REF. CHARACTERS IN FIG. 1 PRECEDED BY 1-

REF. CHARACTERS IN FIG. 2 PRECEDED BY 2-

*INVENTOR.*
ARTHUR J. GEHRING, Jr.
LLOYD W. STOWE

AGENT

REF. CHARACTERS IN FIG. 3 PRECEDED BY 3-

*INVENTOR.*
ARTHUR J. GEHRING, Jr.
LLOYD W. STOWE

Charles G. English
AGENT

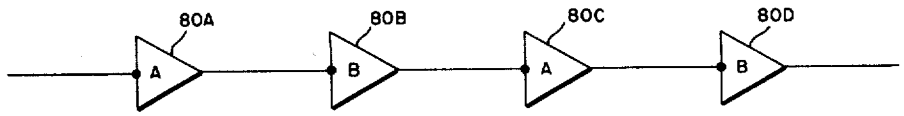
Fig. 4A
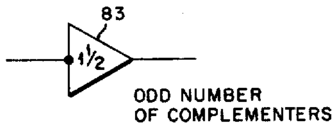
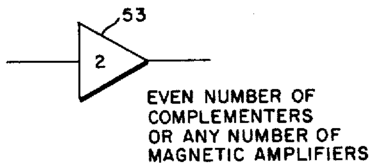
Fig. 4C Fig. 4D
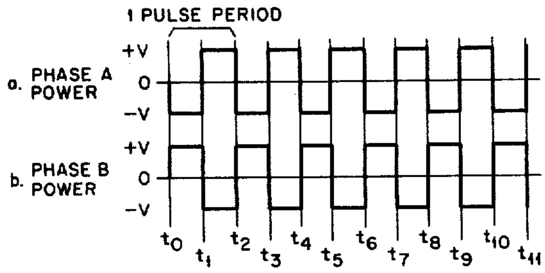
Fig. 4B
REF. CHARACTERS IN
FIG. 4 PRECEDED BY 4-
INVENTOR.
ARTHUR J. GEHRING, Jr.
LLOYD W. STOWE
Charles E. English
AGENT

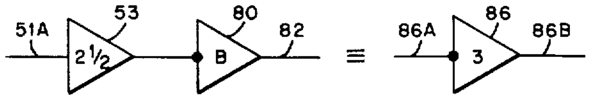
Fig. 5A
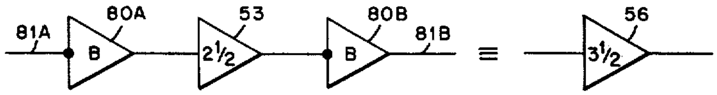
Fig. 5B
REF. CHARACTERS IN
FIG. 5 PRECEDED BY 5-
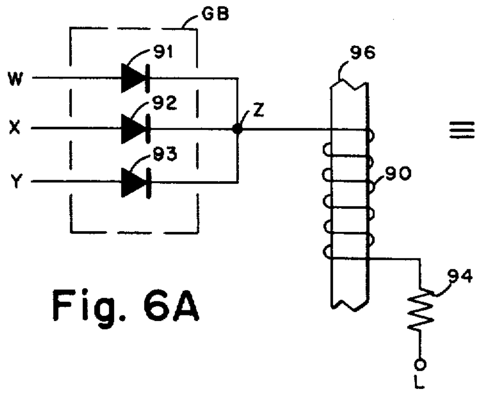
Fig. 6A
Fig. 6B
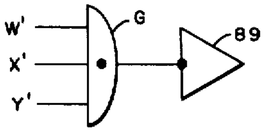
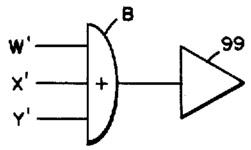
Fig. 6C
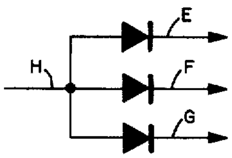
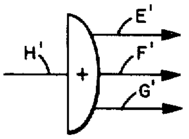
Fig. 6D Fig. 6E
REF. CHARACTERS IN
FIG. 6 PRECEDED BY 6-
*INVENTOR.*
ARTHUR J. GEHRING, Jr.
LLOYD W. STOWE
Charles G. Englert
AGENT July 20, 1965 A. J. GEHRING, JR., ETAL 3,196,402
MAGNETIC COMPUTER
Filed March 28, 1957 77 Sheets-Sheet 5

ENCODING FUNCTION TABLE FOR HIGH LEVEL SIGNALS
DECODING FUNCTION TABLE FOR LOW LEVEL SIGNALS

REF. CHARACTERS IN
FIG. 7 PRECEDED BY 7-

INVENTOR.
ARTHUR J. GEHRING, Jr.
LLOYD W. STOWE

Charles C. English
AGENT

MAGNETIC COMPUTER

Filed March 28, 1957 77 Sheets-Sheet 6

REF. CHARACTERS IN
FIG. 8 PRECEDED BY 8-

*INVENTOR.*
ARTHUR J. GEHRING, Jr.
LLOYD W. STOWE

Charles E. English
AGENT

REF. CHARACTERS IN FIG. 9 PRECEDED BY 9-

INVENTOR.
ARTHUR J. GEHRING, Jr.
LLOYD W. STOWE

Charles G. English
AGENT

INVENTOR
ARTHUR J. GEHRING, J
LLOYD W. STOWE

Charles C. English
AGENT

INVENTOR
ARTHUR J. GEHRING, Jr.
LLOYD W. STOWE

Charles G. English
AGENT

INVENTOR
ARTHUR J. GEHRING, Jr.
LLOYD W. STOWE

Charles C. English
AGENT

SIGN OF (rA) FLIP FLOP

SIGN OF (rX) FLIP FLOP

SIGN OF (rL) FLIP FLOP

REF CHARACTERS ON THIS SHEET PRECEDED BY 11–

INVENTOR
ARTHUR J. GEHRING, Jr.
LLOYD W. STOWE
Charles G. Engle
AGENT

REF. CHARACTERS ON THIS SHEET PRECEDED BY 12-

INVENTOR
ARTHUR J. GEHRING, Jr.
LLOYD W. STOWE

Charles C. English
AGENT rC–"C" REGISTER

REF. CHARACTERS ON THIS SHEET PRECEDED BY 13–

INVENTOR
ARTHUR J. GEHRING, Jr.
LLOYD W. STOWE

Charles C. English
AGENT

July 20, 1965 A. J. GEHRING, JR., ETAL 3,196,402

MAGNETIC COMPUTER

Filed March 28, 1957 77 Sheets-Sheet 14

REF. CHARACTERS ON THIS SHEET PRECEDED BY 14-

INVENTOR
ARTHUR J. GEHRING, Jr.
LLOYD W. STOWE

Charles G. English
AGENT

INVENTOR
ARTHUR J. GEHRING, Jr.
LLOYD W. STOWE

Charles C. English
AGENT

MAGNETIC COMPUTER

Filed March 28, 1957

INVENTOR
ARTHUR J. GEHRING, Jr.
LLOYD W. STOWE
Charles C. English
AGENT

REF. CHARACTERS ON THIS SHEET PRECEDED BY 16—

INVENTOR
ARTHUR J. GEHRING, Jr.
LLOYD W. STOWE
Charles C. English
AGENT rX-"X" REGISTER BIT 3 & 4 CHANNELS

REF. CHARACTERS ON THIS SHEET PRECEDED BY 16 –

INVENTOR
ARTHUR J. GEHRING, Jr.
LLOYD W. STOWE

Charles C. English
AGENT

MAGNETIC COMPUTER

Filed March 28, 1957 77 Sheets-Sheet 19

REF. CHARACTERS ON THIS SHEET PRECEDED BY 17-

INVENTOR
ARTHUR J. GEHRING, Jr.
LLOYD W. STOWE

Charles C. English
AGENT

MAGNETIC COMPUTER

Filed March 28, 1957 77 Sheets-Sheet 20

REF. CHARACTERS
ON THIS SHEET
PRECEDED BY 17–

INVENTOR
ARTHUR J. GEHRING, Jr.
LLOYD W. STOWE

Charles G. English
AGENT

ADDER INPUT AND rA LEFT SHIFT GATES

REF. CHARACTERS ON THIS SHEET PRECEDED BY 18—

INVENTOR
ARTHUR J. GEHRING, Jr.
LLOYD W. STOWE

Charles C. English
AGENT

July 20, 1965 A. J. GEHRING, JR., ETAL 3,196,402

MAGNETIC COMPUTER

Filed March 28, 1957 77 Sheets-Sheet 22

INVENTOR
ARTHUR J. GEHRING, Jr.
LLOYD W. STOWE

Charles C. English
AGENT

INVENTOR
ARTHUR J. GEHRING, Jr.
LLOYD W. STOWE

Charles G. English
AGENT

July 20, 1965 A. J. GEHRING, JR., ETAL 3,196,402

MAGNETIC COMPUTER

Filed March 28, 1957 77 Sheets-Sheet 24

INVENTOR
ARTHUR J. GEHRING, Jr.
LLOYD W. STOWE

Charles C. English
AGENT

INVENTOR
ARTHUR J. GEHRING, Jr.
LLOYD W. STOWE
Charles C. English
AGENT

REF. CHARACTERS ON THIS SHEET PRECEDED BY 24 —

INVENTOR
ARTHUR J. GEHRING, Jr.
LLOYD W. STOWE

Charles E. English
AGENT

REF. CHARACTERS ON THIS SHEET PRECEDED BY 25-

INVENTOR
ARTHUR J. GEHRING, Jr.
LLOYD W. STOWE
Charles C. English
AGENT

MAGNETIC COMPUTER

Filed March 28, 1957

INVENTOR
ARTHUR J. GEHRING, Jr.
LLOYD W. STOWE

Charles E. English

AGENT

July 20, 1965 A. J. GEHRING, JR., ETAL 3,196,402
MAGNETIC COMPUTER
Filed March 28, 1957 77 Sheets-Sheet 29
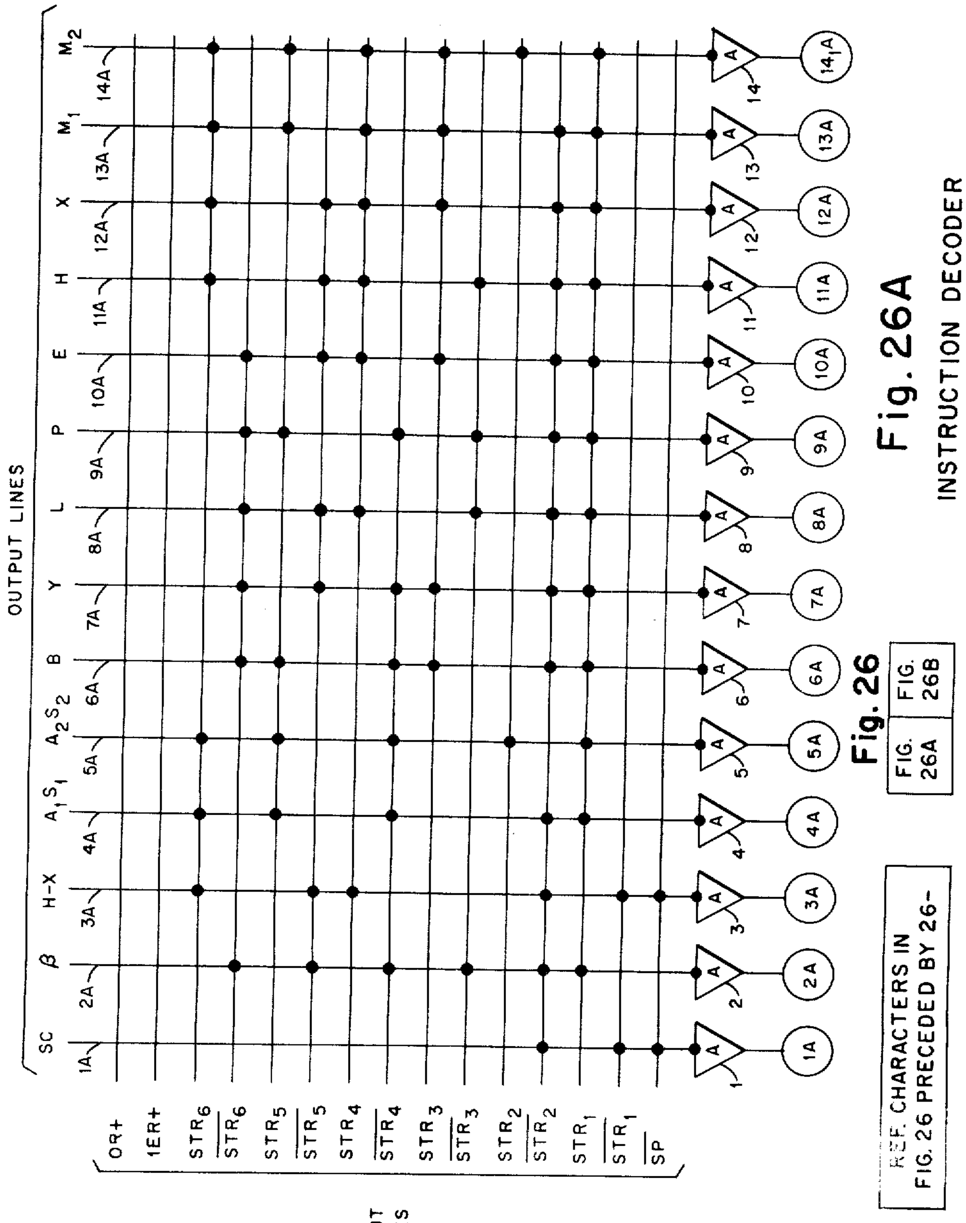
Fig. 26A, Fig. 26
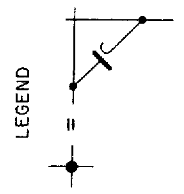
INVENTOR.
ARTHUR J. GEHRING, Jr.
LLOYD W. STOWE
Charles C. English
AGENT INVENTOR.
ARTHUR J. GEHRING, Jr.
LLOYD W. STOWE Charles G. English
AGENT July 20, 1965 A. J. GEHRING, JR., ETAL 3,196,402
MAGNETIC COMPUTER
Filed March 28, 1957
77 Sheets-Sheet 31
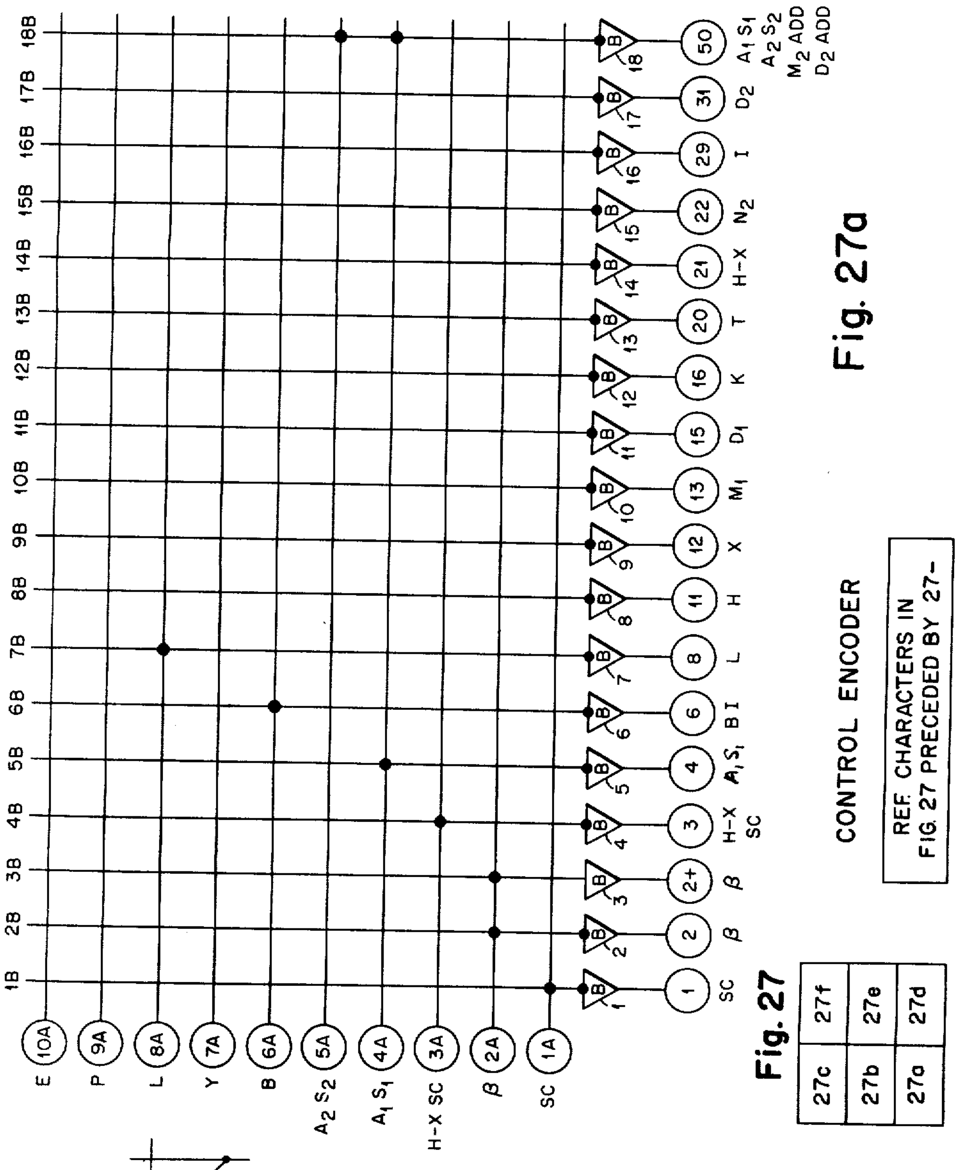
Fig. 27a, Fig. 27
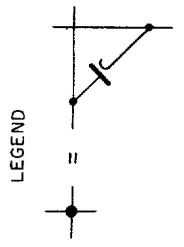
*INVENTOR.*
ARTHUR J. GEHRING, Jr.
LLOYD W. STOWE
Charles C. English
AGENT INVENTOR.
ARTHUR J. GEHRING, Jr.
LLOYD W. STOWE Charles C. English
AGENT INVENTOR.
ARTHUR J. GEHRING, Jr.
LLOYD W. STOWE Charles C. English
AGENT INVENTOR.
ARTHUR J. GEHRING, Jr.
LLOYD W. STOWE Charles G. Englert
AGENT July 20, 1965 A. J. GEHRING, JR., ETAL 3,196,402

MAGNETIC COMPUTER

Filed March 28, 1957 77 Sheets-Sheet 35

*INVENTOR.*
ARTUR J. GEHRING, Jr.
LLOYD W. STOWE

Charles C. English
AGENT

MAGNETIC COMPUTER

INVENTOR.
ARTHUR J. GEHRING, Jr.
LLOYD W. STOWE
Charles C. English
AGENT

INVENTOR
ARTHUR J. GEHRING, Jr.
LLOYD W. STOWE

Charles C. English
AGENT

INVENTOR
ARTHUR J. GEHRING, Jr.
LLOYD W. STOWE
Charles G. English
AGENT

REF. CHARACTERS ON THIS SHEET PRECEDED BY 29-

HEAD SWITCHES

INVENTOR
ARTHUR J. GEHRING, Jr.
LLOYD W. STOWE
Charles C. English
AGENT

REF. CHARACTERS ON THIS SHEET PRECEDED BY 29-

HEAD SWITCHES

*INVENTOR.*
ARTHUR J. GEHRING, Jr.
LLOYD W. STOWE

Charles C. English
AGENT

MAGNETIC COMPUTER

Filed March 28, 1957

INVENTOR
ARTHUR J. GEHRING, Jr.
LLOYD W. STOWE
Charles G. English
AGENT

REF. CHARACTERS ON THIS SHEET PRECEDED BY 30—

INVENTOR
ARTHUR J. GEHRING, Jr.
LLOYD W. STOWE
Charles C. English
AGENT

READ-WRITE CIRCUITS FOR INFORMATION BANDS

REF. CHARACTERS ON THIS SHEET PRECEDED BY 31-

INVENTOR
ARTHUR J. GEHRING, Jr.
LLOYD W. STOWE

Charles C. English
AGENT

FROM MINUEND BUFFERS FIG. 20

REF. CHARACTERS ON THIS SHEET PRECEDED BY 31—

INVENTOR.
ARTHUR J. GEHRING, Jr.
LLOYD W. STOWE

Charles C. English
AGENT

SYNCHRONIZING, START & STOP FLIP FLOPS

REF. CHARACTERS ON THIS SHEET PRECEDED BY 32-

TIMING READ CIRCUITS

INVENTOR
ARTHUR J. GEHRING, Jr.
LLOYD W. STOWE

Charles G. English
AGENT

REF. CHARACTERS FOR FIG.35 PRECEDED BY 35-

CYCLING UNIT ERROR FLIP FLOP

EVERY OTHER WORD FLIP FLOP

REF. CHARACTERS FOR FIG.33 PRECEDED BY 33-

INVENTOR
ARTHUR J. GEHRING, Jr.
LLOYD W. STOWE

Charles G. English
AGENT

INVENTOR
ARTHUR J. GEHRING, Jr.
LLOYD W. STOWE
Charles C. English
AGENT

REF. CHARACTERS ON THIS SHEET PRECEDED BY FIG. 35-

INVENTOR
ARTHUR J. GEHRING, Jr.
LLOYD W. STOWE
Charles C. English
AGENT

INVENTOR
ARTHUR J. GEHRING, Jr.
LLOYD W. STOWE
Charles C. English
AGENT

"Q" INSTRUCTION (22)
(rA) = (rL), "M" ADDRESS
(rA) ≠ (rL), "C" ADDRESS

INVENTOR
ARTHUR J. GEHRING, Jr.
LLOYD W. STOWE
Charles C. English
AGENT

INVENTOR
ARTHUR J. GEHRING, Jr.
LLOYD W. STOWE
Charles C. English
AGENT

"V" INSTRUCTION (37)
LEFT SHIFT (TA)

INVENTOR
ARTUR J. GEHRING, Jr.
LLOYD W. STOWE
Charles E. English
AGENT

MAGNETIC COMPUTER

INVENTOR
ARTHUR J. GEHRING, Jr.
LLOYD W. STOWE
Charles C. English
AGENT

July 20, 1965 A. J. GEHRING, JR., ETAL 3,196,402

MAGNETIC COMPUTER

Filed March 28, 1957 77 Sheets-Sheet 54

INVENTOR
ARTHUR J. GEHRING, Jr.
LLOYD W. STOWE
Charles E. English
AGENT

INVENTOR
ARTHUR J. GEHRING, Jr.
LLOYD W. STOWE
Charles G. Engfield
AGENT

INVENTOR
ARTHUR J. GEHRING, Jr.
LLOYD W. STOWE
Charles C. English
AGENT

MAGNETIC COMPUTER

Filed March 28, 1957

77 Sheets-Sheet 57

INVENTOR
ARTHUR J. GEHRING, Jr.
LLOYD W. STOWE

Charles E. English
AGENT

July 20, 1965 A. J. GEHRING, JR., ETAL 3,196,402

MAGNETIC COMPUTER

Filed March 28, 1957

77 Sheets-Sheet 58

ADDITION-SUBTRACTION

INVENTOR
ARTHUR J. GEHRING, Jr
LLOYD W. STOWE

Charles C. English

AGENT

INVENTOR
ARTHUR J. GEHRING Jr.
LLOYD W. STOWE
Charles E. English
AGENT

July 20, 1965 A. J. GEHRING, JR., ETAL 3,196,402

MAGNETIC COMPUTER

Filed March 28, 1957 77 Sheets-Sheet 60

INVENTOR
ARTHUR J. GEHRING, Jr.
LLOYD W. STOWE

Charles C. Englert
AGENT

MULTIPLICATION

INVENTOR
ARTHUR J. GEHRING, Jr.
LLOYD W. STOWE

Charles E. English
AGENT

July 20, 1965 A. J. GEHRING, JR., ETAL 3,196,402

MAGNETIC COMPUTER

Filed March 28, 1957

77 Sheets-Sheet 62

INVENTOR
ARTHUR J. GEHRING. Jr.
LLOYD W. STOWE

Charles C. English
AGENT

DIVISION

INVENTOR
ARTHUR J. GEHRING, Jr.
LLOYD W. STOWE

Charles G. English
AGENT

INVENTOR
ARTHUR J. GEHRING, Jr.
LLOYD W. STOWE

Charles G. English
AGENT

INVENTOR
ARTHUR J. GEHRING, Jr.
LLOYD W. STOWE
Charles C. English
AGENT

INVENTOR
ARTHUR J. GEHRING, Jr.
LLOYD W. STOWE

Charles C. English
AGENT

INVENTOR
ARTHUR J. GEHRING, Jr.
LLOYD W. STOWE
Charles C. English
AGENT

July 20, 1965 A. J. GEHRING, JR., ETAL 3,196,402

MAGNETIC COMPUTER

Filed March 28, 1957 77 Sheets-Sheet 68

ADDRESS SELECTION

INVENTOR
ARTHUR J. GEHRING, Jr.
LLOYD W. STOWE

Charles G. Enfield
AGENT

INVENTOR
ARTHUR J. GEHRING, Jr.
LLOYD W. STOWE
Charles G. English
AGENT

INTERLOCK FLIP-FLOPS

REF. CHARACTERS ON THIS SHEET PRECEDED BY 48-

SPROCKET FLIP-FLOP HOLD & SHIFT CIRCUITS

INVENTOR
ARTHUR J. GEHRING, Jr.
LLOYD W. STOWE
Charles C. English
AGENT

SUPERVISORY CONTROL INPUT (SCI) FLIP-FLOP

SUPERVISORY CONTROL OUTPUT (SCO) FLIP-FLOP

REF. CHARACTERS ON THIS SHEET PRECEDED BY 49

INVENTOR
ARTHUR J. GEHRING, Jr.
LLOYD W. STOWE

Charles C. English
AGENT

MAGNETIC COMPUTER

Filed March 28, 1957 77 Sheets-Sheet 72

OPERATOR REGISTER
(r0)

REF. CHARACTERS
ON THIS SHEET
PRECEDED BY 50-

INVENTOR.
ARTHUR J. GEHRING, Jr.
LLOYD W. STOWE

Charles C. English
AGENT

INVENTOR
ARTHUR J. GEHRING, Jr.
LLOYD W. STOWE
Charles C. English
AGENT

INVENTOR.
ARTHUR J. GEHRING, Jr.
LLOYD W. STOWE

Charles C. English
AGENT

*INVENTOR.*
ARTHUR J. GEHRING, Jr
LLOYD W. STOWE

Charles G. English
AGENT

MAGNETIC COMPUTER

Filed March 28, 1957

INVENTOR.
ARTHUR J. GEHRING, Jr.
LLOYD W. STOWE

Charles C. English
AGENT

INVENTOR.
ARTHUR J. GEHRING, Jr.
LLOYD W. STOWE

Charles C. English
AGENT

United States Patent Office 3,196,402
Patented July 20, 1965

3,196,402

MAGNETIC COMPUTER

Arthur J. Gehring, Jr., Haddonfield, N.J., and Lloyd W. Stowe, Broomall, Pa., assignors to Sperry Rand Corporation, New York, N.Y., a corporation of Delaware

Filed Mar. 28, 1957, Ser. No. 649,160
34 Claims. (Cl. 340—172.5)

This invention relates to a novel electronic digital computer. More particularly this invention relates to a computer employing electrical and magnetic circuitry for controlling and operating upon (numeric) information represented by trains of electrical signals which have been disposed in a binary coded biquinary decimal system.

TABLE OF CONTENTS

| Subject | Column | Figure |
|---|---|---|
| Introduction | 1 | 1-9 |
| General Functional Description | 19 | 10 |
| Memory Drum | 26 | 35A, 35B |
| Timing Read Circuits | 30 | 32A |
| Cycling Unit | 32 | 34 |
| Minuend Buffers | 34 | 20 |
| Subtrahend Buffers | 37 | 19 |
| Static Register | 38 | 25 |
| Instruction Decoder | 45 | 26 |
| Control Encoder | 47 | 27 |
| Complement Flip Flop | 50 | 21 |
| Comparator | 53 | 17 |
| Control Transfer Flip-Flop | 59 | 12A |
| Time Selection Flip Flop | 62 | 12B |
| Adder | 63 | 18 |
| C Register (rC) | 71 | 13 |
| L Register (rL) | 73 | 14 |
| X Register (rX) | 75 | 16 |
| A Register (rA) | 80 | 15 |
| Sign Flip Flops | 86 | 11 |
| Memory Band and Head Selection Circuits | 92 | 28 |
| Head Switches | 97 | 29 |
| Read-Write Heads | 98 | 30 |
| Read-Write Circuits | 100 | 31 |
| Standby | 103 | ---------- |
| Write "0" | 104 | ---------- |
| Write "1" | 106 | ---------- |
| Reading | 108 | ---------- |
| Overflow Circuits | 112 | 22 |
| Multiplier Quotient Counter | 115 | 23 |
| Step Down of MQC | 119 | ---------- |
| IER–OR Circuits | 121 | 24 |
| Cycling Unit Error Flip-Flop | 124 | 33B |
| Every Other Word Flip-Flop | 126 | 33A |
| Start-Stop Circuits | 127 | 32B |
| Computational Operations | 132 | ---------- |
| Address Selection | 133 | 47, 35C |
| K Instruction | 151 | 36 |
| Q Instruction | 152 | 37 |
| T Instruction | 154 | 37 |
| U Instruction | 158 | ---------- |
| N and V Instructions | 158 | 38, 39 |
| E Instruction | 163 | 40 |
| P Instruction | 164 | 41 |
| B Instruction | 165 | 42 |
| X Instruction | 166 | 43 |
| Addition and Subtraction | 170 | 44 |
| Multiplication | 181 | 45 |
| Division | 192 | 46 |
| Input-Output | 211 | ---------- |
| Introduction | 211 | ---------- |
| 0 Register (r0) | 212 | 50 |
| 0 Register Input Circuits | 214 | 51 |
| Sprocket and Interlock Flip Flops | 216 | 48 |
| Supervisory Control Circuits | 221 | 49 |
| Operations | 225 | 52 |

There have been a number of electronic digital computing machines developed within recent years capable of performing arithmetic operations with a fair amount of speed and reliability. These machines generally require an enormous amount of vacuum tube or transistor circuitry, having varying degrees of complexity in order to carry out the many operations required of a versatile computer. Accordingly, those prior art devices requiring the use of a great many vacuum tubes are generally of considerable size and have the disadvantage of being required to handle a considerable power dissipation which necessitates special construction and ventilation facilities. There are also correspondingly large drains from available power supplies which limit the freedom with which such machines may be located. Even the so-called "all transistorized computers" suffer from the limitations inherent in transistors as these elements are oft times unreliable and unstable due to their sensitivity to variations in temperature and light. In addition the transistors now in use are subject to failure or burnout due to transient overloading. Further, at the present time it is extremely difficult to buy commercially available transistors of the same type which are not irregular in character.

The use of electrical circuitry in combination with magnetic elements has within recent years led to the development of signal translating devices known generally as magnetic amplifiers. These recently developed magnetic amplifiers have many advantages over the known devices, for example, vacuum tubes and transistors, used for translating, amplifying and controlling electrical signals. In particular, magnetic amplifiers are more reliable, compact, sturdy and require considerably less power and ventilation to operate than vacuum tubes and are not sensitive to temperature or light variations as are transistors. Additionally, the magnetic amplifier is inherently capable of being employed as a delay or storage device.

It will be appreciated that the particular qualities of a magnetic amplifier already mentioned make them extremely suitable for use in a device, such as a computer, which requires inter alia, a large number of circuits and a high degree of reliability.

Further, an amplifier, which inherently stores or delays electrical signals, is readily adaptable for use in logical elements such as counters, address, registers etc.

Throughout the computer to be described herein there are but two basic magnetic amplifiers used, in conjunction with a gating structure based on a novel principle, to produce the myriad of logical elements and control apparatus necessary.

In addition to employing amplifiers or translating elements, which take advantage of certain magnetic phenomena, the computer disclosed in its preferred form utilizes a rotatable drum provided with a smooth peripheral layer of magnetizable material for storing the bulk of information used in the computer and for supplying control signals to the various magnetic circuits throughout the computer. The control signals emanating from the drum take two different forms; the first comprises two continuous sets of power pulses which drive the various magnetic amplifiers; the second is an initiating signal which is supplied periodically to a cycling unit or master clock which generates the timing signals used in this computer. As will be pointed out in the more detailed explanation of the magnetic amplifiers used herein, two types of power pulses having a pre-selected phase relationship are needed in order to efficiently drive the various magnetic amplifiers. The repetition rate of the two sets of power pulses will determine the speed at which the computer operates and since the two sets of power pulses are supplied from the rotating drum, the repetition rate of the power pulse is a function of the speed of rotation of the drum. It will be appreciated that the repetition rate of the information signal pulses stored on the drum will also be a function of the drum speed so that the power pulses and the information signal pulses will always bear a predetermined temporal relationship, that is the appearance of the information signal pulses and the power pulses are mechanically synchronized.

Further as will be pointed out later in the specification, the temporal relationship between a given set of information pulse signals and the timing signals generated by the cycling unit will determine the numeric value of the given set of information pulses. Since the cycling unit is also controlled by periodic pulses emanating from the drum, it can be seen that the timing signals, the two sets of power pulses needed to drive the magnetic amplifiers and the information signal pulses to be operated upon by the computer are always generated in a fixed time relationship as determined by the speed of rotation of the drum.

Most of the computers already developed employ either the parallel or series approach for handling or operating upon (numeric) information. The former involves the use of a separate channel or wire for each digit of the numeric information, and all digits are transmitted simultaneously, "in parallel." The series system requires only one channel or wire and the digits are transmitted "serially" on this one channel. For parallel operation it is required that separate devices be used in an addition or subtraction operation for each denominational order involved, whereas for serial operation only one such device is necessary because it is possible to process the denominational orders of a number one at a time and thereby use the same device for all orders. The main advantage of parallel operation is that higher computation speeds are possible, whereas the salient feature of serial operation is that less equipment is required to process information.

In the instant computer a series-parallel system has been developed for transmitting and operating upon information, wherein the pulses comprising each denominational order of a number are transmitted and operated upon in a parallel fashion and wherein each denominational order is transmitted and operated upon serially. Thus, a combination has been made in order to effect the advantages of both serial and parallel operation.

Accordingly it is an object of this invention to provide a rugged yet reliable computer.

Another object of the invention is to provide a new computer of increased operational speed which translates information in the serial-parallel mode.

It is another object of this invention to provide a computer utilizing low power dissipative elements.

It is another object of this invention to provide a digital computer utilizing compact magnetic amplifier circuits.

It is another object of this invention to provide a digital computer wherein the internal transferring and storing circuits are all made up of pulse type translating circuits driven from a common pulsating power source.

It is another object of this invention to provide a digital computer in which the flow of digital information within the computer is synchronized by a common pulsating power source energizing the translating circuits making up the computer.

It is another object of the invention to provide a digital computer of the foregoing type in which a rotating drum memory is employed having a signal track recorded thereon from which the pulsating power source is controlled.

It is another object of this invention to provide a digital computer in which one or more of the logical circuits incorporated therein is used for different computer operations.

It is another object of the present invention to provide a computer of the foregoing type which readily lends itself to modular construction techniques.

Other objects and features of the present invention will become apparent upon a careful consideration of the following detailed description when taken together with the accompanying drawings.

In the drawings:

FIG. 1A shows in schematic form a typical magnetic complementer element used in the present invention, while FIGS. 1B and 1C show respectively the logical symbol of the circuit of FIG. 1A and certain operational waveforms useful in understanding the operation of the circuit of FIG. 1A;

FIG. 2A shows in schematic form a typical magnetic amplifier element used in the present invention, while

FIG. 3A shows in block diagram form, a typical closed ring circuit used by this invention and illustrates the manner in which amplifier elements are connected in cascade, while

FIG. 4A shows in block diagram form a cascaded chain of magnetic complementer elements, while FIG. 4B, shows the relationship of the A and B phase power pulses for the A and B phase complementer elements of FIG. 4A;

FIG. 4C shows the logical symbol for a chain of three complementer elements or alternatively a chain of two amplifiers and one complementer;

FIG. 4D shows the logical symbol for a chain of cascaded magnetic elements comprising an even number of complementer elements;

FIGS. 5A and 5B show the logical equivalents of a cascaded chain of amplifiers and complementer elements;

FIG. 6A shows a fragmentary schematic diagram of a gating structure or a buffer network used in this invention, while FIGS. 6B and 6C show the respective logical symbols for these circuits;

FIGS. 6D and 6E show the schematic and logical representation of a different type of buffer circuit used in this invention;

Figure 10A:
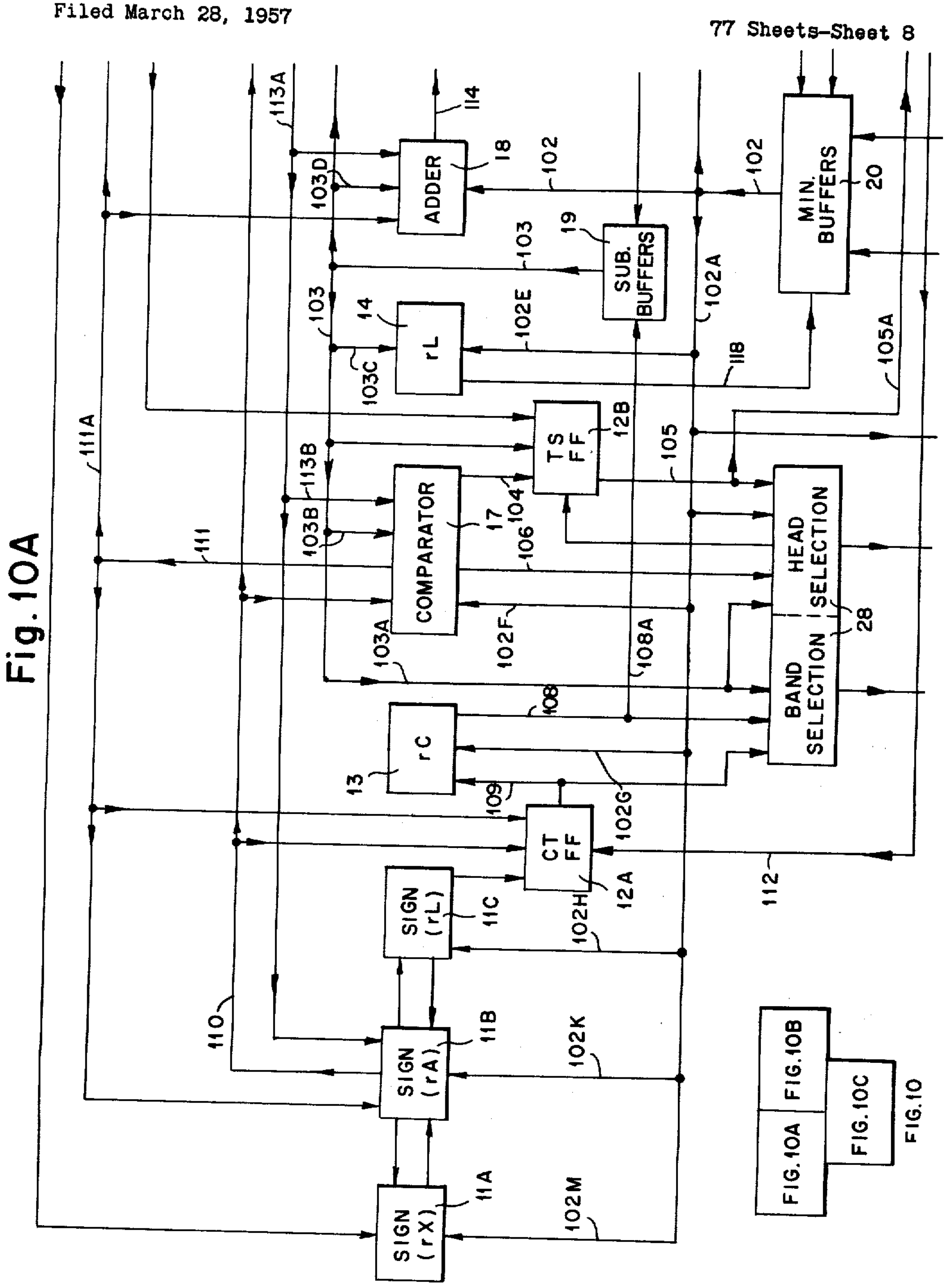
Figure 10B:
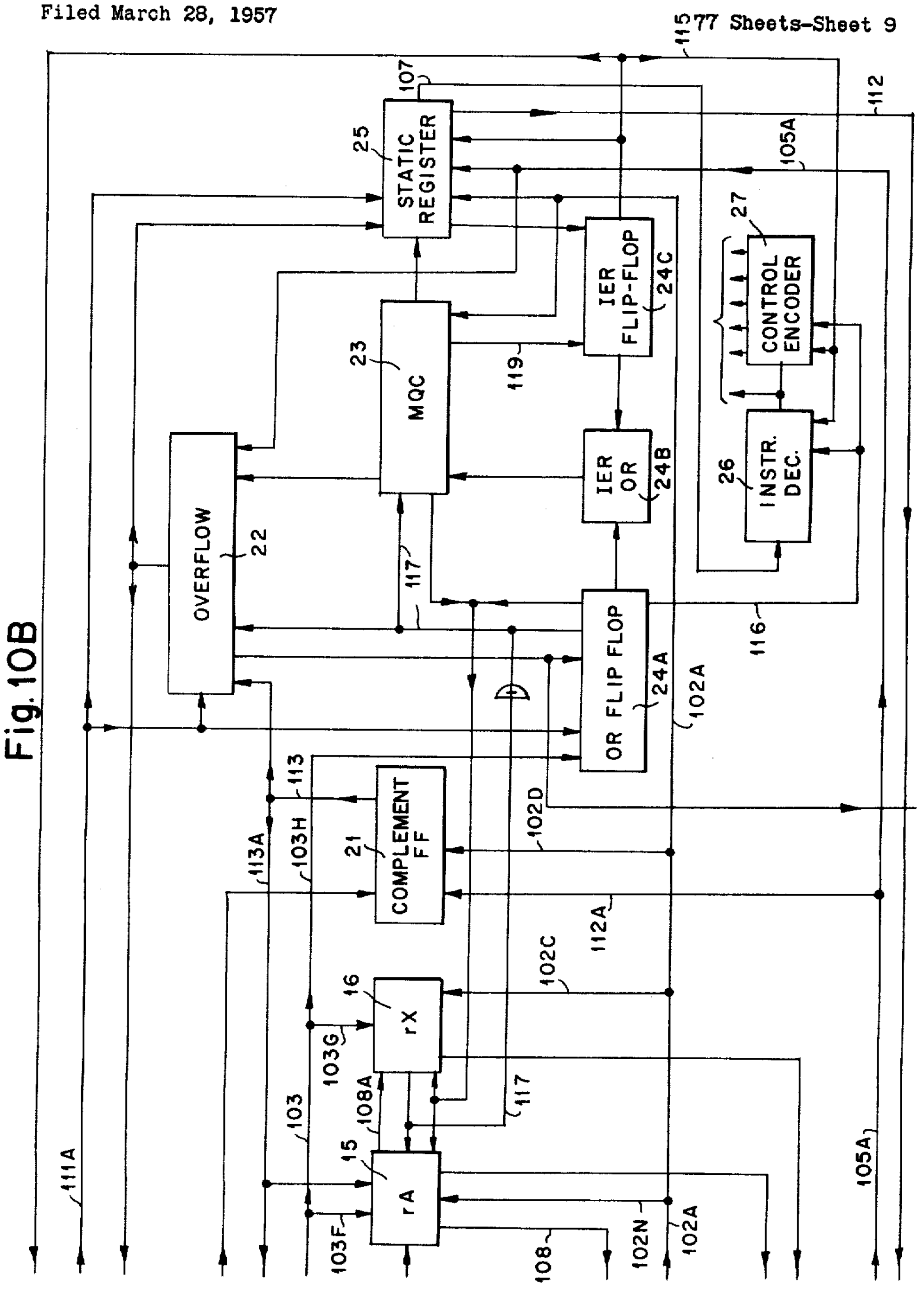
Figure 10C:
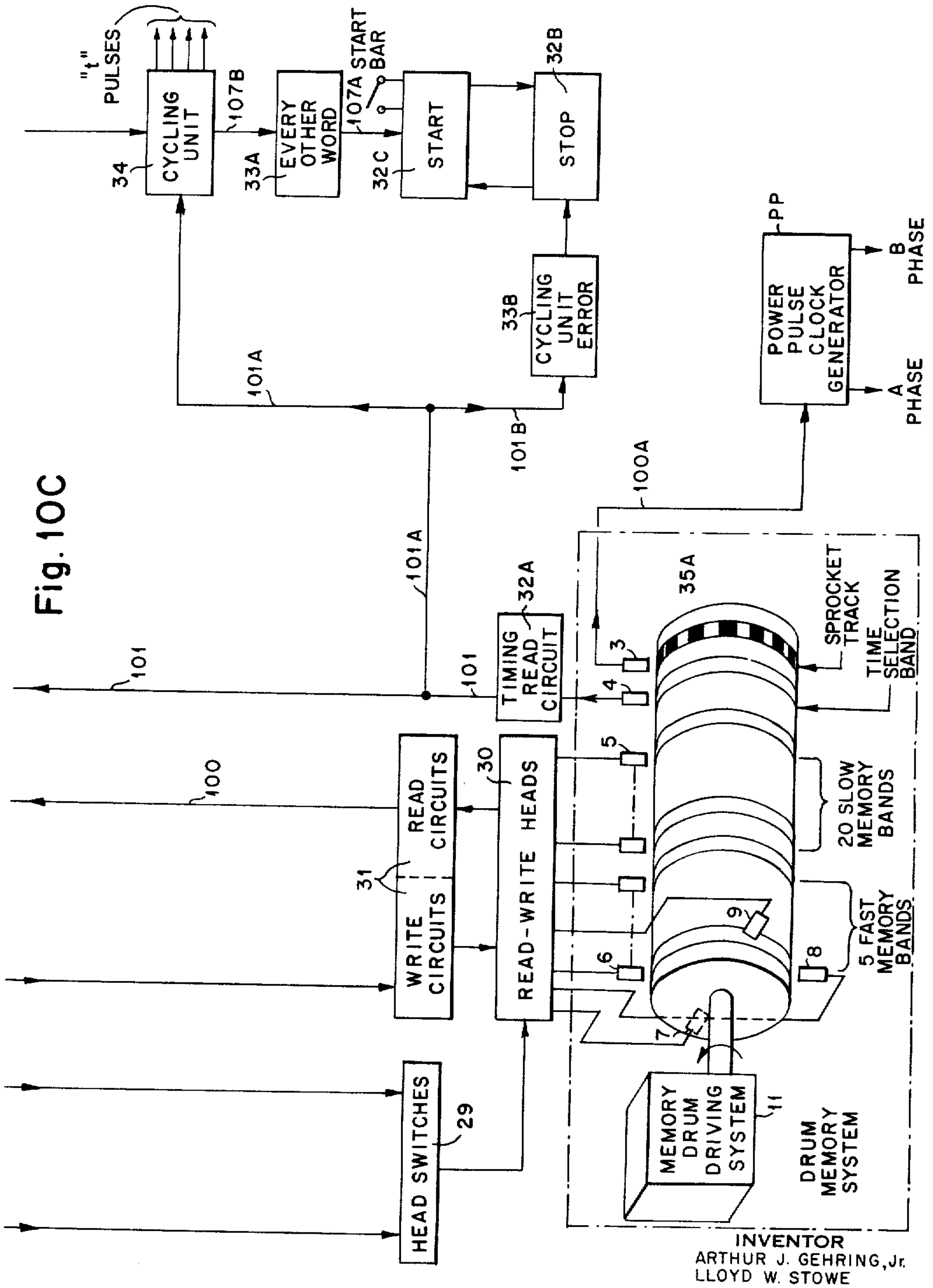
Figure 11B:
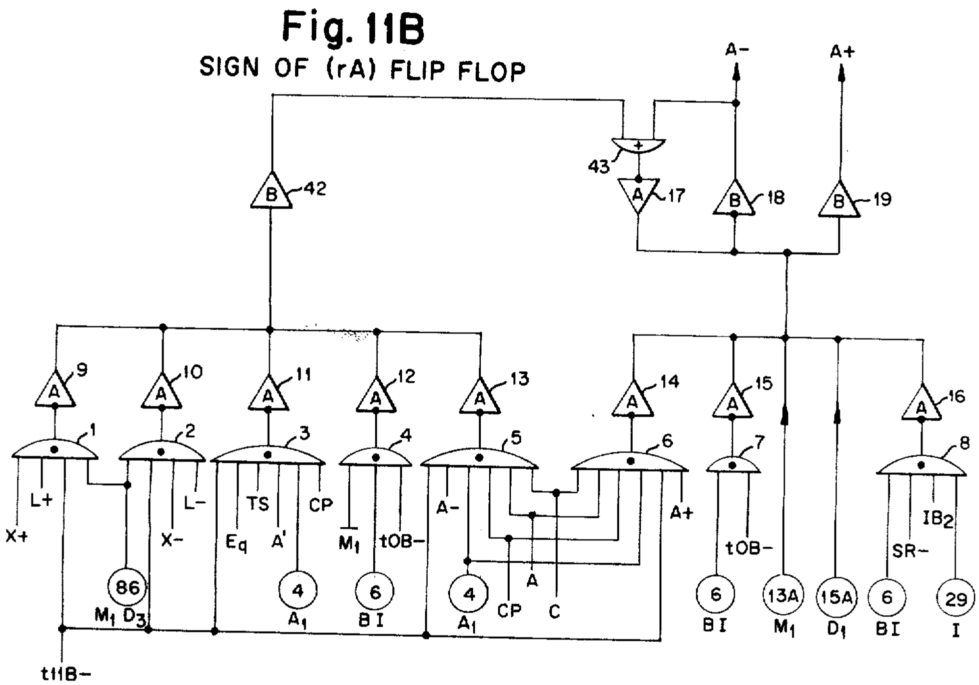
Figure 11A:
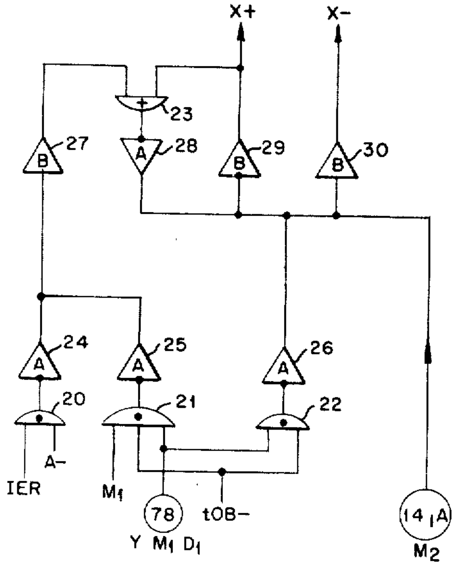
Figure 11C:
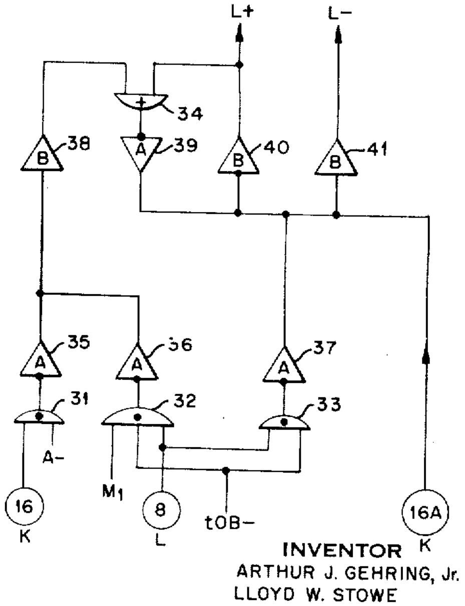
Figure 12:
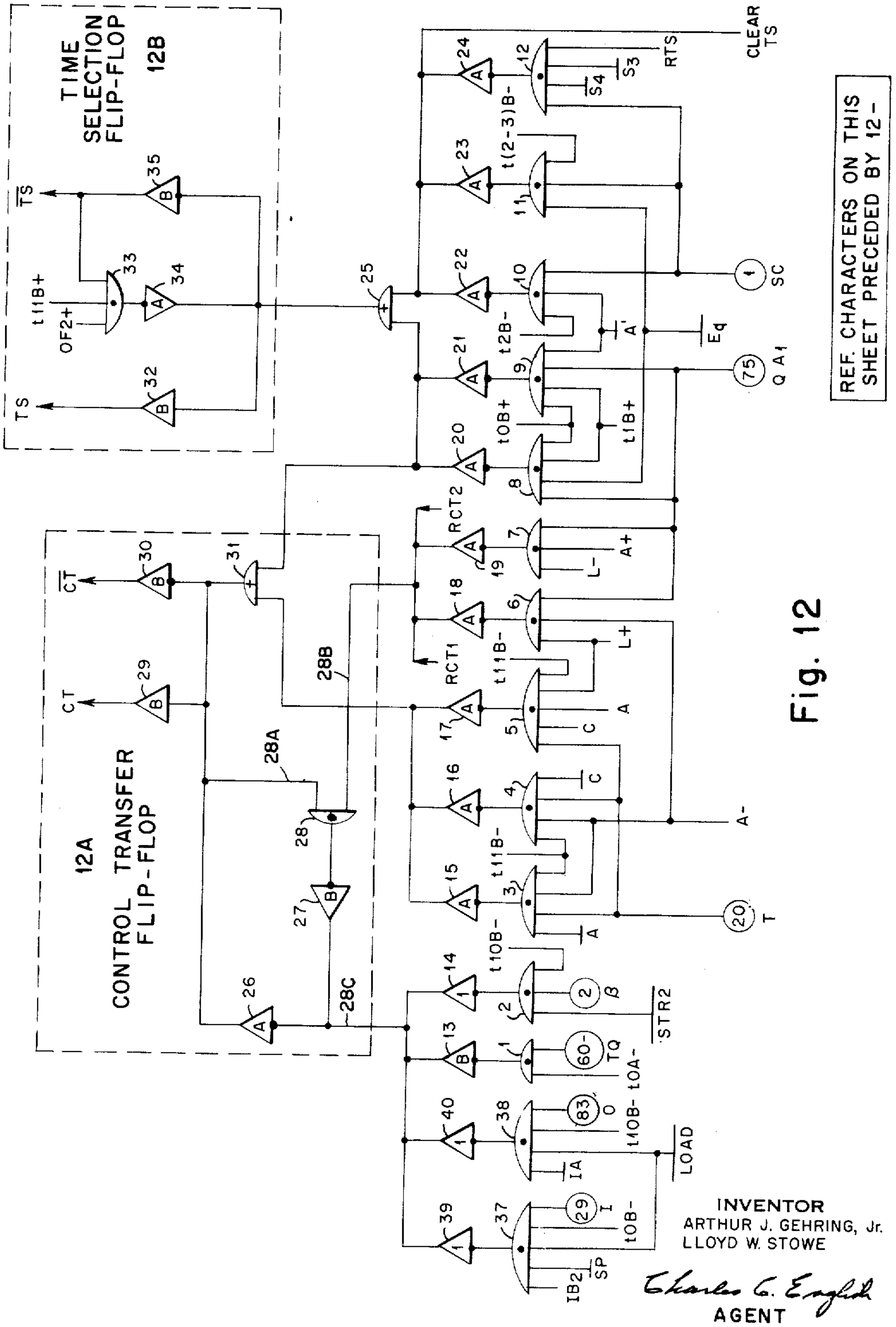
Figure 13:
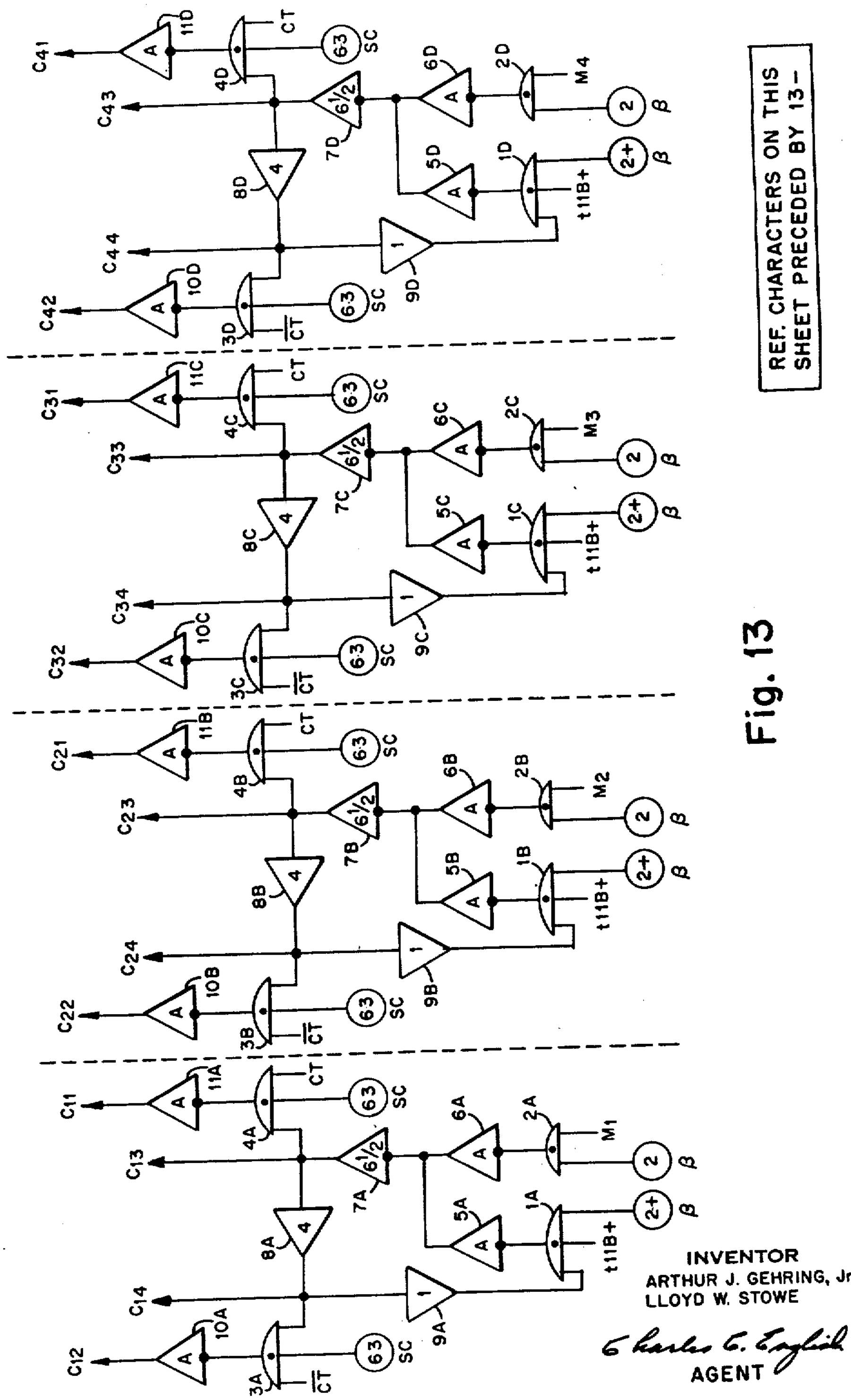
Figure 14:
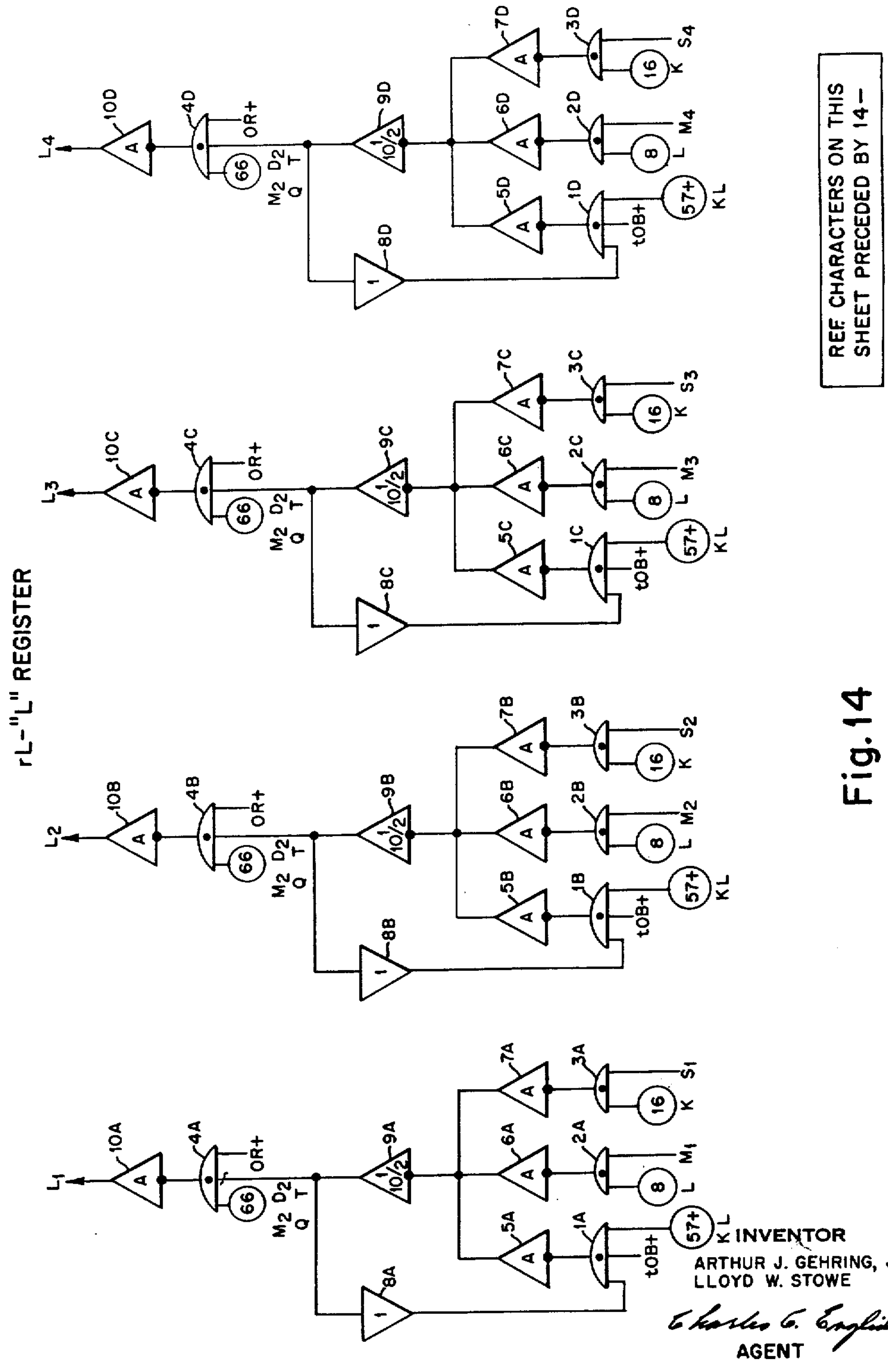
Figure 15A:
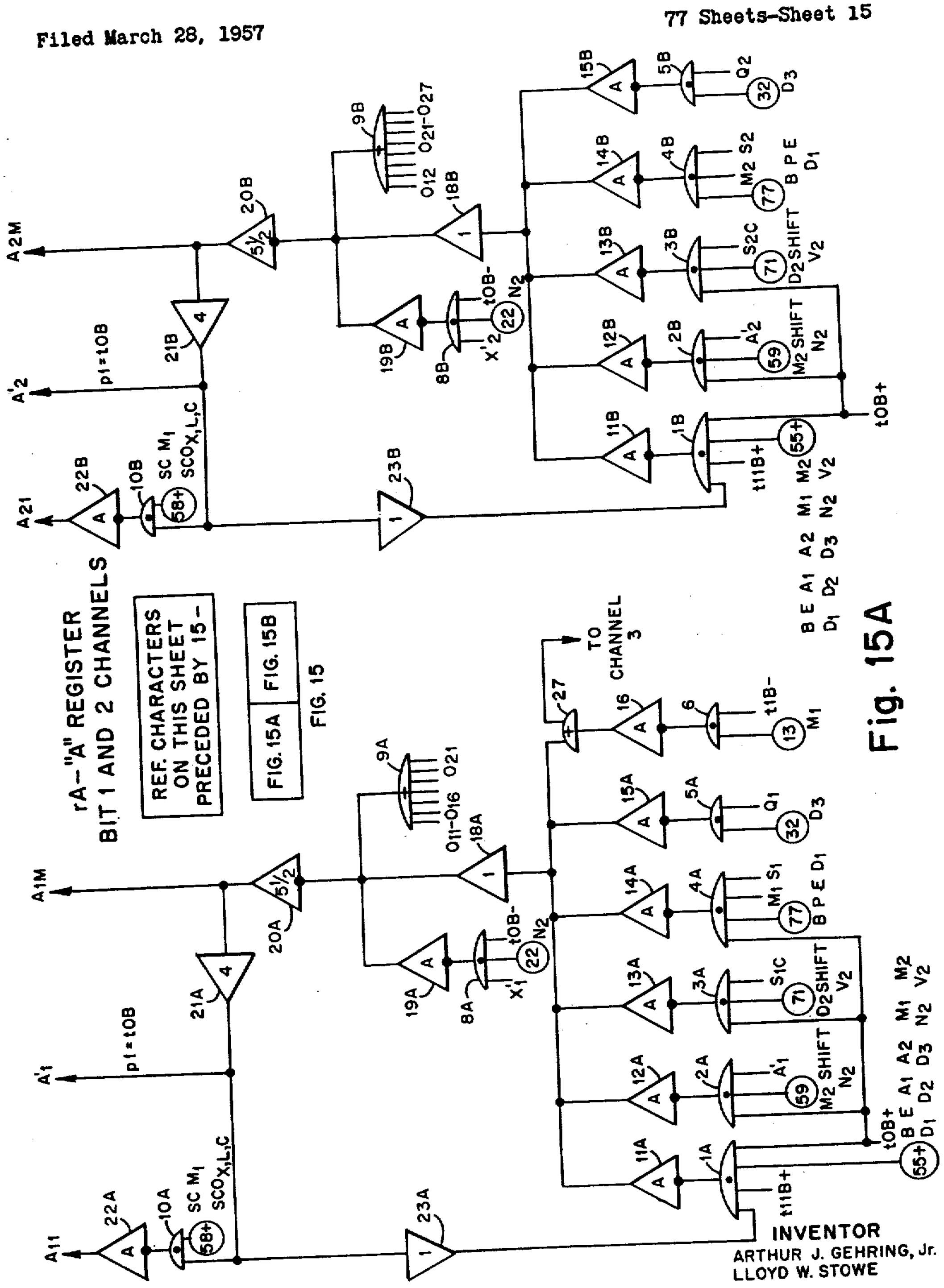
Figure 15B:
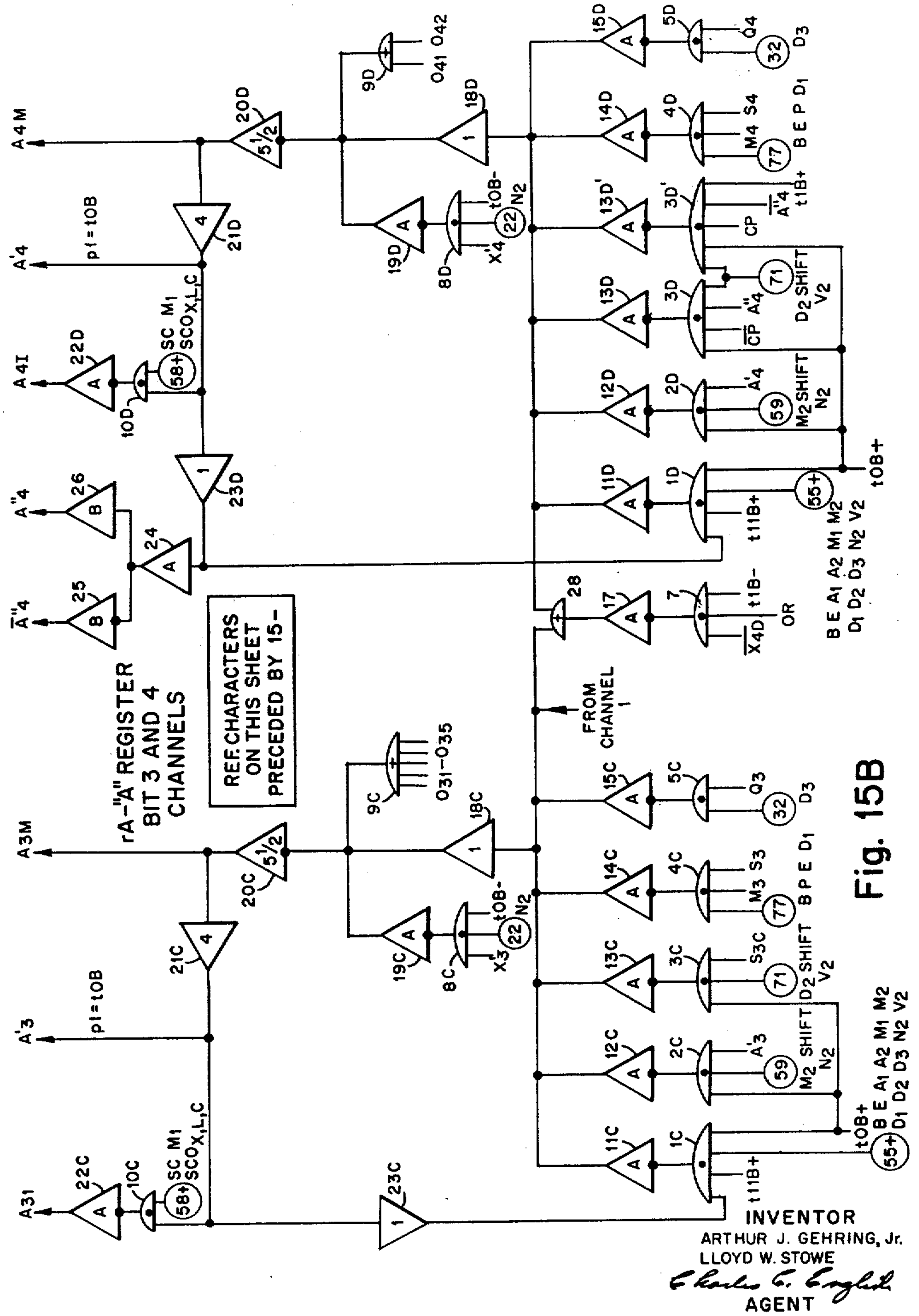
Figures 16, 16A, 16B:
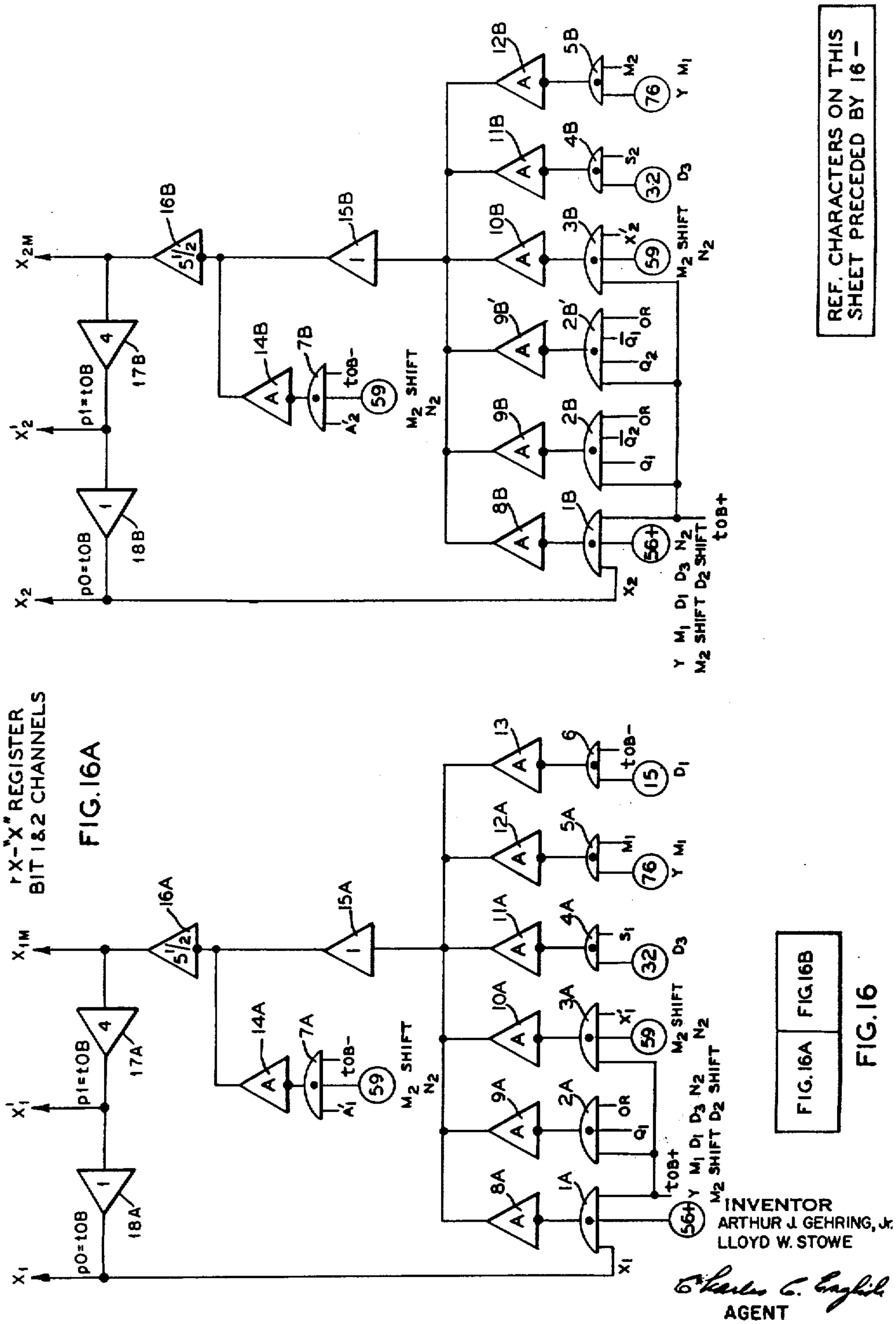
Figure 16B:
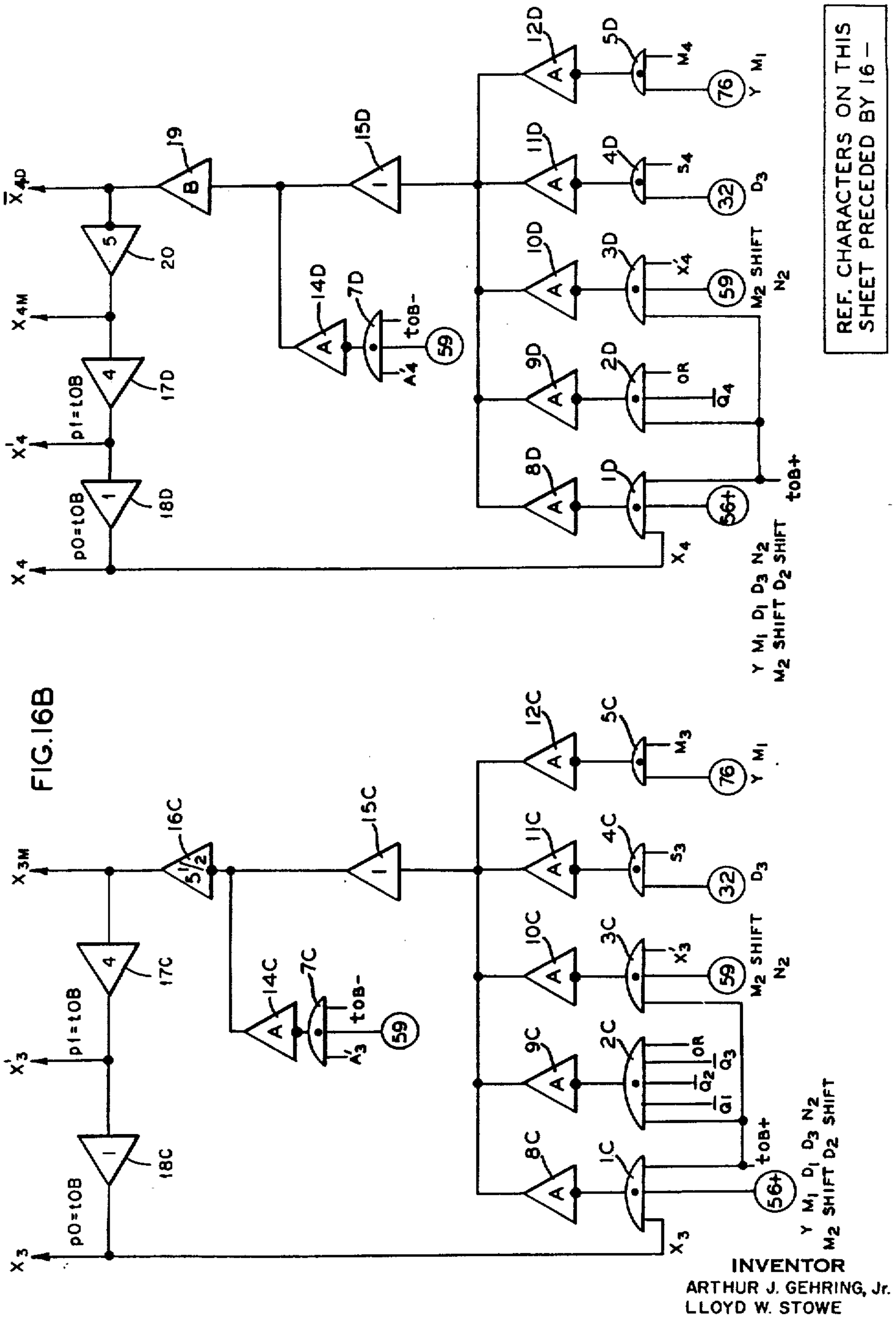
Figure 18A:
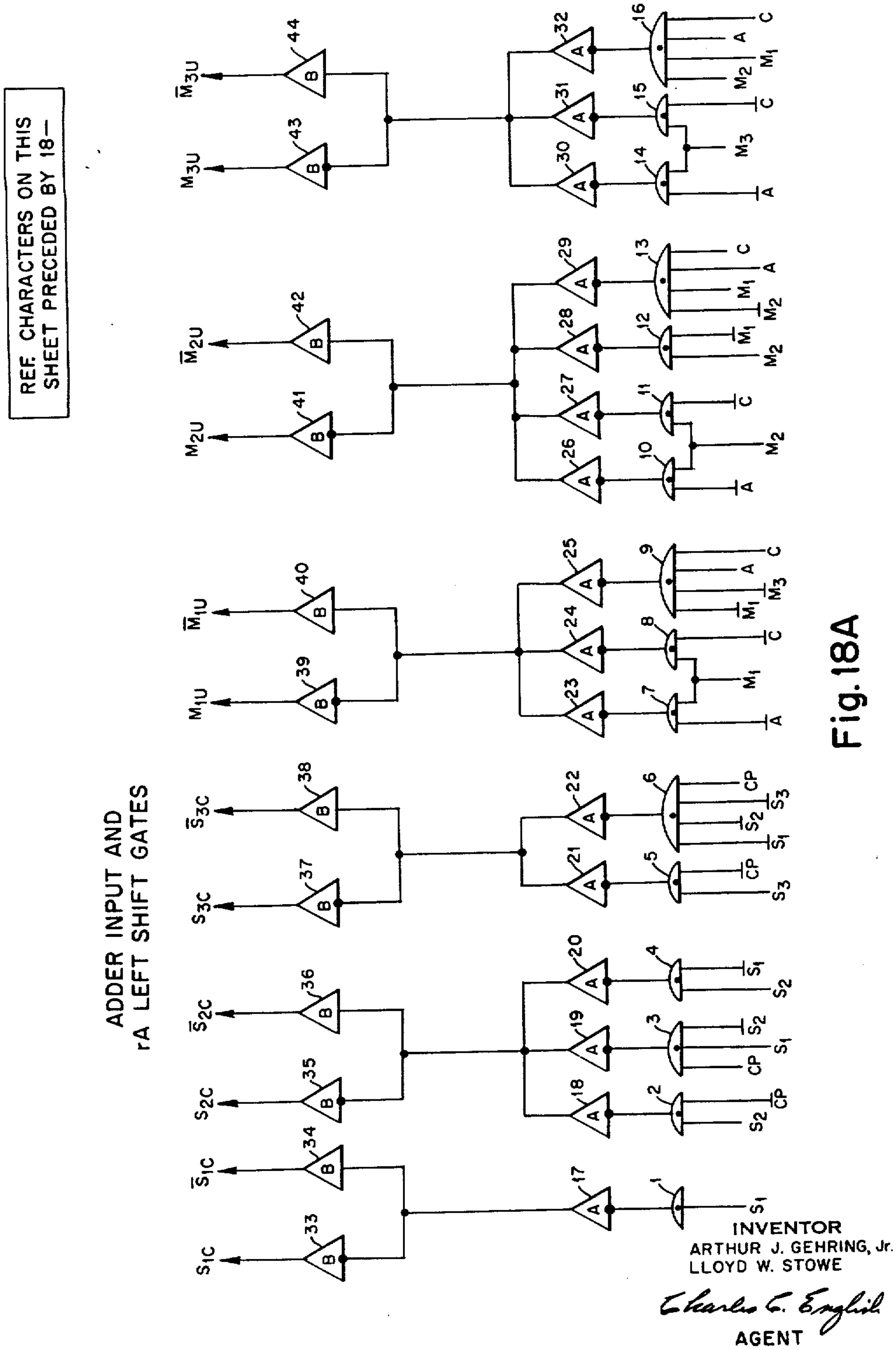
Figure 18B:
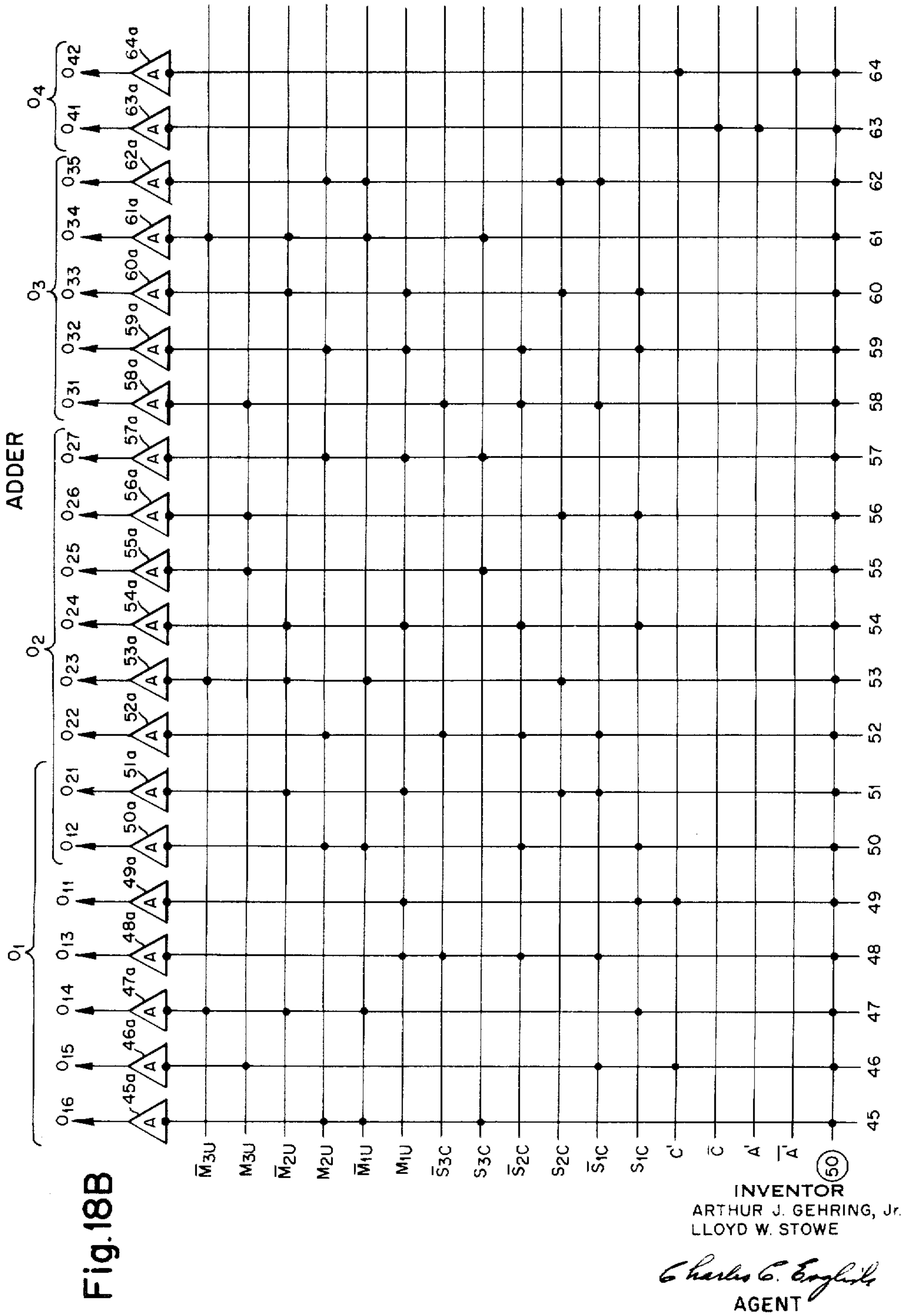
Figures 19, 20:
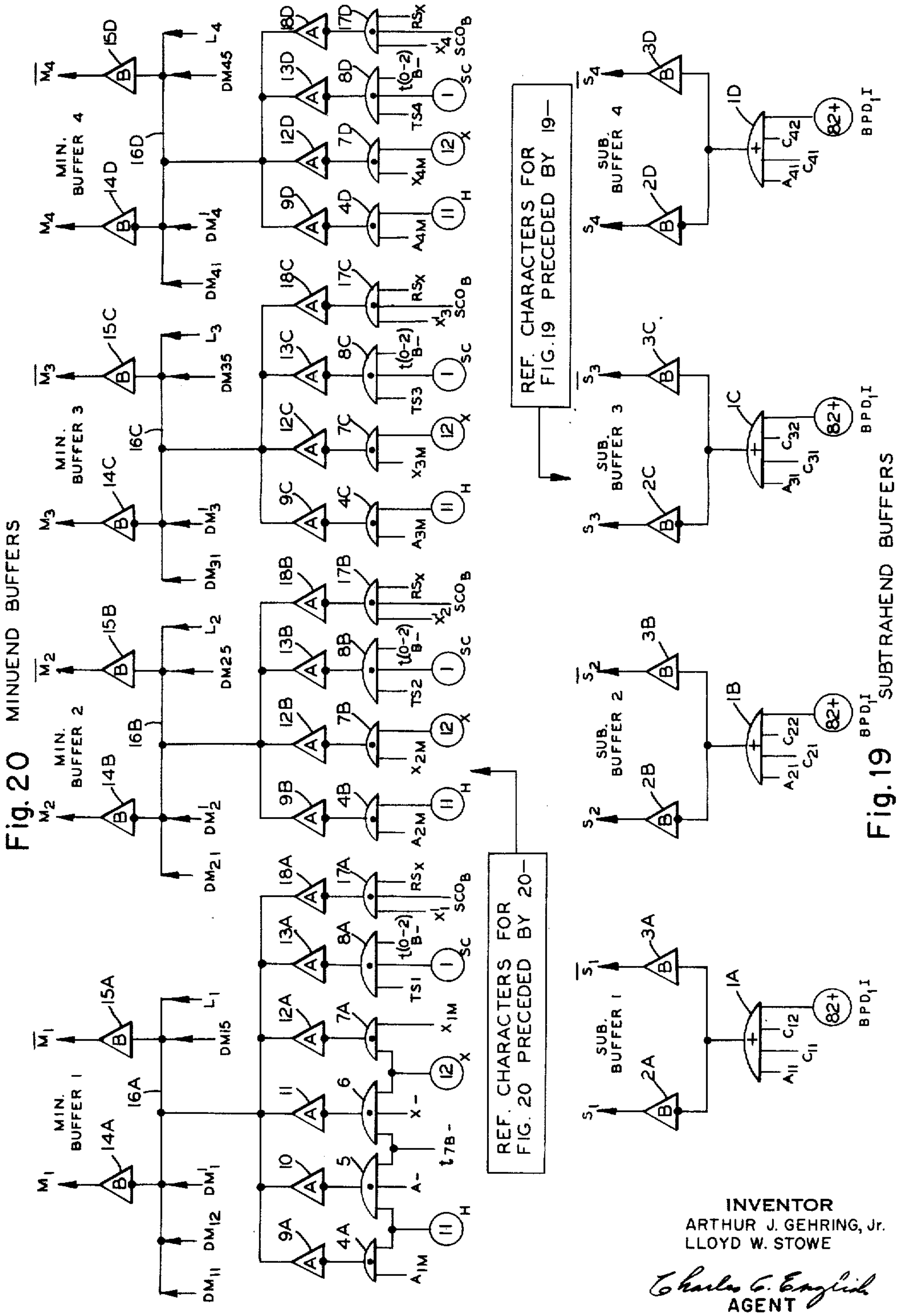
Figures 21, 22:
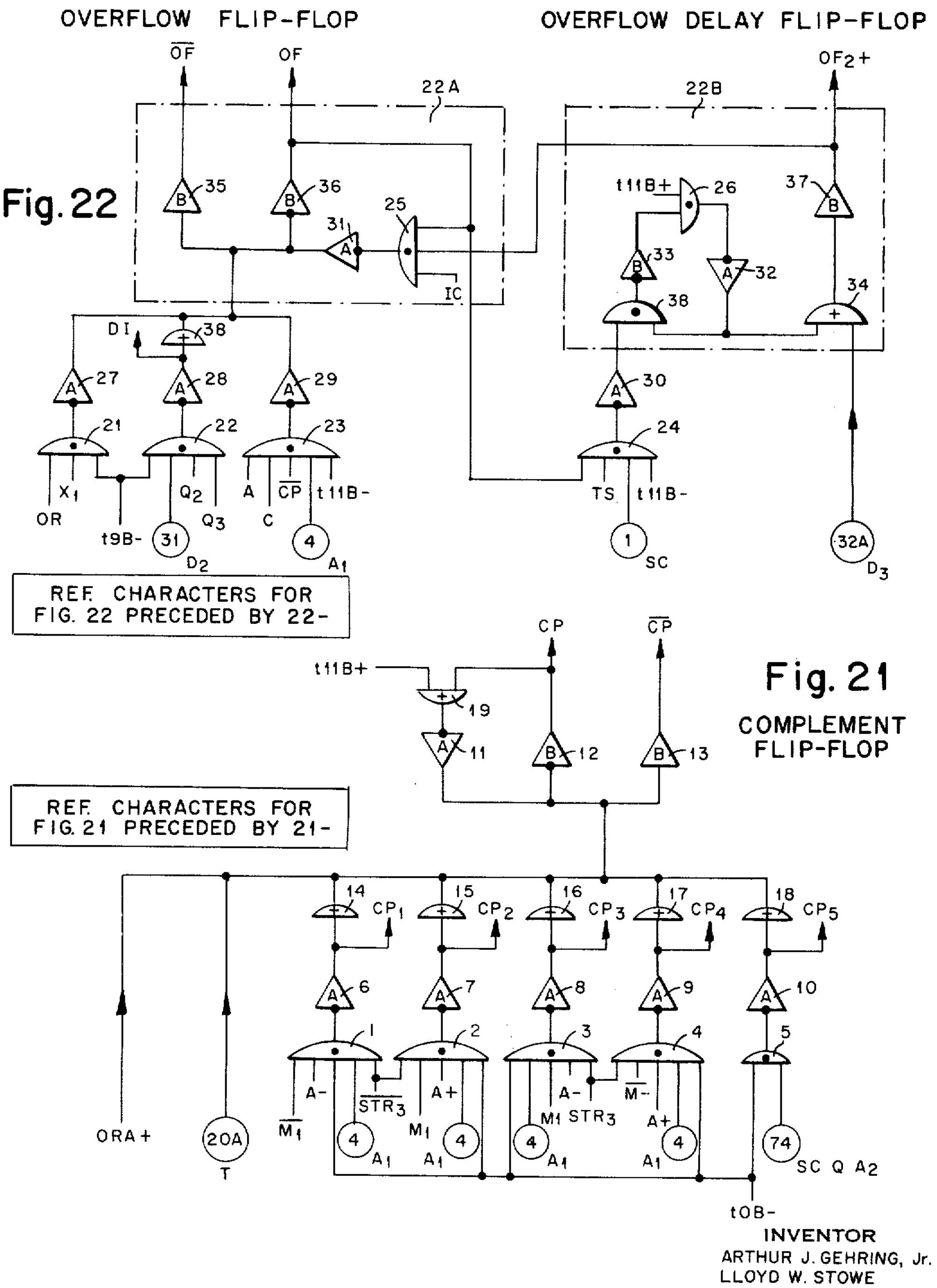
Figures 23A, 23B:
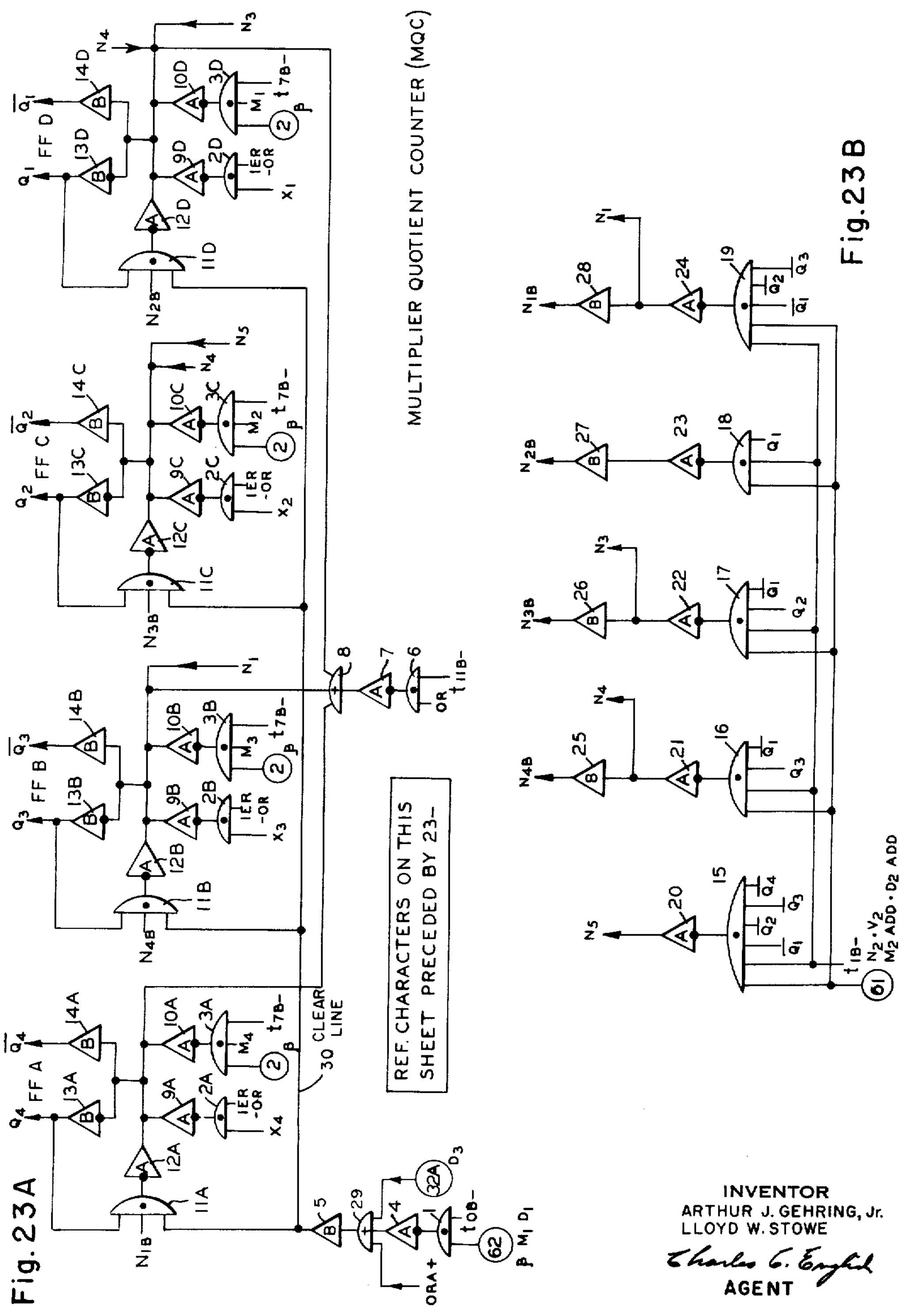
Figure 24:
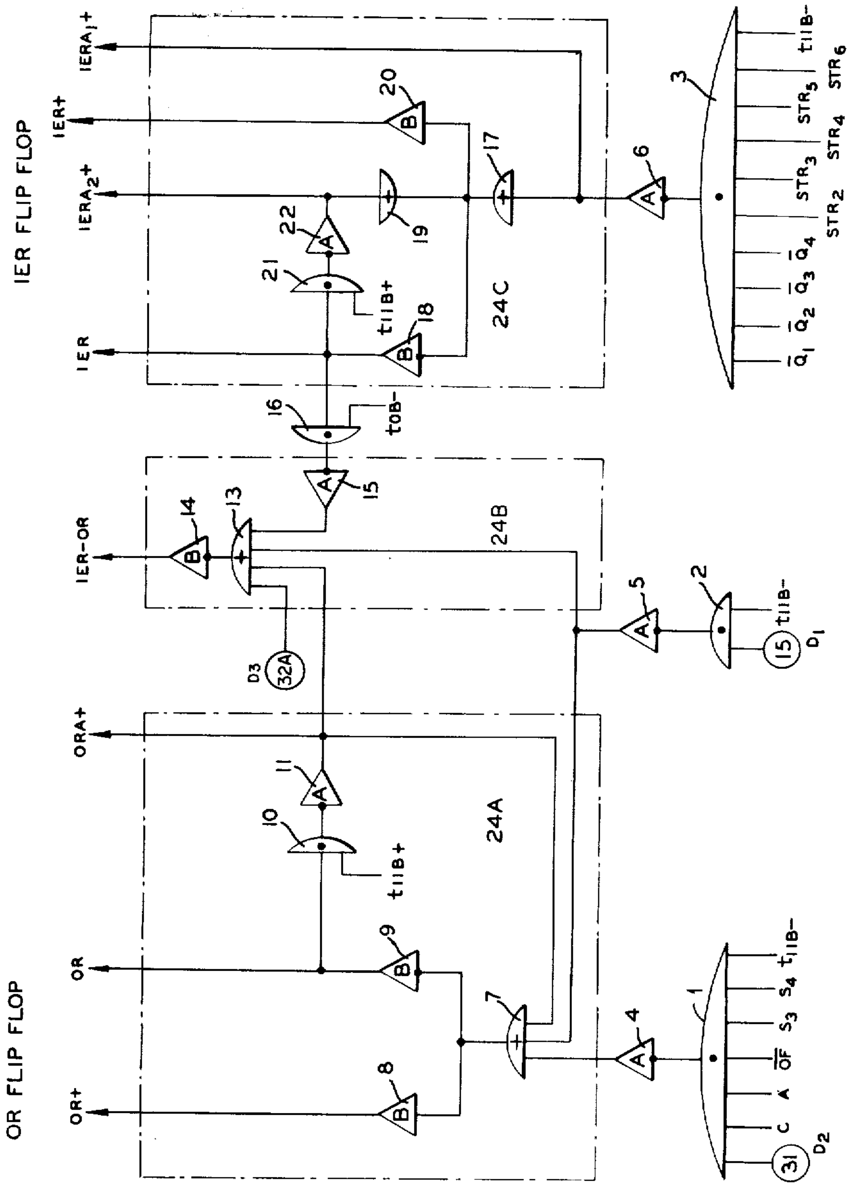

FIGS. 10A, 10B and 10C arranged as indicated by FIG. 10, illustrate in a generalized manner a simplified block diagram of the computer;

FIGS. 11A, 11B and 11C show in schematic diagram form the sign Flip-Flop circuits for the X Register, the A Register and the L Register used in the invention;

FIGS. 12, 12A and 12B show in schematic detail the Control Transfer and Time Selection Flip-Flop circuits used in the present invention;

FIGS. 13 and 14 show in schematic detail the C and L Registers incorporated herein;

FIGS. 15, 15A and 15B show the details of the A Register employed in this invention;

FIGS. 16, 16A and 16C show the details of the X Register used herein;

FIGS. 17A, 17B, 17C and 17D show in schematic form the details of the Comparator circuit used in this invention;

FIGS. 18A and 18B show the details of the Adder circuit employed in this invention;

FIG. 19 shows in schematic form the Subtrahend Buffer circuits used herein;

FIG. 20 shows in schematic form the details of the Minuend Buffer circuits used herein;

FIG. 21 shows in schematic form the details of the Complement Flip-Flop used herein;

FIG. 22 shows in schematic form the details of the Overflow Flip-Flop and Overflow Delay Flip-Flop circuits incorporated in this invention;

FIGS. 23A and 23B show in schematic form the details of the Multiplier Quotient Counter used herein;

FIG. 24 shows the details of the OR and IER Flip-Flops used in the construction of the present computer.

Figure 25A:
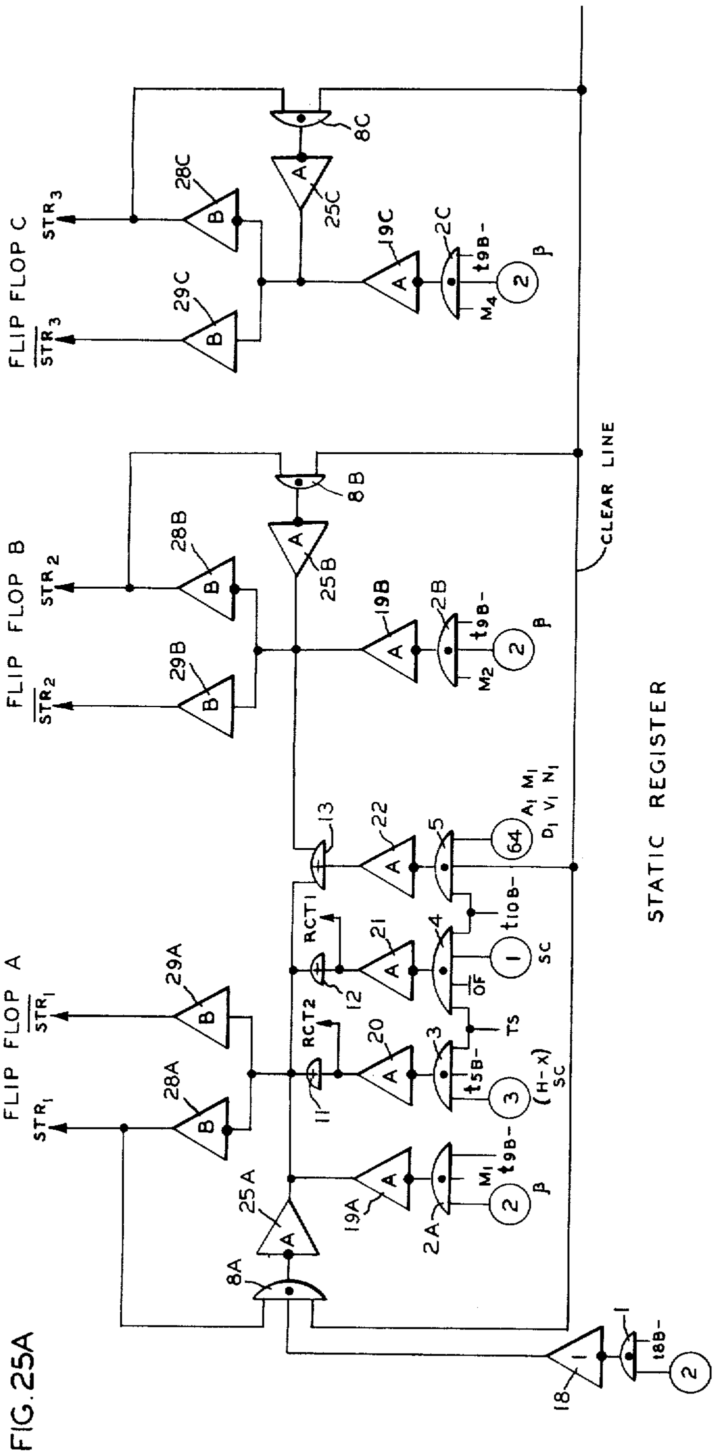
Figure 25:
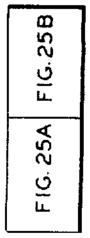
Figure 25B:
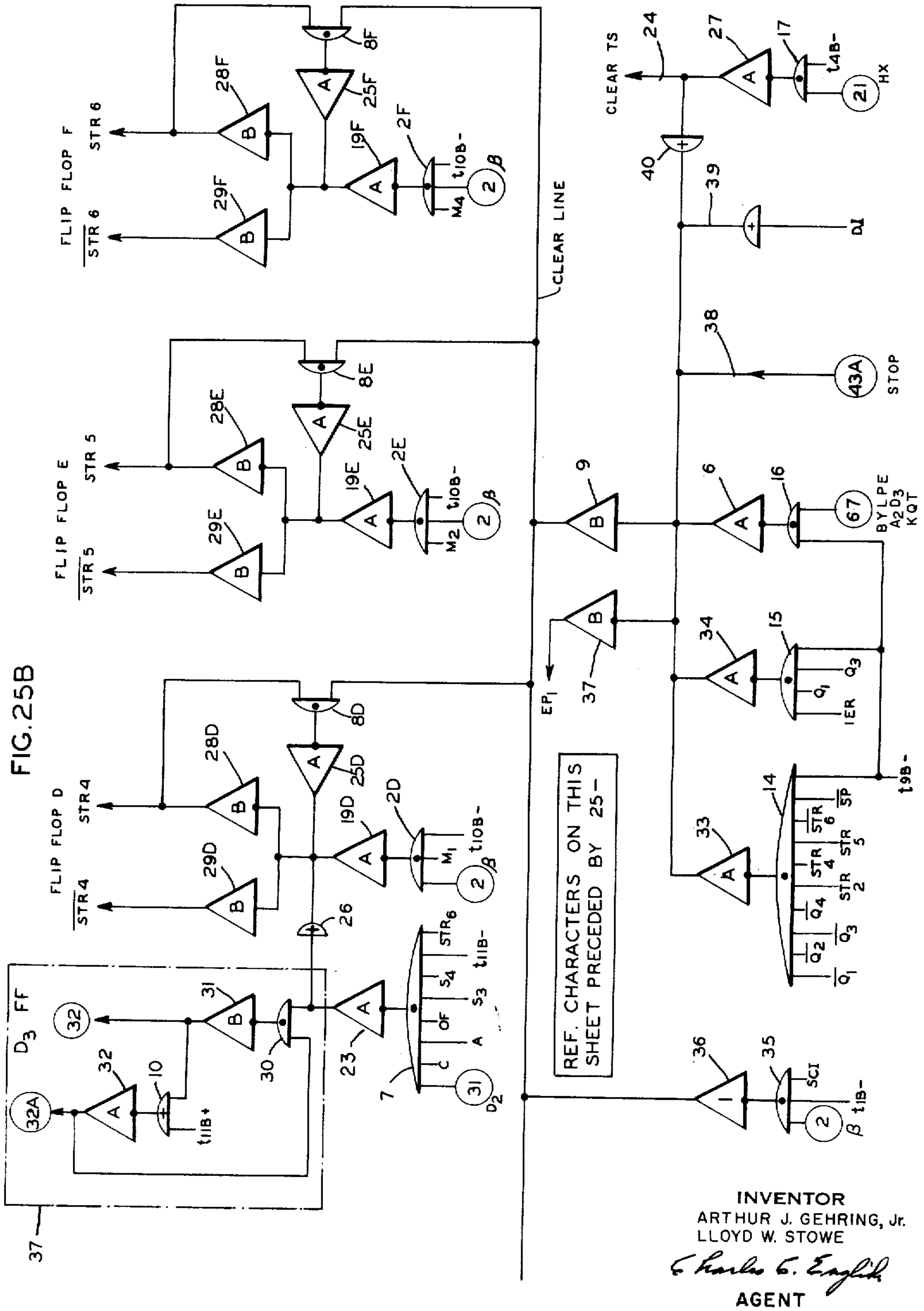
Figure 26B:
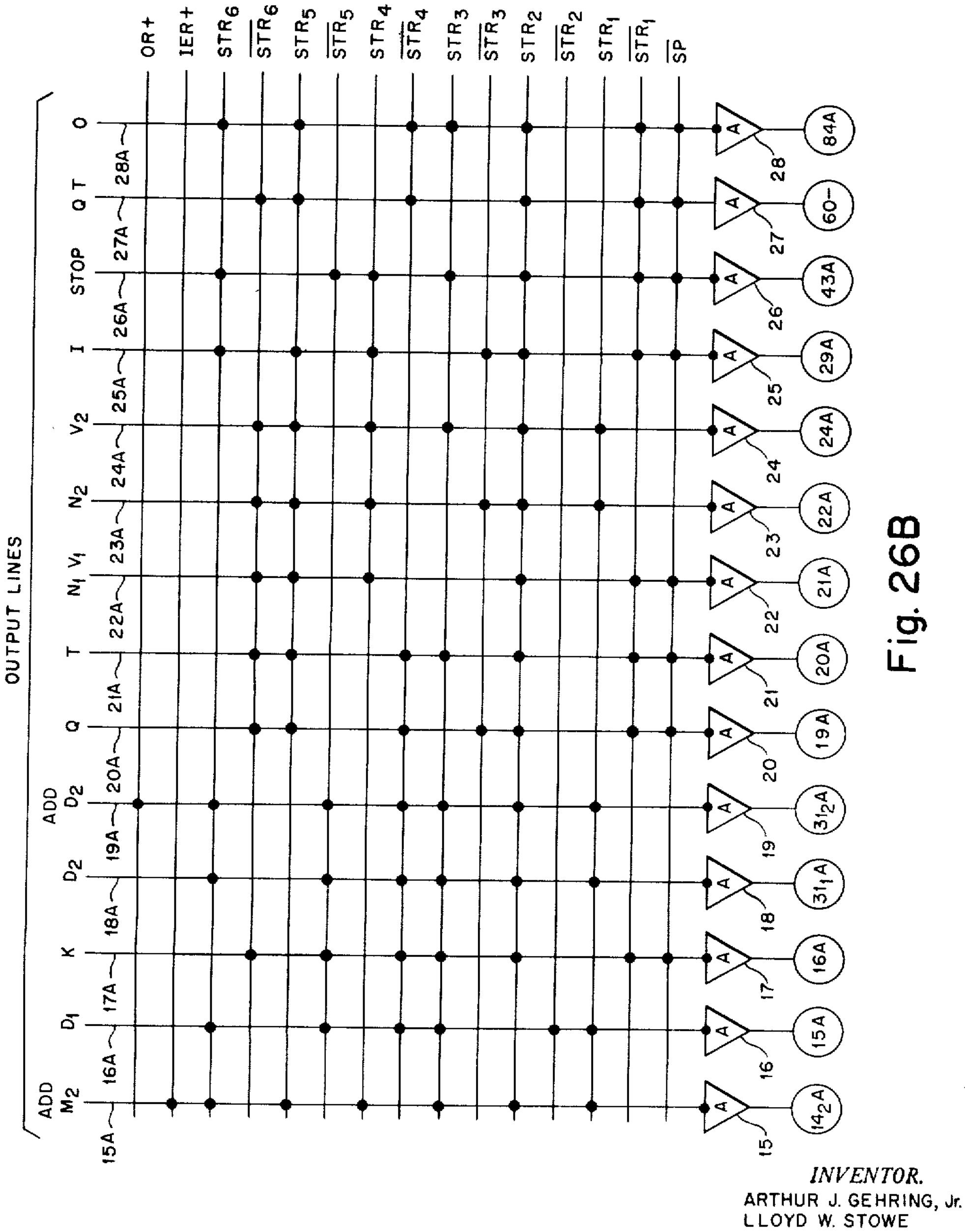
Figure 27B:
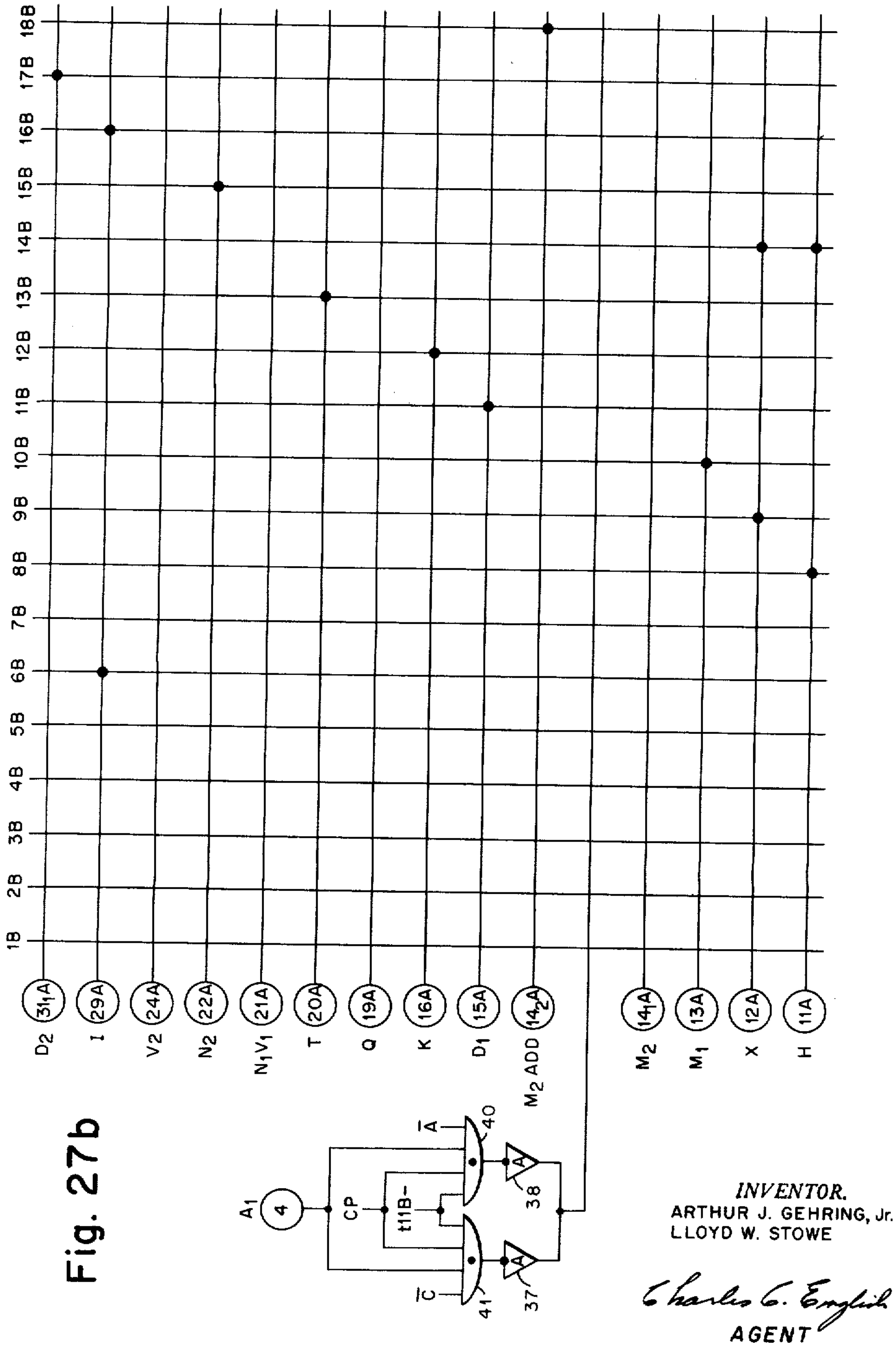
Figure 27C:
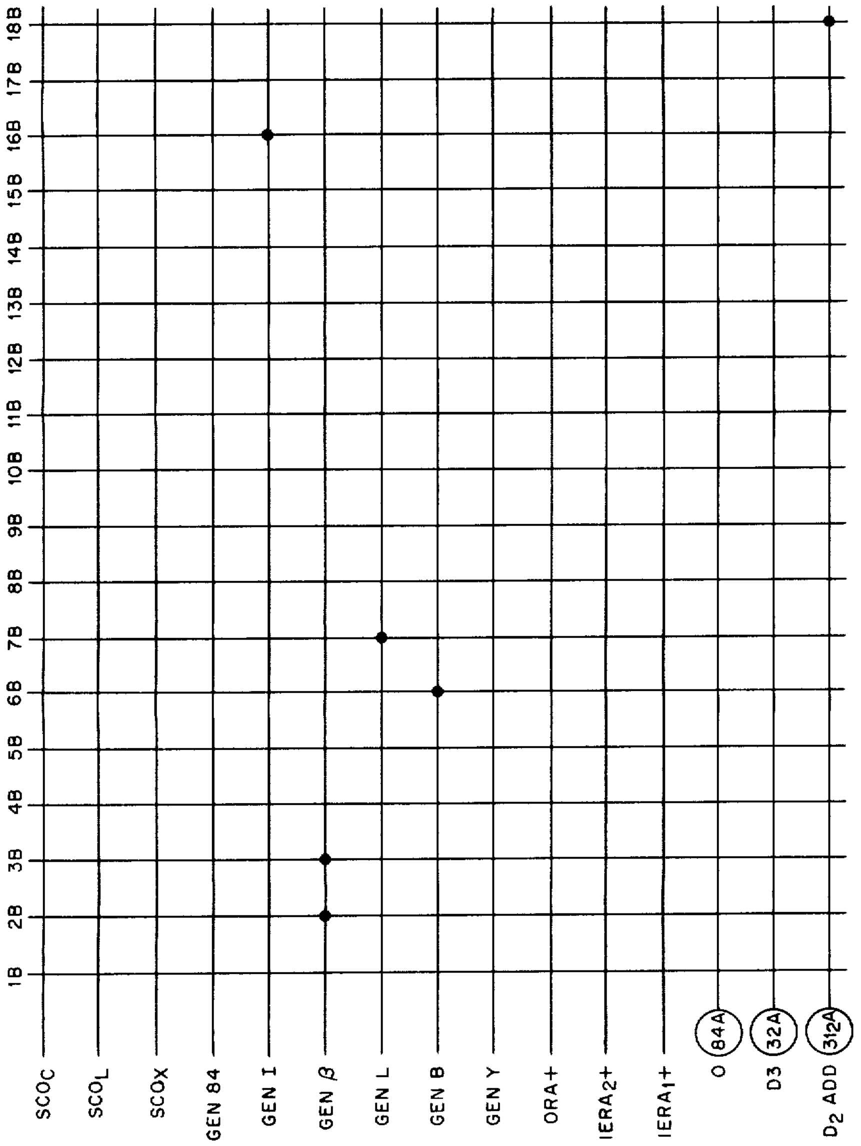
Figure 27D:
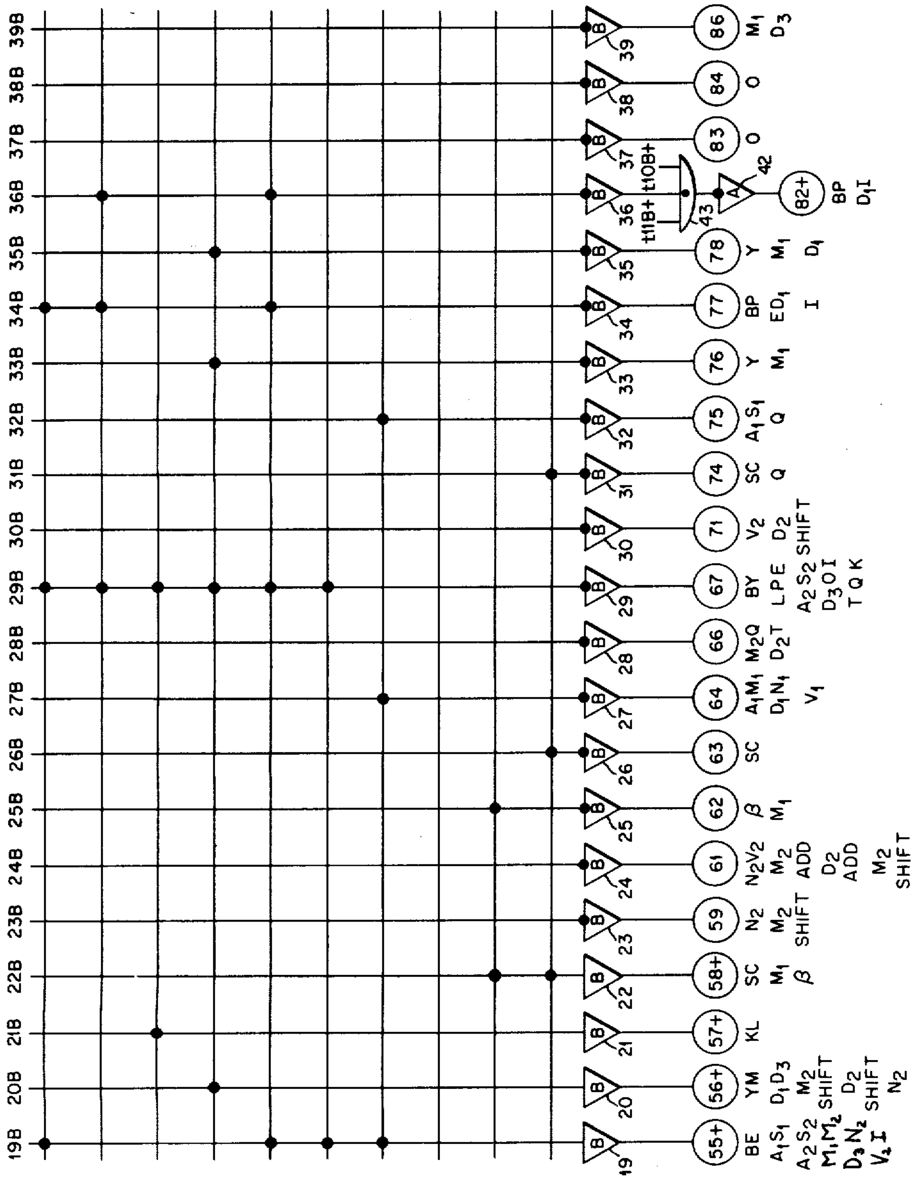
Figure 27E:
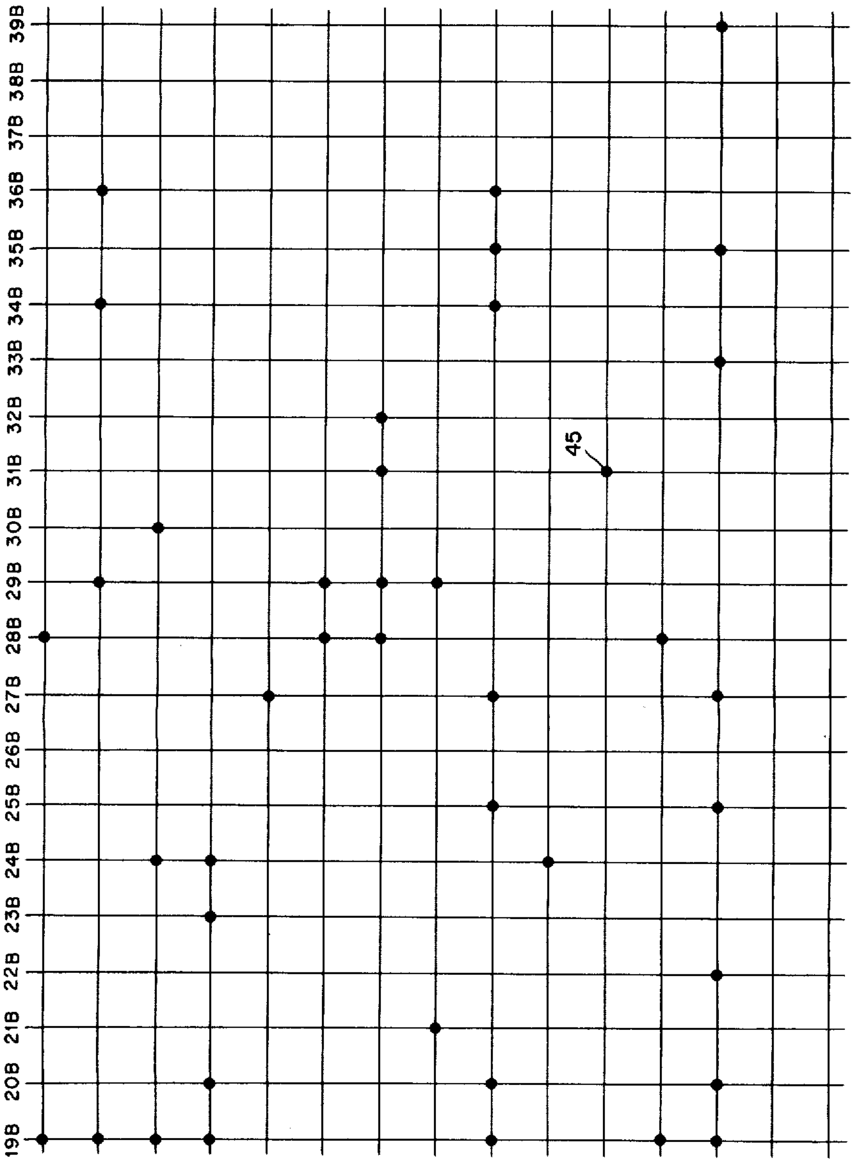
Figure 27F:
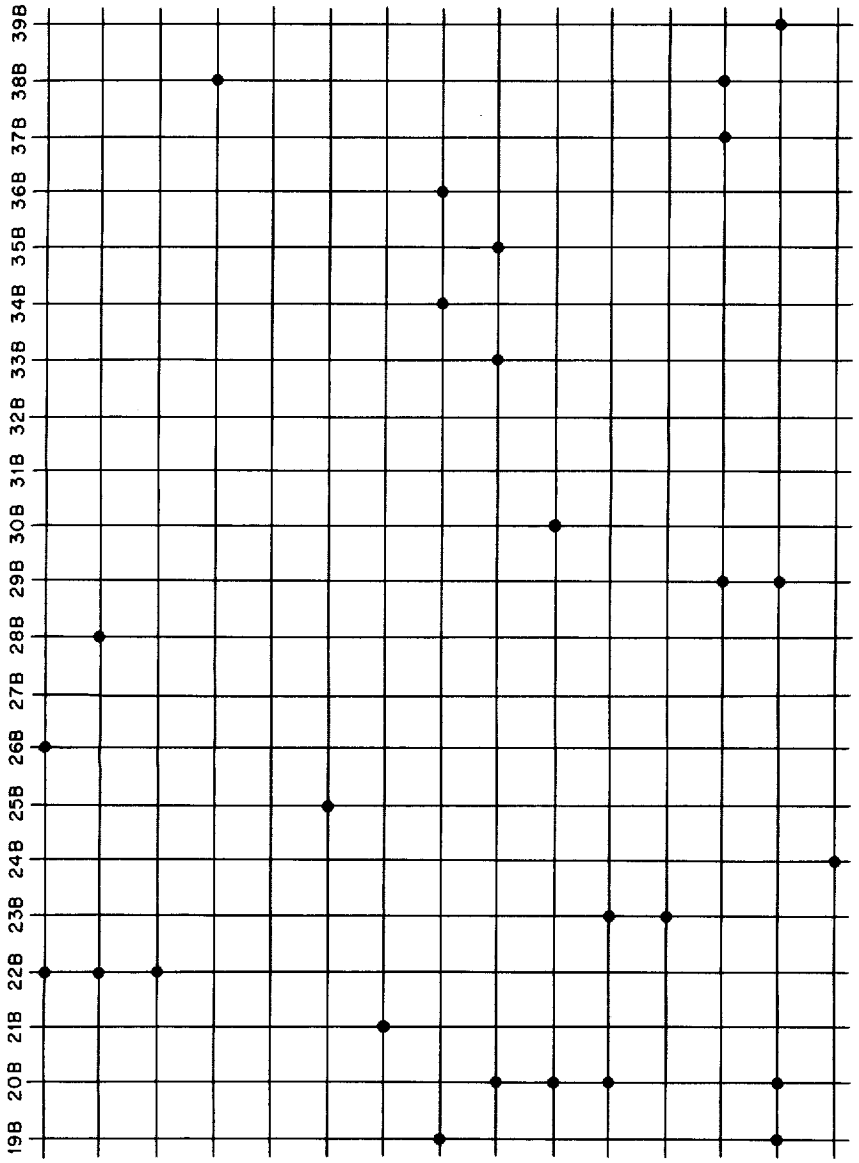
Figures 28, 28A:
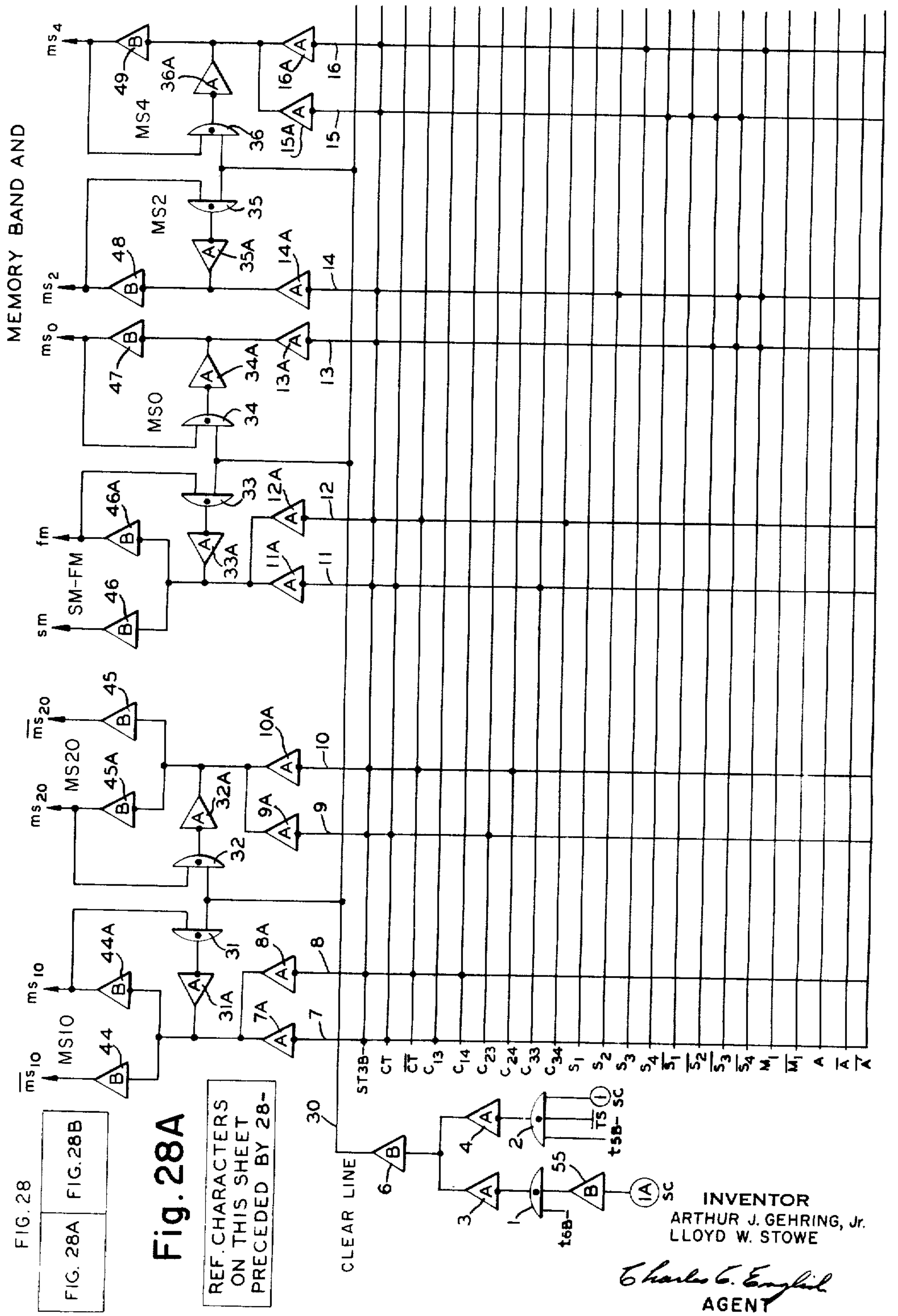
Figure 28B:
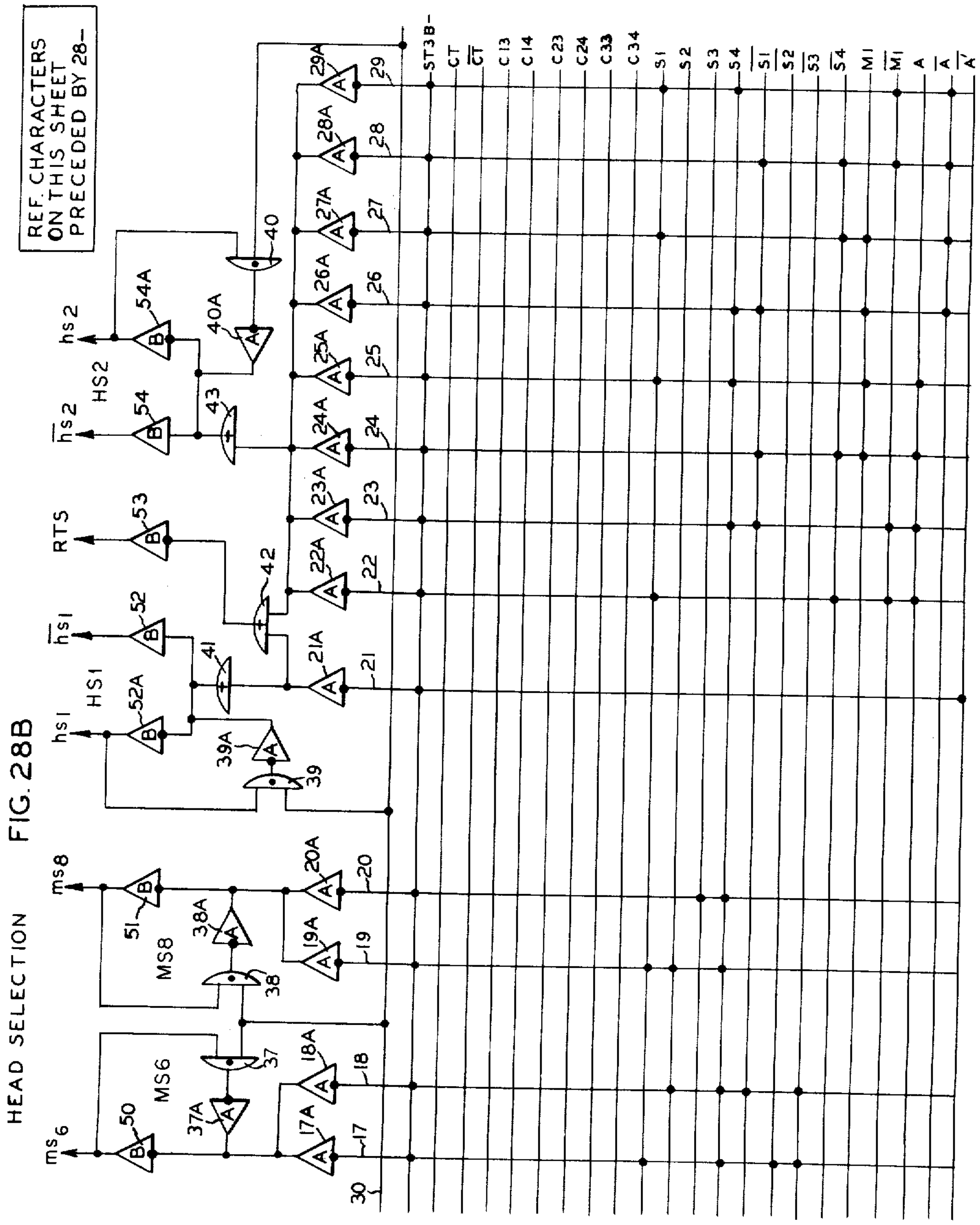
Figure 29A:
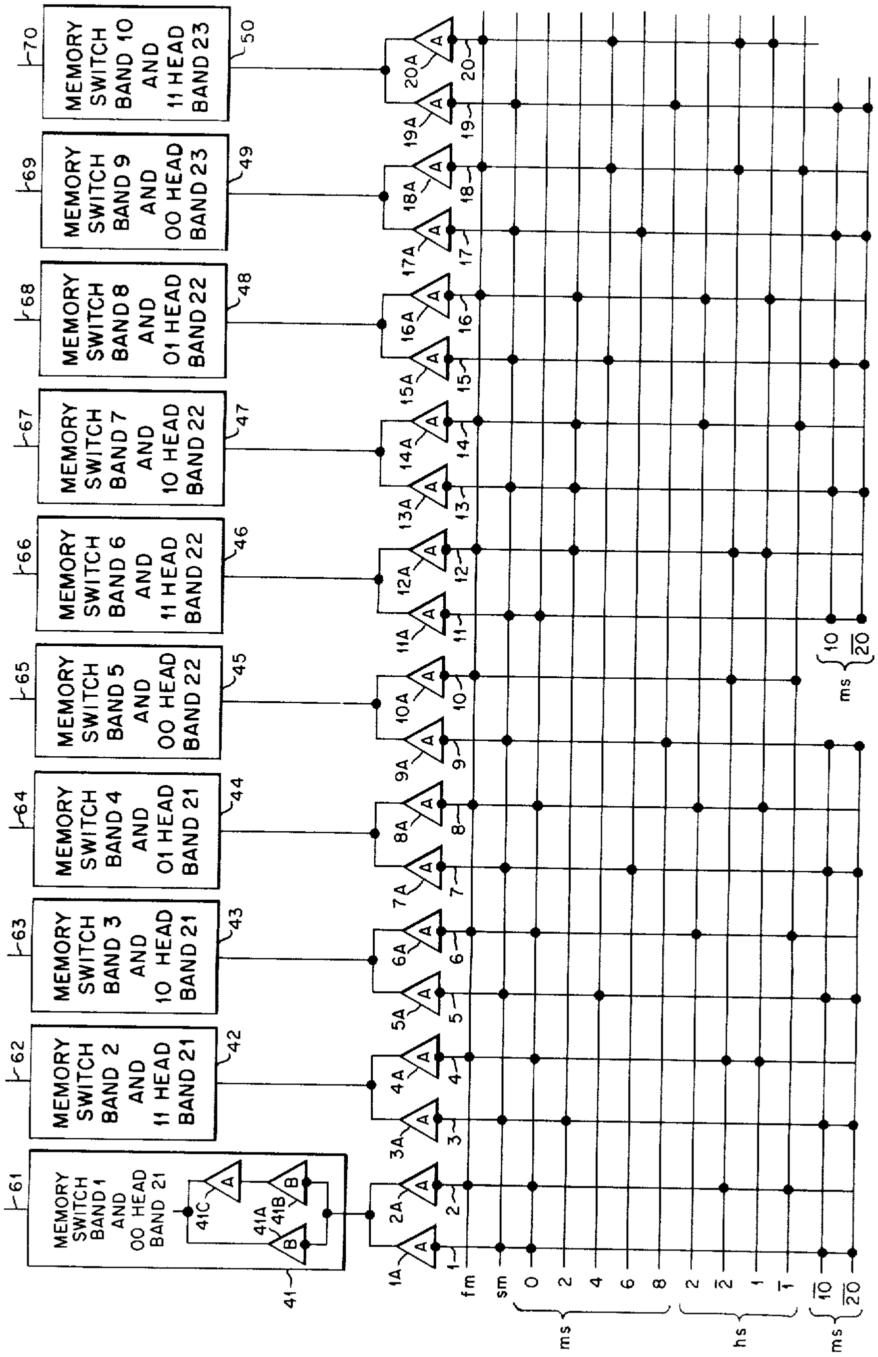
Figure 29:
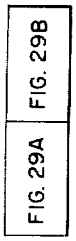
Figure 29B:
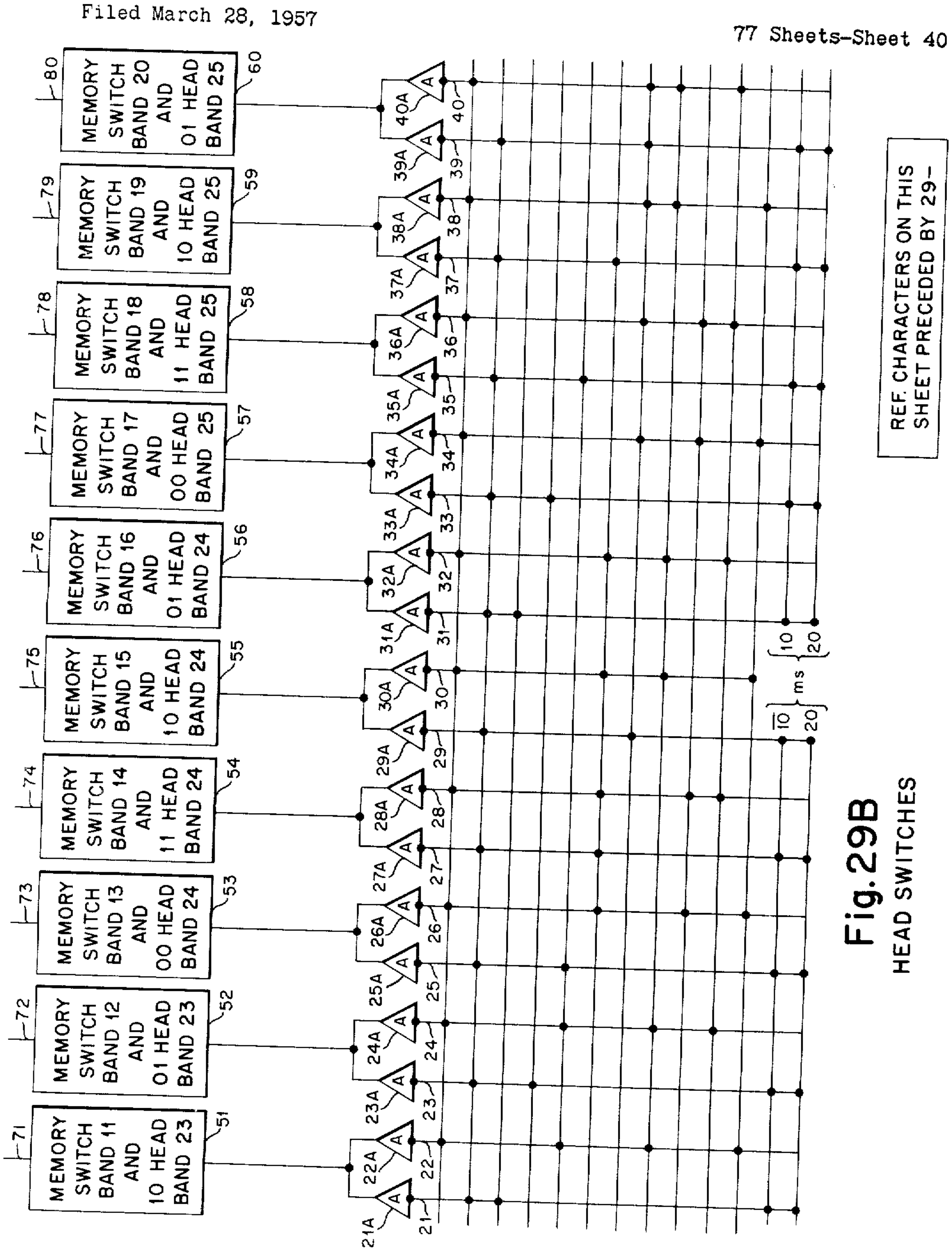
Figures 30, 30A:
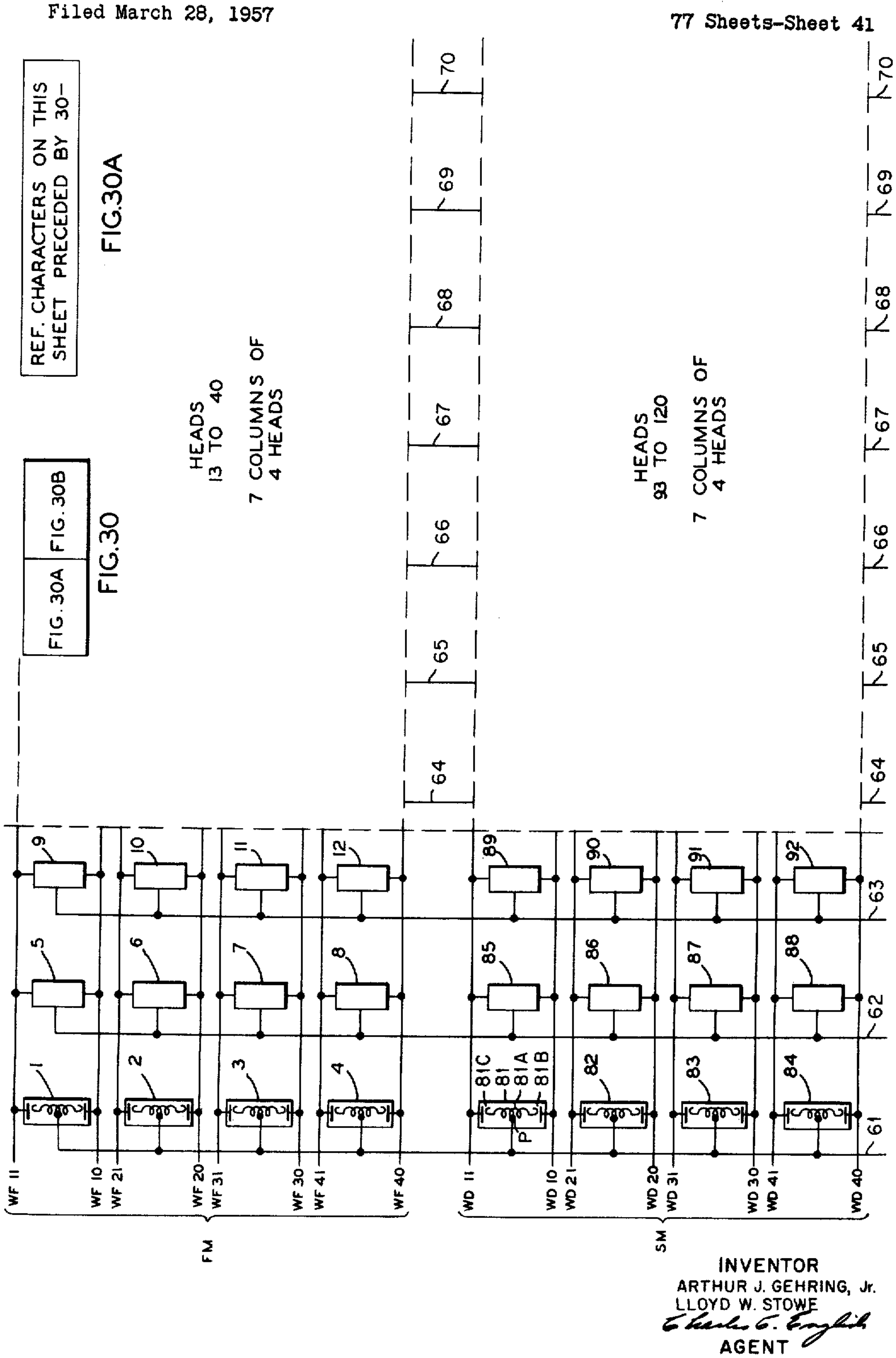
Figure 30B:
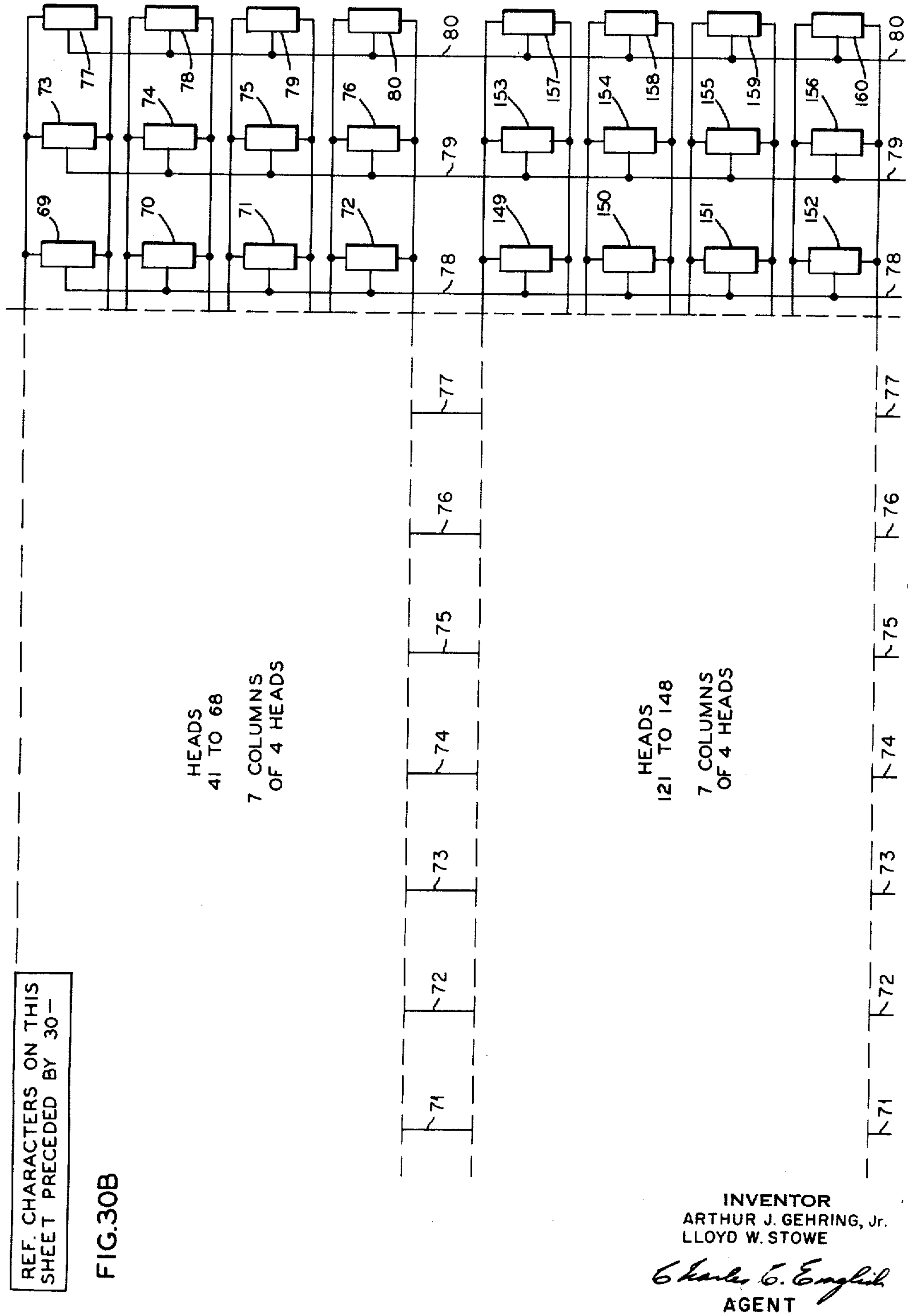
Figure 31A:
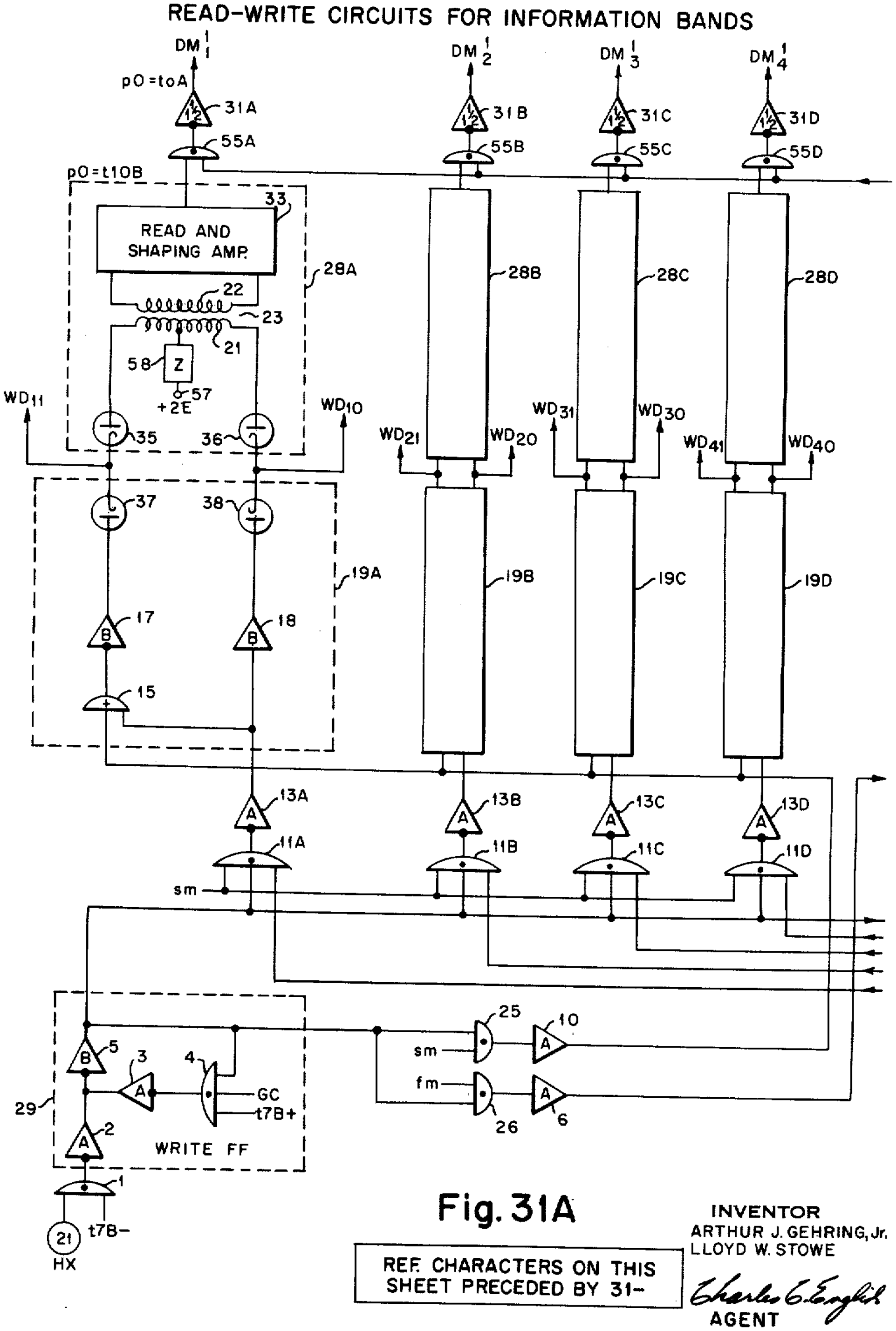
Figure 31B:
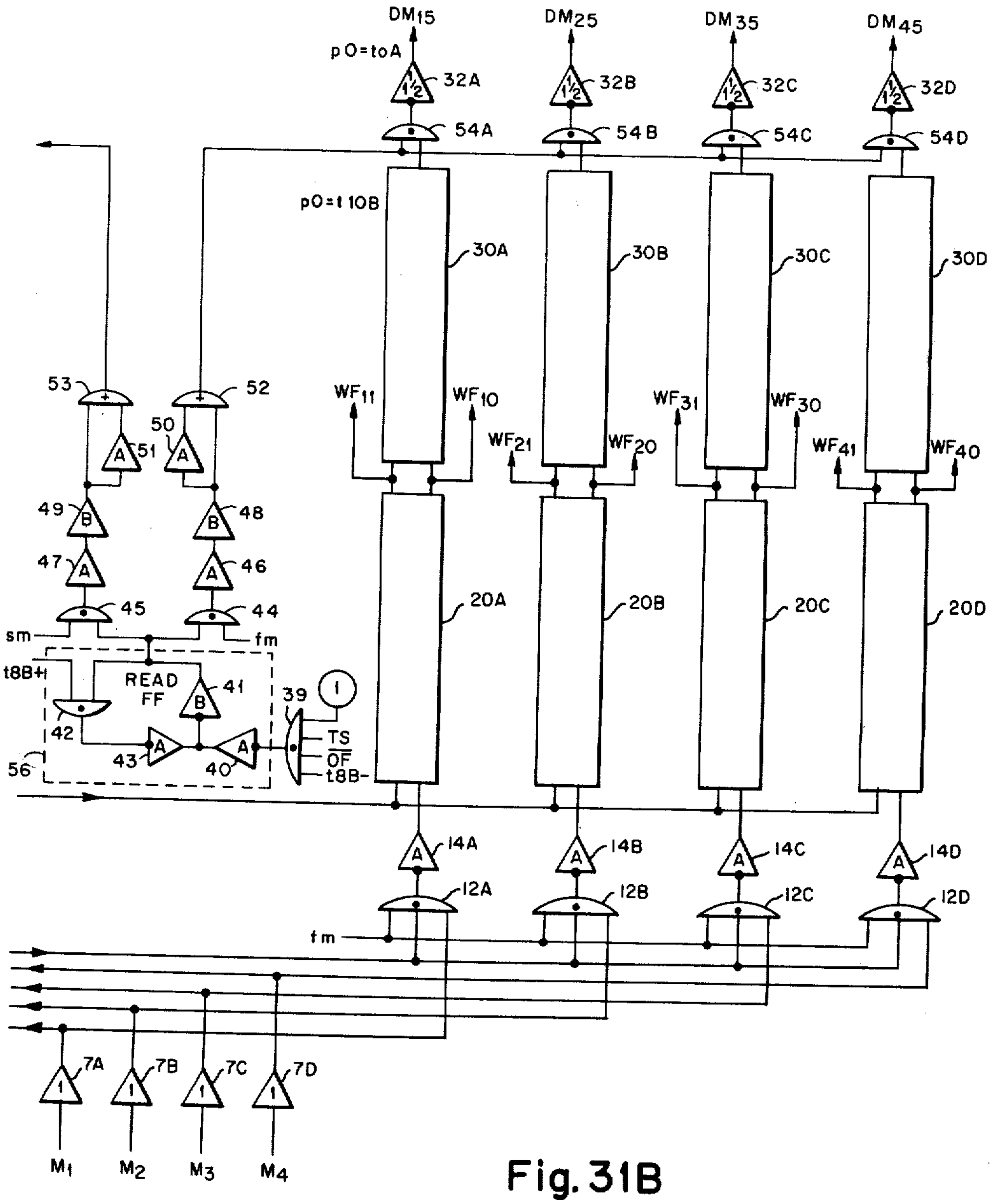
Figure 31:
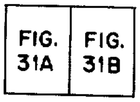
Figure 32B:
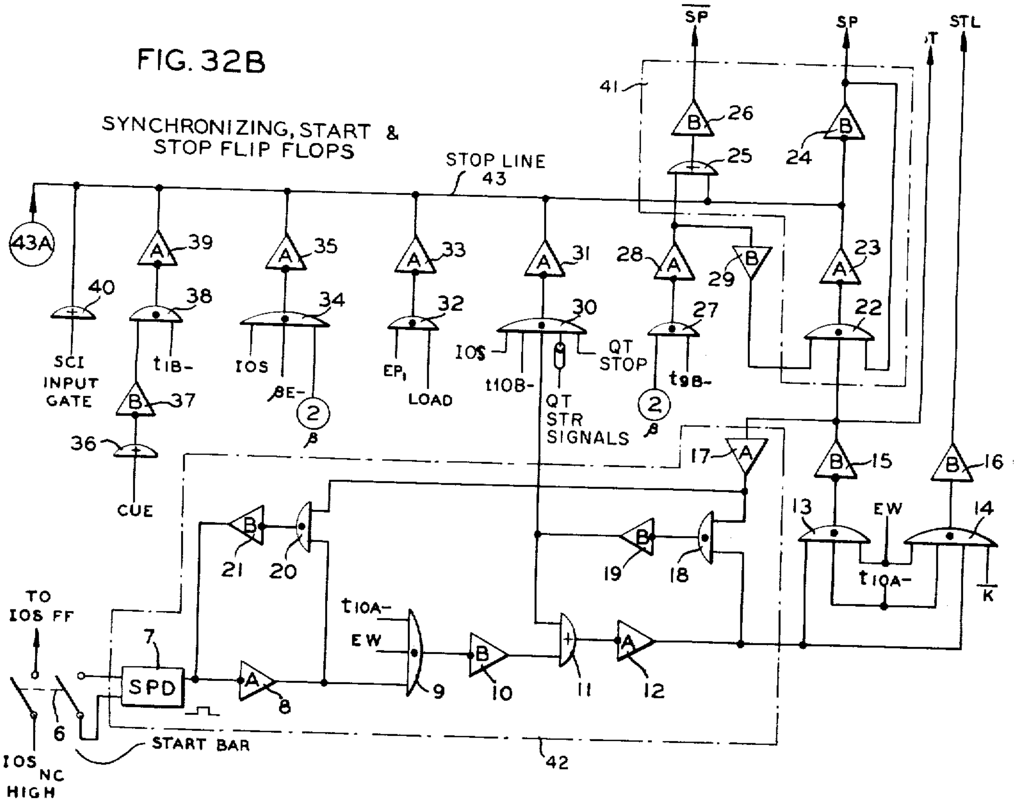
Figure 32A:
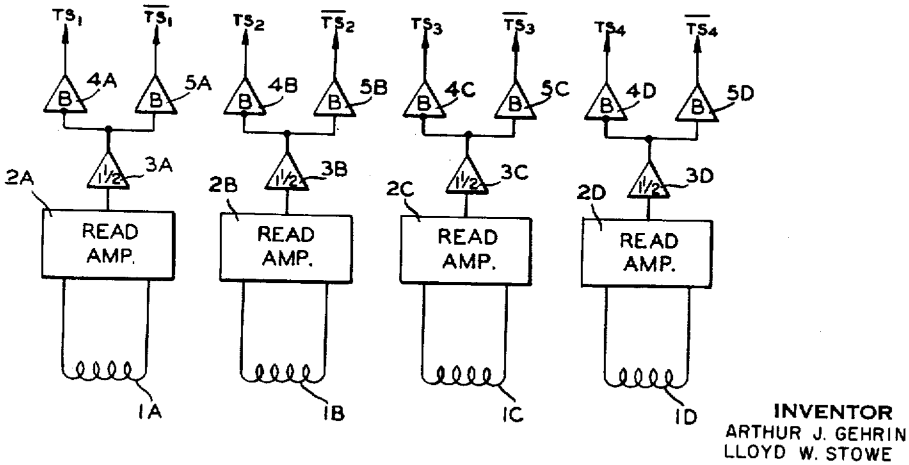
Figure 35C:
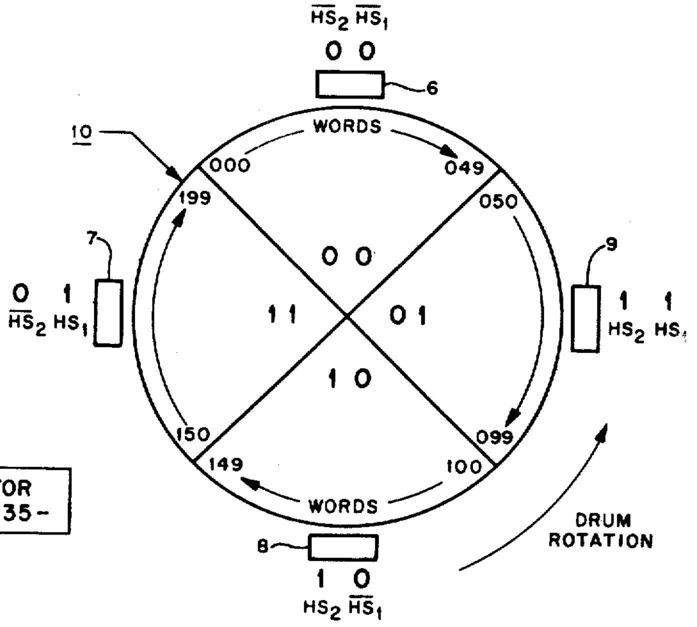
Figure 33B:
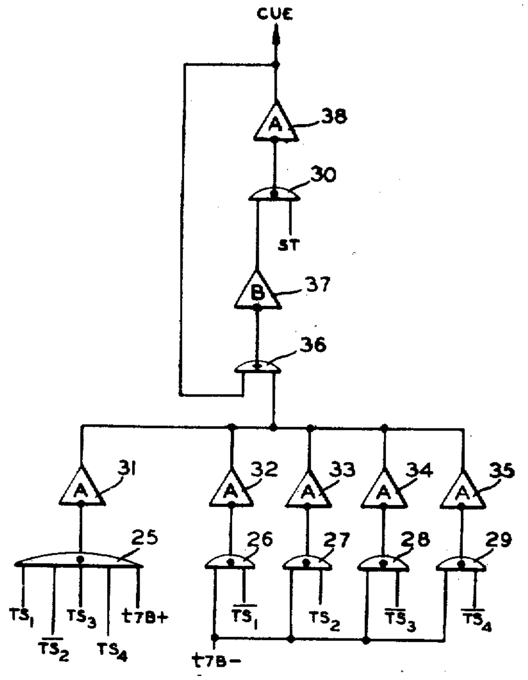
Figure 33A:
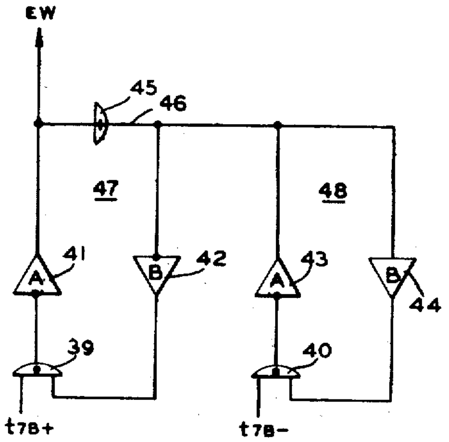
Figures 34, 34A:
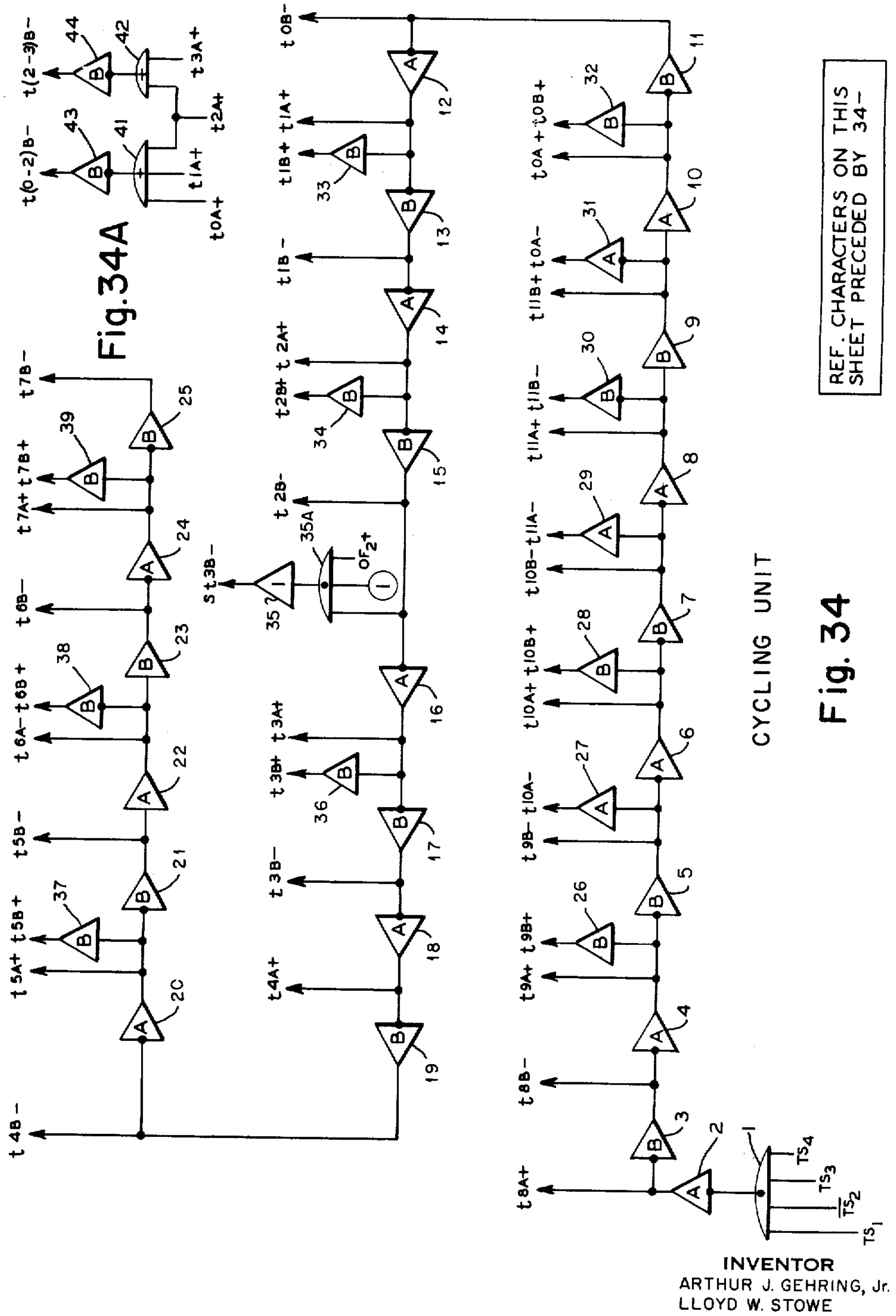
Figure 35B:
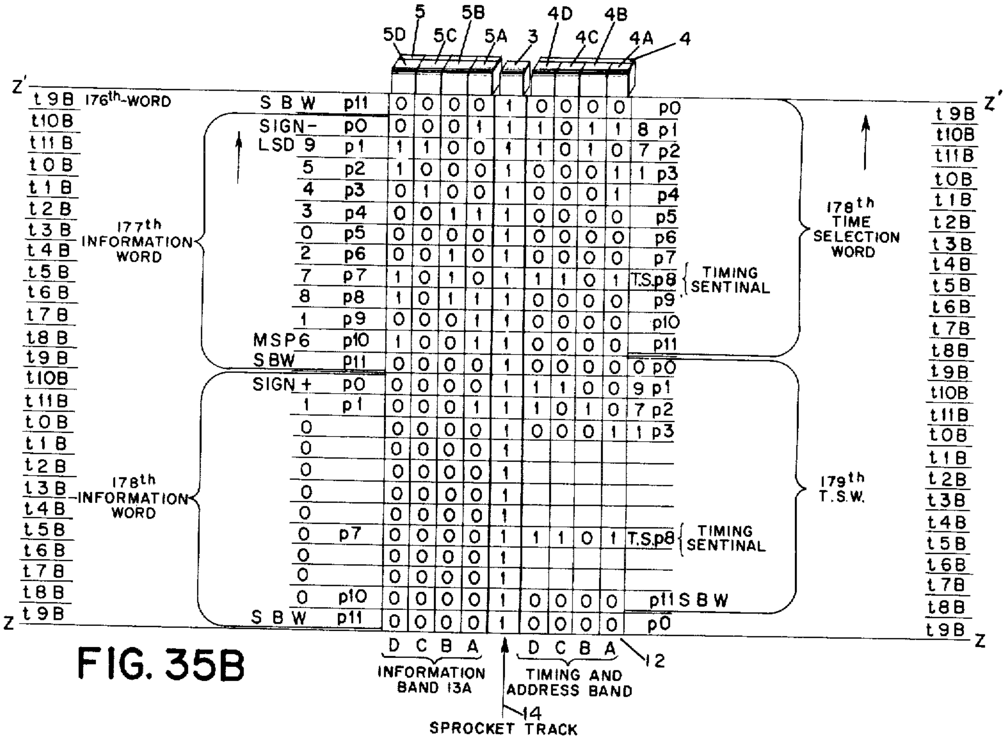
Figure 35A:
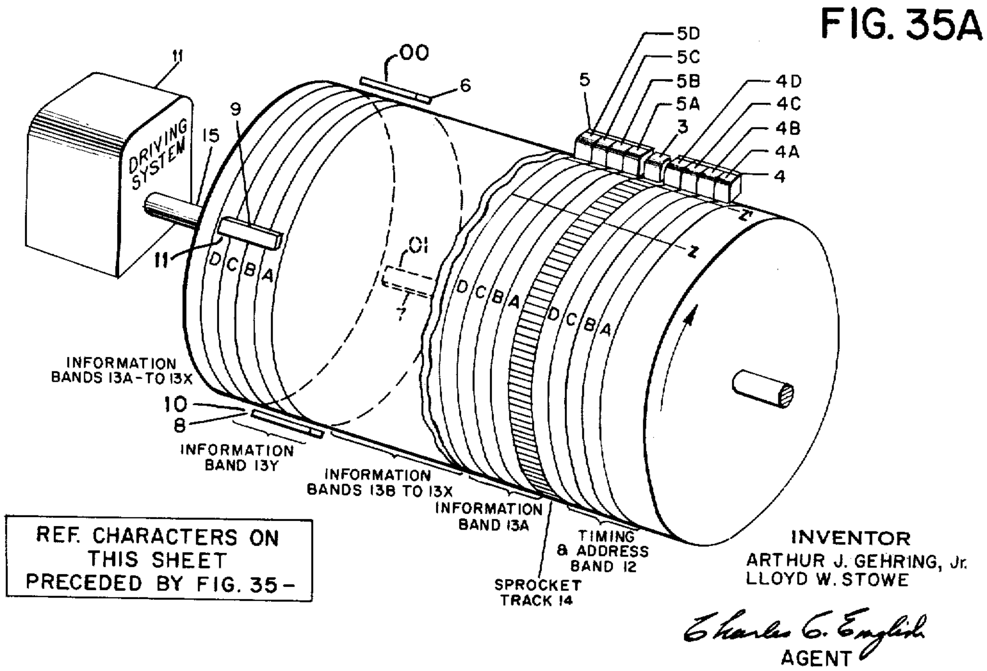
Figure 36:
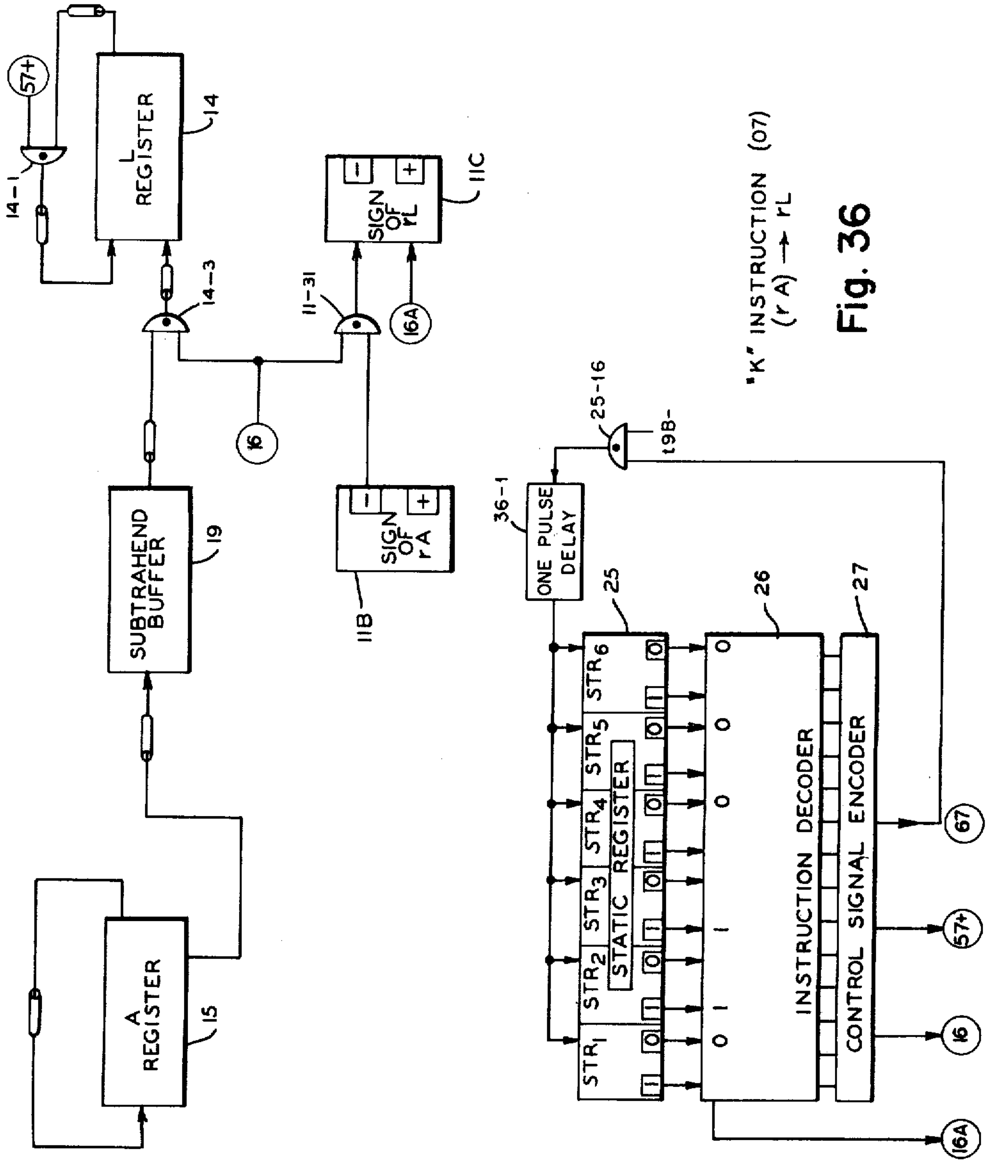
Figure 37A:
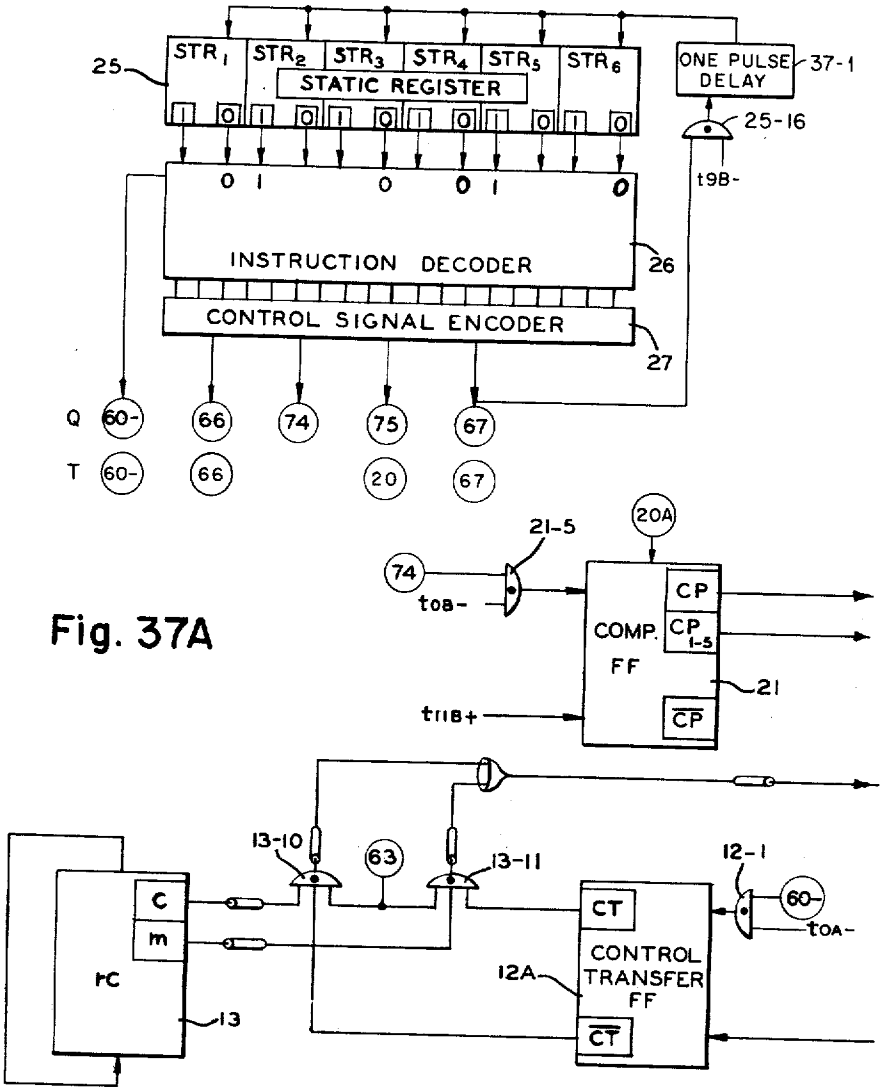
Figure 37:
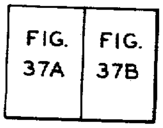
Figure 37B:
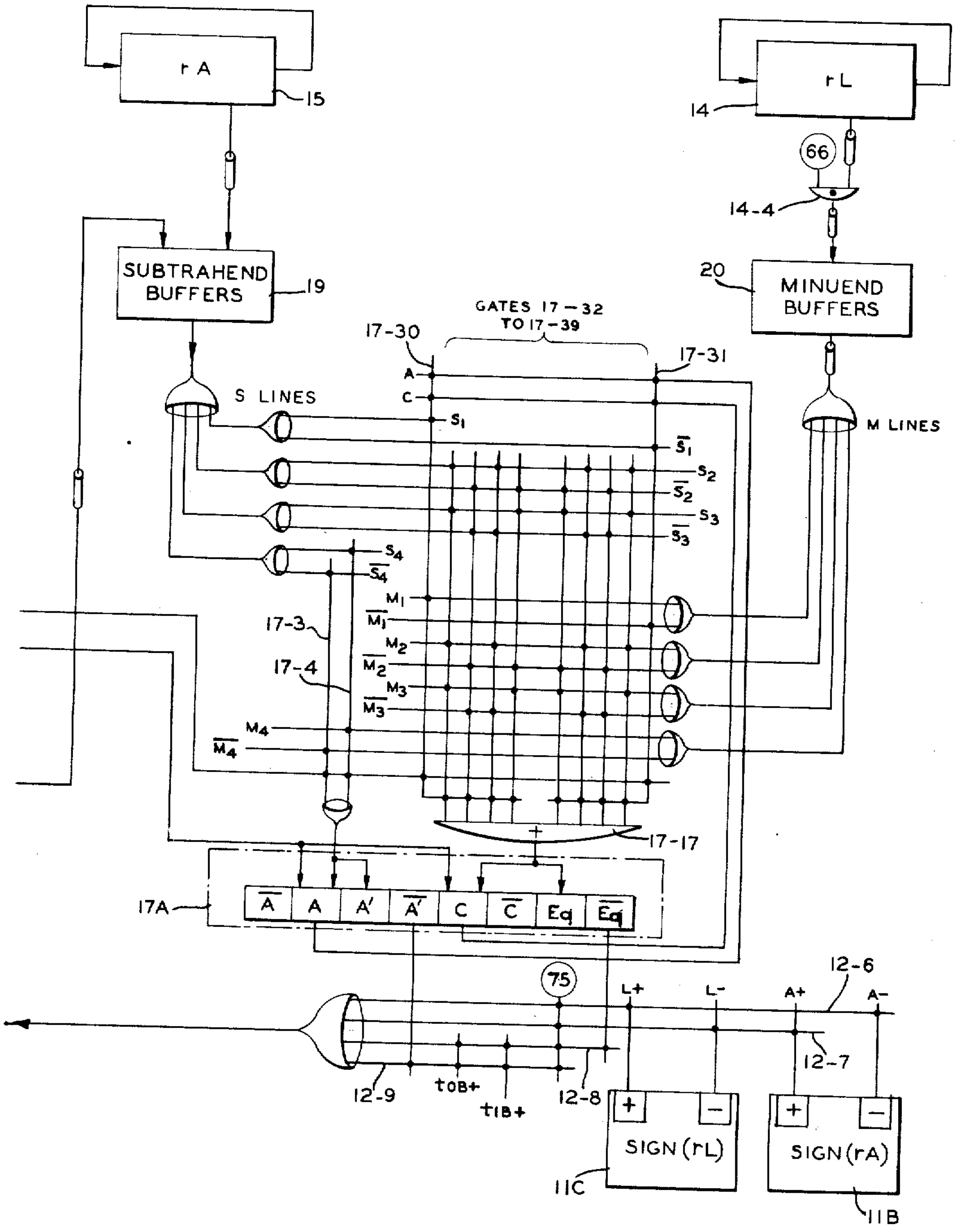
Figure 38:
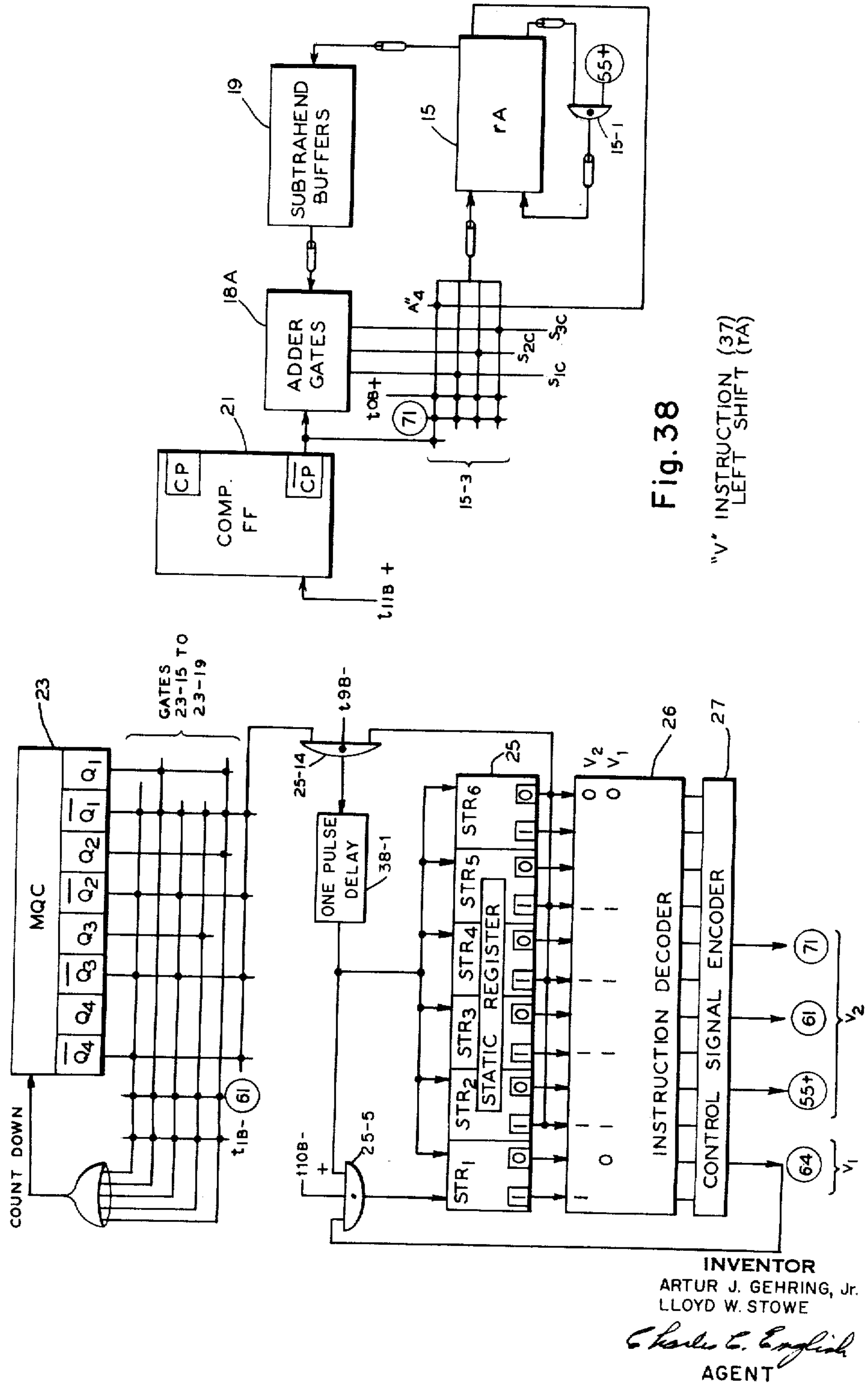
Figure 39:
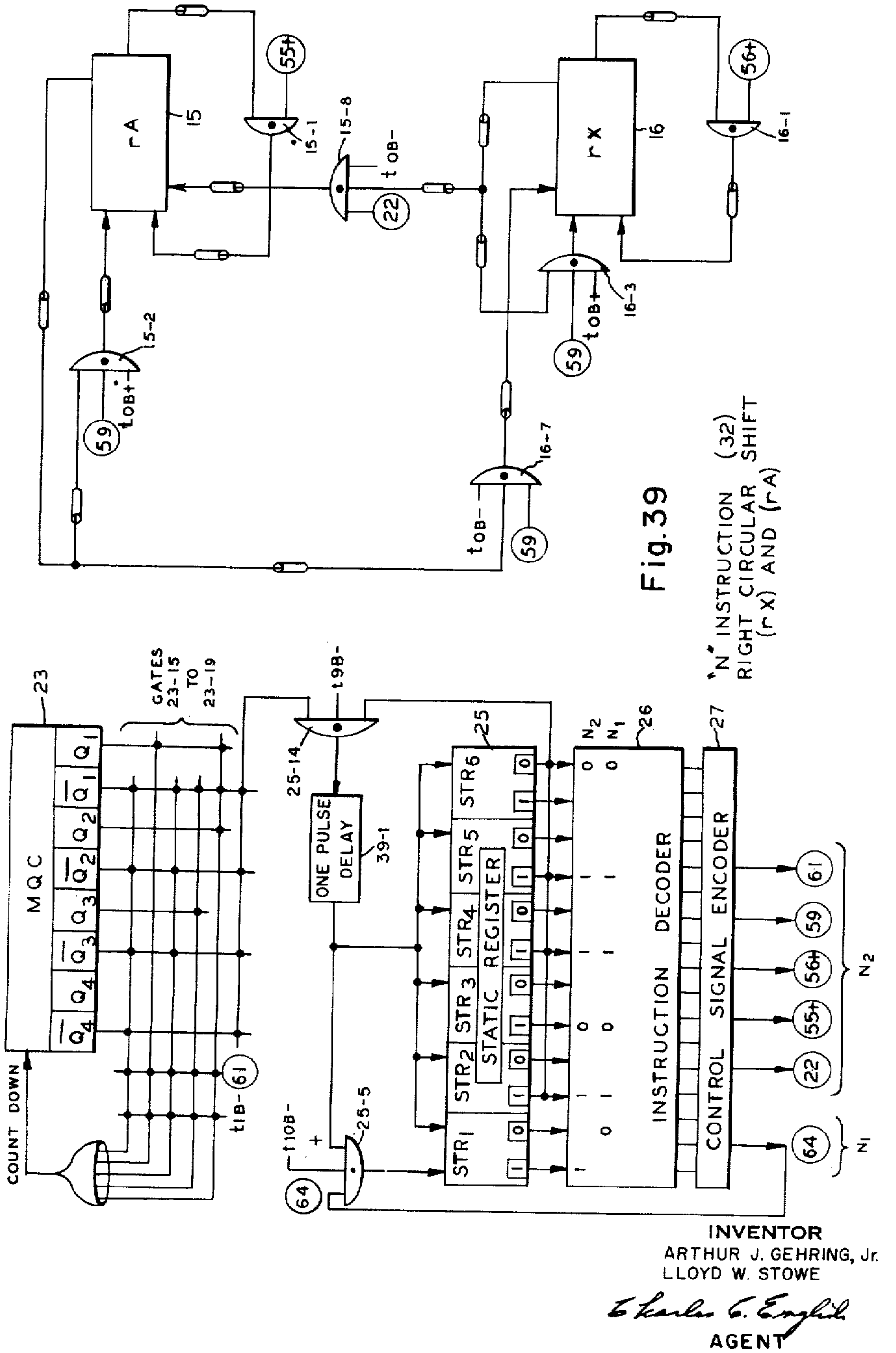
Figure 40:
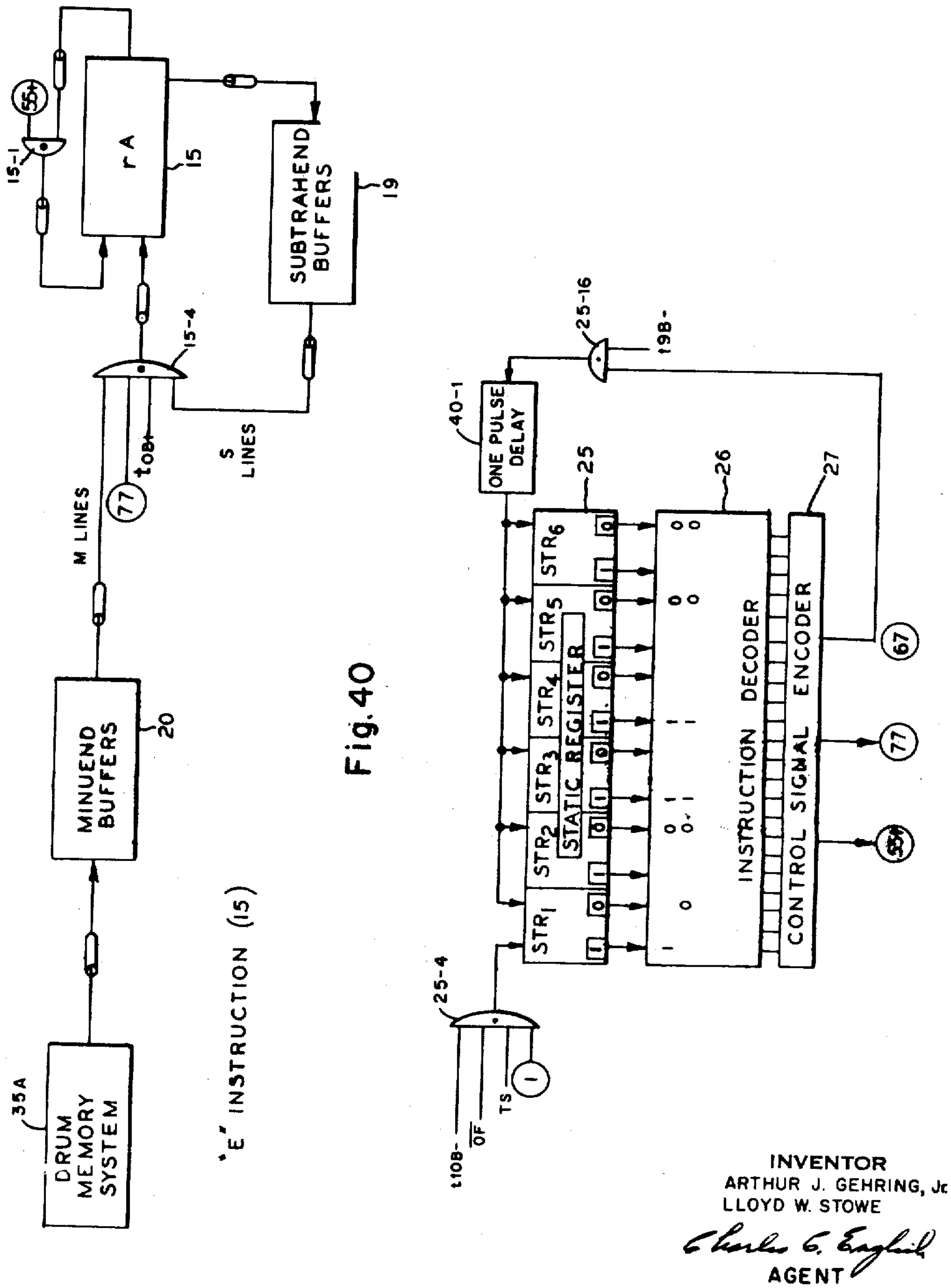
Figure 41:
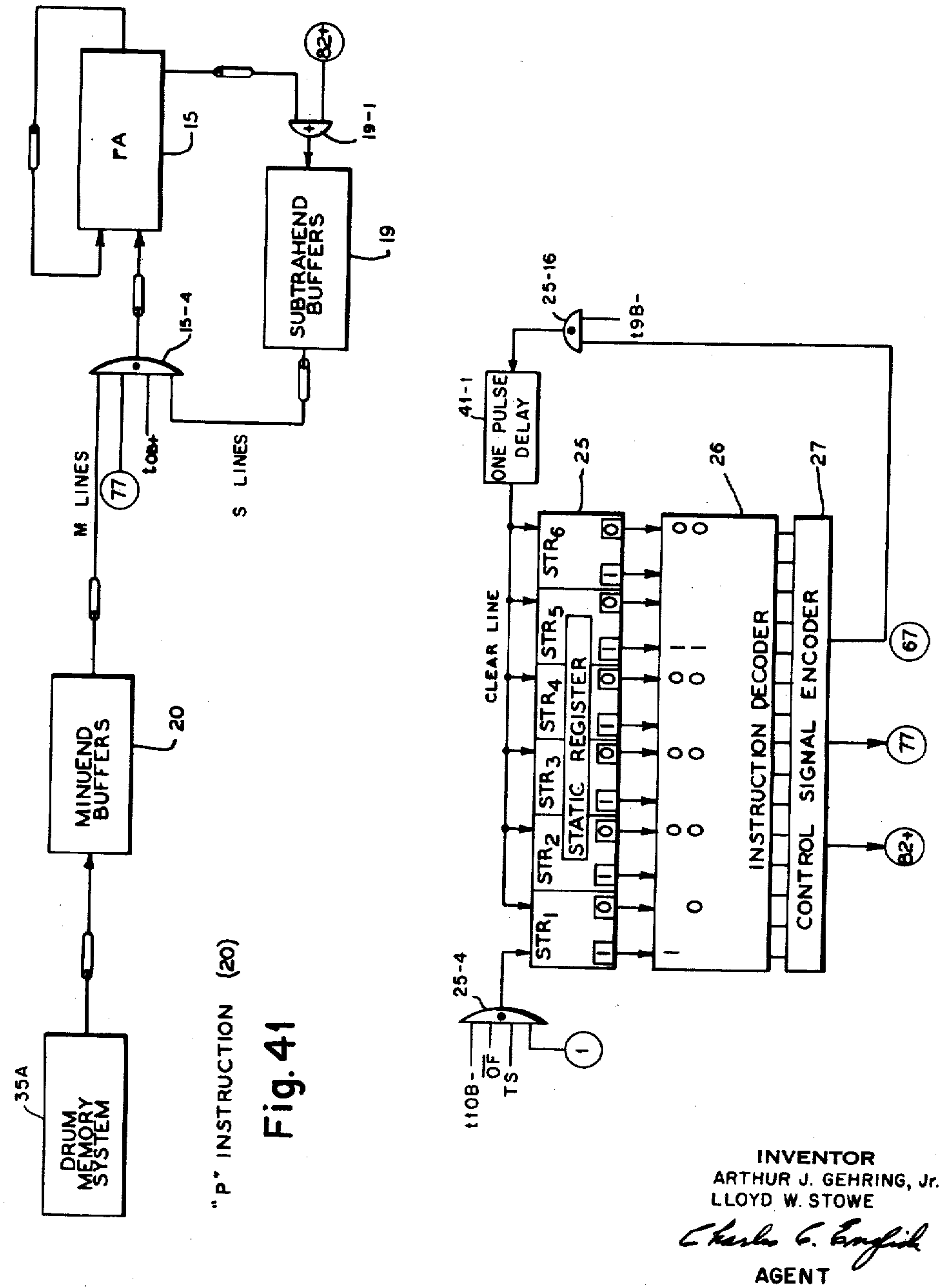
Figure 42:
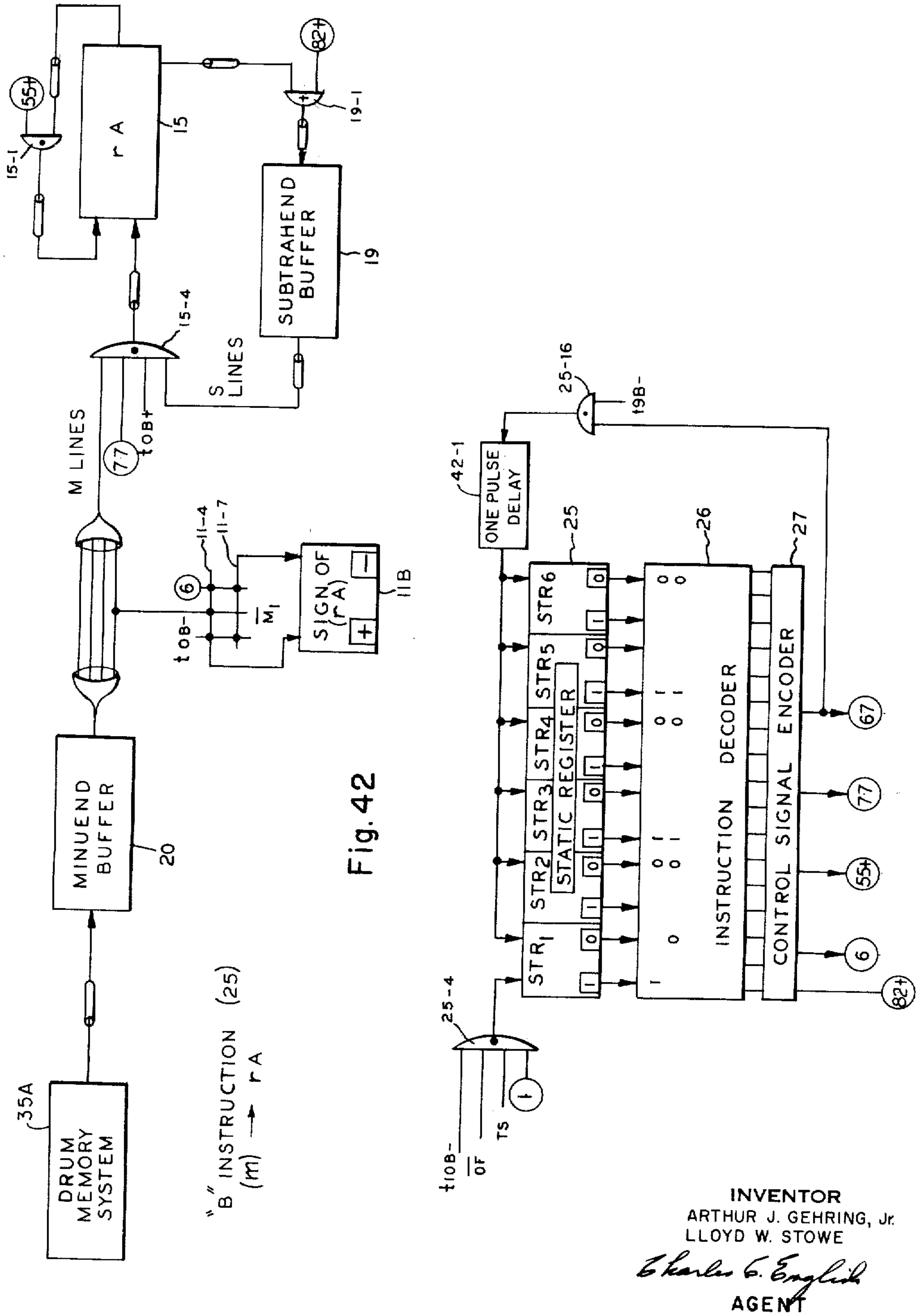
Figure 43:
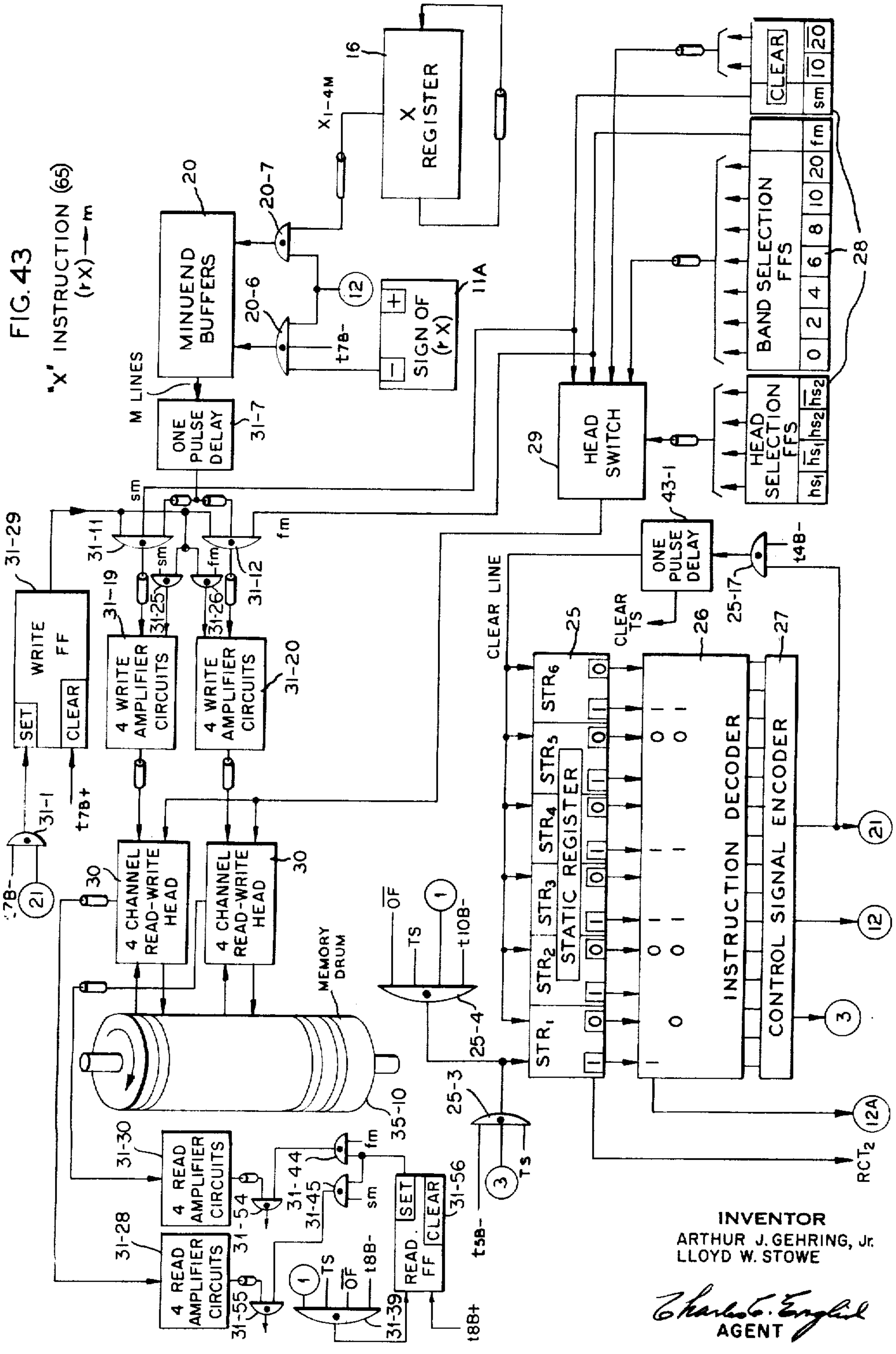
Figures 44, 44A:
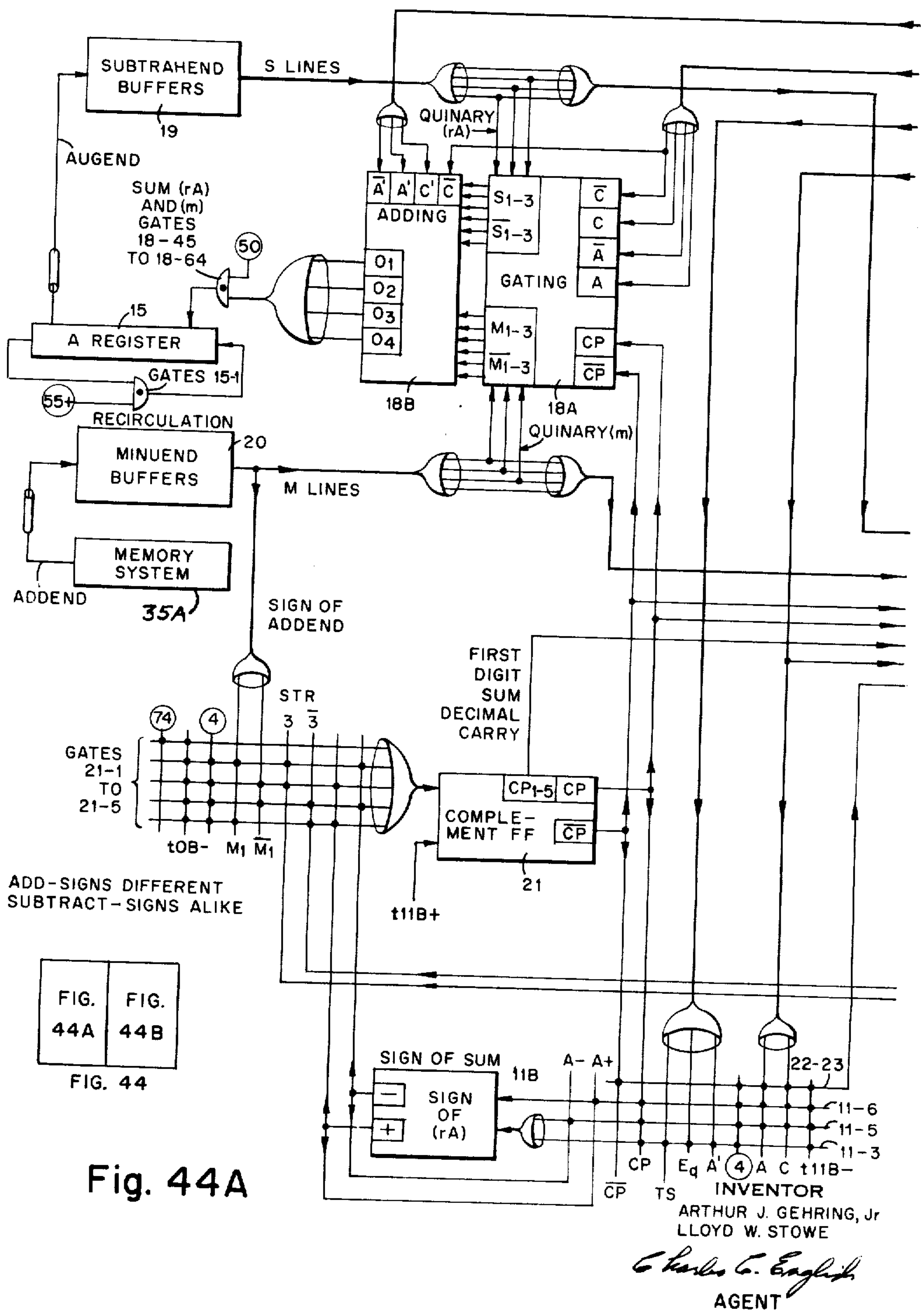
Figure 44B:
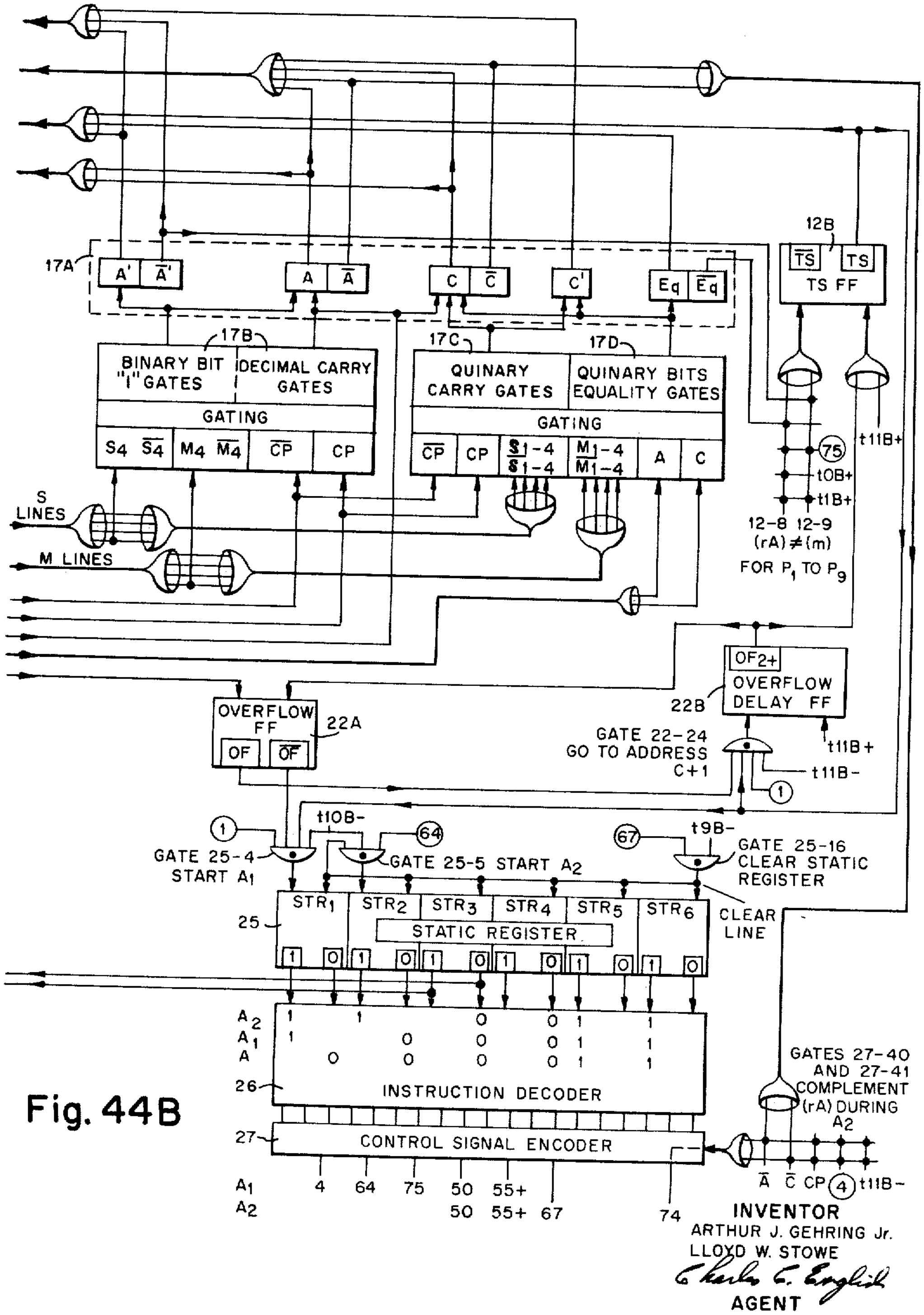
Figure 45:
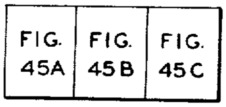
Figure 45A:
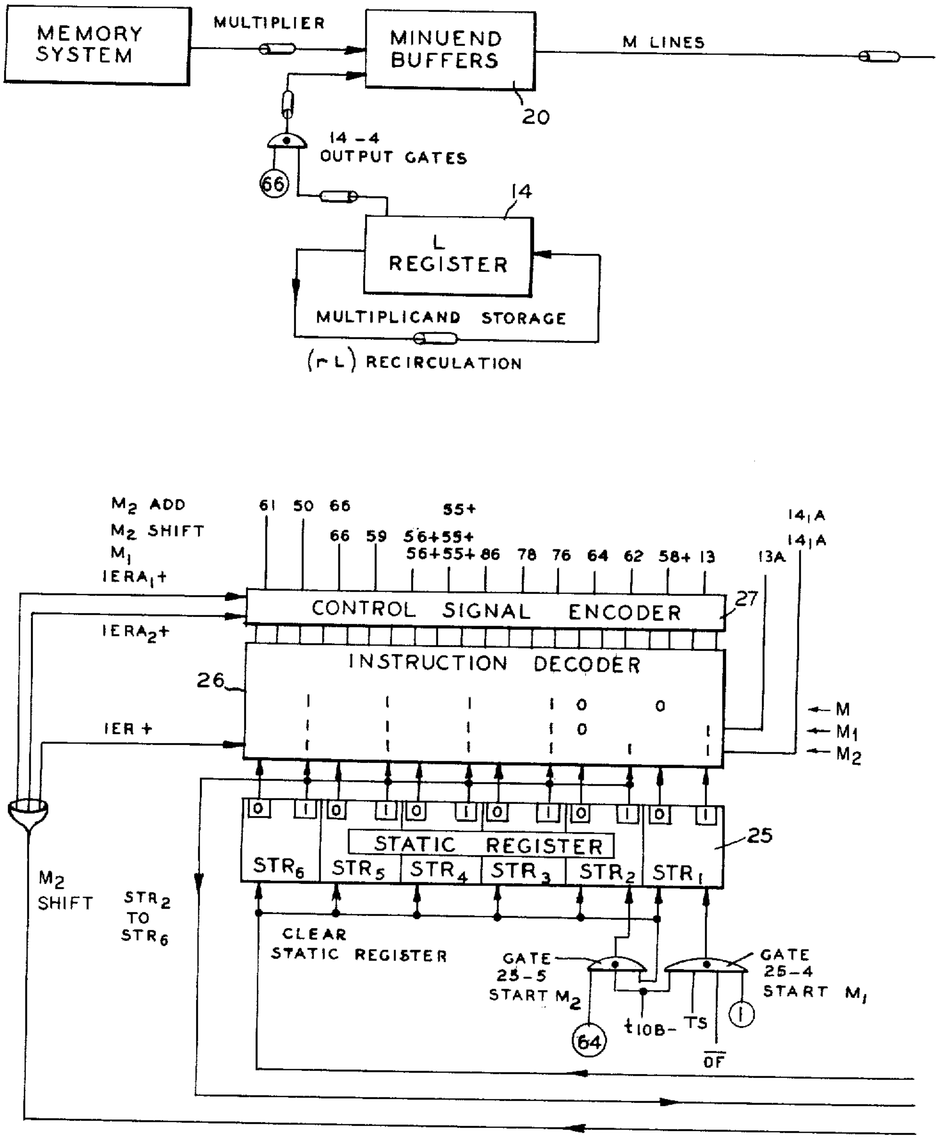
Figure 45B:
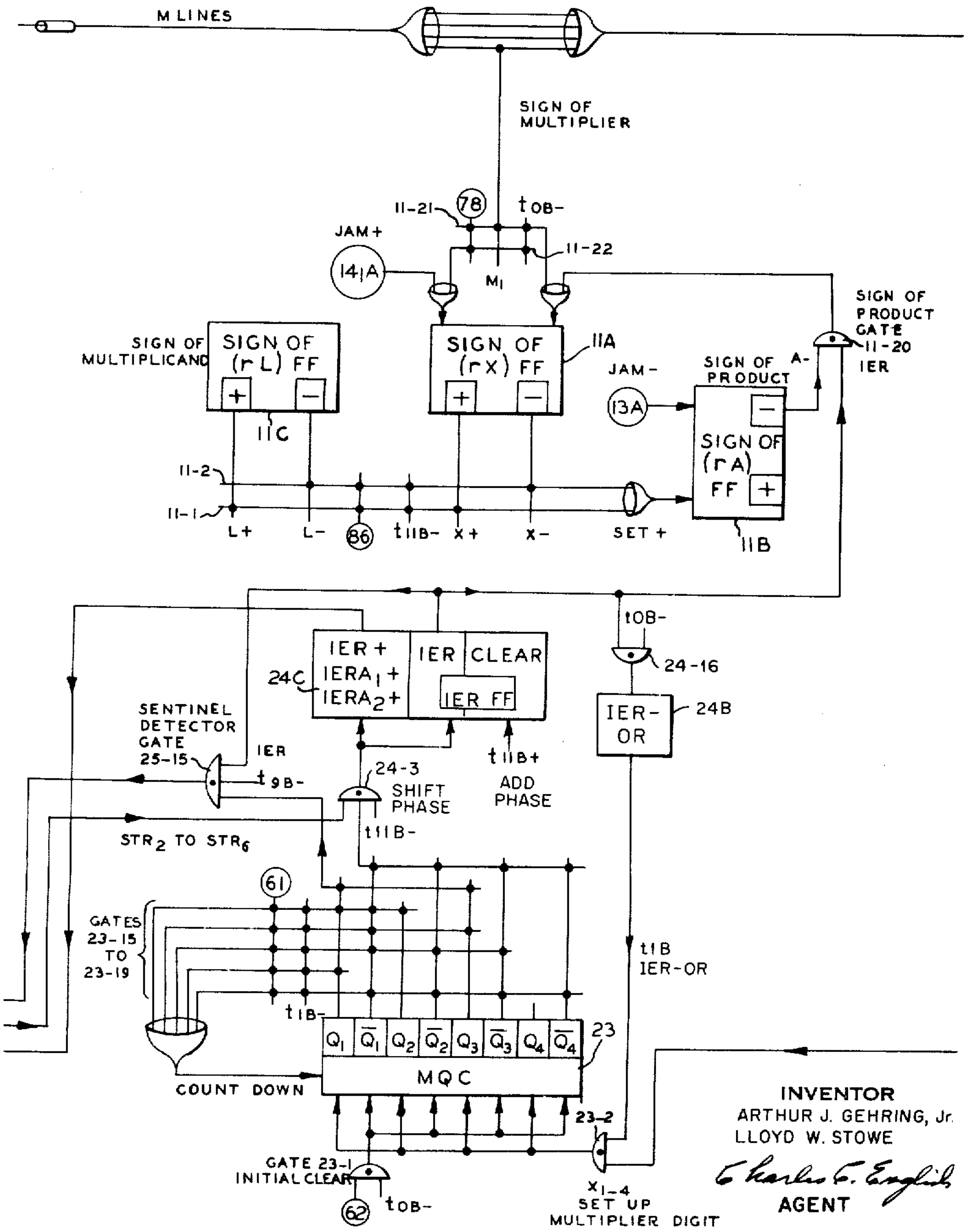
Figure 45C:
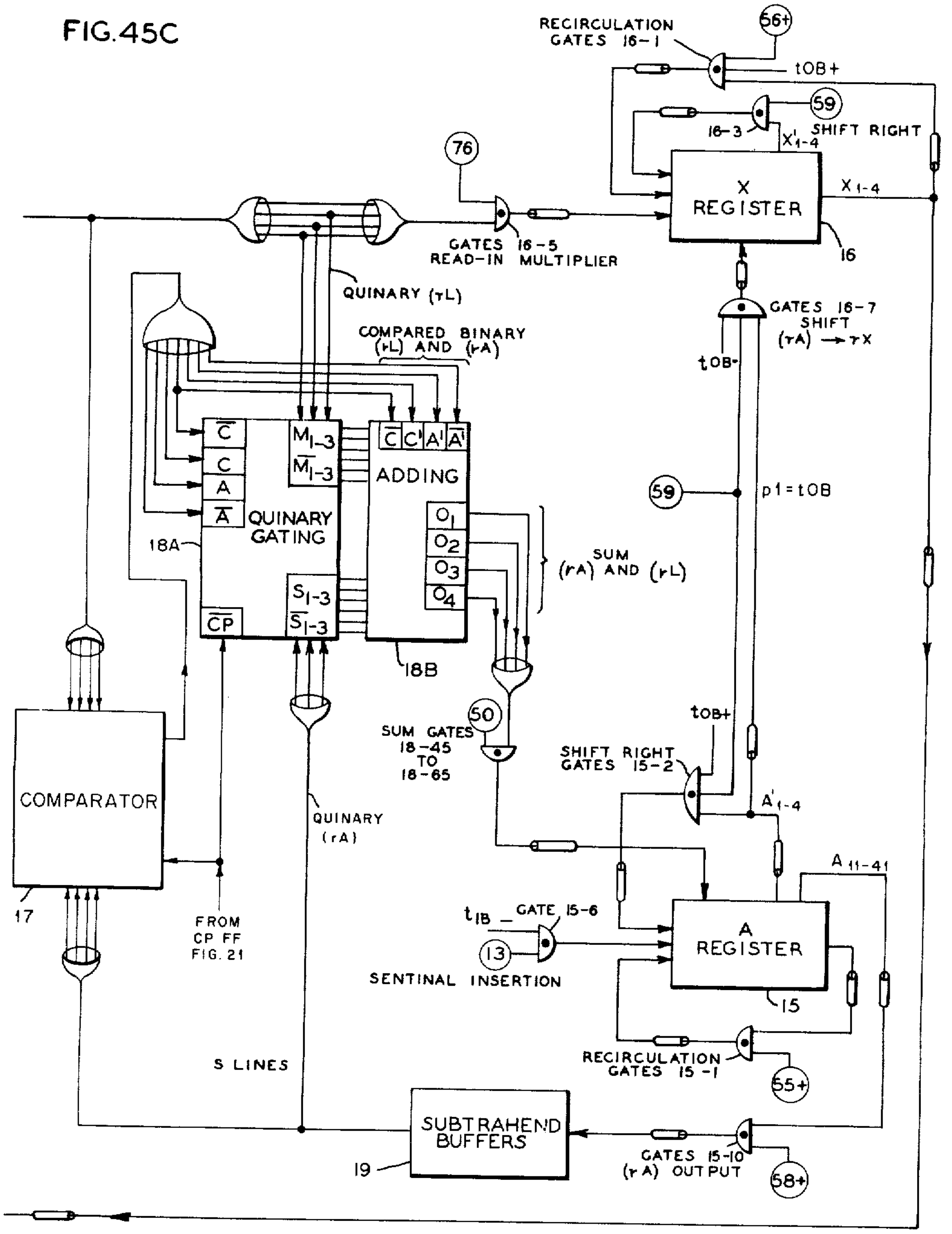
Figures 46, 46A:
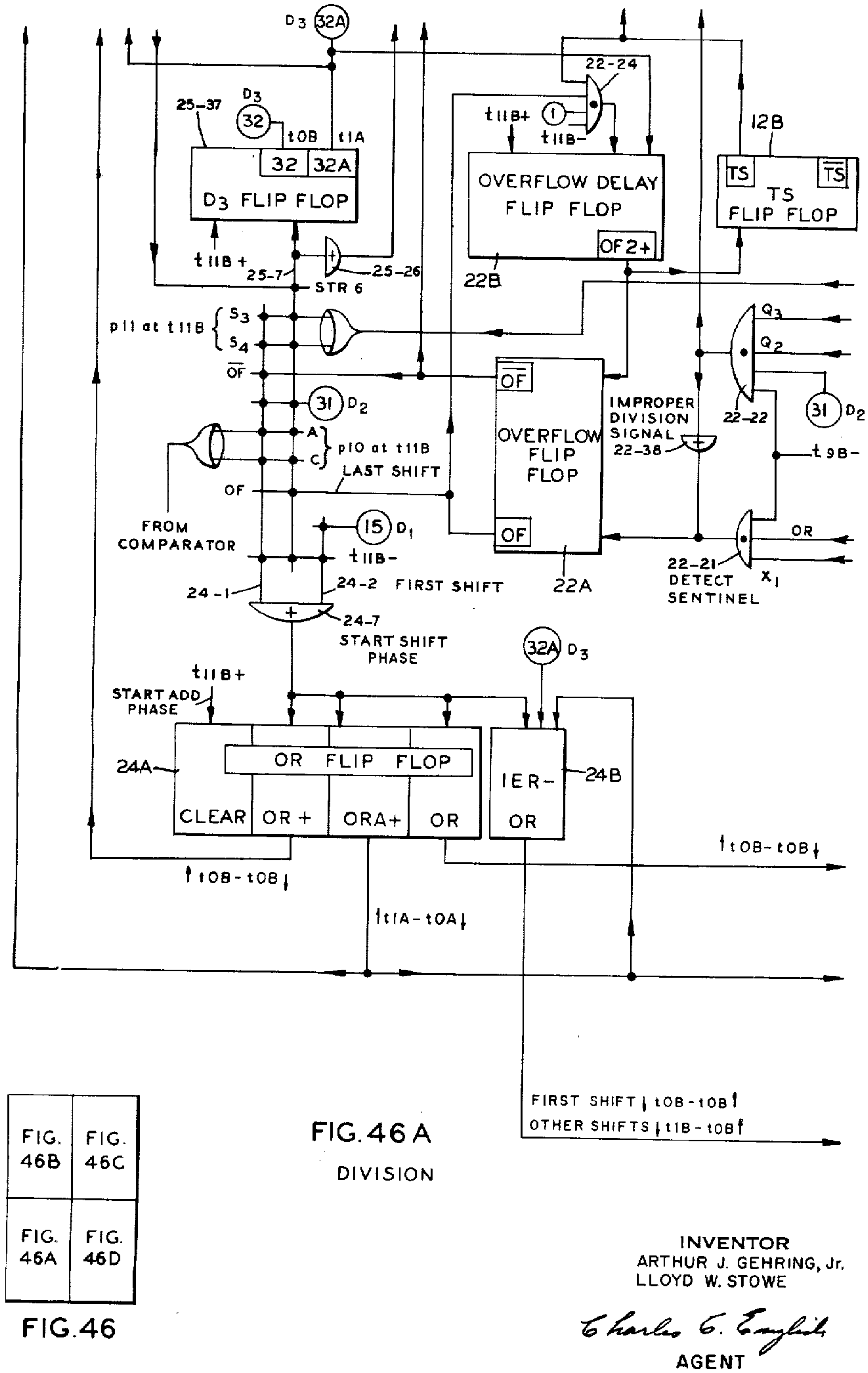
Figure 46B:
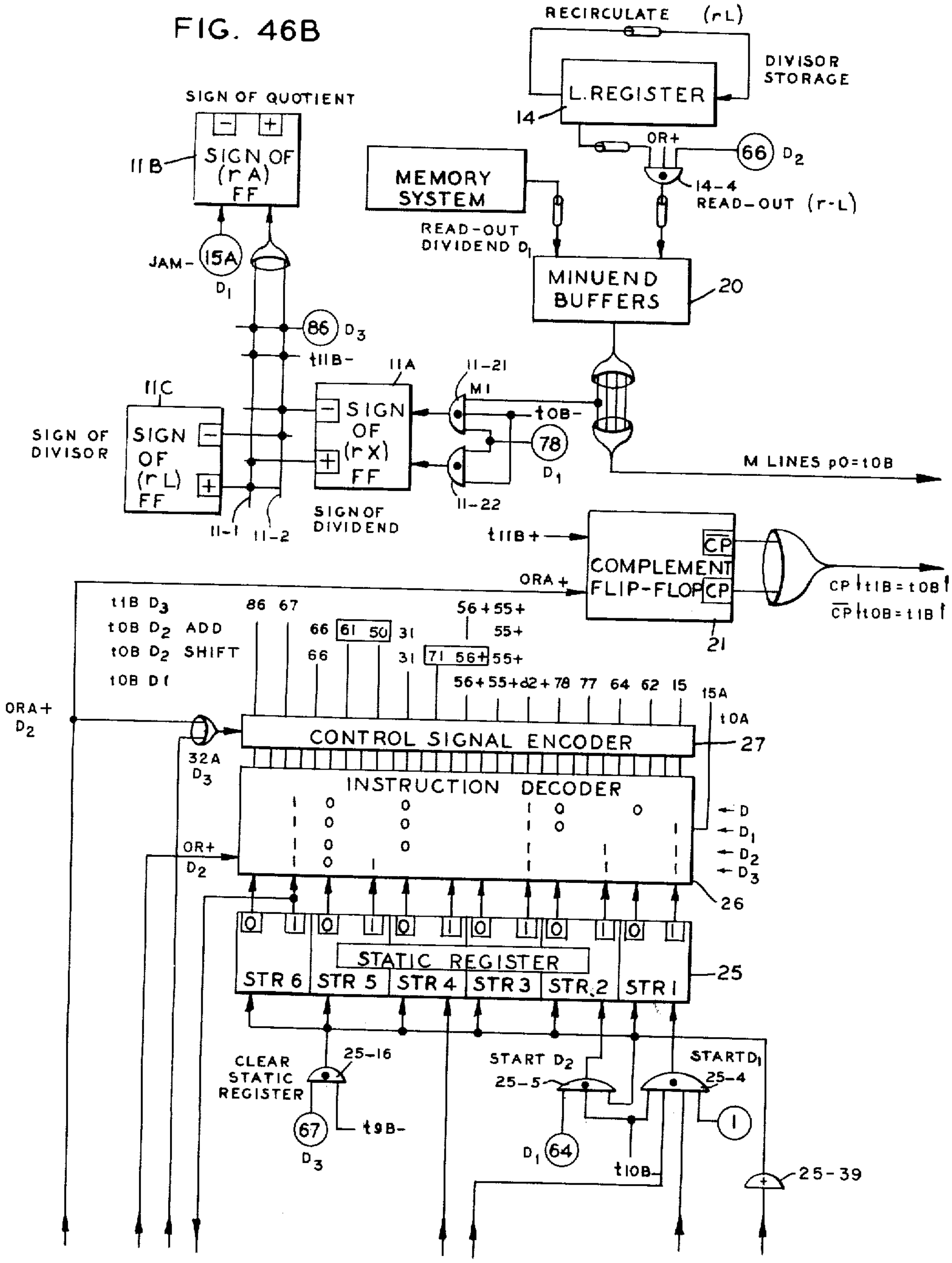
Figure 46C:
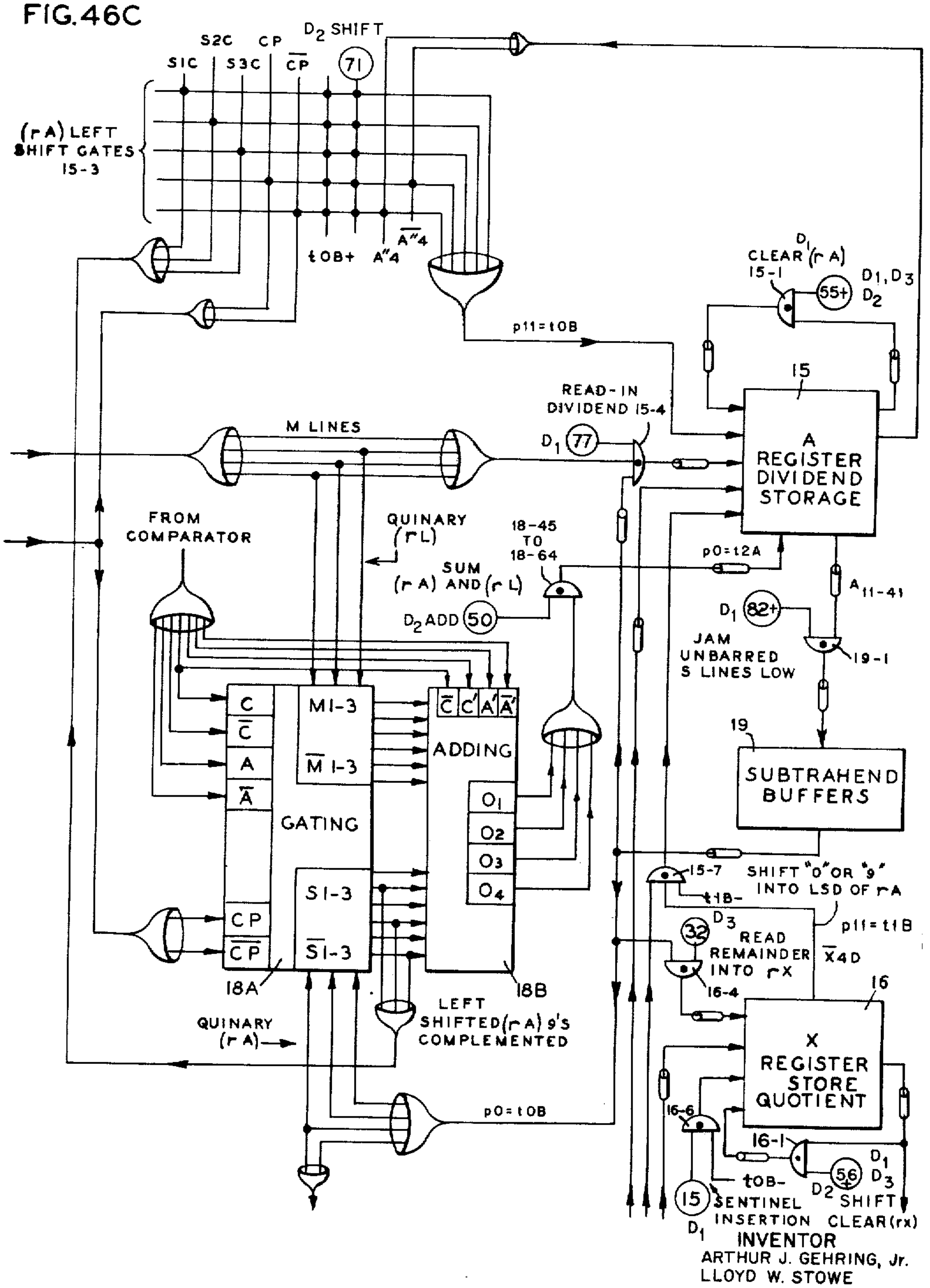
Figure 46D:
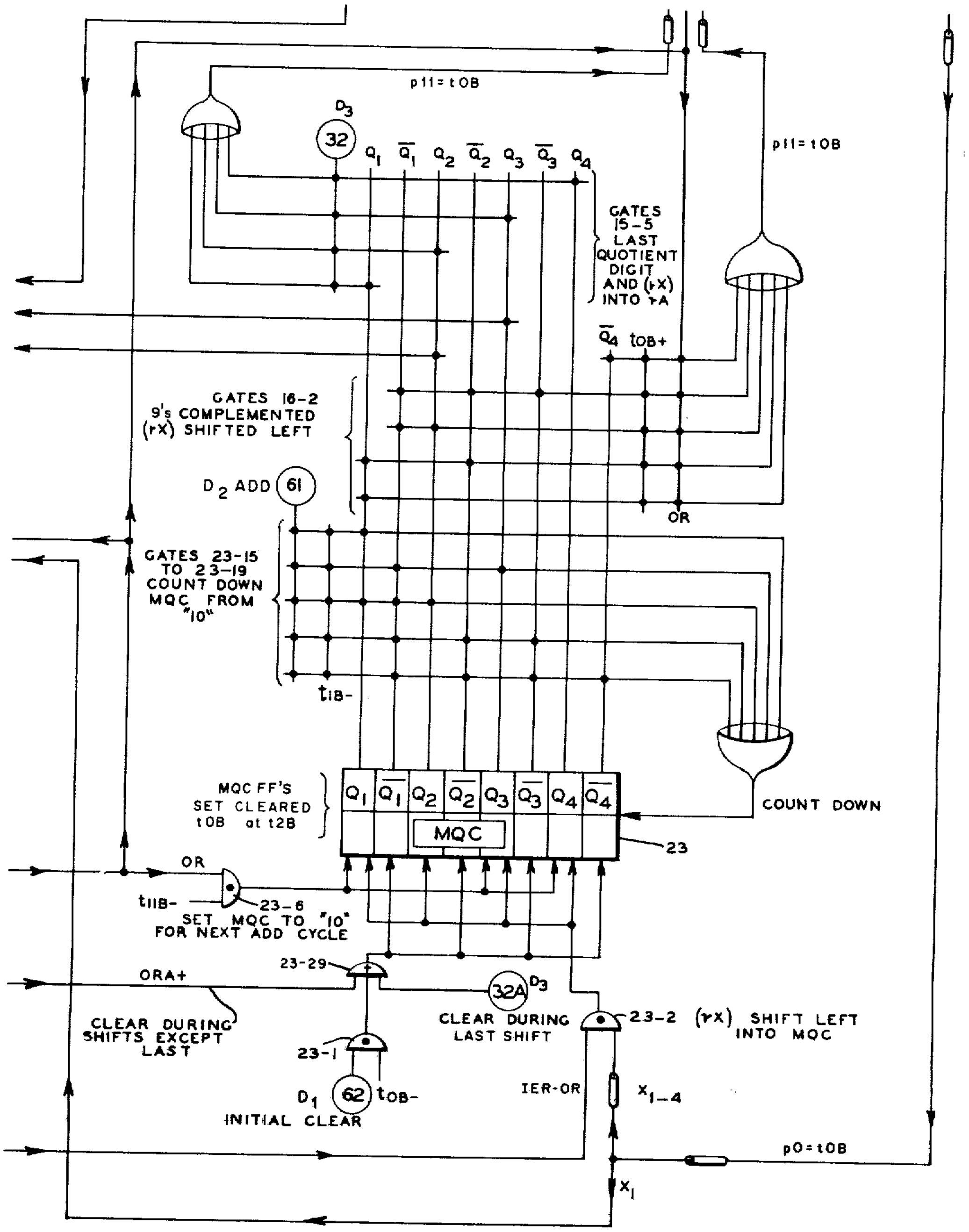
Figures 47, 47A:
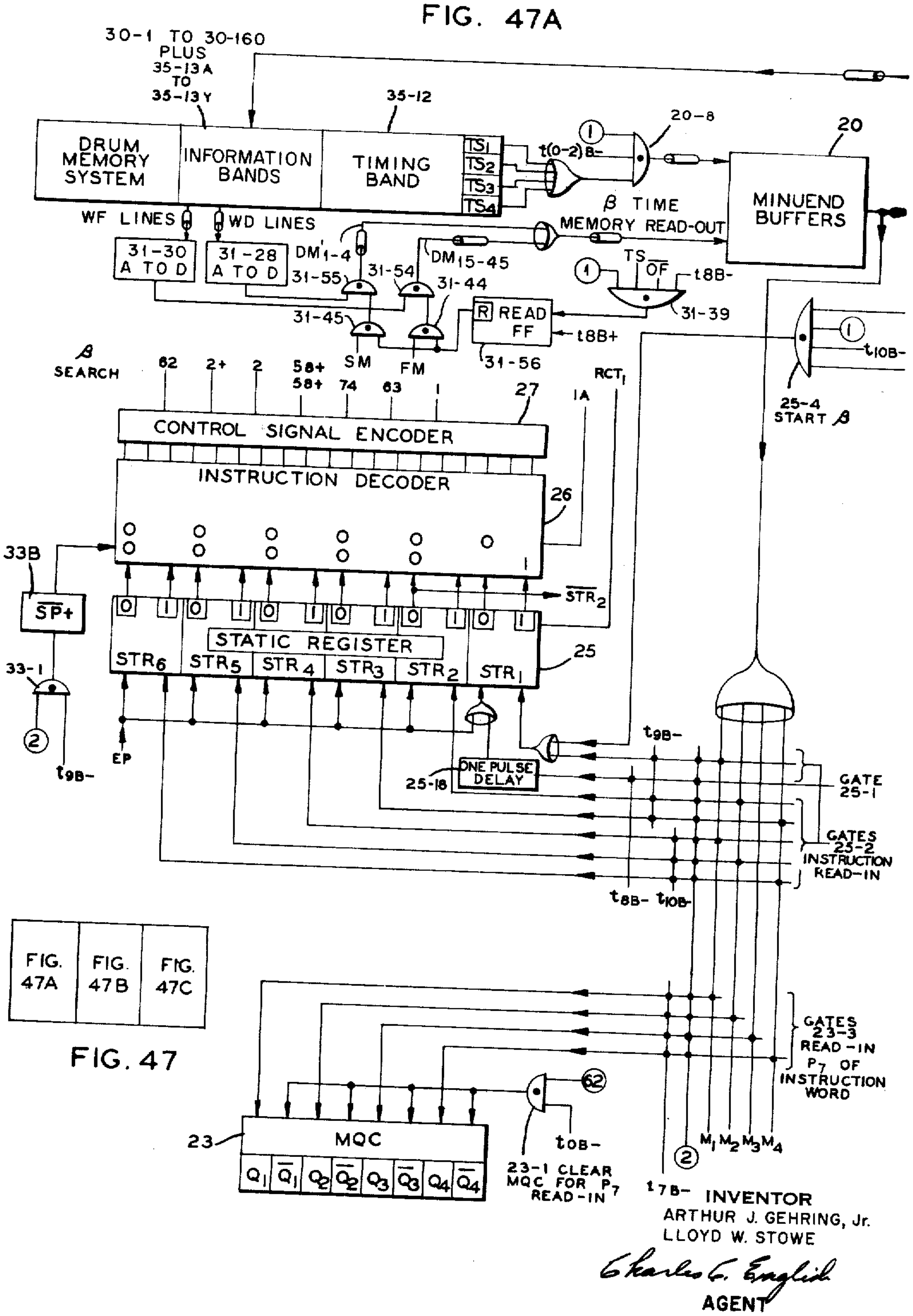
Figure 47B:
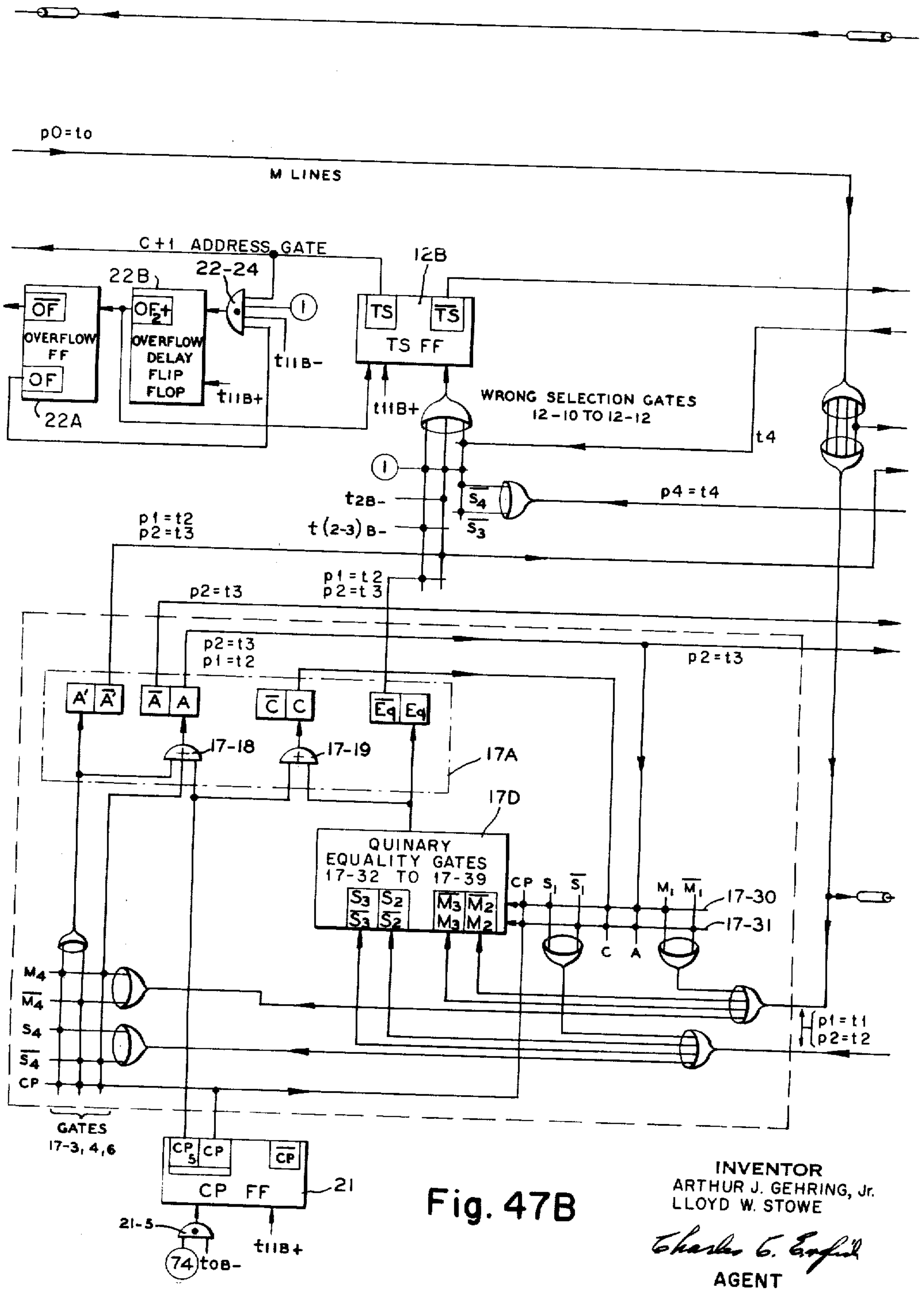
Figure 47C:
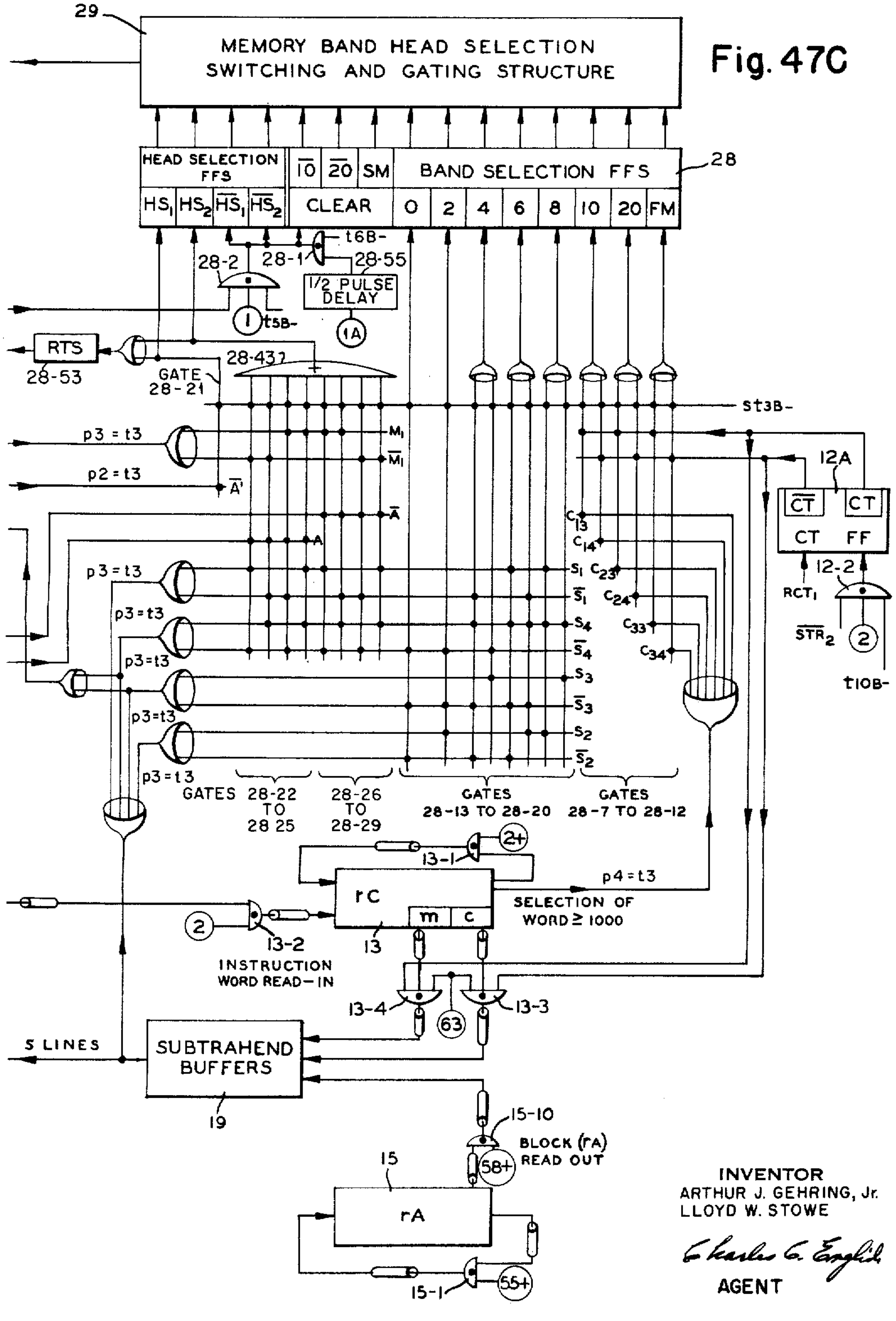
Figure 48A:
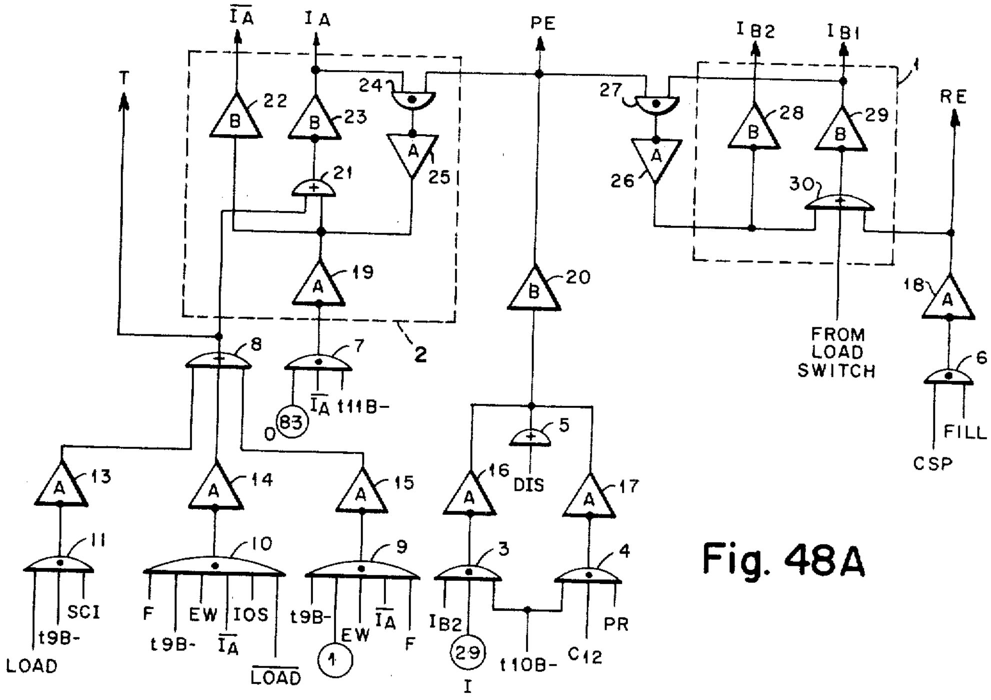
Figure 48B:
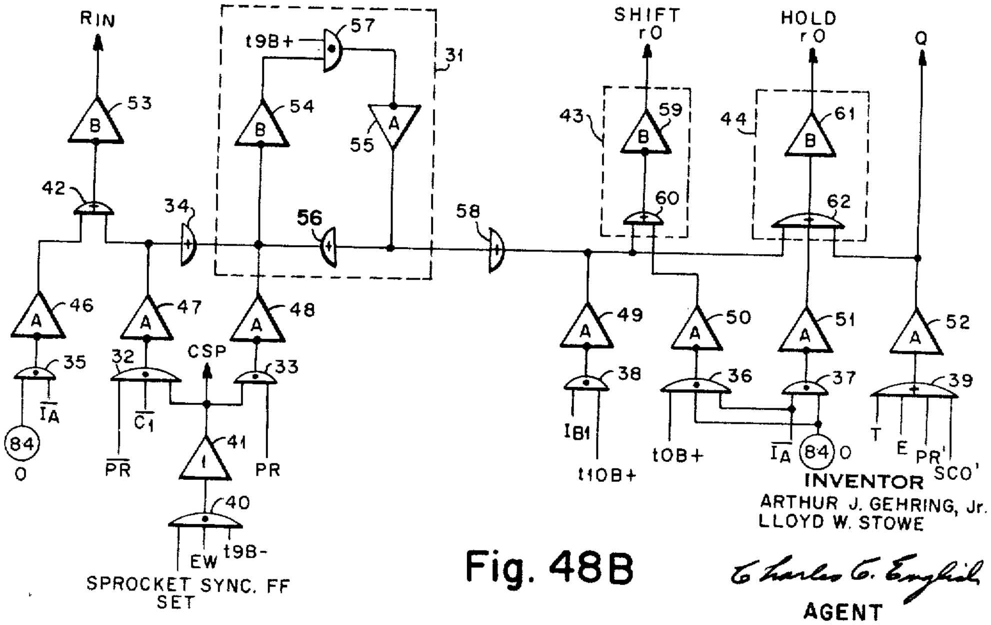
Figure 49A:
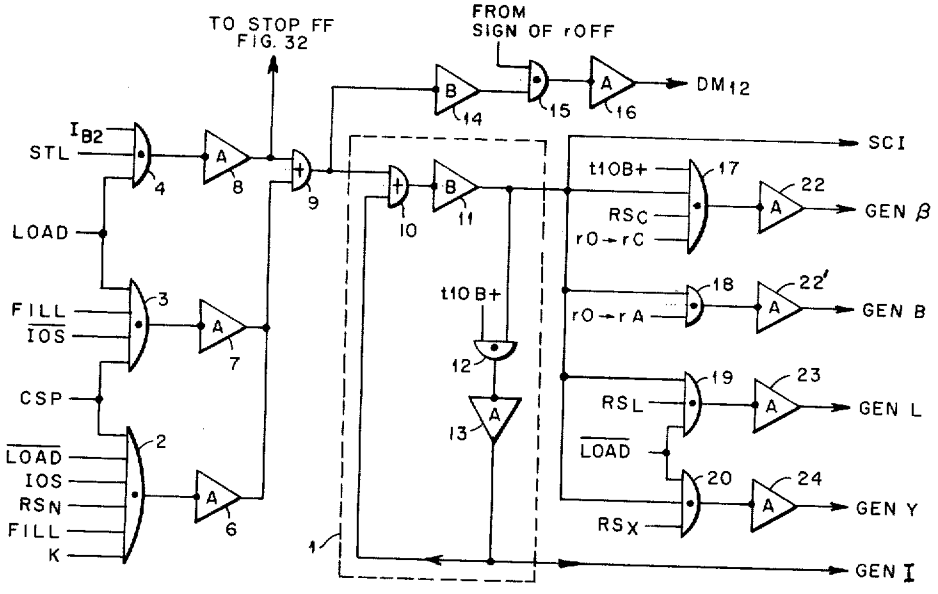
Figure 49B:
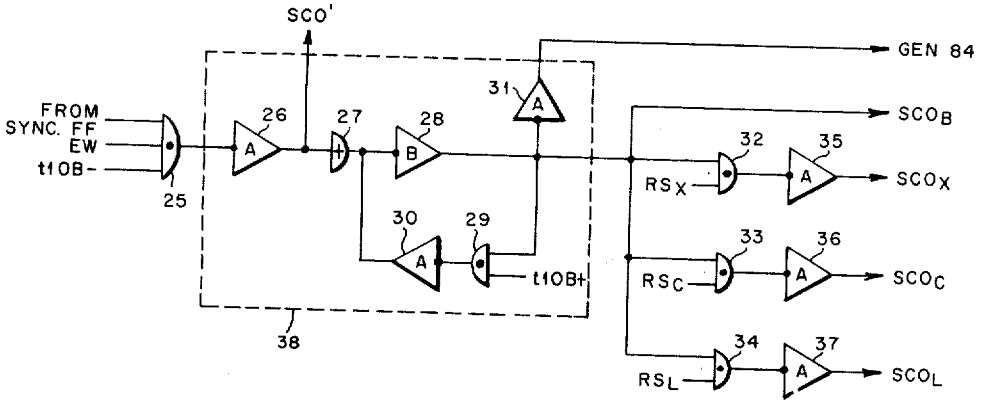
Figure 50:
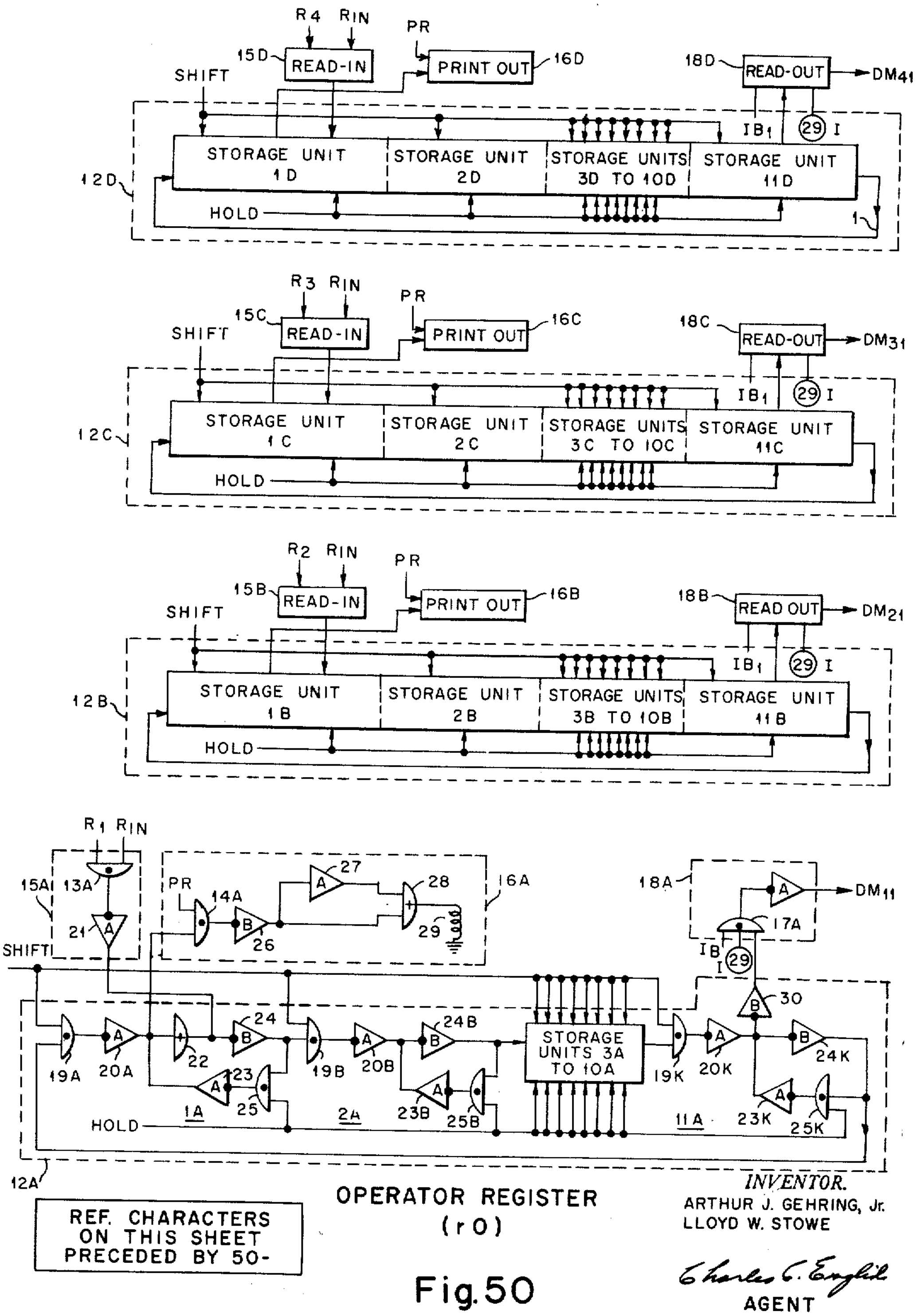
Figure 51:
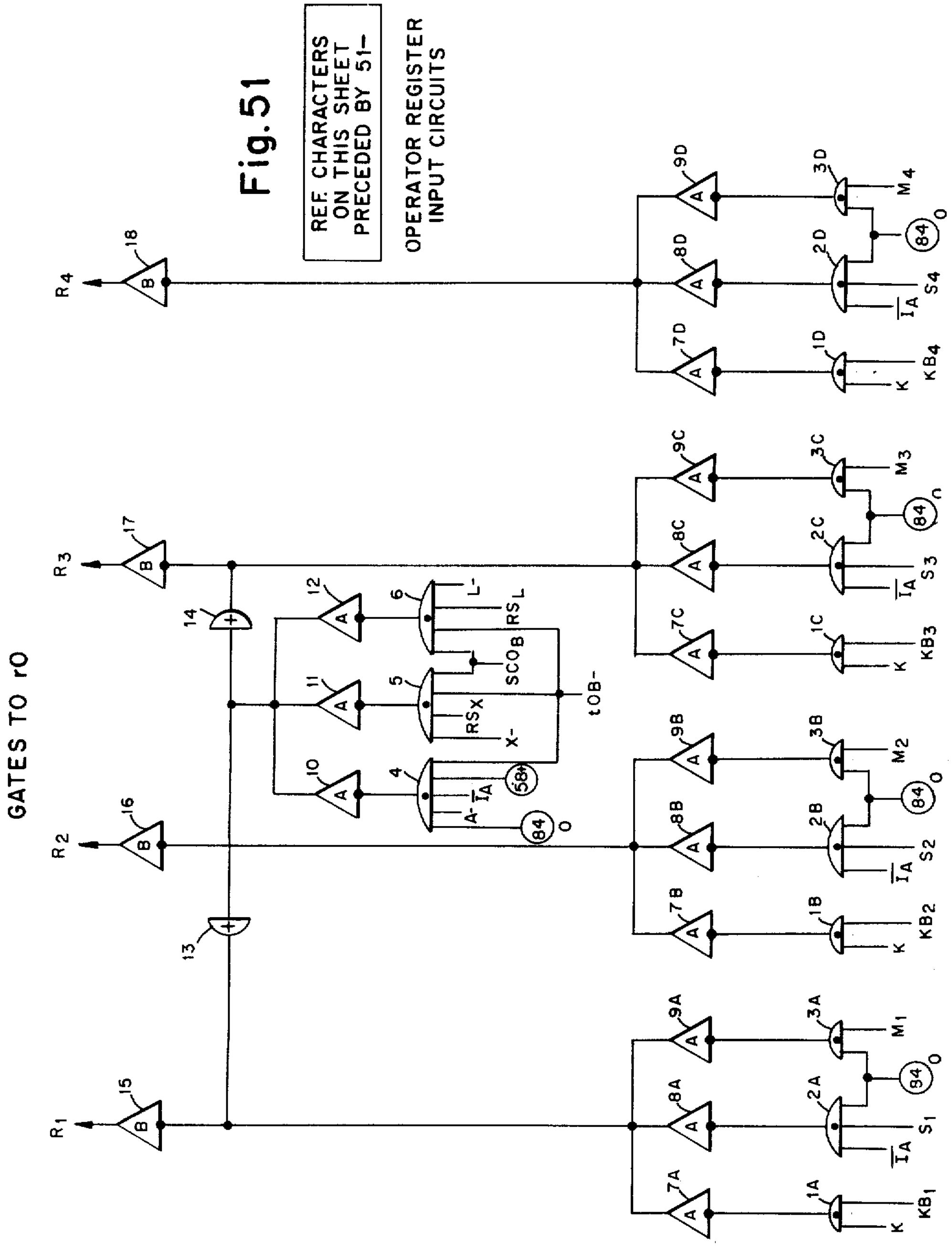
Figures 52, 52A:
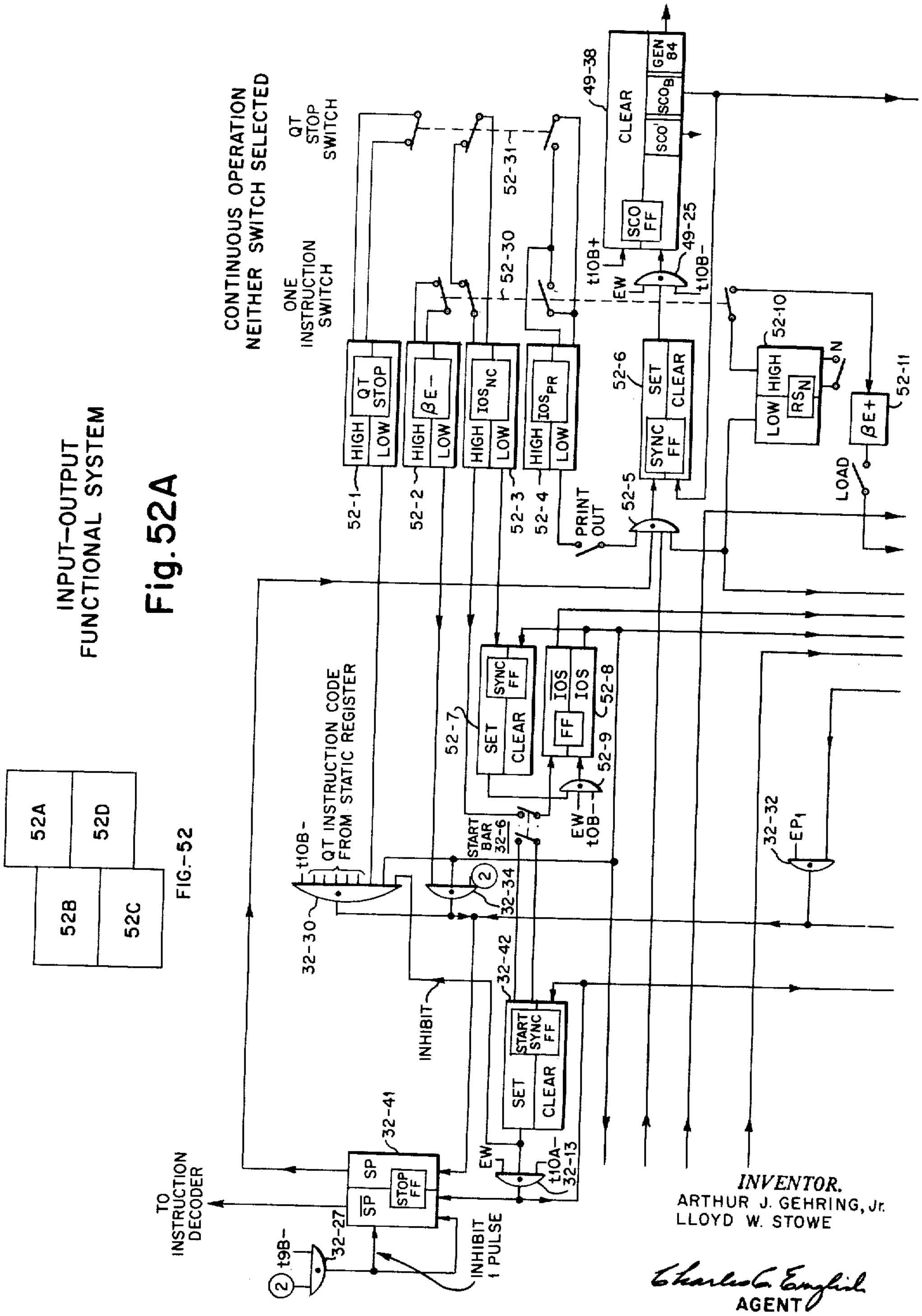

FIGS. 25A and 25B arranged as indicated in FIG. 25 illustrate the details of the Static Register used in this invention;

FIGS. 26A and 26B arranged as indicated in FIG. 26 illustrate the details of the Instruction Decoder used herein;

FIGS. 27A through 27F arranged as indicated in FIG. 27 show the details of the Instruction Encoder used herein;

FIGS. 28A and 28B arranged as indicated in FIG. 28 show the details of the Memory Band and Head Selection circuits incorporated in the present invention;

FIGS. 29A and 29B arranged as indicated in FIG. 29 show the details of the Head Switches employed by the present system;

FIGS. 30A and 30B arranged as indicated in FIG. 30 show in schematic form the electrical interconnections of certain of the memory drum heads;

FIGS. 31A and 31B arranged as indicated in FIG. 31 show in schematic detail the Read-Write circuits for certain of the heads for the magnetic drum memory used by this invention;

FIG. 32A shows in simplified schematic form the Timing Read circuits associated with the drum memory used in this invention;

FIG. 32B shows the details of the Start-Stop circuits used in the present computer;

FIG. 33A shows the details of the Every Other Word Flip-Flop used herein;

FIG. 33B shows the Cycling Unit Error Flip-Flop;

FIGS. 34 and 34A show a detailed block diagram of the Cycling Unit used by the present computer;

FIGS. 35A and 35B, show respectively a partial elevational view and an expanded sectional view of the Drum Memory of this invention, illustrating in a general manner the spatial relationship of the timing band and information bands recorded on the drum;

FIG. 35C is a diagrammatic illustration of the manner in which the sequence numbers of the words may be thought of as existing on the drum;

FIG. 36 is a simplified block diagram showing the organization of certain of the computer components during the execution of a predetermined transfer instruction;

FIGS. 37, 37A and 37B show in simplified block diagram form, the organization of certain of the computer components during the execution of certain choice instructions;

FIG. 38 is a simplified block diagram showing the organization of certain of the computer components during the execution of a first type of shift instruction;

FIG. 39 is a simplified block diagram showing the organization of certain of the computer components during the execution of another type of shift instruction;

FIG. 40 is a simplified block diagram showing the organization of certain of the computer components during the execution of another type of transfer instruction;

FIG. 41 is a simplified block diagram showing the organization of certain of the computer components during the execution of still another type of transfer instruction;

FIG. 42 is a simplified block diagram showing the organization of certain of the components of the computer during the execution of yet another transfer instruction;

FIG. 43 is a simplified block diagram showing the organization of certain of the components of the computer during the execution of a transfer of information from within the computer to the memory;

FIGS. 44A and 44B arranged as indicated in FIG. 44 show in simplified block diagram form the organization of certain of the computer components during the execution of an addition or subtraction instruction;

FIGS. 45A, 45B and 45C arranged as indicated in FIG. 45 show in simplified block diagram form, the organization of certain of the computer components during the execution of a multiplication instruction;

FIGS. 46A, 46B, 46C and 46D arranged as indicated in FIG. 46 show in simplified block diagram form the organization of certain of the computer components during the execution of a division instruction;

FIGS. 47A, 47B and 47C arranged as indicated in FIG. 47 show in simplified block diagram form the organization of certain of the computer components during the execution of an address search of the memory system;

FIG. 48A shows in block diagram form the details of the Interlock Flip-Flop circuits used in the input-output equipment of this invention;

FIG. 48B shows in block diagram form the details of the Sprocket Flip-Flop Hold and Shift circuits used in the input-output equipment of this invention;

FIGS. 49A and 49B show in block diagram form, the Input and Output Control Flip-Flops for the input and output equipment used by this invention;

FIG. 50 shows in block diagram form a storage and shift register used to link the input-output equipment of this invention with the computer itself;

FIG. 51 shows in block diagram form the input gate circuits for the register circuit of FIG. 50; and FIGS. 52A, 52B, 52C and 52D arranged as indicated in FIG. 52 show in simplified block diagram form the organization of the input-output circuits shown in FIGURES 48A to 51 respectively together with certain connections with the computer itself.

Before going into a detailed description of the computer a few comments concerning the diagrammatic presentation in the drawings may be in order. For example, in FIG. 10, which is a simplified block diagram showing in a generalized manner the logical organization of the several components which make up the computer, the components themselves are given reference characters which correspond to the subsequent figure numbers which show in more detail the circuitry comprising the components. To illustrate, the L Register is designated as element 14 in FIG. 10 and the details of the L Register are given in FIG. 14.

Also in the figures, except FIG. 10, the various elements illustrated are preceded by a numeric prefix corresponding to the number of the figure Again to illustrate, the reference characters indicated on FIG. 16, for example, are understood to contain the corresponding numeric prefix 16.

Finally, to better illustrate the interconnection of the computer components during certain operations, separate block diagrams are included to show the appropriate interconnection of the components necessary to execute these operations. Here and wherever else it was deemed appropriate, small inset figures have been included to illustrate how the various drawing sheets may be assembled to show the interconnection of the components shown by the drawings.

Before proceeding with the detailed description of the present invention it will be advantageous to describe and explain the basic logical elements and the respective symbols therefor, which are used repeatedly throughout the block diagrams characterizing this invention.

Figures 1A, 1B, 1C:
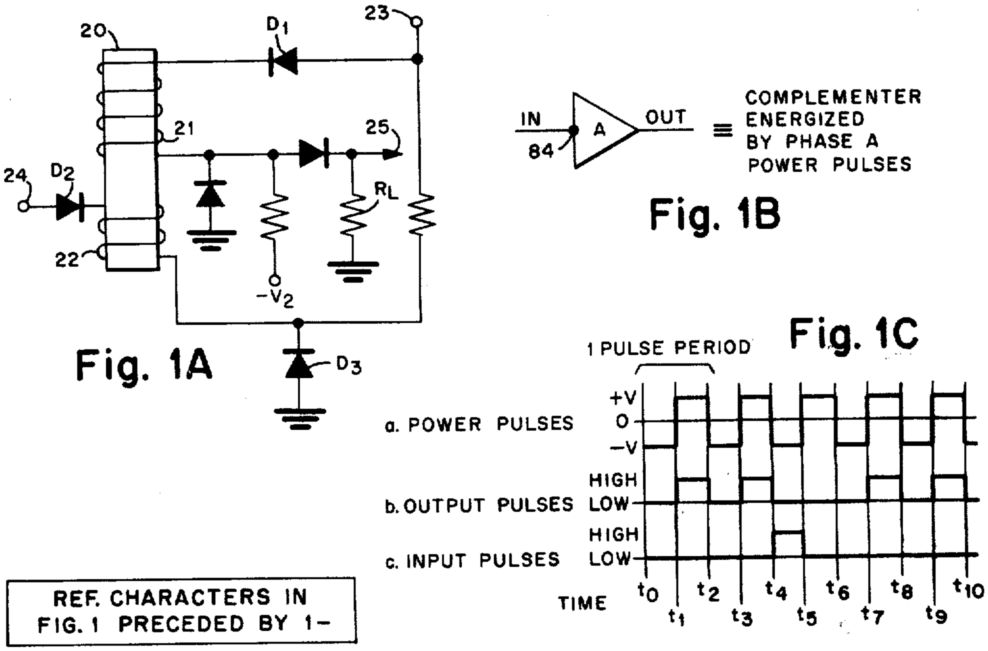

Referring now to FIGURES 1A, 1B and 1C there is shown a complementing pulse type magnetic amplifier element which shall be hereinafter referred to as a complementer. It should be noted that a complementer is by definition a device which will yield a complemented output, that is, it produces a high level output when a low level input is presented thereto, or on the contrary, one which will produce a low level output when there is a high level input thereto. The complementer shown in FIGURE 1A is described in detail in the patent issued to W. F. Steagall 2,709,798, issued May 31, 1955. Briefly, however, this circuit may comprise a core 1–20 of magnetic material preferably, but not necessarily, exhibiting substantially rectangular hysteresis characteristics. Such cores may be made of a variety of materials, among which are compounds comprising substantially 4% molybdenum and 79% nickel. These magnetic core materials are sold commercially under various tradenames such as 4–79 Molypermalloy, Deltamax, and Orthonik. The core 1–20 carries two windings thereon, namely, a power or output winding 1–21, and a signal or input winding 1–22. One end of the said power or output winding 1–21 is coupled through a diode $D_1$ to a source of 1–23 of regularly occurring equally spaced positive and negative-going power pulses of the type shown by waveform *a* in FIGURE 1C. Similarly one end of the signal or input winding 1–22 is coupled through a diode $D_2$ to a source 1–24 of selectively applied high or low level input pulses of the type shown by waveform *c* in FIGURE 1C.

If we should assume that core 20 is at its plus remanence operating point and a low level input signal is applied at 1–24, then each positive-going power pulse applied from the source 1–23 will effect a current flow through diode $D_1$ and winding 1–21 driving the core 20 from its plus remanence operating point to its plus saturation region. For this particular state of operation the coil 1–21 exhibits a relatively low impedance whereby substantially all the energy of the positive half cycles of the applied power pulses may pass through the winding 1–21, and successive high level output pulses will appear at the output point 1–25. Thus the positive-going power pulses of waveform *a* (FIG. 1C) appearing during the time intervals *t1* to *t2* and *t3* to *t4* effect corresponding output pulses at the terminal 1–25 as shown in waveform *b* (FIG. 1C). Therefore, it can be seen that a high level output pulse will be developed across the load resistor $R_L$ for each positive portion of the power pulse cycle provided that the input signal applied at terminal 1–24 is maintained at low level.

If a high level input pulse should be applied from the signal source 1–24 as shown by waveform *c* during a time interval *t4* to *t5*, when the power pulse is negative and when the winding 1–21 is decoupled by diode $D_1$, a current will be caused to pass through the winding 1–22 and clamping diode $D_3$ in a direction tending to move the core 1–20 from its plus remanence operating point to its minus remanence operating point in this time interval. The next subsequently applied positive-going power pulse applied during *t5* to *t6* from the source 1–23 will therefore cause the core 1–20 to operate along a substantially unsaturated portion of its hysteresis loop between its minus remanence and its plus remanence operating points. For this particular state of operation, the winding 1–21 exhibits a relatively high impedance and therefore a low level output will appear at the terminal 1–25 during the time interval *t5* to *t6*. If no further high level input pulses are applied, i.e. a low level signal is applied during the time interval *t6* to *t7* to terminal 1–24, the core 1–20 will once more be driven from its plus remanence to its positive saturation region by the next positive-going power pulse, at *t7* to *t8*, again effecting a corresponding high level output at the terminal 1–25.

Thus, examining the waveforms shown in FIGURE 1C, it will be seen that in the absence of high level input pulses, the complementer circuit shown provides regularly occurring high level output pulses in coincidence with the positive half cycles of the applied power pulses; while the application of a high level signal input during a negative-going power pulse portion will inhibit a high level output pulse during the application of the next subsequent positive-going power pulse. The device of FIG. 1A thus provides a high level output pulse in the absence of a preceding high level input pulse, and provides a low level output following the application of high level input pulse, whereby the device acts as a complementer, having a one-half cycle delay between input and output pulses.

Referring now to FIGURE 1B there is shown the triangular symbol which shall throughout the remainder of the drawings designate a single complementer. The input to the circuit is at the base of the triangle, while the output is taken from the apex of the triangle. The alphabetic character "A" within the triangle designates the phase of the power pulse being applied to the circuit. In this regard it should be noted that all complementers are operated on either A or B phase power pulses, wherein the A and B phase power pulses have the same frequency but opposite phases. For example, if the power pulses of waveform *a* of FIGURE 1C represents phase A, phase B power pulses would be 180° out of phase therewith, with the positive half cycles thereof occurring during the negative half cycles of the phase A pulses. The significance of the particular phase of the power pulse applied to a complementer will be explained in detail in connection with FIGURE 4A which shows a plurality of complementers serially connected to form a chain. The dot 1–84 distinguishes a complementer from an amplifier, which is now to be described.

Figure 2A:
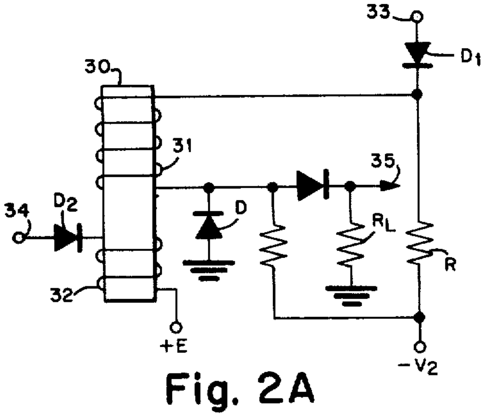
Figure 2C:
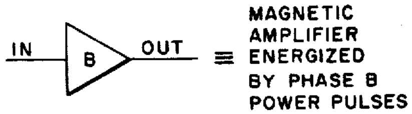
FIGS. 2C and 2B show respectively the logical symbol of the circuit of FIG. 2A and certain waveforms useful in understanding the operation of the circuit of FIG. 2A.
Figure 2B:
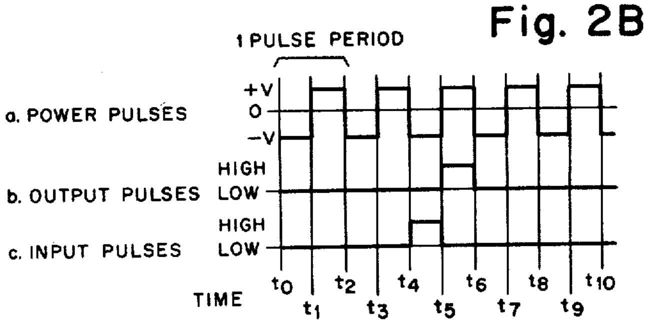

Referring now to FIGURES 2A to 2C there is shown a non-complementing pulse-type magnetic amplifier which shall be hereinafter referred to as a magnetic amplifier. It should be noted that a magnetic amplifier is by definition a device which will produce a high level output one-half pulse time after a high level input is presented thereto or produces a low level output one-half pulse time after a low level input is presented thereto. The details of such an amplifier are given in the patent to Steagall 2,709,798. Briefly, however, the magnetic amplifier shown in FIGURE 2A may comprise the magnetic core 2–30, which preferably but not necessarily exhibits a substantially rectangular hysteresis loop. The core 2–30 as in the case of the complementer just described carries two windings thereon, namely, a power or output winding 2–31 and a signal or input winding 2–32. One end of the power winding 2–31 is again coupled via rectifying means $D_1$ to a source 2–33 of regularly occurring equally spaced power pulses of the configuration shown by waveform *a* in FIGURE 2B and one end of the signal or input winding 2–32 is coupled via rectifying means $D_2$ to a source 2–34 of selectively applied input pulses.

If we should now assume that the core 2–30 is initially at its minus remanence operating point and that a low level input signal has been applied to terminal 2–34 during the time interval *t0* to *t1* then, a positive-going power pulse from the source 2–33, applied during the time interval *t1* to *t2*, will drive the core 2–30 from its minus remanence operating point to its plus remanence operating point during this time interval. As was mentioned previously, the winding 2–31 exhibits a relatively high impedance for this state of operation and consequently a low level output will appear at the output point 2–35 during the time interval *t1* to *t2*. During the next subsequent time interval, *t2* to *t3*, when the applied power pulse is negative-going, diode $D_1$ is decoupled, and a low level input signal is again applied by source 2–34, a reverse current will flow from ground, through the rectifier D, through the said winding 2–31, and thence through the resistor R to a source of negative potential $-V_2$. The magnitude of this reverse current flow is sufficient to flip the core 2–30 from its plus remanence operating point to its minus remanence operating point during the time interval *t2* to *t3*, whereby the next positive-going power pulse from the source 2–33, applied for instance during the time interval *t3* to *t4*, will once more drive the core 2–30 along the high impedance operating path on its hysteresis loop, thereby producing a low level output at the terminal 2–35.

If a high level input pulse should be applied from the input source 2–34 during the time interval *t4* to *t5* (waveform *c* of FIGURE 2B), a current will flow through diode $D_2$ and the signal winding 2–32 in a direction producing a magnetomotive force in core 2–30 in opposition to that effected by the aforesaid reverse current flow through winding 2–31, during this same time interval. The application of a high level input pulse will therefore cause the core 2–30 to remain at its plus remanence operating point, whereby the next subsequent positive-going power pulse, applied for instance during the time interval *t5* to *t6*, will drive the core 2–30 into positive saturation, effecting a high level output pulse at the terminal 2–35. If a low level input pulse is applied during the time interval *t6* to *t7*, the reverse current flow through winding 2–31 will again flip the core to its minus remanence operating point and the device will produce a low level output during the interval from *t7* to *t8*.

Thus, examining the waveforms of FIGURE 2B, it will be seen that in the absence of high level input pulses, the magnetic amplifier circuit shown provides regularly occurring low level output pulses in coincidence with the positive half cycles of the applied power pulses; while the application of a high level signal input during a negative-going power pulse portion will inhibit the resetting of the core 2–30, and thus a high level output pulse will be produced during the next subsequent positive-going power pulse. The device thus provides a high level output pulse one-half cycle after the application of a high level input pulse, and provides a low level output one-half cycle after the application of low level input pulse, whereby the device acts as an amplifier providing a one-half pulse delay in signal transfer.

Referring now to FIGURE 2C there is shown a triangular symbol which shall throughout the remainder of the drawings designate a single magnetic amplifier. Here as in the complementer, the input is shown as being applied to the base of the symbol and the output as coming from the apex of the trangle. The input is shown undotted to distinguish it from the complementer symbol. The alphabetic character "B" within magnetic amplifier designates the phase of the power pulse being applied to the amplifier. In this regard it should be noted that all magnetic amplifiers are operated on either A or B phase power pulses. The significance of the particular phase of the power pulse applied to an amplifier will be explained in detail in connection with FIGURE 3 which shows a plurality of magnetic amplifiers serially connected.

For optimum operation of either the complementer or the magnetic amplifier of FIGURES 1 and 2 respectively, the signal input should be applied during the negative-going portion of the power pulse. Thus an output will not be developed until the next positive-going portion of the power pulse is applied to the complementer or the magnetic amplifier. It is therefore inherent to the operation of either of the two aforementioned devices to provide a delay period for the transmission of a signal applied thereto. If a complete power pulse cycle is the measure of one pulse period then the magnetic amplifier and complementer each inherently furnishes a delay of one-half pulse period or one pulse time in the transmission of a signal provided the negative and positive portions of the power pulse cycle are of equal duration.

Further regarding the output level of either the magnetic amplifiers or complementers, it should be noted that during the negative-going portion of the power pulses the output level of a magnetic amplifier or complementer is at low level, so that a magnetic amplifier which is receiving a series of low level inputs will produce a substantially steady state low level output and a complementer which is receiving a series of high level inputs will also produce a sustantially steady state low level output.

In accordance with the present invention magnetic amplifiers and complmenters may be interconnected in closed ring configurations or in a simple cascade arrangement. Such complementers and magnetic amplifiers may be energized by regularly occurring power pulses. As will become apparent from the ensuing description certain of these magnetic amplifiers and complementers are energized by "phase A power pulses," while other of the magnetic amplifiers or complementers will be energized by "phase B power pulses." It will also become apparent from the following description that when magnetic amplifiers or complementers of the type contemplated herein are in fact utilized, in a cascaded or closed ring arrangement, the several power pulse sources cooperate with the input pulses fed to the magnetic amplifiers or complementers to selectively produce high or low level outputs from the magnetic amplifiers or complementers concerned. In this connection it will be noted that a magnetic amplifier or complementer which is energized by phase A power pulses will provide the properly timed input to a magnetic amplifier or complementer which is energized by a phase B power pulse and vice versa.

Referring now to FIGURES 3A to 3D there is shown a chain of magnetic amplifiers 3–50A to 3–50E. Each of the magnetic amplifiers (3–50A, 3–50C, 3–50E), which contains the letter A therein is energized by a source of phase A power pulses, the waveform of which is shown by waveform *a* of FIGURE 3B, and each of the magnetic amplifiers (3–50B and 3–50D) which contains the letter B therein is energized by a source of phase B power pulses, the waveform of which is shown at waveform *b* of FIGURE 3B. Although the chain of magnetic amplifiers 3–50A to 3–50E begins with a magnetic amplifier 3–50A energized with phase "A" power pulses the following discussion is equally applicable to a chain of magnetic amplifiers beginning with a magnetic amplifier energized with phase "B" power pulses.

The magnetic amplifiers 3–50A, 3–50C and 3–50E and magnetic amplifiers 3–50B and 3–50D are connected via lines 3–54A and 3–54B, respectively, to a properly phased source of power pulses. Lines 3–54A and 3–54B and the source of "A" and "B" power pulses will not be shown in connection with the magnetic amplifiers used in explaining the more detailed block diagrams of this computer; however, these elements will be understood to exist as designated by the presence of an A or B within the triangular symbol representing the element.

Figure 3A:
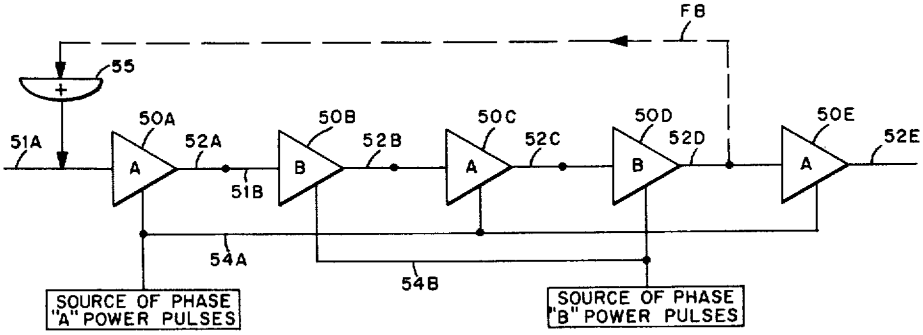

As is apparent from FIGURE 3A the output line of a magnetic amplifier (e.g. line 3–52A) is connected to the input line (e.g. 3–51B) of the next magnetic amplifier in the chain. Further, it is apparent that the magnetic amplifiers energized by phase "A" power pulses and the magnetic amplifiers energized by the phase "B" power pulses are connected in alternation.

Figure 3B:
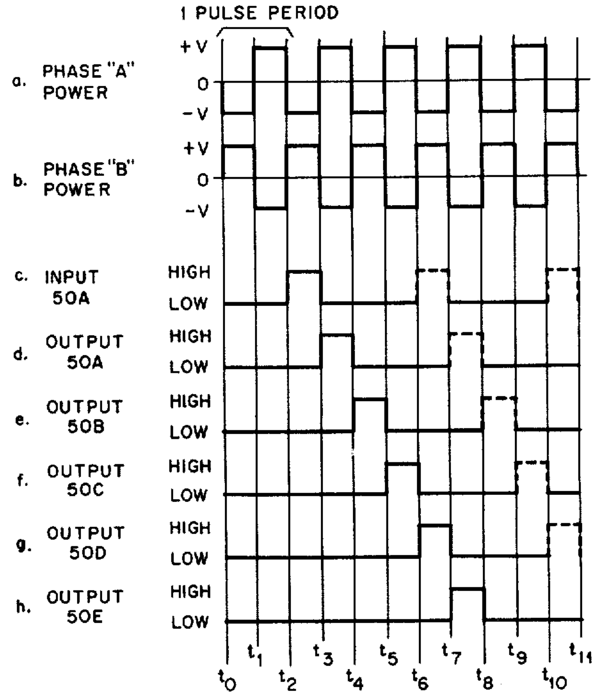
FIG. 3B shows a series of waveforms useful to an understanding of the action of the circuit of FIG. 3A.

It will be appreciated from the foregoing explanation of magnetic amplifiers, that if, as shown in FIGURE 3B, a low level input signal is applied to line 3–51A of magnetic amplifier 3–50A during the interval of time *t0* to *t1* a low level output pulse will be developed by magnetic amplifier 3–50A during the time interval *t1* to *t2*. Further as shown by FIGURE 3 the output line 3–52A of magnetic amplifier 3–50A is connected to the input line 3–51B of magnetic amplifier 3–50B and thus the output pulse of amplifier 3–50A serves as the input to amplifier 3–50B. By observing the waveforms of FIGURE 3B during the time interval *t1* to *t2* it can be seen that the input (low level) to amplifier 3–50B is applied when the power pulse (FIGURE 3C) associated with magnetic amplifier 3–50B is negative going. Thus, magnetic amplifier 3–50B will produce a low level output one-half pulse period (or one pulse time) after receiving an input, i.e. during the time interval *t2* to *t3*, as shown by waveform *e* of FIGURE 3B. The low level output of magnetic amplifier 3–50B is in turn applied to the input of a magnetic amplifier 3–50C during the negative-going portion of the power pulse applied to this latter magnetic amplifier, thereby causing a low level output to be developed by magnetic amplifier 3–50C during the time interval *t3* to *t4* as shown by waveform *f*. It is obvious, therefore, from the previous description and an examination of FIGURE 3B that a low level output will be produced by magnetic amplifiers 3–50D and 3–50E during the time intervals *t4* to *t5* and *t5* to *t6* respectively.

If a high level input signal, waveform *c* of FIGURE 3B, is applied at line 3–51A of magnetic amplifier 3–50A during the time interval *t2* to *t3*, it will be readily understood without further explanation that this input pulse will be translated serially through magnetic amplifiers 3–50A to 3–50E and that during this translation the input pulse will be delayed one-half pulse period as it is propagated through each of the magnetic amplifiers.

Figure 3C:
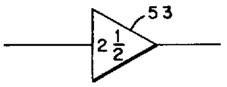
FIGS. 3C and 3D show the logical symbols for the circuit of FIG. 3A.

Taking the chain of amplifiers 3–50A to 3–50E as an entirety it will be appreciated that a low level input applied at 3–51A during the time interval *t0* to *t1* will cause a low level output to be generated at 3–52E during the time interval *t5* to *t6*, i.e. a low level input pulse at 3–51A will be delayed two and one-half pulse periods before it is generated at 3–52E. Further, a high level input applied at 3–51A during the time interval *t2* to *t3* will cause a high level output pulse to be generated by a magnetic amplifier 3–50E during the time interval *t7* to *t8*, i.e. the high level input pulse at 3–51A will be delayed two and one-half pulse periods before it is generated at 3–52E. Since the chain of magnetic amplifiers conforms to the definition of a magnetic amplifier (supra) in that it produces a high level output signal after and in response to a high level input signal and produces a low level signal after and in response to a low level input signal, it may be represented by the symbol for a single magnetic amplifier having an indication of the amount of delay introduced by the chain. FIGURE 3C shows the symbol 3–53 that may be used to represent a chain of magnetic amplifiers (as shown in FIGURE 3A) or other devices which conform to the above criteria. The numeral within the symbol 3–53 denotes the amount of delay in pulse periods encountered in the chain and the undotted input indicates that the output is uncomplemented.

Figure 3D:
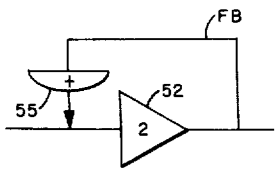

Referring to FIGURES 3A and 3B again together with FIGURE 3D there is shown respectively a closed ring configuration of magnetic amplifiers 3–50A to 3–50D, the waveforms, and the block diagram symbol 3–52 therefor. The output of magnetic amplifier 3–50D is fed back via line FB through a suitable isolating device 3–55 to the input of the first magnetic amplifier 3–50A in the chain. Thus, when a high level output is developed by magnetic amplifier 3–50D during time interval *t6* to *t7* (waveform *g* of FIG. 3B), it is fed back via line FB and device 3–55 to line 3–51A of magnetic amplifier 3–50A as a high level input signal (see dashed part of FIG. 3A). This high level input signal will cause magnetic amplifiers 3–50A to 3–50D to produce high level outputs as indicated by the dashed portions of FIGURE 3B. When a high level output again is produced by magnetic amplifier 3–50D during *t10* to *t11* it of course will be fed back to the input of amplifier 3–50A at this time. Thus, with the feed back connection, once a high level input is presented to the input of magnetic amplifier 3–50A it will be caused to recirculate endlessly through the closed ring configuration of magnetic amplifiers 3–50A to 3–50D. It should be noted that the numeral 2 inside symbol 3–52 represents the delay expressed in pulse periods inherent in the closed ring configuration. As will be explained later, isolating device 3–55 may be used in conjunction with other signals to inhibit the recirculation of signals via the feed back path FB.

It follows naturally that a low level input signal applied to magnetic amplifier 3–50A will recirculate through the closed ring configuration in the same manner.

Referring now to FIGURE 4A there is shown a cascaded arrangement comprising an *even number* of complementers 4–80A to 4–80D. Each of the complementers (4–80A and 4–80C) which contains the letter A therein is energized by a source of phase A power pulses, the waveform of which is shown at *a* FIGURE 4B; and each of the complementers (4–80B and 4–80D) which contains the letter B therein is energized by a source of phase B power pulses, the waveform of which is shown at *b* FIGURE 4B.

As is apparent from FIGURE 4A the output of each complementer is connected to the input of the next complementer in the chain. Further it is apparent that the complementers energized by phase "A" power pulses and the complementers energized by the phase "B" power pulses are connected in alternation.

Although the chain of complementers 4–80A to 4–80D begins with a complementer 4–80A energized with phase "A" power pulses, the following discussion is equally applicable to a chain beginning with a complementer energized with phase "B" power pulses.

It will be appreciated from the foregoing explanation of complementers, that if a low level input signal is applied to the input of complementer 4–80A during the negative half cycle of the phase A power pulse, a high level output pulse, i.e. a complemented output, will be developed by this complementer during the next positive half cycle. As shown by FIGURE 4A the output of complementer 4–80A is connected to the input of complementer 4–80B, and therefore the output pulse of complementer 4–80A serves as the input signal to complementer 4–80B. Since all the complementers 4–80A to 4–80D are similar in operation, complementer 4–80B will produce a low level (complemented) output one-half pulse period after receiving a high level input. The low level output of complementer 4–80B is in turn applied to input of a complementer 4–80C during the negative going portion of the power pulse applied to this latter complementer, thereby causing a high level output to be developed by complementer 4–80C during the next positive half cycle of the A phase power pulse.

If a high level input signal is applied to the input of complementer 4–80A it will be readily understood without further explanation that this input pulse will be translated serially through complementers 4–80A to 4–80D and that during this translation the input pulse will be complemented and delayed one-half pulse period as it is propagated through each of the complementers.

Taking the chain of an even number of complementers 4–80A to 4–80D as an entirety it will be appreciated that a low level input signal to the input of the first complementer in the chain will cause a low level output to be generated by complementer 4–80D two pulse periods later. Further, a high level input applied to the first complementer 4–80A will cause a high level output pulse to be generated by complementer 4–80D two pulse periods later.

Since the chain comprising an even number of complementers conforms to the definition of a magnetic amplifier (supra) in that it produces a high level output signal after and in response to a high level input signal and produces a low level output signal after and in response to a low level input signal, it too may be represented by the symbol for a single magnetic amplifier having an indication of the amount of delay encountered in the chain. FIGURE 4D shows the symbol 4–53 that may be used to represent a chain of magnetic amplifiers as shown in FIGURE 3A or chain of N complementers (where N= an even integer). The numeral within the symbol 4–53, FIGURE 4D, denotes the amount of delay in pulse periods encountered in a chain of four complementers.

Referring now to FIGURE 4C there is shown the symbol 4–83 for a chain of N complementers; where N is any odd integer. The numeral 1½ within the symbol 4–83 again indicates the delay in pulse periods encountered within the chain. In this particular case the symbol 4–83 represents the serial connection of complementers 4–80A to 4–80C. As pointed out previously, a low level input signal applied to complementer 4–80A will cause a high level output signal to be produced by complementer 4–80C one and one-half pulse periods later; and a high level input signal applied to complementer 4–80A will cause a low level output to be produced by complementer 4–80C one and one-half pulse periods later. Therefore, a chain of 3 or any other odd number of complementers performs according to the definition of any single complementer in that it produces a high level output signal after and in response to a low level input signal and vice-versa and may be represented by the symbol therefor which includes an indication of the delay encountered.

FIGURES 5A and 5B illustrate typical block diagrams wherein magnetic amplifiers and complementers are interconnected. In FIGURE 5A there is shown a chain of magnetic amplifiers 5–53, having a two and one-half pulse period delay (in other words the delay encountered in five magnetic amplifiers), connected to the input of a single complementer 5–80. An input signal applied to the cascaded magnetic amplifiers 5–53 will be developed as a complemented output on line 5–82, three pulse periods after it is applied. The two symbols 5–53 and 5–80 may be, therefore, combined and shown as symbol 5–86 which indicates that an input signal applied to line 5–86A will be complemented and appear on line 5–86B three pulse periods after its application.

In FIGURE 5B there are shown two complementers 5–80A and 5–80B connected to the input and output respectively of the chain of magnetic amplifiers 5–53. As indicated, element 5–53 has a two and one-half pulse period delay (five amplifiers) and each of the complementers 5–80A and 5–80B inherently have a one-half pulse period delay. Thus, an input applied at 5–81A will be complemented, delayed one-half pulse period, and then applied to element 5–53; the output of complementer 5–80A will be delayed two and one-half pulse periods by the chain of magnetic amplifiers 5–53 and then applied to the input of complementer 5–80B, which will complement and delay for one-half pulse period the output of element 5–53. It should be noted that an input signal applied at 5–81A will be complemented twice and delayed three and one-half pulse periods before it appears at line 5–81B. Consequently, the structure comprising elements 5–80A, 5–80B and 5–53 acts as a magnetic amplifier (shown at 5–56) having a delay of three and one-half pulse periods.

FIGURES 5A and 5B are merely illustrative of the general rule applicable to a cascaded arrangement of complementers and magnetic amplifiers which may be stated as follows:

A chain of magnetic amplifiers and complementers which contains an *even* number of complementers may be illustrated as a single magnetic amplifier having an appropriate indication as to the amount of delay encountered, and a chain which contains an *odd* number of complementers may be illustrated as a single complementer with an appropriate indication of the amount of delay encountered therein.

Referring now to FIGURE 6A, there is shown a gating and buffing structure GB that may be used throughout the entire computer to either perform a logical "AND" or a logical "OR" function. The gate-buffer (GB) may comprise a plurality of unilateral current conducting elements (e.g., diodes 6–91, 6–92 and 6–93) connected at their cathodes to a common output terminal point Z. Each of the anodes of diodes 6–91, 6–92 and 6–93 are connected respectively to signal input terminals W, X, and Y. The signals on these input terminals individually may vary discretely from some fixed low level potential L to some high level potential H. Terminal point Z is connected through a load, which may comprise the signal or input winding 6–90 on a core 6–96 of a magnetic amplifier or complementer. The other end of the winding 6–90 is connected through a resistor 6–94, to a source of low level potential L.

From the structure illustrated, it may be seen that in order for the terminal Z to be at the low level potential L, all the signals present on input terminals W, X, and Y must also be at low level potential L. Thus, as far as low level signal potentials are concerned, the structure GB acts as a coincidence or "AND" gate. When the structure GB is used in the block diagrams, hereinafter presented, as a coincidence gate for low level signals it is represented by a dot (.) in a half moon symbol as shown in G in FIGURE 6B. If the output of the gate G, FIGURE 6B, feeds a complementer 6–89, then a coincidence of low level signals at terminals W′, X′, Y′ will produce a high level output from complementer 6–89.

Further, it may also be stated if the signal potential at any of the input terminals W, X or Y (FIG. 6A) is at a high level potential, H then the output terminal Z also will be at a high level potential H. Therefore, as far as high level input signals are concerned the structure GB acts as an "OR" gate or buffer. When the structure GB is used in the block diagrams as a buffer for high level signals it may be represented by a plus (+) sign in a half moon symbol as shown at B in FIGURE 6C. Thus if the buffer B feeds an amplifier element 6–99, a high level input on any terminal W′, X′ or Y′ will produce a high level output from element 6–99.

FIGURE 6D illustrates a plurality of unilateral current conducting elements having a common input at H wherein their output lines E, F and G are isolated. FIGURE 6E illustrates the block diagram symbol for the structure shown in FIGURE 6D.

Figure 7A:
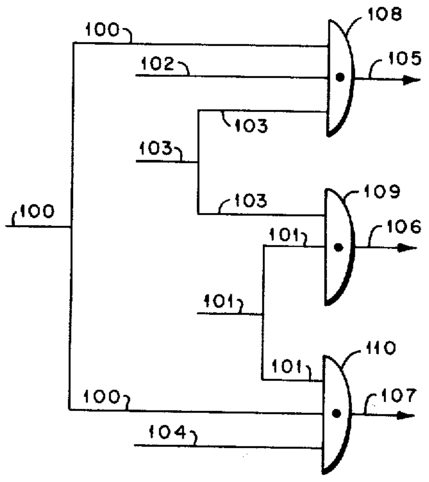
FIGS. 7A, 7B and 7C show different logical representations for gating and buffing structures used in this invention.
Figure 7B:
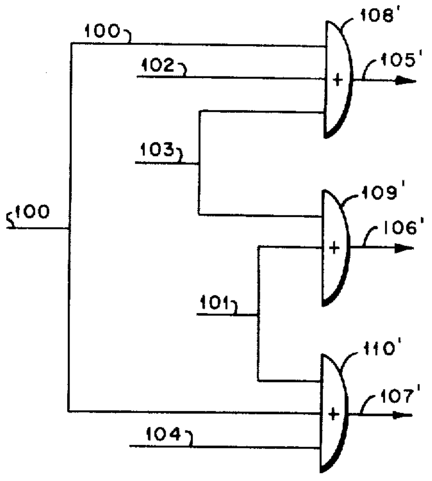

Referring now to FIGURES 7A and 7B, there are shown an array of gates 7–108, 7–109 and 7–110 and an array of buffers 7–108′, 7–109′, and 7–110′ for low level and high level signal inputs respectively. In the foregoing discussion on gates and buffers it will be appreciated that in order for the potential on any of the output lines 7–105, 7–106, 7–107 of the aforementioned gates to be at a low level, all the inputs to gates 7–108, 7–109 and 7–110 respectively (FIG. 7A), must be energized by low level signals and, in order for a high level output to appear on any of the output lines 7–105′, 7–106′, 7–107′, for the buffer array of FIG. 7B at least one of the inputs to buffers 7–108′, 7–109′ and 7–110′ respectively, must be at a high level. Further, it will be understood that the structure for FIGURES 7A and 7B may be identical, the inclusion of a dot (·) or a plus (+) merely being indicative of the normal function performed.

There are many instances throughout the discussion of this computer where it will be necessary to show or otherwise represent a large number of gating or buffing structures acting in concert. Accordingly, the representation shown in FIGURE 7C will be employed to illustrate a plurality of unidirectional current conduction elements acting together as a buffing array for high level signals or as a gating array for low level signals.

Figure 7C:
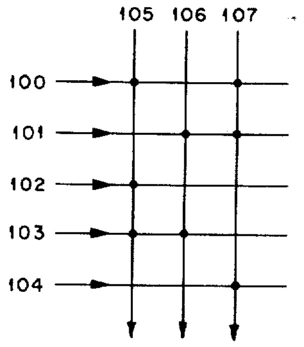

Viewing FIGURE 7C it can be seen that output line 7–105 contains three dots thereon which indicate three unilateral conducting elements connected to three input lines 7–100, 7–102 and 7–103. Thus the representation in FIGURE 7C comprising input lines 7–100, 7–102 and 7–103 and output line 7–105, including the dots thereon, designates the gating structure 7–108 in FIGURE 7A and the buffing structure 7–108′ in FIGURE 7B. Each of the other gates 7–109 and 7–110 and buffers 7–109′ and 7–110′ of FIGURES 7A and 7B respectively are represented in like manner in FIGURE 7C.

Functionally, the array shown in FIGURE 7C may be either employed as an encoding matrix for high level input signals or a decoding matrix for low level input signals. The term encoding matrix shall designate throughout this specification a circuit which has a plurality of input and output lines wherein the presence of a high level signal on one of the input lines will cause a high level output to be generated on one or more output lines: the term decoding matrix shall designate a circuit which has a plurality of input and output lines wherein the simultaneous presence of low level signals on a plurality of input lines will cause a low level signal to be generated on a selected one or ones of the output lines.

Figure 8A:
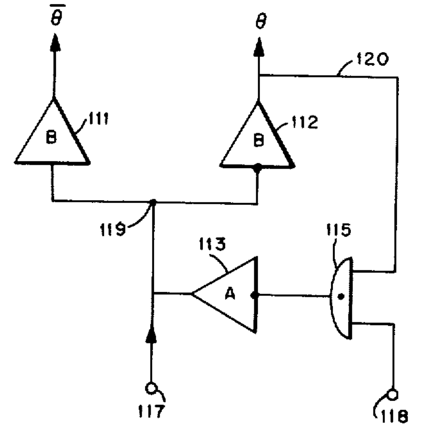
FIGS. 8A and 8B show in block diagram form different types of Flip-Flop circuits used in this invention.

Throughout the computer to be presently described there is a great need for bistable switching elements. FIGURE 8A is illustrative of a bistable network having two mutually exclusive states wherein in one state a first element in the network produces a series of low level output pulses while the second element produces a series of high level output pulses, and in a second state the first element produces a series of high level output pulses while the second element produces a series of low level output pulses. This bistable element shall hereinafter be referred to as a "flip-flop".

Referring to FIGURE 8A it can be seen that the flip-flop may comprise a phase "B" magnetic amplifier 8–111, which may be considered as the first element mentioned above, and a phase "B" complementer 8–112, which may be considered as the second element, connected together at their inputs via line 8–119. The output of complementer 8–112 is connected via line 8–120 to a first input of a gate 8–115 and the output of this gate may be in turn connected to line 8–119 through a phase "A" complementer 8–113. Input signals may be applied at the set terminal 8–117, which is also connected to line 8–119 and to the restore terminal 8–118, which is connected to the second input of gate 8–115.

In operation, magnetic amplifier 8–111 generates the restore or $\bar{\theta}$ output of this flip-flop whereas complementer 8–112 generates the set or $\theta$ output. When magnetic amplifier 8–111 is producing a series of low level output pulses while complementer 8–112 is producing a series of high level pulses the flip-flop is by convention restored or in its $\bar{\theta}$ state, and when complementer 8–112 is producing a series of low level outputs while magnetic amplifier 8–111 is producing a series of high level outputs the flip-flop is by convention set or in its $\theta$ state; where $\theta$ and $\bar{\theta}$ are the names given the signals generated by this flip-flop.

Figure 8B:
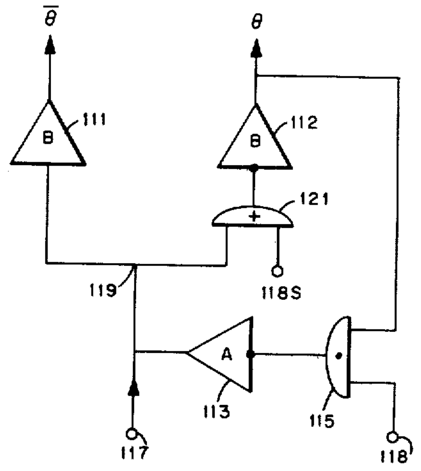
Figure 8C:
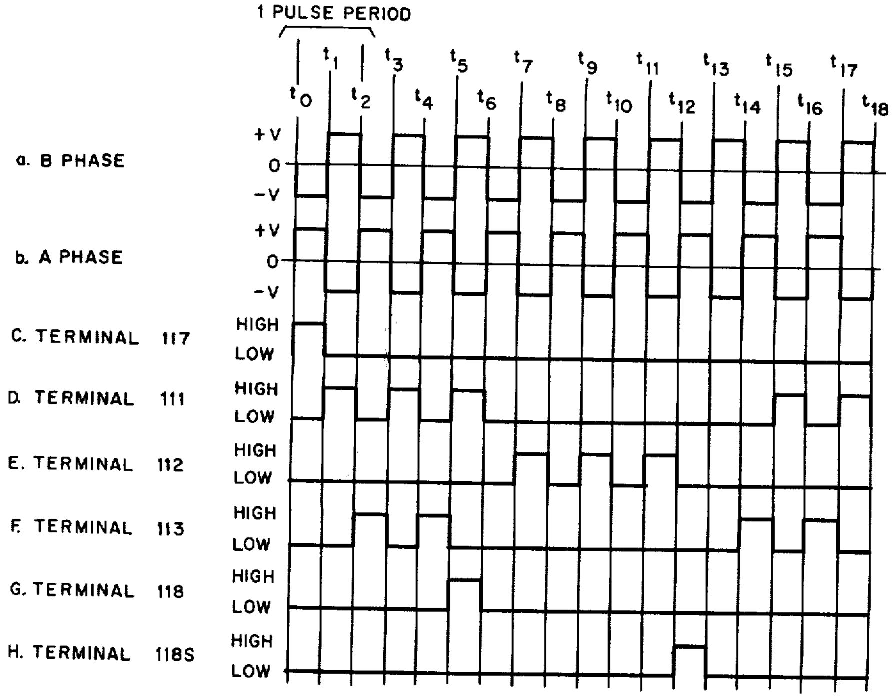
FIG. 8C shows a series of waveforms useful in understanding the circuits of FIGS. 8A and 8B.

The flip-flop shown on FIGURE 8A will now be briefly described in conjunction with the waveforms shown at FIGURE 8C so that its operation may be understood when the flip-flop is employed in conjunction with the more complex diagrams of the computer.

Presuming now that terminals 8–117 and 8–118 are normally held at a lower level potential or suitably isolated from the rest of the flip-flop and a high level signal input (waveform *c* of FIGURE 8C) is selectively applied at terminal 8–117 in the period *t*0 to *t*1 (that is during the negative-going portion of the B phase power pulses associated with magnetic amplifier 8–111 and complementer 8–112), the magnetic amplifier 8–111 will produce a high level output as shown by waveform *d* and complementer 8–112 will produce a low level output (waveform *e*) during the time period *t*1 to *t*2. This low level output from complementer 8–112 will be transmitted through gate 8–115 causing complementer 8–113 to generate a high level output during the time period *t*2 to *t*3 (waveform *f*) when again the power pulses associated with elements 8–111 and 8–112 are negative-going. The high level output from complementer 8–113 will, of course, cause magnetic amplifier 8–111 to continue to generate a high level output (waveform *d*) and complementer 8–112 to continue to generate a low level output (waveform *e*) when the power pulses associated with these elements are positive-going. The generating of high level output pulses by magnetic amplifier 8–111 and low level output pulses by complementer 8–112 in synchronism with the positive pulse portion of the B phase power pulses applied thereto will continue until a positive restore pulse applied at 8–118 causes the flip-flop to change state. By convention when the flip-flop is in this first state it is set to its $\theta$ state.

If now a high level pulse (waveform *g*) is applied to terminal 8–118 during time interval *t*5 to *t*6 then the flip-flop will be caused to change state. This is accomplished in the following manner: The high level restore pulse applied to gate 8–115 via terminal 8–118 causes the gate to produce a high level output pulse which is applied to complementer 8–113. Complementer 8–113 will then produce a low level output during time interval *t*6 to *t*7 (that is when the power pulses applied to elements 8–111 and 8–112 are negative-going). The low level output from complementer 8–113 causes magnetic amplifier 8–111 to produce a low level output during the period *t*7 to *t*8 and complementer 8–112 to produce a high level output during the same time interval. The high level output from complementer 8–112 is fed back to gate 8–115 which transmits a high level pulse to complementer 8–113, which in turn produces a low level signal to thereby sustain the high level outputs from complementer 8–112 and the low level output from amplifier 8–111. This is the $\bar{\theta}$ state of flip-flop.

Either output from the flip-flop may be considered the barred or unbarred output. Generally, throughout the description of this computer, the convention has been adopted that the signal present from a flip-flop is generated by the magnetic amplifier or complementer which is producing low level outputs. However, at times a high level output from a flip-flop is employed and when this is the case the output signal is distinguished by having a "+" or "A" affixed to its label.

Referring now to FIGURE 8B, in conjunction with the waveforms of FIGURE 8C, there is shown a modified version of the flip-flop in FIGURE 8A previously described. Like elements of the two figures bear like reference characters. Input pulses applied at terminals 8–117 and 8–118 will cause the flip-flop to react in the same manner as just described.

The difference in the two diagrams resides in the addition of a second restore terminal 8–118*s* connected through a buffer 8–121 to the input of complementer 8–112.

Presuming now that the flip-flop shown in FIGURE 8B is restored, i.e. magnetic amplifier 8–111 is producing low level output pulses, complementer 112 is producing high level output pulses and that a high level input pulse is applied to buffer 8–121 via terminal 8–118*s* during the time interval *t*12 to *t*13 (FIGURE 8C) then the flip-flop will change state in the following manner: Buffer 8–121 will transmit a high level signal to the input of complementer 8–112 during the time interval *t*12 to *t*13. It should be noted at this interval of time, complementer 8–113 is producing a low level output, which is being fed to the input of magnetic amplifier 8–111. Therefore, during time interval *t*13 to *t*14 both elements, 8–111 and 8–112 will generate low level output pulses. The low level output pulse from complementer 8–112 will be fed back to complementer 8–113 via gate 8–115 causing this complementer to generate a high level output pulse which is applied to magnetic amplifier 8–111 and complementer 8–112 during time interval *t*14 to *t*15. Thereafter, the flip-flop will continuously produce low level output pulses from complementer 8–112 and high level output pulses from magnetic amplifier 8–111 as indicated in FIGURE 8C. The flip-flop of FIGURE 8B may be restored in the same manner as previously described in connection with the flip-flop illustrated in FIGURE 8A. The essential difference in the effect of the flip-flops in FIGURES 8A and 8B respectively resides in the fact that for a selected one-half pulse period, the outputs of complementer 8–112 and magnetic amplifier 8–111 are at the same output levels.

In order to follow the operation of the computer described, herein, it is essential to understand the method of notation employed for representing numeric quantities. As previously pointed out a series-parallel system is employed for transmitting and operating upon the signal pulses representing numeric information. For non-ambiguous representation it is essential that each parallel group of signal pulses comprising a digit be uniquely identified. The preferred form of this invention utilizes a four pulse or bit position code to represent a digit wherein the pulses constituting a digit all appear simultaneously and are operated upon and transferred in parallel.

In Chart I presented below, there are shown the several pulse combinations which represent the numerical characters used in this machine. It should be noted that a "1" indicates the presence of a pulse of a first level and a "0" represents a pulse of a second level.

CHART I

| Decimal Values | Binary Portion (Bit Position) | Quinary Portion (Bit Position) |
|---|---|---|
| | 4 | 3 2 1 |
| 0 | 0 | 0 0 0 |
| 1 | 0 | 0 0 1 |
| 2 | 0 | 0 1 0 |
| 3 | 0 | 0 1 1 |
| 4 | 0 | 1 0 0 |
| 5 | 1 | 0 0 0 |
| 6 | 1 | 0 0 1 |
| 7 | 1 | 0 1 0 |
| 8 | 1 | 0 1 1 |
| 9 | 1 | 1 0 0 |

As can be observed from Chart I, the first three bit positions of the digit have been labeled the "quinary portion" and the fourth bit position has been labeled "binary portion" of the digit. In the digits 0 to 4, the presentation of the bits in the quinary portion follows the laws of binary mathematics. The same pattern of bits is repeated in the quinary portions of the digits 5 to 9. Thus, the only distinction between the set of digits 0–4 and 5–9 rests in the presence or absence of a "1" in the binary portion, or fourth bit position, of the digit. Considering the fact that all the pulses comprising a digit appear simultaneously, an examination of the Chart I will show that the value of a digit depends on the positional distribution of the "1" and "0" bits comprising the digit.

The denominational value of a particular digit is measured against a temporal standard, that is, denominational significance is attached to the time a particular group of four bits appears with reference to a standard set of cyclic clock pulses. For the purpose of setting the temporal position of a digit with respect to the clock pulses, time is broken down into a plurality of discrete intervals. The first of these intervals is the "pulse period" or digit time allowed for the appearance of the four time parallel bits comprising digit. The next interval is the "computer word period" or "minor cycle" which is the amount of time allotted for the transfer of a group of digits, hereinafter designated as a word, constituting the smallest element of information stored in the computer as a unit. The word time has been conveniently chosen to be twelve pulse periods or digit times long.

In its preferred form the computer described herein has a basic pulse repetition rate of 660 kilocycles per second; thus, the pulse period is equal to approximately 1.5 microseconds and the word time is equal to approximately 12 times 1.5 microseconds or 18 microseconds. Thus the A and B phase clock pulses previously described and shown have repetition rates of 660 kilocycles per second. It may be appreciated that by representing a digit through the use of a group of four simultaneous bits and by representing a computer word as a time series of digits, the effective bit repetition rate is a factor of four greater than if the word were entirely built up of bits in seriatim.

Figure 9A:
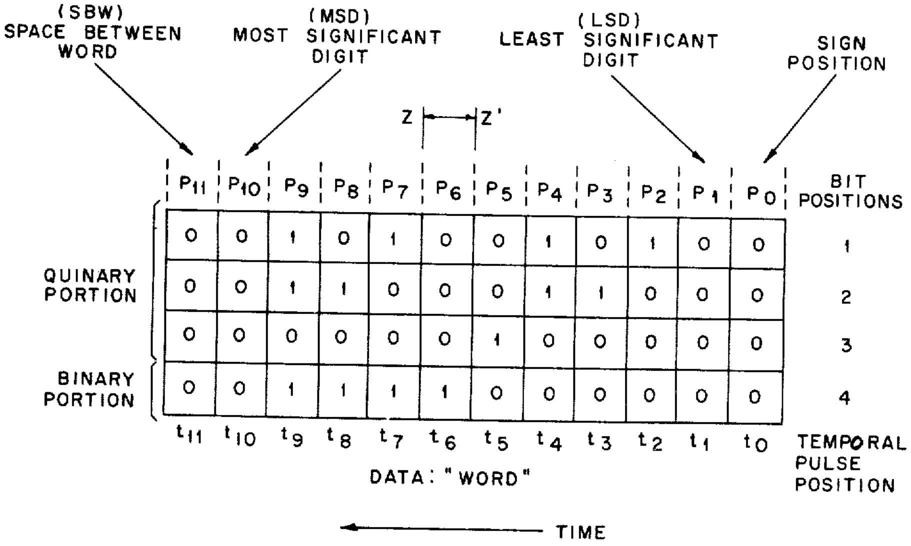
FIGS. 9A and 9B show in a general manner the serial-parallel composition of a data and an instruction word respectively used in the present invention.

The information contained in a computer word may either represent data to be manipulated, or represent an instruction to be executed by the computer. Referring now to FIGURE 9A which illustrates the data word, it can be seen that various names have been given to different digits according to their time position in relation to the other digits in the word. Throughout the specification it will be considered that each data word comprises 12 pulse periods starting from pulse period 0(P0) to pulse period 11(P11), wherein four bits in parallel occupy one pulse period and each parallel bit is transmitted via its own translating circuit. Each of the bits comprising a digit has a value which depends upon its position. The bits that occupy the first position are the least significant in the quinary portion of a digit; the bits that occupy the third position are the most significant of the quinary portion, and the bits which occupy the fourth position comprise the binary portion of the digit (see Chart I).

It will be apparent from an examination of FIGURE 9A that all the pulse periods comprising a word do not convey (numeric) information, for example the bits comprising the P11 pulse period are all "0" and constitute what is known as the "space between words" (abbreviated as "SBW"). The "SBW" is introduced to permit sufficient time for the switching of various circuits required to channel information, throughout the machine.

The pulse periods, P1 to P10 inclusive (ten decimal digits) are used for the representation of absolute numerical values, wherein the pulse periods P1 and P10 have been allocated for the signals representing the least significant digit (LSD) and the most significant digit (MSD) respectively of a numerical value. Thus, the computer is capable of manipulating numbers over the range of $|0 \text{ to } 10^{-10}|$. It will be noted from the sign of the exponent that the computer treats all numbers as quantities less than one. This avoids certain difficulties in mechanizing arithmetic operations. However, it will be obvious to those skilled in the computer art that it is entirely possible to program the computer so that problems involving numbers greater than one may be solved by employing the so-called "floating decimal point technique." Finally, the pulse period labeled P0 has been reserved for accommodating the signal pulses or bits representative of the sign of the (numeric) information in the rest of the word. In this connection it should be noted that the sign of a data word is established by the character of the bit in the first or least significant bit position (LSB) of the P0 pulse period. If a "0" bit is present in this bit position of P0, the sign of the word is considered positive. If a "1" bit appears in this bit position of P0 the sign of the word is considered negative.

As mentioned previously the denominational value of a digit is measured against the series of cyclic clock pulses, which range from ***t*0 to *t*11, one pulse period corresponding to one clock pulse interval. The digit appearing at *t*10 (i.e. the MSD) may be considered as being in the tenth's denomination and the digit P1 (i.e. the LSD) may be considered as being in the 10 billionth denomination, with the digits intervening lying between these two orders in decimal steps. If the data word of FIGURE 9A were to be examined starting when P0 appears at *t*0**, a comparison of FIGURE 9A and Chart I will show that the number represented by the "1" and "0" bits of the data word illustrated is equal to +.0876543210.

It is entirely conceivable and practical that the data word will be examined at a time when P0 does not appear at ***t*0, for example when P0 appears at *t*1 (abbreviated *P*0=*t*1). If the word shown in FIGURE 9A were examined beginning at P0=*t*1** the value represented by the digit therein would be equal to +.8765432100.

Figure 9B:
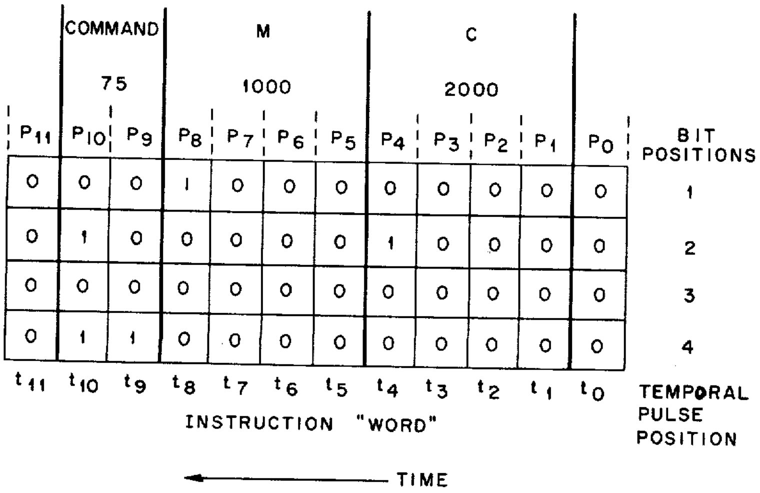

Referring now to FIGURE 9B there is shown an instruction word which occupies 12 pulse periods, from P0 to P11. Pulse period P11 is reserved for the SBW and pulse period P0 is not used, as an instruction word need not be logically signed. Therefore, in an instruction word, the pulses comprising the sign digit, P0, and the SBW are always at a level which represents 0's.

The two digits in pulse periods P9 and P10 are designated as the command portion at the instruction word while the four digits in pulse periods P5 to P8 and the four digits in the pulse periods P1 to P4 are designated respectively as the "*m*" and "*c*" address portions. The two digits in the command portion of the instruction word designate the operation (e.g. subtraction) to be performed. The "*m*" portion of the instruction word generally specifies the address in the memory of an operand although as shall be seen the "*m*" portion may specify the address of an instruction. It should be noted at this point that all commands do not require the use of the memory and if such be the case the four digits in pulse positions P5 to P8 are not used to specify an address of an operand. The "*c*" portion of the instruction word specfies the memory location of the next instruction word to be used by the computer.

GENERAL FUNCTIONAL DESCRIPTION—FIGURES 10A, 10B AND 10C

Referring now to FIGURES 10A, 10B and 10C, arranged as shown in FIGURE 10, there is illustrated the overall block diagram which shows the interconnections of the various computational and control elements of the machine to be described. In all cases the reference numeral assigned to each of the elements 11 through 35 corresponds to the figure number of the detailed drawing illustrating the element. For example, the block designated Comparator 17 (FIGURE 10A) is shown in detail on FIGURE 17.

In the computer there is provided a Drum Memory Unit 35A which serves to store all the data and instruction words necessary for computer operation. In addition, the Drum Memory Unit has recorded thereon, information which indicates to some extent the address of information (data or instruction words) available from the memory at any given instant. Further the Memory Unit serves as the synchronizing source for the various power pulses which are necessary to drive the magnetic amplifiers and complementers of this computer.

In particular, the Memory Unit 35A (FIGURE 10C) comprises a Rotating Magnetic Drum the surface of which is divided into a plurality of circumferential recording-reproducing bands, wherein each band comprises four parallel tracks. As with the other elements on FIGURE 10 the Rotating Magnetic Drum shall be described in more detail later. Suffice it to say for the present that the drum contains 25 information bands, each of which stores 200 data and instruction words. In addition, the drum comprises a Memory Band, designated as the Time Selection Band, which provides, inter alia, information as to the word or sequence number of the words stored in each of the bands; and one track designated as the Sprocket Track which is a synchronizing source for the power pulses for all the magnetic elements of the machine.

It will be noted that since each of the 25 information bands store 200 computer words, 25 information bands will store a total of 5000 computer words. Of the 25 information bands 20 are designated Slow Memory (SM) bands and 5 are designated Fast Memory (FM) bands. As shall be explained later the information on the 5 FM Bands is more accessible than the information contained on the 20 SM bands.

The Sprocket Track, shown for convenience at the right hand end of the Drum, has permanently recorded thereon a train of magnetic spots which are sensed by an electro-magnetic transducer 3. As each magnetic spot on the Sprocket Track passes under the transducer 3 a voltage is induced in said transducer which is transmitted via cable 100A to the power pulse clock generator PP.

The Power Pulse Clock Generator PP is the only element on FIGURE 10 which will not be described in detail. However, element PP may be a conventional phase splitter type circuit so constructed that in response to a single train of impulses two trains of output pulses are produced therefrom which are 180° out of phase. One train of output pulses from the Power Pulse Clock Generator, designated A phase, serves as the power pulses for all the A phase of amplifiers and complementers for this computer while the other train of output pulses designated B phase serves as the power pulses for all the B phase amplifiers and complementers.

As stated the Time Selection Band yields a signal which identifies the sequence number (0–199) of the information word that is presently available from each of the 25 information bands on the Drum. In addition the central timing apparatus or as it is later designated the Cycling Unit 34 is selectively controlled by a timing signal pre-recorded on the Time Selection Band. Associated with this band is a bank of four electro-magnetic transducers 4 for detecting magnetic spots indicative of information on the four tracks which constitute the Time Selection Band. The information from the aforementioned band is detected by said bank of transducers 4 and transmitted thereby to the Timing and Read Circuit 32A. The Timing Read Circuit 32A generates in response to the information on the Time Selection Band a plurality of outputs designated generally as TS and $\overline{TS}$ signals, wherein these TS and $\overline{TS}$ signals are indicative of the sequence number of the information words presently available from the Memory. More particularly, these TS and $\overline{TS}$ outputs which indicate the sequence number of the information bands are transmitted via cable 101 to the input of the Minuend Buffers 20 (FIGURE 10A) the Minuend Buffers act as one of the information distribution centers of the machine. The prerecorded timing signal also contained on the Timing Band, on the other hand is transmitted via cables 101 and 101A to the Cycling Unit 34 and via cables 101, 101A and 101B to the Cycling Unit error circuit.

The Cycling Unit 34 is activated once each word time by the timing signal obtained from the Timing Read Circuit 32A to generate a group of timing pulses, wherein the timing pulses comprising the group are produced in seriatim. These timing pulses, or "*t*" pulses, are transmitted to the various elements of the computer and act as a timing standard against which the value of a computer word may be measured. In addition the timing pulses obtained from the Cycling Unit 34 perform numerous other functions which may be repetitive in nature.

It will be observed that the output of the Cycling Unit 34 is fed via cable 107B to the Every Other Word circuit 33A which in turn produces an enabling signal, once for each two word times, and this signal is fed via cable 107A to the Start Circuit 32C. When the start bar, associated with the Start Circuit 32C is closed, the Start Circuit will generate, after being enabled by the Every Other Word circuit, a signal which will be fed to the Stop Circuit 32B, to inhibit the SP signal and permit computer operation. The SP signal effects various elements in the computer, and in particular it causes the Instruction Decoder 26 (FIGURE 10B) to be partially inoperative, a condition which stops the computer from carrying out further instructions.

The Cycling Unit Error circuit 33B, which also receives the timing signal from the Timing Read Circuit 32A, causes the Stop Circuit 32B to produce SP signals if a timing error is detected in the output of the Time Selection Band. In particular an error will be noted if the pre-recorded timing signals which drive the Cycling Unit 34 are generated at an improper time.

As previously mentioned the Timing Read Circuit 32A is connected to the input of the Minuend Buffers 20, and the Minuend Buffers will transmit the word sequence number derived from the Time Selection Band by the Timing Read Circuit 32A to the Comparator 17 via cables 102, 102A and 102F. In a manner to be described hereinafter the Comparator 17 also receives from the C Register 13 information relative to the particular computer word desired from the Rotating Drum Memory shown at 35A. When comparison is found between a portion of the information from the C Register and the word sequence number emanating from the Time Selection Band the Comparator will condition via cable 104, the Time Selection Flip-Flop (TSFF) 12B. Further, selected outputs of the Comparator 17 will be transmitted over cable 106 to the input of the Band and Head Selection Circuit 28. The output of the TSFF 12B also conditions the Band and Head Selection Circuit 28 via cable 105 and the Static Register 25 via vables 105 and 105A. In response to the output of the Time Selection Flip-Flop 12B the Static Register 25 produces a signal indicating the search for a particular memory location on the Rotating Drum is at an end and that information may be written at the particular memory location thereof or that information may be read from that particular memory location.

It will be observed that the Band and Head Selection circuit 28 also receives inputs from the Minuend Buffers 20 via cables 102 and 102A; the Subtrahend Buffers 19 via cables 103 and 103A, the C register via cable 108 and the Control Transfer Flip-Flop (CTFF 12A) via cable 109. The Minuend Buffers convey information from the Time Selection Band relative to the word presently available from the Drum, the Subtrahend Buffers convey either the "*m*" or "*c*" portion of the instruction word stored in the C Register, and the CT Flip-Flop 12A determines whether the "*c*" or "*m*" portion of the instruction word stored in the C register 13 will identify the particular portion of the memory to be used. The Band and Head Selection circuit in turn controls the head switches 29, and these two units 28 and 29 are the apparatus that determine which of the numerous electromagnetic transducers (Read-Write Heads 30), associated with the Memory at 35A, will be selected for reading or writing information on the Rotating Drum.

In order to facilitate the explanation of the block diagram (FIGURE 10) a representative group of computer operations will be generally described and it will be assumed that the Rotating Drum Memory at 35A has stored in the 25 Memory Bands all the data and instructions necessary for the operation of the computer.

Information may be recorded on the Memory Bands of Drum 35A or recovered therefrom by the apparatus shown at block 30, designated Read-Write Heads. As shall later be described the Read-Write Heads 30 include banks of electromagnetic transducers (Read-Write Heads) suitable for causing magnetic spots to be deposited on the surface of the Drum or for detecting the presence of magnetic spots on said surface. A separate bank of four Read-Write Heads (hereinafter called a head assembly) is associated with each of the 20 Slow Memory information bands and four separate head assemblies are associated with each of the 5 Fast Memory FM Bands. Thus for the purpose of illustration, head assembly 5 of the Read-Write Heads 30 is shown associated with one Slow Memory Band and Read-Write Head assemblies 6 through 9 are associated with one of the Fast Memory Bands.

Assume that a selected instruction word is read out of the Rotating Drum Memory via the Read-Write Heads 30, Read Circuit 31 and cable 100 to the Minuend Buffer 20. The Minuend Buffers are selectively connected at their outputs via cables 102, 102A, etc. to a majority of the computational and control elements of this machine. Thus a selected word, in this case an instruction word, may be routed to any desired computational or control element.

As previously indicated the instruction word comprises three parts, a command portion, an "*m*" address portion, and a "*c*" address portion; wherein the command portion indicates the operation of the performed, the "*m*" portion indicates the location in the memory of a possible operand, and the "*c*" portion indicates the location in the memory of the next instruction. The entire instruction word is transferred from the Minuend Buffers 20 via cables 102, 102A and 102G to the C Register. This last named register will store one computer word and is used for the storing of the instruction word that the computer is presently operating upon.

The command portion of the instruction word is simultaneously transferred from the Minuend Buffers 20 via cables 102 and 102A to the Static Register 25 where it is staticized as a control signal for the computer operation to be performed. The output of the Static Register 25 is transmitted via cable 107 to the Instruction Decoder 26 and the output of the Instruction Decoder 26 is transmitted to the input of the Control Encoder 27. These three last named units 25, 26 and 27 comprise the major control elements of this computer and they produce the operating signals which direct the flow of data throughout the computer and condition the various computational and control elements.

If the instruction involves the use of the memory (e.g. an operand from the memory is required), the Static Register 25 will condition via cable 112 the CTFF 12A, which will produce signals that are transmitted via cable 109 to the C Register 13 and Band Selection Circuits 28. These signals will allow the "*m*" portion of the instruction word now stored in the C Register to be transmitted out of the C Register 13 to the Band Selection Circuit 28 and to the Subtrahend Buffer 19. Subtrahend Buffers 19 act as the distribution center for the output of C Register 13 and the A Register 15, which is another one word register. The Subtrahend Buffers 19 transmit the "*m*" portion of the instruction word stored in the C Register 15 to the input of the Comparator 17 via cables 103 and 103B. The Comparator will also be receiving at this time the word sequence number from the Time Selection Band via the Timing Read Circuits 32A, via the Minuend Buffers 20 and the cables previously outlined. When agreement is found between the word number from the Time Selection Band and the word number called for by the "*m*" portion of the instruction word, the Comparator 17 will condition, via cable 104 the TSFF 12B which produces a signal allowing the Band and Head Selection Circuits 28 and the Head Switches 29 to select a particular head assembly in the Read-Write Heads 30. A selected head assembly (e.g. 5) will then transmit the output of a given address of the Rotating Drum Memory which contains one word to the Minuend Buffer 20 via Read Circuits 31 and cable 100.

The instruction stored in the Static Register 25 causes the Instruction Decoder 26 and the Control Encoder 27 to produce signals which route the information from the Read-Write Circuits 31 as it appears at the output of the Minuend Buffer to the proper computational element. For example, if a memory transfer instruction (transfer a selected word from the Memory at 35A to a particular register) is stored in the Static Register, the Instruction Decoder 26 and the Control Encoder 27 will produce signals which will allow the information at the output of the Minuend Buffer 20 to pass into a selected register.

There are four registers which may receive and store one information word from the Memory via the Minuend Buffers 20. These registers are shown as the C register 13(*r*C), the L Register 14(*r*L), the A Register 15(*r*A), and the X Register 16(*r*X). The input to all these registers are connected to the output of the Minuend Buffers 20 via cables 102G, 102E, 102N and 102C respectively. As previously mentioned the C Register 13 only receives and stores instruction words, whereas Registers 14 to 16 may receive and store any information word. Registers 14 to 16 have associated therewith Sign Storage Elements 11C, 11B and 11A respectively. These aforementioned elements are connected to the output of the Minuend Buffers 20 via cables 102H, 102K and 102M respectively and are conditioned to receive an input by the Control Encoder 27. When a selected register (e.g. L Register 14) is to receive a data word from the memory at 35A, the sign storage element associated therewith (e.g. 11C) is alerted by the Control Encoder 27 to receive and store the sign of the data being transferred from the Memory.

If instead of a transfer instruction an Add or Subtract instruction is set up in the Static Register then additional computational and control elements will be employed. One of the operands to be operated upon will be selected from the memory as determined by the "*m*" portion of the instruction word in the C Register and the other operand will be presumed to be stored already in the A Register 15. Therefore, an Add or Subtract order will cause a selected word from the Memory to be detected by Read Heads 30 and be transmitted by Read Circuits 31 to the Minuend Buffers 20 so that this selected data word may be algebraically manipulated with the contents of the A Register 15. Once the operand from the Memory is detected, it is directed by the Control Encoder 27 out of the Minuend Buffers 20 to the input of the Adder 18 via cable 102 and to the input of the Comparator 17 via cables 102, 102A and 102F. Moreover, the sign digit of the data word from the Memory is routed from the Minuend Buffers to the input of the Complement Flip-Flop 21 via cables 102, 102A and 102D. Further and still under the direction of the Control Encoder 27 the contents of the A Register 15 will be transmitted via cable 108 to the input of Sub Buffers 19 and thence via cable 103 to a second set of inputs of the Comparator 17 and the Adder 18. The effect of the information from the A Register 15 and the Memory on the Comparator 17 will be noted by signals on cable 111 which will be transmitted to another input of the Adder 18. Furthermore the sign of the information in the A Register which is stored in element 11B, is allowed to condition via cable 110, another input of Complement Flip-Flop 21. Thus the operand selected from the Memory and the operand from the A Register 15 are both caused to be transferred to the Comparator 17 and the Adder 18, and the signs of these two operands are transferred to the Complement Flip-Flop which in accordance with the sign information of the two operands will effect Comparator operation via cables 113, 113A and 113B.

The Static Register 25 which is storing the Subtract or Add instruction, will also condition the Complement Flip-Flop 21. This Flip-Flop as previously mentioned, effects the operation of both the Adder 18 and the Comparator 17. If Subtraction or Addition is to take place the instruction in the Static Register 25 together with the sign information from the Sign of *r*A 11B and the sign information of the operand from the Memory will cause the Complement Flip-Flop 21 to condition the Adder 18 and the Comparator 17 accordingly, that is to either produce the sum or difference of two operands. The result of the Add or Subtract operation which is performed by the Comparator 17 and the Adder 18 will appear at the output of the Adder 18 and is transferred via cable 114 to the A Register 15.

One other element, the Overflow Circuit 22, is employed during the Add or Subtract instruction. The overflow Circuit 22 is at least controlled by the Complement Flip-Flop 21 via cable 113 and the Comparator 17 via cables 111 and 111A. Functionally the Overflow Circuit 22 is used in Addition or Subtraction to detect a condition wherein the result of the operation exceeds one computer word, that is the capacity of the A Register 15.

By way of summarizing the function of some of the components used during the Addition or Subtraction process the following chart is presented.

| Component | Function |
|---|---|
| Memory 35A | To supply one operand. |
| A Register | To supply another operand and receive and store the result of the operation. |
| Static Register 25 / Instruction Decoder 26 / Control Encoder 27 | To produce the various control signals needed to execute the instruction stored in the Static Register. |
| Complement Flip-Flop | To accept the sign information of the two operands and in accordance with the instruction set up in the Static Register 25 to control the Adder 18 and Comparator 17. |
| Sign of *r*A 11B | To supply sign data to the CPFF 21 and to accept the sign of the result of the Add or Subtract operation. |
| Adder 18 and Comparator 17 | Accept operands from the A Register and the memory and compute result. |
| Overflow 22 | To produce indication that the result of the Add or Subtract operation exceeds capacity of A Register. |

If the instruction set up in the Static Register 25 is a Multiplication or Division order, additional control elements will be employed. These elements are shown on FIGURE 10B and comprise the Multiplier Quotient Counter (MQC) 23, the OR Flip-Flop 24A, the IER Flip-Flop 24C and the IER–OR circuit 24B. The Multiplication and Division operation are essentially iterative Addition or Subtraction routines respectively, and the IER and OR Flip-Flops 24A and 24C and the IER–OR circuit 24B determine when the iterative Subtraction or Addition routines take place. The IER and OR Flip-Flops 24A and 24C control via cables 115 and 116, respectively the Instruction Decoder 26 and the Control Encoder 27, so that these units produce signals which allow iterative addition or subtraction to take place. As in the Add or Subtract instructions the Adder 18 and the Comparator 17 are used to compute sums or differences.

The Multiplier Quotient Counter (MQC) 23 functions in both the Multiplication and Division instruction; in Multiplication the MQC determines the number of iterative addition steps which may be necessary, and in Division the MQC 23 yields an indication of the partial quotient.

In order to illustrate the interconnections and use of these additional elements (e.g. 23) a Multiplication instruction will be discussed generally. In the execution of this order one of the operands, the Multiplicand, is assumed to be already stored in the L Register 14, the other operand, the Multiplier, must be derived from the Memory 35A and read into the X Register 16. As previously indicated the "*m*" portion of the instruction word which is stored in the C Register 13 will determine in conjunction with the information derived from the Time Selection Band when a particular Read-Write Head in the block 30 will detect the desired data word from the Drum 35A. When the proper Memory location is found on the Rotating Drum of 35A a data word will be transferred from either the Slow or Fast Memory Bands to the Minuend Buffers 20 and thence under the control of elements 25 to 27 to the X Register 16. After the transfer is made the least significant digit of the data stored in the X Register is transferred via cable 117 to the Multiplier Quotient Counter (MQC) 23. The contents (Multiplicand) of the L Register 14 will be transferred via cable 118 to the Minuend Buffers and thence to the input of the Adder 18 and the Comparator 17 via cables 102, 102A, and 102F. At the same time the contents of the A Register 15 will be transferred to the Comparator 17 and Adder 18 via cable 108, Subtrahend Buffers 19 and cable 103, so that the sum produced by the adder will be stored in the A Register via cable 114. On the first summation the contents of the L Register will be added to zero as the A Register is cleared prior to a Multiplication operation. However, the contents of the L Register are added to the contents of the A Register N times, where N is the digit stored in the Multiplier Quotient Counter (MQC) 23. For example, if the least significant digit stored in the X Register transferred to the MQC 23 is a 5, then at the end of the first Multiplication cycle the quantity 5L will be stored in the A Register. The Multiplier Quotient Counter 23 will indicate when the addition cycle is over by generating a signal that is transmitted via cable 119 to the IER Flip-Flop 24C which in turn will produce an output signal. The output of the IER Flip-Flop 24C is transmitted via cable 115 to the input of the Instruction Decoder 26 and the Control Encoder 27 which in response thereto produces control voltages necessary to allow the shift phase of Multiplication to commence. At this time the IER Flip-Flop 24C conditions the IER–OR circuit 24B to produce a signal which prepares the Multiplier Quotient Counter 23 to receive the next digit of the Multiplier from the X Register. In the shift cycle of Multiplication the contents of the A Register 15 and the contents of the X Register 16 are both shifted one denominational digit to the right. Further, the least significant digit (LSD) of the data stored in the X Register (Multiplier) is transferred to the MQC 23, and the least significant digit of the information in the A Register is transferred to the X Register via cable 108A. Thereafter a new Addition cycle will take place as previously indicated. The add and shift cycles continue alternately until the Multiplication is completed and at that time the most significant portion of the product will be stored in the A Register 15 and the least significant portion of the product will be stored in the X Register 16.

When an instruction is set up in the Static Register that does not require the use of the "*m*" portion of the instruction, the Static Register 25 will produce conditioning signals which allow the "*c*" portion of the instruction word stored in C Register 13 to be compared with the information from the Time Selection Band after the instruction stored in the Static Register 25 has been completed. Accordingly a search for an operand in the Memory will not take place. Such an instruction not involving the Memory may typically require that the contents of the A Register 15 be transferred to the L Register 14. In a register to register transfer the instruction word in the Static Register 25 will cause the Instruction Decoder 26 and Control Encoder 27 to produce control voltages which will allow the contents of the A Register 15 to be transferred via cable 108, Subtrahend Buffer 19, cable 103 and cable 103C to the input of the L Register 14. Furthermore, the sign of the contents of the A Register which is stored in element 11B will be transferred to element 11C which stores the sign of the contents of the L Register 14.

After any of the above instructions are fully performed the Static Register will be cleared to thereby cause the Instruction Decoder 26 and Control Encoder 27 to produce signals which will allow a new instruction to be removed from the Memory at 35A. The address of the next instruction to be performed is determined generally by the "*c*" portion of the instruction word presently in the C Register 13. The "*c*" Address is compared with the sequence number from the Time Selection Band and when coincidence is found a Read-Write Head from the group 30 will be selected by the Head and Band Selection Circuit 28 and the Head Switches 29. A new instruction will be read out of the Memory and again stored in the C Register 13 and in the Static Register 25, so that a new cycle of operation will commence.

The operation of this computer is cyclic and for convenience the following outline is presented to illustrate this feature:

(1) A new instruction is extracted from the Memory at 35A as determined by a portion (generally the "*c*" portion) of the instruction word presently in the C Register 13.

(2) The entire new instruction is transferred from the Memory and stored in the C Register.

(2*a*) The command portion of the instruction word (P9 and P10) is transferred and stored in the Static Register 25.

(3) If the instruction in the Static Register 25 involves the use of a word stored in the Memory at 35A (e.g. transfer a particular word from the Memory to the L Register 14) then the Static Register will condition the Instruction Decoder 26 and the Control Encoder 27 to produce control voltages which will initiate a search for the "*m*" portion of the instruction word in the C Register 13.

(3*a*) If the instruction in the Static Register does not involve the use of a word stored in the Memory (e.g. transfer a word presently in the A Register 15 to the L Register 14) then the Static Register 25 will not condition the Instruction Decoder 26 and a Control Encoder 27 to produce voltages which will initiate a search for a Memory word.

(4) After the search for the particular word in the Memory is completed, the instruction is executed.

(4*a*) In the case where the Memory is not involved the instruction is executed immediately.

(5) After the instruction is executed the Static Register is cleared and the Instruction Decoder 26 and Control Encoder 27 are conditioned to allow a portion (usually the "*c*" portion) of the instruction word in the C Register 13 to determine the next new instruction word to be used from the Memory.

(6) The new instruction is extracted from the Memory and the cycle of operation starts anew.

In various parts of the specification reference will be made to the beta ($\beta$) cycle or step of the computer operation. It will be understood that this expression refers to the cycle of operation set forth in the steps 2 and 2*a* of the above outline.

MEMORY DRUM

Having thus described the basic building blocks and the general organization of the computer, the details of the various components comprising the invention will now be described. Referring to FIGURE 35A there is shown a portion of the Rotating Drum Memory 35–10 for providing the computer with signal impulses which are either representative of information (data or instructions) or have timing significance. The Drum 35–10 is coated or plated with a material which is readily magnetizable and has a high degree of magnetic flux remanence. Such magnetic materials are well known in the art and may for example comprise 79% iron and 21% nickel.

The Drum 35–10 is connected via shaft 35–15 to a driving system 35–11, which may comprise an electric motor for rotating the Drum at say 16,500 r.p.m. During computer operation the driving system is activated, by means not shown, so that the Drum 35–10 is continuously rotated by the driving system 35–11 via shaft 35–15.

The system of recording information bits on the Drum is arbitrary and may be any of those well known such as, phase modulation, return to zero or non-return to zero. For purposes of illustration it is herein assumed that a "return to zero" system is employed. In this system it may be assumed that the surface of the entire Drum has been magnetized to saturation in a given direction, e.g.

negative flux saturation ($-B_s$). When the Drum 35–10 is in this condition it is storing all zero's and is devoid of impulses which have timing significance.

Impulses having timing significance, or which are representative of information, are stored on the surface of the Drum by selectively magnetizing a given portion or spot on the surface to negative ($-B_s$) or positive ($+B_s$) flux saturation. In general a spot on the surface magnetized to $+B_s$ represents a "1" bit or a timing pulse and a spot magnetized to $-B_s$ represent a "0" bit. As shall be shown later the surface of the Drum between successive recorded bits on a track is magnetized to the zero state ($-B_s$); so that the system of recording may be considered as a "return to zero" system.

The surface of the Drum 35–10 is divided into a plurality of parallel circumferential tracks appropriately grouped to provide separate information bands. Each band consists, for example, of four adjacent tracks, each track of which contains the respective bits of the 5421 parallel code employed by the present computer. A separate track containing odd-even check bits can be added to each of the bands if desired. A group of four adjacent tracks representative of one band is designated in the figure as 35–A to 35–D. All the tracks, except the sprocket track 35–14, are so grouped.

In the preferred embodiment of the invention there are twenty-five bands 35–13A to 35–13Y of 200 words each, reserved for the storing of information, i.e. data or instruction words, and said bands are hereinafter referred to as "information bands." Of the 25-information bands, 5 are designated as fast access bands (FM) and 20 are designated as slow or normal access bands (SM).

The two information bands 35–13A and 35–13Y shown on FIGURE 35A are representative; and band 35–13A typifies a slow or normal access band (SM) and band 35–13Y typifies a fast access band (FM). The essential difference between the fast and slow access bands rests in the fact that fast access bands have 4 Read-Wr.te head assemblies 35–6 to 35–9, further designated as the 00, 01, 10 and 11 head assemblies, spaced at 90° intervals about the circumference of the Drum, whereas the slow access bands have only one Read-Write head assembly.

Further it will be understood from a later discussion on Address Selection that the time required to search out a given word on the FM bands may be a factor of 4 less than the time required to search out a corresponding word on a SM band.

For example, the 25th word on a FM band will pass under 4 Read-Write head assemblies (00, 01, 10, 11) for each revolution of the Drum 35–10, whereas the same location on a SM band will pass under only one Read-Write head assembly (00) for each revolution.

All the head assemblies of the slow access bands and at least one head assembly for each fast access band lie in a common longitudinal plane. The head assemblies for both the slow and the fast access bands which lie on this common plane will be referred to as the zero-zero (00) heads. The three remaining head assemblies of the fast access bands are designated as the one-one (11) heads, one-zero (10) heads and the zero-one (01) heads and are positioned as shown, 90° displaced about the periphery of the Drum in the region where FM information is stored. Further it will be appreciated that all the 11 heads of the 5 fast access bands lie in one common plane 90° displaced from the 00 heads; all of the 10 heads lie in one plane 90° displaced from the 11 heads, and finally the 01 heads all lie in a plane 90° displaced from the 10 heads as depicted. It will also be seen from the position of the heads and the direction of Drum rotation shown in FIGURE 35A that a given word presently in registration with the 00 heads in the fast memory band will encounter the 01, the 10 and then the 11 heads in succession.

It should be noted that the read-head assemblies for all the information bands are identical, and therefore only the head assembly generally designated 35–5 associated with information band 35–13A will be described. Read-Write head assembly 35–5 comprises four individual Read-Write heads 45–5A to 35–5D wherein head 35–5A is associated with track 35–A of information band 35–13A; head 35–5B is associated with track 35–B of information band 35–13A, etc. The four heads 35–5A to 35–5D operate so as to either read or record 4 bits in parallel on the 4 tracks of band 35–13A, wherein these 4 bits comprise a digit.

The individual heads comprise at least one magnetic core member, which may be toroidal, having a coil of wire wrapped about it. Suffice it to say for the present that a magnetic spot on the Drum passing in proximity to a Read-Write head will induce a current in the coil associated with the head wherein the direction of the current is a function of the polarity of the magnetic spot, and that a current passing through the coil will induce a magnetic spot on the Drum, wherein the magnetic sense of the spot will be a function of the direction of current passing through the coil.

In the preferred embodiment of this invention, the circumference of the Drum is set so that the tracks in the several information bands have positions, which are in line, for storing 2400 "0" or "1" bits recorded serially as distinct magnetic spots. Since a band accommodates 4 bits in parallel, and each track of the band stores 2400 bits in series, it may be stated that a band stores 2400 digits or 200 twelve digit words. For convenience each word in all the bands 35–13A to 35–13Y bears a sequence number from 0 to 199 wherein said sequence number indicates the relative position of any word in a band.

It should be noted that each one of the information bands 35–13A to 35–13Y contains words having different addresses. For example, information band 35–13A contains words having memory addresses 0–199; band 2 contains words having memory addresses 200–399; band 3 contains memory addresses 400–599; and etc., so that with twenty-five bands in all a total of 5000 words may be stored on the Drum. As will later be seen the FM bands store words having addresses 4000 to 4999. It will be appreciated that the sequence number designation of the word presently available to the zero-zero (00) heads on all the bands will be the same at any given instant. For example, the 25th word in the band 35–13Y will be under head assembly 35–6 when the 25th word on band 35–13A is under head assembly 35–5.

It is necessary, in recording or reading information on the surface of the Drum 35–10, to be able to determine with accuracy what portion of the circumference of the Drum will pass under the various fast access head assemblies 00, 01, 10, or 11 at any given instant. The timing and address band 35–12 comprising tracks 35–A to 35–D cooperating with head assembly 35–4, which is positioned in line with the zero-zero heads, provides this information. The head assembly 35–4 is similar to the head assembly 35–5 and comprises 4 individual Read-Write heads 35–4A to 35–4D for sensing impulses recorded in parallel on tracks 35–A to 35–D of band 35–12, respectively.

As in the case of the information bands, the timing and address band 13–12 accommodates 200 computer words, hereinafter called time selection words. The word on the timing and address band 13–12 presently under read assembly head 35–4 as shall later be explained gives an indication of the sequence number of the *next* word on *all* the information bands 35–13A to 35–13Y to be presented to the 00 Read-Write heads. Further it will be shown that one digit in each word in the timing and address band 35–12 contains timing impulses which set or synchronize the Cycling Unit or master clock (FIG. 34).

As mentioned earlier there is one track which does not form a part of any band, namely the sprocket track 35–14. This track in cooperation with single read-head 35–3 and a phase splitting network (discussed in connection with FIG. 10) provide the A and B phase clock or power pulses which are needed to drive the various magnetic amplifiers and complementers throughout the computer. The sprocket track 35–14 has recorded thereon, in serial fashion 2400 timing pulses or 1 bits, wherein the recorded 1 bits on the sprocket track are in line with digit positions on the information bands 35–13A to 35–13Y and the timing and address band.

The impulses stored on that portion of the surface of the Drum designated "timing and address band," and on the portion designated "sprocket track" are pre-recorded by conventional means and are not changed during computer operation.

Referring now to FIG. 35B in conjunction with FIG. 35A there is shown an expanded view of the surface of the Drum 35–10 from lines Z to Z′ which includes an arc or section of the timing and address band 35–12, the sprocket track 35–14 and information band 35–13A. The Drum section in FIG. 35B illustrates nine individual tracks comprising the two bands 35–12 and 35–13A of four tracks each and the sprocket track 35–14. Each of the tracks shown accommodates 25 "0" or "1" bits. Thus the section of band 35–13A and of band 35–12 from line Z to Z′ each store in parallel 25 digits or 2 words plus one digit of another word.

In the preferred embodiment of this invention, selected digit positions of the time selection words are reserved for storing timing impulses (hereinafter referred to as the timing sentinel) and the sequence number of the next information words in bands 35–13A to 35–13Y to pass under the 00 head assemblies associated with these information bands. To this end pulse positions P1, P2 and P3 of the time selection words contain the sequence number of the next word on all the information bands 35–13A to 35–13Y to be presented to the corresponding 00 Read-Write heads 35–5 etc., and pulse position P8 contains the timing sentinel which has a special code designation of 1101. The remaining pulse positions of the time selection word on band 34–12 may be filled with "0" bits. As shall be shown in connection with the Cycling Unit (FIG. 34) the pulse combination, referred to above as the timing sentinel, in the P8 position of each word on the timing and address band 35–12, is detected by gate 34–1 on FIG. 34, which sets the Cycling Unit once per minor cycle.

Since each of the information bands contains 200 words it will only be necessary to employ 3 digits of each time selection word on Band 35–12 to give an indication of the sequence number of the words on the Drum about to be presented to the various Read-Write head assemblies.

The timing band contains numbers from 0 to 199 sequentially spaced about the circumference of the Drum (FIG. 35A) at one word intervals. The P1, P2, and P3 digit position of every timing word on band 35–12 contains information indicative of the sequence number of the words on information bands 35–13A to 35–13Y which will next pass under all 00 Read-Write Head Assemblies (e.g. 35–5 and 35–6). The digit in the P1 position of the time selection words corresponds to units digit of a word sequence number, the digit in the P2 position corresponds to a tens digit of the word sequence number and the digit in the P3 position corresponds to the hundreds digit of a word sequence number. The one bits in any given digit are weighted according to the bi-quinary system so that a one bit in track D of band 35–12 is the most significant bit and represents a $5^1$ and a "1" bit in tracks C, B, or A of band 35–12 represents a value equal to $2^2$, $2^1$, or $2^0$ respectively. Since the digit in the P3 position of the time selection word is in the hundreds denomination and there are 200 words in any information band, it is only necessary that the "1" or "0" bit be in track A of pulse position P3 of band 35–12 in order to distinguish between a sequence number above or below 100.

It will be appreciated therefore that the P3, P2, and P1 positions of the time selection word on FIG. 35B approaching head assembly 35–4 (as indicated by the arrow denoting the direction of rotation of the Drum) are indicative of 178th sequence number or 178th word on all the information bands 35–13A to 35–13Y. The aforementioned time selection word will be referred to as the 178th time selection word. Further it will be understood that the digits in the P3, P2 and 1 positions of the next word on band 35–12 will be indicative of the 179th information word on all the information bands 35–13A to 35–13Y.

Referring now to the section of the information band 35–13A on FIG. 35B it will be observed that P0 pulse position of the 177th data word is presently approaching head assembly 35–5, at substantially the same time as the 178th time selection word is approaching head 35–4 and it will be understood that the same pulse position (P0) of 177th word on each of the remaining 24 bands is approaching a Read-Write head assembly in line with head assemblies 35–5 and 35–4. It is obvious from FIG. 35B that the 178th information word on all the bands 35–13A to 35–13Y will next pass under the head assemblies in line with head 35–5 and 35–4.

The particular significance of a digit in each pulse position of a data or information word has already been explained and will not be dealt with again here. For convenience the value of the digits and their designations, where applicable, have been inscribed on FIG. 35B next to the digit involved. It should be noted, that the most significant bit (MSB) of each digit is stored on track D of information band 35–13A and the least significant bit (LSB) of each digit is stored on track A.

For ease in understanding the relationship between the order of the words on the timing and address band 35–12 and the order of the words on the information bands 35–13A to 35–13Y it will be advantageous to assume for the moment that the Drum 35–10 is not rotating. It can be observed that the P0 pulse position of the 178th time selection word is detected by head assemly 35–4 at the same instant that the P11 pulse position (SBW) of the 176th data word on each of the 25 information bands 35–13A to 35–13Y is detected by the 00 head assemblies which are in line with element 35–4. Further it can be seen that the P1 to P11 pulse positions of the 178th time selection word are detected by head assembly 35–4 at the same time as the P0 to P10 pulse position respectively are detected by the 00 heads of the information band 35–13A to 35–13Y. Thus it can be stated that the P0 pulse position of the Nth time selection word (where N=0 to 199) leads by 13 pulse position (1 word and 1 digit) the P0 pulse position of the Nth word on the information bands. For example as shown by FIG. 35B, the P0 position of the 178th time selection word is 13 pulse positions ahead of the P0 pulse position of the 178th information word.

Referring now to the portion of the sprocket track 35–14 shown in FIG. 35B it will be observed that a "1" bit or timing pulse is recorded for each pulse position of the time selection word in band 35–12, and for the information words in bands 35–13A to 35-13Y. Thus for every digit recorded or read from the Drum 35–10 a sprocket pulse will be detected by head 35–3 associated with track 35–14.

TIMING READ CIRCUIT—FIGURE 32A

Referring now to FIGURE 32A there is shown in block form the read circuits for the timing and address band 35–12 of FIGURE 35A wherein windings 32–1A to 32–1D represent the pickup coils for read heads 35–4A to 35–4D. Each pickup coil is connected to the input of a respective read amplifier 32–2A to 32–2D. Each of these elements 32–2A to 32–2D in addition to being an amplifier acts as a wave shaper and clipper, so that the output of any of the read amplifiers 32–2A to 32–2D is suitable for driving a magnetic amplifier or complementer. It should be noted that the circuitry of elements 32–2A to 32–2D is conventional and may comprise vacuum tubes, or transistors which have substantially no delay in transmission time. Therefore, these circuits will not be described in detail. The output of read amplifiers 32–2A to 32–2D are connected to the inputs of elements 32–3A to 32–3D respectively, said elements 32–3A to 32–3D react as a group of three magnetic amplifiers connected in series which have an inherent delay of one and one-half pulse periods. Elements 32–3A to 32–3D are in turn each connected at their outputs to the inputs of a B phase complementer and amplifier pair; wherein element 32–3A drives the inputs of B phase complementer 32–4A and B phase amplifier 32–5A; element 32–3B drives the inputs of B phase complementer 32–4B and B phase amplifier 32–5B, etc.

A low level signal applied to the inputs of any of the complementer-amplifier pairs 32–4A, 32–5A, etc. will cause the amplifier of that pair to produce a low level signal and the complementer to produce a high level signal output one-half pulse period after the applied input signal. When this condition obtains the barred output, which here is the equivalent of a "0" bit is produced. Conversely a high level signal applied to any of the inputs of the complementer-amplifier pairs 32–4A, 32–5A, etc., will cause the amplifier to produce a high level signal and the complementer to produce a low level signal; and when this condition obtains the unbarred output, which here is the equivalent of a "1" bit, is produced. For example, a low level signal applied to the inputs of complementer 32–4A and amplifier 32–5A causes a $\overline{TS_1}$ signal to be produced and a high level signal applied to the same inputs causes a $TS_1$ signal to be produced. The "1" bits or unbarred signal outputs are weighted according to the bi-quinary system wherein the $TS_1$ signal is the least significant bit and the $TS_4$ signal is the most significant bit.

The leading edge of a magnetic spot on the drum 35–10 representing a "1" bit on any of the tracks in the timing and address band 35–12 induces a voltage in one of the windings 32–1A to 32–1D which will be transmitted and shaped into a high level signal by the read amplifier associated with the winding. This high level signal representing a "1" bit is applied to the input of one of the elements 32–3A to 32–3D which in turn, after a one and one-half pulse period delay, causes a high level signal to be applied to the input of one of the complementer-amplifier pairs (e.g. elements 32–4A and 32–5A); whereupon the complementer of that pair affected will produce, after another half-pulse period delay, an unbarred output signal. On the other hand a "0" bit on any of the tracks in the timing and address band 35–12 will not induce a voltage in the windings 32–1A to 32–1D. The absence of a voltage is transmitted as a low level signal by the read amplifiers 32–2A to 32–2D. This low level signal representing a "0" bit is applied to the input of one of the elements 32–3A to 32–3D which after its inherent delay period causes a low level signal to be applied to the input of one of the complementer-amplifier pairs; whereupon the amplifier of the pair affected will produce after it herent delay period a barred output signal. For example, a "1" bit on track C of band 35–12 (FIGURE 35A) will induce a voltage across winding 32–1C, wherein said voltage will be amplified and shaped by read amplifier 32–2C and applied as a high level signal to the input of element 32–3C. After a one and one-half pulse period delay, element 32–3C produces another high level signal which is applied to the common input of amplifier 32–4C and complementer 32–5C whereupon complementer 32–4C will produce after its inherent delay period a low level $TS_3$ output signal, representative of a "1" bit. It will be appreciated by tracing through the previous path that a "0" bit on track C of band 35–12 will cause amplifier 32–5C to produce a low level $\overline{TS_3}$ output signal.

CYCLING UNIT—FIGURE 34

Referring now to FIGURE 34 there is shown the Cycling Unit or master clock which supplies the timing pulses used throughout the computer. The Cycling Unit comprises a serially connected chain of 24 amplifiers and complementers (elements 34–2 through 34–25) wherein an amplifier or complementer driven by power pulses of a first phase (e.g. phase A power pulse) is connected at its input and output to at least one amplifier or complementer driven by power pulses of a second phase (e.g. phase B power pulse). Several of the aforementioned elements 34–2 through 34–25 drive amplifiers or complementers not connected in the chain but which also produce timing pulses. In particular, complementers 34–4 through 34–7, 34–12, 34–14, 34–16, 34–20 and 34–24 are connected at their outputs to the inputs of amplifiers 34–26 through 34–29, 34–33, 34–34, 34–36, 34–37 and 34–39 respectively; and the output of complementer 34–15 is connected to the input of element 34–35 via gate 34–35A. Further the outputs of complementer 34–8, amplifier 34–10 and amplifier 34–22 are connected to the inputs of complementer 34–30, amplifier 34–32 and complementer 34–38, respectively.

The input of the first element, complementer 34–2, in the chain is connected to the output of gate 34–1 which in turn is driven by the designated outputs of the Timing Read Circuit, FIGURE 32A, which produce the $TS_4$, $TS_3$, $\overline{TS_2}$ and $TS_1$ signals. It will be appreciated that gate 34–1 will transmit a low level signal to the input of complementer 34–2 only when all the inputs to this gate are at a low level, a condition which occurs when the $TS_4$, $TS_3$, $\overline{TS_2}$ and $TS_1$ signals, indicating a 1101 output are simultaneously generated. Referring back to the description of the timing and address band 35–12 (FIGURE 35A) it will be recalled that the timing sentinel has a code designation of 1101 stored in the P8 pulse position of every word on the timing band 35–12. Thus, by retracing the circuit from the read head 35–4 associated with the timing and address band 35–12 to the input of gate 34–1 it can be seen that the aforementioned signals ($TS_4$, $TS_3$, $\overline{TS_2}$, $TS_1$) are generated two pulse periods after the timing sentinel in the P8 position of every word passes under read head 35–4. Therefore when gate 34–1 detects the presence of the timing sentinel, a low level signal will be transmitted therethrough to the input of complementer 34–2 which after a one-half pulse period delay produces a high level signal occurring during the positive portion of the A phase power pulses.

The high level signal generated by complementer 34–2 is propagated through the remainder of the complementers and amplifiers (34–3 through 34–25) in the chain so that the output signals, which may be at a high or low level, are developed by the A and B phase amplifiers and complementers one-half pulse period after receiving an input from the element which precedes it. In addition, those amplifiers or complementers which form part of the Cycling Unit, but are not in the chain, will produce an output one-half pulse period after receiving an input from a complementer or amplifier in the chain. For example, complementer 34–31 produces an output one-half pulse period after receiving an input from amplifier 34–9.

By way of notation, a high level signal or a low level signal from the Cycling Unit developed by an amplifier or complementer which is driven by phase A power pulses bears as part of its designation the symbol A+ or A− respectively; and a high level signal or low level signal from the Cycling Unit developed by an amplifier or complementer which is driven by phase B power pulses bears as part of its designation the symbol B+ or B− respectively. Further a signal having the plus symbol as part of its designation is only present when the element producing the signal yields a high level output and conversely a signal having the minus symbol as part of its designation is only present when the element producing the signal yields a low level output.

The configuration of amplifiers and complementers comprising the Cycling Unit is similar to that discussed in connection with FIGURES 3 to 5 and, therefore, its operation will not be discussed in detail. However, it will be understood that each output signal from the Cycling Unit, with the exception of the S*t*3B– signal, is generated once every time gate 34–1 transmits a signal, or stated otherwise the aforementioned signals are generated once for every timing sentinel that passes under the read head 35–4 associated with the timing band 35–4 (FIGURE 35).

The S*t*3B– signal is generated at the output of element 34–35, which acts as an amplifier having a one pulse period delay. Element 34–35 is connected at its input to the output of gate 34–35A, which in turn is driven by the 0F2+ output of the Overflow Flip-Flop (FIGURE 22), the (1) output line of the Signal Encoder (FIGURE 27) and, as previously indicated, by the output of complementer 34–15. Thus, one pulse period after all the inputs to gate 34–35A are at a low level, element 34–35 will produce a low level signal designated as the S*t*3B– signal. The symbol "S" denotes that the S*t*3B– signal is the only gated output of the Cycling Unit.

Each output signal from the Cycling Unit bears, in addition to the symbols already discussed a *t* number designation which in indicative of the relative time the particular signal is produced. The *t* numbers range from ***t*0 to *t*11 wherein the *t*0B pulses from elements 34–11 and 34–32 occur at the same time the P0** pulse position of any word being transferred to a register (e.g. *r*A) appears at the output of the transfer system (FIGURES 19 and 20). This condition is abbreviated P0=***t*0B**. In this regard the P1=*t*1B, P2=*t*2B, etc., at the output of the transfer system when information is being transferred to a register. It will be noticed that the Cycling Unit generates two or more pulses, bearing the same *t* number, for example, the *t*0A+, *t*0B+, and *t*0B– pulses. When this condition exists the output pulse bearing the letter A, designating phase A, appears one-half pulse period before the output signal bearing the letter "B," designating "B" phase. Where the *t* numbers and the alphabetic designation of the two output pulses are the same but have different signs, as in the case of the *t*0B– and *t*0B+ pulses, the two pulses appear simultaneously but are of different levels. That is, *t*0B+ is a high level signal and *t*0B– is a low level signal.

Taking the *t*0B+ and *t*0B– signals as a starting point, the signal pulses generated by elements in the Cycling Unit following complementer 32–11 are labelled with *t* numbers in ascending order and signal pulses generated by elements which precede complementer 32–11 are labelled with *t* numbers in descending order. The output pulses of the Cycling Unit are used as timing signals for the various elements of the computer. Frequently in the following description reference will be made to a particular "time," for example, time "*t*9B." This expression will be taken to mean that the elements in the Cycling Unit which produce an output having the designated "*t*" number are presently yielding such an output. Therefore, at time *t*9B, complementer 34–5 and amplifier 34–26 are both producing output signals.

Recalling that the Cycling Unit is set in operation by the timing sentinel in the P8 position of each word on the timing band 35–12 and that each element in the chain of elements (34–2 to 34–25) has an inherent one-half pulse period delay, it can be determined, when the timing sentinel is read by head 35–4, that a *t*5B+ pulse and a *t*5B– pulse are being generated by amplifier 34–37 and complementer 34–21 respectively of the Cycling Unit.

Referring back to FIGURE 35B it will be seen that a timing symbol, or "*t*" number has been placed adjacent to each pulse position in a computer word indicating when, with reference to the Cycling Unit, a particular pulse position will be under the Read-Write head assemblies. For example, FIGURE 35B shows that the P0 pulse position of a Time Selection word, and the P11 pulse position of an information word are under the head assemblies in line with unit 35–4 at time *t*9B.

Referring now to FIGURE 34A there is shown a pair of B phase complementers 34–43 and 34–44, which are considered as part of the Cycling Unit, and generate at their outputs the *t*(0–2)B– and *t*(2–3)B– timing signals respectively. The input of complementer 34–43 is connected to the output of buffer 34–41 which in turn is connected at its input to the *t*0A+, *t*1A+, and *t*2A+ outputs of the Cycling Unit. It will be appreciated that high level signals will appear at the last named outputs at time *t*0A, time *t*1A, and time *t*2A and that in response to these high level signal buffer 34–41 will transmit three high level signals, separated by a half pulse period, to the input of complementer 34–43. In response to these high level signals complementer 34–43 will produce low level outputs at time *t*0B, *t*1B and *t*2B. Collectively these three output signals will be hereinafter referred to as the *t*(0–2)B– signal.

The input of complementer 34–44 is connected to the output of buffer 34–42 which is driven by the *t*2A+ and *t*3A+ outputs of the Cycling Unit. It will be appreciated that high level signals will appear at the *t*2A+ and *t*3A+ outputs at time *t*2A and *t*3A, and that in response to these high level signals buffer 34–42 will transmit two high level signals (separated by a half pulse period) to the input of complementer 34–44. In response to these two high level signals complementer 34–44 will produce low level outputs at time *t*2B and at time *t*3B. Collectively these two output signals from complementer 34–44 will be hereinafter referred to as the *t*(2–3)B– signal.

MINUEND BUFFERS

As previously noted, the bits comprising a data or an instruction word are transferred from circuit to circuit within the computer by either of two transfer circuits referred to as the "Minuend Buffers" and the "Subtrahend Buffers." FIGURE 20 to which reference is now made shows the details of the Minuend Buffers.

The Minuend Buffers comprise four parallel channels, labelled Min Buffers 1 to 4 for transferring respectively, bits 1 to 4 of the four bit serial-parallel output of the A Register, X Register, L Register, and the Rotating Drum Memory via four pairs of output lines labelled $M_1$, $\overline{M}_1$; $M_2$, $\overline{M}_2$; $M_3$, $\overline{M}_3$; $M_4$, $\overline{M}_4$ to various elements in the machine. As will hereinafter be described the output of an Input-Output Register hereinafter referred to as the 0 or *r*0 Register may also be conveyed from the input-output equipment of the Min Buffers 1 to 4. In addition Min Buffer 1 is the transfer link for conveying sign information from the sign of *r*X Flip Flop (FIG. 11A), the signal of *r*0 Flip Flop (FIG. 52), and the sign of *r*A Flip Flop (FIG. 11B) to select elements in the computer.

A coincidence of low level signals applied to any of Min Buffers 1 to 4 are essentially identical with exception that Min Buffer 1 has three additional input circuits for transferring sign information not found in Min Buffers 2 to 4. Accordingly, only Min Buffer 1 will be described in detail bearing in mind the exceptions noted. Identical elements in each of the four channels bear the same arabic numeral designation but have identifying alphabetic notation, e.g., complementer 20–14 of Min Buffer 1 is structurally and functionally the same as complementers 20–14B, 20–14C, and 20–14D of Min Buffers 2 to 4 respectively.

Referring now in particular to Min Buffer 1 there may be observed a B phase complementer 20–14A and a B phase amplifier 20–15A connected together at their inputs, via line 16A. This common input line 20–16A of elements 20–14A and 20–15A is coupled to the $L_1$ output, FIG. 14, for the first channel of the L Register; the $DM_1'$ output, FIG. 31A, for the first track of the slow access portion on the Revolving Drum Memory; the $DM_{15}$ output, FIG. 31B, for the first track of the fast access portion of the Revolving Drum Memory; the $DM_{11}$ output for the first channel of the 0 Register, FIG. 50; and the $DM_{12}$ output of complementer 49–16, FIG. 49A. As shall be pointed out later in the description, the DM12 output of complementer 49–16 is representative of the sign of the information in the 0 Register, and is ultimately determined by the sign of *r*0 Flip Flop shown in FIG. 52. Min Buffers 2 to 4 are in like manner connected to the $L_2$, $L_3$ and $L_4$ outputs of the second, third and fourth channels of the L Register; the $DM_{21}$, $DM_{31}$ and $DM_{41}$ outputs of the second, third and fourth channels of the 0 Register; and the $DM_2'$, $DM_3'$ and $DM_4'$ output and $DM_{25}$, $DM_{35}$ and $DM_{45}$ outputs of the second, third and fourth tracks of the slow and fast access portions of the Revolving Drum Memory, respectively. It will be noted that the sign of the 0 Register is only transferred via Min Buffer 1.

The output line of complementer 20–14A and the output line of amplifier 20–15A will be referred to as the $M_1$ and $\overline{M}_1$ output lines respectively. When complementer 20–14A produces a low level output signal, an $M_1$ signal is said to be present at the output of complementer 20–14A. When amplifier 20–15A produces a low level output, an $\overline{M}_1$ signal is said to be present at the output of the amplifier 20–15A. Since the input of elements 20–14A and 20–15A are joined together, it is obvious that Min Buffer 1 will produce either the $M_1$ or the $\overline{M}_1$ signal, that is, if a low level signal is present at the aforementioned common input line 20–16A, Min Buffer 1 will produce an $\overline{M}_1$ signal one-half pulse period thereafter, and if a high level signal is presented to common input 20–16A Min Buffer 1 will produce an $M_1$ signal one-half pulse period thereafter.

It is therefore apparent, that whenever the signal being supplied to common input line 20–16A from one of the $DM_1'$, $DM_{11}$, $DM_{12}$, $DM_{15}$ or $L_1$ outputs is a low level, an $\overline{M}_1$ signal will be produced a half pulse period thereafter at the output of amplifier 20–15A; and when this input signal on line 20–16A is at a high level an $M_1$ signal will be produced at the output of element 20–14A a half pulse period after the high level signal is applied. With respect to Min Buffers 2 to 4 a high level signal from any one of the outputs $DM_{21}$, $DM_2'$, $DM_{25}$ or $L_2$ causes Min Buffer 2, after a one-half pulse period delay, to produce an $M_2$ signal; a high level signal from the $DM_{31}$, $DM_3'$, $DM_{35}$ or $L_3$ outputs causes Min Buffer 3 to produce after a one-half pulse period delay, an $M_3$ signal; and a high level signal from the $DM_{41}$, $DM_4'$, $DM_{45}$ or $L_4$ outputs causes Min Buffer 4 to produce after a one-half pulse delay, an $M_4$ signal.

The common input connection for each of the Min Muffers in addition to receiving the above described inputs, are also driven by a plurality of gating circuits shown in the lower part of the figure. The gating structure which drives the common input line 20–16A for complementer 20–14A and amplifier 20–15A comprises six sets of input circuits, wherein each set comprises a low level coincidence gate (e.g. 20–4A) connected to the input of a respective complementer (e.g. 20–9A), the output of which is connected to the common input line 20–16A. As indicated in the drawing the four gates 20–4A, 20–7A, 20–8A, and 20–17A and their respective complementers 20–9A, 20–12A, 20–13A and 20–18A have identical counterparts in Min Buffers 2 to 4, whereas the two remaining input circuits for Min Buffer 1 comprising gate 20–5 and its respective complementer 20–10, and gate 20–6 and its respective complementer 20–11 only supply inputs to elements 20–14A and 20–15A of Min Buffer 1 and have no counterparts in Min Buffers 2 to 4.

Gates 20–5 and 20–6 each have three inputs thereto, which are; the (11) output line of the Control Encoder, FIG. 27, the A– output line of the sign of *r*A Flip Flop, FIG. 11B, and a *t*7B– output line of the Cycling Unit, FIG. 34, for gate 20–5; and the (12) output line of the Control Encoder, the X– output of the sign *r*X Flip Flop, FIG. 11A, and the *t*7B– output of the Cycling Unit, for gate 20–6. It will be appreciated that the two aforementioned input circuits convey the sign information of the contents of the A and X Registers to the various components of the computer via Min Buffer 1.

Gate 20–4A is driven by the $A_{1M}$ output of the A Register, FIG. 15, and the (11) signal line from the Control Encoder, and gate 20–7A is driven from the $X_{1M}$ output in the first channel of the X Register, FIG. 16, and the (12) signal line from the Control Encoder. Gate 20–8A is driven by the (1) output line from the Control Encoder, the $TS_1$ line from the first track of the Timing Band Read Circuits, FIG. 32A, and the *t*(0–2)B– output line from the Cycling Unit, FIG. 34A. Gate 20–17A is connected at its input to the $X_1'$ output of the X Register, FIG. 16; the $SCO_B$ output of the Supervisory Control Output Flip Flop (SCO)FF (FIG. 49B) and to the $RS_X$ switch shown in block form on FIG. 52D.

A coincidence of low level signals applied to any of the gates 20–4A, 20–5, 20–6, 20–7A, 20–8A or 20–17A causes one of the complementers 20–9A, 20–10, 20–11, 20–12A, 20–13A or 20–18A associated with each of the aforementioned gates to produce, after a one-half pulse period delay, a high level signal. This high level signal produced by one of the aforementioned complementers is applied to the input line 20–16A of elements 20–14A and 20–15A to thereby cause an $M_1$ signal to be produced by complementer 20–14A after still another one-half pulse period delay. If, on the other hand at least one of the inputs to each of the aforementioned gates is at a high level then its respective complementer will transmit, after a one-half pulse period delay a low level signal to line 20–16A and thereby cause an $\overline{M}_1$ signal to be produced at the output of amplifier 20–15A.

Low level coincidence gates 20–4B to 20–4D of Min Buffers 2 to 4 respectively are connected to the (11) output line of the Control Encoder and to the designated outputs of the second, third, and fourth channels of the A Register, and gates 20–7B to 20–7D are connected to the (12) output line of the Control Encoder and to the designated outputs of the second, third and fourth channels of the X Register. Further gates 20–8B to 20–8D are connected to the (1) output line of the Control Encoder, the *t*(0–2)B– outputs of the Cycling Unit and to the designated outputs of the Timing Read Circuits, FIG. 32A; and gates 20–17B to 20–17D are all connected to the $SCO_B$ output of the (SCO)FF, the $RS_X$ switch and to the designated outputs of the second, third and fourth channels of the X Register.

It may be noted at this point that numerical significance is attached to each of the output signals from Min Buffers 1 to 4 wherein an:

$M_4$ signal represents a value equal to 5, in the binary portion of a digit $\overline{M}_4$ signal represents a zero or the absence of a value equal to 5, in the binary portion of a digit $M_3$ signal represents a value equal to 4, in the quinary portion of a digit $\overline{M}_3$ signal represents a zero or the absence of a value equal to 4, in the quinary portion of a digit $M_2$ signal represents a value equal to 2, in the quinary portion of a digit $\overline{M}_2$ signal represents a zero or the absence of a value equal to 2, in the quinary portion of a digit $M_1$ signal represents a value equal to 1, in the quinary portion of a digit and an $\overline{M}_1$ signal represents a zero or the absence of a value equal to 1.

To summarize then, Min Buffers 1 to 4 will produce respective unbarred ($M_1$, $M_2$, $M_3$, $M_4$) parallel outputs or respective barred ($\overline{M}_1$, $\overline{M}_2$, $\overline{M}_3$, $\overline{M}_4$) parallel outputs in dependency upon the numeric significance of the parallel bits being fed into the respective Min Buffer channels. For reference purposes then, an unbarred output from any channel, $M_1$ for example, represents the presence of a "1" bit in that channel, while a barred output from any channel, $\overline{M}_1$ for example, represents the presence of a "0" bit in that channel. Thus, the decimal digit 8 for example having the code 1011 would appear at the output of the Min Buffers as a $M_4$, $\overline{M}_3$, $M_2$, $M_1$ code.

SUBTRAHEND BUFFERS

Referring now to FIGURE 19 there is shown the detailed block diagram of the Subtrahend Buffers. The Subtrahend Buffers comprise four identical parallel channels, labelled Sub Buffers 1–4, for transferring respectively bits 1 to 4 of the four-bit serial-parallel output of the C Register or A Register via 4 pairs of output lines, $S_1$, $\overline{S}_1$; $S_2$, $\overline{S}_2$; $S_3$, $\overline{S}_3$; and $S_4$, $\overline{S}_4$, to the various elements of the machine. All the Sub Buffers 1 to 4 are structurally identical, therefore, only one of these channels will be described in detail. It will be understood that identical elements in each of the four channels bear the same arabic numeral designation but have identifying alphabetic notation; e.g. complementer 19–2A of Sub Buffer 1 is structurally and functionally the same as complementers 19–2B, 19–2C and 19–2D of the Sub Buffers 2, 3, and 4 respectively.

Referring now in particular to Sub Buffer 1, there may be observed complementer 19–2A and amplifier 19–3A connected in parallel at their inputs. The common input, of the two aforementioned elements, is in turn connected to the output of buffer 19–1A. When complementer 19–2A produces a low level output signal and amplifier 19–3A simultaneously produces a high level output signal, an $S_1$ signal is said to be present at the output of complementer 19–2A; when this condition is reversed, an $\overline{S}_1$ signal is said to be present at the output of amplifier 19–3A. The output line of complementer 19–2A and the output line of amplifier 19–3A will be referred to as the $S_1$ and $\overline{S}_1$ output lines, respectively.

Since the inputs of elements 19–2A and 19–3A are joined together it is obvious that Sub-Buffer 1 will produce either $S_1$ or $\overline{S}_1$ signals, that is if a low level signal is presented at the aforementioned common input, Sub-Buffer 1 will produce an $\overline{S}_1$ signal one-half pulse period thereafter and if a high level signal is presented to buffer 19–1A Sub-Buffer 1 will produce an $S_1$ signal one-half pulse period thereafter. A low level signal will be presented at the common input of complementer 19–2A and amplifier 19–3A if all the input signals present at buffer 19–1A are at a low level, and a high level signal will be presented at said common input line if any one of the signal inputs to buffer 19–1A is at a high level.

Buffer 19–1A is connected at its input to the $A_{11}$ output of the first channel in the A Register, FIG. 15, the $C_{11}$ and $C_{12}$ outputs of the first channel in the C Register, FIG. 13, and the (82+) control line in the Control Encoder, FIG. 27. Buffers 19–1B, 19–1C and 19–1D are all connected to the (82+) control line of the encoding function table and to the indicated outputs of the second, third and fourth channels of the C and A Registers.

From the described connections, it may be observed that each Sub Buffer may accept an output from a designated channel of the A Register or the C Register, and each Sub Buffer controls 2 output lines, e.g. Sub-Buffer 4 controls the $S_4$ and $\overline{S}_4$ output lines. Further it may be noted at this point that numerical significance is attached to each of the output signals from Sub Buffers 1 to 4, wherein an:

$S_4$ signal represents a value equal to 5, in the binary portion of a digit $\overline{S}_4$ signal represents a zero or the absence of a value equal to 5 in the binary portion of a digit $S_3$ signal represents a value equal to 4, in the quinary portion of a digit $\overline{S}_3$ signal represents a zero or the absence of a value equal to 4 in the quinary portion of a digit $S_2$ signal represents a value equal to 2, in the quinary portion of a digit $\overline{S}_2$ signal represents a zero or the absence of a value equal to 2, in the quinary portion of a digit $S_1$ signal respresents a value equal to 1, in the quinary portion of a digit and an $\overline{S}_1$ signal represents a zero or the absence of a value equal to 1, in the quinary portion of a digit.

To summarize, Sub Buffers 1 to 4 will produce respective unbarred ($S_1$, $S_2$, $S_3$, $S_4$) outputs or respective barred ($\overline{S}_1$, $\overline{S}_2$, $\overline{S}_3$, $\overline{S}_4$) outputs in dependency upon the numeric significance of the parallel bits fed into the Sub Buffer channels. For reference purposes then, an unbarred output from any channel, $S_1$ for example, represents the presence of a "1" bit in that channel, while a barred output from any channel, $\overline{S}_1$ for example, represents the presence of a "0" bit in that channel. Therefore, the decimal digit 3, for example, having the code 0011, would appear at the output of the Sub Buffers as a $\overline{S}_4$, $\overline{S}_3$, $S_2$, $S_1$ code.

In FIGURES 25A and 25B, 26A and 26B and 27A through 27D there are shown, respectively, the Static Register, the Decoder and the Encoder of the computer which comprises the control circuits for converting the signals of the two digits (P9 and P10) in the command portion of the instruction word, FIG. 9B, into the various control potentials that are needed throughout the computer to perform an operation.

As will be noted, the drawings are appropriately marked with alphabetic symbols at various points to indicate during what instruction the associated circuits are rendered operative. For example in FIG. 25, each of the gates has one or more alphabetic symbols associated therewith to indicate during what operation the associate gate is rendered effective.

STATIC REGISTER—FIGS. 25A AND 25B

FIGURES 25A and 25B illustrate the details of the Static Register. One function of the Static Register is to receive certain of the bits in the command portion of the instruction word and to store these bits for presentation to the other two elements comprising the control circuits, or in few cases directly to an arithmetic or other control element of the machine. As has been previously stated the operation to be performed by the computer is determined by the information contained in the command portion of the instruction word. Consequently the instruction word, and more particularly the command portion thereof, must necessarily be transferred to the Static Register. It will be recalled from the description of the general block diagram (FIGS. 10A, 10B, and 10C) that both data and instruction words are stored on the rotating storage Drum and are transferred therefrom in serial-parallel form to the various elements of the computer via the Read-Write heads and the Minuend Buffers (FIG. 20).

Now referring in particular to FIGURES 25A and 25B there may be observed six flip-flops A to F which are used, interalia, to store the essential data contained in the two command digits (P9 and P10) of an instruction word. Each of the six flip-flops A to F are substantially identical and only one (B) will be described.

Similar elements in each of the flip-flops are referenced with identical numerals but have different alphabetic designations.

Flip-flop B comprises an amplifier 25–29B and a complementer 25–28B connected together at their inputs. The output of complementer 25–28B is connected to the input of a recirculation gate 25–8B which in turn is connected at its output to the input of recirculation complementer 25–25B. The output of complementer 25–25B drives the common input of elements 25–29B and 25–28B, so that there is a feedback loop from the output of complementer 25–28B back to its input. A high level signal applied to the common input of the aforementioned elements 25–29B and 25–28B causes amplifier 25–29B to produce a high level signal at its output marked $\overline{STR2}$ and causes complementer 25–28B to produce a low level signal at its output marked STR2 so that flip-flop B is by convention in its STR2 or "1" state. Low level outputs from complementer 25–28B will be fed through recirculation gate 25–8B to the input of recirculation complementer 25–25B causing the latter complementer to produce a high level signal at the common input of amplifier 25–29B and complementer 25–28B. The recirculation of the low level output signal from complementer 25–28B back to its input via elements 25–8B and 25–25B will cause flip-flop B to remain in its STR2 or "1" state. It will be observed that recirculation gate 25–8B has an input from the clear line. As the clear line is normally maintained at a low level, it will be appreciated that low level output pulses from complementer 25–28B will pass through recirculation gate 25–8B causing complementer 25–25B to continue to produce high level signals at the common input of elements 25–28B and 25–29B and thereby maintain flip-flop B in its STR or "1" state. When on the other hand the potential on the clear line is raised it will be appreciated that low level output signals from complementer 25–28B will not pass through recirculation gate 25–8B and that a high level signal from the clear line will be presented to complementer 25–25B which in turn will produce a low level output signal at the common input of elements 25–28B and 25–29B. A low level signal applied to the common input of these aforementioned two elements causes amplifier 25–29B to produce a low level signal at its output marked $\overline{STR2}$ and causes complementer 25–28B to produce a high level signal at its output marked STR2 so that flip-flop B is by convention in its $\overline{STR2}$ or "0" state. High level outputs from complementer 25–28B will be fed through recirculation gate 25–8B (not withstanding the potential on the clear line) to the input of complementer 25–25B causing the latter complementer to produce a low level signal at the common input of elements 25–28B and 25–29B. The continued recirculation of the high level signal from the output of complementer 25–28B to its input will cause flip-flop B to remain in its $\overline{STR2}$ or "0" state. Due to the inherent one-half pulse period delay encountered in the amplifiers and complementers comprising flip-flop B, a high level signal on the clear line will not reset flip-flop B to its "0" or $\overline{STR2}$ state until one pulse period has elapsed.

The remaining flip-flops A and C to F all operate in a similar manner so that the application of a high level signal applied to the clear line, which is connected to all of the flip-flops A to F via gates 25–8A to 25–8F, causes these flip-flops to be cleared, after a one pulse period delay, to their "0" or $\overline{STR1}$, $\overline{STR2}$, $\overline{STR3}$, $\overline{STR4}$, $\overline{STR5}$ and $\overline{STR6}$ states respectively. Further the application of a high level signal to the common input of an amplifier-complementer pair, that is, elements 25–29A and 25–28A, 25–29B and 25–28B, etc., in any of the six flip-flops A to F will cause that flip-flop to be set to its "1" or STR state.

Chart AA presented below shows the elements of flip-flop B and the corresponding similar elements of each of the other flip-flops A and C to F inclusive.

CHART AA

| | FF A | FF B | FF C | FF D | FF E | FF F |
|---|---|---|---|---|---|---|
| Input Complementer | 25-19A | 25-19B | 25-19C | 25-19D | 25-19E | 25 19F |
| $\overline{STR}$ or "0" output amplifier | 25-29A | 25-29B | 25-29C | 25-29D | 25-29E | 25-29F |
| STR or "1" output complementer | 25-28A | 25-28B | 25-28C | 25-28D | 25-28E | 25-28F |
| Recirculation Complementer | 25-25A | 25-25B | 25-25C | 25-25D | 25-25E | 25-25F |
| Recirculation and Clear Gate | 25-8A | 25-8B | 25-8C | 25-8D | 25-8E | 25-8F |

The common inputs of all the aforelisted amplifier-complementer pairs are connected through input gates 25–2A to 25–2F and complementers 25–19A to 25–19F to the unbarred output lines of Min Buffers 1, 2 and 4 respectively. Again viewing flip-flop B as typical it can be observed that input gate 25–2B, has three inputs thereto and it will be appreciated that if all the inputs at gate 25–2B are at a low level, complementer 25–19B will produce a high level signal at the input of amplifier 25–29B and complementer 25–28B causing flip-flop B to be set to its STR2 or "1" state. Flip-flops A and C to F each have a similar input circuit comprising input gate 25–2A and complementer 25–19A; input gate 25–2C and complementer 25–19C; input gate 25–2D and complementer 25–19D; input gate 25–2E and complementer 25–19E; and input gate 25–2F and complementer 25–19F respectively. One input of all the gates 25–2A to 25–2F is connected to the (2) output line of the Control Signal Encoder, FIG. 27; a second input of gates 25–2A to 25–2C and gates 25–2D to 25–2F are respectively connected to the *t*9B– output line and the *t*10B– output line of the Cycling Unit, FIG. 34. Further the third input to gates 25–2A and 25–2D; 25–2B and 25–2E; and 25–2C and 25–2F are connected respectively to the unbarred $M_1$, $M_2$ and $M_4$ output lines of Min Buffers 1, and 4 (FIG. 20).

As previously mentioned the Static Register is used to store the command portion (P9 and P10 digits) of an instruction word being transferred from the Drum Memory to the computer control circuits. This transfer, which is herein referred to as the transfer or $\beta$ cycle, occurs after the computer has completed a previous instruction and has found the next instruction to be executed. During the $\beta$ cycle then, the P9 and P10 digits of the newly found instruction are read out of the Drum Memory onto the M lines (Min Buffers outputs) into the Static Register as will now be described. At substantially the same time as the transfer of the command portion of the instruction word is made to the static register, the entire instruction is transferred to the C register as shall be described later. To store the P9 digit in the Static Register, the input gates 25–2A, 25–2B and 25–2C are alerted during each minor cycle by a *t*9B– signal from the Cycling Unit and by a low level (2) signal for the Control Encoder (FIG. 27). The low level (2) signal exists for a whole minor cycle or word time during the $\beta$ transfer operation. When the two aforementioned signals are present the information available on the $M_1$, $M_2$ and $M_4$ output lines of the Min Buffers will pass through input gates 25–2A to 25–2C respectively and will be stored in flip-flops A to C. The information available at this time (*t*9B–) corresponds to the first digit of the two command digits, i.e. the digit in the P9 pulse position of the instruction word. The second group of input gates 25–2D to 25–2F are in like manner alerted by the (2) signal from the Control Encoder and a *t*10B– pulse from the Cycling Unit so that 3 bits of the second digit (P10) of the command portion of the instruction word pass through said second group of gates 25–2D to 25–2F and will be stored in the flip-flops D to F.

It will be appreciated since all of the amplifiers and complementers comprising flip-flops A to F have an inherent one-half pulse period delay that the P9 digit of the instruction word will be stored in flip-flops A to C at time *t*10B and that the P10 digit of an instruction word will be stored in flip-flops D to F at time *t*11B. Thus the entire command portion of the instruction word is stored in the Static Register by time *t*11B.

It will be observed that the $M_3$ output of the Minuend Buffers is not connected to any of the input gates 25–2A to 25–2F. Therefore, the third bit of a digit in the biquinary code which is normally transferred by Min Buffer 3, is not employed to designate an instruction, so that the instruction numbers requiring the digits 4 or 9 are not used as either digit of an instruction.

Table AB, shown below, lists in column 1 the "0" or "1" bits in the P9 and P10 positions of an instruction word that designates an instruction. The "X" in the third bit position in the two digits of the command portion of the instruction word indicates that the aforementioned bit position is not used. In column 2 there is shown the decimal digits which the bits in the command portion of the instruction word represent; in column 3 there is a brief description of the order or command; and in column 4 there is listed the alphabetic abbreviation for the order described. Hereinafter, either the alphabetic or numeric designation or both will be used to identify the instruction involved.

TABLE AB

| Col. 1 | | Col. 2 | Col. 3 | Col. 4 |
|---|---|---|---|---|
| P10 | P9 | P10–P9 | Description | Alphabetic Code |
| 0X10 | 1X00 | 25 | Transfer the contents of the memory location designated by *m* to the A Register. | B |
| 1X01 | 0X00 | 60 | Transfer the contents of the A Register to memory location designated by *m*. | H |
| 0X00 | 1X10 | 07 | Transfer the contents of the A Register to the L Register. | K |
| 0X01 | 0X00 | 10 | Transfer the contents of the memory location designated by *m* to the L Register. | L |
| 1X01 | 1X00 | 65 | Transfer the contents of the X Register to the memory location designated by *m*. | X |
| 0X00 | 1X00 | 05 | Transfer the contents of the memory location designated by *m* to the X Register. | Y |

TABLE AB—Continued

| Col. 1 | | Col. 2 | Col. 3 | Col. 4 |
|---|---|---|---|---|
| P10 | P9 | P10–P9 | Description | Alphabetic Code |
| 1X10 | 0X00 | 70 | Add algebraically the contents of the memory location designated by *m* to the contents of the A Register and put the result in the A Register. | A |
| 1X10 | 1X00 | 75 | Subtract algebraically the contents of the memory location designated by *m* from the contents of the A Register and put result into the A Register. | S |
| 1X11 | 1X00 | 85 | Multiply the contents of the L Register (multiplicand) by the contents of the memory location designated by *m* (multiplier) and put 20-digit product into the A and X Registers, each having the sign of the product (the most significant half goes into the A Register). | M |
| 1X00 | 1X00 | 55 | Divide the contents of the memory location designated by *m* (dividend) by the contents of the L Register (divisor), and put the unrounded result and sign of the quotient in the A Register and the remainder in the X Register. The remainder has the sign of the dividend. | D |
| 0X11 | 0X10 | 32 | Shift the contents of the A Register to the right *n* places into the X Register, which is also shifting to the right into the A Register (circular shift). The sign positions are not involved in this shift. *n* can vary between 0 and 10. The carriage-return character (code 1101) is used to represent 10. | N |
| 0X11 | 1X10 | 37 | Shift the contents of the A Register to the left *n* places, losing the most significant digits and bringing in 0's in the least significant places on the right. *n* can vary between 0 and 10. The carriage-return character (code 1101) is used to represent 10. | V |
| 0X10 | 0X10 | 22 | If the contents of the A Register are algebraically equal to the contents of the L Register, the next instruction is in the memory location designated by *m*, if not, the next instruction is in the memory location designated by *c*. | Q |
| 0X10 | 1X10 | 27 | If the contents of the A Register are algebraically greater than the contents of the L Register, the next instruction is in the memory location designated by *m*, if not, the next instruction is in the memory location designated by *c*. | T |
| 1X10 | 1X10 | 77 | (1) If the 0 Register is not in use, transfer the contents of the A Register into the 0 Register and print out the contents of the 0 Register. Computation may proceed during printout of 0 Register. The next instruction is in the memory location designated by *m*. (2) If the 0 Register is in use, turn on output ready lamp. The next instruction is in the memory location designated by *c*. | O |
| 1X11 | 0X10 | 82 | (1) If the 0 Register is filled, transfer the contents of the 0 Register to the A Register. The next instruction is in the memory location designated by *m*. (2) If the 0 Register is not filled, the next instruction is in the memory location designated by *c*. | I |

TABLE AB—Continued

| Col. 1 | | Col. 2 | Col. 3 | Col. 4 |
|---|---|---|---|---|
| P10 | P9 | P10–P9 | Description | Alphabetic Code |
| 0X01 | 1X00 | 15 | Change the bits in each decimal digit in the contents of the A Register to 0 wherever the contents of memory location *m* has a 0 in the corresponding bit position. This is a logical multiply instruction. Sign is undisturbed. | E |
| 0X10 | 0X00 | 20 | Superimpose the 1-bits contained in memory location *m* onto the contents of the A Register, and leave the result in the A Register. The sign is undisturbed. | P |
| 1X01 | 1X10 | 67 | Stop. The next instruction is in the memory location designated by the *c*. (If the control transfer switch is set, the next instruction is in the memory location designated by *m*.) | U |

In addition, to serving as the means for storing the command portion of the instruction word, the Static Register functions as a sequencing unit to advance the computer through its cycle of operation or the series of steps necessary to perform a given instruction. To this end flip-flops, A, B, and D have additional input circuits operable to change the output from these flip-flops after the Static Register has been cleared or has received and stored the comand digits.

An examination of flip-flop A will show that three additional input circuits may be employed to change the state of this flip-flop from its "0" or $\overline{\text{STR1}}$ state to the "1" or STR1 state. The first of these input circuits comprises a buffer 25–11 interposed between the common input of elements 25–29A and 25–28A and the output of a complementer 25–20 which in turn is connected at its input to the output of a gate 25–3; the second input circuit comprises a buffer 25–12 interposed between the common inputs of elements 25–28A and 25–29A and the output of a complementer 25–21 which in turn is connected at its input to the output of a gate 25–4; and finally the third input circuit comprises a buffer 25–13 which is connected at one of its outputs to the input of elements 25–28A and 25–29A and connected at its input to the output of a complementer 25–22, which is in turn connected at its input to the output of a gate 25–5. The coincidental application of low level signals to any of these gates will cause its respective complementer to produce a high level signal at the input of complementer 25–28A which in turn will set the flip-flop to its STR1 or "1" state. The high level signals produced by complementers 25–20 or 25–21 in response to an input from gate 25–3 or 25–4 are labelled the RCT2 and RCT1 signals respectively. These two high level signals are applied to the input of the Control Transfer Flip-Flop (FIGURE 12) which shall later be described.

The input circuits employing gates 25–3 and 25–4 are used primarily to pass a signal which indicates that a desired location in the revolving Drum Memory has been found. This signal will cause flip-flop A to produce a "1" or STR1 signal which in turn causes the Decoder and Encoder circuits to produce signals which allow information to be conveyed to and from the selected location in the revolving Drum Memory as determined by the particular instruction to be performed or the cycle of operation of the computer.

Gate 25–3 is driven by the Cycling Unit (FIG. 34) at time *t*5B–, the (3) signal line of the Control Encoder (FIG. 27) and the TS output line of the Time Selection Flip-Flop, FIG. 12B. Gate 25–4 is also driven by the TS output of the Time Selection Flip-Flop, the (1) signal line of the Control Encoder, the Cycling Unit at time *t*10B and the $\overline{\text{OF}}$ output of the OF Flip-Flop (FIG. 22). Gate 25–3 is used during H and X instructions as indicated by the alphabetic symbols adjacent thereto, while gate 25–4 is used during a search on SC order as is indicated by the alphabetic symbol adjacent thereto.

The input circuit comprising gate 25–5 is used to alter the output of the flip-flop A after the initial step of a mathematical operation requiring more than one step is performed. In particular this gate aids in the sequencing of the addition (an A instruction), multiplication (an M instruction), division (a D instruction), right and left shift operation (N and V instructions). The logical operation of gate 25–5 will be explained in greater detail in the course of the discussion concerning the computer operations and performance of instructions. It should be noted at this point that gate 25–5 is connected at its input to the clear line of the Static Register, the (64) signal line from the Control Encoder (FIG. 27) and the *t*10B– output line of the Cycling Unit (FIG. 34).

An examination of FIGURE 25A will show that the input circuit comprising gate 25–5, complementer 25–22 and buffer 25–13 also drives flip-flop B at the common input of elements 25–29B and 25–28B. A coincidence of low level signals applied to the input of gate 25–5 causes a low level signal to be presented at the input of complementer 25–22. In response to this low level input signal complementer 25–22 produces a high level signal output which is applied at the input of both flip-flops A and B whereby both of these flip-flops are set to their "1" states.

One other input circuit remains to be discussed in connection with flip-flop A, namely the input circuit comprising gate 25–8A. Gate 25–8A is connected at its output to the input of complementer 25–25A and is connected at one of its inputs to the output of element 25–18 which acts as a complementer having a delay of one pulse period. The input of element 25–18 is connected to the output of gate 25–1 which in turn is connected at its inputs to the (2) output line of the Control Encoder (FIG. 27) and the *t*8B– output line from the Cycling Unit (FIG. 34).

During the $\beta$ cycle, when the (2) signal is present, gate 25–1 will transmit a low level signal to the input of element 25–18 at time *t*8B. This low level input signal will be propagated through element 25–18 which has a delay of one pulse period, gate 25–8A and complementer 25–25A which has a one-half pulse period delay, and will appear at the input of paired elements 25–28A and 25–29A as a low level signal at time *t*10A. If a high level signal is *not* applied to the input of the aforementioned paired elements from another signal source at the same time, namely time *t*10A, then flip-flop A will be cleared to its "0" or $\overline{\text{STR1}}$ state in response to a coincidence of signals applied to the input of gate 25–1. If a high level signal is applied to the input of paired elements 25–28A and 25–29A at *t*10A then flip-flop A will be set to its "1" or STR1 state notwithstanding the action of the circuit comprising gate 25–1, element 25–18, gate 25–8A and complementer 25–25A. Such a high level signal will be presented to the input of paired elements 25–28A and 25–29A at time *t*10A by complementer 25–19A in response to the coincidental application of low level signals to gate 25–2A. It will be recalled from the previous description that gate 25–2A is controlled by the (2) signal and that the several inputs to gate 25–2A *may* all have low level signals applied thereto at time *t*9B. Therefore, a coincidence of low level signals at the input of gate 25–2A causes complementer 25–19A, which has an inherent one-half pulse period delay, to yield a high level output signal which is applied to the input of paired elements 25–28A and 25–29A at time *t*10A.

There is another input circuit to the Static Register yet to be described; namely an input circuit connected to flip-flop D.

The additional input circuit to flip-flop D comprises a gate 25–7 connected at its output to the input of a complementer 25–23 the output of which is connected via buffer 25–26 to the common input of complementer-amplifier pair 25–28D and 25–29D. Gate 25–7 is connected at its input to eight signal lines which are as follows: *t*11B– output line of the Cycling Unit (FIG. 34), $S_3$ and $S_4$ output lines of the Subtrahend Buffer (FIG. 19), OF output of the Overflow Flip-Flop (FIG. 22), the A and C signal lines from the Comparator (FIG. 17), the $STR_6$ output of flip-flop F, and the (31) signal line from the Control Encoder (FIG. 27). If all the input signals to gate 25–7 are simultaneously at a low level, complementer 25–23 will produce a high level signal one half pulse period thereafter which will be transmitted through buffer 25–26 to the inputs of amplifier 25–29D and complementer 25–28D of flip-flop D. After another half pulse period delay inherent in these two latter devices amplifier 25–29D produces a high level output and complementer 25–28D produces a low level output signal whereby flip-flop D is set to its "1" or STR4 state.

The input circuit comprising gate 25–7 and complementer 25–23 also controls another flip-flop designated as the $D_3$ flip-flop ($D_3FF$), which drives a section of the Control Encoder (FIG. 27). The $D_3$ flip-flop shown at 25–37 comprises complementers 25–31 and 25–32 connected at their inputs to gate 25–30 and buffer 25–10 respectively. Buffer 25–10 is connected at its first input to the output of complementer 25–31 and at its second input to the *t*11B+ output of the Cycling Unit (FIG. 34). Gate 25–30 is driven by the output of complementer 25–23 and the output of complementer 25–32.

The $D_3$ flip-flop is very similar to the bistable devices already discussed in connection with FIG. 8B with the exception that the $D_3$ flip-flop does not employ an amplifier corresponding to element 111 of that figure. If complementer 25–31 is producing low level output pulses and complementer 25–32 is producing high level output pulses, coincident with the power pulses applied thereto, the $D_3$ flip-flop is said to be producing both (32) signals and (32A) signals which are indicated by the encircled 32 and 32A. If this condition is reversed the flip-flop will produce neither (32A) signals nor (32) signals.

The $D_3FF$ is set to produce low level signals at the output of complementer 25–32, and high level signals at the output of complementer 25–31 once each minor cycle by a *t*11B+ pulse, applied to buffer 25–10, from the Cycling Unit; whereas the (32) signal and (32A) signal (low level signal at the output of complementer 25–31 and high level signals at the output of complementer 25–32) are generated one pulse period and one and one-half pulse periods respectively after all the signals at the input of gate 25–7 are at a low level. The coincidence of low level signals at gate 25–7 will only occur once during each division operation (D instruction) (to be later explained) so that normally the $D_3$ flip-flop does not produce either (32) or (32A) signals.

INSTRUCTION DECODER—FIGS. 26A AND 26B

Referring now to FIG. 26 there is shown the Instruction Decoder element of the Control Circuits comprising this invention. The Instruction Decoder is essentially an enlarged version of the decoding matrix or gating array shown in FIG. 7. Accordingly, the function of this element is to accept signals on a plurality of input lines (shown as horizontal lines) and generate an output signal on one selected output line (shown as the vertical lines). Each horizontal input line is labelled to show the source of the signals on the line, and each vertical output line is labelled with letter symbols (SC, B, etc.) to indicate during which instruction a given output line will be selected.

A dot at the intersection of a horizontal input line and a vertical output line, as shown by the legend on FIG. 26, represents a unilateral conducting element connected to the crossing input and output lines in the manner indicated. The unilateral conducting elements on any one output line act in concert to form a gate or logical "and" circuit for low level signals, said gates being noted by reference characters 26–1A to 26–28A. Gates 26–1A to 26–26A and 26–28A are connected at their outputs to the inputs of complementers 26–1 to 26–26 and 26–28 respectively, and gate 26–27A is connected at its output to amplifier 26–27. Complementers 26–1 to 26–26 and 26–28 produce a high level output signal one-half pulse period after all the unilateral conductors connected to their inputs receive a coincidence of low level signals; and amplifier 26–27 produces a low level signal one-half pulse period after the unilateral conductors connected to its input receive a coincidence of low level signals. The output signals of complementers 26–1 to 26–26 and 26–28 are designated by an Arabic number and the letter A, both in a circle; the letter A indicating a high level output signal is generated. The output of amplifier 26–27 is designated by an encircled Arabic number; and minus sign, the minus sign indicating a low level signal is generated.

It may be observed that 12 of the 15 input lines to the Instruction Decoder are connected to designated outputs of the Static Register flip-flops (FIG. 25). Recalling that the entire command portion of the instruction word is stored in the Static Register at time *t*11B it will be appreciated that since each output line of the Decoder drives either an amplifier or complementer, having a half pulse period delay, that the selected output signal from the Decoder representative of the command digits will not be generated until time *t*0A.

Two of the remaining 3 input lines, OR+ and IER+, are connected to corresponding outputs of the OR and IER flip-flops respectively (FIG. 24). The IER+ and OR+ signals are high level inputs and serve to inhibit a low level output from the lines marked $M_2$ ADD and $D_2$ ADD respectively during selected steps of division or multiplication.

The input lines designated $\overline{SP}$ (which is normally at a low level) is connected to the designated output of the stop flip-flop, FIG. 32B. However, it may be advantageous to drive the $\overline{SP}$ line in a positive direction once during each $\beta$ cycle of computer operation. As will be recalled during the $\beta$ cycle the command portion of the instruction word is transferred to and stored in the Static Register. Further it has been shown that the 3 bits of the P9 digit of the instruction word are entered into the Static Register flip-flops A to C at time *t*9B, one pulse period before the 3 bits of the P10 digit of the instruction word are entered into Static Register flip-flops D to F. Therefore, the signals emanating from the Static Register flip-flops, which are representative of the command digits of the instruction word are not presented simultaneously to the Instruction Decoder input lines. Consequently there is a risk that an undesired signal may be generated on one of the output lines of the Instruction Decoder due to the bits in the P9 position of the instruction word only. For example, the "H" or 60 instruction or the "X" or 65 instruction would produce the same outputs from the STR flip-flops A to C as the search, namely $\overline{STR1}$, and $\overline{STR2}$ signal outputs. Assuming, as will later be shown, that the Static Register has been cleared prior to the entering the command digits of an instruction therein, then the three remaining flip-flops D to F in the Static Register will produce $\overline{STR4}$, $\overline{STR5}$, and $\overline{STR6}$ signals, until the P10 digit of the command portion of the instruction word is read into the Static Register. Assume further that the instruction to be executed is an "H" or 65 instruction, then when the P9 digit of the instruction word is read into the Static Register a low level signal would be generated on the SC line of the Instruction Decoder. This would be an error. Now then, since the only difference between the two "H" and "X" lines and the SC line lies in the information contained in the P10 position of the instruction words, the output lines of the Instruction Decoder must be inhibited until the P10 position of the instruction word is made available to the Instruction Decoder. To this end there is generated by the Stop Flip-Flop (FIG. 32B) a positive going signal which is impressed on the $\overline{SP}$ line when the P9 portion of the command digit is being transferred from the Static Register flip-flops A to C to the Instruction Decoder. The positive $\overline{SP}$ signal is generated once during each $\beta$ cycle, in a manner to be described in connection with FIG. 32B, so that the output of the Instruction Decoder is inhibited until both the P9 and P10 digits of the instruction word are available to the Instruction Decoder.

CONTROL ENCODER—FIGS. 27A–27F

Referring now to FIGURES 27A through 27F there is shown the third element of the Control Circuit, namely the Control Encoder. The Control Encoder is essentially an enlarged version of the encoding matrix or buffing array for high level signals shown in FIGURE 7. Accordingly, the function of this element is to accept a high level signal on any one of a plurality of input lines (shown as horizontal lines) and generate an output signal on a plurality of output lines (shown as vertical lines). Each horizontal input line is labelled to show the source of the signal on the line and to illustrate on which computer operation a high level signal will be presented on any given input line. Each vertical output line is labelled with a symbol (e.g. SC, B, etc.) to indicate the operation a given output line will select.

A dot at the intersection of a horizontal input line and a vertical output line, as shown by the legend on FIG. 27, represents a unilateral conducting element connected to the crossing input and output lines in the manner indicated. The unilateral conducting elements on any one output line act in concert to form a buffer or logical "or" circuit for high level signals, said buffers being noted by reference characters 27–1B to 27–39B. Buffers 27–1B, 27–2B, 27–4B to 27–18B, 27–23B to 27–39B are connected at their outputs to the inputs of complementers bearing the same numeric designation as the buffers driving them, and buffers 27–3B, 27–19B to 27–22B, are connected at their outputs to amplifiers bearing the same numeric designation as the buffers driving them. The aforementioned complementers will produce a low level output signal one-half pulse period after any one of the unilateral conductors connected to their inputs receive a high level signal; and the aforementioned amplifiers will produce a high level signal one-half pulse period after any one of the unilateral conductors connected to their inputs receive a high level signal. The output signals of each of the complementers are designated by an Arabic numeral which is in a circle and the output signals of any of the amplifiers are designated by an Arabic number followed by a + symbol, both in a circle; the + symbol indicates a high level output signal is generated one-half pulse period after the corresponding vertical bus is energized by an input signal.

The amplifiers and complementer in the Control Encoder driven by buffers 27–1B to 27–35B and 27–37B to 27–39B directly generate the variously labelled control signals used throughout the machine. However, complementer 27–36, which is driven by buffer 27–36B, does not directly generate a control signal; instead, the output of complementer 27–36 is connected to one of the three inputs of gate 27–43, which in turn drives complementer 27–42. Complementer 27–42 generates an output one-half pulse period after receiving an input from gate 27–43 and one-half pulse period after the rest of the amplifiers and complementers in the Control Encoder generate outputs. High level outputs generated by complementer 27–42 are designated as the (82+) signal.

High level signals, *t*10B+ and *t*11B+, which are applied to the two remaining inputs of gate 27–43 by the Cycling Unit will be transmitted through the aforesaid gate and cause complementer 27–42 to generate a low signal at least twice during each minor cycle or word time.

It may be observed that all the high level input signals to the Control Encoder with the exception of the 32A, IERA$_1$+, IERA$_2$+, ORA+, Gen Y, Gen B, Gen L, Gen $\beta$, Gen I, Gen 84, SCO$_X$, SCO$_C$ and SCO$_L$ signals and the signals produced by the complementers 27–37 and 27–38 are generated by the Instruction Decoder (FIG. 26). Reference to FIGURE 26 will show that all the outputs of the Instruction Decoder, excepting the (43A) and (60−) outputs, drive the Control Encoder. The output signals of the Instruction Decoder representative of the command portion of the instruction word as previously explained, is generated at time *t*0A. Since each vertical output line of the Control Encoder, with the exception of the line containing buffer 27–36B, drives either an amplifier or complementer, having a half pulse period delay, it will be clear that selected outputs from the Control Encoder representative of the command digits in the Static Register will be generated at time *t*0B. With regard to the output line containing buffer 27–36B it will be understood that the (82+) signal associated therewith is generated at time *t*1A, since the Instruction Decoder signals (e.g. (6A)) which generate the (82+) signal must be propagated through two complementers 27–36 and 27–42.

The ORA+, IERA$_1$+, and IERA$_2$+, and (32A) signals, which are high level signals generated during the multiplication and division operations, are obtained from the OR flip-flop (FIG. 24), the IER flip-flop (FIG. 24), and the D$_3$ flip-flop (FIG. 25) respectively.

The apparatus for generating the signal from the output of complementers 27–37 and 27–38, used in the addition and substraction operations, is shown as comprising a buffer 27–31B in the Control Encoder. Complementers 27–37 and 27–38 are driven by gates 27–40 and 27–41 respectively, each said gate having four input lines thereto. Three of the four inputs, namely the *t*11B− line from the Cycling Unit (FIG. 34), the (4) line from the Control Encoder (FIG. 27) and the CP line from the Complement Flip-Flop (FIG. 21) are connected to both gates 27–40 and 27–41. In addition the $\overline{A}$ and $\overline{C}$ outputs from the Comparator (FIG. 17) are connected to gates 27–40 and 27–41 respectively. One-half pulse period after all the signal inputs to either or both of the two aforementioned gates are at a low level, a high level signal will be generated at the outputs of either element 27–37 or 27–38. As may be observed from FIGURES 27B and 27E the outputs of the aforementioned complementers are connected via a diode 45 to buffer 27–31B.

The Gen I, Gen $\beta$, Gen B, Gen L and Gen Y signals are all high level signals generated by the apparatus shown in FIG. 49A. These high level signals are selectively generated when *new* information is to be transferred from an external data transfer link into the various registers of the computer.

The data transfer link as shall be seen is a one word register R(0) which is used to temporarily store information that is to go into or out of the computer.

The SC0$_X$, SC0$_C$, SC0$_L$ and Gen 84 signals are also high level signals and generated by the apparatus shown on FIG. 49B whenever information is to be transferred from one of the registers of the computer to the data transfer link R(0) Register.

Referring back to FIG. 25 the clearing circuits for the Static Register will now be described.

It will be recalled that a high level signal applied to the clear line will after a one pulse period delay clear the Static Register to produce $\overline{STR1}$, $\overline{STR2}$, $\overline{STR3}$, $\overline{STR4}$, $\overline{STR5}$ and $\overline{STR6}$ signals. The clear line as shall now be shown is connected to eight input circuits each of which selectively causes a high level signal to be applied thereto.

The first of these circuits comprises an element 25–36, which acts as a complementer having a one pulse period delay, connected at its output to the clear line and at its input to the output of gate 25–35, the inputs of which are in turn connected to the (2) output of the Control Encoder (FIG. 27), the *t*1B– output line of the Cycling Unit (FIG. 34), and the SCI output from the Supervisory Control Input Flip-Flop (FIG. 49). When all the inputs to gate 25–35 are at a low level element 25–36 will produce a high level signal one pulse period thereafter which is applied to the clear line of the Static Register.

Functionally gate 25–35 detects a condition wherein an instruction word is externally programmed into the Static Register and Control Register (FIG. 13) from the information transfer link (0 Register) shown in FIGURE 50. When the aforementioned condition occurs it will be appreciated that it is necessary to clear the Static Register in order that it may accept two new digits from the information transfer link (0 Register).

The remaining six input circuits to the clear line all have one element in common, namely amplifier 25–9 which is connected at its output to the clear line. Amplifier 25–9 is connected at its input to the outputs of complementers 25–33, 25–34, 25–6 and complementer 25–27 via buffer 25–40. Complementers 25–33, 25–34, 25–6 and 25–27 are connected at their inputs to gates 25–14, 25–15, 25–16, and 25–17 respectively. Further the input of amplifier 25–9 is connected via line 25–39 to the output of complementer 22–28 (FIG. 22) which selectively produces a high level DI signals and to the (43A) signal line of the Instruction Decoder.

It will be observed that the same elements which are connected to the input of amplifier 25–9 are also connected to the input of complementer 25–37, which produces a low level EP1 signal one-half pulse period after it receives a high level signal at its input from elements 25–33, 25–34, 25–6, 25–27 or lines 25–38 and 25–39. The EP1 signal is used during the load operation, that is when information is being entered into the computer, and its effect will be discussed in connection therewith.

The (43A) high level signal is generated when a stop order (U order) is set up in the Static Register and decoded by the Instruction Decoder and the high DI signal is generated during a division order (D order) if a particular type of error is noted. Either of these high levels signals will cause complementer 25–37 to produce an EP1 signal and amplifier 25–9 to produce a high level signal which is applied to the clear line of the Static Register. Thus the Static Register will be cleared whenever a stop order, as noted by the (43A) signal, is generated or a specific type of error in division occurs as noted by the DI signal.

Gate 25–14, which is the ending pulse gate for the "N" and "V" orders, has ten inputs thereto which are connected to the $\overline{Q1}$, $\overline{Q2}$, $\overline{Q3}$ and $\overline{Q4}$ outputs of the Multiplier Quotient Counter (FIGURE 23); the STR2, STR4, STR5 and $\overline{STR6}$ outputs of the Static Register; the $\overline{SP}$ output of the Stop Flip-Flop (FIG. 32B); and the *t*9B– output of the Cycling Unit (FIG. 34). When all the inputs to gate 25–14 are at a low level, complementer 25–33 produces a high level signal which is applied to the inputs of complementer 25–37 and amplifier 25–9 causing complementer 25–37 to produce a low level EP1 signal and amplifier 25–9 to produce a high level signal which is applied to the clear line. An examination of gate 25–14 and elements 25–33, 25–37 and 25–9 will show that all the inputs to gate 25–14 can only be at a low level at time *t*9B; that a high level signal will appear on the clear line at time *t*10B; and that a low level EP1 signal will be generated by complemneter 25–37 at time *t*10B.

Gate 25–14 detects a condition which indicates that a "32" or "37" order which is being performed has been completed and therefore it is necessary to clear the Static Register so that the cycle of computer operation may continue.

Gate 25–15 is connected at its input to the Q1 and Q3 outputs of the Multiplier Quotient Counter, the $\overline{IER}$ output of the IER flip-flop (FIG. 24) and the *t*9B– output from the Cycling Unit. Gate 25–16 is connected at its inputs to the (67) signal line of the Control Encoder (FIG. 27) and to the *t*9B– output of the Cycling Unit. When all the inputs to either of gates 25–15 and 25–16 are at a low level the complementer associated therewith will produce, after one-half pulse period delay, a high level signal which is applied to the input of complementer 25–37 and amplifier 25–9. Again it will be observed that all the inputs to gates 25–15 and 25–16 may be at a low level only at time *t*9B and, therefore, the clear line will receive a high level signal at time *t*10B and an EP1 signal will be produced at time *t*10B in response to an output from either gate 25–15 or gate 25–16. It will be appreciated, if a high level signal is applied to the clear line at time *t*10B that the Static Register will be cleared at time *t*11B. Gate 25–15 detects the end of an "M" order and gate 25–16 detects the end of a variety of orders listed on (FIG. 25) beneath the inscription of the (67) signal.

Gate 25–17 is connected at its input to the (21) signal line of the Control Encoder and to the *t*4B– output of the Cycling Unit. When both inputs to gate 25–17 are at a low level, a condition which will occur at time *t*4B, complementer 25–27 will produce, after a one-half pulse period delay, a high level signal which will be applied via buffer 25–40 to the input of complementer 25–37 and amplifier 25–9 causing these elements to produce an EP1 signal and a high level signal respectively at time *t*5B. The high level signal generated by amplifier 25–9 at time *t*5B is applied to the clear line of the Static Register; whereby the Static Register will be cleared at time *t*6B in response to an output from gate 25–17. Functionally gate 25–17 detects the end of an "H" or "X" order wherein a word is transferred from the "A" or "X" Registers respectively to a desired memory location on the Drum. It will be understood that after either of these orders are completed, that it will be desirable to clear the Static Register so that the cycle of computer operation may continue.

COMPLEMENT FLIP-FLOP (CPFF)

The details of the complement flip-flop are shown in FIGURE 21 to which reference is now made. The output of this circuit is used to alert various gates in the computer as will be described. For example, the output of this circuit is fed to certain input gates in the comparator, FIGURE 17, and to the adder input gates, FIGURE 18A, and certain of the A Register gates, FIGURE 15, to mention just a few of its connections in the computer.

For convenience this flip-flop will hereinafter be designated as the CPFF circuit. The circuit has two mutually exclusive outputs, designated CP and $\overline{CP}$. The CPFF will be said to be in its CP state if the output on the CP terminal is at a low level. Conversely, the CPFF will be said to be in its $\overline{CP}$ state if the output from the $\overline{CP}$ terminal is at low level.

As shown, the CPFF includes a recirculating loop comprising an A phase complementer 21–11 and a B phase complementer 21–12 connected in a closed loop through a buffer circuit 21–19. Also included in the circuit is a B phase amplifier 21–13 the output of which represents the $\overline{CP}$ output terminal from the circuit. The CP output is taken from the B phase complementer 21–12. Connected to the buffer 21–19 is a *t*11B+ timing signal from the Cycling Unit, FIGURE 34. Thus, once each minor cycle at time *t*11B+, the high level *t*11B+ signal from the Cycling Unit restores the CPFF to its $\overline{CP}$ state. That is a high level pulse at buffer 21–19 causes the output of complementer 21–11 to drop to a low level one-half pulse time later. This low level pulse in turn causes the output of amplifier 21–13 to drop to a low level and the output of complementer 21–12 to rise to a high level one-half pulse time later. The high-level output from complementer 21–12 is recirculated through complementer 21–11 to sustain the high level output on terminal CP and the low level output to terminal $\overline{CP}$. The CPFF is thus periodically restored to its $\overline{CP}$ state.

The CPFF may be set to its CP state through any one of a number of input circuits shown in the lower part of the figure. For example, a high level signal derived from the ORA+ terminal of the OR Flip-Flop, FIGURE 24, is applied to the input of complementer 21–12 causing the output from complementer 21–12 to drop to a low-level one-half pulse time later, and the output of amplifier 21–13 to rise to a high level output. The low level output of complementer 21–12 is recirculated through complementer 21–11 to sustain the low level output from complementer 21–12. The CPFF is thus set to its CP state where it will remain until it is restored by a *t*11B+ timing signal. The ORA+ signal occurs during the shift cycle of the D2 step of a divide operation and will be described later. A high level (20A) signal obtained from the Instruction Decoder, FIGURE 26, during a T operation may also be used to set the CPFF to its CP state in the manner indicated above. In addition to these two sources for setting the CPFF to its CP state, two pairs of input gates comprising gates 21–1 and 21–2 for the first pair and 21–3 and 21–4 for the second pair are also used to set the CPFF to the CP state. The first pair of the above-mentioned gates 21–1 and 21–2 have their outputs connected through respective A phase complementers 21–6 and 21–7 and buffers 21–14 and 21–15 to the set-input of the flip-flop. Gates 21–1 and 21–2 are alerted during an add operation (an A or 70 instruction) and function to compare the sign of the A register operand relative to the sign of the operand derived from the memory, and if there is a difference in signs one of the gates will set the CPFF to its CP state. As will be described, setting CPFF to its CP state causes the operand stored in the A register to be complemented before it is added to the operand derived from the memory.

To this end gates 21–1 and 21–2 each have applied thereto, a (4) signal from the Control Encoder, FIGURE 27, and an $\overline{STR3}$ signal from the Static Register, FIGURE 25. Both the (4) signal and the $\overline{STR3}$ signals are developed at the start of an add operation, and operate to alert both of the gates 21–1 and 21–2.

In addition, gates 21–1 and 21–2 each receive a low level *t*0B– timing signal from the Cycling Unit, FIGURE 34. Finally gate 21–1 receives the A– output from the Sign of *r*A Flip-Flop, FIGURE 11, and the $\overline{M1}$ output of the Minuend Buffer circuits, FIGURE 20; and gate 21–2 receives the A+ output from the sign of *r*A Flip-Flop and the M1 output of the Minuend Buffer circuits. It will be later seen that, if the operand stored in the A Register is plus, the Sign of *r*A Flip-Flop is set to A+, or alternatively if the sign of this operand is negative the sign of *r*A Flip-Flop will be set to A–. It will be remembered that the sign of a word derived from the memory is indicated by the presence or absence of a "1" bit in the 1st bit position of the P0 digit. That is, if the data word taken from the memory has a positive sign the 1st bit of the P0 digit will be a "0," while if the sign is negative, the 1st bit of the P0 digit will be a "1." Thus if the data word is positive the $\overline{M1}$ output line of the Minuend Buffer will be at a low level during P0 or conversely the M1 output line will be at a low level during P0 if the data word has a negative sign. Thus gate 21–1 with its A– and $\overline{M1}$ connections look for the condition where the operand stored in the A Register is negative and the operand derived from the memory is postive. If this condition obtains a *t*0B– timing signal is gated through gate 21–1. Complementer 21–6 then generates a high level pulse one-half pulse time later to set CPFF to its CP state at time *t*1B. Gate 21–2 on the other hand with its A+ and M1 inputs checks for the opposite conditions where the sign of the operand derived from the memory is negative and the sign of the operand stored in the A Register is positive. If this condition obtains, a *t*0B– timing signal is gated through gate 21–2. Complementer 21–7 then generates a high level pulse one-half pulse time later to set the CPFF to its CP state at time *t*1B.

The second pair of gates mentioned above, namely 21–3 and 21–4 are alerted during a substract operation (identified as an S or 75 instruction) and function to compare the sign of the operand stored in the A Register with the sign of the operand obtained from the memory. If there is no difference in signs then the CPFF is set to its CP state, and the operand stored in the A Register is complemented before it is added to the operand derived from the memory.

To this end, gates 21–3 and 21–4 each receive a (4) Encoder signal from FIGURE 27 and an STR3 signal from the Static Register, FIGURE 25. Both of these signals occur responsive to the initiation of a subtract operation. These gates also receive a *t*0B– timing signal from the Cycling Unit, FIGURE 34. As the final inputs, gate 21–3 receives the A– output from the sign of *r*A Flip-Flop of FIGURE 11 and the M1 output from the Minuend Buffer circuits of FIGURE 20; while gate 21–4 receives the A+ output from the Sign of *r*A Flip-Flop and the $\overline{M1}$ output of Minuend Buffer circuits. Thus from the preceding discussion on how the signs of the operands are indicated it will be seen that gate 21–3 will gate a *t*0B signal through to complementer 21–8 which in turn will set the CPFF to its CP state if the signs of the operands stored in the A Register and derived from the memory are both negative; while gate 21–4 will gate a *t*0B signal through to complementer 21–9 to in turn set the CPFF to its CP state if the signs of both operands are positive during a subtract operation.

In addition to the gates 21–1 to 21–4 there is further included a fifth gate labelled 21–5 which functions through complementer 21–10 and buffer 21–18 to set the CPFF to its CP state during certain operations such as for example a search operation. This gate has *t*0B– timing signal applied thereto and a (74) encoder signal. The latter signal, namely the (74) signal obtains during a search operation, a Q instruction and, as will later be described during the A2 correction cycle of an add operation. Thus during any of these operations, gate 21–5 will gate a *t*0B– signal through to complementer 21–10 which in turn will set the CPFF to its CP state at time *t*1B.

Although the CP and $\overline{CP}$ output terminals represent the main output points from the CPFF circuit, there is also derived from the circuit five outputs labelled CP1 to CP5 taken respectively from the output of complementers 21–6, 21–7, 21–8, 21–9 and 21–10. These five outputs are fed to buffer 17–8 of the Comparator Circuit, FIGURE 17B, to generate the A and C comparator signals during the start of the search operation or at the start of an add or a subtract operation whenever the CPFF is set to its CP state.

COMPARATOR—FIGURES 17A TO 17D

Referring now to FIGURES 17A through 17D there is shown the segment of the computer which has been designated as the Comparator. Functionally, the Comparator is involved in both control and arithmetic operations and signals derived therefrom are used in the Address Selection operation and the operations concerned with algebraically manipulating or comparing two operands. The output lines of the Comparator are shown on FIGURE 17A wherein signals are generated in groups in a mutually exclusive manner as follows:

A′ and A signals or $\overline{A}'$ and $\overline{A}$ signals:
A and C signals or $\overline{A}$ and $\overline{C}$ signals:
C and C′ signals or $\overline{C}$ signals:
and EQ, C′ and C signals or $\overline{C}$ and $\overline{EQ}$ signals.

It should be noted that a given signal from the Comparator is present when the element generating that signal is yielding a low level output. As will be apparent from the following description, two groups of mutually exclusive signals may be generated simultaneously, that is the A′ and the A signal may be generated at the same time as the C and the C′ signals.

Figures 17A, 17B:
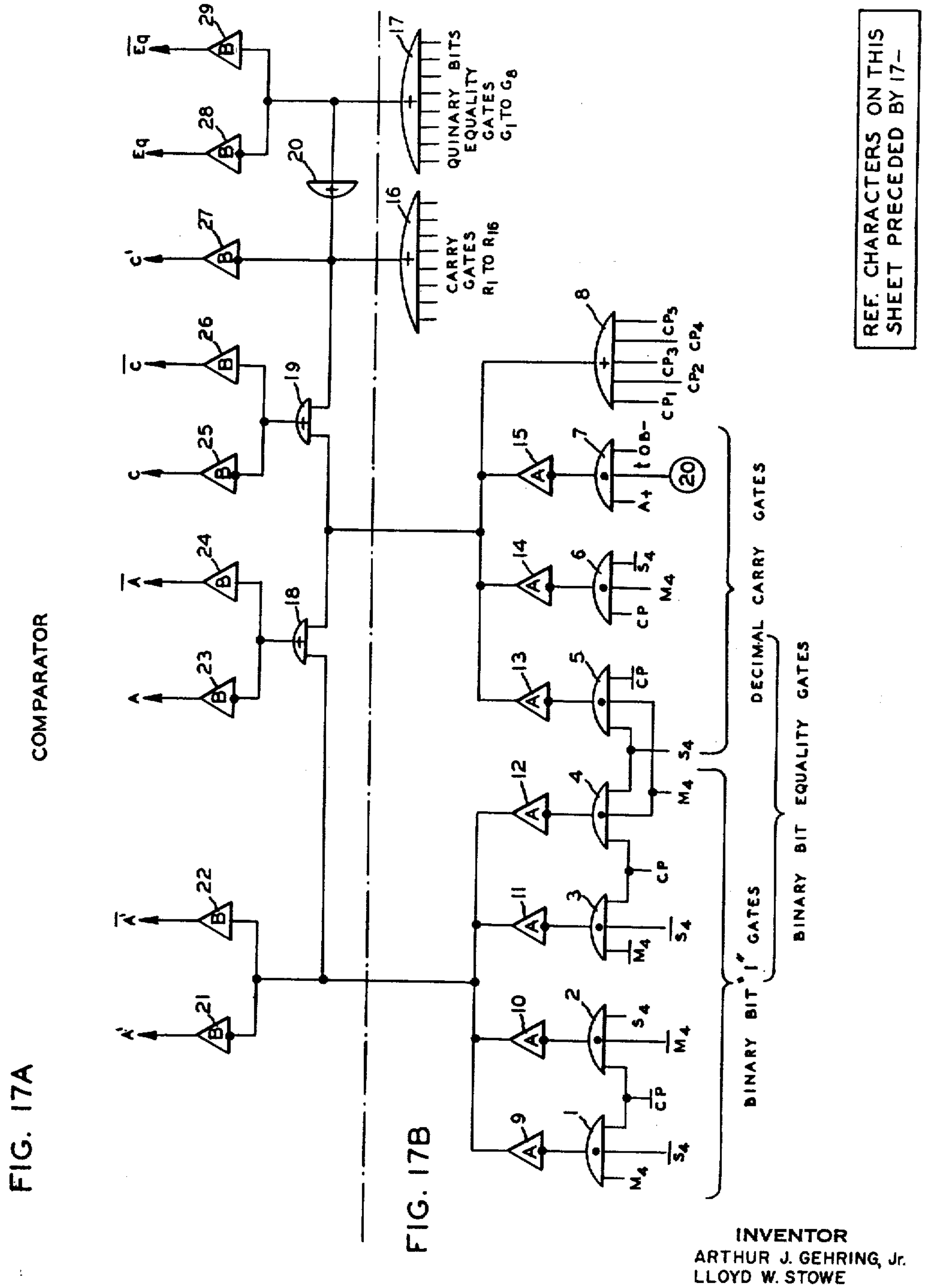
Figure 17C:
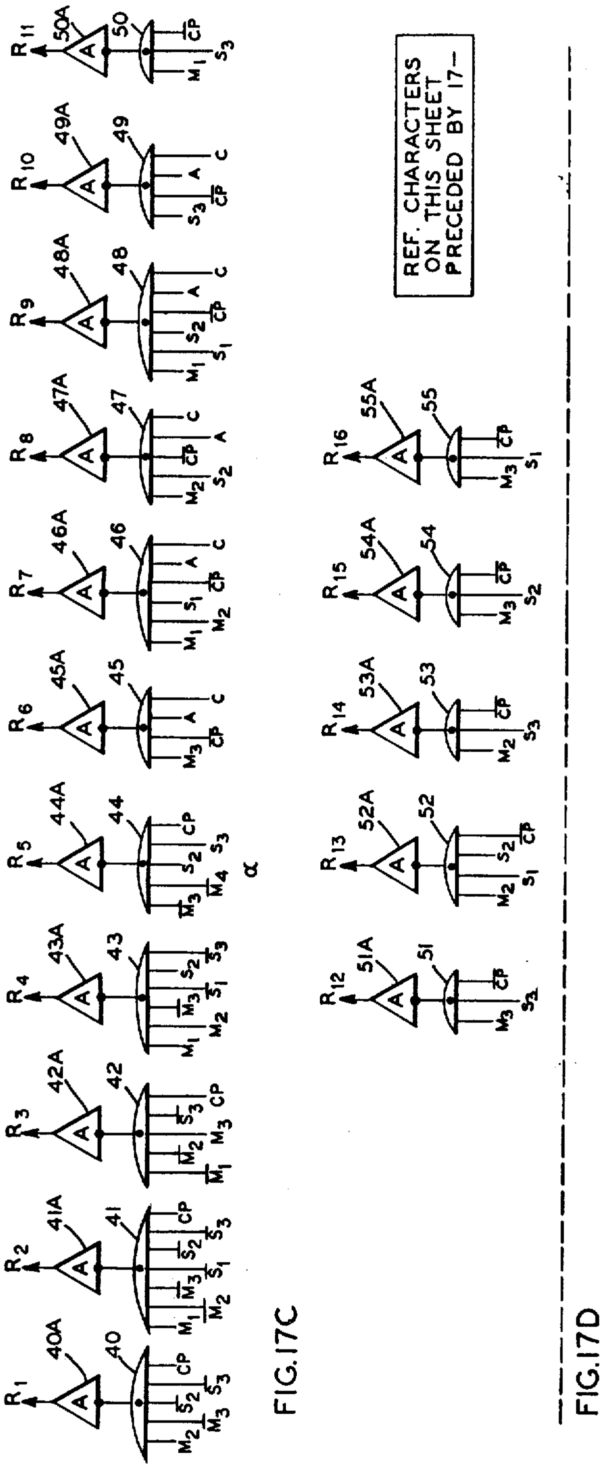
Figure 17D:
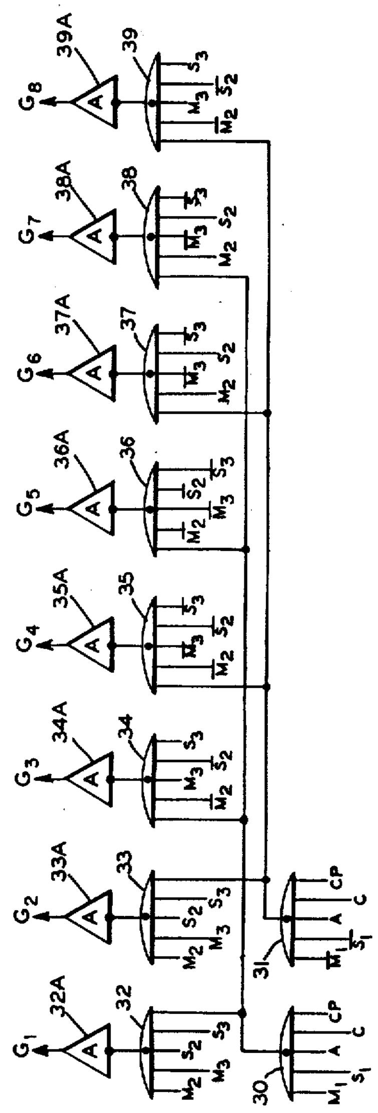

It will be seen from FIGURE 17A that the A′ or $\overline{A}'$ signals as well as the A or $\overline{A}$, C or $\overline{C}$, and the EQ or $\overline{EQ}$ signals are each generated by identical pairs of complementers and amplifiers connected together at their inputs wherein the aforementioned signals are derived from the outputs Complementer 17–21 and Amplifier 17–22; Complementer 17–23 and Amplifier 17–24; Complementer 17–25 and Amplifier 17–26; and Complementer 17–28 and Amplifier 17–29 respectively. Further, it will be observed that the C′ signal is generated by Complementer 17–27 and it will be noted that this signal is generated one-half pulse period after a high level signal is applied to said complementer.

When a high level signal is present at the common input of any amplifier-complementer pair the unbarred output from that pair will be generated one-half pulse period after the applied high level input, and conversely a low level signal applied to any of the paired elements will cause the barred output to be generated one-half pulse period thereafter.

In order to facilitate the explanation of the Comparator the input elements for each complementer-amplifier pair will be described separately. The common input of elements 17–21 and 17–22, from which the A′ and $\overline{A}'$ signals are generated, is connected to the output of four Complementers 17–9 through 17–12. Said Complementers 17–9 through 17–12 are in turn connected at their inputs to coincidence gates 17–1 through 17–4 respectively. Gate 17–1 and 17–2 are both connected to the $\overline{CP}$ output of the Complementer Flip-Flop (FIGURE 21), the M4 and $\overline{M4}$ outputs of Min Buffer 4 respectively, and the $\overline{S4}$ and S4 outputs of Sub Buffer 4 respectively. Gates 17–3 and 17–4 are both connected to the CP output of the Complementer Flip-Flop, the $\overline{M4}$ and M4 outputs of Min Buffer 4 respectively and the $\overline{S4}$ and S4 outputs of Sub Buffer 4, respectively. When all the inputs to any of the gates 17–1 through 17–4 have low level signals applied thereto, a high level output signal will be generated by one of the complementers 17–9 through 17–12 which will in turn cause a low level A′ signal to be generated by complementer 17–21 and a high level signal from amplifier 17–22. If, however, there is no coincidence of low level signals on any of the inputs to gates 17–1 through 17–4 it will be appreciated that a low level $\overline{A}'$ signal will be generated by amplifier 17–22 and a high level signal from complementer 17–21.

It will be noted at this point that the output of complementers 17–9 through 17–12 are also connected through buffer 17–18 to the common input of complementer 17–23 and amplifier 17–24. Thus a high level signal generated by any of the aforementioned complementers 17–9 to 17–12 will be transmitted to the common input of elements 17–23 and 17–24 causing a low level A signal to be produced by complementer 17–23. The same stimulus is applied by complementers 17–9 through 17–12 to paired elements 17–21, 17–22, and 17–23, 17–24 so that whenever a low level A′ signal is generated a low level A signal is also generated. Further, the common inputs of complementer 17–23 and amplifier 17–24 are connected through buffer 17–18 to the output of complementers 17–13 through 17–15 and buffer 17–8; said buffer being connected to the CP1 to CP5 outputs of the Complementer Flip-Flop (FIGURE 21). Complementers 17–13 to 17–15 are connected at their inputs to gates 17–5 through 17–7 respectively. Each of the latter gates has three inputs which are connected as follows: Gates 17–5 and 17–6 are connected respectively to the $\overline{CP}$ and CP outputs of the Complementer Flip-Flop, the M4 output of Min Buffer 4 and the S4 and $\overline{S4}$ outputs of Sub Buffer 4 respectively; and gate 17–7 is connected to the A+ output of the Sign of *r*A Flip-Flop (FIGURE 11A), the (20) output line from the Control Encoder (FIGURE 27) and the *r*0B– output line from the Cycling Unit (FIGURE 34).

When all the inputs to any of the gates 17–5 through 17–7 are at a low level, a high level output signal will be produced by a corresponding complementer 17–13 to 17–15. The resultant high level signal passes through buffer 17–18 causing a low level A signal to be generated by complementer 17–23. Further, a high level input signal on any of the input lines of buffer 17–8 will be transmitted therethrough and through buffer 17–18 to the inputs of elements 17–23 and 17–24 causing complementer 17–23 to produce an A signal. Conversely, if complementers 17–13 to 17–15 and buffer 17–8 all cause a lower level signal to be present at the common input of complementer 17–23 and amplifier 17–24 an $\overline{A}$ signal will be produced.

In addition it will be observed that the output of complementers 17–13 through 17–15 and buffer 17–8 are connected to the input of paired elements 17–25 and 17–26 via buffer 17–19; therefore, a high level signal produced by any of the elements 17–8, 17–13 to 17–15 will be transmitted to complementer 17–25 and amplifier 17–26 causing a C signal to be developed. Since both complementer-amplifier pairs 17–23, 17–24, and 17–25, 17–26, are driven by components 17–8 and 17–13 through 17–15 it will be appreciated that A and C signals or $\overline{A}$ and $\overline{C}$ signals will be produced simultaneously whenever the simulus for elements 17–23 to 17–26 is derived from elements 17–8 or elements 17–13 to 17–15 inclusive.

The complementer-amplifier pair 17–25 and 17–26 is also driven, via buffer 17–19, by the output of buffer 17–16 and by the output of buffer 17–17 via buffers 17–20 and 17–19. Complementer 17–27, which generates a C′ signal, is driven by buffer 17–16 and buffer 17–17 via buffer 17–20; and amplifier-complementer pair 17–28 and 17–29, which generates the EQ or $\overline{EQ}$ signals, is driven by the output of buffer 17–7 alone. A high level signal transmitted through buffer 17–16 will cause a C and C′ signal to be simultaneously generated and a high level signal from buffer 17–17 will cause a C′, a C and an EQ signal to be generated simultaneously.

The inputs to gates 17–1 to 17–6 are all connected to the several outputs, as previously indicated, of Min Buffer 4, Sub Buffer 4 and the Complementer Flip-Flop. Gates 17–1 to 17–6 therefore respond to binary bit information (the fourth bit position of the code) of the digits being transferred by the Minuend and Subtrahend Buffers. Assuming that a $\overline{CP}$ signal is generated by the Complementer Flip-Flop (FIGURE 21), gates 17–1, 17–2 and 17–5 will be alerted to check binary bit information being routed by the transfer system (FIGURES 19 and 20). Either gate 17–1 or 17–2 will transmit a low level pulse when the bits on the S4 and M4 lines of the transfer system are not the same (i.e. not equal). Stated differently, these gates check for the condition where one but not both of the digits appearing on the M and S lines is greater than 5. A low level signal pulse transmitted by either of these gates will, as previously explained, cause A′ and A signals to be generated by complementers 17–21 and 17–23.

Gate 17–5, under the assumed $\overline{CP}$ condition, will transmit a low level signal when there is a "1" bit on both of the M4 and S4 lines and will cause A and C signals to be generated by complementers 17–23 and 17–25.

When a CP signal is generated by the Complementer Flip-Flop (FIGURE 21), gates, 17–3 or 17–4 will transmit a low level pulse when the bits on the S4 and M4 lines are identical. As in the case of gates 17–1 and 17–2 a low level pulse transmitter by gates 17–3 or 17–4 will cause an A′ and an A signal to be produced. Gate 17–6, which is also alerted by the presence of a CP signal, will transmit a low level signal when there is a "1" bit on the M4 line and a "0" bit on the S4 line; stated differently a low level pulse will be transmitted when the decimal digit on the M lines is 5 or greater and the decimal digit on the S lines is less than 5. As noted a low level signal transmitted by gate 17–6 causes an A and C signal to be produced by complemetners 17–23 and 17–25 respectively.

Gate 17–7 passes a low level pulse at the beginning, or at time *t*0 of a T order when the (20) signal is present, if the sign of the information in *r*A is plus as noted by the A+ signal (derived from the Sign of *r*A Flip-Flop, FIGURE 11A) at the input to gate 17–7. The low level output of gate 17—7 will, as previously described, cause an A and C signal to be generated.

Buffer 17–8 will transmit a high level signal from one of the CP1 to CP5 outputs of the Complementer Flip-Flop (FIGURE 21) at the instant the Complementer Flip-Flop is set to CP via any of the gates (FIGURE 21) receiving a (4) or (74) signal from the Control Encoder (FIGURE 27). The high level signal transmitted via buffers 17–8, 17–18, and 17–19 again causes an A and C signal to be produced.

Buffers 17–16 and 17–17 reflect the result of a comparison of the quinary bits of information on the $S_1$ to $S_3$ and $M_1$ to $M_3$ lines of the Subtrahend and Minuend buffers.

Buffer 17–16 has 16 inputs thereto labeled R1 to R16 which are derived from complementers 17–40A to 17–55A (FIG. 17C), wherein said complementers 17–40A to 17–55A are in turn connected to the outputs of coincidence gates 17–40 to 17–55 respectively. All the gates 17–40 to 17–55 are connected to the designated outputs of the Minuend Buffer (FIGURE 20), Subtrahend Buffer (FIGURE 19) and Complementer Flip-Flop output CP or $\overline{CP}$ (FIGURE 21) with the exception of gate 17–43 which is not driven by the Complementer Flip-Flop.

Assuming that the Complementer Flip-Flop is set to CP, gates 17–40 to 17–42 will be alerted to detect the condition wherein the quinary portion of the digit on the M lines is greater in magnitude than the quinary portion of the digit on the S lines. Whenever all of the inputs to any one of the gates 17–40 to 117–42 are at a low level, a high level signal will be generated on an R line by one of the complementers 17–40A to 17–42A associated with the gate selected. It will be appreciated that a high level signal on any of the R lines will pass through buffer 17–16 and cause a C and C′ signal to be simultaneously produced by complementers 17–25 and 17–27 respectively. The C and C′ signal when so generated may be taken to indicate that the quinary portion of a digit on the M lines is greater than the quinary portion of a digit on the S lines.

Chart AC shown below lists in Column G all the gates alerted by the CP signal which check for the quinary portion of the digit on the M lines being greater than the corresponding portion of the digit on the S lines. In Columns 1 and 2 and in line with the gate affected are listed the M and S lines connected thereto, and in Columns 3 and 4 in the same row are listed the possible decimal values of the quinary portion of the digit on the M and the S lines. Since all the barred or unbarred outputs of Min Buffers 1 to 3 and Sub Buffers 1 to 3 are not connected to the gates listed in Chart AC the quinary portion of a digit on the M and S lines is not uniquely defined. However, it will be observed in all cases that every possible value for the quinary portion of a digit on the M lines is greater than every possible value for the quinary portion of a digit on the S lines.

CHART AC

| Col. G. | Col. 1 Min Buffer Inputs | Col. 2 Sub Buffer Inputs | Col. 3 Poss. Quin. Val. on M Lines | Col. 4 Poss. Quin. Val. on S Lines |
|---|---|---|---|---|
| 17–40 | $\bar{M}_3$, $M_2$ | $\bar{S}_3$, $\bar{S}_2$ | 2, 3 | 0, 1 |
| 17–41 | $\bar{M}_3$, $\bar{M}_2$, $M_1$ | $\bar{S}_3$, $\bar{S}_2$, $\bar{S}_1$ | 1 | 0 |
| 17–42 | $M_3$, $\bar{M}_2$, $\bar{M}_1$ | $\bar{S}_3$ | 4 | 0, 1, 2, 3 |

Reference to Chart AC above will show that one pair of values which should generate an R signal is not checked for by gates 17–40 to 17–42; namely, when the value of the quinary portion of the digit on the M lines is equal to 3 and the value of the quinary portion of the digits on the S lines is equal to 2. An examination of the inputs to gate 17–43 will show that an R signal will be generated by complementer 17–43A when this condition exists as determined by the inputs of the aforementioned gate.

In the operation of the computer it may be advantageous to compare a numeric value against an alaphabetic symbol. The code for the aliphabetic symbols does not necessarily follow a weighted order such as used herein to designate numeric values, and may be completely arbitrary. The result of the comparison of two symbols expressed in a non-weighted code, or a symbol in a non-weighted code and a digit in a weighted code may be in part determined by a structure similar to gates 17–41 to 17–43. One such gate 17–44 for comparing a digit and an alphabetic symbol is shown and this gate is driven by the designated outputs of the Minuend and Subtrahend Buffers and the CP output of the Complementer Flip-Flop. This gate 17–44 compares selected bits of the non-weighted code representing an ignore symbol, delete symbol, period, or tab symbol on the S lines against numeric values of 0, 1, 2, or 3 on the M lines. It will be observed that gate 17–44 may receive selected bits of both the quinary and binary portion of a decimal digit from the Minuend and Subtrahend Buffers (FIGURES 19 and 20). Other gates similar in structure to gate 17–44 which are not shown may be used to aid in comparing data of a similar nature. For convenience there is listed below in Table 1 the code for all the digits and alphabetic symbols presently used in this machine.

TABLE 1

| | Binary | Quinary |
|---|---|---|
| Ignore | 0 | 111 |
| Delete | 0 | 110 |
| Minus | 0 | 101 |
| 0 | 0 | 000 |
| 1 | 0 | 001 |
| 2 | 0 | 010 |
| 3 | 0 | 011 |
| 4 | 0 | 100 |
| 5 | 1 | 000 |
| 6 | 1 | 001 |
| 7 | 1 | 010 |
| 8 | 1 | 011 |
| 9 | 1 | 100 |
| Period | 1 | 111 |
| Tabulate | 1 | 110 |
| Carriage Return | 1 | 101 |

The digits and alphabetic symbols are listed in order of increasing magnitude, as viewed by the comparator gates, so that the lowest value is the ignore symbol and the highest value is the carriage return symbol. It will be appreciated from the list that the bits in the decimal digits have a weighted significance while this is not true in the case of the bits for the alphabetic symbols.

Assuming now that the Complementer Flip-Flop is cleared to $\overline{CP}$ gates 17–50 to 17–55 will be alerted to produce an output when the quinary portion of the digit on the M lines plus the quinary portion of the digit on the S lines sums to a value of greater than four. Whenever all the inputs to anyone of gates 17–50 to 17–55 are at a low level, a high level R signal will be generated by one of the complementers 17–50A to 17–55A thereby causing a C and C′ signal to be produced simultaneously by complementers 17–25 and 17–27 respectively. The C and C′ signals when so generated may be taken to indicate that the quinary portion of a digit on the M lines plus the quinary portion of a digit on the S lines sums to a value greater than four.

Chart AD shown below lists in Column G all the gates alerted by the $\overline{CP}$ signal which check for a quinary summation of the digits on M and S equal to a sum greater than four. In Columns 1 and 2 in a row with the gate affected are listed the M and S lines connected thereto and in Columns 3 and 4 are listed the possible values of the quinary portions of the digit on the M and S lines. In all cases every possible value of a quinary portion of a digit on the M lines plus every possible value of the quinary portion of a digit on the S lines sums to a value of 5 or more (that is a sum greater than 4).

CHART AD

| Col. G | Col. 1 Min. Buffer Inputs | Col. 2 Sub. Buffer Inputs | Col. 3 Pos. Quinary Values on M Lines | Col. 4 Pos. Quinary Values on S Lines |
|---|---|---|---|---|
| 17–50 | $M_1$ | $S_3$ | 1, 3 | 4 |
| 17–51 | $M_3$ | $S_3$ | 4 | 4 |
| 17–52 | $M_2$ | $S_2, S_1$ | 2, 3 | 3 |
| 17–53 | $M_2$ | $S_3$ | 2, 3 | 4 |
| 17–54 | $M_3$ | $S_2$ | 4 | 2, 3 |
| 17–55 | $M_3$ | $S_1$ | 4 | 1, 3 |

It will be observed from the above chart that gates 17–50 to 17–55 do not check for a condition where the quinary portion of the digit on the M lines is equal to 3 and the quinary portion of the digit on the S lines is equal to 2 so that these aforementioned gates would not produce an R signal from the sum of these two digits. However, an examination of gate 17–43 again will show that an R signal will be generated by complementer 17–43A when this condition (M=3, S=2) exists as determined by inputs of gate 17–43.

Gates 17–45 to 17–49, which are also alerted by the $\overline{CP}$ signal, function in a manner similar to gates 17–50 to 17–55 just described; however, it will be noticed that gates 17–45 to 17–49 in addition to being driven by the M and S lines are connected to the outputs of elements 17–23 and 17–25, which produce the A and C signals respectively. The A and C signals appearing at gates 17–45 to 17–49 result, as shall be fully explained later, from the comparison of the immediately preceding M and S line digits received by the Comparator. Assuming that the last comparison of two digits from the Minuend and Subtrahend buffers produced an A and C signal and that the $\overline{CP}$ signal is present, then gates 17–45 to 17–49 will be alerted to produce an output when the quinary portion of the digit on the M lines and the quinary portion of the digit on the S lines sums to a value of at least 4. An output from any of these gates will cause one of the complementers 17–45A to 17–49A to produce an R signal which in turn will permit a C and C′ signal to be generated by elements 17–25 and 17–27, respectively.

Chart AE, shown below, lists in Column G, all the gates alerted by the $\overline{CP}$, A and C signals which check for a quinary summation of the digits on the M and S lines equal to a sum of at least 4. In Columns 1 and 2 in a row with the gate affected are listed the M and S lines connected thereto and in Columns 3 and 4 are listed the possible values of the quinary portions of the digit on the M and S lines.

CHART AE

| Col. G Gate | Col. 1 Min. Buffer Inputs | Col. 2 Sub. Buffer Inputs | Col. 3 Pos. Quinary Values on Lines | Col. 4 Pos. Quinary Values on Lines |
|---|---|---|---|---|
| 17–45 | $M_3$ | | 4 | 0, 1, 2, 3, 4 |
| 17–46 | $M_3, M_1$ | $S_1$ | 3 | 1, 3 |
| 17–47 | $M_2$ | $S_2$ | 2, 3 | 2, 3 |
| 17–48 | $M_1$ | $S_2, S_1$ | 1, 3 | 3 |
| 17–49 | | $S_3$ | 0, 1, 2, 3, 4 | 4 |

Having described all the inputs to buffer 17–16 there yet remains to be presented an analysis of the several inputs to buffer 17–17. The several inputs to buffer 17–17 again reflect a comparison of the quinary information on the M and S lines of the Minuend and Subtrahend Buffers. Buffer 17–17 has 8 inputs thereto labeled G1 to G8 which are derived from the output of complementers 17–32A to 17–39A; wherein the inputs of said complementers are in turn connected to the outputs of coincidence gates 17–32 to 17–39 respectively. All the gates 17–32 to 17–39 are connected to designated $M_2$ $M_3$, $\overline{M}_2$, $\overline{M}_3$, $S_2$, $S_3$, $\overline{S}_2$ and $\overline{S}_3$ outputs of the Minuend Buffer (FIGURE 20) and Subtrahend Buffer (FIGURE 19). In addition gates 17–32, 17–34, 17–36 and 17–38 are connected at their inputs to the output of gate 17–30; and gates 17–33, 17–35, 17–37 and 17–39 are connected at their inputs to the output of gate 17–31. Both gates 17–30 and 17–31 are driven by the CP output of the Complementer Flip-Flop and the outputs of elements 17–23 and 17–25 which produce the A and C signals respectively (FIGURE 17). The A and C signals, as shall be fully explained later, are a function of the comparison of digits already operated upon by the Comparator. Additionally gates 17–30 and 17–31 are respectively connected at their inputs to the $M_1$ and $S_1$ and $\overline{M}_1$ and $\overline{S}_1$ outputs of Min Buffer 1 and Sub Buffer 1.

Assuming that the Complementer Flip-Flop is set to CP, gates 17–30 to 17–39 will be alerted to detect a condition wherein the quinary portions of the digits presently on the M and S lines are equal, *provided* that the previous digit on the M and S lines produced both A and C signals. Whenever all the inputs to any of the gates 17–32 to 17–39 are at a low level and all the inputs to either of gates 17–30 or 17–31 are at low level, a high level signal will be generated on a G line by one of the complementers 17–32A to 17–39A associated with the gate selected. It will be appreciated that a high level signal on any of the G lines will pass through buffer 17–17 and cause a C, C′ and EQ signal to be simultaneously produced by complementers 17–25, 17–27 and 17–28 respectively.

Gates 17–32 to 17–34 acting in concert with gates 17–30 and 17–31 are employed to detect a condition wherein the quinary portions of non-numeric information (see Table 1) on both the M and S lines are identical. Gates 17–35 to 17–39 together with gates 17–30 and 17–31 are used to detect a condition wherein the quinary portions of numeric information on the M and S lines are identical. An examination of gates 17–35 to 17–39 will show that these gates each respond to a condition wherein the quinary information on the M and S lines ranges from 0 to 4 respectively, e.g. gate 17–38 will transmit a low level signal when the quinary portions of the digits on the M and S lines are both equal to 3. Gates 17–32 to 17–34 each inspect the quinary portion of two non-numeric symbols as listed below which may be transmitted on the M and S lines: Gate 17–32 inspects for the quinary portion of the ignore and period symbol; gate 17–33 inspects for the quinary portion of the delete and tabulate symbol; gate 17–34 inspects for the quinary portion of the minus and carriage return symbol.

CONTROL TRANSFER FLIP-FLOPS—FIGURES 12, 12A AND 12B

Referring now to FIGURE 12 there is shown at 12A the Control Transfer Flip-Flop which shall hereinafter be abbreviated as the CTFF. The CTFF produces either a CT output from amplifier 12–29, or a $\overline{CT}$ output from complementer 12–30. The CT output is said to be present (that is CTFF is set to its CT state) when amplifier 12–29 produces low level output signals and complementer 12–30 produces high level output signals. When the converse is true (that is when the CTFF is cleared to its $\overline{CT}$ state) the $\overline{CT}$ output is present. It is, of course, obvious that the CT and $\overline{CT}$ states are mutually exclusive and that the CTFF operates in a similar manner to the generalized flip-flop shown in FIGURE 8A.

The output signals $\overline{CT}$ and CT of the CTFF control respectively gates 13–3A to 13–3D and gates 13–4A to 13–4D of the C register (FIGURE 13). As will be explained in connection with the C register and the search operation, these two sets of gates 13–3A to 13–3D and 13–4A to 13–4D allow either the *c* or *m* portion respectively of the instruction word to determine the location on the Drum Memory of the next data or instruction word to be used by the computer. Further the $\overline{CT}$ output is applied to gates 28–8, 28–10 and 28–12 and the CT output is applied to gates 28–7, 28–9 and 28–11 in the Memory Band and Head Selection circuit of FIGURE 28.

The CTFF comprises an amplifier 12–29 and a complementer 12–30 connected together at their inputs and jointly driven by the output of complementer 12–26 and buffer 12–31. The outputs of the latter two elements 12–26 and 12–31 also are connected to the recirculation input 12–28A of gate 12–28, the output of which is connected to the input complementer 12–27. The output of complementer 12–27 is in turn connected to the input of complementer 12–26 so that a closed loop is formed comprising elements 12–26, 12–28 and 12–27.

The CTFF receives inputs at three of its elements, namely complementer 12–26, gate 12–28 and buffer 12–31. A high level signal applied to the input of complementer 12–26 causes this element to produce a low level output signal one-half pulse period thereafter which is applied to the inputs of amplifier 12–29, complementer 12–30 and to the recirculation input 12–28A of gate 12–28. The low level output produced by complementer 12–26 causes amplifier 12–29 and complementer 12–30 to produce, after a half pulse period delay, a low level and a high level output signal respectively, whereby the CTFF is set to its CT state. Additionally, the low level output of complementer 12–26 is transmitted via gate 12–28 to the input of complementer 12–27 which after a half pulse period delay causes another high level signal to be applied to the input of complementer 12–26 thereby sustaining the CTFF in its CT state.

A high level signal applied to the clear input 12–28B of gate 12–28 will as previously explained in connection with the section on gates and buffers cause a high level signal to be transmitted through gate 12–28 notwithstanding the level of the signals on its remaining input 12–28A. This high level signal will be propagated through complementers 12–27 and 12–26 causing a low level signal to be generated by complementer 12–30 whereby the CTFF is cleared to a $\overline{CT}$ state. Further the high level output of complementer 12–26 is recirculated via elements 12–28 and 12–27 thus sustaining the CTFF in its $\overline{CT}$ state. When the CTFF is cleared to its $\overline{CT}$ state the clear input terminal 12–28B is ineffective to set the CTFF to CT. To set the CTFF requires that a high level signal to arrive on line 12–28C as will later be described.

A high level signal applied to either of the inputs of buffer 12–31 will be transmitted to the common input of amplifier 12–29 and complementer 12–30 and to the recirculation input 12–28A of gate 12–28 causing after the delay inherent in elements 12–30 and 12–29, a low level signal and a high level signal to be generated by the aforementioned elements respectively, whereby the CTFF is cleared to its $\overline{CT}$ state. Since, the output of buffer 12–31 also drives the recirculation input 12–28A of gate 12–28 the CTFF will continue to produce $\overline{CT}$ outputs.

Since each complementer or amplifier in the CTFF has an inherent one-half pulse period delay, it will be appreciated by observing the construction of the CTFF that: (1) a high level signal applied to the input 28C of complementer 12–26 will cause the CTFF to produce CT signals one pulse period thereafter, (2) a high level signal applied to the input of 12–28B of gate 12–28 will cause the CTFF to produce $\overline{CT}$ signals one and one-half pulse periods thereafter and (3) a high level signal applied to either input of buffer 12–31 will cause the CTFF to produce $\overline{CT}$ signals one-half pulse period thereafter.

There are four conditions during computer operation that will cause the CTFF to be set to its CT state. Gates 12–1, 12–2, 12–37 and 12–38 each detect one of these conditions. Each of the aforesaid gates are connected at their outputs to the inputs of complementer elements 12–13, 12–14, 12–39 and 12–40 respectively all of which in turn drive the input 12–28C of complementer 12–26. Elements 12–39, 12–40 and 12–14 react as a complementer having a full pulse period delay while complementer 12–13 provides a one-half pulse period delay.

Gate 12–37 detects a specific condition during an I order as noted by the five inputs to this gate which are as follows: The IB2 output from the I*b* flip-flop (FIGURE 48A), the $\overline{SP}$ output from the stop flip-flop (FIGURE 32B), the $\overline{load}$ output from the load flip-fiop (FIGURE 50), the (29) signal line from the Control Encoder (FIGURE 27), and the *t*0B– timing signal from the Cycling Unit (FIGURE 34). As shall be fully explained in connection with the "I" order it will be desirable to set the CTFF to its CT state when all five inputs to gate 12–37 are at a low level. When this condition obtains, gate 12–37 will transmit a low level pulse to the input of element 12–39 which will produce a high level signal one pulse period later causing the CTFF to be set to its CT state. It will be recalled that the "I" order allows the transfer of the contents of the register to the A Register if the 0 Register is full and causes the *m* portion of the instruction word in the C Register to determine the location of the next instruction word to be used by the computer. To this end the IB2 signal indicates that the 0 Register is full and in combination with the other signals on gate 12–37 causes the CTFF to be set to its CT state, whereby gates 13–4A to 13–4D (FIGURE 13) of the C Register will be alerted to permit the *m* portion of the instruction word contained therein to be used in determining a memory address.

Gate 12–38 in combination with element 12–40 performs a function similar to that described in connection with gate 12–37. This gate 12–38 detects a specific condition during a "0" order as noted by the four inputs thereto which are: the $\overline{IA}$ output of the IA flip-flop (FIGURE 48A), the $\overline{load}$ output of the load flip-flop (FIGURE 50) the *t*10B– timing pulse from the Cycling Unit and the (83) signal line from the Control Encoder (FIGURE 27).

It will be recalled that the 0 instruction specifies that the contents of the A Register be transferred to the 0 Register and that the address of the next instruction word in the memory be specified by the *m* portion of the word presently in the C Register provided the 0 Register is not in use when the transfer ($rA \rightarrow r0$) is to take place. The presence of the $\overline{IA}$ signal indicates as will be later explained that the 0 Register is not in use and therefore the $\overline{IA}$ signal in combination with the other signals applied to gate 12–38 will in a manner similar to that explained in connection with the signals applied to gate 12–37 cause the CTFF to be set to its CT state.

Gate 12–1 in combination with complementer 12–13 again will cause the CTFF to be set to its CT state when the inputs to gate 12–1 are all at a low level. A (60–) signal generated by the Instruction Decoder (FIGURE 26) at the beginning of a T or Q instruction and a *t*0A– signal from the Cycling Unit (FIGURE 34) are both applied to gate 12–1. Therefore at time *t*0 during a T or Q order a signal will pass through gate 12–1 to the input of complementer 12–13 setting the CTFF to its CT state and allowing the *m* portion of the instruction word in the C Register to determine the location of the next instruction word to be used by the computer. During the T and Q orders the contents of the A Register is compared with the contents of the L Register and if the contents of the A Register is algebraically greater than the contents of the L Register (execution of the T order) or the contents of the A Register are equal to the contents of the L Register (execution of the Q order) then the next instruction word to be used by the computer is in the memory location designated by the *m* portion of the word presently in the C register, otherwise the next instruction is determined by the *c* portion of the instruction word in the C Register. It is obvious therefore that gate 12–1 logically assumes the condition in the T order that the contents of *r*A are greater than the contents of *r*L and in the Q order that the contents of the A Register are equal to the contents of the L Register.

Gate 12–2 in combination with element 12–14 also will cause the CTFF to be set to its CT state when all the inputs to this gate are at a low level. An $\overline{STR2}$ signal from the Static Register (FIGURE 25A), a (2) signal, generated during $\beta$, from the Control Encoder (FIGURE 27) and a *t*10B– timing signal from the Cycling Unit all are applied to the inputs of gate 12–2. It will be recalled that during the $\beta$ cycle, the instruction word is transferred from the memory to the C Register (FIGURE 13) and to the Static Register (FIGURE 25). In particular it will be recalled that the digit in the P9 position of the instruction word is transferred to the Static Register flip-flops A to C (FIGURE 25). A review of the code representing various instructions will show that those instructions requiring the use of the memory will have a "0" bit in the first and second bit positions of the P9th digit. It will be appreciated then that the $\overline{STR2}$ output from the Static Register will obtain during this condition (i.e. when the memory is to be used during the execution of a particular order). Therefore, if the instruction word being transferred from the memory requires the use of the memory for executing the instruction, an $\overline{STR2}$ signal will be generated which in combination with the other signals on gate 12–2 will cause the CTFF to be set to its CT state.

There are nine conditions during computer operation that cause the CTFF to be closed to its $\overline{CT}$ state. Gates 12–3 to 12–9 detect seven of these conditions and the RCT1 and RCT2 outputs of the Static Register (FIGURE 25) which are applied to gate 12–28 give an indication of the remaining two conditions. The RCT1 or the RCT2 (high level) signals will be generated as previously indicated each time a desired location in the memory is found. These signals (RCT1 and RCT2) are applied to the clear input 12–28B of gate 12–28 and will, when generated, clear the CTFF to its $\overline{CT}$ state. Also connected to the clear input of gate 12–28 are the outputs of complementers 12–18 and 12–19 which are connected at their inputs to the output gates 12–6 and 12–7 respectively. The inputs to gates 12–6 and 12–7 are both controlled by the (75) signal from the Control Encoder FIGURE 27. Further the inputs of gates 12–6 and 12–7 are respectively connected to the A– and L+ and A+ and L– outputs of the Sign of *r*A Flip-Flop (FIGURE 11) and the Sign *r*L Flip-Flop (FIGURE 11). If all the inputs to either gates 12–6 or 12–7 are at a low level (a condition which indicates that the sign of the information in the A Register is not the same as the sign of the information in the L Register), complementer 12–18 or 12–19 will be caused to generate a high level signal which will be applied to gate 12–28 clearing the CTFF to its $\overline{CT}$ state.

As mentioned earlier in this description high level signals applied to buffer 12–31 will cause the CTFF to be cleared to its $\overline{CT}$ state. To this end it will be observed that the output of complementers 12–15, 12–16 and 12–17 all drive one input of buffer 12–31. The inputs to complementers 12–15, 12–16 and 12–17 are connected respectively to the outputs of gates 12–3 to 12–5. Gates 12–3 to 12–5 are all connected at their inputs to the (20) signal line from the Control Encoder (FIGURE 27) and the *t*11B– output of the Cycling Unit (FIGURE 34). Additionally, gate 12–3 is connected at its input to the $\overline{A}$ output of the Comparator (FIGURE 17) and at the A– output of the Sign *r*A Flip-Flop (FIGURE 11); gate 12–4 is connected at input to the A– output of the Sign of *r*A Flip-Flop and the $\overline{C}$ output of the Comparator; and gate 12–5 is connected at its input to the A and C outputs of the Comparator and to L+ output of the Sign of *r*L Flip-Flop, FIGURE 11. When all the inputs to any of these gates are a low level one of the complementers 12–15 to 12–17 produce a high level signal which will be be applied to the input of buffer 12–31 causing the CT flip-flop to be cleared to its $\overline{CT}$ state. The logical significance of the various inputs to gates 12–3 to 12–5 will be later explained in connection with the T order.

It will be further observed that the output of complementers 12–20 and 12–21 both drive a second input of buffer 12–31. The input to complementers 12–20 and 12–21 are connected to the outputs of gates 12–8 and 12–9 respectively. Three of the four inputs to gates 12–8 and 12–9 are connected to the 75 signal line from the Control Encoder (FIGURE 27) and the *t*0B+ and the *t*1B+ outputs of the Cycling Unit. The remaining inputs of gates 12–8 and 12–9 are connected to the $\overline{EQ}$ and $\overline{A}'$ outputs from the Comparator. It will be appreciated that a coincidence of low level signals applied to the inputs of either gate 12–8 or 12–9 will cause the CTFF to be cleared to its $\overline{CT}$ state. Logically gates 12–8 to 12–9 are employed during the Q order as shall be later fully described.

TIME SELECTION FLIP-FLOP

Referring now to section 12B of FIGURE 12 there is shown the Time Selection Flip-Flop which shall hereinafter be abbreviated as the TSFF. The TSFF produces either a TS output from amplifier 12–32 or $\overline{TS}$ output from complementer 12–35. The TS output is said to be present (i.e. the TSFF is cleared to its TS state) when amplifier 12–32 produces low level output signals and complementer 12–35 produces high level signals. When the converse is true (i.e. the TSFF is set to its $\overline{TS}$ state) and the $\overline{TS}$ output is present. It will be appreciated that the TS and $\overline{TS}$ states are mutually exclusive and that this flip-flop operates in a similar manner to the generalized flip-flop shown and described in connection with FIGURE 8A.

The TSFF comprises an amplifier 12–32, and a complementer 12–35 connected together at their inputs wherein said elements 12–32 and 12–35 are jointly driven by the outputs of buffer 12–25 and complementer 12–34. The input of complementer 12–34 is connected to the output of recirculation gate 12–33 which in turn is connected at its input to the output of complementer 12–35, the $t$11B+ output of the Cycling Unit (FIGURE 34) and the OF2+ output from the Overflow Delay Flip Flop (FIGURE 22). Low level outputs of complementer 12–35 will be recirculated through the loop comprising gate 12–33 and complementer 12–34 provided the two remaining inputs ($t$11B+ and OF2+) of gate 12–33 are at a low level. Moreover, if the output of complementer 12–35 is at a high level, it will be recirculated via gate 12–33 and complementer 12–34 notwithstanding the condition of the remaining two inputs on gate 12–33.

It will be appreciated that a high level signal on any one of the inputs to gate 12–33 will induce complementer 12–34 to produce a low level signal which in turn causes amplifier 12–32 to produce a low level signal and complementer 12–35 to produce a high level signal which will be recirculated through gate 12–33 thus clearing the TSFF to its TS state. It will be appreciated that the TSFF will be cleared to its TS state at least once per minor cycle since a $t$11B+ pulse, which is a positive signal generated once per minor cycle, is applied to gate 12–33. Further it will be appreciated that a high level signal applied to any of the inputs of buffer 12–25 will cause amplifier 12–32 to produce a high level signal, and complementer 12–35 to produce a low level signal which will be recirculated through gate 12–33; thus setting the TSFF to its $\overline{TS}$ state.

Buffer 12–25 is connected at its first input to the output of complementers 12–20 and 12–21. These complementers will produce high level outputs in a manner previously described in connection with the CTFF. Suffice it to say when the CTFF is cleared to its $\overline{CT}$ state by the high level signals from complementer 12–20 or 12–21 that the TSFF will also be set to its $\overline{TS}$ state by these same high level signals which will be transmitted through buffer 12–25 to the inputs of elements 12–32 and 12–35.

The second input of buffer 12–25 is connected to the outputs of complementers 12–22 to 12–24 and to the Clear TS line which is tied to the output of complementer 25–27 (FIGURE 25) via line 25–24. Complementers 12–22 to 12–24 are connected at their inputs to the outputs of gates 12–10 to 12–12 respectively. One input of each of these gates (12–10 to 12–12) is connected to the (1) signal line of the Control Encoder (FIGURE 27). Additionally, gate 12–10 is connected to the $t$2B– output line of the Cycling Unit and the $\overline{A}'$ output of the Comparator; gate 12–11 is connected to the $\overline{EQ}$ output of the Comparator and the $t$(2–3)B– output of the Cycling Unit; and gate 12–12 is connected to the $\overline{S3}$ and $\overline{S4}$ outputs of the subtrahend buffer and the RTS output of the Memory Band and Head Selection circuit (FIGURE 28). Again, a coincidence of low level signals applied to all the inputs of any of the gates 12–10, to 12–12 will cause a complementer associated therewith to produce a high level signal which will, in a manner previously described, set the TSFF to its $\overline{TS}$ state.

Gates 12–10 to 12–12 are as noted by the (1) Control Encoder signal, alerted during any search operation, that is when the Drum Memory is being used to supply or receive a data or instruction word. These gates 12–10 to 12–12 are used, as will be fully explained in connection with the section dealing with Address Selection, to detect a condition which indicates that a non-desired memory location is available as the read-heads in the memory.

ADDER—FIGURES 18A AND 18B

In FIGURES 18A and 18B, to which reference is now made, there is shown respectively the Adder Input Gates and signal translating circuits, and the Adder Output Gates. In FIGURE 18B there is shown a series of coincidence gates each represented by a vertical line labelled 18–45 through 18–64. Connected to the output of each of the gates 18–45 through 18–64 is a complementer labelled 18–45A through 18–64A respectively. The coincident drive signals for the gates 18–45 to 18–64 are shown as being applied to a series of horizontal lines appropriately legended on the left hand side of the figure according to the drive source. The drive signal connections to each of the gates is shown as a dot (representative of a diode) interconnecting the horizontal drive lines and the vertical gates lines. These drive signals carry the legend $\overline{M}_{3u}$, $M_{3u}$, $\overline{M}_{2u}$, $M_{2u}$ etc., and will be described in detail later on.

As is characteristic of all of the coincidence gates in this computer, the gates look for a coincidence of low-level signals and in response to the attainment of this condition cause the complementers to which the gate is connected to produce a high level output pulse. For example, considering gate 18–45 as typical, it requires the coincidence of low level signals from the drive lines $M_{2u}$, $\overline{M}_{1u}$, $S_{3c}$ (FIGURE 18A) and the Control Encoder (FIGURE 27) (50) signal in order to produce a high level output from complementer 18–45A.

The outputs of the complementers 18–45A to 18–64A are buffed together by appropriate buffer circuits, 15–9A, 15–9B, 15–9C and 15–9D shown in the A Register FIGURE 15, and in the manner indicated by the brackets of FIGURE 18 to provide as indicated in FIGURE 18B four output lines, labelled $O_1$ to $O_4$, representing the four bit positions of the 5421 bi-quinary code utilized by the computer. In particular, the outputs from complementers 18–45A to 18–51A are buffed together by buffer 15–9A to provide an $O_1$ output. A high level signal produced by any of these complementers and appearing on this line, $O_1$, respresents the decimal value 1. The outputs from complementers 18–50A to 18–57A inclusive are buffed together by buffer 15–9B to produce the $O_2$ output. Thus a high level signal produced by any of these complementers appears on the $O_2$ line and represents the decimal value 2. It will be seen that high level signals produced by complementers 18–50A and 18–51A are buffed into both the $O_1$ and $O_2$ lines and thus high level signals produced by either of these two complementers represent the decimal value 3. It will later become apparent that the decimal value 3 can also be represented by $O_1$ and $O_2$ outputs being produced by the action of others of the complementers 18–45A to 18–57A. Continuing, the output of complementers 18–58A to 18–62A inclusive are buffed together by buffer 15–9C to produce the $O_3$ output. High level signals produced by any of these complementers produces an output on the $O_3$ line representative of the decimal value 4. Finally, the outputs of complementers 18–63A and 18–64A are buffed together by buffers 19–9D to produce the $O_4$ output. A high level signal produced by either of these two complementers represents the decimal value 5.

In checking the drive sources for the Adder output gates of FIGURE 18B it will be seen that the sources $\overline{M}_{3u}$, $M_{3u}$, $\overline{M}_{2u}$, $M_{2u}$, $\overline{M}_{1u}$, $M_{1u}$, $\overline{S}_{3c}$, $S_{3c}$, $\overline{S}_{2c}$, $S_{2c}$, $\overline{S}_{1c}$, and $S_{1c}$ are obtained from the adder input gates and translating circuits shown in FIGURE 18A. Continuing with the inspection of the drive sources for the Adder output gates it will be seen that the C′, $\overline{C}$, A′ and $\overline{A}'$ signals are obtained from the Comparator circuit, FIGURE 17A. Finally, the drive signal labelled (50) is an output from the Control Encoder, FIGURE 27, and is obtained in response to the storage of certain predetermined instruction signals in the Static Register (FIGURE 25), such as an add or "A" instruction. The Control Encoder signal (50) appears as a train of pulses of B phase persisting for at least one minor cycle. The other drive signals, which are also B phase pulses, are momentary in nature and are developed in accordance with the operands being operated on by the Adder.

In particular referring to FIGURE 18A, the $S_{1c}$ and $\overline{S}_{1c}$ are mutually exclusive signal sources and are obtained from the output of a complementer 18–33 and amplifier 18–34 connected together at their inputs and driven from a single complementer 18–17 which in turn is driven from the output of the $S_1$ line of the Sub Buffer 1 circuit (FIGURE 19), through a diode gate indicated as 18–1. In the operation of these circuits it will be well to remember that "1" bits appearing at the unbarred output lines, $S_1$, $S_2$ etc. of the Sub Buffer circuits are represented as low-level signals and the "0" bits appearing at the unbarred output lines $S_1$, $S_2$, etc. of the Sub Buffer circuits are represented as high level signals. At the barred output lines $\overline{S}_1$, $\overline{S}_2$ etc. of the Sub Buffers, the reverse relationship holds. That is "1" bit outputs of the barred output lines $\overline{S}_1$, $\overline{S}_2$, etc. of the Sub Buffers are represented by high level signals and "0" bit outputs appear as low level signals. The same condition holds of course for the "0" and "1" bit outputs from the unbarred lines $M_1$, and $M_2$ etc. and the barred output lines $\overline{M}_1$, $\overline{M}_2$ etc. from the Minuend Buffer circuits shown in FIGURE 20. Thus, from the foregoing it will be recognized that the appearance of a "1" bit (a low level signal) on the $S_1$ line will be complemented by complementer 18–17; complemented again by complementer 18–33 and appear one pulse time later as a low level output pulse on line $S_{1c}$. At the same time the complemented output of complementer 18–17 is amplified by amplifier 18–34 and appears as a high level (or complemented) signal at the output of line $\overline{S}_{1c}$. Conversely if a "0" bit appears at gate 18–1 (a high level signal at $S_1$) then a low level pulse will be developed at $\overline{S}_{1c}$ and a high level pulse will be developed at $S_{1c}$. Thus a "1" bit input from $S_1$ will produce an $S_{1c}$ output, whereas "0" bit input from $S_1$ will produce an $\overline{S}_{1c}$ output.

The $S_{2c}$ and $\overline{S}_{2c}$ signal sources are obtained from a complementer 18–35 and amplifier 18–36 connected together at their inputs and driven by the parallel outputs of three complementers 18–18, 18–19 and 18–20. Complementers 18–18, 18–19 and 18–20 are each connected at their inputs to the output of respective coincidence gates 18–2, 18–3 and 18–4 respectively. Gate 18–2 receives the $S_2$ output from the Sub Buffer circuits and the $\overline{CP}$ output of the Complementer Flip-Flop FIGURE 21. Gate 18–3 receives the $S_1$ output and $\overline{S}_2$ output of the Sub Buffer circuits and the CP output of the Complementer Flip-Flop. Gate 18–4 receives the $S_2$ and $\overline{S}_1$ outputs from the Sub Buffer circuits.

A coincidence of low level signals or any one of the gates 18–2, 18–3 or 18–4 causes a low level signal to appear at the $S_{2c}$ output terminal one pulse period later.

The $S_{3c}$ and $\overline{S}_{3c}$ signals are derived from complementer 18–37 and amplifier 18–38 respectively, the inputs to which are connected in parallel to the outputs of a pair of complementers 18–21 and 18–22. Complementers 18–21, 18–22 have their inputs driven from a pair of coincidence gates 18–5 and 18–6 respectively. Gate 18–5 receives the $S_3$ output of the Sub Buffer 3 and the $\overline{CP}$ output of the Complementer Flip-Flop, while gate 18–6 receives the $\overline{S}_1$, $\overline{S}_2$, $\overline{S}_3$ outputs from the Sub Buffer circuits 1, 2 and 3 and the CP output of the Complementer Flip-Flop. As before, a coincidence of low level signals on either of the gates 18–5 or 18–6 causes a low level signal to appear at the $S_{3c}$ terminal one pulse period later.

The $M_{1u}$ and $\overline{M}_{1u}$ signals are produced by a complementer 18–39 and amplifier 18–40 respectively, the inputs of which are connected in parallel to the outputs of complementers 18–23, 18–24 and 18–25. Complementers 18–23, 18–24 and 18–25 have their inputs connected respectively to the output of coincidence gates 18–7, 18–8, and 18–9 respectively. Gate 18–7 receives as its inputs, the $\overline{A}$ output from the Comparator (FIGURE 17A) and the $M_1$ output of the Min Buffer 1 shown in FIGURE 20. Gate 18–8 receives as its inputs the $\overline{C}$ signal from the Comparator and the $M_1$ output from the Min Buffer 1. Finally gate 18–9 receives as its inputs the $\overline{M}_1$ and $\overline{M}_3$ outputs from the Min Buffers 1 and 3 and the A and C signals from the Comparator. A coincidence of low level signals at any of the gates 18–7, 18–8 or 18–9 produces a low level output at $M_{1u}$ one pulse period later.

The $M_{2u}$ and $\overline{M}_{2u}$ signals are produced by complementer 18–41 and amplifier 18–42 the inputs of which are connected in parallel to complementers 18–26 to 18–29. Each of the latter complementers has its input connected to a corresponding coincidence gate 18–10 to 18–13 inclusive. Gates 18–10 and 18–11 each receive the $M_2$ output from the Min Buffer 2 with gate 18–10 receiving in addition the $\overline{A}$ signal from the Comparator and gate 18–11 the $\overline{C}$ signal from the Comparator. Gate 18–12 receives the $M_2$ and $\overline{M}_1$ outputs from the Min Buffer 1 and 2, while gate 18–13 receives the $\overline{M}_2$, $M_1$ outputs from the Min Buffers and the A and C signals from the Comparator. A low level $M_{2u}$ signal is developed one pulse time after the occurrence of coincidence of low level signals at any of the gates 18–10 to 18–13.

The $M_{3u}$ and $\overline{M}_{3u}$ outputs are derived from complementer 18–43 and amplifier 18–44 the inputs to which are connected in parallel and driven from the output of complementers 18–30, 18–31 and 18–32. Each of the latter complementers has its input connected to the output of a respective coincidence gate 18–14, 18–15 and 18–16 respectively. Gates 18–14 and 18–15 each receive as one input thereto the $M_3$ output of the Minuend Buffer circuits, while gate 18–14 in addition receives the $\overline{A}$ signal from the Comparator and gate 18–15 the $\overline{C}$ signal from the Comparator. Gate 18–16 receives as its inputs the $M_2$, $M_1$ outputs from the Minuend Buffer circuits, and the A and C signals from the Comparator. A low level $M_{3u}$ signal will be produced one pulse time after the occurrence of a coincidence of low level signals on any one of the gates 18–14, 18–15 or 18–16.

From an inspection of the input signals applied to the input gates of FIGURE 18A it will be understood that one of the purposes of the circuits shown in this figure is to apply the quinary bits of the signals appearing on the Minuend Buffers and Subtrahend Buffers to the Adder output gates shown in FIGURE 18B. In particular it will be recognized that the gates 18–1 through 18–6 which control the output appearing on lines $S_{1c}$, $\overline{S}_{1c}$, $S_{2c}$, $\overline{S}_{2c}$, $S_{3c}$, and $\overline{S}_{3c}$ derive their inputs from the first three bit positions, $S_1$, $S_2$ and $S_3$ of the signals appearing on the Sub Buffer circuits. Similarly, the gates 18–7 through 18–16 which control the production of the signals appearing on lines $M_{1u}$, $\overline{M}_{1u}$, $M_{2u}$, $\overline{M}_{2u}$, $M_{3u}$ and $\overline{M}_{3u}$ derive their inputs from the first three bit positions $M_1$, $M_2$ and $M_3$ of the Minuend Buffers. It will be apparent that in various arithmetic operations, signals appearing on the Sub Buffers lines, represent one operand of a pair, and the signals appearing on the Minuend Buffers represent the other operand of a pair.

The present computer performs addition of operands of unlike signs and subtraction of operands of like signs by the well known process of complementing one of the operands and adding the complemented operand to the other operand. The Sub Buffer line input gates of FIGURE 18A taken together with the action of the Complementer Flip-Flop of FIGURE 21 operate to complement the quinary portion of the Sub-Buffer operand. In particular, and as will be described, the Complementer Flip-Flop input gates (gates 21–1 to 21–4) compare the signs of the operands and sense the operation to be performed and set the condition of the Complementer Flip-Flop accordingly. For example, if an add operation (A instruction) is to be performed, and the signs of the operands are alike the Complementer Flip-Flop is cleared to $\overline{CP}$. If, however, the signs are unlike gates 21–1 or 21–2 detects this difference in signs of the operand and sets CPFF to CP. In the alternative, if a subtract operation is to be performed and the signs are unlike the Complementer Flip-Flop is cleared to $\overline{CP}$ while if the signs are alike then gates 12–3 or 12–4 detects this similarity of signs and sets the CPFF to CP. If the Complementer Flip-Flop is cleared to $\overline{CP}$ then input gates 18–2 and 18–5 of the adder input circuits, FIGURE 18A, are alerted, while if the complementer is set to CP then input gates 18–4, 18–3, 18–4 and 18–6 are alerted. Thus it will be seen that input gates 18–2 and 18–3 operate in a mutually exclusive manner as do gates 18–5 and 18–6. It will also be seen from the following tables where "0" bits are represented by barred S line designations and "1" bits are represented by unbarred S line designations, that with the Complementer Flip-Flop set to $\overline{CP}$ the quinary outputs on the $S_{1c}$, $\overline{S}_{1c}$, $S_{2c}$, $\overline{S}_{2c}$, $S_{3c}$ and $\overline{S}_{3c}$ lines assume conditions corresponding to the uncomplemented input from the Sub-Buffer lines, while if the Complementer Flip-Flop is set to CP then the quinary outputs on the $S_{1c}$, $\overline{S}_{1c}$, $S_{2c}$, $\overline{S}_{2c}$, $S_{3c}$ and $\overline{S}_{3c}$ lines assume signal conditions corresponding to the nines complement of the input on the Sub Buffer lines.

Table II shows the relationship between input and output signal conditions of the circuit of FIGURE 18A with Complementer Flip-Flop set to $\overline{CP}$.

TABLE II

| Decimal Value | Input Code | Output Code |
|---|---|---|
| 0 | $\overline{S}_1$ $\overline{S}_2$ $\overline{S}_3$ | $\overline{S}_{1c}$ $\overline{S}_{2c}$ $\overline{S}_{3c}$ |
| 1 | $S_1$ $\overline{S}_2$ $\overline{S}_3$ | $S_{1c}$ $\overline{S}_{2c}$ $\overline{S}_{3c}$ |
| 2 | $\overline{S}_1$ $S_2$ $\overline{S}_3$ | $\overline{S}_{1c}$ $S_{2c}$ $\overline{S}_{3c}$ |
| 3 | $S_1$ $S_2$ $\overline{S}_3$ | $S_{1c}$ $S_{2c}$ $\overline{S}_{3c}$ |
| 4 | $\overline{S}_1$ $\overline{S}_2$ $S_3$ | $\overline{S}_{1c}$ $\overline{S}_{2c}$ $S_{3c}$ |
| 5 | $\overline{S}_1$ $\overline{S}_2$ $\overline{S}_3$ | $\overline{S}_{1c}$ $\overline{S}_{2c}$ $\overline{S}_{3c}$ |
| 6 | $S_1$ $\overline{S}_2$ $\overline{S}_3$ | $S_{1c}$ $\overline{S}_{2c}$ $\overline{S}_{3c}$ |
| 7 | $\overline{S}_1$ $S_2$ $\overline{S}_3$ | $\overline{S}_{1c}$ $S_{2c}$ $\overline{S}_{3c}$ |
| 8 | $S_1$ $S_2$ $\overline{S}_3$ | $S_{1c}$ $S_{2c}$ $\overline{S}_{3c}$ |
| 9 | $\overline{S}_1$ $\overline{S}_2$ $S_3$ | $\overline{S}_{1c}$ $\overline{S}_{2c}$ $S_{3c}$ |

Table III shows the relationship between input and output signal conditions for the circuits of FIGURE 18A with the Complementer Flip-Flop set to CP.

TABLE III

| Decimal Value | Input Code | Output Code |
|---|---|---|
| 0 | $\overline{S}_1$ $\overline{S}_2$ $\overline{S}_3$ | $\overline{S}_{1c}$ $\overline{S}_{2c}$ $S_{3c}$ |
| 1 | $S_1$ $\overline{S}_2$ $\overline{S}_3$ | $S_{1c}$ $S_{2c}$ $\overline{S}_{3c}$ |
| 2 | $\overline{S}_1$ $S_2$ $\overline{S}_3$ | $\overline{S}_{1c}$ $S_{2c}$ $\overline{S}_{3c}$ |
| 3 | $S_1$ $S_2$ $\overline{S}_3$ | $S_{1c}$ $\overline{S}_{2c}$ $\overline{S}_{3c}$ |
| 4 | $\overline{S}_1$ $\overline{S}_2$ $S_3$ | $\overline{S}_{1c}$ $\overline{S}_{2c}$ $\overline{S}_{3c}$ |
| 5 | $\overline{S}_1$ $\overline{S}_2$ $\overline{S}_3$ | $\overline{S}_{1c}$ $\overline{S}_{2c}$ $S_{3c}$ |
| 6 | $S_1$ $\overline{S}_2$ $\overline{S}_3$ | $S_{1c}$ $S_{2c}$ $\overline{S}_{3c}$ |
| 7 | $\overline{S}_1$ $S_2$ $\overline{S}_3$ | $\overline{S}_{1c}$ $S_{2c}$ $\overline{S}_{3c}$ |
| 8 | $S_1$ $S_2$ $\overline{S}_3$ | $S_{1c}$ $\overline{S}_{2c}$ $\overline{S}_{3c}$ |
| 9 | $\overline{S}_1$ $\overline{S}_2$ $S_3$ | $\overline{S}_{1c}$ $\overline{S}_{2c}$ $\overline{S}_{3c}$ |

From the foregoing two tables it will be apparent that when the Complementer Flip-Flop is set to $\overline{CP}$ the $S_{1c}$, $\overline{S}_{1c}$, $S_{2c}$, $\overline{S}_{2c}$, $S_{3c}$ and $\overline{S}_{3c}$ lines which drive the Adder output gates of FIGURE 18B merely repeat the quinary input bits without change, while when the Complementer Flip-Flop is set to CP the quinary bits on the Subtrahend Buffers appear in a nines complemented form at the output from the $S_{1c}$, $\overline{S}_{1c}$, etc. lines. That is a quinary bit code representing the decimal value 1 for example will appear at the output of the $S_{1c}$, $\overline{S}_{1c}$, etc. lines as a code representing the quinary value 3. Complementing of the fourth bit or binary bit of the digit on the Subtrahend lines is carried out in the Comparator by the gates 17–3, 17–4, and 17–6. In this connection it will be noted that in the Comparator with the CPFF set to CP, gate 17–4 with its barred, or complemented, input on the $S_4$ line is equivalent to gate 17–1 with its unbarred input on the $S_4$ line in controlling the production of the A' and A signals. Likewise, gate 17–3 is equivalent to gate 17–2 in controlling the production of the A' and A signals. By the same token gate 17–6 with its CP signal and barred, or complemented, $S_4$ signal equivalent to gate 17–5 with its unbarred $S_4$ input in controlling the production of the A and C signals from the Comparator.

In the addition of digits appearing on the Minuend Buffer lines $M_1$ etc. to the digits appearing on the Subtrahend Buffer lines $S_1$ etc., a decimal carry may result. For example, if the two digits total to ten or more then a decimal carry will result and this carry must be added to the next higher digit order in the operation. This is accomplished by using the A and C signals from the Comparator. These signals, namely, the A and C signals are simultaneously generated whenever the sum of two digits in the operands is equal to or greater than ten. As explained in the section of the Comparator (FIGURE 21) the A and C signals are produced one pulse time (or one digit time) after the digits appear at the output of the Minuend and Subtrahend lines. Since the A and C signals are delayed one pulse (or one digit) time after the appearance of the Minuend and Subtrahend Buffer digits which produce these signals, it will be apparent that the A and C signals can be fed directly to the Minuend input gates of FIGURE 18A to effect a delayed carry addition to the Min Buffer operand. Thus gates 18–9, 18–13, and 18–16 with their A and C signals inputs are provided to effect this delayed carry addition.

The following table shows the relationship of the output signal condition from the quinary drive lines $M_{1u}$ $\overline{M}_{1u}$, $M_{2u}$, $\overline{M}_{2u}$, $M_{3u}$ and $\overline{M}_{3u}$ for different input signal conditions assuming first no carry and then a carry as indicated by the presences of an A and C signals. In the table below "0" bits are represented by barred designations and "1" bits are represented by unbarred designation. At both the input and output, low level signals represent "1" bits and high level signals represent "0" bits.

TABLE IV

| Decimal Value | Quinary Input Code | Quinary Output Code | |
|---|---|---|---|
| | | Without carry (No A & C signals) | With carry or A & C signals |
| 0 | $\overline{M}_1$ $\overline{M}_2$ $\overline{M}_3$ | $\overline{M}_{1u}$ $\overline{M}_{2u}$ $\overline{M}_{3u}$ | $M_{1u}$ $\overline{M}_{2u}$ $\overline{M}_{3u}$ |
| 1 | $M_1$ $\overline{M}_2$ $\overline{M}_3$ | $M_{1u}$ $\overline{M}_{2u}$ $\overline{M}_{3u}$ | $\overline{M}_{1u}$ $M_{2u}$ $\overline{M}_{3u}$ |
| 2 | $\overline{M}_1$ $M_2$ $\overline{M}_3$ | $\overline{M}_{1u}$ $M_{2u}$ $\overline{M}_{3u}$ | $M_{1u}$ $M_{2u}$ $\overline{M}_{3u}$ |
| 3 | $M_1$ $M_2$ $\overline{M}_3$ | $M_{1u}$ $M_{2u}$ $\overline{M}_{3u}$ | $\overline{M}_{1u}$ $\overline{M}_{2u}$ $M_{3u}$ |
| 4 | $\overline{M}_1$ $\overline{M}_2$ $M_3$ | $\overline{M}_{1u}$ $\overline{M}_{2u}$ $M_{3u}$ | $\overline{M}_{1u}$ $\overline{M}_{2u}$ $\overline{M}_{3u}$ |
| 5 | $\overline{M}_1$ $\overline{M}_2$ $\overline{M}_3$ | $\overline{M}_{1u}$ $\overline{M}_{2u}$ $\overline{M}_{3u}$ | $M_{1u}$ $\overline{M}_{2u}$ $\overline{M}_{3u}$ |
| 6 | $M_1$ $\overline{M}_2$ $\overline{M}_3$ | $M_{1u}$ $\overline{M}_{2u}$ $\overline{M}_{3u}$ | $\overline{M}_{1u}$ $M_{2u}$ $\overline{M}_{3u}$ |
| 7 | $\overline{M}_1$ $M_2$ $\overline{M}_3$ | $\overline{M}_{1u}$ $M_{2u}$ $\overline{M}_{3u}$ | $M_{1u}$ $M_{2u}$ $\overline{M}_{3u}$ |
| 8 | $M_1$ $M_2$ $\overline{M}_3$ | $M_{1u}$ $M_{2u}$ $\overline{M}_{3u}$ | $\overline{M}_{1u}$ $\overline{M}_{2u}$ $M_{3u}$ |
| 9 | $\overline{M}_1$ $\overline{M}_2$ $M_3$ | $\overline{M}_{1u}$ $\overline{M}_{2u}$ $M_{3u}$ | $\overline{M}_{1u}$ $\overline{M}_{2u}$ $\overline{M}_{3u}$ |

From table IV it will be apparent that in the absence of a carry signal, the input gates 18–7, 18–8, 18–10, 18–11, 18–12, 18–14 and 18–15 operate to provide a coded $M_{1u}$, $\overline{M}_{1u}$, etc., output which is characteristic of the input code, while with a carry present as represented by the simultaneous generation of A and C signals in the Comparator, the output code is increased by the decimal value one.

Returning now the Adder output gates shown in FIGURE 18B, it will be recognized that each of the gates 18–45 to 18–64 has a different signal combination applied thereto so that each gate checks for a different combinatorial pair of digits on the Min and Sub Buffer lines. Take for example gate 18–45, one will see that the signal combination necessary to produce a high level output from complementer 18–45A and hence a "1" bit on the 01 line from this complementer corresponds to the condition $\overline{M}_{1u}$, $M_{2u}$ and $S_{3c}$ taken of course together with the (50) signal from the Control Encoder (FIGURE 27). The (50) signal is applied to all the Adder output gates during various arithmetic operations using the Adder circuit of FIGURE 18B. Assuming an add operation of operands of like signs and no previous carry then it will be seen from the preceeding tables that the $\overline{M}_{1u}$, $M_{2u}$ combination obtains whenever the Min Buffer digit corresponds to a decimal value of 2 or 7, while the $S_{3c}$ signal obtains whenever the Sub Buffer digit is a 4 or 9. The above possible Min and Sub-Buffer digits can add to produce three distinct sums 6, 11 or 16. Anyone of these sums requires the presence of a "1" bit in the O line to represent it. Thus gate 18–45 together with complementer 18–45A would operate to produce this bit of the sum. To represent a decimal 6 or 16 requires in addition a "1" bit on the $O_4$ line. This is produced by Adder gate 18–63 or 18–64. If in the assumed example, it is further assumed that the particular decimal digits are a 2 on the Min Buffers and a 4 on the Sub Buffers then the code representing these two digits are $\overline{M}_1$, $M_2$, $\overline{M}_3$, $\overline{M}_4$ and $\overline{S}_1$, $\overline{S}_2$, $S_3$, $\overline{S}_4$ and the $O_4$ bit of the sum of 6 is produced as follows: In the Comparator (FIGURE 17) with CPFF set to $\overline{CP}$, gate 17–53 is, with all of its inputs, namely $\overline{CP}$, $M_2$ and $S_3$, at a low level, rendered operative to produce an R signal and hence C and C′ signals. At the same time an $\overline{A}'$ signal is generated by amplifier 17–22 since none of the gate driving this amplifier are rendered operative. The simultaneous generation of an $\overline{A}'$ and a C′ signal causes complementer 18–64A to produce a "1" bit on the $O_4$ line, thereby indicating a sum of 6 when taken with the "1" bit produced on the $O_1$ line by gate 18–45 and complementer 18–45A.

Now in the assumed example if a sum of 11 was to be indicated by the pressure of a 2 on the Min Buffers and a 9 on the Sub Buffers then the codes representative of these values are $\overline{M}_1$, $M_2$, $\overline{M}_3$, $\overline{M}_4$ and $\overline{S}_1$, $\overline{S}_2$, $S_3$, $S_4$. In this case, a "1" bit should be produced on the $O_1$ line and an A and C signal should be generated to indicate a carry. In this example gate 18–45 would again be rendered operative to produce a "1" bit on the $O_1$ line. The A and C signal is generated in the Comparator as follows: Gate 17–2 with all its inputs, namely $\overline{CP}$, $S_4$ and $\overline{M}_4$, at a low level would operate to produce an A and A′ signals while gate 17–53 in the Comparator operates responsive to the $\overline{CP}$, $M_2$, $S_3$ combination to produce an R signal which in turn generates a C signal. The resulting A and C signals are applied not only to various Comparator gates for the next digit operation but also to the Minuend input gates of the Adder, FIGURE 18A, where it can be added to the next digit arriving on the M lines.

Taking the final condition of the above example assume that the digits sum to 16 by the presence of a 7 on the M lines and 9 on the S lines. In this case, the output of the Adder should produce a "1" bit on both the $O_1$ and $O_4$ lines to indicate the 6 and the Comparator should generate an A and C signal to indicate a decimal carry. In the assumed example the codes are $\overline{S}_1$, $\overline{S}_2$, $S_3$, $S_4$ and $\overline{M}_1$, $M_2$, $\overline{M}_3$, $M_4$. Gate 18–45 again operates to produce the "1" bit on the $O_1$ line. In the Comparator, gate 17–5 detects the $M_4$, $S_4$ bits and causes complementers 17–23 and 17–25 to produce the A and C signals to indicate the decimal carry. And finally gate 17–53 detects the $M_2$, $S_3$ bits to produce an R signal which in turn produces a C′ signal. At the same time amplifier 17–22 generates an $\overline{A}'$ signal since none of the gates 17–1 to 17–4 detect a coincident signal condition. Thus back in the Adder circuit, gate 18–64 again operates in response to the $\overline{A}'$ and the C′ signal to produce a "1" bit on the $O_4$ output line thereby completing the suming operation for this pair of digits.

Continuing with an examination of the Adder gates 18–45 to 18–64 we see that gate 18–46 relies on the signal combination of $M_{3u}$, $\overline{S}_{1c}$ and C′ for its input signal combinations. From the preceding tables it will be recognized that $M_{3u}$ obtains whenever the digit on the Min lines with or without a carry (A and C signals) equals a 4 or 9, while an $\overline{S}_{1c}$ obtains (when CPFF is set to $\overline{CP}$) for S line digit values of 0, 2, 4, 5, 7 and 9. The third input to gate 18–46 is the C′ signal and this signal obtains only when the quinary portions of the instantaneous digits being added produce a quinary carry signal (or C′ signal) from the Comparator. The two possible digit values 4 or 9 appearing on the M lines plus the above six possible digit values appearing on the S lines can give rise to nine distinct totals; namely, 4, 6, 8, 9, 11, 13, 14, 16 or 18. Of these nine possible totals only those combinations of Minuend digits and Subtrahend digits which produce a quinary carry C′ signal however will be effective to produce an $O_1$ output from gate 18–46. That is, the presence of either a 0 or a 5 on the M lines when summed with either 4 or a 9 on the S lines will fail to produce the C′ signal. Thus of the 9 possible sums mentioned above, only those which sum to 6, 8, 11, 13, 16 or 18 will produce the necessary C′ signal to operate gate 18–46. It will be seen that each of these six possible sums requires a "1" bit on the $O_1$ line to represent it.

The other gates 18–47 to 18–62 feeding the $O_1$ to $O_3$ output lines of the Adder are similar to 18–45 and 18–46 already discussed in detail and no further description of these gates are thought to be necessary. Gates 18–63 and 18–64, however, derive their inputs from the Comparator and some further logical note regarding these two gates may be desirable. Looking at gate 18–63 first it will be seen that this gate has as inputs the A′ and $\overline{C}$ signals from the Comparator. For the description of the Comparator and from the Comparator drawing itself (FIGURE 17) it will be seen that during an add operation of numbers of like signs or a subtract operation of numbers of unlike signs, with the CPFF cleared to $\overline{CP}$, an A′ signal will be generated whenever one but not both of the digits being operated on contain a "1" bit in their four position or is greater than 5. Under the same setting of CPFF, a $\overline{C}$ will be generated if the quinary portions of the two digits do not add to 5 or more. Thus gate 18–63 with its A′ and $\overline{C}$ signals logically indicates that an $O_4$ signal should be generated if one but not both of the digits being operated on is 5 or more and no quinary carry is present.

Turning now to gate 18–64 it will be seen that this gate has as inputs the $\overline{A}'$ and C′ signals. Again from the description of the Comparator and from the Comparator drawing itself it will be seen that during an add operation or a subtract operation, with the CPFF set to CP, a C′ signal will be generated whenever the quinary portion of a digit on the Min Buffer lines, with or without a decimal carry added thereto, is greater than the quinary portion of the digit on the Sub Buffer lines. Under the same setting of the CPFF, the $\overline{A}'$ signal is generated whenever the digits being operated on both contain "0" or "1" bits in their fourth position or whenever both digits are above or below 5 in value. Thus logically gate 18–64 indicates that an $O_4$ signal should be generated if both digits being operated on are above or below 5 and the quinary value of the Min Buffer digit with or without a carry is greater than the quinary value of the Sub Buffer digit.

C REGISTER (*r*C)—FIGURE 13

Referring now to FIGURE 13, there is shown in simplified schematic form, the four parallel channels comprising the Control Register, herein referred to as C or *r*C Register. As previously alluded to, this register is used to store an instruction word for use in Address Selection. Also as previously described, an instruction word comprises a command or instruction portion made up of the P9 and P10 digits which are staticized in the Static Register as an instruction to be performed, and two address portions here designated as the "*m*" and the "*c*" Addresses. The "*m*" Address portion is defined by by the P8, P7, P6 and P5 digits, and the"*c*" Address is defined by the P4, P3, P2, and P1 digits. The P11 digit, the space between words, and the P0 digit, the sign digit, are not used in the instruction word. The "*c*" Address represents the address of the next instruction, while the "m" Address is used only under certain conditions, or during certain instructions, such as, for example, during those instructions which require that an operand be derived from the memory. In this case the "*m*" Address is the address of the operand.

The *r*C Register, comprises, as illustrated four identical channels, one for each bit of the four bit 5421 parallel code used by the computer. Each of the channels include a low level coincidence type input gate 13–2A, 13–2B, 13–2C and 13–2D. Each of these gates receives the unbarred output from a respective one of the Min Buffer circuits shown in FIGURE 20. For example, gate 13–2A receives the $M_1$ output from Min Buffer 1, gate 13–2B the $M_2$ output from Min Buffer 2, gate 13–2C the $M_3$ output from Min Buffer 3, and gate 13–2D the M4 output of Min Buffer 4. Each of these input gates also receives as its other input, the (2) signal from the Control Encoder, FIGURE 27. The (2) signal from the Control Encoder is a low level signal which commences at time *t*0B and persists during the $\beta$ cycle of the machine.

Each of the input gates 13–2A, 13–2B, 13–2C and 13–2D drives a corresponding complementer 13–6A, 13–6B, 13–6C and 13–6D, which in turn drives a closed, or recirculating loop of twenty-four magnetic amplifiers and complementers. Since all the channels of the *r*C Register are identical, the recirculating loop of only the first channel will be described in detail. As indicated, each closed loop comprises a series of twenty-four A and B phase magnetic amplifiers and complementers connected in head to tail relation with the output of the last element connected to the input of the first through a recirculation gate 13–1A for the first channel and gates 13–1B, 13–1C and 13–1D for the remaining channels. For purposes of simplifying the illustration, 13 of the amplifiers and complementers in each channels are shown by a single block containing the numeric designation of 6½, and labelled 13–7A in the first channel. As will be remembered, each amplifier or complementer produces a one-half pulse delay in signal transfer, so that the numeric designation of 6½ indicates a total of 6½ pulse delays or the equivalent of 13 elements. This block contains a dot at its input to indicate that the group of 13 elements includes an odd number of complementers. Similarly, 8 of the elements in each channel are represented by a single block containing the numeric designation 4 and labelled 13–8A in the 1st channel. Two more elements are represented by the single block labelled 13–9A in the first channel and contain the numeric designation 1. The twenty-fourth element in the loop is an A phase complementer designated as element 13–5A in the first channel and as elements 13–5B, 13–5C and 13–5D in the remaining channels.

The recirculation gate 13–1A, 13–1B, 13–1C and 13–1D are as indicated, inhibitory gates which normally function to continuously recirculate the contents of the respective closed loops except during the application of inhibition signals to these gates. In this connection it will be observed that each of the recirculation gates contain a connection to the *t*11B+ terminal of the Cycling Unit, FIGURE 34, so that at time *t*11B in the word cycle, the recirculation path will be jammed. This jamming occurs during the digit time which represents the space between words. Thus the *t*11B+ signal acts to keep the space betwen words clear in the register.

Each of the recirculation gates also has impressed thereon a (2+) signal which is a high level signal obtained from the Control Encoder, FIGURE 27, simultaneously with the (2) signal. The purpose of the (2+) signal is to clear the *r*C Register of its contents at the time a new instruction is being read into the register.

In operation then and during the "$\beta$" cycle, starting at *t*0B, the Encoder signals, (2+) and (2) respectively operate to clear the *r*C Register of its previous contents by jamming the recirculation gate and to read a new instruction therein by opening the input gates. At *t*0B, the start of the "$\beta$" cycle, the bits of the P0 pulse of the new instruction appear at the unbarred output $M_1$, $M_2$, $M_3$ and $M_4$ of the Min Buffer lines. At *t*0B of the next successive minor cycle the (2) and (2+) encoder signals disappear and the new contents within the register continue to recirculate, making one complete recirculation for each minor cycle.

Since the timing of the computer establishes the condition that the P0 pulse of the instruction word appears at the input to the gates 13–2A, 13–2B, 13–2C and 13–2D at *t*0B, and remembering that each amplifier-complementer gives rise to a one-half pulse delay time, it will be observed that P0 equals *t*7B at terminals $C_{13}$, $C_{23}$, $C_{33}$ and $C_{43}$ of the respective channels; and further that P0 will arrive at terminals $C_{14}$, $C_{24}$, $C_{34}$ and $C_{44}$ of the respective channels at time *t*11B. Stated differently, it will be seen that the bits comprising the first digit pulse (P1), of the C Address portion will arrive at terminals $C_{14}$ $C_{24}$, $C_{34}$ and $C_{44}$ at *t*0B, and that the bits of the P5 pulse, or first digit of the "*m*" Address will arrive at terminals $C_{13}$, $C_{23}$, $C_{33}$ and $C_{43}$ of the respective channels also at *t*0B. From this timing relationship it will be seen that the bits of the last digit (P4) of the "*c*" Address will arrive at the terminals $C_{14}$, $C_{24}$, $C_{34}$ and $C_{44}$ at time *t*3B, and the bits of the last digit (P8) of the "m" Address occur at terminals $C_{13}$, $C_{23}$, $C_{33}$ and $C_{43}$ also at time *t*3B. As will be described, the bits appearing at these terminals are applied to the Memory Band and Head Selection gates, FIGURE 28, and are used during Address Selection.

Connected to each of the terminals $C_{14}$, $C_{24}$, $C_{34}$ and $C_{44}$ is a corresponding output gate labelled 13–3A, 13–3B, 13–3C and 13–3D used for deriving the "*c*" Address from the register. Gates 13–4A, 13–4B, 13–4C and 13–4D are connected respectively to terminals $C_{13}$, $C_{23}$, $C_{33}$ and $C_{43}$ and are used to derive the "*m*" Address from the *r*C Register. Also connected to each of the output gates 13–3A, 13–3B, 13–3C, 13–3D, 13–4A, 13–4B, 13–4C and 13–4D of the *r*C Register is the (63) Encoder signal. This signal is obtained whenever the first two stages of the Static Register (FIGURE 25) are set to $\overline{STR1}$ and $\overline{STR2}$ such as in a search operation where either a new instruction signal or an operand is being searched for. In addition to the (63) signal each of the output gates also receive either the CT or the $\overline{CT}$ output from the Control Transfer Flip-Flop CTFF FIGURE 12A. In more particular, the "c" Address output gates 13–3A, 13–3B, 13–3C and 13–3D each receive the $\overline{CT}$ signal while the "m" Address output gates 13–4A, 13–4B, 13–4C and 13–4D each receive the CT output of the CTFF. Thus it will be seen that in the presence of a (63) signal either the "m" or the "c" Address will be read out of the output gates of the rC Register, depending upon whether the CTFF is set to CT or $\overline{CT}$.

The outputs from each of the output gates 13–3A, 13–3B, 13–3C and 13–3D are fed through a corresponding A phase complementer 13–10A, 13–10B, 13–10C and 13–10D to lines $C_{12}$, $C_{22}$, $C_{32}$ and $C_{42}$ and thence to buffers 19–1A, 19–1B, 19–1C and 19–1D respectively of the Sub Buffer circuits FIGURE 19. Thus from the timing relationship previously established in the rC Register, it will be seen that the bits of P1 will occur at t1B at the output of the Sub Buffer circuits. That is, since the bits of P1 occur at the input to the output gate at t0B these same bits will occur at the S line output of the Sub Buffer Circuits at time t1B due to the one-half pulse delay caused by A and B phase complementers included in this path (i.e. the A phase complementers 13–10A etc. at the output of the output gates and the presence of the B phase complementers 19–2A etc. in the S line circuits FIGURE 19).

Each of the "m" output gates 13–4A, 13–4B, 13–4C and 13–4D, like the outputs of the "c" gates, are fed through separate A phase complementers 13–11A, 13–11B, 13–11C and 13–11D respectively to lines $C_{11}$, $C_{21}$, $C_{31}$ and $C_{41}$ and thence to buffers 19–1A, 19–1B, 19–1C and 19–1D respectively of the Sub Buffer circuits FIGURE 19. Again from the timing relationship previously established in the rC Register it will be apparent that the bits of the P5 digit when read out takes place from the gates 13–4A to 13–4D will appear at the output of the S lines of the Sub Buffer circuits at time t1B.

L REGISTER (rL)—FIGURE 14

Having described the control register, rC, the next register to be described will be the L Register herein referred to as the L or rL Register. This register is shown in simplified schematic form in FIGURE 14 and like the rC Register contains four identical recirculating channels, one for each bit of the four bit parallel 5421 code used by the computer. Unlike the rC Register which is used for the storage of instruction words, the rL Register is used for the storage and processing of data words. For example, the rL Register is used during a divide or D operation to store the divisor, and during a multiply or "m" operation to store the multiplicand. In addition the rL Register is used during various transfer instructions such as the "L" or (10) instruction where the contents of a word from the memory is stored in rL and also during the "K" or (07) instruction where the contents of the A Register, later to be described, is transferred to rL.

Referring now in detail to FIGURE 14, it will be recognized that each channel includes a pair of coincidence input gates 14–2A and 14–3A for the first channel; 14–2B and 14–3B for the second channel; 14–2C and 14–3C for the third channel, and 14–2D and 14–3D for the fourth channel. In addition, each channel also includes a recirculation gate 14–1A, 14–1B, 14–1C and 14–1D respectively for the four channels. Each of the channels is made up of a combination of twenty-four A and B phase magnetic amplifiers and complementers connected in head to tail relationship with the output of the last such element connected through the recirculation gate to the input of the first element of the chain to form a closed loop. Since each of the channels are identical only the closed loop relationship of the first channel will be described in detail. Starting at the output of the recirculation gate, gate 14–1A in the first channel, it will be seen that there is first included an A phase complementer 14–5A followed by a group of twenty-one amplifiers and complementers designated as element 14–9A and then by a group of two amplifiers or complementers designated as element 14–8A and finally the input of the recirculation gate 14–1A. As will be remembered, each of the amplifiers or complementers produces a one-half pulse delay in signal transfer so that the numeric designation such as 10½ in block 14–9A indicates a total of 10½ pulse delays or twenty-one elements, while the numeric designation 1 in block 14–8A designates a 1 pulse delay or group of two elements. The dot at the input of element 14–9A indicates that an odd number of complementers are included in this group of elements so that the output of element 14–9A is complemented with respect to its input.

Returning now to the input circuits of the four channels it will be seen that each of the input gates 14–2A, 14–2B, 14–2C and 14–2D is connected to the unbarred output terminals $M_1$ to $M_4$ respectively of the Min Buffer circuits of FIGURE 20. In addition, each of these gates receive as a permissor signal the (8) signal from the Control Encoder of FIGURE 27. The (8) signal from the Control Encoder is a low level signal which is developed at t0B and persists for one minor cycle during the execution of the L transfer instruction. This instruction is a transfer of a word from the Drum Memory to the rL Register. The output of each of the gates 14–2A, 14–2B, 14–2C and 14–2D drive a corresponding complementer 14–6A, 14–6B, 14–6C and 14–6D which in turn is connected to the input of the group of twenty-one elements 14–9A, 14–9B, 14–9C and 14–9D respectively.

Connected to each of the recirculation gates is a t0B+ jamming signal obtained from the Cycling Unit (FIGURE 34) and also a (57+) jamming signal obtained from the Control Encoder of FIGURE 27. The (57+) signal is a high level signal which is obtained simultaneously with the 8 signal and persists for one minor cycle. Thus in the L transfer instruction, the 8 signal opens the respective input gates 14–2A, 14–2B, 14–2C and 14–2D to permit a new word to be read into the rL Register from the Minuend Buffer circuits. At the same time the (57+) signal jams the recirculation gates to clear the rL Register of its old contents. At the end of the minor cycle the (57+) and the (8) signals disappear and the new contents are permitted to recirculate within the register. As will be recalled a minor cycle equals twelve pulse times. Therefore since each loop contains 24 amplifiers and complementers, each providing a one-half pulse delay; the word is the register will make one complete recirculation for each minor cycle. As will also be recalled the timing of the computer is such that the bits of the P0 digit on the Min Buffer lines occur at t0B. Thus in checking the timing around the loops it will be observed that the P0 bits will occur at the output of the group of twenty-one elements 14–9A, 14–9B, 14–9C and 14–9D at t11B, and at the input to the recirculation gates 14–1A, 14–1B, 14–1C and 14–1D one pulse time later or at t0B. The t0B+ timing signal applied to these gates thus blocks recirculation of the P0 bits, which comprise the sign digit of the word. The sign digit as will later be seen is separately store in the sign of rL Flip-Flop FIGURE 11C.

The other input gates 14–3A, 14–3B, 14–3C and 14–3D receive as one input thereto the unbarred outputs $S_1$ through $S_4$ respectively from the Sub Buffer circuits, FIGURE 19. These gates operate in the same manner as the first described input gates during a K instruction which is a transfer of a word in the A Register to the rL Register. No further description of these input gates will be made other than to point out that connected in parallel to these gates is a (16) Control Encoder signal which is developed for one minor cycle during the K instruction. This signal is a low level permissor for the input gates and permits the bits appearing on the $S_1$ to $S_4$ lines to be read into the *r*L Register. The (57+) signal from the Control Encoder of FIGURE 27 is also developed at the same time as the (16) signal so that the register may be cleared of its old contents simultaneously with the read in of the new word from the A Register. As in the case of the first input gates the output of the gates 14–3A, 14–3B, 14–3C and 14–3D are applied through corresponding A phase complementers 14–7A, 14–7B, 14–7C and 14–7D to the input of the group of twenty-one elements 14–9A, 14–9B, 14–9C and 14–9D respectively.

The output from each of the channels of the *r*L Register is taken from the output of the group of twenty-one elements 14–9A, 14–9B, 14–9C and 14–9D and fed through respective coincidence output gates 14–4A, 14–4B, 14–4C and 14–4D and phase A complementers 14–10A, 14–10B, 14–10C and 14–10D to output lines $L_1$, $L_2$, $L_3$, and $L_4$ respectively, and thence to the Min Buffer circuits of FIGURE 20 via the paired amplifier complementer circuits 20–14A, 20–15A etc.

It will be recalled from the above description of the timing of the signals stored in the *r*L Register, that the bits of the P0 digit circulating in the *r*L Register occur at the input to the output gates at *t*11B. Accordingly and due to the one-half pulse delay caused by the complementers 14–10A, 14–10B, 14–10C and 14–10D and the one-half pulse delay of the amplifiers 20–14A etc. or complementers 20–15A etc. at the output of the Min Buffers of FIGURE 20, the P0 digit will occur on the minuend output lines $M_1$, $M_2$ etc. at *t*0B.

The output gates 14–4A, 14–4B, 14–4C and 14–4D are low level coincidence gates and receive not only the bit output from the respective channels of the *r*L Register but also a (66) Control Encoder signal which occurs whenever an instruction calls for an output to be taken from the *r*L Register such as during a multiply of "*m*" instruction or during a Divide or "D" operation for example. Each of the output gates also receives in addition, the OR signal from the OR Flip-Flop (FIGURE 24). This is a jamming signal which overrides the (66) signal during the shift cycle of a division operation and will be described in more detail at a later point in the specification.

X REGISTER (*r*X)—FIGURES 16A and 16B

Referring now to FIGURES 16A and 16B there is shown in block diagram form, the details of the X register, herein referred to as the *r*X Register. FIGURE 16 is an inset showing how FIGURES 16A and 16B may be arranged to demonstrate the parallel disposition of the four channels comprissing the register. In this connection FIGURE 16A shows the channels for the first two bits of the four bit parallel code, while FIGURE 16B shows the channels for the last two bits of the four bit code.

The *r*X Register like the *r*L Register is used for storing and handling data words. To give a few examples, the *x*X Register is used during a multiplication operation (M or 85 instruction) to first store the multiplier and later the least significant portion of the product, and during a divide operation (D or 55 instruction) to first store the quotient and later the remainder. This register is also used during an N or 32 shift instruction; an X or 65 instruction where the contents of the *x*X Register are read into the memory, and for transfer operation such as the Y or 05 instruction where the contents of a given memory address are transferred to the *r*X Register.

Like the other registers of this invention, each of the four channels comprising the *r*X Register includes a group of twenty-four A and B phase complementer and amplifier elements connected in head to tail relationship with the output of the last such element connected through a recirculation gate to the input of the first such element to thereby form a closed recirculating loop for each bit. The first three channels are all identical in the construction of their closed loops. Starting at the output of the recirculating gates, 16–1A for the first channel, 16–1B for the second channel and 16–1C for the third channel, each loop includes first an A phase complementer 16–8A, 16–8B and 16–8C respectively, each providing a one-half pulse period delay, followed by a group of two complementers or amplifiers 16–15A, 16–15B and 16–15C respectively, each providing a one pulse period delay. Connected to the output of the latter elements is a group of eleven amplifier and complementer elements, 16–16A, 16–16B, and 16–16C respectively each providing a five and one-half pulse period delay, which is in turn followed by a group of eight amplifiers or complementers 16–17A, 16–17B, and 16–17C respectively each providing a four pulse period delay, and finally a group of two amplifiers or complementers 16–18A, 16–18B and 16–18C respectively each providing a one pulse period delay. The output from the latter elements are connected to the input of the respective recirculation gates to complete the closed loops.

As discussed previously and for the purpose of simplifying the illustration, groups of amplifier and/or complementing elements are shown as a single block carrying a numeric legend corresponding to the periods of pulse delay produced by the group as a whole. Elements 16–16A, 16–16B and 16–16C are typical wherein each of these groups comprise eleven elements, each element having a one-half pulse period delay—thus the legend five and one-half. In addition, it will be noted that each of these blocks contain a dot on its input which indicates that an odd number of complementers are included in the group so that the output from this group is the complement of its input.

The recirculation loop of the fourth channel differs from the other three channels only in that the group of eleven elements shown at 16–16A, 16–16B and 16–16C in the other channels has been shown broken down into a group of ten elements 16–20, providing a five pulse period delay, preceded by a single B phase amplifier 16–19 providing a one-half pulse period delay. The output of the latter element is applied to an output terminal $\overline{X}_{4D}$ which in turn is applied to a special gate 15–7 of the A Register (FIGURE 15) during a division operation to finish complementing the dividend as will be described in the section dealing with the division instruction.

Like the other registers in the computer, each of the recirculation gate 16–1A, 16–1B, 16–1C and 16–1D are inhibitory gates with input signals provided for jamming recirculation during certain times. In this respect, each of the recirculation gates has applied thereto a (56+) signal which is derived from the Control Encoder, FIGURE 27. This signal is a high level signal which is developed during the intervals when new information is to be read into the register. It persists for a minor cycle and operates to clear the register of its old contents. In addition, each of the recirculation gates has a *t*0B+ signal applied thereto from the *t*0B+ tap of the Cycling Unit, FIGURE 34. This signal is a momentary high level signal which is used to jam recirculation of the sign digit in the register during normal recirculation cycles. The sign digit is, as will be described, separately stored in the Sign of *r*X Flip-Flop, FIGURE 11A.

As shown in the lower part of the figure several gating circuits are provided for feeding information into the register and for shifting the contents within the register. Included in these circuits is a first set of input gates 16–5A, 16–5B, 16–5C and 16–5D each connected through respective A phase complementers 16–12A, 16–12B, 16–12C and 16–12D to the respective closed loops of the register in the manner indicated. These gates are used during the first step, $M_1$, of a multiply instruction for reading the multiplier into the register and during a "Y" instruction for reading the contents of a predetermined memory address into the register. To this end there is connected to each of the gates, the unbarred output from the respective Minuend Buffer circuit (FIGURE 20) with the $M_1$ line connected to gate 16–5A; the $M_2$ line to the second channel gate 16–5B; the $M_3$ line to the third channel gate 16–5C, and the $M_4$ line to the fourth channel input gate 16–5D. Also connected to these gates in parallel is the (76) Control Encoder signal from FIGURE 27. This signal is a low-level permissor signal developed at *t*0B and lasting for a minor cycle to permit new information to be read into the register. At this same time the (56+) signal is applied to the recirculation gates for a minor cycle to clear the register of its old contents. After a minor cycle has elapsed, the (56+) and the (76) Control Encoder signals disappear and the bits comprising the new contents now inserted in the register are permitted to recirculate within the register, making one complete recirculation for each minor cycle. During a read-in operation through input gate 16–5A, 16–5B, 16–5C and 16–5D the bits comprising the P0 pulse (the sign digit) arrive at the input gates at *t*0B, and after one minor cycle these bits arrive at the output terminals $X_1$, $X_2$, $X_3$ and $X_4$ (or at the input of the recirculation gates 16–1A, 16–1B, 16–1C and 16–1D) at *t*0B, so that the *t*0B+ jamming signal operates to block recirculation of these bits. For reference purposes then it will be seen that during a normal recirculation, the P1 bits will appear at terminals $X_1'$, $X_2'$, $X_3'$, and $X_4'$ (taken at the output of the amplifier groups 16–17A, 16–17B, 16–17C and 16–17D, respectively) at *t*0B; while at the same time, t0B, the P5 bits will be available at terminals $X_1$M, $X_2$M, $X_3$M, and $X_4$M taken at the input to these amplifier groups.

As will be described, during the $M_1$ step of a multiplication instruction, the multiplier is inserted in the *r*X Register by using the gates 16–5A, 16–5B, 16–5C and 16–5D just described, and the multiplicand is stored in the *r*L Register. After this step, the multiplication operation assumes a second step designated $M_2$ during which time, the multiplier is read out of the *r*X Register one digit at a time and into the Multiplier Quotient Counter (MQC), FIGURE 23, to control the multiplication operation. This is done by shifting the contents of the *r*X Register to the right, one digit position at a time. During the first shift operation, the least significant digit in the *r*X Register is cleared from the *r*X Register and is read into the MQC. This stores the least significant digit of the multiplier in the MQC. Thereafter the contents of the *r*L Register are added to the contents of the A Register a number of times as determined by the number stored in the MQC. After this addition has taken place, the contents of the *r*X Register are again shifted one place to the right and the next higher order digit in the *r*X Register is cleared from the *r*X Register and stored in the MQC, and the add operation is repeated. This cycle of shift and add is repeated until the multiply operation is completed. As each right shift occurs in the *r*X Register, a corresponding right shift occurs in the A Register and the least significant digit of the product being developed in the A Register is shifted one digit at a time into the most significant digit position of the *r*X Register. This is accomplished by shifting the contents of the A Register to the right and into the *r*X Register.

To read the multiplier into the MQC one digit at a time, the output of the last elements in the closed loop of the register appearing at terminals $X_1$, $X_2$, $X_3$, and $X_4$ respectively are applied to special input gates 23–2A, 23–2B, 23–2C and 23–2D respectively of the MQC (FIGURE 23) to set the count in the MQC accordingly. These last named gates as will be described are repeatedly but momentarily opened for one digit time to accept the bits comprising one digit from the *r*X Register and then they are closed. The next time they are opened, the bits comprising the next higher order digit of the multiplier in the *r*X is stored in the MQC.

To store successively higher order digits in the MQC from the *r*X Register, the contents of the *r*X are shifted right. This is done by taking taps $X_1'$, $X_2'$, $X_3'$ and $X_4'$ at a point one pulse period removed from the end of each of the closed loops and feeding the same to the inputs of a group of right shift gates designated, 16–3A, 16–3B, 16–3C and 16–3D in the respective channels. The output of each of these gates is fed through a respective complementer 16–10A, 16–10B, 16–10C and 16–10D and back into the closed loop in the manner indicated by the drawings. Also connected to each of these channel shift gates is the (59) Control Encoder signal which signal is present for a minor cycle whenever the contents of the *r*X Register is to be shifted one the right. During the operation of gates 16–3A to 16–3D, the (56+) signal will also be present whereby the normal recirculation path is broken. As will be apparent from the recirculating paths through gates 16–3A, 16–3B, 16–3C and 16–3D, the closed loops contain only 22 complementer and amplifier elements, so that a total of 11 pulse periods rather than the normal 12 pulse periods of delay will be encountered in the recirculation path. Thus the digits within the register will shift one position to the right of their normal position for each minor cycle that the (59) signal is present. In more particular it will be seen that in normal operation with the normal recirculation path operative, the bits comprising P1 arrive at the terminals marked $X_1'$, $X_2'$, $X_3'$ and $X_4'$ at time *t*0B and at terminals $X_1$, $X_2$, $X_3$ and $X_4$ at time *t*1B. After a one minor cycle shift, however, the bits comprising P2 will arrive at terminals $X_1'$, $X_2'$, $X_3'$, and $X_4'$ at time *t*0B and at terminals $X_1$, $X_2$, $X_3$ and $X_4$ at time *t*1B. Also connected to each of the shift gates 16–3A, 16–3B, 16–3C and 16–3D is a *t*0B+ jamming signal obtained from the Cycling Unit. This single pulse signal momentarily jams the shift gates to successively clear each digit from the register as it is shifted into the MQC.

To effect a transfer of the contents of the A Register to the *r*X Register during multiplication or during an (N) shift instruction, a group of input gates 16–7A, 16–7B, 16–7C and 16–7D are provided. These gates receive the $A_1'$, $A_2'$, $A_3'$, and $A_4'$ outputs from the respective channels of the A Register, FIGURE 15. In addition, each of these gates receive, a *t*0B– timing signal from the Cycling Unit FIGURE 34, and the (59) signal from the Control Encoder. The (59) signal alerts these gates during the shift phase of the $M_2$ step of a multiply operation and the *t*0B– timing signal permits only the least significant digit in the A Register to be read into the *r*X Register. The output of these gates are connected through respective A phase complementers 16–14A, 16–14B, 16–14C and 16–14D to the closed loops of the *r*X Register in the manner indicated. It should be noted that during multiplication or an (N) shift instruction the contents of both the *r*A and *r*X Registers are being shifted to the right simultaneously. Thus successively higher order digits will be available at the $A_1'$, $A_2'$, $A_3'$ and $A_4'$ output points of the A Register at time *t*0B during successive shift cycles.

As previously noted, the *r*X register is also used in a divide operation, first to accumulate the Quotient and later to receive the remainder from the A Register.

As will be described, the division operation consists of three distinct steps designated $D_1$, $D_2$ and $D_3$. At the start of a division operation the first step, namely $D_1$ obtains for one minor cycle. During this step, the MQC, FIGURE 23, and *r*X Register are cleared of their old contents and a division sentinel is read into the P0, or sign digit position of the *r*X Register. To this end and starting at time *t*0B of $D_1$, there is developed at the output of the Control Encoder, FIGURE 27, (56+) and (15) signals. The (56+) blocks the recirculation gates 16–1A, 16–1B, 16–1C and 16–1D of the *r*X Register to clear the same of its old contents. The (15) signal is used to alert the division sentinel gate 16–16 connected to the first channel of the *r*X Register. This gate has a *t*0B– signal applied to its input and its output is connected through an A phase complementer 16–13 to the closed loop of the first channel of the *r*X Register. Thus at the start of the divide operation, with the (15) signal present, a *t*0B timing signal is gated through gate 16–6 and appears as a decimal "one" in the *r*X Register. At the end of the $D_1$ minor cycle, or more precisely at time *t*0B of the next succeeding minor cycle, the $D_2$ step of the operation is started. At this time, *t*0B of $D_2$, the OR Flip-Flop, FIGURE 24, has been set and is producing both an IER–OR and an OR output signal. The IER–OR signal from the OR Flip-Flop alerts the input gates 23–2A, 23–2B, 23–2C and 23–2D of the MQC, FIGURE 23. These gates have as their other inputs, the $X_1$, $X_2$, $X_3$ and $X_4$ outputs from the *r*X Register. Also at this time, namely, *t*0B of $D_2$, the P0 bits or sentinel stored in the *r*X Register is at the $X_1$, $X_2$, $X_3$ and $X_4$ outputs of the *r*X Register and are blocked from following the normal recirculation path through gates 16–1A, 16–1B, 16–1C and 16–1D by the *t*0B+ jamming signal on these gates, but are free to pass through the above mentioned MQC input gates. At time t1B of the first minor cycle of $D_2$, the ORA+ signal developed by the OR Flip-Flop is effective to block the recirculation paths of the MQC and permit the MQC to operate as a one pulse delay translation circuit as described in the section on the MQC. The sentinel stored in the *r*X Register thus appears on the input lines $Q_1$, $Q_2$, etc. of the MQC at time *t*1B of the first minor cycle of $D_2$. In more particular the sentinel appears at the output of the MQC as the $Q_1$, $\overline{Q}_2$, $\overline{Q}_3$ and $\overline{Q}_4$. The output from the MQC is then fed back into the *r*X register through a set of complement gates designated 16–2A for the first channel, 16–2B and 16–2B′ for the second channel, 16–2C for the third channel and 16–2D for the fourth channel. The output of each of these gates are fed through respective A phase complementers 16–9A, 16–9B, 16–9B′, 16–9C and 16–9D to the closed loops. These gates each are alerted by the OR signal from the OR Flip-Flop and are used to "nines" complement the output from the MQC before it fed into the *r*X register. To this end gate 16–2A receives the $Q_1$ output from the MQC, gate 16–2B the $Q_1$ and $\overline{Q}_2$ outputs, gate 16–2B′ the $Q_2$ and $\overline{Q}_1$ outputs, gate 16–2C the $\overline{Q}_1$, $\overline{Q}_2$, and $\overline{Q}_3$ outputs, and gate 16–2D the $\overline{Q}_4$ output. Thus the sentinel which was initially inserted in the *r*X Register as a decimal "one" having the code $X_1$, $\overline{X}_2$, $\overline{X}_3$, and $\overline{X}_4$ will be reinserted during the first shift operations of $D_2$ through the MQC and complement gates as a decimal "eight" having the code $X_1$, $X_2$, $\overline{X}_3$, and $X_4$. The complement gates in addition to their other inputs also have a *t*0B+ inhibit signal applied thereto from the Cycling Unit. This signal clears progressively higher order digit positions in the *r*X Register preparatory to the receipt of the Quotient digits.

As will be recognized from tracing the recirculation path for the *r*X Register through the MQC and complement gates, the contents of the *r*X Register will be shifted left one digit place due to the added one pulse period delay of the MQC translating circuits, and will be complemented by the action of the gates 16–2A, 16–2B and 16–2B′, 16–2C and 16–2D. This action is referred to as the complement and shift phase of division and is repeated ten times in alternation with an add phase as will be described later.

At the end of the first minor cycle in the $D_2$ step, the OR Flip-Flop is cleared and the complemented and shifted contents within the *r*X Register are permitted to recirculate through their normal path including gates 16–1A, 16–1B, 16–1C and 16–1D. At this time and due to the left shift action of the MQC translating circuits, the P0 bits, or sentinel digit in the *r*X Register arrive at terminals $X_1$, $X_2$, $X_3$ and $X_4$ at time *t*1B. During the time that normal recirculation takes place, the add phase of division is taking place. During this phase, and in more particular during the first add phase the complement of the most significant digit of the quotient is being developed in MQC, and when this digit has been established the OR Flip-Flop is again set at time *t*0B for a minor cycle. The resulting IER–OR signals developed by the OR Flip-Flop at this time opens the input gates 23–2A, 23–2B, 23–2C and 23–2D of the MQC at *t*1B so that the sentinel digit which arrives at the input of these gates at *t*1B may be fed through the MQC. At the same time namely *t*1B the count in the MQC which represents the complement of the most significant quotient digit is read out of the MQC and into the complement gates 16–2A, 16–2B, 16–2B′, 16–2C and 16–2D. At the end of this minor cycle, the OR Flip-Flop is again cleared and normal recirculation resumes. This is the second complement and shift phase during which time the contents of the *r*X Register have again been complemented and shifted left and the most significant digit of the quotient has been read into the *r*X Register. After the second complement and shift phase the P0 bits, or the sentinel will arrive at terminals $X_1$, $X_2$, $X_3$ and $X_4$ at time *t*2B. The complement and shift phases and the add phase continue in alternation for ten cycles until the P0 bits, or the sentinel, has been shifted ten places so that it arrives at the $X_1$, $X_2$, $X_3$ and $X_4$ terminals at *t*9B. When this occurs, a gate 22–21 in the Overflow Flip-Flop circuit, FIGURE 22, detects the sentinel and indicates operations which terminate the $D_2$ step of the divide operation. The computer then automatically passes into the $D_3$ step during which time a (56+) signal is developed to block recirculation in the *r*X Register. At the same time a (32A) signal is developed and applied to the MQC to block recirculation paths of the MQC whereby the MQC acts as a one pulse delay translation circuit. At this time, the contents of the *r*X Register are read out on terminals $X_1$, $X_2$ $X_3$ and $X_4$ through the MQC circuits and the quotient input gates 15–5A, 15–5B, 15–5C and 15–5D into the *r*A Register, FIGURE 15. At the same time a (32) signal is developed at the Control Encoder to alert the input gates 16–4A, 16–4B, 16–4C and 16–4D to the *r*X Register whereby the output from the *r*A Register, namely the remainder, may now be read into the *r*X Register. To this end each of these gates is connected to the $S_1$, $S_2$, $S_3$ and $S_4$ outputs of the Subtrahend Buffer circuits, FIGURE 19. These Subtrahend Buffer circuits in turn receive their inputs from the outputs of *r*A Register. Each of the input gates 16–4A to 16–4D is connected to the respective channel of the *r*X Register through a corresponding A phase complementer 16–11A, 16–11B, 16–11C and 16–11D in the manner indicated.

In addition to the $X_1'$ etc. outputs and the $X_1$ etc. outputs from the *r*X Register there is further included output terminals $X_1M$, $X_2M$, $X_3M$ and $X_4M$ taken from the respective closed loops at the point indicated namely at a point delayed 7 pulse periods from the output of the recirculation gates. Thus during normal recirculation P0=*t*7 at this point. These outputs are connected to gates 20–7A, 20–7B, 20–7C and 20–7D respectively of the Min Buffers, FIGURE 20, and are used during an X instruction when information is to be read from the *r*X Register into the memory as will be described.

A REGISTER (*r*A)—FIGURES 15A AND 15B

FIGURES 15A and 15B, to which reference is now made, show in detailed block diagram form the A Register, herein referred to as the *r*A Register. The inset figure, FIGURE 15, illustrates how FIGURES 15A and 15B may be arranged to demonstrate the parallel relationship of the four channels comprising the register.

The *r*A Register is used extensively in the computer to perform transfer operations, shift operations and arithmetic operations. To cite a few examples, the *r*A Register is used in transferring data words to and from the memory and for transferring data words to and from other registers such as the *r*L Register. It is also used for interchanging data words between registers such as during a shift operation where the contents of the *r*X Register and the *r*A Register are interchanged. During Add and Subtract operations the *r*A Register is used to store one of the operands and to accumulate the resultant answer from the operation. During a multiply operation the *r*A Register is used to store the most significant portion of the product, and during a Divide operation it is used first to store the dividend and later the quotient.

This register like the other registers comprises four recirculating channels operating in parallel and each providing a 12 pulse period delay in their recirculation paths. FIGURE 15A shows the details of channels 1 and 2 which accommodate the first two bits of the four bit parallel code, while FIGURE 15B shows the details of channels 3 and 4 which accommodate the last two bits of the code. As indicated in the drawings, the recirculation paths of each of the channels contain 24A and B phase complementer and amplifier elements connected in head to tail relationship with the output of the last such element in the chain connected through a recirculation gate to the input of the first element in the chain. The recirculation paths of each of the channels are identical and starting at the output of the respective recirculation gates 15–1A, 15–1B, 15–1C and 15–1D, each channel includes a single one-half pulse delay A phase complementer 15–11A, 15–11B, 15–C and 15–11D respectively, followed by a group of two one-half pulse delay complementers or amplifiers 15–18A, 15–18B, 15–18C and 15–18D respectively each providing a one pulse delay. The output of these elements feed in turn a group of eleven one-half pulse delay complementers or combination of complementers and amplifiers 15–20A, 15–20B, 15–20C and 15–20D respectively, which provide a five and one-half pulse period delay. The output of these elements drive a group of eight amplifier or complementer elements 15–21A, 15–21B, 15–21C and 15–21D which provide a total delay of four pulse periods. The output of these elements in turn drive a group of two amplifiers or complementers 15–23A, 15–23B, 15–23C and 15–23D respectively which provide a one pulse period delay and which in turn have their outputs connected as one input to the respective recirculation gates 15–1A, 15–1B, 15–1C and 15–1D. As in the other registers the dot at the input to a group of elements, such as elments 15–20A, 15–20B, 15–20C and 15–20D indicates that an odd number of complementer elements are included within these groups.

Each of the recirculation gates 15–1A, 15–1B, 15–1C and 15-1D in addition to receiving the output from the last element of the recirculation paths also receive as inputs, a high level *t*0B+ jamming signal from the Cycling Unit (FIGURE 34) for clearing the sign digit from the recirculation paths, and a high level *t*11B+ jamming signal from the Cycling Unit for clearing the space between words from the recirculation paths. In addition each of the recirculation gates obtain a high level 55+ signal from the Control Encoder, FIGURE 27. This signal obtains during the various operations indicated by the alphabetic symbols shown opposite this terminal and persists for a minor cycle to clear the register of its contents.

To permit reading a data word into the register a set of input gates 15–4A, 15–4B, 15–4C and 15–4D is provided. Each of these gates is connected through a corresponding A phase complementers 15–14A, 15–14B, 15–14C and 15–14D to the recirculation loops in the manner indicated. Each of these gates receives and is alerted by a 77 signal from the Control Encoder. This signal is a low-level permissor which obtains for a minor cycle during certain operations such as the B, P, E, etc. instruction as indicated by the alphabetic symbols shown in the drawing. In addition each of the gates has applied thereto the outputs from the corresponding unbarred M and S lines of the Min and Sub Buffer circuits shown in FIGURES 20 and 19 respectively. For example, input gate 15–4A is connected to the $M_1$ and $S_1$ output lines, gate 15–4B, is connected to the $M_2$ and $S_2$ output lines, gate 15–4C to the $M_3$ and $S_3$ output lines and gate 15–4D to the $M_4$ and $S_4$ output lines. Gate 15–4A receives in addition a *t*0B+ high level jamming signal which prevents insertion of the sign digit in the register.

To illustrate the operation of these gates, assume that a B instruction is to be performed; that is, the contents of a given memory address is to be read into the *r*A Register. At this time the Encoder, FIGURE 27, will produce 55+, 77 and 82+ signals. The 82+ signal is a pulsating high level signal which is applied to the buffers 19–1A to 19–1D of the Sub Buffer circuits, FIGURE 19, causing the unbarred Sub Buffer output lines $S_1$ to $S_4$ to deliver a series of low level pulses ("1" bits) to the above mentioned input gates 15–4A to 15–4D. At the same time the 55+ signal blocks the recirculation gates 15–1A to 15–1D to clear the *r*A Register of its old contents, and the 77 signal opens the input gates 15–4A to 15–4D to permit the M line bits appearing on $M_1$ to $M_4$ to be read into the *r*A Register. After a minor cycle the 82+, the 77 and the 55+ encoder signals disappear and the new contents now stored in the *r*A are permitted to recirculate therein, making one complete recirculation each minor cycle. As previously alluded to the timing within the computer is normally such that the input to the input gates from the M lines is P0=*t*0.

Several outputs are taken from the *r*A Register, the first of which to be described are designated as $A_{11}$, $A_{21}$, $A_{31}$ and $A_{41}$. These outputs are obtained by tapping the recirculation loops at a point one pulse period delayed from the end of the loop and feeding the output through respective gates 15–10A, 15–10B, 15–10C and 15–10D to corresponding A phase complementers 15–22A, 15–22B, 15–22C, and 15–22D. The output from these latter elements are in turn connected to buffer elements 19–1A, 19–1B, 19–1C and 19–1D of the Sub Buffer circuits of FIGURE 19, from where the output of the *r*A Register is developed on the $S_1$ to $S_4$ lines of the Sub Buffer circuits. Connected to each of the output gates 15–10A, 15–10B, 15–10C and 15–10D is a 58+ jamming signal from the Control Encoder for preventing the output from the A Register from being applied to the S lines. This signal is developed during various operations of the computer such as during a search operation and during other operations as indicated by the alphabetic symbol opposite this terminal.

It should be recognized that during normal recirculation within the *r*A Register, the timing is such that P0=*t*0B at the input to the recirculation gates and at this same time, namely at time *t*0B, the P1 bits appear at the input to the output gates 15–10A to 15–10P and hence at the output taps $A_1'$, $A_2'$, $A'_3$ and $A_4'$. Therefore, since P1=*t*0B at the input to gates 15–10A to 15–10D, the output of the *r*A as it appears on the S lines will be P1=*t*1B due to the added one-half pulse delay of the complementers 15–22A to 15–22D and the one-half pulse delay of the elements in the Sub Buffer circuits.

The timing P1=*t*0B at taps $A_1'$ to $A_4'$ permits the use of these points to effect a right shift of the contents of the *r*A Register such as is required by the N instruction and the $M_2$ shift phase of multiply. Gates 15–2A, 15–2B, 15–2C and 15–2D are provided for this purpose. Each of these gates is connected to the corresponding $A_1'$ to $A_4'$ terminals of the respective loops. These gates are alerted by a 59 low level permissor signal developed by the Control Encoder of FIGURE 27 whenever it is desired to shift the contents of the *r*A Register to the right. Whenever this signal is developed the (55+) jamming signal for the normal recirculation paths also is developed whereby the normal recirculation path is broken and a shortened recirculation path through gates 15–2A to 15–2D is established. The output of the latter gates are fed through respective A phase complementers 15–12A, 15–12B, 15–12C and 15–12D back into the recirculation paths as indicated. It will be recognized that whenever recirculation takes place through gates 15–2A to 15–2D the recirculation path has twenty-two one-half pulse delays in its composition so that the path has been shortened from 12 pulse periods of delay to 11. Thus after one minor cycle, the bits of P2 will appear at the taps $A_1'$ to $A_4'$ at time *t*0B.

Whenever the contents of the *r*A Register are being shifted to the right during for example, the $M_2$ step of multiply as will be explained, the contents of the *r*X Register are being shifted right into the MQC, FIGURE 23. Also during this step of the Multiply instruction the least significant portion of the product which is being developed in the *r*A Register must be shifted digit by digit into the *r*X. This is accomplished by connecting the $A_1'$ to $A_4'$ taps of the *r*A Register to the gates 16–7A, 16–7B, 16–7C and 16–7D of the *r*X Register. Thus during the first shift cycle of $M_2$ when P1=*t*0B at terminal $A_1'$ to $A_4'$, it will be seen that the *t*0B– timing signal applied to the gates 16–7A to 16–7D will open, to receive the P1 digit in the *r*A Register. At the same time namely *t*0B, a *t*0B+ jamming signal applied to gate 15–2A to 15–2D clears this digit, P1, from the *r*A Register. Following the first minor cycle P2=*t*0B at the $A_1'$ to $A_4'$ taps so that during the next shift cycle the P2 digit in *r*A will be read into *r*X Register, and so on.

As will be explained in the N instruction, the contents of the *r*X and *r*A are interchanged, and each register is undergoing a right shift so that the least significant digit in each register is shifted into the most significant digit position of the other register in a digit by digit manner. That is during the first minor cycle of the shift instruction, the P1 digit in the *r*A Register is shifted out of the *r*A Register and into the *r*X Register. At the same time the P1 digit in the *r*X Register is shifted out of the *r*X Register into the *r*A Register. During the second minor cycle of the shift operation, the P2 digits are interchanged and so on. The manner in which the digits of the *r*A Register are shifted out of this register in the *r*X during the N instruction is the same as that described above in connection with the $M_2$ shift operations. For the purposes of receiving the shifted digits of the *r*X Register into the *r*A Register a set of gates designated 15–8A, 15–8B, 15–8C and 15–8D are provided. These gates are each connected through corresponding A phase complementers 15–19A, 15–19B, 15–19C and 15–19D to a tap one and one-half pulse periods delayed from the start of the recirculation loops in the *r*A Register. Each of these gates receives a low level *t*0B– gating signal from the Cycling Unit and a (22) permissor Encoder signal. In addition each gate is connected to the corresponding $X_1'$ to $X_4'$ output taps of the *r*X Register. During normal recirculation in the *r*X Register P1=*t*0B at taps $X_1'$ to $X_4'$. Thus during an N shift instruction the (22) Encoder signal alerts the gates 15–8A to 15–8D and the *t*0B– timing signal gates the digit appearing at the $X_1'$ to $X_4'$ taps of the *r*X Register into the *r*A Register. At the same time the corresponding *r*X Register gates operate to gate the digit appearing at the taps $A_1'$ to $A_4'$ of the *r*A Register into the *r*X Register. It will be apparent that since there is a total of ten pulse periods of delay between the right circular shift input gates 15–8A to 15–8D and the right circular shift output taps $A_1'$ to $A_4'$ and that since the least significant digit in the *r*A Register is at the output taps $A_1'$ to $A_4'$ at *t*0B, the digit being shifted into the register is read into the most significant position of the *r*A Register. A similar situation exists with respect to the reading of digits of the *r*A Register into the *r*X Register.

In addition to the right shift feature present in the *r*A Register, this register also possesses left shift facilities which are required in order to execute the V instruction and the shift and complement phase of the $D_2$ step of divide. For this purpose gates 15–3A, 15–3B, 15–3C, 15–3D and 15–3D′ are provided. Each of these gates are coupled through a corresponding A phase complementer 15–13A, 15–13B, 15–13C, 15–13D and 15–13D′ respectively, each connected to the recirculation paths of the register in the manner indicated. Each of these gates is connected to the *t*0B+ tap of the Cycling Unit whereby recirculation of the digit at the inputs of these gates at *t*0B may be jammed, and also to the (71) Control Encoder signal which is a permissor signal for alerting the gates. The (71) signal during the shift and complement phases of the divide operation occurs repeatedly at one minor cycle intervals in alternation with an add phase, while during the $V_2$ step of a V shift instruction the (71) signal persists for a number of minor cycles equal to the number of digit positions of left shift the instruction calls for.

To effect the left shift of the digits within the register a one pulse period of delay is added to the recirculation paths. For the first three channels of the register this added one pulse period of delay is obtained by feeding the contents of the *r*A Register out onto the S lines ($S_1$ to $S_3$) of the Sub Buffer circuits, FIGURE 19, through the output gates 15–10A to 15–10C. From the S lines the first three bits are routed through the adder input gates 18–1 to 18–6 and translating circuits, FIGURE 18A, to the $S_{1C}$ to $S_{3C}$ lines from whence they are returned to the input gates 15–3A to 15–3C respectively. The one pulse period of delay encountered between the output of the S lines and the $S_{1C}$ to $S_{3C}$ terminals makes the recirculation paths of the first three channels, 13 pulse periods in length; hence the left shift. The bits in the fourth channel are shifted left by adding a one pulse period of delay directly to this channel. To this end, the end of the normal recirculation loop of the fourth channel is tapped and fed through on A phase amplifier 15–24 to the input of a B phase complementer 15–25 and a B phase amplifier 15–26 in parallel. The output of these latter elements are designated $\overline{A}_4''$ and $A_4''$ respectively and are fed to the respective left shift gates 15–3D and 15–3D′.

The $A_4''$ output is the uncomplemented or true value of the bits circulating within the fourth channel of the *r*A Register, while the $\overline{A}_4''$ output is the complement of the recirculating bits. Gates 15–3D and 15–3D′ have as a fourth input thereto the $\overline{CP}$ and CP outputs respectively of the Complementer Flip-Flop, FIGURE 21. During a normal left shift operation (V instruction) the complementer Flip-Flop is set to $\overline{CP}$ thereby alerting the adder input gates 18–2 and 18–5 and the left shift gate 15–3D for the fourth channel. During this setting of the CPFF, the contents of the *r*A Register are simply shifted left one digit each minor cycle of shift. During the shift and complement phase of divide, however, the contents of the *r*A Register must be not only shifted but complemented. This is accomplished by setting the CPFF to its CP state. The CP output of the CPFF alerts the complementing gates 18–3 and 18–6 of the adder and the complement gate 15–3D′ of the fourth channel. During this time then the contents of the *r*A Register are shifted left and complemented.

Since in a divide operation, the contents of *r*A Register are repeatedly shifted and complemented it will be apparent that the contents of this register will alternately correspond to true and complement values of its contents.

That is, the first and alternate complement operations thereafter will cause the complement of the value to exist in the *r*A Register while the second and alternate complement operations thereafter will cause the true value of the contents to be stored in the *r*A. (The complement of a complement is the real number.) Thus during the shift and complement phase of a divide operation, the least significant digit stored in the *r*A Register should alternately be a 0 or a 9 in order to represent respectively the true or the complement values within the *r*A Register. That is whenever the true value is stored in the *r*A Register, the least significant digit should be a 0, while whenever the complement value is stored in the *r*A Register the least significant digit should be a 9. To this end the $\overline{X}_{4D}$ terminal of the *r*X Register is connected to a gate 15–7 the output of which is applied through an A phase complementer 15–17 and Buffer 15–28 to the 3rd and 4th channels of the *r*A Register as indicated. This gate is alerted by the OR output of OR Flip-Flop FIG. 24 and a *t*1B– gating signal from the Cycling Unit FIGURE 34. The OR signal is generated whenever, during a divide operation, the contents of the *r*X and *r*A Registers are to be shifted and complemented. Thus since the contents of the *r*X Register is simultaneously shifted and complemented with the contents of *r*A Register, the bit appearing at the $\overline{X}_{4D}$ terminal at *t*1 will alternately be a "1" and a "0" (high and low level). Whenever this is a low level bit such as on the first and alternate shift cycles thereafter a signal will be gated through gate 15–7 to force "1" bits in each of channels 3 and 4 of the *r*A Register. "1" bits in these channels correspond to a decimal value of 9 (the nines complement of a 0). During the second shift and complement, cycle, and alternate such cycles thereafter a high level or "1" bit will appear at terminal $\overline{X}_{4D}$ at time *t*1B so that a 0 bit will be forced into channels 3 and 4 of the *r*A Register. This corresponds to the storage of a decimal 0 in the least significant digit position of the register.

During the last step of divide, $D_3$, the quotient built up in *r*X is to be transferred to the *r*A Register and the remainder built up in the *r*A Register is to be transferred to the *r*X Register. For this purpose, gates 15–5A, 15–5B, 15–5C and 15–5D are provided. Each of these gates are connected through a corresponding A phase complementer 15–15A, 15–15B, 15–15C and 15–15D respectively to the closed loops of the register as indicated. Each of these gates is alerted by a (32) signal from the Control Encoder and receives as its input signals the $Q_1$ to $Q_4$ outputs of the MQC, FIGURE 23. Thus at time *t*0B of the $D_3$ step of divide, the (55+) signal is generated to block recirculation in the rA Register, and the contents of this register are read out onto the S lines of the Sub Buffers and into the *r*X Register through gates 16–4A to 16–4D. At the same time the (32) signal is generated and gates 15–5A to 15–5D are opened whereby the last quotient digit in the MQC is read into the *r*A Register followed by the contents of the *r*X Register. At this time the recirculation paths of the MQC are blocked and the contents of the *r*X Register are read through the MQC into the input gates 15–5A to 15–5D of the *r*A Register.

This completes the description of the input gates of the *r*A Register except for gate 15–6. This gate is the multiplication sentinel gate and has its output connected through an A phase complementer 15–16 and a buffer 15–27 to the recirculating paths of channels 1 and 3. At the start of a multiply instruction, during the $M_1$ step of multiply a (13) Control Encoder signal is generated. This signal alerts gate 15–6 and at time *t*1B a timing signal obtained from the Cycling Unit, FIGURE 34, is gated through gate 15–6 as a "1" bit in each of channels 1 and 3. A "1" bit in channels 1 and 3 appears as an improper "five" in the biquinary code. At time *t*0B of the next minor cycle, this sentinel appears at the $A_1'$ to $A_4'$ taps and is read into the most significant digit position of the *r*X Register where after ten shift cycles in the multiply operation the sentinel is read into the MQC. Reading its sentinel into the MQC is sensed by the gate 25–15 in the Static Register to stop the multiply instruction.

The last input circuit for the *r*A Register is obtained from buffers 15–9A, 15–9B, 15–9C and 15–9D. These buffers are connected to the recirculation paths of the *r*A Register as indicated. These buffers receive the $O_{11}$ to $O_{42}$ outputs of the adder, FIGURE 18B, as indicated. The purpose of this connection is to permit the results of the adder to be recirculated back into the *r*A Register for storage. As indicated, the tap to which these buffers are connected is one and one-half pulse period delayed from the start of the recirculating loops. This one and one-half period delay compensates for the corresponding one and one-half periods of delay encountered by the operands as they are processed through the adder input gates, translating circuits and adder output gates of FIGURES 18A and 18B.

The *r*A Register has in addition to the two outputs previously described, a third output designated A1M, A2M, A3M and A4M taken at a point seven pulse periods delayed from the start of the loops where P0=*t*7. These outputs are fed to gates 20–4A, 20–4B, 20–4C and 20–4D of the Min Buffers. These outputs and the gates 20–4A to 20–4D are used during an H instruction where it is desired to read the contents of the *r*A Register into the memory.

SIGN FLIP-FLOPS—FIGURES 11A TO 11C

Referring now to FIGURES 11A, 11B and 11C there are shown the Sign of (*r*X) Flip-Flop, the Sign of (*r*A) Flip-Flop and the Sign of (*r*L) Flip-Flop wherein these flip-flops store the sign information relative to the data contained in the X, A and L Registers, respectively.

Referring to FIGURE 11A it may be seen that the Sign of *r*X Flip-Flop comprises a complementer 11–29 and an amplifier 11–30 connected together at their inputs, with the output of complementer 11–29 connected to one input of recirculation gate 11–23 which in turn is connected at its output to the input of recirculation complementer 11–28. The output of recirculation complementer 11–28 is connected to the input of elements 11–29 and 11–30, so that there is a feedback loop from the output of complementer 11–29 via gate 11–23 and complementer 11–28 back to its input. A low level signal applied to the common inputs of complementer 11–29 and amplifier 11–30 will cause the complementer 11–29 to produce a high level output signal and amplifier 11–30 to produce a low level signal. This condition of the flip-flop is indicative of a minus quantity stored in the X Register, and by convention the X– signal is present at the output of amplifier 11–30. The high level output of complementer 11–29 will be transmitted through gate 11–23 to the input of complementer 11–28 which will produce after its inherent delay period a low level signal which will be reapplied to the inputs of elements 11–29 and 11–30 whereby the flip-flop shown in FIG. 11A will continue to produce X– signals. It will be appreciated that a high level signal applied to the common inputs of amplifier 11–30 and complementer 11–29 will cause amplifier 11–30 to produce a sustained series of high level signals and will cause complementer 11–29 to produce a sustained series of low level signals, whereby the Sign of *r*X Flip-Flop is said to be producing X+ signals at the output of complementer 11–29 indicating a positive quantity stored in the X Register.

The common inputs of elements 11–29 and 11–30 are connected to ($14_1A$) output line of the Instruction Decoder (FIG. 26) and to the output of complementer 11–26 which in turn is connected at its input to the output of gate 11–22. Gate 11–22 is connected at its input to the (78) signal line of the Control Encoder and the *t*0B– output of the Cycling Unit (FIG. 34). It will be appreciated that at time *t*0B gate 11–22 will pass a low level signal to the input of complementer 11–26 provided that the (78) signal is present. In response to this low level signal complementer 11–26 will produce after its inherent delay period a high level signal which as noted before will cause the X+ signal to be produced at the output of amplifier 11–30. Because of the inherent delay in elements 11–26, 11–29 and 11–30 the effect of a signal passing gate 11–22 at time *t*0B will not be realized at the output of the Sign of rX Flip-Flop until time *t*1B. The ($14_1$A) signal is also a high level signal and when it occurs the Sign of *r*X Flip-Flop will accordingly be set to produce X+ signals. As indicated on the drawing the (78) signal is generated at the beginning of the Y order; at the beginning of the $M_1$ portion of the multiplication operation and at the beginning of the $D_1$ portion of the divide operation; and the ($14_1$A) signal is generated at the beginning of the $M_2$ portion of the multiplication operation so that when these aforementioned operations are set up by the Static Register, the Sign of *r*X Flip-Flop will be set as to produce X+ signal.

Recirculation gate 11–23 is also connected at a second input to the output of amplifier 11–27 which is driven by the outputs of complementers 11–24 and 11–25. The input of complementer 11–24 is connected to the output of gate 11–20 and the input of complementer 11–25 is connected to the output of gate 11–21.

It will be observed that gate 11–21 is connected at its input to the *t*0B– output of the Cycling Unit (FIG. 34), the (78) output line of the Control Encoder (FIG. 27) and the $M_1$ output line of the Minuend Buffer (FIG. 20); and gate 11–20 is connected at its input to the IER output of the IER Flip-Flop (FIG. 24) and the A– output of the Sign of *r*A Flip-Flop (FIG. 11B). Whenever all the inputs to either gate 11–20 or 11–21 are at a low level the complementers associated therewith will produce after their inherent delay period a high level signal which is propagated through amplifier 11–27 and gate 11–23 to the input of complementer 11–28. In response thereto complementer 11–28 will produce after its inherent delay period a low level signal at the input of elements 11–29 and 11–30 causing the Sign of *r*X Flip-Flop to produce X– signals.

It will be appreciated that a coincidence of low level signals applied to either gate 11–20 or 11–21 will not bring about the desired result at the output of the sign of *r*X Flip-Flop until two pulse periods has elapsed. Since gate 11–21 can only transmit a signal at time *t*0B its effect on the Sign of *r*X Flip-Flop will not be observed until time *t*2B. Thus even though gates 11–21 and 11–22 may be alerted at the same time (*t*0B) and may both pass signals to the input of the *r*X Flip-Flop simultaneously their effects will be realized at two different times; namely at time *t*1B and time *t*2B respectively. Examining gate 11–21 it will be seen that this gate will transmit the information on the $M_1$ line of the Minuend Buffers at time *t*0B during designated operations (Y, M, D). This information on the M lines will coincide with the sign digit of a word and therefore if there is a "1" bit on the $M_1$ line at time *t*0B the Sign of the *r*X Flip-Flop will be set to its minus condition at time *t*2B. On the other hand if there is not a "1" bit on the $M_1$ line of the Minuend Buffer at time *t*0B gate 11–22 will still transmit a signal causing the Sign of *r*X Flip-Flop to be set to its X+ condition at time *t*1B.

Gate 11–20 is used in the multiplication order to set the Sign of the *r*X Flip-Flop to the same condition as the Sign of *r*A Flip-Flop. As shall be explained both the A and the X Registers may store the result of a multiplication operation wherein the A Register stores the most significant part of the product and the X Register stores the least significant part of the product. It will be appreciated however, that the sign of both these registers which are stored in the Sign of (*r*A) and the Sign of (*r*X) Flip-Flops must coincide.

Referring now to FIG. 11B there is shown the Sign of *r*A Flip-Flop which comprises a complementer 11–18 and an amplifier 11–19 connected together at their inputs wherein the output of complementer 11–18 is connected to one input of recirculation gate 11–43 which in turn is connected at its output to the input of a recirculation complementer 11–17. The output of recirculation complementer 11–17 is connected to the input of elements 11–18 and 11–19, so that there is a feedback loop from the output of complementer 11–18 via gate 11–43 and complementer 11–17 back to its input. A low level signal applied to the common inputs of complementer 11–18 and amplifier 11–19 will cause the aforementioned elements to produce, after their inherent delay periods, a high level output and a low level output signal respectively. This condition of the Sign of *r*A Flip-Flop is indicative of a plus quantity stored in the A Register and by convention the A+ signal is present at the output of amplifier 11–19. The high level output of complementer 11–18 will be transmitted through gate 11–43 to the input of complementer 11–17 which will produce after its inherent delay period a low level signal which will be reapplied to the inputs of common elements 11–18 and 11–19 whereby the flip-flop shown in FIG. 11B will continue to produce A+ signals.

It will be appreciated that the high level signal applied to the common inputs of amplifier 11–19 and complementer 11–18 will cause amplifier 11–19 to produce a sustained series of high level signals and will cause complementer 11–18 to produce a sustained series of low level signals whereby the Sign of *r*A Flip-Flop is said to be producing A– signals at the output of complementer 11–18 indicating a negative quantity stored in the A Register.

The common inputs of elements 11–18 and 11–19 are connected to the (13A) and (15A) output lines of the Instruction Decoder (FIG. 26) and to the outputs of complementer 11–14, 11–15 and 11–16 which are in turn respectively connected to the outputs of gates 11–6, 11–7 and 11–8. As indicated on the drawings the (13A) and (15A) signals are generated at the beginning of the multiply (M) and divide (D) orders respectively and since they are high level signals they will cause the Sign of *r*A Flip-Flop to produce A– signals. It will be shown in the explanation of the multiply and divide orders that the A Register stores the result of these two operations and therefore it can be understood that it is assumed that the result will be negative. However, provisions are made as will be shown, to change sign of the A Register contents should the sign of the result obtained in the multiplier or divide order be positive. It will be recalled from the description of the Decoder that the (13A) and the (15A) high level signals are generated at time *t*0A therefore their effect on the Sign of the *r*A Flip-Flop will not be observed until time *t*0B.

Gate 11–6, which furnishes the drive for complementer 11–14, is connected at its input to the (4) output line of the Control Encoder (FIG. 27), the CP output of the CPFF (FIG. 21), the A and C outputs of the Comparator (FIG. 17), the *t*11B– output of the Cycling Unit (FIG. 34) and the A+ output of the Sign of *r*A Flip-Flop.

When all the inputs to gate 11–6 are at a low level (a condition which can only occur at time *t*11B), complementer 11–14 will generate after its inherent delay period, a high level signal which will be applied to the common inputs of elements 11–18 and 11–19 whereby the Sign of *r*A Flip-Flop will produce A– signals at time *t*0B. It will be shown in the explanation of the add (A) and subtract (S) orders that the result obtained in these computations is stored in the A Register. Accordingly gate 11–6 detects a condition where the sign stored in the Sign of *r*A Flip-Flop does not truly reflect the sign of the result stored in the A Register and provides a circuit for changing the output of the Sign of *r*A Flip-Flop.

Gate 11–7 is connected at its input to the (6) output line of the Control Encoder (FIG. 27), and a *t*0B– output line of the Cycling Unit (FIG. 34). At time *t*0B when the (6) signal is generated (at the beginning of a B or I order) gate 11–7 transmits a low level signal to the input of complementer 11–15 which after its inherent delay period will produce a high level signal to the input of elements 11–18 and 11–19 causing the Sign of *r*A Flip-Flop to generate A– signals. During the B and I orders the contents of a designated location of the memory or the contents of the 0 Register are transferred to the A Register and at time *t*0B the Sign of *r*A Flip-Flop is activated so that at time *t*1B A– signals will be produced by this flip-flop. If on the other hand the sign of the quantity being transferred into the A Register is positive the input circuit comprising gate 11–4 and complementer 11–12, which shall be fully described,, allows a signal to enter the Sign of *r*A Flip-Flop so that A+ signals will be generated at time *t*2B.

Gate 11–8 is connected at its input to the (6) and (29) output lines of the Control Encoder (FIG. 27), the IB2 output of the IB Flip-Flop (FIG. 48A) and the SR– output of the SR Flip-Flop (FIG. 52) which stores the sign of the data contained in the 0 Register FIG. 50. When all the inputs to gate 11–8 are at a low level complementer 11–16 will transmit after its inherent delay period a high level signal which again will cause the Sign of *r*A Flip-Flop to produce A– signals. Gate 11–8 detects a condition where the sign of the quantity stored in the 0 Register is minus. Accordingly this gate will cause the Sign of *r*A Flip-Flop to produce A– signals when the contents of the 0 Register are transferred to the A Register if the contents of the 0 Register is negative.

Recirculation gate 11–43 is connected at a second input to the output of amplifier 11–42 which is connected to the input to the outputs of complementers 11–9 through 11–13. The aforementioned complementers are in turn connected at their inputs to the outputs of gates 11–1 through 11–5 respectively. Whenever all the inputs to any of the gates 11–1 through 11–5 are at a low level the complementer associated with the selected gate will produce after its inherent delay period a high level signal which in turn causes amplifier 11–42 to produce after its inherent delay period a high level signal at the input of gate 11–43. This high level signal at the input to gate 11–43 will be transmitted therethrough, notwithstanding the level of the signal on the remaining input of this gate, and will be applied to complementer 11–17 which will produce after its inherent delay period a low level signal at the common inputs of elements 11–18 and 11–19 whereby the Sign of *r*A Flip-Flop will be caused to produce A+ signals.

Gates 11–1 and 11–2 are connected at their inputs to the (86) output line of the Control Encoder (FIG. 27) and the *t*11B– output line of the Cycling Unit (FIG. 34). In addition gate 11–1 is connected to the X+ and L+ outputs of the Sign of *r*X Flip-Flop and the Sign of *r*L Flip-Flop respectively and the input to the gate 11–2 is connected to the X– and L– outputs of the Sign of *r*X Flip-Flop and Sign of *r*L Flip-Flop. These two gates are alerted at time *t*11B during the first ($M_1$) and third steps ($D_3$) of the multiply and divide orders and therefore a signal transmitted through these aforementioned gates will not affect the output of the Sign of *r*A Flip-Flop until time *t*1B owing to the inherent delay in elements 11–9 or 11–10, 11–42, 11–17, 11–18 and 11–19.

It can be readily seen, therefore, that at time *t*11B gates 11–1 and 11–2 will pass an input signal to their respective complementers 11–9 and 11–10 if there is agreement in the sign data stored in the Sign of *r*X and *r*L Flip-Flops, indicating that the operands manipulated during these orders have like signs.

Gates 11–3 and 11–5 are both alerted by the 4 signal from the Instruction Encoder (FIG. 27), the *t*11B– output of the Cycling Unit (FIG. 34), and the CP output of the Complement Flip-Flop (FIG. 21). In addition, gate 11–3 is connected at its inputs to the EQ and A′ outputs of the Comparator (FIG. 17) and the TS output of the Time Selection Flip-Flop (FIG. 12); and gate 11–15 is connected to the A and C outputs of the Comparator (FIG. 17) and the A– output of the Sign of *r*A Flip-Flop. Gate 11–5 detects a condition during the add (A) or subtract (S) order wherein the output of the Sign of *r*A Flip-Flop does not reflect the sign of a result stored in the A Register as a consequence of the aforementioned operations. Since gate 11–5 is controlled in part by the *t*11B output of the Cycling Unit, the output of the Sign of *r*A Flip-Flop will not be affected until time *t*1B in response to the transmission of the signal through the aforementioned gate.

Gate 11–3 detects a condition wherein the result of an add or subtract operation is equal to zero (0). In this computer the quantity zero (0) is by convention considered as a positive quantity and, therefore, when zero (0) is the result of an add or subtract operation the Sign of the *r*A Flip-Flop will be set to produce A+ signals.

Gate 11–4 is connected to the *t*0B– output of the Cycling Unit (FIG. 34), the $\overline{M}_1$ output of Min Buffer 1 (FIG. 20), and the (6) output of the Signal Encoder (FIG. 27). The output of Min Buffer 1 at time *t*0B corresponds to the sign of a word being transferred via the Minuend Buffer. Accordingly, if the sign digit contains a zero (0) in its least significant bit (indicative of plus) gate 11–4 will transmit a signal which will cause the Sign of *r*A Flip-Flop to produce A+ signals at time *t*2B. It will be appreciated that gates 11–4 and 11–7 are both alerted at the same time. Gate 11–7 will pass a signal at the beginning of a "B" order to the inputs of elements 11–18 and 11–19 causing the Sign of *r*A Flip-Flop to produce A– signals at time *t*1B. However, if the sign of the word being transferred during the B order is positive then gate 11–4 will transmit a signal to the inputs of elements 11–18 and 11–19, via (elements 11–12, 11–42, 11–43 and 11–17) causing the Sign of *r*A Flip-Flop to produce A+ signals.

Referring now to FIG. 11C in conjunction of FIG. 11A it may be seen that the Sign of *r*L Flip-Flop is very similar to the sign of *r*X Flip-Flop already described and comprises amplifiers 11–38 and 11–41, complementers 11–39 and 11–40 and gate 11–34 which correspond to amplifiers 11–27 and 11–30, complementers 11–23 and 11–29 and gate 11–28 respectively of the Sign of *r*X Flip-Flop. It will therefore be understood that a low level signal applied to the common inputs of elements 11–40 and 11–41 will set the Sign of *r*L Flip-Flop to the condition where L– signals are produced and a high level signal applied to the common inputs of the aforementioned elements will set the Sign of *r*L Flip-Flop to a condition where L+ signals are produced.

The common input of elements 11–40 and 11–41 are connected to two input circuits which are as follows: the (16A) output line of the Instruction Decoder FIG. 26 and the output of complementer 11–37 which is connected at its input to the output of gate 11–33. Gate 11–33 is connected at its inputs to the (8) signal line of the Control Encoder and the *t*0B– output of the Cycling Unit (FIG. 34). It will be appreciated that at time *t*0B gate 11–33 will pass a low level signal to the input of complementer 11–37 provided the (8) signal is present.

In response to this low level signal complementer 11–37 will produce after its inherent delay period a high level signal which will cause the Sign of *r*L Flip-Flop to produce L+ signals. Because of the inherent delay in elements 11–37, 11–40 and 11–41 the effect of the signal passing gate 11–33 at time *t*0B will not be realized at the output of the Sign of the *r*L Flip-Flop until time *t*1B. The (16A) signal is also a high level signal and when it occurs the Sign of the *r*L Flip-Flop will also be accordingly set to produce L+ signals. As indicated on the drawing the (8) signal is generated at the beginning of an "L" order and the (16A) signal is generated at the beginning of a "K" order so that when these aforementioned operations are set up by the Static Register, and Decoder and Encoder the Sign of the *r*L Flip-Flop will be set to produce L+ signals.

The Sign of *r*L Flip-Flop is also connected to two other input circuits via amplifier 11–38. The input of the last named amplifier is connected to the outputs of complementers 11–35 and 11–36 which are in turn connected respectively to the outputs of gates 11–31 and 11–32. Gate 11–31 is connected at its input to the (16) output line of the Control Encoder (FIG. 27) and the A– output of the Sign of *r*A Flip-Flop (FIG. 11B). Gate 11–32 is connected at its input to the *t*0B– output of the Cycling Unit (FIG. 34), the (8) output line of the Control Encoder (FIG. 27), and the $M_1$ output line of the Minuend Buffer (FIG. 20). When all the inputs to either gate 11–31 or 11–32 are at a low level the complementers associated therewith will produce after their inherent delay period a high level signal which is propagated through amplifier 11–38 and gate 11–34 to the input of complementer 11–39. In response thereto complementer 11–39 will produce after its inherent delay period a low level signal at the input of elements 11–40 and 11–41 causing the Sign of *r*L Flip-Flop to produce L– signals. Because the delay encountered in each of the amplifiers and complementers in the Sign of *r*L Flip-Flop it will be appreciated that a coincidence of low level signals applied to either gate 11–31 or 11–32 will not affect the output of the Sign of the *r*L Flip-Flop until two pulse periods has elapsed. Gate 11–32 can only transmit a signal at time *t*0B and therefore its effect on the Sign of *r*L Flip-Flop will not be observed until time *t*2B. Thus even though gates 11–32 and 11–33 may be alerted at the same time (*t*0B) and may both pass signal to the input of the Sign of *r*L Flip-Flop simultaneously their effects will be realized at two different times; namely at time *t*1B and at time *t*2B respectively.

Examining gate 11–32 it will be seen that this gate will respond to the information on the $M_1$ line of the Minuend Buffers at time *t*0B during the L order. The information on the M lines at time *t*0B will coincide with the sign digit of a word and therefore if there is a "1" bit on the M lines the Sign of the *r*L Flip-Flop will be set to its minus condition at time *t*2B. On the other hand if there is not a one bit on the $M_1$ lines of the Minuend Buffer at time *t*0B gate 11–33 will still transmit a signal causing the Sign of *r*L Flip-Flop to be set to its X+ condition at time *t*1B.

Gate 11–31 will transmit a signal when the A– output of the Sign of *r*A Flip-Flop is generated provided that the (16) signal from the Control Encoder (FIG. 27) is also present. It will be observed that the (16) signal which is generated by the Control Encoder during the K order (transfer *r*A to *r*L) combined with the A– signal will affect a low level signal at the common input of elements 11–40 and 11–14 via gate 11–31, complementer 11–35, and amplifier 11–38, gate 11–34 and complementer 1–39. Further it will be seen that the (16A) high level signal from the Decoder is also applied to the common input of elements 11–40 and 11–41 during a K order. In the interval that gate 11–31 is transmitting outputs and the (16A) signal is present there will be a low level signal and high level signal applied to the common input of elements 11–40 and 11–41. It will be appreciated that the level at the inputs of elements 11–40 and 11–41 will, therefore, be at a high level and that the Sign of *r*L Flip-Flop will produce L+ signals all during the interval that the (16A) signal is present, notwithstanding any other input to the Sign of *r*L Flip-Flop. As will be shown in the explanation of the K order the (16A) signal from the Decoder is removed at time *t*0A whereas the (16) signal from the Encoder is not removed until time *t*0B. Thus, if the A– signal is present then the output of gate 11–31 produced when the (16A) signal is removed will cause the Sign or *r*L Flip-Flop to produce L– signals.

MEMORY BAND AND HEAD SELECTION CIRCUITS—FIGURES 28A and 28B

Referring now to FIGURES 28A and 28B there are shown the Memory Band and Head Selection circuits which comprise a group of ten flip-flops, connected at their inputs to the output of a decoding function table. Flip-Flops designated $MS_{10}$, $M_{20}$, SM–FM, $HS_1$ and $HS_2$ are substantially identical and accordingly only one of these Flip-Flops, namely $MS_{10}$ will be described.

Flip-Flop $MS_{10}$ comprises an amplifier 28–44 and a complementer 28–44A connected together at their inputs, wherein the output of complementer 28–44A is connected to the input of recirculation gate 28–31 which in turn is connected at its output to the input of recirculation complementer 28–31A. The output of complementer 28–31A drives the common inputs of elements 28–44 and 28–44A so that there is a feedback loop from the output complementer 28–44A back to its input. A high level signal applied to the common input of the aforementioned elements 28–44 and 28–44A causes amplifiers 28–44 to produce a high level signal at its output marked $\overline{ms}_{10}$ and causes complementer 28–44A to produce a low level signal at its output marked $ms_{10}$ so that Flip-Flop $MS_{10}$ is by convention in its $ms_{10}$ state and is producing $ms_{10}$ low level signals at the output of complementer 28–44A. Low level outputs from complementer 28–44A will be fed through recirculation gate 28–31 to the input of recirculation complementer 28–31A causing the latter complementer to produce a high level signal at the common input of amplifier 28–44 and complementer 28–44A. The recirculation of the output signal from complementer 28–44A back to its input via elements 28–31 and 28–31A will cause Flip-Flop $MS_{10}$ to remain in its $ms_{10}$ state. It will be observed that the recirculation gate 28–31 has an input from the clear line 28–30. If the clear line is maintained at a low level it will be appreciated that low level output pulses from complementer 28–44A will pass through recirculation gate 28–31 causing complementer 28–31A to continue to produce high level signals at the input of elements 28–44 and 28–44A and thereby maintain Flip-Flop $MS_{10}$ in its $ms_{10}$ state. When on the other hand the potential on the clear line 28–30 is raised it will be appreciated that low level output signals from complementer 28–44A will not pass through recirculation gate 28–31 and that a high level signal from the clear line will be presented to complementer 28–31A which in turn will produce a low level output signal at the common input of elements 28–44 and 28–44A. A low level signal applied to the common input of these aforementioned two elements causes amplifier 28–44 to produce a low level signal at its output marked $\overline{ms}_{10}$ and causes complementer 28–44A to produce a high level signal at its output marked $ms_{10}$ so that Flip-Flop $MS_{10}$ is by convention in its $\overline{ms}_{10}$ state and is producing low level $\overline{ms}_{10}$ signals at the output of amplifier 28–44. High level outputs from complementer 28–44A will be fed through recirculation gate 28–31 (notwithstanding the potential on the clear line) to the input of complementer 28–31A causing the latter complementer to produce a low level signal at the common input of elements 28–44 and 28–44A. The continued recirculation of the high level signal from the output of complementer 28–44A to its input causes Flip-Flop $MS_{10}$ to remain in its $\overline{ms}_{10}$ state. Because of the inherent one-half pulse period delay encountered in the amplifiers and complementers comprising Flip-Folp $MS_{10}$ the effect of a high level signal on the clear line will not reset Flip-Flop $MS_{10}$ to its $\overline{ms}_{10}$ state until one pulse period has elapsed.

Flip-Flops designated $MS_{20}$, SM–FM, $HS_1$, $HS_2$ all operate in a similar manner, so that the application of a high level signal to the clear line 28–30, which is connected to these Flip-Flops via gates 28–32, 28–33, 28–39 and 28–40 respectively, will cause Flip-Flop $MS_{20}$ to produce $\overline{ms}_{20}$ signals; Flip-Flop SM–FM to produce *sm* signals; Flip-Flop $HS_1$ to produce $\overline{hs}_1$ signals; and Flip-Flops $HS_2$ to produce $\overline{hs}_2$ signals. Further the application of a high level signal to the common input of amplifier-complementer pair in Flip-Flops $MS_{20}$, SM–FM, $HS_1$ or $HS_2$ will cause respectively $ms_{20}$ signals, *fm* signals, $hs_1$ signals or $hs_2$ signals to be generated. The chart presented below shows the elements of Flip-Flop $MS_{10}$ and the corresponding similar elements of each of the other Flip-Flops $MS_{20}$, SM–FM, $HS_1$ and $HS_2$.

CHART AG

| Flip-Flop | $MS_{10}$ | $MS_{20}$ | SM-FM | $HS_1$ | $HS_2$ |
|---|---|---|---|---|---|
| Output Complementer | 28-44A | 28-45A | 28-46A | 28-52A | 28-54A |
| Output Amplifier | 28-44 | 28-45 | 28-46 | 28-52 | 28-54 |
| Recirculation Gate | 28-31 | 28-32 | 28-33 | 28-39 | 28-40 |
| Recirculation Complementer | 28-31A | 28-32A | 28-33A | 28-39A | 28-40A |

The remaining five Flip-Flops designated $MS_0$, $MS_2$, $MS_4$, $MS_6$ and $MS_8$ are again substantially identical and accordingly only one of these Flip-Flops, namely, $MS_0$ will be described in detail. However, before the detailed presentation is set-forth it should be pointed out that the remaining five Flip-Flops are similar to the first set of Flip-Flops already described. The only difference between the two sets of Flip-Flops rests in the fact that each Flip-Flop in the group comprising the $MS_0$ to $MS_8$ Flip-Flops has only one output whereas each Flip-Flop in the first set of Flip-Flops described has two outputs. Stated differently the Flip-Flop output to be described (Flip-Flop $MS_0$) does not have an amplifier corresponding to element 28–44 of the Flip-Flop $MS_{10}$.

Flip-Flop $MS_0$ comprises a complementer 28–47 which is connected at its output to the input of recirculation gate 28–34 wherein the output of the aforementioned gate is in turn connected at its output to the input of recirculation complementer 28–34A. The output of complementer 28–34A drives the input of element 28–47 so that there is a feedback loop from the output of complementer 28–47 back to its own input via elements 28–34 and 28–34A. A high level signal applied to the input of complementer 28–47 causes this complementer to produce after its inherent delay a low level signal at its outputs marked $ms_0$ so that the $MS_0$ Flip-Flop is by convention in its $ms_0$ state. Low level outputs from complementer 28–47 will be fed through recirculation gate 28–34 to the input of recirculation complementer 28–34A causing the latter complementer to produce a high level signal at the input of complementer 28–47 whereby Flip-Flop $MS_0$ is caused to remain in its $ms_0$ state. It will be observed that recirculation gate 28–34 has an input from the clear line 28–30. If the clear line is maintained at a low level, it will be appreciated that low level output pulses from complementer 28–47 will pass through recirculation gate 28–34 causing complementer 28–34A to continue to produce high level signals at the input of element 28–47 to thereby maintain Flip-Flop $MS_0$ in its $ms_0$ state. When on the other hand the potential on the clear line 28–30 is raised, it will be understood that low level output signals from complementer 28–47 will not pass through recirculation gate 28–34 and that a high level signal from the clear line will be presented to the complementer 28–34A which in turn will produce a low level signal at the input of element 28–47. A low level signal applied to the input of complementer 28–47 causes this latter complementer to produce a high level output signal indicating the removal of the $ms_0$ signal. This output of element 28–47 will be fed back to its own input causing the $MS_0$ Flip-Flop to assume a state wherein $ms_0$ signals are not being produced.

Flip-Flops designated $MS_2$, $MS_4$ $MS_6$ and $MS_8$ all operate in a manner similar to Flip-Flop $MS_0$, so that the application of a high level signal to the clear line 28–30 which is connected to these Flip-Flops via gates 28–35 to 28–38 respectively will cause Flip-Flops $MS_2$ to $MS_8$ to cease producing output signals. Further the application of a high level signal to complementers 28–48 through 28–51 of Flip-Flops $MS_2$ to $MS_8$ will cause the designated output signals to be generated by these Flip-Flops. The Chart AH presented below shows the elements of Flip-Flop $MS_0$ and the corresponding similar elements of each of the other elements $MS_2$ to $MS_8$.

CHART AH

| Flip-Flop | $MS_0$ | $MS_2$ | $MS_4$ | $MS_6$ | $MS_8$ |
|---|---|---|---|---|---|
| Output Complementer | 28-47 | 28-48 | 28-49 | 28-50 | 28-51 |
| Recirculation Gate | 28-34 | 28-35 | 28-36 | 28-37 | 28-38 |
| Recirculation Complementer | 28-34A | 28-35A | 28-36A | 28-37A | 28-38A |

The clear line 28–30 is connected to the output of amplifier 28–6 which in turn is connected at its input to the outputs of complementers 28–3 and 28–4. The inputs of complementers 28–3 and 28–4 are connected to the outputs of gates 28–1 and 28–2 respectively wherein gate 28–2 is connected at its inputs to the *t*5B– output of the Cycling Unit (FIGURE 34) the $\overline{TS}$ output of the TS Flip-Flop (FIGURE 12), and the (1) output line of the Control Encoder (FIGURE 27); and gate 28–1 is connected at its input to the *t*6B– output of the Cycling Unit and the output of amplifier 28–55 which in turn is connected at its input to the (1A) output of the Instruction Decoder (FIGURE 26). If the (1A) high level signal is not present, gate 28–1 will pass a low level signal at time *t*6B of every minor cycle which will cause complementer 28–3 to produce a high level signal at time *t*7A of each minor cycle. This high level signal will be propagated through amplifier 28–6 to the clear line whereby the output of complementors $MS_0$ to $MS_8$ will be removed, Flip-Flops $MS_{10}$, $MS_{20}$, $HS_1$ and $HS_2$ will be cleared to their barred output state and the SM–FM Flip-Flop will be conditioned so as to produce *sm* signals. It will be appreciated that the outputs of the aforelisted complementers will not be affected until time *t*8B in response to the signal passed through gate 28–1. Further it will be understood that if the (1A) high level signal is present amplifier 28–55 will maintain one input of gate 28–1 at a high level so that by tracing through the circuit comprising complementer 28–3 and amplifier 28–6 it will be seen that the clear line 28–30 will be maintained at a low level when the (1A) signal is present at the input of complementer 28–55. However, when all the inputs to gate 28–2 are at a low level (a condition which can only occur at time *t*5B) complementer 28–4 will produce, after its inherent delay period, a high level signal which will be propagated through amplifier 28–6 to the clear line 28–30 whereby all the Flip-Flops of the Memory Band and Head Selection will be cleared.

The decoding function table which controls the outputs of the ten Flip-Flops shown in FIGURES 28A and 28B comprises 23 gates 28–7 to 28–29 inclusive shown in the figures as a series of vertical lines the input signals for which are represented as a series of horizontal lines appropriately labelled to indicate the source of input signal. Gates 28–7 to 28–20 shall hereinafter be referred to as the Band Selection (BS) gates; gate 28–21 shall hereinafter be referred to as the $HS_1$ gates; and gates 28–22 to 28–29 shall hereinafter be referred to as the $HS_2$ gates.

The outputs of Band Selection (BS) gates 28–7 and 28–8 are connected to the inputs of complementers 28–7A and 28–8A respectively, which are in turn both connected at their outputs to the common inputs of elements 28–44 and 28–44A. In like manner Band Selection gates 28–9 through 28–12 drive the inputs of complementers 28–9A to 28–12A respectively, wherein the outputs of complementers 28–9A and 28–10A are connected to the inputs of elements 28–45 and 28–45A and the outputs of complementers 28–12A and 28–11A are connected to the inputs of elements 28–46 and 28–46A. When all the inputs to any of these gates are at a low level the complementer associated therewith will produce after its inherent delay period a high level signal which will be applied to the common inputs of one of the amplifier-complementer pairs in Flip-Flops $MS_{10}$, $MS_{20}$, or SM–FM. For example, if all the inputs to gate 28–10 are at a low level at a given time then complementer 28–10A will produce after its inherent delay period a high level signal which will be applied to the common inputs of elements 28–45A and 28–45 whereby as previously explained the $ms_{20}$ signals will be produced.

One input of each of the Band Selection gates 28–7 through 28–12 is connected to the $S_{t3B-}$ output of the Cycling Unit. It will be recalled that the $S_{t3B}$ signal of the Cycling Unit is a low level signal occurring at time *t*3B, and that this signal is the only gated output of the Cycling Unit. In particular it will be recalled that the $S_{t3B-}$ signal is generated during the minor cycles that the (1) output signal from the Control Encoder is present at the input of gate 34–35A (see FIGURE 34). In addition gates 28–7, 28–9 and 28–11 are connected to the CT output of the CT Flip-Flop (FIGURE 12) and gates 28–8, 28–10, and 28–12 are connected at their inputs to the $\overline{CT}$ output of the CT Flip-Flop. Further gates 28–7 through 28–12 are connected respectively to the $C_{13}$, $C_{14}$, $C_{23}$, $C_{24}$, $C_{33}$ and $C_{34}$ outputs of the C Register (FIGURE 13).

As previously described in connection with the C Register the last digit (P4) of the C portion of the instruction word will arrive at terminals $C_{14}$, $C_{24}$, and $C_{34}$ at time *t*3B and the last digit (P8) of the M portion of the instruction word will also arrive at terminals $C_{13}$, $C_{23}$ and $C_{33}$ at time *t*3B. It is therefore apparent that CT signals (CT or $\overline{CT}$) present from the CT Flip-Flop select the digit (P4 or P8) of the C or M portion of the instruction word which will be applied via gates 28–7, 28–9 and 28–11 or gates 28–8, 28–10 and 28–12 to Flip-Flops $MS_{10}$, $MS_{20}$ and SM–FM.

The output of Band Selection gates 28–13 through 28–20 are connected to the inputs of complementers 28–13A through 28–20A respectively wherein the output of complementer 28–13A drives the input of complementer 28–47 of Flip-Flop $MS_0$; the output of complementer 28–14A drives the input of complementer 28–48 of Flip-Flop $MS_2$; the outputs of complementers 28–15A and 28–16A drive the input of complementer 28–49 of Flip-Flop $MS_4$; the output of complementers 28–17A and 28–18A drive the input of complementer 28–50 of Flip-Flop $MS_6$; and the output of complementers 28–19A and 28–20A drive the input of complementer 28–51 of Flip-Flop $MS_8$. When all the inputs to any of these gates 28–13 to 28–20 are at a low level the complementer associated therewith will produce after its inherent delay period a high level signal, which will be applied to the input of one of the complementers 28–47 to 28–51. For example, if all the inputs to gate 28–14 are at a low level at a given time then complementer 28–14A will produce, after its inherent delay period, a high level signal which will be applied to the input of complementer 28–48 whereby as previously explained $ms_2$ signals will be produced.

Band Selection gates 28–12 through 28–20 are connected to the $S_{t3B-}$ output of the Cycling Unit (FIGURE 34). The $S_{t3B-}$ signal occurs as previously explained at time *t*3B provided a (1) signal is applied to gate 34–35A of the Cycling Unit. In addition, Band Selection gates 28–13 through 28–20 are connected to the designated outputs of the Subtrahend Buffers (FIGURE 19) as shown by the connections of the decoding function table on FIGURE 28A and FIGURE 28B. As will be shown in the explanation of Address Selection the P3 digit of the C portion of the instruction word or the P7 of the M portion of the instruction word will be on the output of Subtrahend Buffers (FIGURE 19) when the $S_{t3B-}$ signal is generated by the Cycling Unit.

The output of Head Selection one ($HS_1$) gate 28–21 is connected to the input of complementer 28–21A which in turn drives the common input of elements 28–52A and 28–52 of Flip-Flop $HS_1$ via buffer 28–41 and is connected to the input of complementer 28–53 via buffer 28–42. Gate 28–21 is connected at its input to $S_{t3B-}$ output of the Cycling Unit and to the $\overline{A}'$ output of the Comparator. When both inputs to gate 28–21 are at a low level (a condition which can only occur at time *t*3B) complementer 28–21A will produce after its inherent delay a high level signal which will be applied via buffers 28–41 and 28–42 to the inputs of elements 28–52A, 28–52 and 28–53. A high level signal applied to the complementer-amplifier pair of FlipFlop $HS_1$ will as previously described cause $hs_1$ signals to be produced. Further the high level output of complementer 28–21A will cause complementer 28–53 to produce a low level RTS signal which lasts for one-half pulse period and is applied to the Time Selection Flip-Flop (FIGURE 12) via gate 12–12.

The outputs of the Head Selection 2 ($HS_2$) gates 28–22 to 28–29 are connected to the inputs of complementer 28–22A to 28–29A respectively which are in turn all connected via buffer 28–43 to the common input of elements 28–54 and 28–54A of Flip-Flop $HS_2$. In addition, the outputs of complementers 28–22A through 28–29A are connected via buffer 28–42 to the input of complementer 28–53.

Gates 28–22 through 28–29 are all connected at their inputs to the $S_{t3B-}$ output of the Cycling Unit and to the designated outputs of the Subtrahend and Minuend Buffers (FIGURES 19 and 20). In addition, gates 28–22 to 28–25 are connected at their inputs to the A output of the Comparator (FIGURE 17) and gates 28–26 to 28–29 are connected at their inputs to the $\overline{A}$ output of the Comparator. A coincidence of low level signals applied to all the inputs of one of the gates 28–22 through 28–29 will cause one of the complementers 28–22A through 28–29A to produce, after its inherent delay period, a high level signal which is applied via buffer 28–43 to the common inputs of elements 28–54 and 28–54A and via buffer 28–42 to the input of complementer 28–53, to thereby cause an $hs_2$ signal to be produced by Flip-Flop $HS_2$ and an RTS signal to be produced by complementer 28–53.

The $HS_1$ gate 28–21 and the $HS_2$ gates 28–22 through 28–29 are used, as will be explained, in the section on Address Selection to select one of four Read-Write heads (00, 01, 10 and 11) which are associated with a fast Memory (FM) Band on the rotating Drum Memory (FIGURE 35). Further as will be shown the RTS signal indicates a condition wherein a Read-Write head other than a zero-zero (00) head is selected.

By way of summation it should be noted that: (1) all the gates 28–7 through 28–29 are alerted at time *t*3B– by an $S_{t3B-}$ signal from the Cycling Unit (FIGURE 34); and (2) because of the inherent delays in the amplifiers and complementers shown on (FIGURE 28) the effect of a coincidence of low level signals at the inputs of any of the gates 28–7 through 28–29 will not be realized at the output of complementer 28–53 or of any of the Flip-Flops ($MS_{10}$, $MS_{20}$ etc.) until time *t*4B.

HEAD SWITCHES

Referring now to FIGURES 29A and 29B there are shown 20 memory switches 29–41 through 29–60 connected at their inputs to the output of a decoding function table comprising gates 29–1 through 29–40. Each memory switch controls two Read-Write head assemblies (see FIGURE 30) wherein one head assembly is associated with a slow Memory (SM) Band and the other head assembly is associated with a fast Memory (FM) Band. For example, memory switch 29–41 controls, via line 29–61, the zero-zero (00) head assembly (FIGURE 30) associated with the first Slow Memory (SM) Band on the rotating Drum 35–10 (FIGURE 35) and controls the zero-zero (00) head assembly associated with the first Fast Memory (FM) Band, that is, the 21st information band, on Drum 35–10. Memory switch 29–42 controls via line 29–62 the zero-zero (00) head assembly associated with the second Slow Memory (SM) Band and controls the one-one (11) head assembly associated with the first Fast Memory (FM) Band. It will be understood that memory switches 29–41 through 29–60 respectively control the zero-zero (00) heads on the first 20 information bands on Drum 35–10 (that is bands 35–13A through 35–13T) and that switches 29–41 through 29–44 respectively control the 00, 11, 10, and 01 head assemblies associated with information band 35–13U. Further switches 29–45 through 29–48, 29–49 through 29–52, 29–53 through 29–56, and 29–57 through 29–60 control respectively the four heads surrounding each of the remaining Fast Memory (FM) Bands (35–13V through 35–13Y).

All the memory switches shown on FIGURE 29 are identical and, therefore, only memory switch 29–41 will be described in detail. Memory switch 29–41 comprises a pair of "B" phase complementers 29–41A and 29–41B connected together at their inputs wherein the output of complementer 29–41B is connected to the input of an "A" phase amplifier 29–41C. The outputs of "B" phase complementer 29–41A and "A" phase amplifier 29–41C are joined together at switch output line 29–61.

It will be recalled from the description on magnetic amplifiers that the input to a "B" phase complementer is derived from the output of "A" phase amplifier or complementer. Thus, the input to a "B" phase amplifier is coincident with a positive portion of an "A" phase power pulse. A high level signal applied at the common input of "B" phase complementers 29–41A and 29–41B causes complementers 29–41A and 29–41B to produce, after a half pulse period delay, a low level output on line 29–61 coincident with the "B" phase power pulse applied thereto, and causes amplifier 29–41C to produce after a half pulse period delay a low level output at the output of "A" phase amplifier 29–41C. Thus, a high level signal applied at the input of "B" phase elements 29–41A and 29–41B causes low level output signals to be produced on line 29–61 which occur coincident with the positive portion of the "A" and "B" phase power pulses. It will be appreciated, therefore, that a series of high level signals applied to the common input of elements 29–41A and 29–41B will cause a substantially low level D.C. voltage to be generated on switch output line 29–61. If, as shall later be shown, a series of high level signals is applied to the input of switch 29–41 at time *t*5A for one minor cycle then a substantially low level D.C. signal will appear on output line 29–61 at time *t*6A lasting one minor cycle. If on the other hand a series of low level signals are applied to the common input of complementers 28–41A and 28–41B it will be readily understood that a substantially-high level D.C. signal will appear on output line 28–61.

Such low level signals will be applied to the aforementioned common input when any of the potentials to gates 29–1 and 29–2 are at a high level. The high level outputs of gates 29–1 and 29–2 will cause complementers 29–1A and 29–2A to produce low level signals at the input of elements 29–41A and 29–41B.

Memory switches 29–41 to 29–60 are connected at their inputs to the outputs of 40 complementers 29–1A through 29–40A which are grouped in pairs; for example, switch 29–41 is connected at its input to the output of complementers 29–1A and 29–2A; switch 29–42 is connected at its input to the outputs of complementers 29–3A and 29–4A etc. The inputs of complementers 29–1A through 29–40A are in turn respectively connected to the output of gates 29–1 through 29–40, which form a decoding function table. The decoding function table is essentially an enlarged version of the gating array shown in FIGURE 7. Accordingly, the function table, comprising gates 29–1 to 29–40, accepts signals on a plurality of input lines (which are shown as horizontal lines) and generate a low level signal on one selected output line which are shown as vertical lines. Each horizontal line is labelled to indicate the source of the signals on the line and the dot at the intersection of the horizontal and vertical line as shown by the legend on FIGURE 26 or FIGURE 27, represents an unilateral conducting element connected to the crossing input and output lines in the manner shown in the legend. The unilateral conducting elements on any one output line act in concert to form a gate or logical "and" circuit for low level signals as previously explained in connection with (FIGURE 7). Thus, it will be appreciated that one of the complementers 29–1A through 29–40A will produce a high level output signal, one-half pulse period after, the gate associated therewith receives a coincidence of low level signals.

It will be observed that all the input lines of the decoding function table comprising gates 29–1 to 29–40 are connected to the designated outputs of the Flip-Flops shown on FIGURE 28, and it will be recalled that these Flip-Flops do not produce outputs in response to signals at their inputs until time *t*4B. Therefore, the input of one of the memory switches 29–41 through 29–60 will not receive a high level pulse until time *t*5A or one-half pulse period after one of the gates 29–1 through 29–40 is selected. Thus, a series of low level signals produced by one of the gates 29–1 to 29–40 in response to the outputs of the Flip-Flops shown in FIGURE 28 will cause one selected memory switch (29–41 through 29–60) to produce a substantially low level D.C. signal at time *t*5B lasting one minor cycle.

READ-WRITE HEADS

Referring now to FIGURE 30 there is shown a block representation of 40 Read-Write head assemblies associated with the rotating Drum Memory 35–10 (FIGURE 35), wherein each Read-Write assembly comprises four individual Read-Write heads in a column. Heads 30–81 through 30–84 comprise the head assembly associated with the first SM information band (35–13A) on the Drum 35–10 wherein head 30–81 is employed for reading or writing a bit having a value of $2^0$; head 30–82 is employed for reading or writing a bit having a value equal to $2^1$; head 30–83 is employed for reading or writing a bit having a value of $2^2$; and head 30–84 is employed for reading or writing a bit having a value of $5^1$. In like manner heads 30–85 through 30–160 are grouped in 19 columns of four heads wherein each column of heads forms one head assembly and is associated with one of the remaining 19 Slow Memory information bands 35–13B to 35–13T (FIGURE 35). It will be understood that 20 head assemblies are enclosed by the bracket SM and that these head assemblies are disposed in one common longitudinal plane adjacent to Drum 35–10 (FIGURE 35).

All the Read-Write heads in the group 30–81 through 30–160 are identical and accordingly only one head 30–81 will be described in detail. Head 30–81 comprises a soft magnetic core member (now shown) having a center tapped coil of wire 81A wrapped about it. One end of winding 31–81A is connected to the cathode of head diode 31–81C, the anode of which is in turn connected to line $WD_{11}$. The other end of the same winding is connected to the cathode of diode head 31–81B, the anode of which is connected to line $WD_{10}$. As will be seen lines $WD_{10}$ and $WD_{11}$ emanate from the junction of reading circuit 31–28A and writing circuit 31–19A shown on FIGURE 31. When a "0" bit is written on the track of the Rotating Drum associated with head 30–81 current will flow from line $WD_{11}$ through coil 30–81A to the center tap point 30–P of winding 30–81A. In order that current will flow in this direction it will be appreciated that line $WD_{11}$ is driven more positive than point 30–P. When a "1" bit is written on the same track, current will flow from line $WD_{10}$ toward the center tap point 30–P and it will again be appreciated when a "1" bit is written line $WD_{10}$ is driven more positive than point 30–P of winding 30–81A. Thus, the surface of the Drum will be magnetized in a first direction when a "1" bit is stored thereon and will be magnetized in a second direction when a "0" bit is stored thereon. When head 30–81 is employed to detect information on the Drum it will be understood that the leading edge of a magnetic spot indicative of a "1" bit will drive the cathodes of head diodes 30–38B and 31–81C more negative and positive respectively than point 30–P of winding 30–81A.

It will be observed that all the Read-Write heads which are in the same row as element 30–81 are connected to lines $WD_{11}$ and $WD_{10}$. In other words all the heads associated with the 1st track of each band are connected together. Further it will be observed that all the heads in the same row as elements 30–82, 30–83, and 30–84, are connected in a similar manner to lines $WD_{21}$ and $WD_{20}$, $WD_{31}$ and $WD_{30}$, and $WD_{41}$ and $WD_{40}$ respectively. In other words all the heads associated with the second, third and fourth track of each band are also connected together. Reference to FIGURE 31 will show that lines $WD_{21}$ and $WD_{20}$, $WD_{31}$ and $WD_{30}$, $WD_{41}$ and $WD_{40}$ emanate respectively, at the junction of reading circuit 31–28B and writing circuit 31–19B; reading circuit 31–28C and writing circuit 31–19C and reading circuit 31–28D and writing circiut 31–19D. It will also be observed that every switch output line 29–61 to 29–80 (FIGURE 29) is connected to the center tap points 30P of four heads of one head assembly in the group enclosed by the bracket SM. The output lines of the memory switches of FIGURE 29 are also shown on FIGURE 30 and will be noted as lines 30–61 through 30–81 in connection with the latter figure.

Referring now to the group of heads 30–1 through 30–80 enclosed by the bracket FM it will again be observed that they are arranged in 20 columns of four heads wherein each column comprises one head assembly. The 20 head assemblies bracketed by FM are associated with the Fast Memory Bands of Drum 35–10 and are similar in construction to the 20 head assemblies previously discussed which were enclosed by the bracket SM. The head assemblies comprising heads 30–1 through 30–12 and 30–13 through 30–16 (not shown) are associated with the first Fast Memory (FM) Band, that is the twenty-first band, wherein the head assembly comprising heads 30–1 through 30–4, is the zero-zero (00) head assembly, and the head assemblies comprising heads 30–5 through 30–8, 30–9 through 30–12, and 30–13 through 30–16 (not shown) are the 11, 01, and 10 head assemblies respectively associated with the last named information band. The head assemblies comprising heads 30–64 through 30–68 (not shown), 30–69 through 30–72, 30–73 through 30–76, and 30–77 through 30–80 are the 00, 11, 01 and 10 heads associated with the last FM band; that is band 35–13Y on Drum 35–10. In a similar manner the head assemblies comprising heads 30–17 through 30–63 constitute the 00, 11, 10 and 01 head assemblies for Fast Memory Bands 35–13V through 35–13X.

All the individual Read-Write heads 30–1 through 30–80 are identical to head 30–81 and will not be described again. It should be noted, however, that the Read-Write heads in the same row with elements 30–1, 30–2, 30–3, and 30–4 respectively are connected between lines $WF_{11}$ and $WF_{10}$, $WF_{21}$ and $WF_{20}$, $WF_{31}$ and $WF_{30}$, and $WF_{41}$ and $WF_{40}$. Lines $WF_{11}$ and $WF_{10}$, $WF_{21}$ and $WF_{20}$, $WF_{31}$ and $WF_{30}$, and $WF_{41}$ and $WF_{40}$ are connected respectively to the junction of reading circuit 31–30A and writing circuit 31–20A, reading circuit 31–30B and writing circuit 31–20B, of reading circuit 31–30C and writing circuit 31–20C and reading circuit 31–30D and writing circuit 31–20D. As in the case of the Read-Write heads enclosed by the bracket SM it will be observed that every switch output line 29–61 through 29–80 is again connected to the center tap of four heads of one head assembly enclosed by the bracket FM. Thus, it can be seen that the output of each memory switch controls two head assemblies, wherein one head assembly is associated with a Slow Memory Band (SM) and the other head assembly is associated with a Fast Memory Band (FM).

READ-WRITE CIRCUITS—FIGS. 31A AND 31B

Referring now to FIG. 31A and FIG. 31B there are shown the Read-Write Circuits for information bands 35–13A to 35–13Y of the Drum 35–10 (FIG. 35), wherein the Read-Write Circuits shown on FIG. 31A are associated with the 20 SM information bands (35–13A to 35–13T) and the Read-Write Circuits shown on FIG. 31B are associated with 5 FM information bands (35–13U to 35–13Y).

Referring in particular to FIG. 31A there are shown the four identical SM Reading Circuits 31–28A to 31–28D and four identical SM Writing Circuits 31–19A to 31–19D. SM Reading and SM Writing Circuits 31–19A and 31–28A, 31–19B and 31–28B, 31–19C and 31–28C, and 31–19D and 31–28D are connected via lines WD11 and WD10, WD21 and WD20, WD31 and WD30, and WD41 and WD40, to all the Read-Write Heads (FIG. 30) in a row with elements 30–81, 30–82, 30–83, and 30–84 respectively. Each head in the same row as element 30–81 is associated with a track marked A (FIG. 35) in one of the SM information bands 35–13A through 35–13T and each head in a row with elements 30–82 to 30–84 is associated with a selected one of the tracks marked from B to D respectively of an SM information band.

Since all the Writing Circuits 31–19A through 31–19D are identical only one such circuit, namely 31–19A, will be described in detail. It will be shown that Writing Circuit 31–19A may cause any one selected head in line with element 30–81 (FIG. 30) to produce magnetic spots, having a first or second magnetic polarity, on track A of a selected SM information band. From the description of Writing Circuit 31–19A it will be also appreciated that Writing Circuits 31–19B through 31–19D may cause selected Read-Write heads in line with elements 30–82 through 30–84, respectively, to produce magnetic spots on tracks B to D of a selected SM information band.

SM Writing Circuit 31–19A comprises a complementer 31–17 and an amplifier 31–18 connected at their outputs to the anodes of diodes 31–37 and 31–38 respectively.

The cathode of diode 31–37 is connected via line WD11 to the anode of diode 30–81C in head 30–81 (FIG. 30) and the anodes of similar diodes in heads 30–85, 30–89, . . . 30–149, 30–153, and 30–157. The cathode of diode 31–38 is connected via line WD10 to the anode of diode 30–81B in head 30–81 and the anodes of similar diodes in heads 30–85, 30–89, . . . 31–149, 31–153 and 31–157 (FIG. 30). Complementer 31–17 of Writing Circuit 31–19A is connected at its input to the output of buffer 31–15 which in turn is controlled by two input circuits, and complementer 31–18 is connected at its input to one of the aforementioned input circuits. Thus each of the Writing Circuits 31–19A to 31–19D is driven by a pair of input circuits, which are now to be described.

The first of these input circuits comprises an amplifier 31–10 connected at its output to the input of buffer 31–15 of writing 31–19A and to the inputs of similar buffers in Writing Circuits 31–19B to 31–19D. Amplifier 31–10 is connected at its input to the output of gate 31–25 which in turn is connected at its inputs to the output of the Write Flip-Flop 31–29 and to the *sm* output of flip-flop SM–FM (FIG. 28). Flip-Flop 31–29 which shall not be described in detail, comprises complementers 31–3, 31–5, and gate 31–4 connected in a closed ring and complementer 31–2 connected to the input of complementer 31–5. Reference is made to U.S. Patent No. 2,709,798 issued to W. F. Steagall on May 31, 1955, which describes in detail a bistable device similar to that illustrated at 31–29 on FIGURE 31. With regard to the operation of Write Flip-Flop 31–29 it will be understood that a low level signal at the input of complementer 31–2 will cause a sustained series of low level signals to be generated at the output of complementer 31–5 and that a high level *t*7B+ signal from the Cycling Unit applied at the input of complementer 31–3 via recirculation gate 31–4 will cause a sustained series of high level signals to be generated at the output of complementer 31–5 beginning at time *t*8B+. The input of complementer 31–2 in flip-flop 31–29 is connected to the output of gate 31–1 which in turn is connected at its input to the (21) signal line of the Control Encoder (FIG. 27) and the *t*7B– output of the Cycling Unit (FIG. 34). Therefore, a coincidence of signals at the input of gate 31–1 (a condition which can only occur at time *t*7B) will cause flip-flop 31–29 to produce, after the inherent delays of complementer 31–2 and 31–5, a sustained series of low level signals at the output of element 31–5 beginning at time *t*8B. It will be observed that gate 31–1 and gate 31–4 may transmit a low level signal and a high level signal, respectively, at the same time to the Write Flip-Flop 31–29. However, it will be appreciated that when this condition exists the Write Flip-Flop 31–29 will be set to produce low level output signals at time *t*8B at the output of complementer 31–5.

The output of complementer 31–5 also drives one input of gates 31–11A through 31–11D wherein said gates comprises a part of the second input circuits to elements 31–19A through 31–19D respectively. The outputs of gates 31–11A to 31–11D are respectively connected to the inputs of complementers 31–13A to 31–13D. Complementer 13–13A is connected at its output to one input of buffer 31–15 and to the input of amplifier 31–18; the outputs of complementers 31–13B to 31–13D are connected to the inputs of similar buffers and amplifiers in SM Writing Circuits 31–19B to 31–19D. Gates 31–11A to 31–11D are additionally connected at their inputs to the *sm* output of the SM–FM Flip-Flop (FIG. 28) and the output of elements 31–7A to 31–7D respectively. Elements 31–7A to 31–7D as indicated by FIG. 31B may each comprise a pair of serially connected amplifiers or complementers and it will be appreciated that each of the aforementioned elements has an inherent delay of one pulse period. The inputs of elements 31–7A through 31–7D are connected respectively to the $M_1$, $M_2$, $M_3$ and $M_4$ outputs of the Minuend Buffer shown on FIG. 20. Thus, it will be observed that Writing Circuits 31–19A to 31–19D selectively receive the "1" bits from Min Buffers 1 to 4 via elements 31–7A through 31–7D, gates 31–11A through 31–11D and complementers 31–13A through 31–13D, respectively.

Before describing the affects of the information on the $M_1$ to $M_4$ lines on the SM Writing Circuits 31–19A through 31–19D, it will be advantageous to examine the construction of SM Read Circuits 31–28A to 31–28D. Since SM Read Circuits 31–28A to 31–28D are identical only one such Read Circuit, namely 31–28A, will be described in detail.

SM Read Circuit 31–28A comprises a pair of diodes 31–35 and 31–36, wherein the anodes of said diodes are connected to the opposite ends of center-tapped primary winding 31–21 of a read out transformer 31–23, and wherein the center tap of winding 31–21 is connected through a current limiting impedance 58 to a source of positive potential 31–57. The cathodes of diodes 31–35 and 31–36 are respectively connected to lines WD10 and WD11. Secondary winding 31–22 of transformer 31–23 is connected to the input of reading and shaping amplifier 31–33. Amplifier 31–33 may comprise any conventional circuit which performs a clipping and wave shaping function; such circuits are well known in the art and may comprise vacuum tubes or semi-conductors. The output of amplifier 31–33 drives one input of *sm* output gate 31–55A which in turn is connected at its output to the input of element 31–31A. Element 31–31A may comprise a chain of three complementers or a chain of two amplifiers and one complementer, and thus the aforementioned element 31–31A has an inherent delay of one and one-half pulse periods. The output of element 31–31A is connected to the input of Min Buffer 1 on FIG. 20 so that the information read-out of the Rotating Drum Memory may be distributed to the various logical components of the computer.

In like manner, SM Reading Circuits 31–28B to 31–28D are connected at their inputs to lines WD21 and WD20, WD31 and WD30 and WD41 and WD40 respectively, and at their outputs to one input of *sm* output gates 31–55B to 31–55D respectively. Further gates 31–55B to 31–55D are connected via elements 31–31B to 31–31D to the inputs of Min Buffer 2 to 4 respectively.

SM output gates 31–55A to 31–55D are additionally alerted by a gated signal derived from the *sm-fm* Flip-Flop (FIG. 28) and the Read Flip-Flop 31–56. It will be observed that gates 31–55A to 31–55D are connected to the output of buffer 31–53 (FIG. 31B) which in turn is connected at its input to the output of A phase amplifier 31–51, and the output of B phase amplifier 31–49. Amplifier 31–49 is also connected at its output to the input of amplifier 31–51 and is connected at its input to the output of amplifier 31–47. The input of amplifier 31–47 is connected to the output of gate 31–45 which is driven at its inputs by the *sm* output of flip-flop SM–FM (FIG. 28) and the output of the Read Flip-Flop 31–56.

Read Flip-Flop 31–56 will not be described in detail but it will be noted that it comprises complementers 31–43, 31–41, and recirculation gate 31–42 connected in a closed ring and complementer 31–40 connected to the input of complementer 31–41. Reference is made to U.S. Patent No. 2,709,798 issued to W. F. Steagall on May 31, 1955, which describes in detail a bistable device similar to that illustrated at 31–56 on FIG. 31. With regard to the operation of Read Flip-Flop 31–56 it will be understood that a low level signal at the input of complementer 31–40 will cause a sustained series of low level signals to be generated at the output of complementer 31–41 and a high level *t*8B+ signal from the Cycling Unit applied at the input of complementer 11–43 via recirculation gate 11–42 will cause a series of high level signals to be generated at the output of complementer 31–41 beginning at time *t*9B. The input of complementer 31–40 is connected to the output of gate 31–39 which in turn is connected at its inputs to the (1) signal line of the Control Encoder (FIG. 27), the TS output of the TSFF (FIG. 12), the $\overline{\text{OF}}$ output of the OF Flip-Flop (FIG. 22) and the *t*8B– output of the Cycling Unit (FIG. 34). A coincidence of low level signals at the input of gate 31–39 (a condition which may only occur at time *t*8B) will cause Read Flip-Flop 31–56 to produce at the output of element 31–41 a sustained series of low level signals beginning at time *t*9B.

It will be observed that gate 31–39 and gate 31–42 may transmit a low level signal and a high level signal, repectively, at the same time to the Read Flip-Flop 31–56. However, it will be appreciated that when this condition exists, Read Flip-Flop 31–56 will be set to produce low level output signals at time *t*9B.

In order to facilitate the explanation of the operation of the circuits on the FIGS. 31A and 31B the following description will be presented in four sections and titled, Standby, Write "0," Write "1," and Read. Potentials such as +3E volts, –2E volts, etc., are used in the following explanation to illustrate relative potentials only.

STANDBY

The term "Standby" is used to denote a condition wherein information is neither being transferred to or from the Rotating Drum. During standby it will be appreciated none of the memory switches 29–41 to 29–60 (FIG. 29) are selected; that is the output signals on lines 29–61 to 29–80 are all substantially high level D.C. voltages which may be for the purpose of this illustration at +3E volts. Since output lines 29–61 to 29–80 are connected to the center tap points of heads 30–1 to 30–160 it will be apparent that in the standby condition the aforementioned points are maintained at +3E volts. Further the cathodes of the diodes e.g. 30–81B and 30–81C in heads 30–1 to 30–160 will be held substantially at +3E volts.

Refer back to FIGURE 31A, in particular to Write Flip-Flop 31–29 which will be producing a sustained series of high level signals at the output of complementer 31–5 in response to a $t_7b+$ signal applied from the Cycling Unit (FIG. 34) to recirculation gate 31–4. The high level output signals from Write Flip-Flop 31–29 are applied to the inputs of gates 31–11A through 31–11D, whereby the aforementioned gates will transmit a high level signal to the inputs of complementer 31–13A to 31–13D respectively, notwithstanding the level of the signal applied to any other input of these gates. In response to a high level signal complementer 31–13A produces after its inherent delay, a low level signal which is applied to one input of buffer 31–15 and to the input of complementer 31–18. Complementers 31–13B to 31–13D will react in a similar manner as complementer 31–13A but the effect of their output signals on elements 31–19B to 31–19D will not be described in detail. However, it will be borne in mind that the description of SM Writing Circuit 31–19A applies equally well to elements 31–19B to 31–19D. In response to a low level signal at its input amplifier 31–18 will produce after its inherent delay a low level signal of say –2E volts which is applied to the anode of diode 31–38.

It will be observed that a high level signal from Write Flip-Flop 31–29 also drives one input of gate 31–25, and accordingly, said gate will transmit high level signals to amplifier 31–10 nowithstanding the level of the input signal on the remaining input to gate 31–25. In response to a high level signal at its input, amplifier 31–10 produces, after a one-half pulse period delay, a high level signal which will be transmitted through buffer 31–15 to the input of complementer 31–17. Accordingly, complementer 31–17 will produce after its inherent delay period a low level output signal, of say –2E volts which is applied to the anode of diode 31–37. It will be recalled that source 31–57 which is connected to the anodes of diodes 31–35 and 31–36 through impedance 31–58 and winding 31–21 is maintained at a positive potential which may be +2E volts. Potentials which are present during the standby condition cause the anodes of diodes 31–35 through 31–38 and the anodes of all the head diodes (e.g. 30–81B and 30–81C) to be negative with respect to their cathodes. Therefore, all the aforementioned diodes appear as open circuits and current will not flow in any of the head windings in heads 30–1 through 30–160 (FIG. 30) or in winding 31–21 of read-out transformer 31–23.

The chart shown below lists the relative potentials on the anodes of diodes 31–35 to 31–38 and the cathodes of all the head diodes during the standby period. An examination of this chart and FIGURES 30 and 31 will show that during the standby period all the listed diodes react as open circuits.

| Standby: | Potential, volts |
|---|---|
| Anode of diode **31–37** | –2E |
| Anode of diode **31–38** | –2E |
| Anode of diode **31–35** | +2E |
| Anode of diode **31–36** | +2E |
| Cathodes of all head diodes (e.g. **81B** and **81C**) | +3E |

WRITE "0"

The term Write "0" is used to denote a condition wherein a particular head assembly (FIG. 30) is selected and current is caused to flow in the head windings thereof so as to produce a magnetic spot on the Drum having a first polarity indicative of a "0" bit. There are two requisites that must be met in order that a "0" bit may be written on a given band of the Drum 35–10 (FIG. 35). Firstly, a group of four heads comprising one head assembly (FIG. 30) must be selected while the remaining head assemblies are inhibited and secondly the Writing Circuits must cause current to flow in the head windings of the selected head assembly so as to produce a magnetic spot of a first polarity.

The selection of a given head assembly is determined by the structure on FIGURE 29 to which reference is again made. As previously explained if all the signals to one of the gates 29–1 to 29–40 are at a low level for one minor cycle beginning at time *t*4B then one of the memory switches 29–41 to 29–60 will be selected and produce a sustained low level output signal which may be –E volts on one of the lines 29–61 to 29–80 beginning at time *t*5B. For example, if gate 29–1 is selected at time *t*4B then switch 29–41 will produce a sustained low level signal on line 29–61 beginning at time *t*5B. The remaining switches 29–42 to 29–60 will be unselected and high level D.C. voltages which may be +3E volts will be presented on output lines 29–62 to 29–80.

Thus, the center taps of the windings in heads 30–81 to 30–84 of the SM heads and incidently heads 30–1 to 30–4 of the FM heads will be at a potential of –E volts while the center tap points of all the remaining heads on FIGURE 30 will be at +3 volts. Accordingly, the cathodes in heads 30–81 to 30–84 of the SM assemblies and heads 30–1 to 30–4 of the FM head assemblies will be maintained at –E volts and the cathodes of head diodes in the remaining heads 30–85 through 30–160 and 30–5 through 30–80 will be maintained at +3E volts.

Returning now to FIGURE 31 the Write Flip-Flops 31–29 will be set to produce a series of low level signals at time *t*8B by a coincidence of low level signals ((21) signal and *t*7B– signal) at the input of gate 31–1. These low level outputs will last for one minor cycle and the Write Flip-Flop 31–29 will thereafter produce high level outputs in response to *t*7B+ signals applied to recirculation gate 31–4. The low level output signals produced by the Write Flip-Flop 31–29 are applied to gates 31–11A to 31–11D and act as alerting signals thereto. Assuming now that the SM signal is present from flip-flop SM–

FM (FIG. 28), gates 31–11A to 31–11D will transmit the output of elements 31–7A through 31–7D which are connected to the outputs of Min Buffers 1 to 4 respectively.

Examining now only SM Writing Circuit 31–19A, assume for the moment that a "0" in the least significant bit (LSB) position of the sign digit (P0) of a word is to be written on the Rotating Memory Drum by the apparatus at 31–19A and by a selected read-write head 30–81 (FIG. 30). A "0" bit in the least significant bits position of the sign digit of a word, indicative of a plus sign of a quantity, will be manifested as a high level $M_1$ signal at the input to element 31–7A at time *t*8B (P0=*t*8B). The rationale for this timing will be later explained in connection with the H and X orders. In response to the aforementioned high level signal, element 31–7A will produce a high level output at time *t*9B (P0=*t*9B) which will be transmitted by gate 31–11A to the input of complementer 31–13A. The latter complementer will in turn produce a low level signal in response to the high level input at time *t*10A (P0=*t*10A) which will be applied to one input of buffer 31–15 and to the input of amplifier 31–18; causing amplifier 31–18 to produce a low level signal, which may be on the order of –2E volts, at the anode of diode 31–38 at time *t*10B (P0=*t*10B). As will be later shown in the explanation of the H and X orders (see FIG. 43), there is no information present on the M lines (FIG. 20) at time *t*7B and, therefore, the input to element 31–7A will be at a low level at this time. Consequently a high level signal will be applied to gate 31–11A at time *t*8B which will cause complementer 31–13 to produce a low level signal at the input of buffer 31–15 and to the input of amplifier 31–18 at time *t*9A. As previously noted in response to this low level signal, amplifier 31–18 produces a low level output signal of —2E volts which is applied to the anode of diode 31–38.

The low level outputs of Write Flip-Flop 31–29, which were produced beginning at time *t*8B in response to an output from gate 31–1, are also transmitted to the inputs of gates 31–25 and 31–26. The latter two gates 31–25 and 31–26 are additionally alerted by the SM and FM signals respectively from the SM–FM Flip-Flop (FIG. 28). Assuming that the SM signal is present, gate 31–25 will transmit a low level signal whereas gate 31–26 will not. Thus, the first low level output of flip-flop 31–29 appearing at time *t*8B is transmitted via gate 31–25 to the input of amplifier 31–10. In response thereto amplifier 31–10 will produce at time *t*9A a low level signal which is applied to one input of buffer 31–15 of Writing Circuit 31–19A. It will be recalled that complementer 31–13A will be also producing a low level signal at time *t*9A and that this low level signal is applied to buffer *31–15*. Thus, buffer 31–15 will transmit a low level signal to the input of complementer 31–17 which will in turn produce a high level signal, having a potential of +E volts, at the anode of diode 31–37 at time *t*9B. Thus, at time *t*9B the following conditions prevail as indicated by the chart presented below.

| Write "0": | Potential, volts |
|---|---|
| Anode of diode **31–37** | +E |
| Anode of diode **31–38** | –2E |
| Anode of diode **31–35** | (+2E–IZ) |
| Anode of diode **31–36** | (+2E–IZ) |
| Cathodes of head diodes (e.g. **31–81C**) connected to memory switch **29–41** | –E |
| Cathodes of head diodes connected to memory switches **29–42**, etc. | +3E |

An examination of the above chart and FIGURES 30 and 31 indicates that current will flow from the anode of diode 31–37 via line WD11 through head diode 30–81C (FIG. 30) to the center tap of winding 30–81C (FIG. 30) causing the upper half of the aforementioned winding to produce flux in a first direction in the core (not shown) associated with head 30–81. A small amount of current will also flow in the same direction through the upper half of winding 30–81C from source 31–57 through impedance 31–58, winding 31–21 and diode 31–35. Additionally a very small current will flow from source 31–57 through current limiting impedance 31–58, one-half of winding 31–23, diode 31–36, line WD10, and head diode 30–81B to the center tap point 30–P of winding 30–81A. The later current from source 31–57 will cause a small amount of flux to be produced in a second direction in the aforementioned core. However, the net flux produced, is a result of the current which is caused to flow from the anode of diode 31–37 to the center tap point of winding 31–81A. This net flux causes a spot to be magnetized on the Drum having a magnetic polarity indicative of a "0" bit. Thus it can be seen that a "0" bit is written on the Drum before the first digit (sign) of a word is written thereon.

In the system of writing described herein the Drum 35–10 is initially magnetized so that its entire surface is storing zeros. Thus in fact when a "0" bit is initially written on the Drum a change in magnetization does not take place. However when a "0" bit is written over a portion of the Drum storing a "1" bit a reversal of the magnetic polarity of the spot obtains.

Although the preceding description was illustrative of a "0" bit preceding an information word on an A track of a selected band (see FIG. 35), it will be appreciated that circuits 31–19B to 31–19D will cause a "0" bit to precede the writing of an information word on tracks B to D of a given band. The digit written on the Drum before the sign information corresponds to the space between words digit (SBW). Hence, it can be seen, in the writing operation, that the space between words digit (SBW) is deposited on the Drum before the rest of the information word.

As previously indicated, at time *t*8B the P0 digit (sign) of a word being transferred from a register to the memory is present at the inputs of elements 31–7A to 31–7D. If the P0 digit is indicative of a plus sign (i.e. the P0 digit contains a "0" bit) then the Writing Circuits will operate in a manner previously described and a "0" bit indicative of a plus sign will be written on the Drum 35–10 by the apparatus of FIG. 31 at time *t*10B. If the sign digit (P0) is written on the Drum at time *t*10B it will be appreciated that the remaining digits of a word will be written on the Drum at the "*t*" times indicated on FIG. 35B. For example, FIG. 35 indicates that the most significant digit (P10) of a word is written on the Drum at time *t*8B.

One minor cycle after gate 31–1 has passed a signal to the Write Flip-Flop 31–29, a *t*7B+ signal from the Cycling Unit (FIG. 34) will be transmitted through recirculation gate 31–4 so that the Write Flip-Flop will produce high level signals beginning at time *t*8B. These high level signals from the Write Flip-Flop 31–29 effect the Writing Circuits 31–19A through 31–19D in a manner already described in connection with standby; thus diodes 31–35 to 31–38 and Head Diodes 31–1 to 31–160 will be cut off. Since the output signals of the Write Flip-Flop are not directly connected to the anodes of diodes 31–37 and 31–38, but must pass through delay elements, e.g. complementer 31–13A, the standby condition (i.e. the end of writing operation) will not be achieved until time *t*9B. Thus it can be seen that the SM Writing Circuits 31–19A to 31–19D will be in operation for one minor cycle, from time *t*9B of *one* minor cycle to time *t*9B of the next minor cycle.

WRITE "1"

The term Write "1" is used to denote a condition wherein a particular head assembly (FIG. 30) is selected and current is caused to flow in the head windings thereof so as to produce a magnetic spot on the Drum having a polarity indicative of a "1" bit. There are two requisites that must be met in order that "1" bits may be written on a given band of the Drum 35–10 (FIG. 35). As in the case of Write "0" a group of four heads comprising one head assembly (FIG. 30) must be selected whereas the remaining head assemblies on FIG. 30 are inhibited. Secondly the Writing Circuits must cause current to flow in the head windings of the selected head assembly so as to produce a magnetic spot on the Drum (35–10) indicative of a "1" bit.

The selection of a given head assembly is determined by the structure on FIG. 29 to which a brief reference shall now be made. In a manner similar to that explained under the heading "Write 0" the center tap points of P the selected heads 30–1 to 30–4 and heads 30–81 to 30–84 (FIG. 30A) are maintained at a potential of —E volts whereas the center tap points in the remaining heads on FIGS. 30A and 30B are held at +3E volts. Consequently, the cathodes of the diodes in heads 30–1 to 30–4 and 30–81 to 30–84 are held at substantially —E volts while the cathodes of all the remaining head diodes are held at +3E volts.

Having already written the first "0" digit which precedes the sign information of a word, let us now assume that the sign of the word being transferred to the Rotating Drum Memory 35–10 via the Minuend Buffer (FIG. 20) is minus. A minus is represented by a "1" bit in the least significant bit position of the P0 position and thus a low level signal from Min Buffer 1 will be present at the input of element 31–7A at time *t*8B (P0=*t*8B). A low level signal at time *t*8B will cause element 31–7A to produce a low level signal which is applied to one input of gate 31–11 at time *t*9B. In writing the minus sign ("1" bit), it will be understood that the Write Flip-Flop 31–29 is again producing low level signals at its output, and that the *sm* signal from FM–SM (FIG. 28) is present. Therefore, gate 31–11A, which is also alerted by low level signals from the last two named flip-flops will receive at time *t*9B a coincidence of low level signals whereby gate 31–11A will be caused to transmit a low level signal to the input of complementer 31–13A. In response to this low level signal at its input, complementer 31–13A will produce a high level signal at time *t*10A which is applied to one input of buffer 31–15 and to the input of complementer 31–18. Buffer 31–15 will transmit this high level signal to the input of complementer 31–17 notwithstanding the level of the signal on the remaining input of this buffer. Hence, complementer 31–17 and amplifier 31–18 will respectively produce low and high level signals at time *t*10B, wherein said signals are in turn respectively applied to the anodes of diodes 31–37 and 31–38.

It will be recalled that the anodes of diodes 31–35 and 31–36 are connected via opposite ends of winding 31–21 and impedance 31–58 to a source of potential 57 which may be +2E volts. Thus, at time *t*10B if a minus sign is to be written on track A of a selected SM information band, the following conditions prevail as indicated by the chart presented below.

| Write "1": | Potential, volts |
|---|---|
| Anode of diode **31–37** | —2E |
| Anode of diode **31–38** | +E |
| Anode of diode **31–35** | (+2E-IZ) |
| Anode of diode **31–36** | (+2E-IZ) |
| Cathodes of head diodes connected to memory switch **29–41** | —E |
| Cathodes of head diodes connected to memory switches **29–42** to **29–60** | +3E |

An examination of the above chart and FIGURES 30 and 31 indicates that current will flow from the anode of diode 31–38 via line WD10 through Head Diode 30–81B to the center tap of winding 30–81C causing the lower half of the aforementioned winding to produce flux in second direction in the core (not shown) associated with head 30–81. A small amount of current will also flow through the lower half of winding 30–81 so as to produce flux in the second direction from source 57 through impedance 31–58, winding 31–21 and diode 31–36. Additionally, a very small current will flow from source 31–57 through current limiting impedance 31–58, winding 31–21, diode 31–35, line WD11 and Head Diode 30–81C to the center tap point P of winding 30–81A. The latter current from source 31–57 will cause a small amount of flux to be produced in the first direction in the aforementioned core. However, the net flux produced is a result of the current which is caused to flow from the anode of diode 31–38 to the center tap point of winding 31–81A. This net flux causes a spot to be magnetized on the Drum having a polarity indicative of a "1" bit.

READING

The term Reading is used to denote a condition wherein information comprising "1" and "0" bits is to be transferred from the Rotating Drum Memory 35–10 to the various registers and elements in the computer via the Minuend Buffer (FIG. 20).

In the reading operation, a group of four heads comprising one head assembly must be selected, while the remaining head assemblies must be inhibited or action taken to insure that the information detected by any one of the remaining head assemblies does not reach the Minuend Buffers. The selection of a given head assembly for reading is again determined by the structure on FIG. 29. The center tap points of the selected heads (FIG. 30) will be held at —E volts and the center tap points of the unselected heads will be held at +3E volts in the same manner as already described in connection with "Write 1 and Write 0." Assuming that the SM head assembly comprising heads 30–81 to 30–84 (FIG. 30) is to be selected, it will then be appreciated that the center point of these heads as well as FM heads 30–1 to 30–4 will be held at —E volts, while the center tap point of heads 30–5 to 30–80 and 30–85 to 30–160 will be held at +3E volts. Accordingly, the cathodes of the head diodes in heads 30–1 to 30–4 and heads 30–81 to 30–84 will be held at substantially —E volts while the cathodes of the remaining head diodes are held at +3E volts.

Before the read operation may commence the Write Flip-Flop 31–29 must be set to produce high level signals at the output of complementer 31–5. The aforementioned flip-flop 31–29 will be set to this condition, as previously explained, by *t*7B+ signal applied to recirculation gate 31–4 from the Cycling Unit (FIG. 34). High level outputs of the Write Flip-Flop 31–29 will cause, as previously described in the sections titled "Write 1" or "Write 0," the anodes of diodes 31–37 and 31–38 to be held at —2E volts.

Referring now to FIG. 31B it will be recalled that the Read Flip-Flop 31–56 will be set to produce low level signals at time *t*9B–, provided there was a coincidence of low level signals to the input of gate 31–39. This coincidence of signals will occur only during a search operation, as noted by the (1) signal applied to the input of the aforementioned gate. Thus, commencing at time *t*9B Read Flip-Flop 29–56 will produce low level signals which are applied to one input of gate 31–45. Assuming the *sm* signal is also present, then gate 31–45 will transmit a series of low level signals to the input of amplifier 31–47 beginning at time *t*9B. Thus low level signals will be propagated through the aforesaid amplifier to the input of "B" phase amplifier 31–49, which in turn will produce low level outputs beginning at time *t*10B. These low level outputs from "B" phase amplifier 31–49 are transmitted through buffer 31–53 and act as alerting signals for SM output gates 30–55A to 30–55D. Additionally, the low level outputs of "B" phase amplifier 31–49 drive the input of "A" phase amplifier 31–51, which will produce, in response thereto, a series of low level outputs beginning at time *t*11A. These low level outputs are also transmitted through buffer 31–53 to the inputs of gates 31–55A to 31–55D. Hence, it will be appreciated that buffer 31–53 will transmit a substantially low-level D.C. voltage beginning at time *t*10B to one input of gates 31–55A to 31–55D in response to a coincidence of low level *sm* and Read Flip-Flop signals at the input of gate 31–45.

In the reading operation the following conditions as shown in the chart presented below will prevail at time *t*10B when output gates 31–55A to 31–55B are alerted.

| Read: | Potential, volts |
|---|---|
| Anode of diode **31–37** | −2E |
| Anode of diode **31–38** | −2E |
| Anode of diode **31–35** | (+2E−IZ) |
| Anode of diode **31–36** | (+2E−IZ) |
| Cathodes of head diodes in selected heads | −E |
| Cathodes of head diodes in unselected heads | +3E |

An examination of the above chart and FIGURES 30 and 31 indicates that diodes 31–37 and 31–38 of circuit 31–19A and similar diodes in circuits 31–19B to 31–19D will be cut off. In addition all the head diodes in the non-selected head assemblies (i.e. heads 30–5 to 30–80 and 30–85 to 30–160) will be cut off. However, current will flow from terminal 31–57 through impedance 31–58 and thence through a first leg of a parallel circuit comprising the right-half of winding 31–21, diode 31–36, line WD10, head diode 30–81B (FIG. 30), and the lower-half of winding 30–81 to the center tap of winding 30–81A. The second leg of the aforementioned parallel circuit in which current will also flow comprises the left-half of winding 31–21, diode 31–35, line WD11, head diode 30–81C (FIG. 30), and the upper-half of winding 30–81A.

The currents that are caused to flow in the right and left halves of winding 31–21 of transformer 23 are equal in magnitude and opposite in direction so that no net flux is produced by these currents. Consequently a voltage will not be induced across winding 31–22 when balanced current flows in the right and left halves of winding 31–21. However, when the leading edge of a magnetic spot indicative of a "1" bit is detected by a selected Read Write head, as for example, head 30–81 (FIG. 30), then a voltage will be induced across the head winding thereof, namely winding 30–81C. The induced voltage across the head winding will cause a change in current to flow in the aforementioned parallel circuits so that there will be an increase in current in the first leg and a decrease in current in the second leg of the parallel circuit. This change in current will effect a voltage change across winding 31–21 of transformer 31–23 whereby a first voltage, indicative of a "1" bit, will be induced across winding 31–22 and will be transmitted to the input of read and shaping amplifier 31–33. Amplifier 31–33 produces a low level output suitable for driving a magnetic amplifier in response to said first current change. This low level output signal from amplifier 31–33 is transmitted to one input of gate 31–55A, the other input of which is alerted by a steady state low level D.C. voltage from buffer 31–53. Accordingly, gate 31–55A passes a low level signal to the input of element 31–31A which in turn produces a high level signal one and one-half pulse periods thereafter.

As indicated on FIGURE 31 the output of element 31–31A as well as the outputs of elements 31–31B to 31–31D are connected to the DM′ inputs of the Minuend Buffer (FIG. 10). It will be recalled that gate 31–55A receives a steady state low level permissive signals from buffer 31–53 beginning at time *t*10B. Therefore, at this time gate 31–55A will transmit information from the Drum, as detected by Read Circuit 31–28A and the selected Read-Write head to the Min Buffer 1 via element 31–31A.

When the trailing edge of a "1" bit is detected by Read-Write head 30–81, a second change of current flows in the aforedescribed parallel circuits, so that there will be a decrease in current in the first leg and an increase in current in the second leg thereof. Therefore, a second voltage opposite in polarity to that produced by the leading edge of a "1" bit will be induced in winding 31–22 of transformer 31–23. Read amplifier 31–33 may be readily constructed so that it is insensitive to the voltage produced by the trailing edge of a magnetic spot indicative of a "1" bit. For example, if read amplifier 31–33 contains a normally cut off amplifier, then the voltage produced by the trailing edge magnetic spot indicative of a "1" bit may only drive said amplifier further in a non-conductive region. It will be appreciated that read amplifier 31–33 produces a high level signal whenever the trailing edge of a magnetic spot indicative of a "1" bit is detected by a selected Read-Write head.

Since the Drum 35–10 is initially magnetized so that its entire surface is storing "0" bits, the magnetized area of a track after a "1" bit will not induce a voltage in the head winding (e.g. 31–81A, FIG. 30). Therefore, whenever "0" bits are detected by a Read-Write head, no voltage will be induced across transformer winding 31–22 and amplifier 31–33 will not be affected. If read amplifier 31–33 comprises at least one normally cut off amplifier in addition to wave shaping apparatus then read amplifier 31–33 will produce a high level output at the input of gate 31–55A whenever "0" bits are detected. Gate 31–55A will transmit the aforementioned high level signals to the input of element 31–31A which will produce after its inherent delay of one and one-half pulse periods a low level signal at the $DM_1'$ input of the Minuend Buffer (FIG. 20).

The reading process may be considered as ended when the D.C. low level permissive signal from buffer 31–53 is removed from the inputs of gates 31–55A to 31–55D. As earlier described this permissive signal is the result of the coincidence of low level *sm* signals from the FM-SM Flip-Flop (FIG. 28) and low level output signals from the Read Flip-Flop 31–56 at the input of gate 31–45. Since the Read Flip-Flop 31–56 receives a *t*8B+ signal at the input of recirculation gate 31–42 once each minor cycle, the last named flip-flop will be set to produce high level signals at time *t*9B. These high level signals will be propagated through gate 31–45, a phase amplifier 31–47, B phase amplifier 31–49 to one input of buffer 31–53 and to the input of A phase amplifier 31–51 which will produce after its inherent delay a high level signal at the second input of buffer 31–53. Accordingly, buffer 31–53 will transmit high level signals in synchronism with the positive portion of the A and B phase pulses so that the output of this buffer appears to be a substantially high level D.C. signal. This high level D.C. signal will commence at time *t*10B and will last until the Read Flip-Flop 31–56 is reset by a coincidence of signals at gate 31–39. It will be appreciated that the high level output from buffer 31–53 will act as an inhibition signal on gates 31–55A to 31–55D causing these gates to transmit high level signals to the inputs of elements 31–31A to 31–31D respectively. Summarizing it may be stated that the read operation commences at time *t*10B of one minor cycle and is ended at time *t*10B of the next subsequent minor cycle.

Reference to FIG. 35B will show that at time *t*10B the P0 digit of an information word is being detected by a Read-Write head assembly. Accordingly, the timing at the input to gates 31–55A to 31–55B is P0=*t*10B. Therefore, the timing at the output of elements 31–31A to 31–31D must be P0=*t*0A, since these aforementioned elements all have an inherent delay period of one and one-half pulse periods. Reference to (FIG. 20) Min Buffers 1 to 4 will show that there is a one-half pulse delay due to elements 20–14A to 20–14D and 20–15A to 20–15D in the transmission of information through the Minuend Buffers. Therefore, the timing at the output of the Minuend Buffer (FIG. 20) when an information word is being transferred from the memory to an element in the computer is P0=*t*0B.

Refer now to FIGURE 31B which illustrates the Reading and Writing circuits associated with the five FM information bands 35–13U to 35–13Y. In this figure there are shown four identical FM Reading Circuits 31–30A to 31–30D and four identical FM Writing Circuits 31–20A to 31–20D. FM Reading Circuits 31–30A to 31–30D are identical to circuits 31–28A to 31–28D and FM Writing Circuits 31–20A to 31–20D are identical to circuits 31–19A to 31–19D of FIGURE 31A. Accordingly, the Reading and Writing circuits for the FM bands will not again be described, however, their interconnections with the FM head assemblies shown on FIGURE 30 will be outlined. FM Reading and Writing Circuits 31–20A and 31–30A, 31–20B and 31–30B, 31–20C and 31–30C, 31–20D and 31–30D are connected via lines WF11 and WF10, WF21 and WF20, WF31 and WF30 and WF41 and WF40 to the Read-Write heads (FIG. 30) in a row with elements 30–1, 30–2, 30–3 and 30–4, respectively. Each head in the same row as element 30–1 is associated with the track marked A of an FM information band and the heads in a row with elements 30–2 to 30–4 are associated with the tracks marked B to D respectively of the FM information bands.

The input elements (e.g. complementer 31–14A and gate 31–12A) connected to the FM Writing Circuits 31–20A to 31–20D are substantially identical to the input elements connected to the SM Writing Circuits 30–19A through 30–19D. Thus gates 31–12A to 31–12D are the analogues of gates 31–11A to 31–11D and complementers 31–14A to 31–14D are the analogues of complementers 31–13A to 31–13D. Gate 31–26 and amplifier 31–6 serve as a link for transmitting the output of the Write Flip-Flop 31–29 to the input of FM Writing Circuits 31–20A to 31–31D and, therefore, these last named two elements are similar in function to gate 31–25 and amplifier 31–10 described in connection with SM Writing Circuits 31–19A to 31–19D.

Two differences in the input circuitry connected to the SM and FM Writing Circuits, exists and these differences shall now be described. Input gates 31–12A to 31–12D, which are connected to the output of Min Buffers 1 to 4 via elements 31–7A to 31–7D respectively, are alerted by an *fm* signal; whereas the input gates to the slow memory Writing Circuits are alerted by an *sm* signal. Secondly the output of the Write Flip-Flop 31–29 is transmitted through gate 31–26 (alerted by an *fm* signal) and amplifier 31–6 to the inputs of Writing Circuits 31–20A to 31–20D, whereas the output of the Write Flip-Flop 31–29 are transmitted through gate 31–25 (alerted by an *sm* signal) and amplifier 31–10 to the SM Writing Circuits. An examination of FIGS. 31A and 31B will show that the selection between SM Writing Circuits and FM Writing Circuits is determined by gates 31–25 and 31–26. If the *sm* signal is present, low level outputs of the Write Flip-Flop will be transmitted via gate 31–25 and amplifier 31–10 to the SM Writing Circuits 31–19A to 31–19D; if the *fm* signal is present then low level outputs from the Write Flip-Flop will be transmitted through gate 31–26 and amplifier 31–6 to the inputs of the FM Writing Circuits 21–20A to 31–20D. Since the *sm* and *fm* signals are mutually exclusive, it will be appreciated that only one of the two Writing Circuits 31–19A to 31–19D or 31–20A to 31–20D may be selected at any time.

In the explanation of the method for selecting a particular head assembly for reading or writing it was shown that one memory switch (FIG. 28) controls two head assemblies, one head assembly of an FM band and one SM head assembly. Thus it might appear that during the writing operation, two head assemblies, an SM head assembly and an FM head assembly would cause information to be placed on the Rotating Drum Memory. However, this possibility is negated since only one of the two writing arrangements (circuits 31–19A to 31–19D or circuits 31–20A to 31–20D) may be selected.

The output arrangements (e.g. gate 31–54A and element 31–32A) for the FM Reading Circuits 31–30A to 31–30D are substantially identical to that disclosed in connection with the SM Reading Circuits 31–28A to 31–28D. Thus FM output gates 31–54A to 31–54D are the analogues of SM output gates 31–55A to 31–55D and elements 31–32A to 31–32D are the analogues of elements 31–31A to 31–31D described in connection with the SM Reading Circuits. It will be noted that the outputs of elements 31–32A to 31–32D are connected to the $DM_{15}$, $DM_{25}$, $DM_{35}$, and $DM_{45}$ inputs respectively of Min Buffers 1 to 4 (FIG. 20), and consequently the output of the FM portion of the Rotating Drum Memory (FIG. 35) may be conveyed to the Minuend Buffer. However, a difference between the output circuitry connected to the SM Read Circuit and the output circuitry connected to the FM Reading Circuits does exist, and this difference shall now be described. SM output gates 31–55A to 31–55D are alerted by a substantially low level D.C. voltage from the output of buffer 31–53, whereas FM output gates 31–54A to 31–54D are alerted by the output of buffer 31–52. It will be recalled that buffer 31–53 will transmit a substantially low level D.C. voltage to the input of gates 31–55A to 31–55D in response to a coincidence of low level *sm* and Read Flip-Flop signals at the input of gate 31–45. The output of buffer 31–52 will alert gates 31–54A to 31–54D in a similar manner to that described in connection with the alerting of gates 31–55A to 31–55D by the output of buffer 31–53. However, the output signal of buffer 31–52 is a function of a coincidence of low level FM and Reading Flip-Flop signals at the input of gate 31–44.

Elements 31–44, 31–46, 31–48, 31–50 and 31–52 associated with the FM output gates 31–54A to 31–54D are analogues in function and operation to elements 31–45, 31–47, 31–49, 31–51 and 31–53, respectively, associated with the SM output gates. Accordingly, the former group of elements associated with the FM output gates 31–54A to 31–54D will not be described.

It will be understood that since the *sm* and *fm* signals are mutually exclusive only one of the buffers 31–53 and 31–52 will produce a low level output signal at any given time and thus during the Reading operation either the SM output gates 31–55A to 31–55D or the FM output gates 31–54A to 31–54D will be alerted but not both.

In the Reading operation, as in the case of the previously described writing operation, two head assemblies are conditioned by one memory switch (FIG. 29). Thus it might appear that during the Reading operation, two head assemblies, an SM head assembly and an FM head assembly would cause information to be transmitted from the two bands on the Drum to the Minuend Buffers. However, this possibility is negated since only one of the two sets of output gates (31–55A to 31–55D or 31–54A to 31–54D) may be selected at any one time.

OVERFLOW CIRCUITS—FIGURE 22

Referring now to FIGURE 22 there is shown at 22–22A and 22–22B the Overflow Flip-Flop and the Overflow Delay Flip-Flop respectively. The Overflow Flip-Flop, which shall hereinafter be designated OF Flip-Flop, comprises an amplifier 22–35 and a complementer 22–36 connected together at their inputs, wherein the output of complementer 22–36 is connected to the input of a recirculation gate 22–25 which in turn is connected at its output to the input of a recirculation complementer 22–31. The output of complementer 22–31 drives the common input of elements 22–35 and 22–36; so that there is a feed back loop from the output of complementer 22–36 back to its input. A high level signal applied to the common input of the aforementioned elements 22–35 and 22–36 causes amplifier 22–35 to produce a high level signal at its output marked $\overline{OF}$ and causes complementer 22–36 to produce a low level signal at its output marked OF so that the OF Flip-Flop by convention produces an OF signal. Low level outputs from complementer 22–36 will be transmitted through recirculation gate 22–25 to the input of recirculation complementer 22–31 causing the latter complementer to produce after its inherent delay a high level signal at the common input of amplifier 22–35 and complementer 22–36. Recirculation of the output signal from complementer 22–36 back to its input via elements 22–25 and 22–31 will cause the OF Flip-Flop to continue to produce OF signals.

It will be observed that the recirculation gate 22–25 of the OF Flip-Flop has an input which is connected to the $OF_{2+}$ output of the Overflow Delay Flip-Flop shown at 22–22B. If the $OF_{2+}$ output of the Overflow Delay Flip-Flop is at a low level, it will be appreciated that the low level output pulses of complementer 22–36 will pass through recirculation gate 22–25 causing complementer 22–31 to continue to produce high level signals at the inputs of elements 22–35 and 22–36 to thereby cause the OF Flip-Flop to continue to produce OF signals. When on the other hand the output of the Overflow Delay Flip-Flop is at a high level it will be appreciated that low level output signals from complementer 22–36 will not pass through recirculation gate 22–25 and that a high level ($OF_{2+}$) signal from the Overflow Delay Flip-Flop will be presented to the complementer 22–31 which in turn will produce a low level output signal at the common input of elements 22–35 and 22–36. A low level signal applied to the common inputs of the aforementioned two elements causes amplifier 22–35 to produce a low level output signal and causes complementer 22–36 to produce a high level signal at its output so that the OF Flip-Flop is by convention producing an $\overline{OF}$ signal. High level outputs from the complementer 22–36 will be fed through recirculation gate 22–25 to the input of complementer 22–31 causing the latter complementer to produce a low level signal at the common input of elements 22–35 and 22–36. Continued recirculation of the high level signals from the output of complementer 22–36 to its input will cause the OF Flip-Flop to continue to produce $\overline{OF}$ signals. Due to the inherent one-half pulse period delay encountered in the amplifiers and complementers comprising the OF Flip-Flop the high level signal applied from the Overflow Delay Flip-Flop to the input of recirculation gate 22–25 will not cause the OF Flip-Flop to produce $\overline{OF}$ signals until one pulse period has elapsed.

The common inputs of elements 22–35 and 22–36 are connected to the output of three input circuits which cause a high level signal to be applied thereto, thus setting the OF Flip-Flop to a condition where OF signals are produced.

The first of these input circuits comprises a complementer 22–27 connected at its output to the common input of elements 22–35 and 22–36 and connected at its input to the output of gate 22–21. Gate 22–21 is connected at its input to the OR output of the OR Flip-Flop (FIGURE 24), the $X_1$ output of the X Register (FIGURE 16), and the *t*9B– output of the Cycling Unit (FIGURE 34). Thus when all the signals at the input of gate 22–21 are at a low level (a condition which can only occur at time *t*9B) complementer 22–27 will produce a high level signal which will cause the OF Flip-Flop to produce OF signals. This first input to the OF Flip-Flop will, as shall be shown later in the specification detects the end of the second step of the divide operation and will cause an OF signal to be produced one pulse period thereafter.

The second input circuit of the OF Flip-Flop comprises a buffer 22–38 connected at its output to the input of paired elements 22–35 and 22–36 and connected at its input to the output of complementer 22–28. Complementer 22–28 is in turn connected to the output of gate 22–22 which has four inputs thereto. Gate 22–22 is connected to the $Q_2$ and $Q_3$ outputs of the MQC (FIGURE 23), the (31) signal output line of the Control Encoder (FIGURE 27), and the *t*9B– output line of the Cycling Unit (FIGURE 34). This second input circuit to the OF Flip-Flop detects a specific condition that may arise during the second step of the division operation. If the MQC reaches a predetermined count as indicated either by the $Q_2$ and $Q_3$ signals during the second portion of the division operation then at time *t*9B gate 22–22 will pass a low level signal to the input of complementer 22–28 which in turn will produce a high level signal. This high level signal will be applied via buffer 22–38 to the input of paired elements 22–35 and 22–36; thus causing the OF Flip-Flop to produce OF signals. In addition the high level output of complementer 22–28 is designated as the DI signal and is applied to the clear line of the Static Register (FIGURE 25). As shall be fully described in connection with the division operation the DI signal indicates that an error has been committed during the second step ($D_2$) of the divide operation.

The third input circuit to the Overflow Flip-Flop comprises a complementer 22–29 connected at its output to the input of elements 22–35 and 22–36 and connected at its input to the output of gate 22–23. Gate 22–23 is connected at its input to the A and C outputs of the Comparator (FIGURE 17), the $\overline{CP}$ output of the Complementer Flip-Flop (FIGURE 21), the (4) output line of the Control Encoder (FIGURE 27), and the *t*11B– output of the Cycling Unit (FIGURE 34). It will be appreciated when low level signals are applied simultaneously to gate 22–23 (a condition which can only occur at time *t*11B) that complementer 22–29 will produce a high level signal one-half pulse period thereafter which is applied to the common inputs of elements 22–35 and 22–36 whereby the OF Flip-Flop will produce OF signals.

Gate 22–23 detects a condition either in the Subtract (S) or Add (A) operation wherein the two most significant digits of the data words operated upon by the Adder produce a carry as noted by the A and C signals at time *t*11B. A carry produced at time *t*11B would cause a digit to be placed in the P11 digit position (SBW) of the A register. The P11 digit position (SBW) is normally cleared out of the A Register and information indicative of a result in this position would be destroyed. Therefore, gate 22–23 detects a condition where the result of an Add or Subtract order would flow into the SBW of the word indicative of the result.

Refer now the Overflow Delay Flip-Flop shown at 22B which shall hereinafter be referred to as the OFD Flip-Flop. The OFD Flip-Flop comprises a complementer 22–32 connected at its output to the input of recirculation gate 22–38 and to the input of amplifier 22–37 via buffer 22–34. The output of amplifier 22–37 is connected to the input of recirculation gate 22–25 of the OF Flip-Flop, and the output of gate 22–38 is connected to the input of complementer 22–33 which in turn is connected at its output to the input of gate 22–26. Gate 22–26 is also connected at its input to the *t*11B+ output of the Cycling Unit (FIGURE 34) and is connected at its output to the input of complementer 22–32. Thus it can be seen that the output of complementer 22–32 is fed back to its own input via elements 22–38, 22–33, and 22–26 and further it can be seen that the output of complementer 22–32 is connected via buffer 22–34 to amplifier 22–37 which produces the $OF_{2+}$ signal. A low level signal applied to the complementer 22–32 causes the aforementioned complementer to produce after its inherent delay period a high level output signal. This high level signal will be transmitted through buffer 22–34 to the input of amplifier 22–37 which will produce after its inherent delay period a high level signal designated as the $OF_{2+}$ signal. In addition, a high level output of complementer 22–32 will be transmitted through gate 22–38, not withstanding the level of the signals which may be on any other input of this gate, to the input of complementer 22–33. A high level signal at the input of complementer 22–33 causes this complementer to produce after its inherent delay period a low level signal which will be transmitted via gate 22–26 to the input of complementer 22–32. Therefore, high level signals will be produced continually by complementer 22–32 the output of which will be ultimately propagated through amplifier 22–37 and appear as the high level $OF_{2+}$ signals.

It will be observed that the input of gate 22–38 is connected to the output of complementer 22–30 which in turn is connected at its input to the output of gate 22–24. Gate 22–24 is connected at its input to the OF output of the OF Flip-Flop, the TS output of the Time Selection Flip-Flop (FIGURE 12), the (1) signal line from the Signal Encoder (FIGURE 27), and the *t*11B– output line of the Cycling Unit (FIGURE 34). It will be appreciated that when all the signals at gate 22–24 are at a low level (a condition which can only occur at time *t*11B), complementer 22–30 will produce after its inherent delay period a high level signal which will be applied to gate 22–38. The high level signal transmitted by gate 22–38 will cause complementer 22–30 to produce a low level signal which is applied via gate 22–26 to the input of complementer 22–32. This latter complementer will produce after its inherent delay period a high level signal which will cause an $OF_{2+}$ signal to be generated at the output of amplifier 22–37 and will cause continued $OF_{2+}$ signals to be generated by action of the recirculation loop already described. Thus it can be seen at time *t*11B if all the signals to gate 22–24 are at a low level there will be transmitted a pulse which will ultimately cause the $OF_{2+}$ signal to be generated at time *t*1B.

The generation of $OF_{2+}$ signals will continue until a high level pulse is applied at the input of gate 22–26. A high level signal will be generated by the Cycling Unit at time *t*11B of every minor cycle and will be applied from its *t*11B+ output to the input of gate 22–26. The *t*11B+ signal will be transmitted via gate 22–26 to the input of complementer 22–32 causing this latter complementer to produce after a half pulse delay period a low level signal which will be applied to the input of amplifier 22–37. Amplifier 22–37 will in turn produce a low level output indicating the removal of the $OF_{2+}$ signal at time *t*0A. Further the low level output of complementer 22–32 will be transmitted via gate 22–38 to the input of complementer 22–33 which in turn produces after its inherent delay period a high level signal at the input of complementer 22–32 causing the latter complementer to continue to produce low level signal outputs.

MULTIPLIER QUOTIENT COUNTER—FIGURES 23A AND 23B

Referring now to FIGURES 23A and 23B there is shown the Multiplier Quotient Counter which shall hereinafter be designated as the MQC. The MQC is used during the two shift orders (N and V orders) and in the multiply and divide orders (M and D orders). In the shift orders the MQC stores a digit which determines the number of times the data in a register is to be denominationally shifted. In the multiply order (M) the MQC stores one digit of the multiplier at a time and determines the number of times the multiplicand should be added to itself for each multiplier digit; and in the divide operation each digit of the quotient is determined by the count stored in the MQC at a particular instant. Further as shall be seen in the divide order the MQC acts as an extra one pulse delay path for the X Register when it is necessary to shift the contents of that register one pulse position to the left.

It will be observed that the MQC comprises four identical Flip-Flops FFA to FFD wherein Flip-Flop FFD produces $Q_1$ and $\overline{Q}_1$ signals representative of a decimal one or respectively; FFC produces $Q_2$ and $\overline{Q}_2$ signals representative of decimal two or zero respectively; FFB produces $Q_3$ or $\overline{Q}_3$ signals representative of a decimal four or zero respectively; and FFA produces $Q_4$ and $\overline{Q}_4$ signals representative of a decimal five or zero respectively.

Since all of the Flip-Flops FFA to FFD are identical only one shall be described; namely Flip-Flop FFA. It should be noted that similar elements in each of the other Flip-Flops are referenced with identical numerals but have different alphabetic designations. For example, complementer 23–12A of Flip-Flop FFA, complementer 23–12B of Flip-Flop FFB, complementer 23–12C of Flip-Flop FFC and complementer 23–12D of Flip-Flop FFD all operate in the same manner and perform the same function.

Flip-Flop FFA comprises an amplifier 23–14A and a complementer 23–13A connected together at their inputs. The output of complementer 23–13A is connected to the input of a recirculation gate 23–11A which in turn is connected at its output to the input of recirculation complementer 23–12A. The output of complementer 23–12A drives the common input of elements 23–13A and 23–14A so that there is a feed back loop from the output of complementer 23–13A back to its input. A high level signal applied to the common input of the aforementioned elements 23–13A and 2314–A causes amplifier 23–14A to produce a high level signal at its output marked $\overline{Q}_4$ and causes complementer 23–13A to produce a low level signal at its output marked $Q_4$ so that the Flip-Flop FFA is by convention producing a $Q_4$ signal. Low level outputs from complementer 23–13A will be fed through recirculation gate 23–11A to the input of recirculation complementer 23–12A causing the latter complementer to produce a high level signal at the common input of amplifier 23–14A and complementer 23–13A. The recirculation of the output signal from complementer 23–13A back to its input via elements 23–11A and 23–12A will cause Flip-Flop FFA to continue to produce $Q_4$ signals.

It will be observed that recirculation gate 23–11A of Flip-Flop FFA (as well as the recirculation gates for Flip-Flops FFB to FFD) has as another input, the clear line 23–30. As the clear line 23–30 is normally maintained at a low level, it will be appreciated that low level output pulses from complementer 23–13A will pass through recirculation gate 23–11A causing complementer 23–12A to continue to produce high level signals at the input of elements 23–13A and 23–14A to thereby cause Flip-Flop FFA to continue producing $Q_4$ signals. When on the other hand the potential on the clear line 23–30 is raised it will be appreciated that low level output signals from complementer 23–13A will not pass through recirculation gate 23–11A and that a high level signal from the clear line will be presented to complementer 23–12A which in turn will produce a low level output signal at the common input of elements 23–13A and 23–14A. A low level signal applied to the common input of the aforementioned two elements causes amplifier 23–14A to produce a low level output signal, and causes complementer 23–13A to produce a high level signal at its output, so that Flip-Flop FFA is by convention producing a $\overline{Q}_4$ signal. In this state the high level outputs from complementer 23–13A will be fed through recirculation gate 23–11A to the input of complementer 23–12A causing the latter complementer to produce a low level signal at the common input of elements 23–13A and 23–14A so as to cause Flip-Flop FFA to continue to produce $\overline{Q}_4$ signals. Due to the inherent one-half pulse period delay encountered in the amplifiers and complementers comprising Flip-Flop FFA, a high level signal on the clear line 23–30 will not reset Flip-Flop FFA to FFD, that is, cause it then to produce barred signals, until one pulse period has elapsed.

The clear line 23–30 is connected to the output of a complementer 23–5 which in turn is connected at its input to the output of a buffer 23–29. Buffer 23–29 is connected at its input to the ORA+ output of the OR Flip-Flop (FIGURE 24), the (32A) output line of the $D_3$ Flip-Flop (FIGURE 25), and the output of complementer 23–4. The input of complementer 23–4 is connected to the output of gate 23–1, having two inputs which are connected to the (62) output line of the Control Encoder (FIGURE 27) and the *t*0B– output line of the Cycling Unit (FIGURE 34). When both inputs of gate 23–1 are at a low level (a condition which occurs at time *t*0B– during the $\beta$ cycle and during the first step of a division or multiplication order) complementer 23–4 will produce, after a one-half pulse period delay, a high level signal to the input of amplifier 23–5 which, after its inherent delay period, causes a high level pulse to be applied to the clear line 23–30. Further, as shall be shown the ORA+ signal and the (32A) signal, both of which are high level signals, are applied to amplifier 23–5 during certain steps of the division operation causing amplifier 23–5 to produce a high level output signal which is applied to the clear line 23–30.

The remaining Flip-Flops FFB to FFD all operate in a similar manner so that the application of a high level signal to the line 23–30 which is connected to Flip-Flops FFB to FFD via gates 23–11B to 23–11D causes these Flip-Flops to be cleared, after a one pulse period delay, to a condition where they are producing $\overline{Q}_3$, $\overline{Q}_2$ and $\overline{Q}_1$ signals respectively. Further the application of a high level signal to the common input of an amplifier-complementer pair in any given Flip-Flop FFB to FFD causes the given Flip-Flop to produce unbarred signals.

Chart AF presented below shows the elements of Flip-Flop FFA and the corresponding similar elements of each of the other Flip-Flops FFB to FFD inclusive.

CHART AF

| Flip-Flop | FFA | FFB | FFC | FFD |
|---|---|---|---|---|
| Recirculation and Clear Gate | 23–11A | 23–11B | 23–11C | 23–11D |
| Recirculation Complementer | 23–12A | 23–12B | 23–12C | 23–12D |
| Output Amplifier (Barred outputs) | 23–14A | 23–14B | 23–14C | 23–14D |
| Output Complementer (Unbarred outputs) | 23–13A | 23–13B | 23–13C | 23–13D |

The common inputs of each of the aforelisted amplifier-complementer pairs of Flip-Flops FFA to FFD are connected through a first input gate and associated complementer to the $M_4$ to $M_1$ output lines, respectively, of the Minuend Buffer (FIGURE 20) and through a second input gate and an associated complementer to the $X_4$ to $X_1$ outputs, respectively, of the X Register.

Again viewing Flip-Flop FFA, as typical, it can be observed that a gate 23–3A, having three inputs, drives a complementer 23–10A the output of which is in turn connected to the common input of elements 23–13A and 23–14A. It will be appreciated that if all the inputs at gate 23–3A are at a low level, complementer 23–10A will produce a high level signal at the input of amplifier 23–14A and complementer 23–13A causing Flip-Flop FFA to produce a $Q_4$ signal. Flip-Flops FFB to FFD each have a similar circuit comprising input gate 23–3B and complementer 23–10B; input gate 23–3C and complementer 23–10C; and input gate 23–3D and complementer 23–10D respectively. One input of all the gates 23–3A to 23–3D is connected to the (2) output line of the signal Encoder (FIGURE 27); a second input of gates 23–3A to 23–3D is connected to the *t*7B– output line of the cycling Unit (FIGURE 34); and the third input to gates 23–3A to 23–3D are connected respectively to the $M_4$, $M_3$, $M_2$ and $M_1$ output lines of Min Buffers 4 to 1 (FIGURE 20).

The (2) signal, which alerts gates 23–3A to 23–3D, is generated during the $\beta$ cycle of computer operation, i.e. when instruction is being transferred from the memory via the Minuend Buffer (FIGURE 20). Since gates 23–3A to 23–3D are also connected to the *t*7B– output line of the Cycling Unit (FIGURE 34) and to the $M_4$, $M_3$, $M_2$ and $M_1$ output lines respectively of the Minuend Buffer, it will be appreciated that the digit of the instruction word present on the Minuend Buffer output lines at time *t*7B will be transmitted through the aforementioned gates into Flip-Flops FFA to FFD respectively. The information available at the output of the Minuend Buffer at this time (*t*7B) corresponds to the digit in the P7 position of the instruction word being transferred. Thus, the P7 digit of every instruction word being transferred via the Minuend Buffer during the $\beta$ cycle is stored in the MQC. Since all the amplifiers and complementers comprising Flip-Flops FFA to FFD have an inherent one-half pulse period delay. The P7 digit of the instruction word will not be stored in the MQC until time *t*8B of the $\beta$ cycle. Storage of this digit is used to control the number of shift cycles to be executed if the instruction word calls for an N or a V instruction.

The second input circuit to Flip-Flop FFA comprises a gate 23–2A having two inputs and a complementer 23–9A wherein the output of gate 23–2A is connected to the input of complementer 23–9A which in turn is connected at its output to the common input of elements 23–13A and 23–14A. Gate 23–2A is connected at its inputs to the IER–OR output of the IER and OR Flip-Flops (FIGURE 24) and to the $X_4$ output of the X Register (FIGURE 16). It will be appreciated that if both the inputs at gate 23–2A are at a low level, complementer 23–9A will produce a high level signal at the input of elements 23–13A and 23–14A causing Flip-Flop FFA to produce a $Q_4$ signal. Flip-Flops FFB to FFD each have a similar circuit comprising input gate 23–2B and complementer 23–9B; input gate 23–2C and complementer 23–9C; and input gate 23–2D and complementer 23–9D, respectively. One input of all the gates 23–2A to 23–2D is connected to the IER–OR output of the IER–OR Flip-Flop and to the $X_4$, $X_3$, $X_2$ and $X_1$ outputs respectively of the X Register. The IER–OR signal may, as shall be shown, occur at time *t*1B during the multiplication order or may occur for a period lasting from time *t*0B to time *t*11B during the division order. In multiplication one digit at a time is transferred from the X Register via outputs $X_4$, $X_3$, $X_2$ and $X_1$ (FIGURE 16) and gates 23–2A to 23–2D to be stored in the MQC, whereas during a particular phase of the division operation the MQC acts as a path having a one pulse period delay whereby the $X_4$, $X_3$, $X_2$ and $X_1$ outputs of the X Register may be returned to the input of the same register via the MQC. During the time that the MQC acts as a one pulse delay conduit, Flip-Flops FFA to FFD react as monostable devices. This change in operation occurs in the following manner: A high level ORA+ signal from the OR Flip-Flop (FIGURE 24) or a high level (32A) signal from the $D_3$ Flip-Flop (FIGURE 25) is applied for a period equal to a minor cycle to the input of amplifier 23–5, the output of which is connected to the clear line 23–30. The ORA+ or (32A) signals are also buffed together by the buffer 24–13 to produce a low level IER–OR signal. The high level ORA+ or (32A) signal causes amplifier 23–5 to generate a high level signal output for an entire word time which is transmitted via the clear line 23–30 to the input of recirculation gate 23–11A and thence to the input of complementer 23–12A which produces a series of low level output pulses for a period equal to one word time. The series of output pulses from complementer 23–12A is applied to the common inputs of elements 23–13A and 23–14A causing a series of $\overline{Q}_4$ signals to be produced. If a high level signal is not applied to the common input of the aforementioned paired elements a sustained $\overline{Q}_4$ signal will be produced. However, if a "1" bit is applied to gate 23–2A from $X_4$ during this time, the complementer 23–9A will apply a high signal to complementer 23–13A which will in turn produce a $Q_4$ output one pulse time after the corresponding $X_4$ "1" bit has been received. The MQC during this time then simply acts to provide a one pulse delay for the X Register bits. It will be appreciated that since the clear line 23–30 is also connected to Flip-Flops FFB to FFD that these Flip-Flops will react in a similar manner for the $X_3$, $X_2$ and $X_1$ bits when the ORA+ or (32A) signal is generated.

The common input of amplifier-complementer pairs 23–13A and 23–14A, 23–13B and 23–14B, and 23–13D and 23–14D of Flip-Flops FFA, FFB and FFD, respectively are selectively driven to a high level from yet another source, namely the output of buffer 23–8. The input of buffer 23–8 is connected to the output of complementer 23–7 which in turn is driven by the output of gate 23–6. Gate 23–6 has two inputs which are connected to the OR output of the OR Flip-Flop (FIGURE 24) and the *t*11B output of the Cycling Unit (FIGURE 34). During selective steps of the division order the OR output of the OR Flip-Flop will be at a low level for a period equal to one minor cycle. At time *t*11B–, of that minor cycle gate 23–6 will pass a low level signal to the input of complementer 23–7 which in turn will produce a high level signal at the common input of elements 23–13A and 23–14A, 23–13B and 23–14B, 23–13D and 23–14D of Flip-Flops FFA, FFB and FFD respectively. Therefore, the MQC will be set to a condition where it is producing $Q_4$, $Q_3$, $\overline{Q}_2$ and $Q_1$ signals in response to an input via gate 23–6, complementer 23–7 and buffer 23–8. These latter signals are representative of a count of ten stored in the MQC. It should be noted that while normally the 4 bits comprising a digit are representative of values between 0 and 9 in this particular case an exception is made and the combination 1101 ($Q_4$, $Q_3$, $\overline{Q}_2$, $Q_1$) is used to indicate a number greater than 9.

STEP DOWN OF MQC

Referring now to FIGURE 23B there is shown the Step Down circuits for the MQC which comprises five gates 23–15 to 23–19, wherein all the gates are at least connected to the (61) output line of the signal Encoder (FIGURE 27) and the *t*1B– output line of the Cycling Unit (FIGURE 34). In addition, gates 23–15 to 23–19 are connected to the designated outputs of the MQC as indicated on the figure, so that the aforementioned gates detect specific counts stored by the MQC. In particular gate 23–15 detects a count of zero (0), gate 23–16 detects a count of a 4 or 9, gate 23–17 detects a count of a 2, or 7, gate 23–18 detects a count of a 1, 3, 6, 8 or 10 and gate 23–19 detects a count of a 0 or 5. The output of gates 23–15 to 23–19 are connected to the inputs of complementers 23–20 to 23–24 respectively. Step Down signals are taken from the $N_5$, $N_4$, $N_3$ and $N_1$ outputs of complementers 23–20, 23–21, 23–22 and 23–24, respectively wherein the $N_5$ output and $N_4$ output drive the common input of elements 23–13C and 23–14C of Flip-Flop FFC; the $N_4$ and $N_3$ outputs drive the common input of elements 23–13D and 23–14D of Flip-Flop FFD; and the $N_1$ output drives the common input of elements 23–13B and 23–14B of Flip-Flop FFB. The outputs of complementers 23–21 to 23–24 are also connected to the input of amplifiers 23–25 to 23–28 respectively. Additional Step Down signals are derived from the $N_{4B}$, $N_{3B}$, $N_{2B}$ and $N_{1B}$ outputs of amplifiers 23–25 through 23–28, wherein these aforementioned outputs are connected to the input of recirculation gates 23–11B, 23–11C, 23–11D and 23–11A of Flip-Flops FFB, FFC, FFD and FFA respectively.

The apparatus of (FIGURE 23B) serves to generate signals in response to the output of the MQC wherein such generated signals are fed back to jam the MQC to a predetermined count, which is a unit less than the count which actuated the step down circuits.

As can be observed gates 23–15 to 23–19 respond in accordance with the output of the MQC at time *t*1B, provided the (61) signal is present. A coincidence of low level signals applied to all the inputs of one of the gates 23–15 to 23–19 (a condition which can only occur at time *t*1B) causes one of the complementers 23–20 to 23–24 to produce at time *t*2A a high level output signal. A high level output from one of the complementers 23–20 to 23–22 or 23–24 is applied directly to the complementer-amplifier pairs of Flip-Flops FFB, FFC and FFD as previously indicated, and will, therefore, cause one of the aforementioned Flip-Flops to produce ($\overline{Q}_3$, $\overline{Q}_2$ or $\overline{Q}_1$ signals, at time *t*2B. Further, a high level output from one of the complementers 23–21 to 23–24 causes a selected one of the amplifiers 23–25 to 23–28 to produce a high level signal at time *t*2B. Since recirculation gates 23–11B, 23–11C, 23–11D and 23–11A are connected to the outputs of amplifiers 23–25 to 23–28 respectively, a high level signal from one of the aforementioned amplifiers will cause the Flip-Flop which it drives in the MQC to produce a barred output signal at time *t*3B in the same manner as if a high level clear signal was applied to a selected recirculation gate. It will therefore be appreciated, that the output of the MQC will be changed in response to all the signals from the Step Down circuits at time *t*3B.

To illustrate how the Step Down circuit operates assume for the moment that the MQC is storing a specific count. For example, if the MQC is storing the count of 4 then Flip-Flop FFA to FFD will generate $\overline{Q}_4$, $Q_3$, $\overline{Q}_2$ and $\overline{Q}_1$ signals. If the (61) signal is present, at time *t*1B gate 23–16 will pass a low level signal to the input of complementer 23–21, which will produce a high level $N_4$ signal at time *t*2A. This high level signal is applied to the input of complementer 23–25, to the common input of elements 23–13C and 23–14C of Flip-Flop FFC and to the common inputs of element 23–13D and 23–14D of Flip-Flop FFD; and will, cause amplifier 23–25 to produce a high level signal $N_{4B}$; Flip-Flop FFC and Flip-Flop FFD will be set to produce the $Q_2$ and $Q_1$ signals at time *t*2B by the $N_4$ signal. The high level signal, $N_{4B}$ from complementer 23–25 is applied to the input of recirculation gate 23–11B to clear FFB to its $\overline{Q}_3$ state. Thus, it can be seen that at time *t*3B the MQC is producing $\overline{Q}_4$, $\overline{Q}_3$, $Q_2$, and $Q_1$ signals which are representative of a numeric value equal to 3 and that a counter has been stepped down by one unit. This code renders gate 23–18 operative so that upon receipt of the next *t*1B signal an $N_{2B}$ signal is generated. The $N_{2B}$ signal closes the FFD to its $\overline{Q}_1$ state leaving a code $\overline{Q}_4$, $\overline{Q}_3$, $Q_2$ and $\overline{Q}_1$ or a 2 in the counter.

The MQC also has the facility of counting below zero. If the MQC is storing a zero count ($\overline{Q}_4$, $\overline{Q}_3$, $\overline{Q}_2$, and $\overline{Q}_1$) then a time *t*1B, provided the (61) signal is still present, gates 23–15, and 23–19 will pass low level signals into the Step Down circuits of FIGURE 23B. In response thereto the Step Down will generate the $N_5$, $N_{1B}$, and $N_1$ signals which will be transmitted to the counters of FIGURE 23A whereby the MQC will be jammed to a count indicative of "one below zero." The count of "one below zero" will be represented by $\overline{Q}_4$, $Q_3$, $Q_2$ and $\overline{Q}_1$ signals of the MQC.

IER–OR CIRCUITS—FIGURE 24

Referring now to FIGURE 24 there is shown at 24–24A, 24–2C and 24–24B respectively the OR Flip Flop, the IER Flip Flop and the Buffing Circuit which produces an output in response to either the IER or the OR Flip Flops.

The signals generated by the elements shown at 24–24A to 24–24C are employed only during certain steps of the multiplication and division orders. In particular signals from the OR Flip Flop are employed during the second step ($D_2$) of the divide operation; signals from the IER Flip Flop are employed during the second step ($M_2$) of the multiplication order; and the signal (IER–OR) from the Buffer Circuit shown at 24–24B is used during the second and third steps ($D_2$ and $D_3$) of the division order and during the second step ($M_2$) of the multiplication order.

The OR Flip Flop shown at 24–24A, comprises an amplifier 24–8 and a complementer 24–9 connected together at their inputs, wherein, the output of complementer 24–9 is connected to the input of recirculation gate 24–10 which in turn is connected at its output to the input of recirculation complementer 24–11. The output of complementer 24–11 is connected via buffer 24–7 to the input of elements 24–8 and 24–9, so that there is a feed back loop from the output of complementer 24–9 back to its input. A high level signal applied to the common input of the aforementioned elements 24–8 and 24–9 causes amplifier 24–8 to produce a high level signal at its output marked OR+ and causes complementer 24–9 to produce a low level signal at its output marked OR so that the OR Flip Flop is by convention producing OR+ and OR signals simultaneously. Low level outputs from complementer 24–9 will be fed through recirculation gate 24–10 to the input of recirculation complementer 24–11 causing the latter complementer to produce a high level signal which is applied via buffer 24–7 to the common input of amplifier 24–8 and complementer 24–9. Complementer 24–11 produces the ORA+ signal and by convention this signal is present when complementer 24–11 is producing high level outputs. The recirculation of the output signal from complementer 24–9 back to its input via elements 24–10, 24–11 and 24–7 will cause the OR Flip Flop to continue to produce OR+, OR, and ORA+ signals.

It will be observed that recirculation gate 24–10 has an input from the *t*11B+ output of the Cycling Unit (FIGURE 34) and it will be appreciated that the *t*11B+ output is normally at a low level from time *t*0B to time *t*10B. Therefore, low level output pulses from complementer 24–9 will pass through recirculation gate 24–10 until the *t*11B+ signal is generated by the Cycling Unit. When the *t*11B+ signal is generated, low level output signals from complementer 24–9 will not pass through recirculation gate 24–10 and a high level signal from the *t*11B+ output of the Cycling Unit will be presented via gate 24–10 to complementer 24–11 which in turn will produce a low level output signal. This low level output signal will be applied via buffer 24–7 to the common input of elements 24–8 and 24–9 whereby amplifier 24–8 will produce a low level signal at its output and complementer 24–9 will produce a high level signal at its output and by convention the OR Flip-Flops is not producing the OR+ or the OR signals. High level outputs from complementer 24–9 will be fed through recirculation gate 24–10 to the input of complementer 24–11 causing the latter complementer to produce a low level signal at its output thereby removing the ORA+ signal.

Due to the one-half pulse period delay encountered in the amplifiers and complementers comprising the OR Flip-Flops the effect of the *t*11B+ signal at buffer 24–10 will not be realized until time *t*0B at the output of paired elements 24–8 and 24–9 and at time *t*0A at the output of complementer 24–11.

The common inputs of amplifier 24–8 and complementer 24–9 are additionally connected through buffer 24–7 to the output of complementer 24–4 and the output of complementer 24–5; wherein said complementers are in turn connected at their inputs to the outputs of gates 24–1 and 24–2 respectively.

Gate 24–1 has 7 inputs connected thereto which are as follows: the (31) output line from the Control Encoder; the C and A outputs from the Comparator (FIGURE 17); the $\overline{\text{OF}}$ output of the Overflow Flip-Flop (FIGURE 22); the $S_3$ and $S_4$ outputs of the Subtrahend Buffer (FIGURE 19) and the *t*11B– of the output of the Cycling Unit (FIGURE 34). When all the inputs to gate 24–1 are at a low level complementer 24–4 will produce, after its inherent delay period, a high level signal which will be applied to the input of buffer 24–7 and is transmitted therethrough, nothwithstanding the level of the signals on the other inputs of buffer 24–7, to the common inputs of complementer 24–9 and complementer 24–8. The high level signal applied to the common inputs of elements of 24–9 and 24–8 in response to a coincidence of low level signals at the input of gate 24–1 will produce, as previously described, the OR+, OR and ORA+ signals.

Since gate 24–1 is connected to the *t*11B– output of the Cycling Unit and to the 31 output line of Control Encoder, all the signals at the input of the aforementioned gate may only be at a low level at time *t*11B during a particular phase ($D_2$) of the division operation. Because of the inherent delay encountered in complementer 24–4 and the other complementer and amplifier in the OR Flip-Flop, the OR+ and the OR signals will be established at time *t*0B and the ORA+ signal will be established at time *t*1A in response to the output from gate 24–1.

Gate 24–2 is connected to the 15 signal line of the Control Encoder and to the *t*11B– output of the Cycling Unit. The two inputs to gate 24–2 will simultaneously be at a low level at time *t*11B during the 1st step or $D_1$ portion of the divide operation. When this condition occurs gate 24–2 will transmit a low level signal to the input of complementer 24–5 which in turn will produce, after a one-half pulse period delay a high level output signal which is applied via gate 24–7 to the common inputs of elements 24–8 and 24–9 causing the OR+ and OR signals to be established at time *t*0B and the ORA+ signal to be established at time *t*1A.

By way of summarizing, it may be stated the OR and OR+ signals are established at time *t*0B and the ORA+ signal is established at time *t*1A of a given minor cycle; and the OR and OR+ signals are removed at time *t*0B and ORA+ signal is removed at time *t*0A of the next minor cycle by the *t*11B+ output of the Cycling Unit which is applied to gate 24–10. It therefore may be noted that the OR and OR+ signals are present for one minor cycle and the ORA+ signal is present for $^{11}/_{12}$ of a minor cycle.

The IER Flip-Flop shown at 24–24C, comprises an amplifier 24–20 and complementer 24–18 connected together at their inputs, wherein the output of complementer 24–18 is connected to the input of recirculation of gate 24–21 which in turn is connected at its output to the input of recirculation complementer 24–22. The output of complementer 24–22 is connected via buffer 24–19 to the input of elements 24–18 and 24–20 so that there is a feed back loop from the output of complementer 24–18 back to its input. A high level signal applied to the common input of the aforementioned elements 24–18 and 24–20 causes amplifier 24–20 to produce a high level signal at its output marked IER+, and causes complementer 24–18 to produce a low level signal at its output marked IER so that the IER Flip-Flop is by Convention producing IER+ and IER signals simultaneously. Low level outputs from complementer 24–18 will be fed through recirculation gate 24–21 to the input of recirculation complementer 24–22 causing the latter complementer to produce a high level signal which is applied via buffer 24–19 to the common input of amplifier 24–20 and complementer 24–18. It will be observed that complementer 24–22 produced the $IERA_{2+}$ signal and by convention this signal is present when complementer 24–22 is producing high level outputs.

It will be observed that recirculation gate 24–21 has an input from the *t*11B+ output of the Cycling Unit (FIGURE 34) and it will be appreciated that the *t*11B+ output is normally at a low level from time *t*0B to time *t*10B. Therefore, low level output pulses from complementer 24–18 will pass through recirculation gate 24–21 until the *t*11B+ signal is generated by the Cycling Unit. When the *t*11B+ signal is generated, low level output signals from complementer 24–18 will not pass through recirculation gate 24–21 and a high level signal from the *t*11B+ output of the Cycling Unit will be presented to complementer 24–22 which in turn will produce a low level output signal. This low level output signal will be applied via buffer 24–19 to the common input of elements 24–18 and 24–20; whereby amplifier 24–20 will produce a low level signal at its output and complementer 24–18 will produce a high level signal at its output and by convention the IER Flip-Flop is neither producing the IER or the IER+ signals. High level outputs from complementer 24–18 will be fed through recirculation gate 24–21 to the input of complementer 24–22 causing the latter complementer to produce a low level signal at its output thereby removing the $IERA_{2+}$ signal. Thus when the IER Flip-Flop is in this state it will be cleared, and will not produce either the IER, IER+ or $IERA_{2+}$ signals. Because of the one-half pulse period delay encountered in the amplifiers and complementers comprising the IER Flip-Flop the effect of the *t*11B+ signal at gate 24–21 will not be realized until time *t*0B at the output of paired elements 24–18 and 24–20 and at time *t*0A at the output of complementer 24–22.

The common inputs of amplifier 24–20 and complementer 24–18 are additionally connected through buffer 24–17 to the output of complementer 24–6 wherein said complementer is in turn connected at its input to the output of gate 24–3. Gate 24–3 has ten inputs connected thereto which are as follows: the $\overline{Q}_4$, $\overline{Q}_3$, $\overline{Q}_2$ and $\overline{Q}_1$ of the MQC (FIGURE 23), the $STR_2$, $STR_3$, $STR_4$, $STR_5$ and $STR_6$ outputs of the Static Register (FIGURE 25) and the *t*11B− output of the Cycling Unit (FIGURE 34). When all the inputs to gate 24–3 are at a low level complementer 24–6 will produce, after its inherent delay period, a high level signal which will be applied to the input of buffer 24–17 and transmitted therethrough to the common inputs of complementer 24–18 and amplifier 24–20. The high level signal applied to the common inputs of elements 24–20 and 24–18 in response to a coincidence of low level signals at the inputs of gate 24–3 will produce as previously described the IER, the IER+ and $IERA_{2+}$ signals.

The high level output of complementer 24–6 is designated as the $IERA_{1+}$ signal and is selectively produced for only a half pulse period at time T0A.

As shall be shown in the explanation of the multiplication order, the inputs to gate 24–3 will be simultaneously at a low level at a time *t*11B when the MQC is storing a count of zero and the static register output has been shifted to indicate that the second step ($M_2$) of the multiplication order is to commence. Therefore, due to the inherent delay encountered in complementer 24–6 and the complementers and amplifiers comprising the IER Flip-Flop, the $IERA_{1+}$ signal will be generated for one-half pulse time at time T0A; the IER and IER+ signals will be established at time *t*0B and the $IERA_{2+}$ signal will be established at time *t*1A.

By way of summarizing, it may be stated the IER and IER+ signals are established at time T0B and the $IERA_{2+}$ signal is established at time *t*1A of a given minor cycle; and the IER and IER+ signals are removed at time T0B and $IERA_{2+}$ signal is removed at time *t*0A of the next minor cycle by the *t*11+ output of the Cycling Unit which is applied to gate 24–21. Further the $IERA_{1+}$ lasts only one-half pulse period and is generated at time *t*0A. The IER and IER+ signals are present for one minor cycle whereas the $IERA_{2+}$ signal is present for 11/12 of a minor cycle.

The buffing circuit shown at 24B which produces the IER–OR signal comprises a complementer 24–14 which is connected at its input to the output of buffer 24–13. Buffer 24–13 is connected at its input to the 32A output of $D_3$ Flip-Flop (FIGURE 25); the output of complementer 24–11 which produces the ORA+ signal; the output of complementer 24–5; and the output of complementer 24–15. Complementer 24–15 is connected at its input to the output of gate 24–16 which is in turn driven by the *t*0B− output of Cycling Unit and the IER output of the IER Flip-Flop. When any of the signals applied to buffer 24–13 is at a high level complementer 24–14 will produce after its inherent delay period a low level signal which is designated as the IER–OR signal.

The (32A) signal from the $D_3$ Flip-Flop and ORA+ signal are generated for a minor cycle and 11/12 of a minor cycle respectively and thus the IER–OR signal produced in response to the application of either the (32A) or the ORA+ signal will last one minor cycle or 11/12 of a minor cycle. A high level signal produced by complementer 24–5 or complementer 24–15 in response to a coincidence of low level signals applied to gates 24–2 or 24–16 respectively will only last for one-half pulse period; therefore, the IER–OR signal produced in response to the high level output from either complementer 24–5 or 24–15 will only last a half pulse period. By observing the timing signals on gates 24–2 and 24–16 it will be appreciated that the IER–OR signal will be generated at times *t*0B and *t*1B respectively in response to the outputs of the latter two gates.

CYCLING UNIT ERROR FLIP-FLOP—FIGURE 33B

Referring now to FIGURE 33B there is shown the Cycling Unit Error Flip-Flop and its associated input circuitry which detects the presence of an improperly generated timing sentinel. It will be recalled that the timing sentinel is pre-recorded in the P8 digit position of every word on the Time Selection Band of the Rotating Drum Memory (FIGURE 35), and that in response to each timing sentinel the Timing Read Circuits 32A produce TS4, TS3, $\overline{TS2}$, and TS1 signals. Further it will be recalled that the aforementioned TS signals are applied to gate 34–1 of the Cycling Unit (FIGURE 34) so that the Cycling Unit will be synchronized with the movement of the Rotating Drum Memory (FIGURE 35). For the Cycling Unit to function properly, the TS signals which are representative of the timing sentinel must be applied to the input gate 34–1 of the Cycling Unit (FIGURE 34) at time *t*7B+, and *at no other time*.

The apparatus shown on FIGURE 33B detects a condition wherein the timing sentinel signals are generated at an improper time or a condition wherein signals produced when the timing sentinel should be generated are not indicative of the timing sentinel. If the TS signals which are indicative of the timing sentinel are not generated at the proper time the Cycling Unit Error Flip-Flop will generate a high level CUE signal which will be applied to the stop line 32–43 (FIGURF 32) causing the Stop Flip-Flop to be set so as to produce low level SP signals and high level $\overline{SP}$ signals whereby the Instruction Decoder (FIGURE 26) will be inhibited.

The Cycling Unit Error Flip-Flop comprises a complementer 33–38 which produces high level CUE signals. This complementer is connected in a closed ring configuration to one input of a buffer 33–36 which is in turn connected at its output to the input of a complementer 33–37, and complementer 33–37 is connected via recirculation gate 33–30 to the input of complementer 33–38 so that there is a recirculation loop from the cutput of complementer 33–38 back to its input. A high level signal applied to the input of buffer 33–36 will cause complementer 33–37 to produce, after its inherent delay period, a low level signal which will be transmitted through gate 33–30 to the input of complementer 33–38 which in turn will produce, after its delay period, a high level CUE period. This high level CUE signal will be re-applied to buffer 33–36 whereby the Cycling Unit Error Flip-Flop will continue to produce high level CUE signals at the output of complementer 33–38.

It will be observed that recirculation gate 33–30 has one input connected to the ST output of the circuits shown on FIGURE 32B. This ST output is normally maintained at a low level so that if once the Cycling Unit Error Flip-Flop is set to produce CUE signals it will continue to produce high level outputs at the output of complementer 33–38 until the ST input to recirculation gate 33–30 is raised to a high level. When this occurs gate 33–30 will transmit a high level signal to the input of complementer 33–38 which will in turn produce a low level signal, indicating the removal of the CUE output. The low level output of complementer 38–30 will be transmitted through buffer 33–36 if the remaining input to buffer 33–36 is also maintained at a low level. The low level signal transmitted through the aforementioned buffer causes complementer 33–37 to produce a high level signal which will be applied to the input of complementer 33–38 via gate 33–30, whereby the CUE Flip-Flop will be caused to continue to produce low level signals at the output of complementer 33–38.

Buffer 33–36 is connected at its remaining input to the outputs of complementer 33–31 through 33–35 which are in turn connected at their inputs to the outputs of gates 33–25 to 33–29 respectively. Gate 33–25 is connected at its input to the TS1, $\overline{\textbf{TS2}}$, TS3, TS4 outputs of the timing read circuit 32A and to the *t*7B+ output of the Cycling Unit, FIGURE 34. It will be appreciated that the *t*7B+ output of the Cycling Unit will be at a low level at all times except time *t*7B; and therefore if the TS1, $\overline{\textbf{TS2}}$, TS3 and TS4 signals indicative of a timing sentinel should be generated at some time other than *t*7B gate 33–25 will transmit a low level signal to complementer 33–31 which will produce a high level signal at the input of buffer 33–36. As previously explained a high level signal at the input of this buffer will cause the Cycling Unit Error Flip-Flop to be set to a condition where high level CUE signals are produced at the output of complementer 33–38.

Gates 33–26 to 33–29 are all connected at one of their inputs to the *t*7B– output of the Cycling Unit and are connected to the $\overline{\textbf{TS1}}$, TS2, $\overline{\textbf{TS3}}$ and $\overline{\textbf{TS4}}$ outputs respectively in the timing read circuit 32A. Since the timing sentinel is represented by TS1, $\overline{\textbf{TS2}}$, TS3 and TS4 signals, at time *t*7B if any of the indicated signals applied to gates 33–26 to 33–29 are generated, an error will be noted. Accordingly, if one of the gates 33–26 to 33–29 receives a coincidence of low level signals at time *t*7B–, it will transmit a low level signal to its associated complementer which will produce a high level signal after a half-pulse period delay. This high level signal will be applied to the input of buffer 33–36 whereby the Cycling Unit Error Flip-Flop will be again set to a condition where high level CUE signals are produced.

EVERY OTHER WORD FLIP-FLOP—FIGURE 33A

Referring now to FIGURE 33A there is shown the Every Other Word Flip-Flop circuit. This circuit produces a low level EW signal which is one minor cycle in duration in response to alternate signals applied from the Cycling Unit at time *t*7B. Logically the Every Other Word Flip-Flop circuit may be considered as a binary counter. The EW signal is employed for synchronization purposes and is applied to elements of this machine which receive asynchronously generated input signals.

The Every Other Word Flip-Flop circuit comprises two Flip-Flops wherein each Flip-Flop controls the other. The first of the two Flip-Flops designated as Flip-Flop 33–47 comprises a complementer 33–41 which produces the EW signal. This complementer is connected at its output via isolating buffer 33–45 and line 33–46 to the input of complementer 33–42 and to the input of amplifier 33–44 of the second Flip-Flop to be described. The output of complementer 33–42 is connected via recirculation gate 33–39 to the input of complementer 33–41 so that there is a feed back loop from the output of complementer 33–41 back to its own input.

The second Flip-Flop of the Every Other Word circuit designated as Flip-Flop 33–48 comprises a complementer 33–43 connected at its output to the input of an amplifier 33–44 which is in turn connected at its output via recirculation gate 33–40 to the input of complementer 33–43, so that again there is a feed-back loop from the output of complementer 33–43 back to its own input. In addition, the output of complementer 33–43 is connected via line 33–46 to the input of complementer 33–42 of the first described Flip-Flop. Recirculation gates 33–39 and 33–40 of both Flip-Flops are additionally connected respectively to the *t*7B+ and *t*7B– outputs of the Cycling Unit.

Since line 33–46 is connected to the inputs of both complementer 33–42 and amplifier 33–44 it will be appreciated that the potential on line 33–46 will control the pulses that are recirculating in each of the two Flip-Flops 33–47 and 33–48. Assuming that the signal on line 33–46 is at a high level at time *t*8A then complementer 33–42 will produce a low level signal at time *t*8B which will be transmitted through gate 33–39. Since the Cycling Unit signal applied to gate 33–39 is at a low level at all times except at time *t*7B, low level output signals from complementer 33–42 generated at any time except time *t*7B will be transmitted through gate 33–39. The low level signal transmitted through gate 33–39 will be applied to complementer 33–41 which will produce a high level signal back on line 33–46 at time *t*9A.

The high level output of complementer 33–41 also indicates that the EW signal is *not* present.

The assumed initialed high level signal on line 33–46 at time *t*8A will also be transmitted through amplifier 33–44 at time *t*8B to the input of gate 33–40. This high level signal will be transmitted through the aforementioned gate to the input of complementer 33–43 which will attempt to produce a low level signal at time *t*9A on the line 33–46. However, the high level output from complementer 33–41 produced at time *t*9A will prevail on line 33–46. Thus until stimulus is applied to recirculation gates 33–39 and 33–40 the signal appearing at the EW output of complementer 33–41 of the first described flip-flop will be at a high level, and the signals appearing at the outputs of elements 33–42 and 33–44 will be at low and high levels respectively.

At time *t*7B there will be applied to gates 33–39 and 33–40 a high and a low level signal, respectively, from the Cycling Unit (FIG. 34). The high level signal applied to recirculation gate 33–39 will be transmitted therethrough causing complementer 33–41 to produce a low level signal at its output at time *t*8A which is indicative of the EW signal, and will be applied via buffer 33–45 to line 33–46.

The low level *t*7B− signal applied from the Cycling Unit (FIG. 34) to gate 33–40 will not be transmitted therethrough since the output of amplifier 33–44 which also drives gate 33–40 is at a high level. Accordingly, complementer 33–43 will receive, at time *t*7B, a high level signal and in response thereto will produce a low level signal on line 33–46 at time *t*8A. Since complementers 33–41 and 33–43 are both producing low level signals at time *t*8A, the potential on line 33–46 will be at a low level. Therefore, complementer 33–42, which is connected to line 33–46, will produce a high level signal at time *t*8B. This high level signal will be transmitted through gate 33–39 to the input of complementer 33–41 which will produce in response thereto a low level EW signal at time *t*9A.

The low level signal appearing on line 33–46 at time *t*8A will also be applied through amplifier 33–44 at time *t*8B to the input of gate 33–40. Since the Cycling Unit signal applied to gate 33–40 is a high level signal at all times except at time *t*7B, low level output signals from amplifier 33–44 generated at all times except time *t*7B will *not* be transmitted. Accordingly, complementer 33–43 will receive a high level signal input and again produce a low level signal on line 33–46 at time *t*9A. Thus until new stimulus is applied to recirculation gates 33–39 and 33–40 the signal appearing at the EW output of complementer 33–41 will be at a low level, and the signals appearing at the outputs of elements 33–42 and 33–44 will be at high and low levels respectively.

One word time later a *t*7B+ signal will be applied to recirculation gate 33–39 of the Flip-Flop 33–47 and a *t*7B− signal will be applied to recirculation gate 33–40 of Flip-Flop 33–48. The high level *t*7B+ signal applied to gate 33–39 will not change the low level output from complementer 33–41. The *t*7B− signal, however, applied to recirculation gate 33–40 will be coincident with a low level output from amplifier 33–44 and will thereby cause complementer 33–43 to produce a high level output on line 33–46 at time *t*8A. This high level signal will recirculate through complementer 33–42, gate 33–39 and complementer 33–41 to maintain the EW output high, thereby indicating the removal of the EW signal. This condition prevails until at time *t*7 of the next minor cycle when the *t*7B+ and *t*7B− timing signals applied to gates 33–39 and 33–40 operate as described to set the circuit to its low level EW state. Thus the EW signal is produced on alternate (every other) minor cycles.

START STOP CIRCUITS—FIGURE 32B

Refer now to FIGURE 32B which illustrates the Synchronizing-Start Flip-Flop 32–42 and the Stop Flip-Flop 32–41.

It will be recalled that Stop Flip-Flop 32–41 generates the $\overline{SP}$ signals, which control certain of the output lines of the Instruction Decoder (FIGURE 26). When $\overline{SP}$ signals are produced by the Stop Flip-Flop 32–41 the aforementioned output lines of the Instruction Decoder (FIG. 26) are permitted to produce output signals. However, when $\overline{SP}$ signals are not being produced, the aforementioned output lines of the Instruction Decoder (FIGURE 26) will be inhibited, and as a consequence, the Instruction Decoder (FIGURE 26) will be prevented from generating control signals and the computer will be unable to perform instructions.

The Stop Flip-Flop 32–41 comprises an amplifier 32–26, which produces $\overline{SP}$ signals, and a complementer 32–24, which produces SP signals, wherein the input of amplifier 31–26 is connected to the output of buffer 32–25. Buffer 32–25 in turn is connected at its inputs to the output of recirculation complementer 32–23 and to the stop line 32–43. The output of recirculation complementer 32–23 and the stop line 43 are also connected to the input of complementer 31–24; and the input of recirculation complementer 32–23 is connected to the output of recirculation gate 32–22. Recirculation gate 32–22 is connected at one of its inputs to the output of complementer 32–24 so that the output signals from complementer 32–24 may be fed back to its own input via gate 32–22 and complementer 32–23, and may be transmitted to the input of amplifier 32–26 via gate 32–22, complementer 32–23 and buffer 32–25.

The operation of the Stop Flip-Flop 32–41 will not be set forth in detail since it is similar to many of the Flip-Flop circuits already described in this specification. However, it will be understood that the Stop Flip-Flop 32–41 is a bistable device and when the amplifier 32–26 is producing low level signals at its output, a condition which indicates the presence of $\overline{SP}$ signals, complementer 32–24 will be producing high level signals at its output. Further when the output conditions are reversed it will be appreciated that low level SP signals will be present at the output of complementer 32–24 while high level signals will be present at the output of amplifier 32–26.

Additionally, it will be understood that a high level signal applied simultaneously to the inputs of elements 32–26 and 32–24 will cause the Stop Flip-Flop 32–41 to produce low level SP signals and that a low level signal applied simultaneously to the inputs of the latter two elements causes the Stop Flip-Flop 32–41 to produce low level $\overline{SP}$ signals.

It will be observed that the input of amplifier 32–26 is connected via buffer 23–25 to the stop line 32–43 and that the input of complementer 32–24 is also connected to the same line. Consequently, a high level signal on the stop line 32–43 will cause the Stop Flip-Flop 32–41 to produce SP signals after the inherent delays in elements 32–24 and 32–26, and a low level signal on the stop line 32–43 will cause $\overline{SP}$ signals to be produced.

The stop line 32–43 is connected to the outputs of complementers 32–23, 32–31, 32–33, 32–35, 32–39, the output of buffer 32–40 and the (43A) signal line of the Instruction Decoder (FIGURE 26). Complementers 32–23, 32–31, 32–33, 32–35 and 32–39 are in turn connected at their inputs to gates 32–22, 32–30, 32–32, 32–34 and 32–38 respectively and buffer 32–40 is connected to the output of complementer 49–8 of the input circuitry shown on FIGURE 49A. In order to expedite the explanation of the various input circuits to the stop line each of the aforementioned gates will be treated separately as follows:

Gate 32–38 is connected at its input to the *t*1B− output of the Cycling Unit (FIGURE 34) and to the output of complementer 32–37 which is in turn connected at its input to the CUE output of the Cycling Unit Error Flip-Flop (FIGURE 33B) via buffer 32–36. The Flip-Flop shown on FIGURE 33B detects the generation of an improperly sequenced timing sentinel from the Time Selection Band (FIGURE 35A), and produces a sustained series of high level CUE signals when improper sequencing occurs. The high level CUE signal will be propagated through buffer 32–36 and complementer 32–37 and appear as low level signals at one input of gate 32–38. At time *t*1B a low level signal will be generated by the Cycling Unit (FIGURE 34) and applied to the remaining input of gate 32–38. In response to a coincidence of low level signals at its inputs, gate 32–38 passes a low level signal to the input of complementer 32–39 which in turn will cause a high level signal to appear on the stop line 32–43.

Gate 32–34 is connected at its inputs to the (2) signal line from Control Encoder (FIGURE 27); the $\beta$E− output of element 52–2 (FIGURE 52A) and the IOS output of IOS Flip-Flop 52–8 (FIGURE 52A).

Element 52–2, which will be described in connection with FIGURE 52, and the IOS Flip-Flop 52–8 may be conditioned to produce low level $\beta$E− signals and low level IOS signals, respectively. The IOS Flip-Flop 52–8 will not be described in detail. However it will be appreciated that this Flip-Flop is a bistable device and may have two inputs and two outputs from which mutually exclusive IOS and $\overline{\text{IOS}}$ low level signals may be transmitted. Therefore when all the signals applied to gate 32–34 are at a low level, complementer 32–35 will be conditioned to produce a high level signal which is applied to the stop line. As shall later be explained gate 32–34 is used when it is desirable to stop the computer after the execution of each instruction.

Figure 52B:
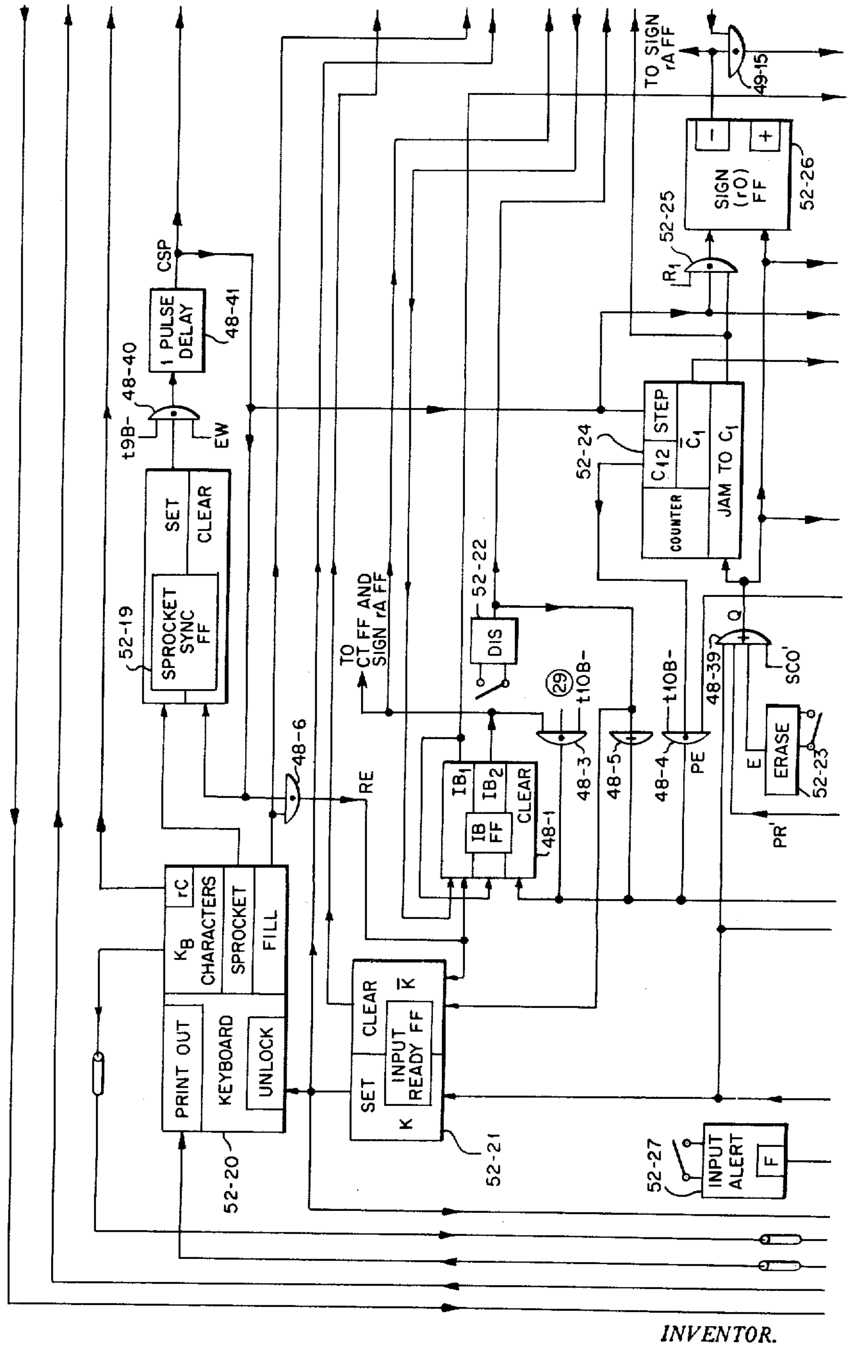
Figure 52C:
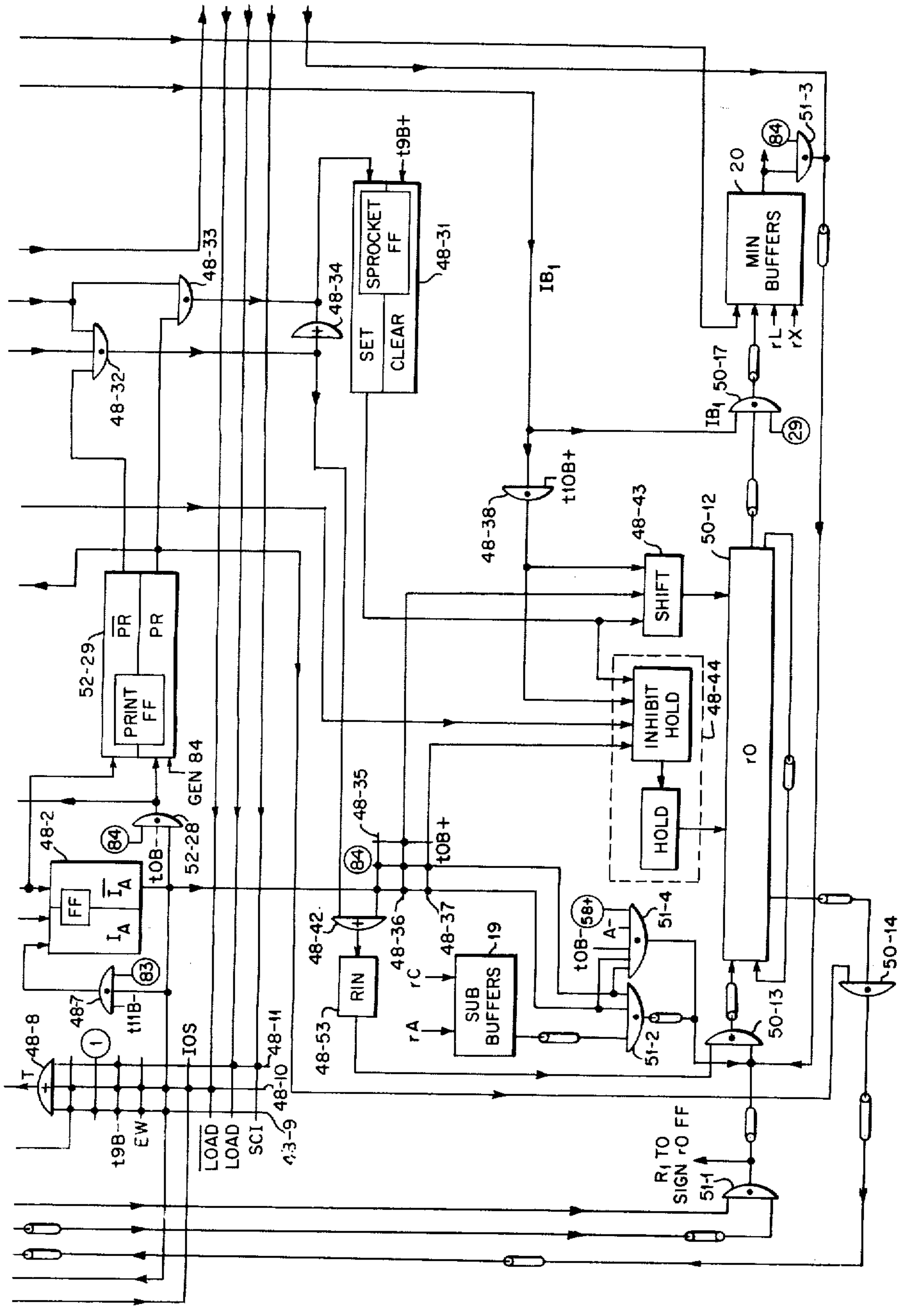
Figure 52D:
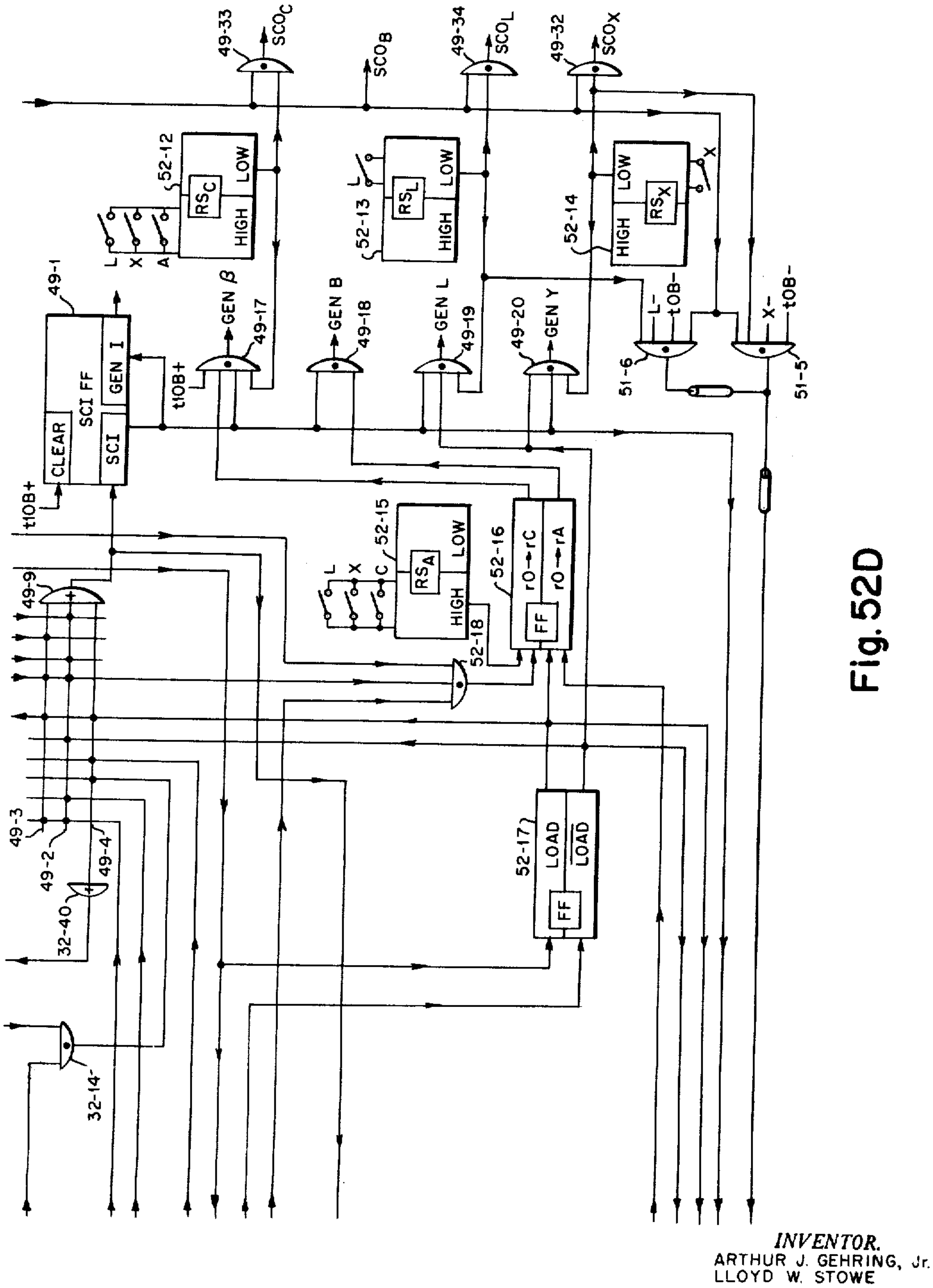

Gate 32–32 is connected at its inputs to the EP1 output of the Ending Pulse Circuits (FIGURE 25) and to the load output of the Load Flip-Flop 52–17 (FIGURE 52D). The Load Flip-Flop 52–17 will not be set forth in detail, but suffice it to say that it is similar to the many Flip-Flops already described and that it has two inputs and two outputs from which mutually exclusive load and $\overline{\text{load}}$ low level signals obtain. Therefore, when the load and EP1 low level signals are both simultaneously present at the inputs to gate 32–32 (a condition which can only occur after an instruction has been executed), complementer 32–33 will be conditioned to produce a high level signal which is applied to the stop line 32–43. Gate 32–32, as should be explained, may be used during the load operation to stop the computer after each instruction required in this operation is executed.

Gate 32–30 is connected at its inputs to the *t*10B− output of the Cycling Unit (FIGURE 34); the output of the QT stop element 52–1 which may produce low level signals; the IOS output of the IOS Flip-Flop 52–8 (FIGURE 52A); one output of the Synchronizing-Start Flip-Flop 32–42 and the $\overline{\text{STR}}$6, STR5, $\overline{\text{STR}}$4, STR2 and $\overline{\text{STR}}$1 outputs of the Static Register (FIGURE 25). The five STR signals are shown as applied from Static Register (FIGURE 25) to gate 32–30 via a cable designated QT STR signals. When all the signals applied to the input of gate 32–30 are at low levels, complementer 32–31 will be conditioned to produce a high level signal on the stop line 32–43. Gate 32–30 may be optionally used, as shall be explained, to stop the computer operation after the execution of each Q or T instruction.

Gate 32–22, which has been described as the recirculation gate for the Stop Flip-Flop 32–41, is connected at its input to the SP output of the Stop Flip-Flop 32–41, the output of complementer 32–15 which is in turn controlled by the Synchronizing-Start Flip-Flops 32–42; and to the output of amplifier 32–29 which is in turn controlled by gate 32–27 via complementer 22–28. Normally complementer 32–15 and amplifier 32–29 produce low level signals at their outputs so that SP output signals from amplifier 32–24 may be fed back to the input of the aforementioned complementer 32–24 via recirculation gate 32–22 and complementer 32–23. However, it will be appreciated that when either amplifier 32–29 or complementer 32–15 produces a high level signal, the SP signal will be prevented from recirculating and that gate 32–22 will pass a high level signal to complementer 32–23. In response to a high level signal complementer 32–23 will produce a low level signal which will be transmitted to the input of amplifier 32–26 via buffer 32–25 and to the input of complementer 32–24, provided the stop line 32–43 is maintained at a low level when complementer 32–23 produces a low level signal. If this condition is maintained the low level output of complementer 32–23 will cause the SP stop Flip-Flop 32–41 to be set to produce $\overline{\text{SP}}$ signals.

By way of summarizing the operation of the input circuits to the Stop Flip-Flop 32–41 just described it may be stated that; when all the input signals to a selected one of the aforelisted gates are at low levels, there will be transmitted a low level signal to the input of the complementer associated with the selected gate. This complementer will in turn produce, after its inherent delay period, a high level signal on the stop line 32–43 whereby the Stop Flip-Flop 32–41 is conditioned to produce SP signals. Further the stop line 32–43 will transmit a high level signal to Flip-Flop 32–41 whenever the (43A) signal is generated by the Instruction Decoder (FIGURE 26) or buffer 32–40 receives a high level signal from the apparatus of FIGURE 49A. Conversely, when one of the input signals to all the gates 32–22, 32–27, 32–30, 32–32, 32–34 and 32–38 is at a high level and buffer 32–40 or (43A) signal line is not transmitting a high level signal, it will be appreciated that stop line 32–43 will transmit a low level signal whereby the Stop Flip-Flop 32–41 will be conditioned to produce $\overline{\text{SP}}$ signals.

There are two input circuits to the Stop Flip-Flop 32–41 yet to be described and both these circuits control at least the recirculation gate 32–22 or Flip-Flop 32–41.

The first input circuit comprises gate 32–27 which is connected at its output to the input of complementer 32–28. Complementer 32–28 is connected at its output to the input of amplifier 32–26 via buffer 32–25 and to the input of amplifier 32–29, the output of which is in turn connected to one input of recirculation gate 32–22. The inputs of gate 32–27 are connected to the (2) output line of the Control Encoder (FIGURE 27) and to the *t*9B− output line of the Cycling Unit (FIGURE 34), so that gate 32–27 will transmit a low level signal to the input of complementer 32–28 at time *t*9B during the $\beta$ cycle of computer operation, i.e. when the (2) signal from the Control Encoder (FIGURE 27) is present. In response to this low level signal at its input, complementer 32–28 produces a high level signal at time *t*10A which is applied to the input of amplifier 32–29 and to the input of amplifier 32–26 via buffer 32–25. Accordingly, amplifier 32–26 will produce a high level signal at its output marked $\overline{\text{SP}}$ at time *t*10B. It will be recalled that the $\overline{\text{SP}}$ output of the Stop Flip-Flop 32–41 is connected to the Instruction Decoder (FIGURE 26) and that it was desirable to inhibit certain outputs of the Instruction Decoder at time *t*10B during the $\beta$ cycle. The high level signal produced by amplifier 32–26 (indicating the removal of the $\overline{\text{SP}}$ signal) will, as previously described, inhibit particular outputs of the Instruction Decoder for one-half pulse period at time *t*10B during the $\beta$ cycle of computer operation.

The high level output of complementer 32–28 produced at time *t*10A will also be propagated through amplifier 32–29 (at time *t*10B) to one input of recirculation gate 32–22. As previously described gate 32–22 will transmit a high level signal to the input of amplifier 32–23 which in turn will produce a low level signal on the Stop line 32–43 at time *t*11A. This low level signal on the Stop line 32–43 will cause the Stop Flip-Flop 32–41 to produce $\overline{\text{SP}}$ signals, beginning at time *t*11B.

The remaining input circuit to the Stop Flip-Flop 32–41 comprises Synchronizing-Start Flip-Flops 32–42, gate 32–13 and complementer 32–15 which is connected at its output to one input of recirculating gate 32–22. The Synchronizing-Start Flip-Flops at 32–42, as the name implies, comprises two Flip-Flops connected in series. The function of these two Flip-Flops comprising circuit 32–42 is to accept a randomly generated start pulse and synchronize it with the operation of the machine. Such a pulse is generated when the start switch 32–6 is closed, causing single pulse device 7, which may be differentiator circuit; to produce one high level output pulse. This high level pulse is applied to the first of two Flip-Flops in element 32–42 which comprises amplifier 32–8 recirculation gate 32–20 and complementer 32–21 connected in a closed ring configuration. In particular the high level output signal produced by single pulse device 7 is applied to the input of complementer 32–8, which produces, after its inherent delay period, a low level signal. This low level signal will be transmitted via recirculation gate 32–20 (provided the remaining input in this gate is maintained at a low level) to the input of complementer 32–21 which in turn produces after its inherent delay a high level signal at the input of complementer 32–8, whereby complementer 32–8 will continue to produce low level output signals. The low level output signals from complementer 32–8 are applied to gate 32–9, which acts as input circuit for the second Flip-Flop in element 32–42. It will be observed that gate 32–9 is also connected at its input to the *t*10A– output of the Cycling Unit (FIGURE 34) and the EW output of the Every Other Word Flip-Flop (FIGURE 33A). It will be appreciated, therefore, that the output of complementer 32–8 in the first Flip-Flop of element 32–42 may not be transmitted via gate 32–9 until time *t*10A and the EW signal is generated. As will be shown the EW signal last for one word time and is generated every other computer word period. Thus the pulse produced by single pulse device 7 may be caused to recirculate through elements 32–8, 32–20 and 32–21 for a period up to two minor cycles before it may be transmitted through gate 32–9. The reason for this is that the single pulse produced by element 32–7 may occur partially or entirely during the power pulse period for complementer 32–8. If the high level output of element 32–7 is applied coincident with the positive portion of the power pulse period of complementer 32–8 then complementer 32–8 will react as if it received no input or a low level input signal. However, if output of element 32–7, is applied partially during the positive portion of the power pulse period of complementer 32–8 the resulting output from the aforementioned complementer would lie between a low level output and a high level output signal. Accordingly, the output pulse of single pulse device 32–7 is allowed to recirculate through elements 32–8, 32–20 and 32–21, before being transferred to the next stage of the computer. During the recirculation period the output pulses of the elements in the first Flip-Flop will become stabilized so that they are producing either high or low level signals. If the high level pulse produced by single pulse device 32–7 causes complementer 32–8 to produce low level signals, then at time *t*10A, provided the EW signal is present, gate 32–9 will transmit a low level signal to the input of complementer 32–10 which will produce in response thereto a high level signal at time *t*10B. It will be appreciated that since the start bar 32–6 may be actuated at any time, complementer 32–8 may produce its first output pulse at time *t*10A when the EW is present, causing gate 32–9 to transmit a pulse which has an amplitude between a high and low level. Accordingly another synchronizing stage or Flip-Flop may be desirable. The second Flip-Flop synchronizing stage comprises buffer 32–11 connected at one of its inputs to output of complementer 32–10, complementer 32–12, recirculation gate 32–18 and complementer 32–19 connected in a closed ring configuration similar to many of the Flip-Flops already described. A high level signal applied to buffer 32–11 causes complementer 32–12 to produce low level output signals which will be recirculated around the closed ring just described. Again the input pulse applied to the second Flip-Flop is allowed to recirculate before it is transmitted to the next stage in the computer. The reason for this recirculation is similar to that described in connection with first Flip-Flop of element 32–42, since the signal transmitted through gate 32–9 at time *t*10A may not have been stabilized.

Complementer 32–12 of the second Flip-Flop in element 32–42 is connected at its output to the input gates 32–13 and 32–14. These gates 32–13 and 32–14 are also connected to the EW output of the Every Other Word Flip-Flop and the *t*10A– output of the Cycling Unit FIGURE 34. Further gate 32–14 is connected to the $\overline{\text{K}}$ output of the Input Ready Flip-Flop 52–21. Since these latter two gates 32–13 and 32–14 are conditioned by the *t*10A– signal and EW signal, which occurs every other word time, it will be appreciated that input pulse to the second Flip-Flop will recirculate for two word times before it may be transmitted through either or both gates 32–13 and 32–14.

A low signal transmitted through gate 32–13 at time *t*10A will be applied to the input of complementer 32–15 which will produce a high level signal at the input of gate 32–22 at time *t*10B. A high level signal applied to gate 32–22 will in a manner previously described cause the Stop Flip-Flop 41 to produce $\overline{\text{SP}}$ signals which allow the Instruction Decoder (FIGURE 26) to function. It will be appreciated that the high level output of complementer 32–15 produced at time *t*10B will not cause the $\overline{\text{SP}}$ signal to be produced by the Stop Flip-Flop 41 until time *t*11B.

The high level output signal of complementer 32–15 at time *t*10B– is designated as the ST signal and is applied to the Cycling Unit Error Flip-Flop FIGURE 33B to reset the latter circuit. In addition the high output of complementer 32–15 is applied to the input of amplifier 32–17, causing this amplifier to produce a high level signal at its output. The output of amplifier 32–17 is applied to one input of recirculation gate 32–20 in the first Flip-Flop and to one input of recirculation gate 32–18 in the second Flip-Flop of element 32–42. It will be appreciated that one pulse period after the recirculation gates of these aforementioned Flip-Flops receive high level inputs complementers 32–8 and 32–12 will produce a sustained series of high level signals, and that complementers 32–8 and 32–12 will not again produce low level signals until after the start switch 32–6 is closed. Further it will be appreciated that after a high level signal is applied to recirculation gate 32–18 (of the second Flip-Flop), complementer 32–19 will produce low level output signals. These low level output signals from complementer 32–19 are applied as conditioning signals to the QT stop gate 32–30 which drives the STOP Flip-Flop 32–41.

A low level signal from amplifier 32–12 of the second Flip-Flop in element 32–42 will also pass through gate 32–14 provided all the other inputs to this gate are at a low level (a condition which can only occur at time *t*10A). The output of gate 32–14 is connected to the input of amplifier 32–16 and the low level output of gate 32–14 will be propagated through amplifier 32–16 after a one-half pulse period delay or a time *t*10B. The output signal of amplifier 32–16 is designated as the STL signal and is applied to an input circuit of the Supervisory Control Input (SCI) Flip-Flop (FIGURE 49A).

COMPUTATIONAL OPERATIONS (CO)

Having now described in detail the structure of the various components utilized in the computer, as for example the Comparator, the Adder, the Registers, etc., and having further described the general method of interconnection of these components in FIGURE 10, the detailed manner in which specific computational operations may be carried out will now be described. For ease of understanding and presentation the various operations may be conveniently categorized into two groups and two subgroups, as follows, those operations—

(1) Not involving the memory (no "*m*" address search)
  (a) One execution step K, Q, T, U
  (b) two or more execution steps N, V
(2) Involving the memory (search for "*m*" address necessary)
  (a) One execution step E, P, B, L, Y, X, H
  (b) Two or more execution steps A, S, M, D

*Address selection*

A tabulation of the instructions for the foregoing operations is shown below in Table W:

| Instruction | | | Static Register Flip-Flop States | | | | | |
|---|---|---|---|---|---|---|---|---|
| | Letter | Number | RST6 | STR5 | STR4 | STR3 | STR2 | STR1 |
| Group 1a | K | 07 | 0 | 0 | 0 | 1 | 1 | 0 |
| | Q | 22 | 0 | 1 | 0 | 0 | 1 | 0 |
| | T | 27 | 0 | 1 | 0 | 1 | 1 | 0 |
| | U | 67 | 1 | 0 | 1 | 1 | 1 | 0 |
| Group 1b | N | 32 | 0 | 1 | 1 | 0 | 1 | 0 |
| | V | 37 | 0 | 1 | 1 | 1 | 1 | 0 |
| Group 2a | E | 15 | 0 | 0 | 1 | 1 | 0 | 0 |
| | P | 20 | 0 | 1 | 0 | 0 | 0 | 0 |
| | B | 25 | 0 | 1 | 0 | 1 | 0 | 0 |
| | L | 10 | 0 | 0 | 1 | 0 | 0 | 0 |
| | Y | 05 | 0 | 0 | 0 | 1 | 0 | 0 |
| | H | 60 | 1 | 0 | 1 | 0 | 0 | 0 |
| | X | 65 | 1 | 0 | 1 | 1 | 0 | 0 |
| Group 2b | A | 70 | 1 | 1 | 0 | 0 | 0 | 0 |
| | S | 75 | 1 | 1 | 0 | 1 | 0 | 0 |
| | M | 85 | 1 | 1 | 1 | 1 | 0 | 0 |
| | D | 55 | 1 | 0 | 0 | 1 | 0 | 0 |

The difference between Group 1*a* and Group 1*b* instructions, or between Group 2*a* and 2*b* instructions resides only in the length of time or number of minor cycles required to execute the respective instructions. However, a much more fundamental difference exists between all of the Group 1 instructions and all of the Group 2 instructions. This fundamental difference is that the Group 1 instructions do *not* require a search for an operand stored at a memory location designated by the "*m*" address of the C Register, whereas every Group 2 instruction *does* require such a search. Stated somewhat differently, the Group 2 instructions utilize both addresses ("*m*" and "*c*") of the two address system while the Group 1 instructions require merely one address ("*c*"). Referring to Table W it will be seen that all of the Group 2 instructions are distinguishable from all of the Group 1 instructions by the fact that the decoded instruction numbers of the former group staticized in the Static Register 25 contain zeros in the STR1 and STR2 positions ($\overline{\text{STR1}}$ and $\overline{\text{STR2}}$) while the decoded instruction numbers of the latter group contain a 1 in the STR2 position. The presence of a 1 in the STR2 position prevents the institution of any search while the presence of zeros in the STR1 and STR2 positions requires that a search be performed. The institution of a search depends upon the generation of certain signals from the Control Encoder 27 in response to the receipt of a (1A) high level signal from the Instruction Decoder 26. Reference to gate 26–1A of FIGURE 26 will show that the 1A signal is generated whenever zeros are staticized in the STR1 and STR2 positions of the Static Register 25. That is, the Static Register FFA and FFB are in their $\overline{\text{STR1}}$ and $\overline{\text{STR2}}$ states respectively. The fact that this search will be an "*m*" address or a "*c*" address search is determined by the state of the Control Transfer Flip-Flop 12A (CTFF) which determines what set of output gates from the C Register 13 will be opened. The mechanics of this process will be subsequently made clear in the detailed description of the Address Selection process. At this point it is sufficient to establish the distinction between Group 1 and Group 2 instructions as residing in the fact that the former do not require an "*m*" address search while the latter do so require, and that such requirement is determined by gate 26–1A of the Instruction Decoder 26 from the $\overline{\text{STR1}}$ and $\overline{\text{STR2}}$ signal lines of the decoded instruction number in the Static Register 25.

Address Selection is the name given to the operation of locating a specific desired word on the Memory Drum and of transferring the word when found to some other point or points in the computer. Address Selection is essentially a two phase operation, the first phase constituting a search for the word, and the second phase constituting a transfer of the word when found. The first, or search, phase is always performed in the same way. The second, or transfer, phase however may be either of two types. One type of transfer known as a "β transfer" always follows a search for an instruction word while the other type of transfer known as a "data transfer" always follows a search for a data word. A "β transfer" always transfers a new instruction word from the Memory Drum to the C Register 13 and Static Register 25, and places a digit in the MQC 23. A "data transfer" always transfers a data word between the Memory Drum and some other point in the computer, and may be in either direction as determined by the command portion of the instruction in the Static Register.

Before describing the actual process by which Address Selection is accomplished it will be instructive to first examine the selection scheme. It will be recalled from the detailed description of the Memory Drum, FIGURE 35, that the Drum contains 25 200-word information bands and one timing band, each of which is composed of 4 tracks. It will also be recalled that the timing band and 20 of the information bands (SM bands) are each supplied with a single 4-track Read-Write head (00 Head) while the remaining 5 information bands (FM bands) are each supplied with four 4-track Read-Write heads (00, 01, 10, 11 heads) spaced at 90° intervals around the Drum circumference. It is apparent, therefore, that the 20 SM bands have a maximum latency at 200 word times, whereas the 5 FM bands have a maximum latency of 50 word times. In order to utilize the short latency of the FM bands it is necessary to be able to timely select the quadrature head which the desired information will next pass under. To this end, the selection scheme is based on dividing the 200 words in each band into 4 groups of 50 words each, each group occupying one quadrant of the drum circumference. Provision must also be made to insure that no Read-Write head except the 00 head may be selected for any SM band, since for these bands the 01, 10, and 11 heads do not exist. From the foregoing it is clear then that in order to select a particular word location on the Memory Drum the selection scheme logically must make certain determinations which are as follows:

(a) Which of 25 information bands contains the desired word (Band Selection –BS)

(b) Which word within the band is the desired word (Time Selection –TS)

(c) If the desired word is in an FM band which quadrature head should be selected for minimum latency (Head Selection –HS)

(d) If the desired word is in an SM band and a head other than 00 is selected an error has been made (Head Selection –HS)

It will be recalled from the description of FIGURE 35 that the timing band contains the numbers from "0" to "199" sequentially spaced about the circumference of the Memory Drum at one word intervals, and that the location within a word of the sequence number is in digit position P1, P2 and bit 1 of P3. It is therefore apparent that P1, P2 and bit 1 of P3 from the timing band must be compared for equality with P1, P2 and bit 1 of P3 from the "*c*" address of the instruction word in *r*C or P5, P6 and bit 1 of P7 from the "*m*" address of the instruction word in the *r*C Register to determine when the desired word within a band has been found. Such a determination fulfills the requirement (b), supra, and will hereinafter be referred to as Time Selection (TS). It is also clear that the particular information band containing the desired word must be specified completely by the "*m*" or "*c*" address of the instruction word in the *r*C Register since the address on the timing band of the Memory Drum itself conveys no band location information whatever. The determination of the information band within which the desired word will be found, fulfilling the requirement (a), supra, will hereinafter be referred to as Band Selection (BS), and will be solely determined by the P3 and P4 or P7 and P8 digits of the respective memory address locations "*c*" or "*m*" of the instruction word in the *r*C Register.

As will be subsequently shown, the method of choosing a particular quadrature head involves a comparison using information contained in the bit 4 of P2 and bit 1 of P3 digits of the timing band with the comparable information from the *r*C Register. Finally, in order to determine that an improper head has not been selected, bits 3 and 4 of P4 or P8 out of the *r*C Register must be correlated with the bit 4 of P2 and bit 1 of P3 out of the timing band. This part of the selection scheme will be referred to hereinafter as Head Selection (HS). The selection scheme will be more clearly understood by referring now to Diagram X below:

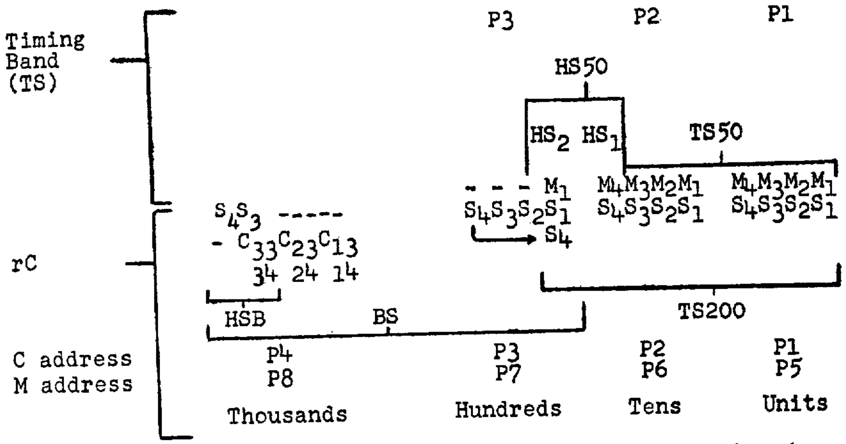

Diagram X is essentially divisible into two parts, that designated "Timing Band" and that designated "*r*C." Consider first that part designated "Timing Band." P1, P2, and P3 correspond to digit positions 1, 2, and 3 of the Timing Band, each digit being composed of 4 bits $M_1$, $M_2$, $M_3$ and $M_4$. The "M" designation indicates that these bits have been read out of the Timing Band and through the Minuend Buffers 20 onto the "M" lines. As previously stated, although all four bits of P1 and P2 from the Timing Band are utilized, only the 1 bit of P3 is used. This is indicated by the presence of a P3, $M_1$ bit, but the absence of the other bits of that digit. These other bits are also present on the "M" lines but, as will be seen, their presence is immaterial to the Address Selection system. Before discussing the meaning of the designations "HS 50" and "TS 50," consider first that part of Diagram X designated "*r*C." The digit positions of the "*c*" and "*m*" addresses of the instruction word in *r*C are indicated respectively P1, P2, P3, P4 and P5, P6, P7, P8. Both groups of digits are shown since the mechanics of Address Selection is the same regardless of which address is being searched for. Hereafter for purposes of explanation it will be assumed that the "*c*" address is being searched for and that therefore the digits P1, P2, P3 and P4 will be treated. However, it should be kept firmly in mind that an "*m*" address might just as readily be the subject of the search. P1, P2, P3 and P4 correspond to the four digits of the instruction word "*c*" address in *r*C, each digit being composed of 4 bits $S_1$, $S_2$, $S_3$, and $S_4$. The "S" designation indicates that these bits have been read out of the C Register 13 and through the Subtrahend Buffers 19 on to the "S" lines. It will be observed that the P4 digit bits are represented by a dual "S" and "C" notation. That is, bits 1 to 3 are designated by $C_{13_{14}}$, $C_{23_{24}}$, $C_{33_{34}}$, and bits 3 and 4 are designated by $S_3$, $S_4$. All of the P4 bits appear on the "S" lines but only the 3 and 4 bits are used, $S_1$ and $S_2$ being superfluous. The "C" notation for the 1 to 3 bits of P4 indicates that these bits are read out of the C Register 13 from the $C_{13}$ etc., output signal lines. $C_{13}$, $C_{23}$ and $C_{33}$ correspond to the signal lines used with the "*m*" address while $C_{14}$, $C_{24}$ and $C_{34}$ correspond to the signal lines used with the "*c*" address. The P4 bits which read out of *r*C and appear on the "S" lines at time *t*4 but are needed at other places at time *t*3. Thus the $C_{13}$ etc. outputs from the *r*C Register permit the P4 bits to be taken from the *r*C Register at time *t*3.

It will be further observed that the digits P1, P2, P3, P4 designate respectively the Units, Tens, Hundreds, Thousands of the memory address sought. The memory location of 10,000 words, words 0000 to 9999, may therefore be specified by the use of a four digit address. For purposes of simplification, however, only a 5000 word memory is illustrated in the preferred embodiment. An additional 5000 words may be added to the memory capacity by using a Memory Drum with 50 bands of 200 words each, or by employing a second Memory Drum of 5000 word capacity. In either event, no new principles are involved in the selection scheme, it only being necessary to supply a pair of "C" output signals for the fourth bit of P4. Such a signal pair, $C_{43_{44}}$, is shown on the detailed diagram of the C Register 13 but is not used herein.

Consider now on Diagram X the designations TS50, HS50, TS200, BS, and HSB. TS50 and HS50, it will be observed, are merely a subdivision of TS200. TS200 refers to Time Selection of 1 of 200 words within any particular band (words 000 to 199). TS50 refers to the selection of 1 of 50 words within a quadrant of a particular band (words 00 to 49), while HS50 specifies a particular quadrature head for a given band. It is apparent therefore that the selection of a 50 word quadrant and a word within that quadrant is the equivalent of selection of a word within the entire 200 word band. As previously discussed this system allows for high speed access from memory bands provided with quadrature heads (FM bands). The designation BS refers to Band Selection, or the particular band within which the word designated by TS200 is to be found. Also as previously discussed and to be subsequently explained in detail, BS is specified solely by the digits of the memory address in *r*C. HSB, a subdivision of BS, involves bits 3 and/or 4 of P4 out of *r*C. Since the present illustrations assumes a 5000 word memory capacity, bit 4 of P4 is always zero or $\bar{S}_4$. Also since it is assumed that the FM bands are represented by words having memory addresses lying between 4000 and 4999, the presence of a "1" in bit 3 of P4 indicates that one of the FM bands contains the word being searched for. If both the $S_3$ and $S_4$ bits of P4 are zero (0) and HS50 calls for a head other than the 00 head then it is clear that an erroneous selection has been made because the presence of zeros in the $S_3$ and $S_4$ bit positions indicates that the desired word has an address below 4000 and is in an SM band, but each SM band is only provided with a 00 head. Means for testing for this condition are provided and will be explained.

Assuming for the time that band selection has been accomplished, return to a consideration of TS200 and the method of selecting a particular word within the selected band. The process of time selection is basically one of testing for a match of information between the sequence number on the "S" lines called for by the memory address out of *r*C and the sequence numbers on the "M" lines being read from the timing band. When this match of information is found it is known that the *next* word on the information band is the desired word and sufficient time remains to energize the proper Read-Write head. In the case of an SM band the proper head must be 00, whereas for an FM band the proper head may be any one of the four quadrature heads. The underlying philosophy of the testing process is that a match of information is presumed and if such match is found not to exist then reading or writing is prohibited for that particular minor cycle, the presumption again being raised at the beginning of the subsequent minor cycle. The match of information for the bits of the TS50 group is tested for by circuits of the comparator (FIGURE 17) and the Time Selection Flip-Flop (FIGURE 12B) and will be described in detail subsequently. The HS50 bits are examined by the comparator (FIGURE 17) and certain special head selection circuits $HS_1$ and $HS_2$ of FIGURE 28, also to be described. The $M_4$ and $S_4$ bits of P2 control the head selection circuits designated as $HS_1$ while the $M_1S_1S_4$ bits of P3 control the head selection circuits designated as $HS_2$. Before, however, describing these circuits it will be beneficial to examine in more detail the process of head selection. The head selection scheme is based upon the binary subtraction of bit 4 of P2 out of rC from bit 4 of P2 out of the timing band ($HS_1$ circuits), and the binary subtraction of bits 1 and 4 of P3 out of *r*C from bit 1 of P3 out of the timing band ($HS_2$ circuits). These bits involved in the subtraction are shown on Diagram X, just described, as the HS50 subdivision of TS200. The result of the subtraction designates the proper head to be selected. In order to clearly understand this process, refer in turn to FIGURE 35C and Tables Y and Z shown subsequently in the specification. Referring first to FIGURE 35C, there is shown a cross-section of an FM band of the Memory Drum 35–10 and the associated four quadrature Read-Write heads 35–6 (00 head), 35–7 (01 head), 35–8 (10 head), 35–9 (11 head). It is seen that these heads are also identified by the respective designations $\overline{HS_2}\,\overline{HS_1}$, $\overline{HS_2}HS_1$, $HS_2\overline{HS_1}$, and $HS_2HS_1$. Further, it will be observed that the zeros of the numerical head designations 00, 01, 10 correspond to $\overline{HS_2}$ or $\overline{HS_1}$ (barred) while the "ones" of the numerical head designations 01, 10, 11 correspond to $HS_2$ or $HS_1$ (unbarred). For example, the zero of the 01 head is designated as $\overline{HS_2}$ and the "one" of the 01 head is designated as $HS_1$. The right hand, or $HS_1$, position of the numerical head designation is obtained from the binary subtraction of the P2 4th bits, and the left hand, or $HS_2$, position is obtained from the binary subtraction of the P3 bits as previously indicated. The cross section of the Memory Drum 35–10 shows that the FM band has been divided into quadrants designated 00, 01, 10, 11 and that these quadrants are established so that sequence numbers 0 to 49 define quadrant 00, sequence numbers 50 to 99 define quadrant 01, sequence numbers 100 to 149 define quadrant 10, and sequence numbers 150 to 199 define quadrant 11. As will be seen the right hand position of the quadrant designations 00, 01, 10, 11, correspond to bit 4 of P2 and the left hand position of these quadrant designations correspond to the binary sum of the 1st and 4th bits of P3 out of *r*C. This quadrant designation will, of course, be the same for *all* bands on the Memory Drum, including the timing band.

In order to understand the significance of the quadrant and head designations 00, 01, 10, 11 illustrated in FIGURE 35C turn now to an examination of Table Y below:

TABLE Y

| | Quadrant First Number | | | Quadrant Last Number | | | |
|---|---|---|---|---|---|---|---|
| Band 1 | P3 | P2 | P1 | P3 | P2 | P1 | |
| 000 | 0 | 0 | 0 | 0 | 4 | 9 | 049 |
| 050 | 0 | 5 | 0 | 0 | 9 | 9 | 099 |
| 100 | 1 | 0 | 0 | 1 | 4 | 9 | 149 |
| 150 | 1 | 5 | 0 | 1 | 9 | 9 | 199 |

| Band 1 | P3 | P2 | P3 | P2 | |
|---|---|---|---|---|---|
| 00 | 000 0 | 0 000 | 000 0 | 0 100 | 04 |
| 05 | 000 0 | 1 000 | 000 0 | 1 100 | 09 |
| 10 | 000 1 | 0 000 | 000 1 | 0 100 | 14 |
| 15 | 000 1 | 1 000 | 000 1 | 1 100 | 19 |

| Band 2 | P3 | P2 |
|---|---|---|
| 200 | 001 0 | 0 000 |
| 250 | 001 0 | 1 000 |
| 300 | 001 1 | 0 000 |
| 350 | 001 1 | 1 000 |

| Band 3 | P3 | P2 | |
|---|---|---|---|
| 400 | 010 0 | 0 000 | |
| 450 | 010 0 | 1 000 | |
| 500 | 1 00 0 | 0 000 | ← |
| 550 | 1 00 0 | 1 000 | |

| Band 6 | P3 | P2 |
|---|---|---|
| 1000 | 000 0 | 0 000 |
| 1050 | 000 0 | 1 000 |
| 1100 | 000 1 | 0 000 |
| 1150 | 000 1 | 1 000 |

Table Y shows five groups of numbers arranged vertically and designated from top to bottom as the P1, P2 and P3 digits from the *r*C Register for selecting Band 1, Band 1, Band 2, Band 3, and Band 6. The "Band" designation refers to bands on the Memory Drum. Examine first the top group designated Band 1. The left-hand column notations 000, 050, 100, and 150 refer to the address of the first word in each of the four quadrants shown on FIGURE 35C while the right hand column refers to the address of the last word in each of the same four quadrants, addresses on the same horizontal line denoting the first and last words in the same quadrant. Additionally, the quadrant first number and last number are shown broken down according to their P1, P2 and P3 digits. It will be immediately apparent that with regard to distinguishing one quadrant from another the information supplied by the P1 digits is useless. P1 is zero for the first word of every quadrant and is 9 for the last word of every quadrant. Therefore, P1 may be ignored. P3 and P2, however, taken together show an ordered change from quadrant to quadrant and are capable of providing quadrant locating information. The ordered change for the P2 and P3 digits for the first words, it is seen, is 00, 05, 10, 15, and for the last words is 04, 09, 14, 19. Examine now the second group from the top, also designated as Band 1. This group is the same as the top Band 1 group except that P1 has been disregarded and P2 and P3 expanded into their four bit bi-quinary code designations. It will be observed that bits 1 to 3 of P2 are all zero for the first word in each quadrant, and that bits 1 and 2 of P2 are zero for the last word in each quadrant. Also bit 3 for the last word in each quadrant is a "1". The significant point is that bits 1 to 3 of P2 for both the first and last words do not change from quadrant to quadrant and therefore convey *no information* useful for quadrant locating. The same condition holds true for bits 2 to 4 of P3, which are all zeros. Examination of bit 4 of P2 and bit 1 of P3 reveals that as one quadrant of a given band succeeds another, these bits show an ordered change as follows, 00, 01, 10, 11, and that this ordered change is *the same* for both the first and last words in a given quadrant. All words within a given quadrant can now be specified as 00, 01, 10 or 11 words and this is illustrated in FIGURE 35C. The necessary quadrant locating information appears to be contained within bit 4 of P2 and bit 1 of P3 and it should not be necessary to examine P2 and P3 in their entirety. This is not completely true, and it will now be shown that the unambiguous designation of a quadrant requires that the 4th bit of P3 out of *r*C must also be considered. Refer now to the group of Table Y designated as Band 2. It is seen that the four quadrants of this band show the same ordered change in bit 4 of P2 and bit 1 of P3 as for Band 1. That is, 00, 01, 10, and 11, as one quadrant succeeds another. However, examination of Band 3 shows a divergence from this pattern to a different pattern of 00, 01, 00, 01, which precludes distinguishing quadrant 1 from quadrant 3, or quadrant 2 from quadrant 4. It will be observed that the discrepancy in this pattern occurs when word 500 is reached and results from the absence of a "one" in the bit 1 of P3 (LSB) position. This situation arises as a result of the bi-quinary code used, that is, a "5" is denoted by a bit in the 4th bit position rather than by bits in the 1st and 3rd bit positions as would be the case in a straight binary code. This occurs because in the bi-quinary code used, the number base shifts from a base of 2 to a combination base of 2 and 5. By a process of quarter adding the 4th and 1st bits of P3 ($S_4$ and $S_1$ out of *r*C) the ordered change seen to exist in Band 1 and Band 2 is maintained. The situation illustrated in Band 3 continues for Bands 4 and 5 (not shown) and then reverts to the condition of Band 1 as Band 6 is reached. At Band 6, reflection will show that the number base has shifted back to 2 and will remain that way until word 1500 in Band 8 is reached, whereupon the condition of Band 3 will again be established. It should also be observed that the process of quarter-adding bits 4 and 1 of P3, regardless of band, can not introduce an error in Bands 1, 2, and their higher numbered counterparts (such as Band 8) because in these bands the 4th bit of P3 is always zero. It will subsequently be seen that the $HS_2$ circuits which operate on the P3 LSB also utilize the P3 4th bit to take into account the situation just described. The quarter-adding process need obviously be applied only to the memory address out of *r*C since the address of words from the timing band can never exceed the number 199 and no number base shift problem exists until word 500 is reached. The significance of the notation 00, 01, 10, and 11 as applied to the quadrants of a memory band and illustrated in FIGURE 35C should now be clear. Referring again to FIGURE 35C it is seen that the quadrants pass any given head in the order 00, 01, 10, 11 and that the words therefore pass the head in a counterclockwise direction from word 000 to word 199. While the quadrants of a band are designated 00, 01, 10, 11 in a clockwise direction, it will be observed that the four quadrature heads are designated 00, 01, 10, 11 in a *counterclockwise* direction. Why this is necessary will now be explained. Referring now to Table Z below there will be observed three horizontal rows of numbers labelled from top to bottom TS(M), *r*C(S), and Head.

The three rows are divided into four groups of numbers separated by vertical double lines. Each group is subdivided into four double columns. The left hand number of each double column of the TS(M) row represents the P3 LSB (1st bit) from the timing band and the right hand number of each double column represents the P2 MSB (4th bit). The left hand number of each double column of the *r*C(S) row represents the quarter-added bits $S_1$ and $S_4$ of P3 out of *r*C, and the right hand column represents the P2 MSB ($S_4$). The significance of using these bits has just been explained in connection with Table Y. As earlier stated the head selection scheme involves the binary subtraction of the above designated *r*C(S) bits from the TS(M) bits. The TS(M) bits designate what quadrant is presently under the 00 head since the timing band is only supplied with a 00 head. The *r*C(S) bits designate in what quadrant the desired word is located. The third row labelled "Head" designates which head the desired word will next pass under. There exist then sixteen possible selection cases which can arise. These are, four cases for each of the following conditions:

(a) The 00 quadrant of the timing band is under the 00 head.

(b) The 01 quadrant of the timing band is under the 00 head.

(c) The 10 quadrant of the timing band is under the 00 head.

(d) The 11 quadrant of the timing band is under the 00 head.

The four cases for each of the above conditions are that the desired word is in quadrant 00, 01, 10, or 11. Table Z shows these sixteen possible selection cases. Group 1 illustrates case (a) above, and Groups 2, 3, and 4 respectively illustrate cases (b), (c), and (d).

Refer to Group 1 and consider the four columns of the group from left to right. Binary subtraction of *r*C from TS yields the following information. If the 00 quadrant of the timing band is under head 00, then a desired word in quadrant:

00 is under the 00 head
01 is under the 11 head
10 is under the 10 head
11 is under the 01 head It should be noted that when substracting the MSB's of P2 it is necessary to borrow from the LSB of P3 ($M_1$ of P3) for two cases in Group 1 (01 and 11 from 00) and for two cases in Group 3 (01 and 11 from 10). Provision is made in the $HS_2$ selection circuits to indicate when a borrow for the $HS_1$ selection was necessary and will be described with those circuits. Referring these results back to FIGURE 35C, which illustrates this case, it is seen that head 35–9 must be designated as the 11 head, head 35–8 must be the 10 head, and head 35–7 must be the 01 head in order that the subtraction scheme yield correct results. Group 2 illustrates the four cases when the 01 quadrant of the timing band is under the 00 head. Reference to FIGURE 35C shows that in such a case the 00 quadrant would be under the 01 head, the 11 quadrant would be under the 10 head, and the 10 quadrant would be under the 11 head. This conforms to the results obtained from Group 2 by binary subtraction. Similarly it will be seen that the results of the subtraction for Groups 3 and 4 are also correct. As an illustration of the shortened access time provided by this head selection system, assume for the moment that the beginning of the 00 quadrant sequence

TABLE Z

| | Group 1 | | | | Group 2 | | | | Group 3 | | | | Group 4 | | | |
|---|---|---|---|---|---|---|---|---|---|---|---|---|---|---|---|---|
| TS(M) | *0†0 | 00 | 00 | 00 | 01 | 01 | 01 | 01 | 10 | 10 | 10 | 10 | 11 | 11 | 11 | 11 |
| rC(S) | 00 | 01 | 10 | 11 | 00 | 01 | 10 | 11 | 00 | 01 | 10 | 11 | 00 | 01 | 10 | 11 |
| Head | 00 | 11 | 10 | 01 | 01 | 00 | 11 | 10 | 10 | 01 | 00 | 11 | 11 | 10 | 01 | 00 |

*P LSB †P2 MSB.

number 000 is under the 00 head. Then it is known that sequence number 050 is under the 11 head, that sequence number 100 is under the 10 head, and that sequence number 150 is under the 01 head. If therefore the word called for by the "C" address out of *r*C is say sequence number 176, then head 01 must be selected to achieve the minimum latency of 26 minor cycles. It must be remembered however that this is only so if sequence number 176 is in an FM band. If sequence number 176 is in an SM band, then head 01 does not exist and provision is made to assure that it cannot be selected. In such a case the computer must wait until sequence number 176 reaches the 00 head (176 minor cycles later). Understanding now the basic philosophy of the Address Selection system turn to an examination of FIGURES 47A, 47B, and 47C arranged as indicated by the inset FIGURE 47 for an understanding of the mechanics of implementing the selection system. Reference should be made also to the detailed diagrams of FIGURES 12, 13, 17, 19, 20, 21, 22, 23, 25, 26, 27, 28, 29, and 35.

Before proceeding with a discussion of the operation depicted by FIGURES 47A through 47C, a few comments concerning the logical symbology used here and in other figures illustrating computer operations should be made. For example, Flip-Flop circuits and other circuits capable of developing either of two outputs signals are shown in block form with the output shown taken from one side of the block and the input shown coming into the other side of the block. A given input will yield the output which is in line with the corresponding input. Gates are shown alternatively as half moon symbols or as a matrix of lines dotted to show signal connections. Cable connections are shown as a single line encircled by a cylindrical sleeve or alternatively as a single line which has been fanned out to show the individual conductors.

Assume that an instruction is being carried out by the computer and that therefore the C Register 13 contains a recirculating instruction word composed of 12 digits as follows:

| P11 | P10P9 | P8P7P6P5 | P4P3P2P1 | P0 |
|---|---|---|---|---|
| SBW | Command | "m" Address | "c" Address | Sign Digit |

The P9 and P10 digits of the instruction word had also been staticized in the Static Register 25 and are controlling the operation being presently performed. The CTFF 12A had been cleared to its $\overline{CT}$ state when the instruction presently being executed was read into the Static Register or when an operand if required by the instruction had been transferred from the memory. The $\overline{CT}$ low level signal alerts band selection gates 28–8, 28–10, and 28–12 and C Register "*c*" Address output gates 13–3. At the conclusion of the instruction being executed an EP signal (ending pulse) is generated by one of the Static Register instruction ending gates 25–14 to 25–17 or 25–35. The EP signal clears the Static Register 25 Flip-Flops A through F to their zero or barred state. As earlier described the presence of zeros in the STR1 and STR2 positions of the Static Register 25 is decoded by gate 26–1A of the Instruction Decoder 26 as a search instruction, and in response thereto the Instruction Decoder 26 generates a (1A) high level signal at time t0A. The 1A high level signal is transmitted to the Control Encoder 27 and to gate 28–1 of the Memory Band and Head Selection Circuits (FIGURE 28) via delay element 28–55. The Control Encoder 27 in response to the (1A) signal generates at time *t*0B the (1), (63), and (74) low level signals and the (58+) high level signal as shown by the first row of output signals adjacent the Encoder 27 in these figures. All of the foregoing signals will be maintained for as many minor cycles as are required to locate the word in the memory being searched for, and will disappear at a time and in a manner to be subsequently explained. The (58+) high level jamming signal blocks A Register 15 output gates 15–10 thereby preventing the recirculating contents of *r*A from reading through the Subtrahend Buffers 19 to the S lines. Recirculation is maintained in the A Register through recirculation gates 15–1 by virtue of the absence of the (55+) high level jamming signal which is *not* generated by the Control Encoder 27. The (74) low level signal permits a *t*0B– timing signal from the Cycling Unit (FIGURE 34) to pass through gate 21–5 to the CPFF 21 generating a one pulse CP5 signal at *t*1A and setting the CPFF 21 to its CP state at *t*1B. The CP5 signal passes through buffers 17–18 and 17–19 generating an initial A and C signal pair from the Comparator Circuits 17A. This initial A and C signal pair together with the CP signal from the CPFF 21 alert gates 17–30 and 17–31 of the Comparator enabling an equality comparison of quinary portion information of the digits on the M and S lines to be performed. As will be subsequently seen, the information on the M and S lines is supplied respectively from the Memory Drum timing band and the C Register. The CP signal from CPFF 21 is also applied to Comparator gates 17–3, 17–4, and 17–6, and enables these gates to compare the binary portions of the information on the M and S lines. Should the search operation continue for more than one minor cycle, which will be the general case, a *t*11B+ timing signal from the Cycling Unit will clear the CPFF 21 to its $\overline{CP}$ state at time *t*0B of each minor cycle, but the CPFF will be immediately again set to the CP state by the (74) and *t*0B– signals via gate 21–5. Low level control signal (63) applied to the C Register read-out gates 13–4 and 13–3 opens the "*c*" Address read-out gates 13–3 at time *t*0B which have been alerted by the $\overline{CT}$ signal from CTFF 12A. The "*m*" Address output gates 13–4 are not opened because no CT signal is available from the CTFF 12A. The "*c*" Address digits P1 to P4 are thus permitted to read out through gates 13–3 to the Subtrahend Buffers 19 and thence onto the S lines. Should the search operation continue for a full minor cycle or longer the entire contents of the C Register 13 including the "*m*" Address digits P5 to P8 will read out onto the S lines, but this is not material because the only digits which will be able to exercise any control of the memory word to be selected are the "*c*" Address digits. That this is so will become apparent from consideration of the timing at the various gates to be subsequently discussed in detail. For example, gates 28–7 to 28–29 which control head selection and band selection are only alerted at time *t*3B by an $S_{t3B-}$ timing signal from the Cycling Unit FIGURE 34. The first "*m*" Address digit P5 which is applied to gate 13–3 does not appear on the S lines until time *t*5, or on the C signal output lines of *r*C until time *t*4, and hence arrive at gates 28–7 to 28–29 too late to have any effect. A similar condition exists for the time selection circuit gates 12–10 to 12–12 which control the shift from a search cycle to a *β*-cycle by determining whether or not time selection has been found. Low level control signal (1) alerts Minuend Buffers timing band input gates 20–8, TSFF wrong selection gates 12–10 to 12–12, special Cycling Unit gate 34–35A which controls generation of the $S_{t3B-}$ timing signal, Head Selection clearing gate 28–2, Static Register Start *β*-cycle gate 25–4, Read Flip-Flop gate 31–39, and Memory Address C+1 gate 22–24. Gate 20–8 is opened for three pulse times by the *t*(0–2)B– timing signal from the Cycling Unit 34 (not shown) to allow the $TS_1$ to $TS_4$ bits of digits P1 to P3 from the timing band 35–12 to read through the Min Buffers 20 onto the M lines as $M_1$ to $M_4$ bits. As previously explained in the description of FIG- URES 32A and 35B the timing is such that $P0=t0B$ at the output of the Min Buffers 20 so that the bits of P1, P2, and P3 from the timing band 35–12 appear on the M lines at time $t$1B, $t$2B, and $t$3B respectively. The quinary portions of P1 and P2 on the M lines ($M_1M_2M_3$) are routed to the Comparator Quinary equality gates 17–30 to 17–39 for comparison with the quinary portions at P1 and P2 on the S lines ($S_1S_2S_3$) out of the C Register 13. The binary or $M_4$ bits of P1 and P2 on the M lines are routed to Comparator gates 17–3, 17–4 and 17–6 for comparison with the binary or $S_4$ bits of P1 and P2 on the S lines out of $r$C. The LSB of P3 on the M lines ($M_1$) is routed to gates 28–22 to 28–29 together with the LSB and MSB of P3 on the S lines ($S_1$ and $S_4$). These gates 28–22 to 28–29 are the $HS_2$ head selection gates previously alluded to in the explanation of the head selection system, and are the gates which carry out the binary substraction yielding the $HS_2$ selection signal. It will be noted at this point and explained subsequently that four of these gates 28–22 to 28–25 require an A signal from the Comparator circuits 17A, and that the remaining four gates 28–26 to 28–29 require an $\overline{A}$ signal also from the Comparator circuits 17A. The $\overline{A}$ and A are mutually exclusive signals and respectively indicate that a borrow or no-borrow was required from the $M_1$ bit of P3 during the binary subtraction of $S_4$ from $M_4$ of P2 to yield the $HS_1$ selection signal. The necessity for indicating the borrow or no-borrow condition was explained in connection with the head selection subtraction system illustrated in Table Z. The manner in which the A and $\overline{A}$ signals are generated will be shown in the discussion which now follows.

Recalling for the moment Diagram X it will be remembered that two basic divisions exist for selecting a memory address. These are: Band Selection (BS) which is controlled solely by the memory address out of the C Register 13, and Time Selection (TS200) which is controlled jointly by the memory address out of the C Register 13 and the sequence numbers out of the Timing Band 35–12. Considering first the Time Selection (TS200) division it will be further recalled that TS200 is subdivided into TS50 (word within a quadrant and HS50 (quadrant) portions. The TS50 portion comprises P1 and bits 1 to 3 of P2. Since P1 can represent numbers from 0 to 9, and P2 first 3 bits can represent numbers from 0 to 4, TS50 can represent the first fifty words from 00 to 49 within any given quadrant. Whether a word is, for example, number 42, 92, 142, or 192 is then determined by the HS50 or quadrant selection portion, thus completely specifying the sequence number of any word within a given band. Consider first the TS50 subdivision of TS200. The S and M bits of this group are compared for equality as previously mentioned by the quinary equality gates 17–30 to 17–39 and the binary equality gates 17–3 and 17–4 of the Comparator 17. If the quinary portions of the S and M bits of the P1 digits are not equal then none of gates 17–32 to 17–39 can be selected at time $t$1B, no output signal will be generated therefrom, and the $E_q$ and C signals from the Comparator circuits 17A will not arise. As already explained in the description of the Comparator, FIGURE 17, $E_q$ and $\overline{E}_q$ signals or C and $\overline{C}$ signals are mutually exclusive, and when no $E_q$ and C signals are generated $\overline{E}_q$ and $\overline{C}$ signals are present. The $\overline{E}_q$ signal generated by the quinary comparison of the P1 digits appears at wrong selection gate 12–11 at time $t$2B and is gated through by a $t(2–3)$B– timing signal from the Cycling Unit, thereby clearing the TSFF 12B to its $\overline{TS}$ condition and suppressing the TS signal. Since the TSFF 12B will not again be set to its TS state by the $t$11B+ timing signal until time $t$0B of the next minor cycle, the start $\beta$ gate 25–4 which requires a TS signal cannot be selected by the $t$10B– timing signal and no $\beta$ transfer cycle can commence. The presence of a $\overline{C}$ signal, or rather the absence of a C signal, inhibits gates 17–30 and 17–31 thereby preventing a quinary comparison of the P2 digits. Assume now that quinary equality had been found for the P1 digits so that $E_q$ and C signals have been generated by the Comparator circuits 17A. The C signal partially alerts gates 17–30 and 17–31 for the quinary comparison of the P2 digits. The generation of the $E_q$ signal suppresses the $\overline{Eq}$ signal so that gate 12–11 is not selected at time $t$2B by the $t(2–3)$B– timing signal. TSFF 12B therefore remains set at its TS state. Simultaneous with the P1 digits quinary equality comparison by gates 17–30 to 17–39 (time $t$1B), gates 17–3 and 17–4 perform a binary bit equality check for the P1 digits. If equality is found ($M_4S_4$ or $\overline{M}_4\overline{S}_4$) then A′ and A signals are generated by the Comparator circuits 17A. The A signal together with the simultaneously derived C signal alerts gates 17–30 and 17–31 denoting total P1 digital equality and enabling a quinary equality check of the P2 digits to be performed. The generation of the A′ signal suppresses the A′ signal at time $t$2B thereby preventing the latter from being gated through wrong selection gate 12–10 by the $t$2B– timing signal. The TSFF 12B therefore remains set in its TS state. However, should gates 17–3 and 17–4 have found non-equality of the P1 binary bits then no A and A′ signals would be generated and $\overline{A}'$ and $\overline{A}$ signals would instead be present. The suppression of the A signal would inhibit gates 17–30 and 17–31 and prevent a quinary equality check of the P2 digits. The $\overline{A}'$ signal would appear at gate 12–10 at time $t$2B and be gated through by a $t$2B– timing signal to clear TSFF 12B to its $\overline{TS}$ state. The clearing of the TSFF 12B to $\overline{TS}$ would prevent the initiation of a $\beta$ transfer cycle by inhibiting start $\beta$ gate 25–4. Assume however, that complete equality had been found by the Comparator 17 for the P1 digits on the M and S lines. Therefore gates 17–30 and 17–31 are alerted by the presence of A and C signals thereon and the quinary equality check of the P2 digits may proceed. It should be noted that gate 12–10 is now rendered useless for purposes of clearing the TSFF 12B to $\overline{TS}$ on any subsequent binary bit comparison because the result of any such comparison will arrive at the gate later than time $t$2B. If quinary inequality is found then the TSFF 12B will be cleared to $\overline{TS}$ by gate 12–11 at time $t$3B in the same manner as already described for the P1 digits. If quinary equality of the P2 digits is found then, gate 12–11 is now also rendered useless for purposes of clearing the TSFF 12B to $\overline{TS}$ on any subsequent quinary comparison because the result of such comparison will arrive at the gate later than time $t$3B. Simultaneous with the P2 digits quinary equality comparison, gates 17–3, 17–4, and 17–6 perform a binary bit comparison for the P2 digits. This binary bit comparison is part of the HS50 or head selection subdivision of TS200. Before taking up head selection a brief summary of TS50 will be helpful. What is effectively accomplished by TS50 is a determination that a match of information has or has not been obtained for the P1 digits and for the quinary portion of the P2 digits on the M and S lines. If such a match has been obtained then the TSFF 12B remains set to TS and a $\beta$ transfer will commence on the next minor cycle provided, as shall be subsequently seen, that gate 12–12 is not selected at time $t$4B. The selection of gate 12–12 at time $t$4B indicates that an erroneous head has been selected. If an information match has not been maintained until time $t$3B then the TSFF 12B will be cleared to its $\overline{TS}$ state and remain so until time $t$0B of the next minor cycle when it will again be set to TS. This process will continue minor cycle after minor cycle until the sought for information match is found, whereupon a $\beta$ transfer will commence at the beginning of the next minor cycle.

Turn now to a consideration of the HS50 or head selection subdivision of TS200. It will be recalled from Diagram X that this portion consists of the MSB's of P2 ($M_4$ and $S_4$), the LSB of P3 on the M lines ($M_1$), and the quarter-added LSB and MSB of P3 on the S lines ($S_1$ and $S_4$). It will also be recalled that the bits on the S lines are binary subtracted from the bits on the M lines to yield two signals labelled $hs_1$ and $hs_2$, $hs_1$ denoting the difference of the P2 bits and $hs_2$ denoting the difference of the P3 bits. Refer now on FIGURE 47 to gates 28–1, 28–2, and 28–21 to 28–29. Gates 28–1 and 28–2 are head selection clearing gates which under appropriate circumstances clear the head selection circuits to the $\overline{hs_2}\overline{hs_1}$ condition denoting the selection of the 00 head of a particular band. Gate 28–21 is the $HS_1$ selection gate and gates 28–22 to 28–29 are the $HS_2$ selection gates. It is seen by the presence of the $S_{t3B-}$ timing signal that the gates 28–21 to 28–29 are selected, if at all, at time *t*3B, whereas gates 28–1 and 28–2 are selected respectively at later times *t*5B and *t*6B. The clearing gates 28–1 and 28–2, therefore, wait until the time for head selection has passed before performing their clearing function. For a clearer understanding of the operation of these gates refer now to FIGURE 28 and assume that a search operation is *not* being performed, and that therefore the (1A) high level and (1) low level signals are *not* present. Gate 28–2 cannot be selected at time *t*5B regardless of the state of the TSFF 12B because of the absence of the (1) signal. Gate 28–1 however is selected at time *t*6B of *every* minor cycle by a *t*6B– timing signal because the (1A) high level signal is not present to jam it. The *t*6B– timing signal at gate 28–1 causes complementer 28–3 to produce a high level signal at its output which is transmitted to clearing line 28–30 at time *t*7B by amplifier 28–6. This high level signal is transmitted to gates 28–31 to 28–40 and clears the selection circuits at time *t*8B by forcing the $ms_0$, $ms_2$, $ms_4$, $ms_6$, $ms_8$, $ms_{10}$, $ms_{20}$, F*m*, $hs_1$ and $hs_2$ signal lines to assume a high level state. On FIGURE 47 this is indicated by a showing that gate 28–1 produces $\overline{hs_1}$, $\overline{hs_2}$, $\overline{\mathbf{10}}$, $\overline{\mathbf{20}}$, and *sm* low level signals. No low level indication for the $ms_0$ to $ms_8$ signal lines is shown since reference to FIGURE 28 shows that there are no $\overline{ms_0}$ to $\overline{ms_8}$ signal lines. The function of gate 28–1 is thus seen to be that of clearing the Head Selection and Band Selection Circuits when *no search* is being performed. It is clear that gate 28–1 will perform this function on the first minor cycle after the completion of any search and thus prepare the circuits for a new selection on the next search, which may be instituted immediately. Assume now that gate 28–1 has performed its clearing function and that a search has been initiated thus giving rise to the (1A) high level and (1) low level signals. The (1A) high level signal applied to gate 28–1 via amplifier 28–55 jams the gate input high so that the *t*6B– timing signal is rendered ineffective. The signal output from complementer 28–3 is therefore maintained low and this low level signal propagated to the clearing line 28–30, and hence to gates 28–31 to 28–40, will not interfere with the selection circuits flip-flops being now controlled by gates 28–7 to 28–29. The function of gate 28–2 is that of clearing the Head Selection and Band Selection Circuits each minor cycle *during* a search when it has been determined that Time Selection has been lost. Such determination is made by the TSFF 12B, by suppressing the TS signal and generating the $\overline{TS}$ signal, and this has been partly described in connection with the TS50 subdivision of TS200 (gates 12–10 and 12–11). As will be seen, gate 12–12 is also involved in the Time Selection determination, and it is operative if at all at time *t*4B. The earliest time then at which it is certain that Time Selection has not been lost is time *t*5B, and therefore gate 28–2 waits until this time before attempting to clear the selection circuits. If Time Selection has not been lost then gate 28–2 is inoperative for lack of the $\overline{TS}$ signal. If Time Selection has been lost then $\overline{TS}$ is present on the gate at time *t*5B and complementer 28–4 will produce a high level signal at its output. This high level signal passes to the clear line 28–30 via amplifier 28–6, and thence to gates 28–31 to 28–40 clearing the selection circuits at time *t*7B in preparation for the next minor cycle of the search. Understanding now how the selection clearing gates 28–1 and 28–2 operate, return to the $HS_1$ and $HS_2$ selection gates 28–21 and 28–22 to 28–29 which are illustrated both in FIGURE 28 and FIGURE 47. As previously stated just prior to the TS50 summary, Comparator gates 17–3, 17–4, and 17–6 perform a binary bit comparison for the P2 digits simultaneous with the P2 digits quinary equality comparison by gates 17–30 to 17–39. Gates 17–3, 17–4 affect both the $HS_1$ and $HS_2$ selection circuits while gate 17–6 directly affects only the $HS_2$ circuits. If the binary M and S bits of P2 are both zero or both "one" ($\overline{M_4}\overline{S_4}$ or $M_4S_4$) then the binary subtraction of the S bit from the M bit always equals binary zero and no-borrow is required from the $M_1$ bit of P3. Gates 17–3 and 17–4 test for these conditions. If equality is found in the $M_4S_4$ bits of P2, then A′ and A signals are generated at time *t*3B from the Comparator circuits 17A and the $\overline{A}'$ and $\overline{A}$ signals are suppressed. The suppression of the $\overline{A}'$ signal at time *t*3B prevents $HS_1$ selection gate 28–21 from being selected and therefore maintains the $HS_1$ Flip-Flop in the cleared or $\overline{HS_1}$ state. This indicates that the 00 or 10 head is to be selected in accordance with the subtraction scheme set forth in Table Z, and as illustrated in FIGURE 35C. The generation of the A signal indicates that no borrow was required from the $M_1$ bit of P3 and this signal alerts the no-borrow $HS_2$ selection gates 28–22 to 28–25. The designated P3 M and S bits applied to gates 28–22 to 28–29 will accordingly select one of these $HS_2$ gates if they are present, or maintain $\overline{HS_2}$ if they are absent thereby completely specifying the desired head as $\overline{HS_2}\overline{HS_1}$ (00) or $HS_2\overline{HS_1}$ (10). If, on the other hand, the binary M and S bits of P2 are *not* both zero or both "one," that is $M_4\overline{S_4}$ or $\overline{M_4}S_4$, then the binary subtraction of the S bit from the the M bit always equals binary "one" and a borrow may or may not be required from the $M_1$ bit of P3. Gate 17–6 tests for this non-binary equality condition and determines whether or not a borrow from $M_1$ of P3 is necessary. If the bits are $M_4$ (1) and $\overline{S_4}$ (0) then it is clear that no borrow is required from $M_1$ of P3, whereas if the bits are $\overline{M_4}$ (0) and $S_4$ (1) then it is equally clear that a borrow from $M_1$ of P3 is required. Examination of gate 17–6 shows that it tests for the condition $M_4\overline{S_4}$, or no-borrow necessary, and if such condition is detected then an A signal is generated by the Comparator circuits 17A which alerts the no-borrow $HS_2$ selection gates 28–22 to 28–25, just as in the case of gates 17–3 and 17–4. The $\overline{A}$ signal is suppressed by the generation of the A signal and borrow gates 28–26 to 28–29 are unalerted. The remaining condition of $\overline{M_4}S_4$, or borrow necessary, is provided for by exclusion. That is, gates 17–3 and 17–4 test for the two possible conditions of equality, $M_4S_4$ and $\overline{M_4}\overline{S_4}$, gate 17–6 tests for one condition of inequality, $M_4\overline{S_4}$, and therefore if none of these gates 17–3, 17–4, or 17–6 is selected it is implicit that the inequality condition $\overline{M_4}S_4$ must exist. In such a case no A and A′ signals can be generated and the $\overline{A}$ and $\overline{A}'$ signals are not therefore suppressed at time *t*3B. The $\overline{A}$ signal alerts the borrow $HS_2$ selection gates 28–26 to 28–29. The designated P3 M and S bits will accordingly select one of these $HS_2$ gates if they are present, or maintain $\overline{HS}_2$ if they are absent. The $\overline{A}'$ signal on $HS_1$ selection gate 28–21 at time *t*3B causes the $HS_1$ Flip-Flop to be set to its $HS_1$ state. The desired head is therefore completely specified as $\overline{HS}_2HS_1$ (01) or $HS_2HS_1$ (11) depending upon the selection made by the $HS_2$ circuits already described.

Since the $\overline{HS}_2\overline{HS}_1$ selection condition corresponds to the 00 head, it also corresponds to non-selection of any of gates 28–21 to 28–29. The selection of any of these gates therefore corresponds to the selection of a head other than the 00 head of some Memory Band. If such a selection occurs it must be insured that no SM band is being called for by the "*c*" Address out of *r*C. This is checked for in the following way. The output of any selected gate 28–21 to 28–29 is also routed to the RTS (Restore Time Selection) circuit, one element of which, delay element 28–53, is shown on FIGURE 47. Delay element 28–53 produces in response thereto a low level output signal at time *t*4B which is routed to wrong selection gate 12–12 of the TSFF 12B. Since P0=*t*0B on the M and S lines then P4=*t*4B on the S lines and bits 3 and 4 of P4 ($S_3$ and $S_4$) also arrive at gate 12–12 at time *t*4B. As previously fully explained the absence of $S_3$ and $S_4$ bits, that is the presence of $\overline{S}_3$ and $\overline{S}_4$ bits, denotes that the address of the word being searched for is 3999 or lower and *must* therefore be in an SM band. SM bands are provided only with a 00 head ($\overline{HS}_2\overline{HS}_1$) and the selection of any other head must constitute an error. When, therefore, gate 12–12 finds a coincidence at its input of $\overline{S}_3$, $\overline{S}_4$ and RTS signals at time *t*4B it causes TSFF 12B to be cleared to its $\overline{TS}$ state, thus preventing the initiation of a *β* transfer cycle via gate 25–4 and causing the selection circuits of FIGURE 28 to be cleared by the *t*5B– timing signal on gate 28–2 as earlier explained. The Head Selection process just described takes place at time *t*3B as indicated by the $S_{t3B-}$ timing signal on gates 28–21 to 28–29. Simultaneous with Head Selection is Band Selection (BS) which is accomplished by gates 28–7 to 28–20. While the TS200 division consisting of the TS50 and HS50 subdivisions provides the means for locating the position of a desired word within any particular Memory Band, it has no way of determining in which particular Memory Band the desired word lies. This is clear from the fact that TS200 can specify only one word out of 200 but not which group of 200 words is of interest. This latter function is provided by the BS division, or digits P3 and P4 from the *r*C Register. Since Band Selection gates 28–7 to 28–20 are all selected at time *t*3B by the $S_{t3B-}$ timing signal from the Cycling Unit, it is clear that the information contained in the P3 and P4 digits must be available simultaneously at time *t*3B. This was earlier mentioned in connection with the explanation of the BS division of Diagram X. It was pointed out at that time that the first three P4 digit bits out of *r*C on the $C_{13_{14}}$, $C_{23_{24}}$, and $C_{33_{34}}$ signal lines bore a timing P4=*t*3B. These signal lines are shown on FIGURE 47 as emanating from the C Register 13 and terminating at the inputs to gates 28–7 to 28–12, the partial selection gates for addresses 1000 or greater. As earlier described, gates 28–7, 28–9, and 28–11 receiving respectively the $C_{13}$, $C_{23}$, and $C_{33}$ signals are used on an "*m*" Address search, while gates 28–8, 28–10 and 28–12 receiving respectively the $C_{14}$, $C_{24}$, and $C_{34}$ signals are used on a "*c*" Address search. The P3 digit bits on the S lines have the proper timing since it will be recalled that P0=*t*0B on the S lines and hence P3=*t*3B. Gates 28–13 to 28–20 utilize these P3 digit bits for the selection of addresses 000 to 999 and the partial selection of addresses greater than 1000. Gates 28–13 to 28–20 drive the Band Selection Flip-Flops $MS_0$, $MS_2$, $MS_4$, $MS_6$ and $MS_8$ while 28–7 to 28–12 drive Band Selection Flip-Flops $MS_{10}$, $MS_{20}$, and FM. The selection of these Flips-Flops by their respective controlling gates denotes the following.

TABLE ZZ

| Flip-Flop | Band | Words |
|---|---|---|
| $MS_0$ | 1 | 000–199 |
| $MS_2$ | 2 | 200–399 |
| $MS_4$ | 3 | 400–599 |
| $MS_6$ | 4 | 600–799 |
| $MS_8$ | 5 | 800–999 |
| $MS_{10}$ | 6 | 1000–1199 |
| $MS_{20}$ | 11 | 2000–2199 |
| FM | 21 | 4000–4199 |

In order to select a word not lying in one of the particular bands specified by Table ZZ more than one of the Selection Flip-Flops must be selected, and this is provided for by gates 28–7 to 28–20 shown on FIGURE 47 and detailed Diagram FIGURE 28. For example, if the address of word 1732 is being searched it is known that word 1732 lies between words 1600 and 1799 and must be in Band 9, but Band 9 cannot be selected by selecting only one Flip-Flop. However, by selecting the Flip-Flop corresponding to address 1000 plus the Flip-Flop corresponding to address 600 the composite selection of word 1600 is achieved. The selection of word 1600 automatically obviously selects the band containing words 1600–1799. Therefore, to select word 1732 the $MS_6$ and $MS_{10}$ Flip-Flops are selected. Other examples are:

| Word— | Flip-Flops Selected |
|---|---|
| 2312 | $MS_{20}+MS_2$ |
| 3468 | $MS_{20}+MS_{10}+MS_4$ |
| 4901 | $FM+MS_8$ |

That the Memory Band and Head Selection circuits of FIGURE 28 will accomplish the desired result will now be illustrated for the first example cited. The address to be found is 1732 and the P4 and P3 digits are respectively decimal "1" representing the thousands digit and decimal "7" representing the hundreds digit. Breaking these decimal digits into their equivalent 4 bit bi-quinary coded representations gives the following:

| P4=1 | | P3=7 | |
|---|---|---|---|
| To Gates 28–8 28–10 28–12 | $C_{34}$ $C_{24}$ $C_{14}$ | $S_4S_3S_2S_1$ | To Gates 28–13 to 28–20 |
| | 0 0 1 | 1 0 1 0 | |
| | or | or | |
| | — — $C_{14}$ | $S_4\overline{S}_3S_2\overline{S}_1$ | |

Examining first gates 28–8, 28–10, and 28–12, it is seen that the $C_{14}$ signal will select gate 28–8 and set the $MS_{10}$ Flip-Flop. Gates 28–10 and 28–12 will remain unselected because the P4 digit produces no $C_{24}$ or $C_{34}$ signals. Examining now gates 28–13 to 28–20 it is seen that only gate 28–18 will be selected by the P3 bits $S_4\overline{S}_3S_2\overline{S}_1$ and hence only the $MS_6$ Flip-Flop will be set. It is clear then that address 1732 causes Flip-Flops $MS_{10}$ and $MS_6$ to be set, and no others, and this is precisely what is desired. A similar procedure can be employed to analyze any other address and it will be seen that the appropriate Flip-Flops will be set in accordance with the described Band Selection System.

Understanding now how the Memory Band and Head Selection circuits of FIGURE 28 generate the necessary signals for selection of the proper band and Read-Write head, the remainder of the Address Selection system may be treated in somewhat lesser detail. The band and head selection signals generated by the circuits of FIGURE 28 are transmitted to the Memory Band and Head Gating and Switching Structure shown in detail in FIGURE 29 and as a block 29 on FIGURE 47. The gating structure is straight-forward and has been described in the explanation of the detailed FIGURE 29. Briefly recapitulating, when one of the gates 29–1 to 29–40 is selected, the corresponding memory switch 29–41 to 29–60 is activated, thus selecting the corresponding column of Read-Write heads shown on FIGURE 30. Each switch alerts the 4-track 00 head for one SM band and one 4-track quadrature head in one of the FM bands. By time *t*10B the transients resulting from picking up the center line of the heads has died away and the heads have electrically stabilized. At the same time, *t*10B, the group of four read and shaping amplifier gates 31–55 for the SM band or gates 31–54 for the FM band shown on FIGURE 31 have been conditioned to transmit the selected address word to the M lines via the Min Buffers 20, and the timing on the M lines is, as before, P0=*t*0B. The manner of conditioning the group of four read and shaping amplifier gates associated with either the SM or FM band has been explained in the description of FIGURE 31, but a brief recapitulation is as follows. Read Flip-Flop gate 31–39 causes the Read Flip-Flop 31–56 to be set to its low level output state at time *t*9B of the minor cycle during which Time Selection (TS) was found. The Flip-Flop output selects gate 31–45 which has been alerted by the SM signal or gate 31–44 alerted by the FM signal. Whichever gate is selected, 31–45 or 31–44, conditions for reading at time *t*10B the particular group of read and shaping amplifier gates with which it is associated, 31–55 or 31–54. Therefore, at time *t*10B, read out from the memory commences and the first or P0 digit will subsequently appear on the M lines at time *t*0B of the next minor cycle. At the same time, the Start-$\beta$ gate 25–4 (shown on FIGURE 47) is sampled by a *t*10B– timing signal from the Cycling Unit to determine whether the $\beta$ transfer shall take place for the "*c*" Address just searched for and found, or whether the "C+1" Address shall be transferred instead. Gate 25–4 has been partially alerted by the (1) control signal from the Control Encoder 27 and the TS signal from TSFF 12B. However, an $\overline{OF}$ signal from Overflow Flip-Flop 22A is required to fully alert the gate. If the $\overline{OF}$ signal is not present then gate 25–4 cannot be selected by the *t*10B– timing signal and the $\beta$ transfer can not be initiated. If this is the case then the OF signal exists and is partially alerting the "C+1" memory address gate 22–24. The "C+1" Address is called for as the result of certain Computational Operations to be subsequently described and the method of selecting this address will be now explained. This gate 22–24 is fully alerted by the (1) control signal and the TS signal so that at time *t*11B gate 22–24 is selected by the *t*11B– timing signal. The output of this gate sets the Overflow Delay Flip-Flop 22B to its $OF_{2+}$ state at time *t*0B of the next minor cycle. The $OF_{2+}$ signal sets the Overflow Flip-Flop 22A to its $\overline{OF}$ state at time *t*1B thus alerting start-$\beta$ gate 24–4. The $OF_{2+}$ signal, which is maintained for a full minor cycle, also jams the TSFF 12B to its TS state so that gate 25–4 is selected by the next *t*10B– timing signal and a $\beta$ transfer is initiated. This jamming of the TSFF 12B is necessary because Time Selection was found for the "*c*" Address, but the "C+1" will not produce a match of information and the TSFF 12B would normally be cleared to $\overline{TS}$ by gate 12–10 or 12–11. Thus, at time *t*10B the TS signal would not be present on gate 25–4 and the $\beta$ transfer for the "C+1" Address could not be initiated. It should be noted that the Read Flip-Flop gate 31–39 is controlled in the same manner as start-$\beta$ gate 25–4 so that in the event that the "C+1" Address is called for instead of the "*c*" Address there will be no read-out onto the M lines until "C+1" because the read and shaping amplifier gates of FIGURE 31 will not have been alerted until that time. Assume now that either the "*c*" or "C+1" Address has been called for and that start-$\beta$ gate 25–4 has been selected by the *t*10B– timing signal. The output signal from selected gate 25–4 at time *t*10B causes the Static Register 25 to produce $RCT_1$ signal at time *t*11A and sets FFA to its STR1 state at time *t*11B. The $RCT_1$ signal is routed to the CTFF 12A where it would cause the CTFF to be cleared to its $\overline{CT}$ state at time *t*0B of the next minor cycle ($\beta$ cycle) if it had been in its CT state. The CTFFA 12A is however already set to its $\overline{CT}$ state and therefore remains unchanged.

*Address selection—$\beta$ Cycle*

When the state of Static Register FFA is changed from $\overline{STR1}$ to STR1 at time *t*11B of the last minor cycle of the search operation, Instruction Decoder gate 26–1A becomes unselected and gate 26–2A becomes selected. The (1A) high level signal therefore goes low and the (2A) high level signal arises, both at time *t*0A. The suppression of the (1A) signal from the Instruction Decoder 26 causes the suppression of the (1), (63), (74), and (58+) signals from the Control Encoder 27 at time *t*0B. The (2A) high level signal is transmitted to the Control Encoder 27 and causes the generation of the (2) and (62) low level signals and the (2+) high level signal at time *t*0B. The (62) low level control signal is routed to the MQC 23 input clearing gate 23–1 where it permits a *t*0B– timing signal to pass through and clear the MQC Flip-Flops to their zero or barred state ($\overline{Q}_1$, $\overline{Q}_2$, $\overline{Q}_3$, $\overline{Q}_4$). This clearing operation is to prepare the MQC Flip-Flops for the storage of the P7 digit to arrive on the M lines for use with an N or V instruction. If the instruction being read into the Static Register 25 is not an N or V instruction, the P7 digit will be cleared out by any instruction requiring the use of the MQC. The (2+) high level signal jams the recirculation gates 13–1 of the C Register 13 for the entire $\beta$ transfer cycle, *t*0B to *t*11B, thus clearing out the old instruction word. The (2) low level signal opens the C Register read in gates 13–2 for one minor cycle so that the new instruction word from the memory reading through the Min Buffers 20 onto the M lines reads into the register. The (2) low level signal also alerts MQC gates 23–3, Static Register gates 25–1 and 25–2, and Stop Flip-Flop gate 33–1. At time *t*7B MQC 23 gates 23–3 are opened for one pulse time by a timing signal from the Cycling Unit and the $M_1$ to $M_4$ bits of P7 are read into and stored by the MQC Flip-Flops. Static Register gate 25–1 passes a *t*8B– timing signal to delay device 25–18, an output signal from which appears at time *t*9B. Static Register gates 25–2A to 25–2C are alerted by a *t*9B– timing signal to pass the $M_1$, $M_2$, and $M_4$ bits of P9 for setting Static Register Flip-Flops A, B, and C to their barred or unbarred STR1, STR2, and STR3 states respectively at time *t*10B. It is seen that the output of both the $M_1$ bit gate 25–2A and the output of delay device 25–18 are routed to the STR1 Flip-Flop A. If the bit on the $M_1$ line is a zero ($\overline{M}_1$) then the output from delay device 25–18 will clear the STR1 Flip-Flop A to its $\overline{STR1}$ state, whereas if the bit is a "one" (M1) then it will take precedence over the output of delay device 25–18 and Flip-Flop A will remain in its STR1 state. This can be more clearly seen from the detailed diagram of the Static Register, FIGURE 25 to which reference should be made. Stop Flip-Flop gate 33–1 passes a *t*9B– timing signal to the Stop Flip-Flop 33B which produces in response thereto an $\overline{SP}$ high level signal (shown on FIGURE 47 as $\overline{SP}$+) for one pulse time at *t*10B. The $\overline{SP}$+ signal is routed to the Instruction Decoder 26 where it inhibits the Decoder gates at time *t*10B. This is necessary to prevent the half-staticized instruction in the Static Register from causing erroneous control signals to be generated. The $\overline{SP}$+ signal goes low one pulse time later at time *t*11B when the $M_1$, $M_2$, and $M_4$ bits of P10 have been read through gates 25–2D to 25–2F by a *t*10B– timing signal and been staticized in Static Register Flip-Flops D, E, and F, so that the full instruction is now available to the Instruction Decoder 26.

As will be recalled from Table W, if any of the Group 2 instructions are read into the Static Register 25 during the β transfer, then zeros will be staticized in the Static Register 25 Flip-Flops A and B with the resultant generation of the $\overline{\textbf{STR1}}$ and $\overline{\textbf{STR2}}$ signals, which cause the Instruction Decoder 26 to initiate another search. If the instruction read into the Static Register 25 during the β transfer calls for such an operand search, then upon initiation of the search immediately following the β transfer the *"m"* Address must be able to read out of *r*C and onto the S lines via Sub Buffers 19. This is provided for by the CTFF gate 12–2. It is seen that this gate requires the (2) control signal, the $\overline{\textbf{STR2}}$ Static Register signal, and a *t*10B– timing signal. The (2) signal will be present during the entire β transfer and the $\overline{\textbf{STR2}}$ signal has been present since the initiation of the just completed search. At time *t*10B a *t*10B– timing signal selects gate 12–2 thereby setting the CTFF 12A to its CT state at time *t*0B of the next minor cycle. The CT signal is routed to and alerts Band Selection gates 28–7, 28–9, and 28–11 and *"m"* Address output gates 13–4 of the C Register 13. Therefore, the search which immediately follows the β transfer will be controlled by the *"m"* Address out of *r*C. When this search is completed, gate 25–4 will initiate a data transfer by setting Static Register 25 FFA to its STR1 state at time *t*11B, and in the process will generate an $RCT_1$ signal. The $RCT_1$ signal, as before, will be routed to the CTFF 12A where it will now cause the CTFF to be cleared to its $\overline{CT}$ state at time *t*0B of the next minor cycle. The $\overline{CT}$ signal will be routed to and alert Band Selection gates 28–8, 28–10, and 28–12 and *"c"* Address output gates 13–3 of the C Register 13. Thus, at the completion of the instruction being performed the computer is ready to search for the next instruction word whose address is designated by the *"c"* address. This completes the Address Selection cycle. The manner of executing particular instructions which have been read into the Static Register will now be described.

Having described how the computer locates an address in the Drum Memory it will be advantageous to examine now the detailed operations of the order designated. Since, in general the order indicates an increasing degree of complexity, consider first the group (1*a*) operations, that is, those operations not involving a search for a memory location designated in the M Address, and requiring only one execution step (one minor cycle). This group is composed of the K, Q, T, and U instructions. It is to be understood that the K and Q instructions to be subsequently described are merely illustrative of a typical register-to-register transfer and a typical choice instruction. It will be appreciated that transfers between other registers, as for example between *r*X and *r*L or *r*X and *r*A, may be just as readily accomplished. Further, choice instructions involving comparisons other than those illustrated by the Q and T instructions may be readily performed by utilization of techniques similar to those to be described. Those of the group (1*a*) instruction to be now described in detail are therefore the K, Q, and U instructions.

*"K" or 07 instruction—FIGURE 36*

A logical block diagram of the K (07) instruction is illustrated in FIGURE 36. Reference should be had to the detailed diagrams of the logical components illustrated in FIGURE 36 for a complete understanding of the operation. Generally, however, the operation is executed in the following manner. Previously, the P9 and P10 digits of the instruction word just read from the memory had been staticized in the Static Register 25, and transmitted to and decoded by the Instruction Decoder 26 as an 07 instruction as indicated. In response to the decoded instruction, a (16A) high level signal is generated by the Instruction Decoder 26 and transmitted to the Control Encoder 27, which in turn generates as indicates the (16), (57+), and (67) signals at time *t*0B. The 57+ signal is applied to the four gates 14–1 of the L Register 14, the recirculation gates, and jams them so that recirculation is prevented. This clears the register of any information that had been recirculating. Control signal (16) applied to gates 14–3, the read-in gates of the L register, acts as a permissive signal and opens these gates so that information on the "S" lines from the Subtrahend Buffers 19 may be read into the L Register. In this instruction, the information on the "S" lines is derived from the A Register 15 which is simultaneously recirculating its contents and reading them into the Subtrahend Buffers because neither the normal recirculation gates nor the output gates of the A Register are blocked since neither the (55+) nor the (58+) control signals have been generated. Thus, the contents of the A Register are transferred to the L Register and also maintained in the A Register. Additionally, the sign of the contents of the A Register must be transferred from the Sign of *r*A Flip-Flop 11B to the Sign of *r*L Flip-Flop 11C. The sign of (*r*A) is transferred in the following way. In order to minimize the equipment required, the Sign of *r*L Flip-Flop is jammed to a plus (+) condition by the (16A) signal, thus tacitly assuming that the sign of (*r*A) is positive. If in fact the sign of (*r*A) is negative, then this information is present at one input to gate 11–31 of the Sign of (*r*L) Flip-Flop. Upon the appearance of the (16) control signal, the Sign of (*r*A) Flip-Flop minus (−) sign information does not immediately cause the Sign of (*r*L) Flip-Flop to change from (+) to (−) since the (16A) high level signal maintains the jammed (+) condition. However, at the end of the operation the (16) signal will exist for one pulse time after the (16A) signal disappears, and at that time the Sign of (*r*L) Flip-Flop will be set to the minus state since it is no longer being jammed to + by the (16A) signal. This completes the execution of the instruction, and at *t*9B– the (67) control signal is gated through gate 25–16, clearing all the Flip-Flops of Static Register 25 to their barred or zero condition at *t*11B and thus instituting a search for the next instruction word whose location is designated by the "C" Address of *r*C.

*Q (22) Instruction—FIGURES 37A and 37B*

Turn now to an examination of the Q (22) instruction, a logical block diagram of which is illustrated in FIGURES 37A and 37B arranged as indicated by FIGURE 37. Reference should be also be made to the detailed diagrams of the logical components illustrated in FIGURE 37 for a complete understanding of the operation. Generally, the operation is executed in the following manner. Previously, the P9 and P10 digits of the instruction word just read from the memory had been staticized in the Static Register 25, and transmitted to and decoded by the Instruction Decoder 26 as an 22 instruction. In response to the decoded instruction two signals are generated by the Decoder 26, a (60−) low level signal as indicated and the (19A) high level signal (not here indicated). The (19A) high level signal is transmitted to the Control Encoder 27 which in turn generates the (66), (74), (75) and (67) Control Encoder signals. The 60− signal from the Decoder is passed through gate 12–1 of the Control Transfer Flip-Flop (CTFF) 12A by a *t*0A– signal from the Cycling Unit FIGURE 34 and sets the CTFF to the CT condition at the start of the operation. The CT signal is applied to gates 13–4, the output gates for the *"m"* Address of the C Register 13, and when the (63) signal appears during the next search the *"m"* Address will read out of *r*C. It will be recalled that the Q instruction states that if (*r*A)=(*r*L) then the next instruction is in the "*m*" address of *r*C, and if $(rA) \neq (rL)$ then the next instruction is in the "C" Address of *r*C. It is seen, therefore, that since CT is automatically set there is a presumption that $(rA)=(rL)$ and the next instruction is designated by the "*m*" Address of *r*C. If, however, it is determined during the comparison of (*r*A) and (*r*L) that $(rA) \neq (rL)$ then at least one of the gates 12–6 to 12–9 will be activated and the CTFF 12A will be cleared to the $\overline{CT}$ state, and the $\overline{CT}$ signal will be applied to gates 13–3, the output gates for the "*c*" Address of the C Register 13. When the 63 signal appears thereafter during the next search, the "*c*" Address will read out of *r*C.

The (75) signal for the Control Encoder 27 conditions gates 12–6 through 12–9 so that the CTFF 12A may be cleared to the $\overline{CT}$ state if $(rA) \neq (rL)$. Gates 12–6 and 12–7 examines the signs of (*r*A) and (*r*L) for inequality, while gates 12–8 and 12–9 examine the magnitudes. Gate 12–8 examines for equality of the quinary portions and gate 12–9 examines for equality of the binary portions of the digits, both gates being inhibited during the space between words (SBW) and sign digit time by the *t*0B+ and *t*1B+ timing signals. The sign information is available immediately from the Sign of (rL) Flip-Flop 11C and the Sign of (*r*A) Flip-Flop 11B, and if sign inequality is present the CTFF 12A will be set to $\overline{CT}$ and the results of the magnitude comparison will be immaterial. If, however, sign equality prevails it is necessary to check for equality of magnitude in order to determine complete equality. This magnitude equality check is performed by the Comparator 17 via gates 17–3, 17–4, and 17–30 through 17–39 and circuits 17A. The recirculating contents of the *r*A Register 15 are being continuously read through the Subtrahend Buffers 19 and into the Comparator gates 17–3, 17–4 and 17–30 to 17–39 since no (58+) signal has been generated by the Control Encoder 27 to block the output gates of *r*A. Recirculation is likewise maintained in *r*A by virtue of the absence of a (55+) signal. The recirculating contents of the L Register 14 are read out of *r*L through the output gates 14–4 by the (66) signal, thence through the Minuend Buffers 20 into into the aforementioned Comparator gates 17–3, 17–4 and 17–30 to 17–39. Recirculation of (*r*L) is maintained by the absence of a (57+) signal. It is therefore seen that while this instruction examines for equality of (*r*A) and (*r*L) the compared information is maintained intact within the respective registers. The specific manner of accomplishing the magnitude comparison will now be described.

In order that magnitude equality may be established it is necessary that each digit of *r*A be identical to the comparable digit out of *r*L, bit for bit. Gates 17–3 and 17–4 of the Comparator check the binary portions of each digit, that is, they examine for the conditions $\overline{M_4}\overline{S_4}$ or $M_4S_4$. If such a condition is found to exist then these gates produce the A and A′ signals from the Comparator 17A. The presence of the A′ signal prohibits the presence of the $\overline{A'}$ signal as previously explained in connection with the detailed description of FIGURE 17. Gate 12–9 cannot therefore be activated and the CTFF 12A will not be cleared to $\overline{CT}$. If, on the other hand, either of the conditions $M_4\overline{S_4}$ or $\overline{M_4}S_4$ exists than A and A′ signals will not be generated, but $\overline{A}$ and $\overline{A'}$ signals will arise. The $\overline{A'}$ signal will gate the (75) signal through gate 12–9 and the CTFF will be cleared to $\overline{CT}$ thus indicating non-equality of (*r*A) and (*r*L) and conditioning gates 13–3 to read out the "C" Address of *r*C on the next search. Understanding now how binary bit inequality causes the CTFF to be cleared to $\overline{CT}$, consider now the gates 17–30 to 17–39 which test for equality of the quinary portions of the digit pairs out of *r*A and *r*L. Gates 17–30 and 17–31 test for the combinations $M_1S_1$ and $\overline{M_1}\overline{S_1}$ respectively while gates 17–32 to 17–39 test for equality in the second and third bit positions, that is, $M_2S_2$ or $\overline{M_2}\overline{S_2}$ and $M_3S_3$ or $\overline{M_3}\overline{S_3}$. It will be further observed that gates 17–30 and 17–31 differ from gates 17–32 to 17–39 in that the former have present as required input signals the A, C, and CP signals, and further that either gate 17–30 or 17–31 must be selected in order to select any of the gates 17–32 to 17–39. If quinary equality is found to exist then one of gates 17–32 to 17–39 will be selected, the output of which will pass through buffer 17–17 to the comparator circuits 17A and generate the C and E*q* signals. The presence of the E*q* signal prohibits the presence of the $\overline{Eq}$ signal as previously explained in connection with the detailed description of FIGURE 17. Gate 12–8 cannot therefore be activated and the CTFF 12A will not be cleared to $\overline{CT}$. If on the other hand quinary equality does not exist then none of gates 17–32 to 17–39 will be activated and $\overline{C}$ and $\overline{Eq}$ signals will arise. The $\overline{Eq}$ signal will gate the (75) signal through 12–8 and the CTFF will be cleared to $\overline{CT}$ thus conditioning gates 13–3 to read out the "C" Address of *r*C on the next search. As previously stated gates 17–30 and 17–31 require the presence of A, C, and CP signals in order that the quinary equality check may be performed. The CP signal serves a purpose similar to a signal from the Control Encoder in that it is an enabling signal for gates 17–3, 17–4, and 17–30 to 17–39. Since these gates are necessary to the performance of the Q instruction, the CP must be generated, in this case by the (74) signal from the Control Encoder 27. The A and C signals are also enabling signals but their presence or absence is determined by the results of the previous digit pair comparison. It has been shown that an A signal will be generated for each digit pair exhibiting binary bit equality, and that a C signal will be generated for each digit pair exhibiting quinary equality. It is therefore seen that in order for quinary equality to be established for any digit pair, the result of the previous digit pair comparison must indicate total equality, both binary and quinary. However, for the first digit pair artificial A and C signals must be generated because there has been no previous comparison to produce them. This artificial A and C signal pair is generated by a CP5 signal from the Complement Flip-Flop 12A at the same time as the generation of CP. The CP5 signal must therefore be generated one pulse time earlier than CP. The (74) signal from the Control Encoder 27 passes a *t*0B− timing signal from the Cycling Unit through gate 21–5 generating the required CP5 and CP signals from the Complement Flip-Flop 21 (CPFF). The CP signal which is required by gates 17–3, 17–4, 17–30, and 17–31 is sustained for one minor cycle and is automatically cleared to $\overline{CP}$ by a *t*11B+ timing signal from the Cycling Unit. The CP5 signal which applied to the Comparator 17A through buffer 17–8 (not shown) is generated for one pulse time only to generate the artificial A and C signals as described hereinabove.

The (67) signal gates a *t*9B− timing pulse through gate 25–16 which causes the Static Register Flip-Flops to be cleared to Zero ($\overline{STR1\text{–}6}$) at *t*11B, the end of the comparison cycle, and initiate a search for the next instruction. The memory address of the next instruction is found in the "*m*" Address or the "*c*" Address of *r*C depending upon whether or not equality or inequality was determined to be the case during the Q instruction just described.

*T (27) Instruction—Figures 37A and 37B*

Having seen now how the Q (22) instruction is performed, the general method of carrying out the T (27)

instruction can be clearly indicated without such detained analysis. With certain conditions to be described hereinbelow kept firmly in mind, the logical block diagram for the Q instruction (FIGURE 37) may be profitably consulted as an aid to understanding the T instruction. Reference should also be made to the detailed diagrams of FIGURES 11, 12, 13, 14, 15, 17, 19, 20, 21, 25, 26 and 27, with particular attention to FIGURES 12 and 17. While the Q instruction checks for equality between ($r$A) and ($r$L), T examines to determine whether ($r$A) is or is not algebraically greater than ($r$L). The condition wherein ($r$A) is algebraically greater than ($r$L) will be designated hereinafter as ($r$A)>($r$L). The condition wherein ($r$A) is not algebraically greater than ($r$L) will be designated hereinafter as ($r$A)$\not>$($r$L). It should be borne in mind that the condition wherein ($r$A) is algebraically equal to ($r$L) is not a separate case but is included within the condition ($r$A)$\not>$($r$L). Furthermore the foregoing notation is limited to designations of *algebraic* conditions which necessarily includes information as to both magnitude and sign. In the following discussion when conditions relating to magnitude only are being discussed this will be indicated by the use of absolute value symbols. For example, the notation |($r$L)|>|($r$A)| means that the absolute value (or magnitude) of ($r$L) is greater than the absolute value of ($r$A) and says nothing whatever with regard to the signs of the quanities. If the condition wherein ($r$A)>($r$L) obtains then the memory address of the next instruction is to be found in the "*m*" address of $r$C. Whereas, if the condition wherein ($r$A)$\not>$($r$L) is the case, then the memory address of the next instruction is to be found in the "*c*" address of $r$C. The mechanics of determining whether the "*m*" or "*c*" address will be read out of $r$C on the search operation immediately following the T instruction is identical to that for the Q instruction. That is, the P9 and P10 digits of the instruction word just read from the memory had been staticized and decoded by the Static Register 25 as a 27 instruction, and transmitted to the Instruction Decoder 26. In response to the decoded instruction two signals are generated by the Instruction Decoder, the (60–) low level signal from gate 26–27 of the Decoder and the (20A) high level signal from gate 26–21A. The (20A) high level signal is transmitted to the Control Encoder 27 which in response thereto generates the (20), (66), and (67) Control Encoder signals. Additionally, the (20A) high level signal sets the Complement Flip-Flop 21 (CPFF) to its CP state by causing the output of complementer 21–12 (FIGURE 21) to assume a low level state and the output of amplifier 21–13 to assume a high level state; however, unlike the (74) signal generated during the Q instruction it does *not* generate a signal such as the CP5 to supply an initial A and C signal pair because it by-passes gates 21–1 through 21–5. An initial A and C signal pair will be generated if at all by comparator gate 17–7, and the only condition when this will occur is when the sign stored in the Sign of (rA) Flip-Flop 11B is positive (+). The reason for this will appear subsequently. As in the Q instruction, the 60– low level signal passes a $t$0A– timing signal from the Cycling Unit FIGURE 34 through gate 12–1 of the Control Transfer Flip-Flop 12A (CTFF) and sets the CTFF to its CT state. The CT signal is applied to gates 13–14, the output gates for the "M" Address of the C Register 13, and when the (63) control signal appears during the search immediately following the T instruction the "M" Address will read out of $r$C. It will be recalled that the T instruction states that if ($r$A)>($r$L) then the next instruction is in the "M" Address of rC, and if ($r$A)$\not>$($r$L) then the next instruction is in the "*c*" Address of $r$C. It is seen, therefore, that since CT is automatically set there is a presumption that ($r$A)>($r$L) and the next instruction is designated by the "*m*" Address of $r$C. If, however, it is determined during the comparison of ($r$A) and ($r$L) that ($r$A)$\not>$($r$L) then at least one of the gates 12–3, 12–4, or 12–5 (shown only in FIGURE 12) will be activated and the CTFF 12A will be cleared to the $\overline{\text{CT}}$ state, and the $\overline{\text{CT}}$ signal will be applied to gates 13–3, the output gates for the "*c*" Address of the C Register 13. When the (63) control signal appears thereafter during the immediately following search the "*c*" Address will read out of $r$C. The aforementioned gates 12–3, 12–4, and 12–5 which detect ($r$A)$\not>$($r$L) are the logical counterparts of gates 12–6 through 12–9 inclusive which are used solely on Q and not during T.

As in the case of the Q instruction, ($r$A) and ($r$L) are read through the Subtrahend and Minued Buffers 19 and 20 respectively to appropriate gates in the Comparator (FIGURE 17) where |($r$A)| is compared with |($r$L)|. These gates are 17–30 to 7–39 where a quinary equality check is performed, gates 17–3 and 17–4 where a binary equality check is performed, and gates 17–6 and 17–40 to 17–43 where |($r$L)|>|($r$A)| check is performed. Gates 17–6 and 17–40 to 17–43 are shown only in FIGURE 17. For a detailed discussion of the manner in which these comparisons are performed and the signals generated thereby reference should be had to the detailed description of the comparator, FIGURE 17. Since it is desired that the state of the CTFF be undisturbed if ($r$A)>($r$L), it necessarily follows as previously discussed that the state of the CTFF should be changed from CT to $\overline{\text{CT}}$ only if ($r$A)$\not>$($r$L). This latter condition, insofar as magnitude is concerned, therefore requires that the conditions |($r$A)|=|($r$L)| and |($r$A)|<|($r$L)| be examined for. It will be observed that these conditions are precisely the ones tested for by the aforementioned comparator gates 17–3, 17–4, 17–6 and 17–30 to 17–43. Gates 17–3, 17–4 and 17–6 generate A or $\overline{\text{A}}$ signals (whereas gates 17–30 to 17–43 generate C or $\overline{\text{C}}$ signals. Additionally, it is necessary to correlate sign information with magnitude information since the signs of quantities are involved in an *algebraic* comparison. Comparator gate 17–7 and gates 12–3, 12–4 and 12–5 of the CTFF take cognizance of the signs of the quantities being compared, the latter three correlating the sign information with the results of the magnitude comparison, all of these gates being alerted by the 20 signal. Referring now to Table V it will be seen that there are twelve possible conditions which must be evaluated, each of three magnitude conditions combined with each of four sign conditions.

TABLE V

| Signs | | Magnitudes | | |
|---|---|---|---|---|
| A | L | A<L | A>L | A=L |
| + | + | $\overline{\text{CT}}$ | CT | $\overline{\text{CT}}$ |
| + | − | CT | CT | CT |
| − | + | $\overline{\text{CT}}$ | $\overline{\text{CT}}$ | $\overline{\text{CT}}$ |
| − | − | CT | $\overline{\text{CT}}$ | $\overline{\text{CT}}$ |

It is apparent that for the condition where the sign of ($r$A) is positive (+) and the sign ($r$L) is negative (−), the result of a magnitude comparison is immaterial since ($r$A)>($r$L) for any magnitude values. There are therefore no gates which specifically test for this condition and the CTFF remains set at its CT state. However, when both the sign of ($r$A) and the sign of ($r$L) are positive (+), magnitude considerations will determine the ultimate state of the CTFF. In this case, if |($r$A)|>|($r$L)| the CTFF must remain unchanged, whereas if

|($r$A)|≦|($r$L)| the CTFF must be cleared to its $\overline{\text{CT}}$ state. Gate 12–5 to be subsequently described in more detail will effect the CTFF change of state if such change is required. It will be also observed that when the sign of (*r*A) is negative (−) and the sign of (*r*L) is positive (+), the result of a magnitude comparison is immaterial since $(rA) \ngtr (rL)$ for any magnitude values. In such case gate 12–5 will clear the CTFF to $\overline{CT}$ for the condition $|(rA)|<|(rL)|$ and gate 12–3 or 12–4 also to be described in more detail will do the same for the conditions $|(rA)|\geqq|(rL)|$. The remaining sign condition, namely when both the sign of (*r*A) and the sign of (*r*L) are negative (−), requires that the CTFF be cleared to $\overline{CT}$ when $|(rA)|\geqq|(rL)|$ and this will be accomplished by gate 12–3 or 12–4. For a clearer understanding of the manner in which gate 12–3, 12–4 and 12–5 are enabled to achieve the desired clearing of the CTFF to it $\overline{CT}$ state examine in turn these gates. Consider first gate 12–5 which has as required inputs thereto the L+, A, C, (20) and *t*11B– signals. The (20) signal from the Control Encoder 27 alerts the gate. The *t*11B– signal from the Cycling Unit 34 determines that the conditions must be examined at the *end* of the comparison since an earlier examination would obviously be incapable of taking into account the most significant digits of (*r*A) and (*r*L). The L+ signal requires that the sign of (*r*L) be positive while the sign of (*r*A) may be either positive or negative. If the sign of (*r*A) is negative then the A and C signals will be generated by gates 17–40 to 17–43 and 17–3 or 17–4, or by gate 17–6, thus establishing that $|(rA)|=|(rL)|$ and hence that $(rA) \ngtr (rL)$. If the sign of (*r*A) is positive then the above mentioned gates will again establish that $|(rA)|<|(rL)|$, or gates 17–3 or 17–4 and 17–30 to 17–39 will establish that $|(rA)|=|(rL)|$ also establishing that $(rA) \ngtr (rL)$. In the latter case, gate 17–7 generates the initial A and C signal pair required for the quinary portion equality check of the first digit pair out of *r*A and *r*L. Consider now gates 12–3 and 12–4. Both of these gates have as required inputs thereto the (20), *t*11B–, and A– signals. In addition gate 12–3 also requires an $\overline{A}$ signal while gate 12–4 requires a $\overline{C}$ signal. The (20) and *t*11B– signals perform the same function as for gate 12–5 already described. The A– signal requires the sign of (*r*A) be negative while the sign of (*r*L) may be either positive or negative. Gates 12–3 and 12–4 test for the conditions $|(rA)|\geqq|(rL)|$ when the sign of (*r*A) is negative regardless of the sign of (*r*L), because if the sign of (*r*L) is positive then $(rA) \ngtr (rL)$ for any magnitude condition and therefore $(rA) \ngtr (rL)$ if $$|(rA)|\geqq|(rL)|$$

This latter condition is clear if it is remembered that when two quantities are negative, the quantity of *lesser* magnitude is the *algebraically* greater. Regardless of the sign of (*r*L), comparator gates 17–40 to 17–43, 17–3, 17–4, and 17–6 establish that $|(rA)|>|(rL)|$ by not producing A or C outputs, hence $\overline{A}$ or $\overline{C}$ outputs will be present to select 12–3 or 12–4. That this is so will be appreciated by remembering that comparator gates 17–40 to 17–43, 17–3, 17–4 and 17–6 test for the respective conditions wherein the $|(rL)|$ quinary portion is greater than the $|(rA)|$ quinary portion, and the $|(rL)|$ binary portion is equal to or greater than the $|(rA)|$ binary portion. Similarly, comparator gates 17–30 to 17–39 and 17–3 and 17–4 establish $|(rA)|=|(rL)|$ at *t*11B– by *not* producing A or C signals. At *t*9B the (67) signal gates a timing pulse through gate 25–16 which clears the Static Register 25 Flip-Flops to zero at *t*11B, the end of the comparison cycle, and initiates a search for the next instruction. The memory address of the next instruction is found in the "*m*" Address or the "*c*" Address of *r*C depending upon whether $(rA)>(rL)$ or $(rA) \ngtr (rL)$ was found to be the case during the T instruction just described.

*U (67) Instruction*

Turn now to an examination of the remaining group (1*a*) instruction, the U (67) or STOP instruction. Reference should be made to FIG. 25, FIG. 26, and FIG. 32B. The U instruction is a programmed order for the computer to stop computation. However, the Memory Drum continues to rotate and energizing power to the various circuits and components is uninterrupted. The P9 and P10 digits of the instruction word just read from the memory had been staticized in the Static Register 25, and transmitted to and decoded by the Instruction Decoder 26 as a 67 instruction. In response to the decoded instruction a (43A) high level signal is generated by the Instruction Decoder 26. This (43A) high level signal is transmitted to two places, namely to the Stop FF 32–41 and to the Static Register 25. The (43A) signal transmitted to the Static Register 25 enters via line 25–35 and causes the Static Register flip-flops to be cleared to their zero or barred ($\overline{STR}$1–6) condition. A memory search would normally be thus initiated for the next instruction. However, no search can proceed because gate 26–1A of the Instruction Decoder 26 is inhibited by a high level $\overline{SP}$ signal generated by the Stop FF 32–41, and therefore, (1) and (63) signals cannot be generated by the Control Encoder. The memory address of the next instruction cannot therefore be read out of the C Register output gates 13–3 or 13–4 because no enabling (63) signal is present thereon, nor can anything be read into the Static Register 25 because the absence of the (1) signal never allows a "β" cycle to be initiated. The high level $\overline{SP}$ inhibition signal on gate 26–1A arises in the following way.

The (43A) signal to the Stop FF 32–41, via the Stop line 32–43, causes complementer 32–24 and amplifier 32–26 to produce a low level SP signal and a high level $\overline{SP}$ signal respectively. This condition is maintained by the recirculation loop of Stop FF 32–41 until positive means to re-start the computer are initiated. The high level $\overline{SP}$ signal is transmitted to the Instruction Decoder 26 and inhibits gates 26–1A, thereby preventing the Instruction Decoder from generating any of the signals required by the Control Signal Encoder 27, thus prohibiting any computation from occurring. The inhibition on gate 26–1A remains until the Stop FF 32–41 is cleared to the $\overline{SP}$ signal low level condition, whereupon a normal search will then proceed.

*N and V Instructions—FIGURES 38 and 39*

Having now described the class (1*a*) sub-group, turn now to an examination of the class (1*b*) sub-group. This includes the N or 32 and V or 37 instructions, both of which usually, though not necessarily, require two or more execution steps. Both of these instructions will be described first generally and then in some detail. The V or 37 instruction logical block diagram is illustrated in FIGURE 38, that for the N or 32 instruction being shown in FIGURE 39. The V instruction calls for a left shift within the A Register of a predetermined number of digit positions and hence is the equivalent of multiplication by ten to some power, that is, a right shift of the decimal point. Generally, this is accomplished by reading (*r*A) out of *r*A and introducing a delay before reinserting the information back into *r*A. The delay introduced is a one-digit time delay per minor cycle. Therefore, in order to achieve left shifts of more than one digit, as many minor cycles as digit position shifts desired will be needed. The Multiplier Quotient Counter (MQC) FIGURE 23 is utilized to control the number of shifts and hence the number of minor cycles.

The N or 32 instruction is similar to the V instruction except that the N instruction calls for a right circular shift of a predetermined number of digit positions of the (*r*A) and (*r*X) between the respective registers. In this operation the least significant digit (LSD) of *r*A is read into the most significant digit (MSD) position of *r*X and the LSD of *r*X is read into the MSD position of *r*A. All other digits are preserved in the respective registers intact but shifted right. Generally, this is accomplished by recirculating (*r*A) and (*r*X) over one-digit time-shortened loops and nitroducing the LSD from each register into the other at the appropriate time (*t*0B). As in the case of the V instruction the MQC 23 controls the number of shifts to be performed. For either instruction the MQC 23 contains a staticized number from zero to ten which indicates the number of shifts to be preformed. This number is originally contained in the P7 digit position of the instruction word whose P9 and P10 digits designate the N or V instruction, and is read into the MQC just prior to the time the instruction itself is read into the Static Register 25. For a complete understanding of the manner in which the P7 digit is read into the MQC 23 reference should be made to the detailed description of Time Selection, FIGURE 35 and to the description of the MQC itself, FIGURE 23. The P7 digit is normally one digit of the "*m*" Memory Address but since the "*m*" address will not be used on either N or V (no memory search being required) it represents a convenient location for the shift-controlling information. Referring now to the left hand side of both FIGURE 38 and FIGURE 39 it will be observed that the same elements are utilized in the N and V instructions, the only differences being in the instruction code numbers illustrated in the Instruction Decoder 26 and the signals generated by the Control Encoder 27. It will be further observed that both instructions are illustrated as two phase operations, that is a first phase $N_1$ or $V_1$ and a second phase $N_2$ or $V_2$, and that there is no apparent distinction between $N_1$ and $V_1$ insofar as functional organization is concerned. There is in fact no actual distinction between $N_1$ and $V_1$, and the computer can not distinguish between the two instructions until the second phase is initiated. The first phase ($N_1$ or $V_1$) is essentially a check of the MQC 23 to see whether the number stored therein is zero or not-zero. If the MQC number is zero then the second phase ($N_2$ or $V_2$) will not proceed since no shifts are required. The Static Register 25 flip flops will all be cleared to zero and a search for the next instruction will be initiated. If the MQC number is not-zero then the second phase ($N_2$ or $V_2$) will be initiated and the number of shifts dictated by the MQC will take place. Before examining in detail the two phases of the N and V orders, it will be instructive to first make reference to the detailed diagram of the Instruction Decoder FIGURE 26, making reference in particular to gates 26–22A, 26–23A and 26–24A. Examination of these gates shows that certain Static Register output signals are common to all three, namely the $\overline{\text{STR6}}$, $\overline{\text{STR5}}$, $\overline{\text{STR4}}$ and STR2 signals. Furthermore, gate 26–22A has present an $\overline{\text{STR1}}$ signal while gates 26–23A and 26–24A are characterized by an STR1 signal. Lastly, gate 26–22A has neither an STR3 nor an $\overline{\text{STR3}}$ signal as a required input, whereas gates 26–23A and 26–24A are distinguishable from each other solely by the fact that the former requires an $\overline{\text{STR3}}$ signal while the latter requires the STR3 signal. Recalling that the N and V orders are 32 and 37 respectively, it is at once apparent that neither gate 26–23A nor gate 26–24A will be selected when either order is read into the Static Register 25 because while $\overline{\text{STR6}}$, STR5, STR4, STR3 or $\overline{\text{STR3}}$ and STR2 signals arise, no STR1 signal is generated. However, gate 26–22A which generates the (21A) high level signal is selected because all required input signals are present. By virtue of the absence of either the STR3 or $\overline{\text{STR3}}$ signal as a required input to gate 26–22A, no distinction between N and V is made during the first phase of either order. It is not until the second phase it is determined which of the two orders is to be performed, and this determination is made as a result of the presence of an STR3 or $\overline{\text{STR3}}$ signal on gates 26–24A or 26–23A respectively. If the STR3 signal is present then the order is V, whereas the presence of an $\overline{\text{STR3}}$ signal designates the order as N. If the number set up in MQC is not-zero then at the end of the first phase of either order the Static Register 25 FFA will be changed from its $\overline{\text{STR1}}$ to its STR1 state and gate 26–23A or gate 26–24A will be selected. The way in which the Static Register 25 FFA is caused to change its state from $\overline{\text{STR1}}$ to STR1 will be explained in the detailed descriptions of the N and V instructions which now follow. In addition to FIGURE 38 and FIGURE 39 reference should be had to the detailed diagrams of the MQC FIGURE 23, the Static Register FIGURE 25, the Instruction Decoder FIGURE 26, and the Control Encoder FIGURE 27.

Assume that the P9 and P10 digits of the instruction word just read from the memory have been staticized in the Static Register 25 as a 32 or 37 instruction and that the Static Register flip-flop output signals have been transmitted to the Instruction Decoder 26. Also assume that the P7 digit of the instruction word has been staticized in the flip-flops of the MQC 23. As already explained in the immediately preceding discussion of the Instruction Decoder 26, gate 26–22A will be selected whether the instruction in the Static Register 25 is either N or V and a (21A) high level signal (not shown on FIGURE 38 or FIGURE 39) will be transmitted to the Control Encoder 27. In response to the (21A) high level signal the Control Encoder 27 generate the (64) low level signal which alerts gate 25–5 to pass a *t*10B– Cycling Unit timing signal during this minor cycle if the gate is not jammed by an output signal (shown as +) from gate 25–14 via delay device 38–1 or 39–1. Delay device 38–1 or 39–1 represents the delay introduced by complementer 25–33 and amplifier 25–9, the latter two elements being shown on FIGURE 25. Consider first the case in which gate 25–5 is jammed. This will occur when the P7 digit stored in the MQC is zero whereby the output signals from the MQC flip-flops will be $\overline{Q}_1\overline{Q}_2\overline{Q}_3\overline{Q}_4$. These signals are applied to gate 25–14 together with STR2, STR4, STR5, $\overline{\textbf{STR6}}$ signals from the Static Register 25. The Static Register signals are required so that gate 25–14 will be conditionally alerted on an N or V order. The MQC signals are required so that gate 25–14 will only be fully alerted on an N or V order when the MQC flip-flops are storing a zero. When the foregoing signals are present on gate 25–14, a *t*9B– timing signal from the Cycling Unit will be gated through to the one pulse-time delay element 38–1 (or 39–1), the output of which, inhibits gate 25–5 at *t*10B and is applied to the clear line of the Static Register to clear the Static Register 25 flip-flops to zero at *t*11B, thus instituting a search for the next instruction. The inhibition on gate 25–5 prevents the *t*10B– timing signal from initiating the second phase of the N or V order by preventing the Static Register FFA from being set to its STR1 state and thereby preventing the selection of gate 26–34A or 26–24A.

If, however, the P7 digit stored in the MQC flip-flops is *not* zero, then the signal combination $\overline{Q}_1\overline{Q}_2\overline{Q}_3\overline{Q}_4$ will not be present on the input to gate 25–14 and no inhibition at gate 25–5 at *t*10B will occur, nor will the Static Register 25 be cleared to zero. Gate 25–5 not being jammed, the *t*10B– timing signal will pass through and set the Static Register FFA from $\overline{\text{STR1}}$ to STR1, thus selecting gate 26–23A or 26–24A of the Instruction Decoder 26 and initiating the second phase of the N or V order.

Having now completely described the common first phase of the N and V orders, the second phase of each order will be separately described. Consider first the V or 37 instruction. Reference should be made to the logical block diagram FIGURE 38 in conjunction with the detailed diagrams of FIGURES 15, 18, 19, 21, 23, 25, 26 and 27. The second phase of the V instruction ($V_2$) is initiated when gate 26–24A of the Instruction Decoder 26 is selected at the end of the first (or $V_1$) phase. Gate 26–24A generates a (24A) high level signal (not shown on FIGURE 38) which is transmitted to the Control Encoder 27 which in turn generates the (55+) high level signal and the (61) and (71) low level signals. The (61) signal alerts MQC count down gates 23–15 to 23–19 to enable the number stored in the MQC 23 to be reduced by one on successive minor cycles. If the P7 digit stored in the MQC were "3" for example, the V instruction would require four minor cycles to be completed. The first minor cycle would be used for $V_1$, or the first phase already described, while the remaining three minor cycles would be used to cause three successive left shifts of (*r*A), one minor cycle being required for each shift. At time *t*1B of the second minor cycle the state of the MQC flip-flops is examined by gates 23–15 to 23–19 and determined to be equal to "3." The output signals from these gates are then inserted into the MQC flip-flops so as to cause the MQC outputs to designate a "2." At *t*1B of the third minor cycle similar signals are generated which cause the MQC outputs to designate a "1." At *t*1B of the fourth and final minor cycle, the MQC count will be reduced to zero, or $\overline{Q_1}\overline{Q_2}\overline{Q_3}\overline{Q_4}$. The zero count in MQC alerts gate 25–14 and enables the *t*9B– timing signal of the Cycling Unit during this minor cycle to pass therethrough and clear the Static Register 25 at *t*11B, thus instituting a search for the next instruction.

The manner in which the left shift of (*r*A) is accomplished will now be described. During $V_1$ the contents of (*r*A) have been constantly reading out of the A Register 15 output gates since a (58+) jamming signal (not shown) has not been generated by the Control Encoder 27, and have also been recirculating within *r*A by virtue of the absence of the (55+) jamming signal on the A Register recirculation gates 15–1. The (*r*A) has been reading through the Subtrahend Buffers 19 to the Adder input gates circuits 18A via the S lines, and thence to the A Register left shift gates 15–3 via the $S_{1c}$, $S_{2c}$ and $S_{3c}$ lines. The Adder gates circuits 18A introduce the desired one pulse (or digit) delay, but only operate on the quinary portion bits (bits 1 to 3) on the S lines as previously explained in connection with the detailed description of FIGURE 18. The delayed binary portion of (4th bit) of (*r*A) must therefore be obtained from another source. This source is the A Register binary bit channel itself. Reference to FIGURE 15 will show that the binary (or fourth) bit channel contains a branch circuit comprising amplifiers 15–24, 15–26 and complementer 15–25 terminating in A″4 and $\overline{A}$″4 signal outputs. By counting the delays introduced by both the quinary bits and binary bit delay paths it will be seen that the A″4 signals from any given digit appear at left shift gates 15–3 simultaneously with the $S_{1c}$, $S_{2c}$, and $S_{3c}$ signals from the same digit. Since it is only desired to *delay* the information on the S lines and *not to complement* it, the Complement Flip-Flop FF21 should be set to its $\overline{CP}$ state. This was done by a *t*11B+ timing signal during some previous minor cycle and no positive steps have been taken to change its state. Although the shifted (*r*A) have been appearing at the left shift gates 15–3 during $V_1$ this shifted information has not been permitted to read into the A Register 15 because these gates have remained unalerted due to the absence of the (71) control signal. When now, at the end of $V_1$, the first phase, MQC 23 is found to contain a number not equal to zero, the $V_2$ phase is initiated by the (64) and *t*10B– signals via gate 25–5 as previously explained. The (55+) high level signal jams the normal recirculation gates 15–1 of the A Register 15. The (71) low level signal opens the left shift read-in gates 15–3 so that the delayed contents of *r*A may read back into the A Register. The t0B+ timing signal jams the shift gates 15–3 for one pulse time to insure that nothing reads into *r*A in the sign digit position. Assuming as before that the number originally stored in the MQC 23 was a "3", three left shifts will take place, one per each of three successive minor cycles. At the end of this time the count in MQC will have been reduced to zero as previously explained and the Static Register will therefore be cleared to zero by gate 25–14 thus suppressing the Control Encoder 27 signals and initiating a search for the next instruction. This completes the V or 37 instruction.

Consider now the second phase of the N or 32 instruction. Reference should be made to the logical block diagram FIGURE 39 in conjunction with the detailed diagrams of FIGURES 15, 16, 23, 25, 26 and 27. The second phase of the N instruction ($N_2$) is initiated when gate 26–23A of the Instruction Decoder 26 is selected at the end of the first phase. Gate 26–23A generates a (22A) high level signal (not shown on FIGURE 39) which is transmitted to the Control Encoder 27 which in response thereto generates the (55+) and (56+) high level signals and the (22), (59), and (61) low level signals. The (61) low level signal alerts the MQC count down gates 23–15 to 23–19 to enable the number stored in the MQC 23 to be reduced by one on successive minor cycles in the identical manner just described in connection with the $V_2$ phase of the V instruction. The (55+) high level signal jams the normal recirculation gates 15–1 of the A Register 15. The (56+) high level signal jams the normal recirculation gates 16–1 of the X Register 16. The (22) low level signal alerts gates 15–8 so that the LSD output of *r*X can be read into the MSD position of *r*A by a *t*0B– timing signal. It is clear that only the LSD is transferred from *r*X to *r*A because gates 15–8 are only open for the one digit time at *t*0B. The (59) low level signal opens gates 15–2 and 16–3, and alerts gates 16–7. Gates 16–7 allow the LSD out of *r*A to be read into the MSD position (P11) of *r*X by the *t*0B– timing signal. Gates 15–2 and 16–3 recirculate the contents of the A and X Registers (P2 to P10) over one-digit time-shortened loops. Reference to FIGURES 15 and 16, the A and X Registers respectively, will show that the first digit out of *r*A and *r*X on the time-shortened loops is P1, the first information digit, and not P0 the sign digit, and that it is P1 out of each register that is read into the P11 digit position of the other. The transferred P1 digits are read into the empty space between words (SBW) or P11 digit position of the register being read into, and a new SBW position is created by the *t*0B+ timing signal which jams gates 15–2 and 16–3 to prevent the P1 digit of each register from being recirculated within the register. There is therefore one empty digit position (SBW) existing in the time-shortened recirculation path. This empty digit position is filled by the transferred P1 and recreated once each minor cycle until the total number of shifts called for by the number in the MQC have been performed. At the end of the instruction a second empty digit position required for the sign position (P0) is established by the shift of the recirculation path from the 11 digit time-shortened loop to the normal 12 digit loop. As in the case of the V instruction when the MQC count has been reduced to zero, the Static Register 25 will be cleared to zero by gate 25–14 thus suppressing the Control Encoder 27 signals and initiating a search for the next instruction. This completes the N and V instructions. The group 2 instructions involving a search for information contained in a memory location designated by the *"m"* Address of the C Register 13 will now be taken up.

*E instructions*

Consider first the group (2*a*) instructions, that is, those instructions involving a search for an operand whose memory location is designated by the *"m"* address, and which require only one execution step (one minor cycle). This group is composed of the E, P, B, L, Y, H, and X instructions. The E and P orders will be separately described. The B, L, and Y orders all of which are memory to register transfers, will not be separately described but only the B order will be detained, the mechanics of transfer for the L and Y orders being completely analogous. Similarly, the H and X orders, both of which are register to memory transfers, will not be both described, but only the X order, the mechanics of transfer for the H order being analogous. Those of the group (2*a*) instructions to be now described in detail are therefore the E, P, B, and X instructions.

The E or 15 instruction, a logical block diagram of which is illustrated as FIGURE 40, may be considered to be a logical multiply or extract order. This operation causes each bit of all the digits in the A Register 15 to be changed to binary zero whenever the corresponding bit of a selected word from the memory is binary zero. Therefore, selected digits or bits of selected digits may be extracted from the totality of the contents of the A Register. In following the operation depicted in FIGURE 40 it will be helpful to refer to the detailed diagrams of the logical components illustrated thereon. Assume now that the P9 and P10 digits of the instruction word read from the memory during the $\beta$ transfer have been staticized and decoded by the Static Register 25 as a 15 instruction, and transmitted to the Instruction Decoder 26. Since the 15 instruction decodes with zeros in the STR1 and STR2 positions ($\overline{\text{STR1}}$ and $\overline{\text{STR2}}$), a memory search will be instituted by Instruction Decoder gate 26–1A. This search will be an *"m"* address search for an operand, as already previously described in the section on Address Selection. The E Instruction Decoder gate 26–10A is not selected because it requires an STR1 signal, not an $\overline{\text{STR1}}$ signal. However, during the last minor cycle of the *"m"* address or data search, Static Register gate 25–4 passes a *t*10B– timing signal which sets the Static Register Flip Flop A to its STR1 state at time *t*11B. Decoder gate 26–10A is therefore selected and generates the (10A) high level signal at time *t*0A. The (10A) high level signal is transmitted to the Control Encoder 27, which in response thereto generates the (55+) high level and (77) and (67) low level signals at time *t*0B. The (55+) high level signal jams the A Register normal recirculation gates 15–1 so that the contents of the A Register 15 cannot recirculate. The (77) low level signal alerts A Register read-in gates 15–4. The contents of the A Register 15 have been reading through the Sub Buffers 19 onto the S lines and thence to the read-in gates 15–4, but have been ineffective because of the absence of the (77) control signal which does not appear till time *t*0B. The digits of the operand found during the *"m"* address search read from the Memory 35A through the Min Buffers 20 onto the M lines and thence to the read-in gates 15–4. If the bits on both the M and S lines are "ones" ($M_1S_1$, $M_2S_2$, $M_3S_3$ or $M_4S_4$), then a "one" will be read into the corresponding bit channel of the A Register. If any of the bits on the M lines are zeros ($\overline{M}_1$, $\overline{M}_2$, $\overline{M}_3$, $\overline{M}_4$) then zeros are read into the corresponding bit channel of the A Register because the M line zero prevents the appropriate read-in gate 15–4 from being selected. The read-in gates 15–4 therefore, under the joint control of the bits on the M and S lines, will read "ones" into the A Register 15 of "ones" exist on both the M and S lines, and will rear zeros into the register in all other cases. The *t*0B+ timing signal on read-in gates 15–4 jams the gates at time *t*0B to prevent digit information from entering the A Register. The (67) control signal applied to Static Register normal ending-pulse gate 25–16 passes a *t*9B– timing signal from the Cycling Unit to delay element 40–1. Delay element 40–1 corresponds to the series delays of Static Register Complementer 25–6 and amplifier 25–9. This delay element emits a pulse at time *t*10B onto the Static Register 25 clearing line which clears all of the Static Register flip-flops to their zero or barred condition at time *t*11B, thus unselecting Decoder gate 26–10A and selecting Decoder gate 26–1A. The unselecting of Decoder gate 26–10A suppresses the (10A) high level signal at time *t*0A and thereby suppresses the (55+), (77), and (67) control signals at time *t*0B. Selected Decoder gate 26–1A generates the (1A) high level signal at time *t*0A resulting in the generation of the (1), (63), (74), and (58+) control signals at time *t*0B, all at which are needed for the search operation as previously explained in Address Selection.

*P instruction—FIGURE 41*

Consider now the P or 20 instruction, a logical block diagram of which is illustrated in FIGURE 41. This may be considered a logical buffing operation which causes each bit of all the digits in the A Register 15 to be changed to binary "one" whenever the corresponding bit of a selected word from the memory is a binary "one." This provides a method of manufacturing new words. In following the operation depicted in FIGURE 41 reference should be made to the detailed diagrams of the logical components illustrated thereon. Assume that P9 and P10 digits of the instruction word read from the memory during the $\beta$ transfer have been staticized and decoded by the Static Register 25 as a 20 instruction, and transmitted to the Instruction Decoder 26. Since the 20 instruction decodes with zeros in the STR1 and STR2 positions ($\overline{\text{STR1}}$ and $\overline{\text{STR2}}$), a memory search will be instituted by Instruction Decoder gate 26–1A. This search will be an *"m"* address search for an operand, as already previously described in the section on Address Selection. The P Instruction Decoder gate 26–9A is not selected because it requires an STR1 signal, not an $\overline{\text{STR1}}$ signal. However, during the last minor cycle of the *"m"* address or data search, Static Register gate 25–4 passes a *t*10B– timing signal which sets the Static Register Flip Flop A to its STR1 state at time *t*11B. Decoder gate 26–9A is therefore selected and generated the (9A) high level signal at time *t*0A. The (9A) high level signal is transmitted to the Control Encoder 27, which in response thereto generates the (67) and (77) low level signals at time *t*0B, and (82+) high level signal at time *t*1A. The contents of the A Register recirculate through the recirculation gates which are not blocked because of the absence of the (55+) signal. The (*r*A) have also been constantly reading out of the A Register and through the Sub Buffers 19 to the memory read-in gates 15–4, but have been ineffective because of the absence of the (77) control signal which does not appear thereon until time *t*0B. The (82+) high level control signal is applied to the Sub Buffers 19 input buffing circuits 19–1, thus producing $S_1$, $S_2$, $S_3$, $S_4$ signals on the S lines for the entire minor cycle. The $S_1$, $S_2$, $S_3$, $S_4$ signals together with the (77) signal alert A Register memory read-in gates 15–4 so that the bits arriving on the M lines control the gates. The digits of the operand found during the "*m*" address search are read from the Memory 35A through the Min Buffers 20 onto the M lines and thence to the read-in gates 15–4. All M line "one" bits ($M_1$, $M_2$, $M_3$, $M_4$) will read into the corresponding bit positions of the A Register while all zero bits ($\overline{M}_1$, $\overline{M}_2$, $\overline{M}_3$, $\overline{M}_4$) will not read in. The A Register bit positions corresponding to these zero M line bits will be controlled by the bits in the A Register recirculation loop. The *t*0B+ timing signal on the read-in gates 15–4 jams the gates at time *t*0B to prevent sign digit information from entering the A Register. The (67) control signal applied to Static Register normal ending-pulse gate 25–16 passes a *t*9B– timing signal from the Cycling Unit to delay element 40–1, the latter corresponding to Static Register complementer 25–6 and amplifier 25–9. This delay element emits a pulse at time *t*10B onto the Static Register clearing line which clears all of the Static Register flip-flops to their zero or barred condition at time *t*11B, thus unselecting Decoder gate 26–9A and selecting Decoder gate 26–1A resulting in the initiation of a search for the next instruction. The unselecting of Decoder gate 26–9A suppresses the (9A) high level signal at time *t*0A and thereby suppresses the (82+), (77), and (67) control signals. Selected Decoder gate 26–1A generates the (1A) high level signal at time *t*0A resulting in the generation of the control signals needed for the next search operation.

*B or 25 instruction—FIGURE 42*

Examine now the B or 25 instruction, a logical block diagram of which is shown on FIGURE 42. This instruction causes the transfer of a word from a particular memory location to the A Register 15. In following the operation depicted in FIGURE 42 it will be helpful to refer to the detailed diagrams of the logical components illustrated thereon. Assume now that the P9 and P10 digits of the instruction word read from the memory during the β transfer have been staticized and decoded by the Static Register 25 as a 25 instruction, and transmitted to the Instruction Decoder 26. Since the 25 instruction decodes with zeros in the STR1 and STR2 positions ($\overline{\text{STR1}}$ and $\overline{\text{STR2}}$), a memory search will be instructed by Instruction Decoder gate 26–1A. This search will be an "*m*" Address search for an operand, as already previously described in the section on Address Selection. The B instruction Decoder gate 26–6A is not selected because it requires an STR1 signal, not an $\overline{\text{STR1}}$ signal. However, during the last minor cycle of the "*m*" Address or data search, Static Register gate 25–4 passes a *t*10B– timing signal which sets the Static Register Flip-Flop A to its STR1 state at time *t*11B. Decoder gate 26–6A is therefore selected and generates the (6A) high level signal at time *t*0A. The (6A) high level is transmitted to the Control Encoder 27, which in response thereto generates the (55+) and (82+) high level signals and (77), (67) and (6) low level signal at time *t*0B. The mechanism of operation of this instruction will be most clearly understod by referring to FIGURES 40 and 41 already described and relating to the E and P instructions respectively. It will be seen that the control signals generated by the Control Encoder 27 on FIGURE 42 include the (55+) and (82+) high level signals and the (77), (67) and (6) low level signals. All these signals except the (6) were generated for either the E or P instructions and are shown on FIGURES 40 and 41. The functions of these control signals as related to the B instruction are identical to the function performed by the same signals during the E or P instructions. That is, the (55+) high level signal jams the normal recirculation gates of the A Register 15–1 thereby clearing the register for the receipt of a new word. The (82+) high level signal applied to the Subtrahend Buffer input buffing structure 19–1 jams all four S lines to the $S_1$, $S_2$, $S_3$, and $S_4$ conditions. The old word, therefore, which was stored in the A Register 15 and which is presently being cleared out is not able to control the signal state of the S lines. The (77) low level control signal partially alerts the A Register memory read-in gates 15–4 so that the digits arriving on the M lines will be unable to read into the A Register. The read-in gates are fully alerted by the fact that the S lines are jammed to the $S_1$, $S_2$, $S_3$, and $S_4$ signal conditions by the (82+) control signal, as already mentioned. The digits arriving at read-in gates 15–4 on the M lines are the digits of the operand searched for and found during the immediately preceding "*m*" Address memory search. The (6) low level control signal alerts gates 11–4 and 11–7, the input gates to the Sign of *r*A Flip-Flop. A *t*0B– timing signal from the Cycling Unit is likewise applied to the gates 11–4 and 11–7. If the $M_1$ bit of the P0 digit of the word on the M lines being trasferred from the memory to the A Register is a binary "1" then gate 11–7 will be selected and the Sign of *r*A Flip-Flop 11B will be set to its minus state. If, however, this aforementioned bit is a binary zero ($\overline{M}_1$) then gate 11–4 will be selected and the Sign of *r*A Flip-Flop will be set to its plus state. The (67) control signal applied to Static Register ending-pulse gate 25–16 generates an ending pulse which clears the Static Register Flip-Flops to their zero or barred state at time *t*11B in the identical manner already fully described for the E and P instructions. The clearing of the Static Register Flip-Flops suppresses the Control Encoder 27 control signals and initiates a search for the next instruction designated by the "*c*" Address of the C Register 13, as also previously described.

*X or 65 instruction—FIGURE 43*

Turn now to the last of the group (2*a*) instructions to be described in detail, the X or 65 instruction, a logical block diagram of which is illustrated in FIGURE 43. This instruction is one of the two by which information may be transferred out of a register and written at a memory location on the magnetic Drum Memory. The information stored in the register and to be transferred to the memory may be a word just taken from some other memory location for writing into a new memory address, or may be information derived from some computational operation, or may have been just read into the computer from an external source. Regardless of the source of the information stored in the register, the process of transferring such information to a specified memory location is always the same. The X instruction to be now described is a transfer from the X Register 16, whereas the H or 60 instruction is a transfer from the A Register 15 to a specified memory location. A transfer from the L Register 14, although not specifically provided for, could just as readily be performed as the X or H instructions, and the mechanics of such a transfer would be completely analogous. The timing of the register to memory transfers is somewhat different from the timing involved in a transfer from the memory to some other point in the machine, that is, the timing for a writing operation is different from that for a reading operation. This is so for the following reason: With regard to the X instruction the Minuend Buffer 20 constitutes the transfer system for both reading and writing. As already described the timing on a read operation is such that P0=*t*0B on the "M" lines out of the Minuend Bugers. It is clear, therefore, in order that this timing for a reading operation be preserved, that a writing operation must be so timed that when the word to be written into the memory is subsequently read out, the timing P0=$t$0B on the "M" lines will be preserved. The existence of a delay path between the Minuend Buffers and the read-write heads during both a write operation and a read operation, combined with the fact that the memory drum is continuously rotating requires that a writing operation, such as is now to be described for the X instruction, must be initiated at an earlier time than a read operation. The precise timing will be detailed in a description of the X instruction which now follows. In following the operation depicted in FIGURE 43 a clearer understanding will be obtained by referring also to the detailed diagrams of the logical components illustrated thereon.

Assume that the P9 and P10 digits of the instruction word read from the memory during the $\beta$ transfer have been staticized and decoded by the Static Register 25 as a 65 instruction, and transmitted to the Instruction Decoder 26. Since the 65 instruction decodes with zeros in the STR1 and STR2 positions ($\overline{\text{STR1}}$ and $\overline{\text{STR2}}$), a memory search will be instituted by Instruction Decoder gate 26–1A. This search will be an "*m*" Address search for a memory location into which the contents of the X Register will be written. In addition to gate 26–1A a special H–X search gate 26–3A is also selected. Gate 26–1A in conjunction with the Control Encoder 27 generates the normal search signals, and gate 26–3A generates the (3A) high level signal.

The read-out circuits comprising Read Flip-Flop 31–56, gates 31–39, 31–44, 31–45, 31–54, 31–55, and read amplifier circuits 31–28 and 31–30, although inactive are illustrated on FIGURE 43. These circuits have been previously described as part of the Address Selection system and will not be here again described. It is sufficient to note that these circuits are inactive because the Read Flip-Flop 31–56 was cleared by the $t$8B+ timing signal from the Cycling Unit, and therefore read-out gates 31–54 and 31–35 are closed. The Read Flip-Flop 31–56 was cleared because the "Clear TS" signal, generated by delay device 43–1, cleared the TS FF 12B (not shown) prior to time $t$8B, and gate 31–39 was therefore not able to override the $t$8B+ clearing signal. The "Clear TS" signal will be subsequently explained in more detail. The (3A) high level signal is routed to the Control Encoder 27 which in response thereto generates the (3) low level control signal at time $t$0B. The X Instruction Decoder gate 26–12A is not selected at this time because it requires an STR1 signal which is not present. The (3) control signal alerts Static Register gate 25–3 so that during the minor cycle when time selection is found a $t$5B– timing signal may be gated through to generate an RCT$_2$ signal at time $t$6A and set the Static Register Flip-Flop A to its STR1 state at time $t$6B. It should be observed that this is five pulse periods earlier than $t$11B, the normal time during a read-out from the memory when the Static Register Flip-Flop A would be set. By time $t$5B when Static Register gate 25–3 is selected, the Head Selection and Band Selection Flip-Flops 28 have selected a particular one of the head switches 29 which has energized for writing one of the SM and one of the FM 4-channel read-write heads 30. If the memory location designated by the "*m*" Address is for the SM band read-write head, then the *sm* signal from the Band Selection Flip-Flops 28 is present and partially alerts write input-circuit gates 31–11 and 31–25, whereas if the memory location is for the FM band read-write head, then the *fm* signal is present and partially alerts write input-circuit gates 31–12 and 31–26. The selection of Static Register gate 25–3 generates the one pulse RCT$_2$ signal at time $t$6A and also causes Decoder gate 26–12A to be selected at time $t$6B thereby generating the (12A)

high level signal at time $t$7A. At this same time $t$7A the search signals are suppressed. The RCT$_2$ signal clears the CTFF 12A to its $\overline{\text{CT}}$ state in the same way as the RCT$_1$ signal generated by Static Register gate 25–4, which has already been explained in the section on Addres Selection. The (12A) high level signal is routed to the Control Encoder 27 and causes the (12) and (21) low level control signals to be generated at time $t$7B. The (21) control signal alerts gate 31–1 so that a $t$7B– timing signal from the Cycling Unit gates through to set the Write Flip-Flop 31–29 at time $t$8B. As will subsequently be seen the Write FF 31–29 remains set until time $t$8B of the next minor cycle and is cleared at that time. The Write Flip-Flop fully alerts Write input-circuit gates 31–11 and 31–25 or 21–12 and 31–26, whichever have been partially alerted by the *sm* or *fm* signal from the band selection Flip-Flops 28. The (12) control signal alerts Min Buffers input gates 20–6 and 20–7. Gate 20–6 is the sign position gate for the sign of ($r$X) Flip-Flop 11A. The $t$7B– timing signal gates out the sign of ($r$X) if it is minus and causes Min Buffer 1 to produce an M$_1$ signal at time $t$8B. If the sign of ($r$X) were plus then gate 20–6 would not be selected and Min Buffer 1 would produce an $\overline{\text{M}}_1$ signal at time $t$8B. Since the sign digit is always P0, it is seen that the timing for the Write operation is established as P0=$t$8B on the M lines. It is clear therefore that the timing out of the X Register 16 into the Min Buffer input gates 20–7 must be P0=$t$7B. This timing is provided by the X$_{1M}$ to X$_{4M}$ output lines from $r$X. It is apparent then that the timing on the M lines for the contents of $r$X has been established as P0=$t$8B, P1=$t$9B, P2=$t$10B . . . P11=$t$7B. These digits are delayed for one pulse period by amplifiers 31–7, and so arrive at Write input-circuit gates 31–11 and 31–12 with the timing P0=$t$9B . . . P11=$t$8B. It will be recalled, however, that gates 31–11 or 31–12 had been fully alerted by the Write FF 31–29 at time $t$8B, one pulse period or digit time before the arrival of P0. Since there was no information on the M lines at time $t$7B, gates 31–11 and 31–12 apparently see a digital zero being read into them at time $t$8B. For the moment this digit will be called the "P zero minus one" or P0–1 digit. After passing through the selected gates 31–11 or 31–12 the digits are delayed for an additional pulse period by complementer 31–13 or 31–14 (neither of which is shown on FIGURE 43) and Write amplifier circuits 31–19 or 31–20 so that they arrive at the selected read-write head with the timing P0–1=$t$9B, P0=$t$10B . . . P10=$t$8B, at which times they are respectively magnetically written onto the surface of the Memory Drum. The P10 or last information digit arrives at the write input circuit gates 31–11 and 31–12 at time $t$7B. At this same time a $t$7B+ timing signal from the Cycling Unit is applied to the Write FF 31–29 which causes it to be cleared at time $t$8B. The P11 or SBW digit therefore does not pass through gates 31–11 or 31–12 and cannot be written onto the Memory Drum. It would appear then that the SBW digit is not written onto the Memory Drum. This is not the case. The P0–1 digit, which it will be recalled is a decimal zero, is an SBW digit, but it is the SBW digit for the memory address less one of the words being transferred from the X Register 16. That this is so is clear from the timing. Since digits are written in order from P0 to P10, then the P0–1 digit which is written just prior to P0, must be the SBW or P11 digit of the immediately preceding word. This system of writing has been found to be useful for engineering reasons, but logically the digits could just as well be written onto the Memory Drum in the order P0 to P11 rather than P0–1, P0 to P10. This could be readily accomplished by setting the Write FF 31–29 at time $t$9B by employing a $t$8B– timing signal on gate 31–1 and clearing the Flip-Flop with a $t$8B+ timing signal on gate 31–4. The (21) control signal has also been routed to Static Register write-ending-pulse gate 25–17 where it gates through a *t*4B– timing signal, generating the Clear TS signal at time *t*5A and appearing on the Static Register clear line at time *t*5B via delay element 43–1. Delay element 43–1 corresponds to the series connection of Static Register complementer 27 and amplifier 9. This clears the Static Register Flip-Flops to zero at time *t*6B and institutes a search for the next instruction via Decoder gate 26–1A. The clearing of the Static Register 25 at time *t*6B suppresses the (12A) high level signal from the Instruction Decoder 26 at time *t*7A and hence also suppresses the (21) and (12) low level signals from the Control Encoder 27 at time *t*7B. The Write FF 31–29 therefore remains cleared and the Min Buffer input gates 20–6 and 20–7 cease to be alerted, thereby removing from the M lines the information from the Sign of (*r*X) FF 11A and the X Register 16.

The Clear TS signal is needed for the following reason. Static Register Start $-\beta$ gate 25–4 is shown on FIGURE 43 although it does not perform any function in connection with the X instruction. It will be recalled from the description of Address Selection that this gate initiates the $\beta$ transfer when Time Selection has been found. However, it is known that Time Selection was found for the X instruction on the immediately preceding minor cycle which located the Memory Address into which the contents of the X Register were to be written. The TS signal was therefore present. In addition, it is known that the (1) signal is generated at the end of the X transfer and appears early at time *t*7B. Three pulse periods later at time *t*10B this gate 25–4 will pass a *t*10B– timing signal and initiate a $\beta$ cycle if the TS signal is still present. Normally, the TS signal would still be present because the gates associated with the Time Selection FF12B which are effective to clear the Flip-Flop to its $\overline{\text{TS}}$ state require the presence of a (1) signal between the times *t*0B to *t*4B, but the (1) signal does not appear until *t*7B. These gates (12–10, 12–11, 12–12) are therefore inactive and the TS signal persists. The Clear TS signal generated at time *t*5A clears the Time Selection FF 12B to the $\overline{\text{TS}}$ state at time *t*5B thereby insuring that start $-\beta$ gate 25–4 cannot pass the *t*10B– timing signal. At time *t*0B the TSFF 12A will again assume its TS State and a normally timed search will commence. If the TS signal had not been suppressed by the generation of the Clear TS signal the following undesirable operation would have occurred. A $\beta$ cycle would have been initiated in the manner already explained in the description of Address Selection, but no read-write head could have been energized because the Head and Band Selection Flip-Flops of FIGURE 28 had been cleared by the normal clearing gate 28–1 (see Address Selection). Therefore, no readout from the memory could take place from any head, and it would appear as though a word composed entirely of zeros were reading onto the M lines. The C Register 13 would be cleared by the (2+) Control signal and the apparent zeros on the M lines would read into the C Register through the input gates alerted by the (2) Control signal. The apparent P9 and P10 digits, zeros, would read into the Static Register 25 and be decoded as $\overline{\text{STR1}}$ to $\overline{\text{STR6}}$ signals. A search would thus be initiated for the "*m*" address out of *r*C which would call for the 000 memory word. When this word were found, another $\beta$ transfer would take place and the 000 word would be transferred to the C Register 13 and Static Register 25. It is highly improbable that the 000 word just searched for and found will be the actual "*c*" Address of the X instruction just performed, and more improbable that it would be the "*c*" Address of *every* register to memory transfer instruction. This completes the group (2*a*) instructions E, P, B, and X.

*Addition and subtraction—FIGS. 44A and 44B*

Turn now to a consideration of the final instruction group, group (2*b*). This group is composed of the A, S, M, D instructions, all of which involve a search for an operand whose memory location is designated by the "*m*" address and which require more than one execution step (two or more minor cycles). The A, S, M, D instructions comprise the so called arithmetic operations, being respectively addition, subtraction, multiplication, and division. Since addition and substraction are basic to multiplication and division, it will be most advantageous to examine these operations first. Multiplication and division will be examined separately, whereas addition and subtraction will be examined simultaneously because it can be proved that subtraction may be performed by a modified addition process, which in fact is done.

The addition and subtraction operations, A and S, are illustrated in the logical block diagram of FIGS. 44A and 44B arranged as illustrated by the inset FIG. 44. These operations will be best understood by first analyzing the general method or philosophy and by then proceeding to a detailed description of the manner in which the general method is implemented.

As previously alluded to, Addition and Subtraction may be considered to be substantially the same type of operation. That this is so can be understood from a recollection of the detailed description of the Adder FIG. 18. It will be recalled that the Adder combines information present on the M lines with information present on the S lines and that the information utilized by the Adder FIG. 18B may be either the actual information on the S lines or the nines complements of the latter. Regardless of the nature of the S lines information, that is, whether it is in complemented or uncomplemented form, the Adder always combines this information with that from the M lines in the same way. It is clear therefore that the Adder, which is used to form the sum during an addition operation or the difference during the subtraction operation, has no means of determining whether the operation is in fact addition or subtraction, but can only determine that it is dealing with uncomplemented information from the M lines combined with complemented or uncomplemented information from the S lines. Whether or not the information on the S lines is complemented is determined in part by the nature of the operation, that is, addition or subtraction, and in part by the signs of the quantities being combined. The rules for complementing or not complementing the quantity on the S lines are readily established by the examination of Tables VII and VIII shown below. In examining Table VII it should be kept in mind that the quantity on the M lines represents the addend and the quantity on the S lines represents the augend. Moreover, the quantity on the M lines is read from the memory whereas the quantity on the S lines is read from the A Register. Examine now Table VII.

TABLE VII—ADD

| | A>M | A<M | A=M | |
|---|---|---|---|---|
| A+ M+ | + | + | + | No CP on $A_1$; No correction on $A_2$ |
| A− M− | − | − | − | |
| ////////////////////////// | | | | |
| A− M+ | − | + | + | CP on $A_1$ |
| A+ M− | + | − | + | |
| | No decimal Carry—CP on $A_2$ | Decimal Carry—No CP on $A_2$ | | |

TABLE VIII—SUBTRACT

| | A>M | A<M | A=M | |
|---|---|---|---|---|
| A− M+ | − | − | − | No CP on $S_1$ No correction on $S_2$ |
| A+ M− | + | + | + | |
| ////////////////////////// | | | | |
| A+ M+ | + | − | + | CP on $S_1$ |
| A− M− | − | + | + | |
| | No Decimal Carry—CP on $S_2$ | Decimal Carry—No CP on $S_2$ | | |

Table VII is a summary of the rules to be followed for an addition operation. It will be seen that the table combines three vertical columns of relative magnitude conditions with four horizontal rows of relative sign conditions. The sign appearing at the intersection of a row and a column denotes the required sign of the sum (plus or minus). Examine first the relative sign conditions of the first two horizontal rows indicated as A+ M+ and A− M−. It is seen that for each of these relative sign conditions the sign of the sum is the same regardless of relative magnitudes of the quanities. This condition is obvious since it is clear that if both quantities are positive then their sum must also be positive, and if both quantities are negative their sum must also be negative. Further, since the quantities are both of the same sign they may be added directly, no complementing being necessary. That this process will yield a correct sum may be readily established by choosing any arbitrary pair of digits and combining them in the manner already described in the detailed description of the Adder, FIG. 18. Consider now the condition where the signs of the quantities are A− M+. For the magniture condition A>M it will be appreciated that the sum must take the sign of the quantity of larger magnitude, and is therefore minus. Similarly, for the condition A<M the sign of the sum must be positive. For the condition A=M the magnitude of the sum will be zero, and by convention the sign of zero is considered plus. By similarly considering the sign condition A+ M− it will be seen that the sign of the sum for the three conditions of relative magnitude should be as indicated in the table.

Consider now the necessity for complementing the quantity on the S lines from the A Register for these cases where the signs of the quantities are different, that is, A−M+ or A+M−. The addition of the quantities of unlike signs can be considered as the equivalent of subtraction of the smaller quantity from the larger with the difference bearing the sign of the larger. However, it is well known that subtraction may be accomplished by complementing the subtrahend and adding this complemented subtrahend to the minuend. Since the Adder of FIG. 18 only adds and does not subtract it is necessary to employ such a complementing system. In the instant cases therefore where an addition operation is called for and the signs of the quantities to be added are different, the subtrahend quantity on the S lines out of the A Register is tens complemented. The tens complement is obtained by nines complementing the quantity on the S lines and adding a "1" to the complement. The reason for tens complementing rather than nines complementing will be subsequently shown. In four of the 6 possible cases (A<M and A=M) this will yield a correct answer, but in two cases (A>M) the answer will be the tens complement of the true answer. In order to obtain the true answer in these two cases the answer obtained by the first addition must itself be tens complemented. To provide for these latter cases the addition operation is composed of two parts, $A_1$ and $A_2$, each part requiring one minor cycle to be performed. During the $A_1$ portion the two quantities are added, the quantity on the S lines out of the A register being either complemented or not for the reasons previously discussed; during $A_2$, which is a correction cycle, the sum obtained during $A_1$ is itself either complemented or not complemented depending upon whether the obtained sum itself was the complement of the true answer or was the true answer. It is necessary, therefore, to have some method of determining whether the answer obtained during $A_1$ was the true answer or was the complement of the true answer. Reference to Table VII indicates that for the four cases where the magnitude conditions A<M and A=M obtain, a decimal carry out of the 10th sum digit position will occur. The table also shows that for the two cases where the magnitude condition A>M obtains that no decimal carry out of the 10th sum digit position will occur. As before, the proof of the foregoing may be easily shown by performing the indicated operation with any arbitrary pair of digits. By testing for the occurrence of the decimal carry out of the 10th sum digit position at the end of the $A_1$ cycle it may therefore be determined whether or not it is necessary to complement the answer just obtained; if a decimal carry occurs the answer obtained during $A_1$ is the true answer and no complement is required, whereas, if no decimal carry occurs then the answer obtained during $A_1$ is the complement of the true answer and must be complemented during $A_2$. It will be appreciated that the necessity for complementing during the $A_2$ cycle can only possibly occur where the signs of the quantities are different, and such a correction is never required for the six cases where the signs of the quantities are the same.

The foregoing rules with regard to complementing of the quantity on the S lines out of the A Register for an addition operation may be summarized as follows:

(1) Signs of the quantities alike (A+M+, A−M−)
   (a) Do not complement on $A_1$
   (b) Do not complement on $A_2$
(2) Signs of the quantities different (A+M−, A−M+)
   (a) Complement on $A_1$
   (b) Complement on $A_2$ if no decimal carry out of tenth sum digit position (A>M)
   (c) Do not complement on $A_2$ if decimal carry out of tenth sum digit position (A<M, A=M)

Turn now to an examination of Table VIII and the subtraction operation. It will be seen, as in the case for the A operation just discussed, that Table VIII combines 3 vertical columns of relative magnitude conditions with 4 horizontal rows of relative sign conditions. The sign appearing at the intersection of a row and a column denotes the required sign of the difference (plus or minus). Examine first the relative sign conditions of the first two horizontal rows, indicated as A−M+ and A+M−. It is seen that for each of these relative sign conditions the sign of the difference is the same regardless of the relative magnitudes of the quantities. That the signs indicated are correct will be clear from the considerations that when one quantity is subtracted from another the sign of the quantity being subtracted, the subtrahend, is changed. It will be evident then that for the sign condition A−M+, where M is subtracted from A, the sign of the difference must always be minus; and for the condition A+M− the sign of the difference must always be plus. It may therefore be concluded that the quantity on the M lines reading from the memory is considered to be the subtrahend and the quantity on the S lines reading from the A Register is considered to be the minuend. Conceptual difficulties will be avoided by keeping the foregoing firmly in mind although in mechanically carrying out the subtraction it will be seen that the quantity on the S lines is in fact the quantity which will be complemented when such complementing is required.

From the foregoing considerations it should be clear that the subtraction operation for quantities of different signs is in fact identical to the addition operation of quantities of the same sign, and that the rules governing complementing will be the same in both cases. That is, no complementing is required on the $S_1$ portion and no correction is required on $S_2$.

Consider now the conditions where the signs of the quantities are the same, A+ M+ and A− M−. It will be appreciated that changing the sign of the subtrahend (M lines quantity) during a subtraction operation produce a situation which is effectively the same as an addition operation where the signs of the quantities are different. Consider first the sign condition A+ M+. For the magnitude condition A>M it will be appreciated that the difference must take the sign of the quantity of larger magnitude and will therefore be plus. Similarly, for the condition A<M the sign of the difference must be minus. For the condition A=M the magnitude of the difference will be zero and here again by convention the sign of zero is considered plus. By similarly considering the sign condition A− M− it will be seen the sign of the difference for the three conditions of relative magnitude should be as indicated in the table. Consider now the necessity for complementing one of the quantities involved in the subtraction. The normal rules of subtraction dictate that the subtrahend should be complemented. However the computer always complements, if at all, the quantity on the S lines. It would appear therefore that the quantity on the S lines should be considered the subtrahend, but as as has been seen from sign considerations it is really the minuend. No problem in fact is created by this situation. As before, in the consideration of the cases in an addition operation where the sign of the quantities are different it is necessary to complement since the Adder of FIG. 18 can only add and does not subtract. In the instant cases therefore, where a subtract operation is called for and the signs of the quantities to be subtracted are the same, the quantity on the S lines out of the A Register is complemented. These instant cases are governed by rules analogous to the rules for the addition of quantities of unlike signs. That is, 4 of the 6 possible cases (A<M, A=M) will yield a correct answer, but in 2 cases (A>M) the answer will be the complement of the true answer. In order to obtain the true answer in these two cases the answer obtained during the first part of the subtraction operation $S_1$, must itself be complemented. The same test utilized in the addition operation for quantities of unlike signs is applicable here. If the difference obtained during the $S_1$ portion of the subtraction cycle produces a decimal carry the answer obtained is the true answer, whereas if no decimal carry is produced then the difference obtained is the complement of the true answer and must itself be complemented during the $S_2$ portion. The foregoing rules with regard to complementing of the quantity on the S lines out of the A Register for a subtraction operation may be summarized as follows:

(1) Signs of the quantities different (A−M+, A+M−)
- (a) Do not complement on $S_1$
- (b) Do not complement on $S_2$ (2) Sign of the quantities alike (A+M−, A−M−)
- (a) Complement on $S_1$
- (b) Complement on $S_2$ if *no* decimal carry out of 10th difference digit position (A>M)
- (c) Do not complement on $S_2$ if decimal carry out of 10th difference digit position (A<M, A=M)

The reason for tens complementing rather than nines complementing can now be seen. It should be clear from general considerations that complementing a number to *any* base and adding it to a second number will always produce a correct sum if the number of times that complementing is performed is *even*, whether such complementing is performed prior to or after the summation. If, however, the number of times that complementing is performed is *odd*, then a complement base of 10 must be used to obtain a correct sum in the decimal system. Examination of the rules for complementing shows that when the signs of the quantities are different for addition or alike for subtraction an *odd or even* number of complementing operations may be required. Therefore, since an *odd* number may be required, it is mandatory that the tens complements be employed.

Understanding now the general method of addition and subtraction turn to an examination of the manner in which this method is implemented. FIGS. 44A and 44B represent a logical block diagram of the method of carrying out the addition and subtraction operations. The clearest understanding will be had by referring to these figures in conjunction with the detailed diagram of the logical components illustrated thereon.

The Addition or 70 instruction is an order to algebraically add the contents of a memory location designated by the "*m*" address of the instruction word to the contents of the A Register and to put the result in the A Register. The Subtraction or 75 instruction is an order to algebraically subtract the contents of a memory location designated by the "*m*" address from the contents of the A Register, and to put the result in the A Register. Assume now that an augend or a minuend which has been read into the A Register 15 by a previous instruction is presently circulating there, and that the sign of the augend or minuend is stored in the sign of (*r*A) flip-flop 11B. Further assume that the P9 and P10 digits of the instruction word read from the memory during the previous $\beta$ transfer have been staticized and decoded by Static Register 25 as a 70 or 75 instruction and transmitted to the Instruction Decoder 26. Since both the 70 and 75 instruction decode with zeros in the STR1 and STR2 positions ($\overline{STR1}$ and $\overline{STR2}$), a memory search will be instituted by Instruction Decoder gate 26–1A. This search will be an "*m*" address search for an addend if the instruction is a 70 and will be for a subtrahend if the instruction is a 75, and will be carried out as previously described in the section on Address Selection. Refer now to the Instruction Decoder gates 26–4A and 26–5A. It will be observed that the signal input conditions for these gates are identical except for the fact that gate 26–4A requires an $\overline{STR2}$ signal whereas gate 26–5A requires an STR2 signal. It will be further observed that neither of these gates 26–4A and 26–5A require either an STR3 or $\overline{\mathbf{STR3}}$ signal. Recalling that the instruction numbers for the Addition and Subtraction operations are respectively 70 and 75, it is seen that the only distinction in the biquinary coded representations resides in the STR3 bit position. That is, the Addition or 70 instruction decodes as an $\overline{STR3}$ condition whereas the Subtraction or 75 instruction decodes as an STR3 condition. It may therefore be concluded that neither of these gates is able to distinguish between Addition and Subtraction orders, and as will be subsequently seen the determination of the order is controlled directly by the STR3 and $\overline{\mathbf{STR3}}$ signal lines from the Static Register 25. Gate 26–4A controls the generation of control signals required for the $A_1$ or $S_1$ portion of the Addition or Subtraction operations, whereas gate 26–5A provides the same function for the $A_2$ or $S_2$ portion. The $A_1$ $S_1$ Instruction Decoder gate 26–4A is not immediately selected because it requires an STR1 signal not an $\overline{STR1}$ signal. However, during the last minor cycle of the "*m*" address or data search, Static Register gate 25–4 passes a *t*10B– timing signal from the Cycling Unit which sets the Static Register flip-flop A to its STR1 state at time *t*11B. Decoder gate 26–4A is therefore selected and generates the (4A) (not shown) high level signal at time *t*0A. The (4A) high level signal is transmitted to the Control Encoder 27, which in response thereto generates the (4), (64), (75) and (50) low level signals and the 55+ high level signal at time *t*0B. The (55+) high level signal jams the recirculation gates 15–1 of the A Register 15 so that the information reading out of the A Register through the subtrahend buffers 19 and onto the S lines does not recirculate within the register. This clears the A Register and prepares it to receive the result of the Addition or Subtraction being generated by the Adder circuits of FIGS. 18A and 18B. The (50) low level signals opens the Adder output gates 18–45 to 18–64 so that the result of the Addition or Subtraction may be read back into the now being cleared A Register 15. Because of the time, *t*0B, at which the (50) control signal appears to alert Adder output gates 18–45 to 18–64, the first bits on the S lines out of the A Register 15 that can be effective within the Adder are the bits of P0, and these bits appear on the S lines at time *t*0B. Simultaneously, the operand in the memory which was found on the just completed "*m*" address search reads out onto the M lines through the Minuend Buffers 20 with the timing P0=*t*0B. The quinary bits of each digit on the M and S lines are routed to the Adder input gates 18A, and all 4 bits of these digits are also routed to the comparator circuits, the binary bits going to the binary bit 1 and decimal carry gates 17B, the binary and quinary bits going onto the quinary carry gates 17C, and the quinary bits going to quinary equality gates 17D. For an understanding of the generation of the particular signals by the comparator circuit 17A in response to signals from the comparator circuits 17B, 17C and 17D, reference should be made to the detailed description of the comparator FIG. 17. Likewise, for an understanding of how these signals generated by the comparator circuit 17A are utilized in the Adder reference should be made to the detailed description of the Adder circuits, FIG. 18.

The (4) low level control signal partially alerts input gates 21–1 to 21–4 of the complement flip-flop 21, partially alerts input gates 11–3, 11–5, 11–6 to the Sign of (*r*A) Flip-Flop 11B, partially alerts input gate 22–23 to the Overflow Flip-Flop 22A, and partially alerts input gates 27–40 and 27–41 of the Control Encoder 27. Complementer Flip-Flop input gates 21–1 to 21–4 determine whether or not the Complement Flip-Flop 21 should be set to its CP state at the beginning of an $A_1$ or $S_1$ cycle. These gates have been fully explained in the detailed description of the Complementer Flip-Flop (FIG. 21). However, briefly recapitulating, these gates operate in the following fashion. It will be recalled from the immediately preceding discussion of the general method to be employed in the Addition and Subtraction operations that the rules for complementing during the $A_1$ or $S_1$ portion are:

Addition—Complement if signs are different, and
Subtraction—Complement if signs are alike.

It will be seen that the $\overline{\text{STR3}}$ signal from the Static Register 25, denoting that the operation is Addition, partially alerts gates 21–1 and 21–2, and that the STR3 signal from the Static Register 25 denoting that the operation is Subtraction partially alerts gates 21–3 and 21–4. In addition, the sign of the augend or minuend, plus or minus, is applied to these gates from the Sign of (*r*A) Flip-Flop 11B, as is the sign of the addend or subtrahend contained in the P0 LSB of the word reading from the memory through the Minuend Buffers 20 and out onto the M lines. An $\overline{M}_1$ bit designating that the sign is plus and an $M_1$ bit designating that the sign is minus. The Addition and Subtraction operations will be most clearly understood by postulating three separate cases which may occur. These cases are:

(1) No complementing required on either $A_1$ or $A_2$ (or $S_1$ or $S_2$).

(2) Complementing required on $A_1$ or $S_1$ but not on $A_2$ or $S_2$.

(3) Complementing required on both $A_1$ or $S_1$ and $A_2$ or $S_2$.

These three cases will be considered in the order indicated. Consider now the first case. Assume that the operation to be performed is Addition and the signs are alike, or that the operation to be performed is Subtraction and the signs are different. In either case, as previously explained, the Complement Flip-Flop with *not* be set to its CP state by a *t*0B– timing signal from the Cycling Unit because none of the gates 21–1 to 21–4 has been fully alerted. The Complement Flip-Flop 21 therefore remains in the $\overline{\text{CP}}$ state to which it had been cleared at the end of the previous minor cycle by a *t*11B+ timing signal from the Cycling Unit. The $\overline{\text{CP}}$ signal is routed to certain of the Adder input gates shown on FIG. 18A and determines that the quinary portion of the augend or minuend from the A Register 15, reading through the subtrahend buffers 19 onto the S lines, shall not be nines complemented. The $\overline{\text{CP}}$ signal is also routed to the comparator Binary Bits "1" and decimal carry gates FIG. 17B, and certain of the comparator quinary carry gates FIG. 17C. These comparator gates compare the quantities on the M and S lines and generate signals which are needed by the Adder FIGS. 18A and 18B for the formation of the sum or difference, and by certain other gates which will be subsequently explained. Moreover, the $\overline{\text{CP}}$ signal is also routed to alert Overflow Flip-Flop input gate 22–23. This latter gate, which is also partially alerted by the (4) low level control signal will set the Overflow Flip-Flop 22A to its OF state in response to a *t*11B– timing signal at the end of the $A_1$ or $S_1$ portion, provided that a decimal carry out of the 10th sum or difference digit position occurs. This decimal carry is indicated by the presence of A and C signals from comparator circuit 17A. The OF signal from the Overflow Flip-Flop 22A partially alerts "C+1" address gate 22–24 so that the "C+1" address will be looked for on the search operation following the completion of the Addition or Subtraction operation being presently performed. The exact way in which this is achieved has already been explained in the detailed description of Address Selection, to which reference should be made for a clear understanding of the functional interrelationships among logical elements 22A, 22B, 12B, gate 22–24 and 25–4. The gate 22–23, which causes the "C+1" address to be searched for in the search operation following the Addition or Subtraction operation indicates that the result of the just performed Addition or Subtraction has exceeded the capacity of the A Register. If such a situation arises it may be desirable to shift the computer program, and this may be readily done by placing the address of an alternative instruction in the "C+1" memory location.

Since it has been assumed that the Complement Flip-Flop 21 is in its $\overline{\text{CP}}$ state it will be seen that the Sign of (*r*A) Flip-Flop 11B input gates 11–3, 11–5, and 11–6 perform no function since they require the CP signal for alerting. A similar condition will be seen to exist for Control Encoder input gates 27–40 and 27–41. Additionally the existence of TS Flip-Flop input gates 12–8 and 12–9 (alerted by the (75) control signal) is immaterial since the effect produced by these gates is utilized by gate 11–3 which has been shown to be inoperative by virtue of the absence of the CP signal. The remaining low level control signal not yet discussed, the 64 signal, is applied to and alerts Static Register gate 25–5 which initiates the $A_2$ or $S_2$ portion of the Addition or Subtraction operation. Toward the end of the $A_1$ or $S_1$ portion a *t*10B– timing signal from the Cycling Unit is passed through alerted gate 25–5 and sets Static Register Flip-Flop B to its STR2 state at time *t*11B. This shift of state of the Static Register Flip-Flop B from its $\overline{\text{STR2}}$ to its STR2 state causes Instruction Decoder gate 26–4A to become unselected and decoder gate 26–5A to be selected. The unselecting of decoder gate 26–4A causes the (4A) high level signal to be suppressed at time *t*0A with the consequent suppression at time *t*0B of the control signals generated by Control Encoder 27. The selecting of decoder gate 26–5A causes the (5A) high level signal to be generated at time *t*0A which is transmitted to the Control Encoder 27 causing the generation at time *t*0B of the (50) and (67) low level signals and the 55+ high level signal. The (74) low level signal shown on FIG. 44 will not be explained now, but will be explained in connection with those operations wherein the Complement Flip-Flop 21 is set to its CP state during $A_1$ or $S_1$. By the end of the $A_1$ or $S_1$ portion just completed, the result of the Addition or Subtraction had been read back into the A Register. During the $A_2$ or $S_2$ operation now commencing the result of the Addition or Subtraction just read into the A Register reads out of the A Register 15 through the subtrahend buffers 19 onto the S lines, and again through the Adder 18A and 18B back into the A Register 15 through Adder gates 18–45 to 18–64 which are alerted by the (50) low level control signal. While this recirculation of the contents of the A Register through the Adder is taking place the (55+) high level signal jams the A Register recirculation gates 15–1 just as during the $A_1$ or $S_1$ portion of the operation. The (67) low level control signal alerts Static Register ending-pulse gate 25–16 which passes a *t*9B− timing signal from the Cycling Unit to the "Clear Line" of the Static Register 25 causing the Static Register Flip-Flops to be cleared to their zero or barred state at time *t*11B, thus unselecting decoder gates 26–5A and selecting decoder gate 26–1A resulting in the initiation of a search for the next instruction. The unselecting of decoder gate 26–5A suppresses the (5A) high level signal at time *t*0A and thereby suppresses the (50), (67) and (55+) control signals at time *t*0B. Selected decoder gate 26–1A generates the (1A) high level signal at time *t*0A resulting in the generation of the control signals needed for the next search operation.

Consider now case 2 which includes the several cases of Addition and Subtraction requiring the Complement Flip-Flop 21 to be set to its CP state during $A_1$ or $S_1$.

Assume that the operation to be performed is Addition and the signs are unlike, or that the operation to be performed is Subtraction and the signs are the same. In either case, as previously explained in the detailed description of the Complementer Flip-Flop FIG. 21, one of the gates 21–1 to 21–4 will be selected by a *t*0B− timing signal from the Cycling Unit, and an output signal therefrom will be transmitted to the CP FF 21. This signal will cause the generation of one of the signals $CP_1$ to $CP_4$ at time *t*1A, and will also cause the CP FF to be set to its CP state at time *t*1B. The $CP_1$ to $CP_4$ signal is routed to the Comparator Circuits 17A where it causes an A and C signal pair to be generated at time *t*1B. These A and C signals are in turn transmitted to the quinary equality gates 17D and certain of the quinary carry gates 17C, appearing thereon at time *t*1B. It is seen therefore, that the $CP_1$ to $CP_4$ signal was required to force the generation of the A and C signals so that these latter signals will exist at time *t*1B at the gates requiring them as alerting signals. Although the generation of A and C signals at the same time is indicative of a decimal carry it will be appreciated that this first A and C signal pair does not convey such a meaning, but is required to allow the aforementioned gates to be rendered operative for the comparison of the P1 digits appearing on the M and S lines at time *t*1B and to effect a "tens" complementing action of the digits on the S lines. The generation of A and C signals for each subsequent digit is controlled by the result of the previous digit pair comparison. The CP signal is routed to the comparator binary bit "1" and decimal carry gates 17B, to the quinary equality gates 17D and certain of the quinary carry gates 17C. All of these comparator gates compare the quantities on the M and S lines and generate signals which are needed by the Adder FIG. 18A and 18B for the formation of the sum or difference, and by certain other gates which will be subsequently explained. The CP signal is also routed to certain of the Adder input gates shown on FIG. 18A and determines that the quinary portion of the augend or minuend from the A Register 15, reading through the Subtrahend Buffers 19 onto the S lines, shall be complemented. It will be recalled from the earlier general discussion of the Addition and Subtraction operation that the ten's complement is utilized. The extra unit required to provide the ten's complement is supplied by the first A and C signal pair generated by the $CP_1$ to $CP_4$ signal as already explained. The A and C signals which are generated by Comparator Circuits 17A according to the digits existing on the M and S lines are routed to certain of the Adder input gates shown on FIG. 18A receiving information from the M lines. The specific manner in which the signals generated by the Comparator Circuits 17A are combined in the Adder with the information on the M lines has been described in detail in the explanation of the Adder FIG. 18, and reference should be had thereto for complete understanding. Moreover, the CP signal is also routed to the Control Encoder input gates 27–40 and 27–41, and to the Sign of (*r*A) FF input gates 11–3, 11–5, and 11–6. Control Encoder input gates 27–40 and 27–41 will be discussed in more detail in the description of case 3 to be presented later. The significance of the Sign of (*r*A) FF input gates 11–3, 11–5, and 11–6 will now be explained. In this regard refer to Table IX, shown below, which contains an extraction of certain conditions previously illustrated, in Tables VII and VIII, which should also be referred to.

TABLE IX

| Sign of (rA) FF | Gate | Add | Subtract | Relative Magnitude |
|---|---|---|---|---|
| − | 11-6 | A+ M− | A+ M+ | A<M |
| + | 11-5 | A− M+ | A− M− | A<M; A=M |
| + | 11-3 | A− M+ | A− M− | A=M |
| | | A+ M− | A+ M+ | |
| | | CP Makes Sign of M Immaterial | | Decimal Carry |

The first column of Table IX indicates the sign condition to which the Sign of (*r*A) FF 11B must be set for specified conditions of relative sign and magnitude. These conditions of relative sign and magnitude are shown in cols. 3, 4 and 5 of the table, col. 2 showing the gate which is effective to produce the sign conditions shown in col. 1. Referring back now to Tables VII and VIII it will be seen that the cases illustrated in Table IX are for the relative magnitude conditions A<M and A=M where the signs of the quantities are different for an add operation or where the signs of the quantities are the same for a subtract operation. It will be seen from Tables VII and VIII that in six of the eight possible cases the sign of the result is different from the initial sign stored in the Sign of (*r*A) FF 11B. These six cases then represent the situations in which the Sign of (*r*A) FF must have its state changed. From the tables it will be observed that these cases all occur during Addition or Subtraction operations when it is required that the S line information be complemented. This condition is satisfied by the requirement on gates 11–3, 11–5, 11–6 of the CP signal. Additionally, from the tables it is seen that a decimal carry from the P10 digit will be generated as a result of the Addition or Subtraction operation. The presence of a decimal carry is a clear indication that the relative magnitude of the quantities is either A<M or A=M, and can not be A>M because the latter case will produce no decimal carry. The A and C signals indicative of a decimal carry are required inputs to gates 11–5 and 11–6 but not to gate 11–3. The (4) low level control signal alerts all three of the aforementioned gates which are sampled at time *t*11B by a *t*11B– timing signal from the Cycling Unit. The remaining signals of 11–5 and 11–6 are respectively A– and A+, which are the sole means of distinguishing these gates from each other. Gate 11–3 is a gate which tests only for the relative magnitude condition A=M and does not test for the condition A<M. The TS, E*q*, and A′ signals shown as required inputs to this gate have the following significance. The TS signal from TS FF 12B indicates that total equality of the digits on the M and S lines existed for the digits P1 to P9 inclusive. The E*q* signal generated by the Quinary Equality gates 17–D via the Comparator Circuits 17A indicates equality of the Quinary Portion of the P10 digits, and the A′ signal generated by the Binary Bit "1" gates 17B via the Comparator Circuits 17A indicates equality of the Binary Bits of the P10 digits. It is clear therefore that the presence of these three signals TS, E*q*, and A′ indicates complete equality of the digits P1 to P10. It will be observed from the Comparator Circuits 17A that the generation of E*q* and A′ signals also implies the generation of A and C signals. The requirement of A and C signals are inputs to gate 11–3 would therefore be redundant and such requirement is dispensed with. Gates 11–3, 11–5 and 11–6 are sampled at time *t*11B of the $A_1$ or $S_1$ portion because it is not until this time that the conditions of relative magnitude can be finally determined by the Comparator Circuits 17A, 17B, 17C and 17D. Since gates 11–5 and 11–6 test for the relative magnitude conditions A<M; and A=M it might appear that gate 11–3 which tests solely for the condition A=M is redundant. This however is not the case. Gate 11–3 is required to make provision for the one case where gate 11–6 will produce an erroneous sign condition. This erroneous sign condition would be produced in the circumstance where the sign of the quantity on the S lines is plus and the sign of the quantity on the M lines is minus for an Addition operation or plus for a Subtraction operation, the magnitude of both quantities being equal (A=M). It will be appreciated that in these cases the result of the addition or subtraction will be zero and should therefore take a positive sign; but examination of gate 11–6 shows that in either of these cases the Sign of (*r*A) FF 11B will be set to its minus state. Gate 11–3 will insure that the Sign of (*r*A) FF 11B will be maintained in its plus state by overriding the effect of gate 11–6.

Consider now the generation of the signals TS, E*q*, and A′ which are utilized by gate 11–3, bearing in mind that these signals are required at time *t*11B. Examine first TS FF 12B together with its input gates 12–8 and 12–9. It is seen that both gates 12–8 and 12–9 have as required inputs a (75) low level control signal and the *t*0B+ and *t*1B+ high level timing signals, gate 12–8 also requiring an $\overline{Eq}$ low level signal and gate 12–9 requiring an $\bar{A}'$ low level signal. The *t*0B+ and *t*1B+ timing signals jam the gates at these times rendering them insensitive to a coincidence of the low level (75) signal and the $\overline{Eq}$ or $\bar{A}'$ low level signal. The $\overline{Eq}$ low level signal required by gate 12–8 indicates that quinary equality was not obtained for some comparison of the digits on the M and S lines. Whereas the $\bar{A}'$ low level signal required by gate 12–9 indicates that binary equality was not obtained for some comparison of the digits on the M and S lines. If either of these gates should be selected during the comparison then the TS FF 12B will be cleared to its $\overline{TS}$ state thus removing the TS signal from gate 11–3 and indicating that A≠M. Examination of gates 12–8 and 12–9 reveals that no low level timing signals are utilized as required inputs and that therefore these gates would be active during the entire $A_1$ or $S_1$ minor cycle if it were not for the jamming action of the high level timing signals *t*0B+ and *t*1B+. The *t*1B+ timing signal jams the gates 12–8 and 12–9 so that the comparison of the P0 digits on the M and S lines will not be effective to clear the TS FF should a sign difference exist. This is desired because these gates are only utilized to provide a magnitude comparison, the sign conditions being taken care of by gates 21–1 to 21–4 and 11–3, 11–5 and 11–6 as already explained. The *t*0B+ timing signal jams gates 12–8 and 12–9 to render them insensitive to the result of a comparison of the space between words (SBW) or P11 digits of the previous words on the M and S lines, such words not being involved in the result of the Addition or Subtraction being carried out. These gates then 12–8 and 12–9 are active to take into account the result of the comparison of the digits P1 through P10. However, because of the delays involved in the signal propagation path from the M and S lines through the Comparator Circuit and the TS FF to gate 11–3 the result of the comparison of the P10 digits will arrive at gate 11–3 later than time *t*11B when the gate is sampled. The result of the last digit comparison that can have any effect at gate 11–3 insofar as the TS signal is concerned is the comparison of the P9 digits. It is therefore necessary to provide some means other than the TS signal at gate 11–3 to indicate the equality or non-equality of the P10 digits. The means employed are the E*q* or A′ signals which are taken directly from the Comparator Circuits 17A. The E*q* and A′ signals can only indicate that the P10 digits were equal and can convey no information whatever with regard to the earlier digits. The existence of the TS signal at time *t*11B indicates that equality was maintained for all previous information digits.

At the same time that a *t*11B timing signal gates 11–3, 11–5 and 11–6 to determine what the sign of the result shall be, input gates 27–40 and 27–41 to the Control Encoder 27 are also being sampled by a *t*11B– timing signal. Examination of gates 27–40 and 27–41 shows that the required input signals common to both of these gates are the *t*11B– timing signal, the (4) low level control signal, and the CP signal from the complement FF 21, and that gate 27–40 also requires an $\bar{A}$ signal whereas gate 27–41 requires a $\bar{C}$ signal. The gates 27–40 and 27–41 determine whether or not it is necessary to complement during the $A_2$ or $S_2$ portion the result obtained during $A_1$ or $S_1$. Comparison of gates 27–40 and 27–41 with the gates 11–3, 11–5, 11–6 will show that these two groups of gates are mutually exclusive. That is, gates 27–40 and 27–41 require the $\bar{A}$ or $\bar{C}$ signal whereas 11–5, 11–6, and 11–3 by implication, require A and C signals. Since both groups of gates are sampled at the same time *t*11B and neither A and $\bar{A}$ nor C and $\bar{C}$ signals can exist simultaneously, the mutually exclusive operation of these groups of gates is apparent. Reference back to Tables VII and VIII will show that a decimal carry, characterized by the presence of A and C signals, is an indication that no requirement for complementing during $A_2$ or $S_2$ of the result obtained during $A_1$ or $S_1$ is necessary. It is also seen that if no decimal carry is obtained, which is characterized by the presence of $\bar{A}$ and/or $\bar{C}$ signals, that it is required to complement during $A_2$ or $S_2$ the result obtained during $A_1$ or $S_1$. It may therefore be concluded that neither of the gates 27–40 and 27–41 will be selected for the condition of case 2 which has just been discussed. For case 3 however either or both of gates 27–40 and 27–41 may be selected, and none of gates 11–3, 11–5, and 11–6 will be selected. For both case 2 and case 3 the (50), (55+), and (64) control signals will perform the same functions as already previously described for case 1 where no complementing took place. Case 3 however differs from both case 1 and case 2 during the $A_2$ or $S_2$ portion of the operation in that the selection of either gate 27–40 or 27–41 at time *t*11B of $A_1$ or $S_1$ will cause the generation of the (74) low level control signal at time $t$0B of $A_2$ or $S_2$, in addition to the generation of the (50), (55+), and (67) control signals, these latter three signals being generated also for case 1 and case 2. The (74) low level control signal and $t$0B– timing signal from the Cycling Unit cause input gate 21–5 of the Complement FF 21 to be selected. The output signal from selected gate 21–5 is transmitted to the Complement FF 21 generating a CP5 signal at time $t$1A and setting the CP FF to its CP state at time $t$1B. The CP5 and CP signals cause the result obtained during $A_1$ or $S_1$ to be complemented when such result is read from the A Register 15 through the Subtrahend Buffer 19 and into the Adder 18A and 18B, the complemented result being then read out of the Adder gates 18–45 to 18–64 and back into the A Register. During this portion of the operation ($A_2$ or $S_2$) none of the gates 21–1 to 21–4, 11–3, 11–5, 11–6, 12–8, 12–9, 27–40, and 27–41 are operative since the required (4) and (75) control signals are absent. The (50), (55+), and (67) control signals which are also present during the $A_2$ or $S_2$ portion perform the same function in the same manner as already earlier explained in the description of case 1. This completes the description of the Addition and Subtraction operations.

*Multiplication—FIGURES 45A, 45B and 45C*

Understanding the philosophy and method for implementation of the process of addition, turn now to a consideration of the multiplication operation which utilizes addition. Multiplication will be best understood by employing the system just used to explain addition, that is, by first analyzing the general method or philosophy and by then proceeding to a detailed description of the manner in which the general method is implemented.

Basically, multiplication may be considered to be a process of iterative addition wherein the multiplicand is added to an initial zero the number of times indicated by the multiplier. For example, if it is desired to multiply the number 123 by the number 321, then the number 123 can be successively added to zero 321 times to yield a product 39483. This is a time consuming process and many shorthand schemes have been employed to reduce the computation time. One of these schemes is employed in the familiar longhand system of multiplication and utilizes a system of shifting the partial products. For instance, using the same numbers as for the previous example, the longhand method computes the product as follows:

```
  123  Multiplicand
 ×321  Multiplier
 ----
  123
 246
369
-----
39483  Product
```

It can be seen that the process employed in the familiar longhand multiplication process consists of the following steps.

(1) Add the multiplicand to zero the number of times indicated by the least significant digit (LSD) of the multiplier, or, 000+123=123, the first partial product.

(2) Form the second partial product by adding the multiplicand to zero the number of times indicated by the next most significant digit (LSD+1) of the multiplier, or 000+123=246=second partial product.

(3) Write the second partial product under the first partial product, but shift the second partial product left one digit position, that is,

```
 123
246   shifted left
```

(4) Repeat Step (2) for the third partial product.

(5) Repeat Step (3) for the third partial product, wherein the second partial product is shifted one place to the left of the second partial product.

(6) Sum the partial products to obtain the final product.

The process above outlined may be considered in a somewhat alternative view. It may be considered that instead of shifting left each partial product just-formed before writing it under the previously formed partial product, that the just-formed partial product is not shifted at all, but that *all* previous partial products are shifted right. This right shift merely constitutes a point of view and is in every way the equivalent of the left shift process which seems to be employed in the longhand multiplication process. A right-shift process is in fact what is employed in the multiplication process to be described. It should be clear from Step (6) above that the utilization of the longhand method requires that some sort of storage means be available to preserve the partial products until the time for summation. In a computer which can multiply two ten-place numbers this storage requirement would necessitate ten registers, or their equivalent, to store the ten partial products. This involves a great deal of equipment, and such equipmient is by-passed by employing a deviation from the straightforward longhand method. The deviation consists of adding each partial product, as it is being formed, to the right-shifted previous partial products, and *not* by adding it to zero. This removes the necessity for storing the individual partial products for later summation by performing the summation along with the formation of the individual partial products. This can be illustrated as follows. Assume, as will later be seen, that a multiplicand is stored in one register (the L Register), that a multiplier is stored in a second register (the X Register), and that a third register (the A Register) is initially cleared and will be used to store the sum of the accumulating partial products. Further assume that a sentinel is inserted into the A Register and transferred into the X Register at the digit position immediately to the left of the most significant multiplier digit. This sentinel will be used to terminate the multiplication operation and will be shown as the letter "S" in the example to follow. Finally, assume that the LSD of the multiplier is shifted into a counter which controls the number of additions of the multiplicand to the accumulating partial product in the A Register. The example will be illustrated twice, first to show the similarity to the longhand method, and second in more detail to illustrate the steps more clearly. The first illustration now follows:

[Multiplicand (rL)=123 Multiplier (rX)=321]

```
Add    ⎧initial (rA)    000
       ⎪        (rL)   +123
       ⎪                ---
(rL)   ⎩  (rA+rL)       123  =first partial product
  once

Add    ⎧new     (rA)   0123  =first partial product shifted right
       ⎪        (rL)   +123
       ⎪               ----
(rL)   ⎨  (rA+rL)      1353
twice  ⎪        (rL)   +123
       ⎪               ----
       ⎩ (rA+2rL)      2583  =sum of first and second partial products

       ⎧new     (rA)  02583=sum of fi-st and second partial products
       ⎪        (rL)   +123   shifted right
       ⎪              -----
Add    ⎪  (rA+rL)     14883
(rL)   ⎨        (rL)   +123
       ⎪              -----
3 times⎪ (rA+2rL)     27183
       ⎪        (rL)   +123
       ⎪              -----
       ⎩ (rA+3rL)     39483=sum of first, second and third
                              partial products=final product
```

Terminate operation.

The first illustration shows that the process to be employed basically consists of:

(1) Add the multiplicand to the contents of an accumulator to form the first partial product, and store the sum in the accumulator.

(2) Shift right the first partial product stored in the accumulator.

(3) Add the multiplicand to the shifted first partial product to form the sum of the first and second partial products and store this sum in the accumulator.

(4) Shift right the sum of the first and second partial products stored in the accumulator.

(5) Add the multiplicand to the shifted sum of the first and second partial products and store this total in the accumulator.

Understanding now the basic method of multiplication, the second illustration will be conducive to a fuller understanding of the detailed description, to be subsequently presented, and of the manner in which the basic method is implemented.

It should be kept in mind that the multiplication of a "$p$" digit number by a "$p$" digit number can produce a product having "$2p$" digits. In these illustrations a pair of 3 digit numbers are used, so that the product could be a six digit number. In the instant computer designed to handle 10 digit numbers therefore, a 20 digit product could be formed. However, as has been seen from the detailed descriptions of the registers, the registers have only a ten digit capacity. The least significant digit of the product being accumulated would therefore be lost during each right-shifting step with the consequent loss of the ten least significant digits of the final product. In order therefore to preserve the ten least significant digits of the final product, the least significant digit is shifted out of the A Register (accumulator) and into the most significant digit position of the X Register each timė the right shifting process occurs. This does not interfere with the multiplier digits stored in the X Register because they too are being shifted right, the least significant multiplier digit in the X Register being shifted out and into the counter for controlling the number of additions to be next performed. A twenty place product can thus be stored in the combined A and X Registers, the ten most significant digits being in A and the ten least significant digits being in X. It should also be clear that the shifting of the LSD out of the A Register and into X during each right-shift process does not interfere with the subsequent addition of the multiplicand to the accumulated contents of the A Register. That this is so is apparent from an examination of the longhand multiplication process wherein it is seen that the LSD of any given partial product is never involved in the addition to any subsequent partial product. The fact that it is not available for such addition (because it is in X and not in A) is therefore immaterial to the correctness of the final product. In the second illustration, which follows, three-digit registers are illustrated but the same method shown is applicable to registers of any digit length, and hence to the ten-digit registers which have been previously described. In the second illustration, which constitutes an expansion of the first illustration, the following steps take place.

Initial conditions:

Multiplicand=123 stored in the L Register ($r$L)
Multiplier=000 stored in the X Register ($r$X)
Accumulation=000 in the A Register ($r$A)

(1) Read multiplier 321 into X Register and insert a sentinel into the least significant first position of the A Register.

Conditions are now:

| | ($r$X) | Counter |
|---|---|---|
| ($r$A)=00S<br>($r$L)=123 | 321 | 0 |

(2) Shift the sentinel from the LSD of $r$A into the MSD of $r$X, and shift the LSD of $r$X into the counter.

| | ($r$X) | Counter |
|---|---|---|
| ($r$A)=000<br>($r$L)=123 | S32 | 1 |

(3) Add ($r$L) to ($r$A) the number of times indicated by the multiplier digit in the counter and store the accumulation in $r$A.

| | ($r$X) | Counter |
|---|---|---|
| ($r$A) 000<br>($r$L) +123<br>123=($r$A)+($r$L) | S32 | 1 |

(4) Shift the LSD of $r$A into the MSD of $r$X, and shift the LSD of $r$X into the counter.

| | ($r$X) | Counter |
|---|---|---|
| ($r$A)=012<br>($r$L)=123 | 3S3 | 2 |

(5) Same as Step 3.

| | ($r$X) | Counter |
|---|---|---|
| ($r$A) 012<br>($r$L) +123 | 3S3 | 2 |
| ($r$A) 135=($r$A)+($r$L)<br>($r$L) +123 | | 1 |
| 258=($r$A)+2($r$L) | | 0 |

(6) Same as Step 4.

| | ($r$X) | Counter |
|---|---|---|
| ($r$A)=025<br>($r$L)=123 | 83S | 3 |

(7) Same as Step 3.

| | ($r$X) | Counter |
|---|---|---|
| ($r$A) 025<br>($r$L) +123 | 83S | 3 |
| ($r$A) 148=($r$A)+($r$L)<br>($r$L) +123 | | 2 |
| ($r$A) 271=($r$A)+2($r$L)<br>($r$L) +123 | | 1 |
| ($r$A) 394=($r$A)+3($r$L) | | 0 |

(8) Same as Step 4.

| | ($r$X) | Counter |
|---|---|---|
| ($r$A)=039 | 483 | S |

The sentinel which has been shifted into the counter terminates the operation. It will be observed that the final product is the five digit number 039,483 as previously determined by the longhand method, the 2 most significant digits being in $r$A and the 3 least significant digits being in $r$X. Essentially, the foregoing process consists of alternate shift and add operations, each shift operation requiring one minor cycle of computer time and each add operation requiring a variable number of minor cycles as determined by the multiplier digit stored in the counter. The total number of minor cycles required to execute a multiply order is therefore equal to: (1) Some number of minor cycles between 1 and 200 required to locate the multiplier stored in the memory at a location designated by the *"m"* address of the instruction word in the C Register, plus (2) one minor cycle for the initial transfer of the multiplier from the memory to the X Register, plus (3) the number of digits in the multiplier (one shift operation per digit), plus (4) the sum of the multiplier digits (number of add operations), plus (5) one minor cycle for the final shift of the sentinel into the counter. Understanding now the basic method of multiplying and the steps to be performed, turn to a consideration of FIGURES 45A, 45B and 45C arranged as indicated by the inset FIGURE 45, for a more detailed description of the mechanics of executing these steps. The clearest understanding may be had by also referring to the detailed descriptions of the logical elements shown in these figures in conjunction with the foregoing outline of multiplication. The multiply or 85 instruction is an order to multiply (*r*L) by the number stored at a memory location designated by the *"m"* Address of the instruction word in the C Register, placing the ten least significant digits of the product in the X register and the ten most significant digits of the product in the A Register. Assume that a multiplicand which has been read into the L Register 14 by a previous instruction is presently circulating there, and that the sign of the multiplicand is stored in the Sign of (*r*L) FF 11–C. Further assume that the P9 and P10 digits of the instruction word read from the memory during the previous $\beta$ transfer have been staticized and decoded by the Static Register 25 as an 85 instruction and transmitted to the Instruction Decoder 26. Since the 85 instruction decodes with zeroes in the STR1 and STR2 positions ($\overline{\textbf{STR1}}$ and $\overline{\textbf{STR2}}$) a memeory search will be instituted by Instruction Decoder gate 26–1A. This search will be an *"m"* Address search for the multiplier, and will be carried out as previously described in the section on Address Selection. Refer now to the Instruction Decoder gates 26–13A, 26–14A and 26–15A. It will be observed that all three of these gates require as inputs from the Static Register 25 the STR1, STR3, STR4, STR5 and STR6 signals. It will be further observed that both of the gates 26–14A and 26–15A also require an STR2 signal input and that these two gates differ only in that gate 26–15A may be jammed by a high level IER+ signal generated by the IER FF 24C. This jamming action will be explained subsequently in connection with the $M_2$ or execution portion of the multiply operation. Additionally, the gate 26–13A differs from both 26–14A and 26–15A in that the first named gate requires an $\overline{\textbf{STR2}}$ input signal from the Static Register 25, and not an STR2 signal. Gate 26–13A, as will be subsequently seen generates signals which among other things control the transfer of the multiplier from the memory to the X Register during the $M_1$ or set-up portion of the multiply operation. Gates 26–14A and 26–15A are utilized during the $M_2$ or execution portion of the instruction to cause the generation of control signals required for the shift and add phases, gate 26–14A being selected for the entire $M_2$ portion whereas as will be seen; gate 26–15A is active only during the add phases but not during the shift phases. The multiply operation can thus be considered to consist of three basic steps involving four Instruction Decoder gates. These steps are:

(1) *"m"* Address search for the multiplier involving Decoder gate 26–1A, followed by (2) $M_1$—set-up to perform multiplication, including transfer of the multiplier to *r*X involving Decoder gate 26–13A, followed by (3) $M_2$—multiply involving Decoder gates 26–14A and 26–15A.

The $M_1$ Instruction Decoder gate 26–13A is not immediately selected by the staticized instruction because it requires an STR1 signal and not an $\overline{\textbf{STR1}}$ signal. However during the last minor cycle of the *"m"* Address or data search for the multiplier, Static Register gate 25–4 passes a *t*10B– timing signal from the Cycling Unit which sets the Static Register FF A to its STR1 state at time *t*11B. Decoder gate 26–13A is therefore selected and generates the (13A) high level signal at time *t*0A. The (13A) high level signal is transmitted to the Control Encoder 27, which in response thereto generates the (13), (62), (64), (76), (78) and (86) low level signals and the (55+), (56+), and (58+) high level signals at time *t*0B. The (55+) high level signal jams the recirculation gates 15–1 of the A Register 15 thereby clearing the register by preventing recirculation and preparing it to act as an accumulator of the product. The (58+) high level signal jams the output gates 15–10 of the A Register 15 thereby preventing the old contents of the A Register from reading through the Subtrahend Buffers 19 and onto the S lines. The (56+) high level signal jams the recirculation gates 16–1 of the X Register 16 thereby clearing it by preventing recirculation and preparing the register to receive the multiplier from the memory. The (76) low level signal alerts X Register read-in gates 16–5 so that the multiplier which was found during the just completed *"m"* Address memory search may read into the X Register via the Minuend Buffers 20 and the M lines. The (78) low level control signal alerts input gates 11–21 and 11–22 to the Sign of (*r*X) FF 11–A. A *t*0B– timing signal from the Cycling Unit is applied to both gates 11–21 and 11–22, selecting gate 11–22 and thereby attempting to set the Sign of (*r*X) FF 11–A to its plus state. However, if the sign of the multiplier is minus, as evidenced by the presence of a bit in the $M_1$ position of the P0 digit gate 11–21 will also be selected and will set the Sign of (*r*X) FF 11–A to its minus state, overriding the effect of gate 11–22. The (13A) high level signals from the Instruction Decoder jams the Sign of (*r*A) FF 11–B to its minus state. The (13) low level control signal passes a *t*1B– timing signal from the Cycling Unit through sentinel insertion gate 15–6 to the bit 1 and bit 3 channels of the A Register 15. This sentinel (0101) will be propagated through the A Register and will arrive at the LSD position at the proper time to be read out of the A Register and into the MSD position of the X Register during the first $M_2$ or next minor cycle.

The (62) low level control signal passes a *t*0B– timing signal from the Cycling Unit through initial clear gate 23–1 which clears the MQC 23 Flip Flops to the $\overline{Q}_1$, $\overline{Q}_2$, $\overline{Q}_3$ and $\overline{Q}_4$ states, thus partially alerting IER FF input gate 24–3 and preparing the MQC to receive the first multiplier digit from the LSD position of the X Register 16. The (86) low level control signal alerts input gates 11–1 and 11–2 to the Sign of (*r*A) FF 11–B. A *t*11B– timing signal from the Cycling Unit samples these two gates at the end of the $M_1$ portion of the multiply operation to determine the sign of the product which will be subsequently accumulated in the A Register. Under the ordinary rules of multiplication it is known that the sign of the product of two numbers is positive if the signs of the multiplier and the multiplicand are alike, whereas the sign of the product is negative if the signs of the multiplier and the multiplicand are different. The proper sign of the product is established as follows. As has been seen, the (13A) high level signal jams the Sign of the (*r*A) FF 11–B to its minus state thereby assuming that the signs of the multiplier and the multiplicand are different. If in fact the signs of the multiplier and multiplicand are the same, then either gate 11–1 or 11–2 will detect such condition and set the Sign of (*r*A) FF 11–B to plus, overriding the effect of the (13A) high level signal. It will be recalled from an earlier discussion of the philosophy of multiplication that both the A and X Registers will store the product. Since this is so the signs of the contents of both registers must be the same, and therefore, it is necessary that the sign stored in the Sign of (*r*X) FF 11–A conform to the sign stored in the Sign of (*r*A) FF 11–B. Four possible combinations of sign conditions can exist for the multiplier and multiplicand, and these are as follows: L+ X+, L− L−, L− X+, and L+ X−. The first case, or L+ X+, will obviously produce a sign for the product of A+ by virtue of the existence of gate 11–1 and will therefore require that the sign of X also be plus. It is seen however that the sign of X is already plus and therefore no correction to it is required. The second and third cases however result in a situation where the sign of A is different from the sign of X, and the sign of X must therefore be forced to agree with the sign of A. Consider first the case L−X−. Gate 11–2 will set the Sign of (*r*A) FF to its plus state but it is known that the sign of X stored in the Sign of (*r*X) FF 11–A is minus. This sign will be jammed to plus by a ($14_1A$) high level signal which will be generated during and maintained for the entire $M_2$ portion of the multiply operation, so that by the time the product has been formed the signs stored in both sign Flip Flops 11–A and 11–B will agree and be plus. Consider now the third case of L−X+. In this case neither of the gates 11–1 or 11–2 will be selected and the Sign of (*r*A) FF 11–B will be set to minus by the (13A) high level signal. Since, as indicated for the immediately preceding case of L−X−, the ($14_1A$) high level signal will jam the Sign of (*r*X) FF 11–A to plus during the $M_2$ portion, some means must be provided to overcome the effect of this signal and force the Sign of (*r*X) FF 11–A to its minus state. The means utilized to achieve this is the Sign of (*r*X) FF input gate 11–20. As is seen from FIGURE 45 this gate requires the A− signal from the Sign of (*r*A) FF 11–B and the IER signal from the IER FF 24C. The A− signal is known to be present as a result of the jamming action of high level signal (13A). The IER signal will be generated during every shift cycle of the $M_2$ portion of the multiply operation and will exist one-half pulse time after the ($14_1A$) signal disappears at the end of $M_2$. Gate 11–20 will therefore control the final state of the Sign of (*r*X) FF 11A, which will be minus in conformity with the sign stored in the Sign of (*r*A) FF 11–B. Consider now the final case of L+X−. It is seen that the Sign of (*r*A) FF 11–B will be set to its minus state for the same reasons as just discussed for the immediately preceding case of L−X−. It is further seen that since the sign condition X− exists no correction of the sign stored in the Sign of (*r*X) FF 11A should be necessary. However as previously explained for the sign condition L−X−, the ($14_1A$) high level signal will jam the Sign of (*r*X) FF 11A to its plus state during $M_2$. For the instant case of L+X− such jamming action must be prevented, and this is accomplished in exactly the same way as just explained for the immediately preceding case of L−X−, that is, by use of gate 11–20.

The remaining $M_1$ low level control signal (64) alerts Static Register gate 25–5 so that a *t*10B– timing signal from the Cycling Unit may be gated therethrough and cause Static Register FF B to be set to its STR2 state at time *t*11B of $M_1$. This change of state of Static Register FF B causes Instruction Decoder gate 26–13A to become unselected and causes gates 26–14A and 26–15A to be selected. At this same time, *t*11B, IER FF input gate 24–3 becomes fully alerted by the presence of the STR2 signal from the Static Register 25 and hence passes a *t*11B– timing signal from the Cycling Unit which sets the IER FF and causes it to produce the IER $A_{1+}$ high level signal at time *t*0A, the IER low level and IER+ high level signals at time *t*0B, and the IER $A_{2+}$ high level signal at time *t*1A, thus initiating the first shift cycle of the $M_2$ portion of the multiply operation. The unselecting of Instruction Decoder gate 26–13A at time *t*11B causes the (13A) high level signal to be suppressed at time *t*0A with the resultant consequent suppression of the Control Encoder 27 signals whose functions have been previously described. This ends the $M_1$ or set-up portion of the Multiply operation, the $M_2$ portion commencing immediately with the selection of Decoder gates 26–14A and 26–15A. The selecting of Decoder gates 26–14A and 26–15A at time *t*11B of $M_1$ causes the generation respectively of the ($14_1A$) and ($14_2A$) high level signals at time *t*0A of the first minor cycle of $M_2$. The ($14_1A$) high level signal is transmitted to the Sign of (*r*X) FF 11A in connection with which its jamming function has already been described, and to the Control Encoder 27. The Control Encoder 27 in response to the ($14_1A$) high level signal generates the (55+) high level signal and the (66) low level signal at time *t*0B. The IER $A_{1+}$ and IER $A_{2+}$ high level signals generated by the IER FF 24C at time *t*0A and *t*1A respectively are also routed to the Control Encoder 27 where the IER $A_{1+}$ signal causes the generation of the (59) low level control signal for one pulse time at time *t*0B and where the IER $A_{2+}$ signal causes the generation of the (59) low level signal and the (56+) high level signal commencing at time *t*1B. The IER+ high level signal generated by IER FF 24C at time *t*0B is transmitted to the Instruction Decoder 26 and jams Decoder gate 26–15A so that the high level output signal ($14_2A$) from this gate is suppressed at time *t*1B.

The ($14_2A$) high level signal is also transmitted to the Control Encoder 27, which in response thereto generates the (50) and (61) low level control signal at time *t*0B. The IER+ high level signal which was generated by the IER FF 24C at time *t*0B is transmitted to the Instruction Decoder 26 jamming decoder gate 26–15A so that the high level output signal ($14_2A$) is suppressed at time *t*1A, thus suppressing the (50) and (61) low level control signals from the Control Encoder 27 at time *t*1B. It is seen then that the (50) and (61) control signals will exist for one pulse-time only, time *t*0B, during each shift phase due to the action of the IER+ jamming signal. As will be subsequently seen however the IER+ jamming signal will not be present during the add phases and the (50) and (61) signals will be maintained then. The existence of the (50) and (61) low level control signals for the one pulse-time *t*0B does not interfere with the multiplication process for the following reasons. The (50) low level control signal opens the output gates of the Adder 18B at time *t*0B but no information reads out of the "0" lines because one pulse-time earlier, at time *t*11B, the M and S lines were cleared. The S lines were cleared by the action of the (58+) high level signal on gates 15–10, and the M lines were cleared by the action of the read out circuit of FIGURE 31. The (61) low level control signal which alerts MQC count-down gates 23–15 to 23–19 is ineffective because all of these gates require a *t*1B– timing signal from the Cycling Unit and by time *t*1B the (61) signal has been suppressed. From the foregoing it will be appreciated that the Control Encoder signals effectively present for a shift phase of the multiply operation are the (55+) and (56+) high level signals and (59) and (66) low level signals, and that all these signals arise at time $t0B$ except the (56+) high level signal which arises at time $t1B$. In addition the IER low level signal which was generated at time $t0B$ by IER FF 24C is present and will exist for a full minor cycle. The IER signal is routed to three places, sign of product gate 11–20, sentinel detector gate 25–15 and IER–OR input gate 24–16. The IER signal on gate 11–20 enables the A– sign condition from Sign of ($r$A) FF 11B to be gated through to set the Sign of ($r$X) FF 11A to its minus state as previously explained. This gate 11–20 will be ineffective until the end of the $M_2$ operation due to the ($14_1A$) high level signal from the Instruction Decoder gate 26–14A, as also previously explained. The IER signal applied to sentinel detector gate 25–15 partially alerts that gate, but since the sentinel 0101 (which will appear as $Q_1Q_3$ in the MQC) will not appear until the very last shift cycle, this gate will be ineffective at time $t9B$ of this minor cycle. Finally, the IER signal applied to gate 24–16 will gate through a $t0B-$ timing signal from the Cycling Unit to the IER–OR circuit 24B, thereby causing the generation of an IER–OR low level signal for one pulse-time at time $t1B$. This IER–OR signal is applied to MQC input gates 23–2 and permits the $X_1$ to $X_4$ bits of the P1 digit (LSD) out of the X Register 16 to read therethrough, thus inserting the LSD multiplier digit in the MQC $FF_8$ A through D at time $t2B$. The (55+) high level control signal jams recirculation gates 15–1 of the A Register 15, thereby preventing recirculation of the contents of the A Register. The (56+) high level control signal jams the recirculation gate 16–1 of the X Register 16 thereby preventing recirculation of the $X_1$ to $X_4$ bits of the original multiplier stored therein. It will be recalled that the (56+) high level signal arises at time $t1B$ but it can be seen that this is immaterial since the $t0B+$ timing signal from the Cycling Unit jams the recirculation gates 16–1 for the one pulse-time prior to the existence of the (56+) high level signal. The $X_1$ to $X_4$ bits of the original multiplier stored in the X Register are routed to the MQC input gates 23–2 but only the P1 digit or LSD will pass therethrough to set up the MQC FF because the IER–OR signal, as already explained, only alerts these gates for one pulse-time at time $t1B$. The (59) low level control signal alerts right shift gates 15–2 of the A Register 15, right shift gates 16–3 of the X Register 16, and input to the X Register gates 16–7 which allow the LSD of $r$A to read into the MSD position of $r$X. The right shift gates 15–2 and 16–3 for the A and X Registers respectively have ben explained in the detailed descriptions of those registers. Briefly, however, these gates cause the contents of the registers to be recirculated over a one-digit time-shortened loop thereby effectively shifting the contents of the registers to the right. This results in a condition which causes the digit which was formerly the MSD to now occupy a position in the register corresponding to that formerly occupied by the "MSD–1" digit. Similarly this causes the digit which was formerly the "LSD+1" digit to now occupy a position in the register corresponding to that formerly occupied by the LSD, all digits between the original "LSD+1" and the original MSD being similarly shifted one digit position to the right. The original LSD is therefore cleared out of each of the registers and zeros are effectively read into the positions which would contain the right-shifted original LSD'S. It is seen that these zeros will now occupy the MSD position in each of the registers. Input to the X Register gates 16–7 which are alerted by the (59) low level control signal receive the $A_1'$ to $A_4'$ bits of the digits in the A Register which are being right shifted. Reference to the A Register detailed diagram FIGURE 15 will show that the timing for the $A_1'$ to $A_4'$ bits is $P1=t0B$ so that the $t0B-$ timing signal from the Cycling Unit which is applied to the gates 16–7 allows the $A_1'$ to $A_4'$ bits of P1 out of the A Register to read into the X Register. This P1 digit it will be recalled contains the sentinel (0101) which was read into the A Register at time $t1B$ of the $M_1$ minor cycle. Reference to the detailed diagram of the X Register FIGURE 16 will show that the P1 or Sentinel digit being read into X is read into the MSD position of the Register. The (66) low level control signal opens the output gates 14–4 of the L Register 14 thereby allowing the contents of the register to read through the Minuend Buffers 20 onto the M lines and into the Adder input gates 18A. Also, since the (58+) high level signal is not present during $M_2$ the A Register output gates 15–10 are not blocked and the contents of the A and L Registers are thus seen to be reading into the Adder circuits 18A and 18B, no effective addition is performed however since the Adder output gates 18–45 to 18–64 are not open due to the absence of the (50) low level control signal. At time $t11B$ a $t11B+$ timing signal from the Cycling Unit is applied to the IER FF 24C causing the IER $A_{2+}$ high level signal to be suppressed at time $t0A$ and causing the IER+ high level and IER low level signals to be suppressed at time $t0B$, thus ending the first shift phase and initiating the first Add phase. Before describing the Add phase a recapitulation of the first shift phase will be helpful. The first shift phase accomplished the following things.

(1) The LSD of the Multiplier stored in the X Register 16 was transferred to and staticized by the MQC FF, this staticized number will be used to control the number of times the multiplicand stored in the L Register 14 will be added to the contents of the A Register 15 during the Add phase which is about to begin.

(2) The contents of the A Register 15 and the X Register 16 have been shifted right one digit position, thereby transferring the sentinel from the A Register to the MSD position of the X Register.

Return now to a consideration of the Add phase of the Multiplication operation. The suppression of the IER $A_{2+}$ high level signal from the IER FF 24C causes the suppression of the (56+) high level signal and the (59) low level signal from the Control Encoder 27. The suppression of the IER+ high level signal at time $t0B$ releases Instruction Decoder gate 26–15A so that a ($14_2A$) high level signal arises at time $t1A$. The ($14_2A$) high level signal is transmitted to the Control Encoder 27 which in response thereto generates the (50) and 61 low level signals at time $t1B$. The Control Encoder continues to generate the (55+) high level signal and the (66) low level signal in response to the ($14_1A$) high level signal from Decoder gate 26–14A which continues in its selected state since none of the Static Register Flip Flops A through F have been caused to change their state. The signals then which are present from the Control Encoder 27 are the (55+) high level signal and the (66), (50) and (61) low level signals, the latter two arising at time $t1B$. Low level control signal (61) alerts MQC count down gates 23–15 through 23–19 at time $t1B$. A $t1B-$ timing signal from the Cycling Unit samples these gates and causes the MQC Flip Flops to be stepped down to the next lower valued decimal digit by time $t3B$. If the multiplication being performed involves the numbers already given in the former illustrations, that is, Multiplicand equals 123 and Multiplier equals 321, then the LSD of the Multiplier which was transferred to the X Register during the first shift operation was a decimal "1." Count down gate 23–18 would therefore have been selected by the *t*1B– timing signal from the Cycling Unit and the count in the MQC will have been reduced to decimal "0" ($\overline{Q}_1$, $\overline{Q}_2$, $\overline{Q}_3$, $\overline{Q}_4$) by time *t*3B, thus fully alerting IER FF input gate 24–3. In addition MQC count down gates 23–15 and 23–19 will also be alerted, however as will be subsequently seen, these count down gates will not be selected because at time *t*1B of the next minor cycle the (61) control signal will be suppressed. The (55+) high level signal inhibits recirculation of the contents of the A Register 15 by blocking the recirculation gates 15–1. The contents of the A Register read out through the Subtrahend Buffers 19, the three quinary bits of each digit being routed into the Adder input gates 18A via the S lines, all four bits of each digit being also routed to the Comparator FIGURE 17, as already described in the description of the Addition operation. It will be seen that the $\overline{CP}$ signal from the CP FF FIGURE 21 is present and that therefore no complementing of the quantity on the S lines will be performed. Reflection will show that complementing is not desired since what is really being accomplished by Multiplication is a shorthand method of iterative Addition. At the same time the (66) low level control signal, which has been present since the beginning of the $M_2$ portion of the Multiply operation allows the contents of the L Register 14 to continue to read out through the L Register output gates 14–4 through the Minuend Buffers 20 and onto the M lines. The 3 quinary bits of the digits on the M lines are read into the Adder input gates 18A and all four bits on the M lines are also routed to the Comparator FIGURE 17, as also previously described in connection with the Addition operation. In the adder circuits 18A and 18B the Multiplicand "123" reading over the M lines is added to the initial zeros which were in the A Register 15, the sum appearing on the $O_1$ to $O_4$ output lines of the Adder 18B, the addition being performed in accordance with the method previously described in the Addition operation. The (50) low level control signal opens the Adder output gates 18–45 to 18–64 so that the sum of the contents of the L Register 14 and the A Register 15 may be read back into the A Register. At the end of this minor cycle (assuming the first multiplier digit is "1") a *t*11B– timing signal from the Cycling Unit will pass through IER FF input gate 24–3 which has been fully alerted by the zero count now stored in the MQC 23. The output signal from gate 24–3 is applied to IER FF 24C as at the beginning of the first shift cycle already described, and generates the IER $A_{1+}$ high level signal at time *t*0A, the IER+ high level and IER low level signals at time *t*0B, and the IER $A_{2+}$ high level signal at time *t*1A. Thus the first add phase terminates and the second shift phase is initiated. This second shift phase will be identical to the first shift phase already described. That is, the new LSD of the Multiplier stored in the X Register will be transferred to and staticized in the MQC $FF_s$, the contents of the A and X Registers will be shifted one digit position to the right, and the LSD of the first partial product now stored in the A Register will be shifted into the MSD position of the X Register. The Sentinel which was shifted into the X Register from the A Register during the first shift phase is thus one digit position closer to reading into the MQC. The second shift phase will be terminated by a *t*11B+ timing signal from the Cycling Unit which will clear the IER FF 24C, as already explained. The second Add phase will then commence and the Multiplicand "123" stored in the L Register 14 will be added to the shifted contents of the A Register. This addition will be performed twice since the number staticized in the MQC $FF_s$ was the second least significant digit, or 2, of the Multiplier "321." The MQC count down gates 23–14 to 23–19 will step the count in the MQC 23 from "2" to "1" during the first minor cycle of the second Add phase, and will then step the count in the MQC from "1" to "0" during the second minor cycle of the second Add phase. As before, the zero count in the MQC will fully alert IER FF input gate 24–3 so that a *t*11B– timing signal from the Cycling Unit during the second minor cycle of the second Add phase will pass therethrough to initiate the third shift phase of the multiply operation. The third shift phase will transfer the remaining, or most significant, digit of the Multiplier from the LSD position of the X Register to the MQC, thus staticizing a "3" therein. The contents of the X and A Registers will be right shifted one digit position and the LSD of A will be transferred to the MSD digit position of X. The sentinel thus now occupies the LSD position in the X Register. Again, the third shift phase will be terminated and the third Add phase initiated by a *t*11B+ timing cycle from the Cycling Unit which is applied to the IER FF 24C. The multiplicand "123" which is stored in the L Register 14 will be added to the right shift contents of the A Register in the Adder circuits 18A and 18B and returned to the A Register. This addition will be performed once per minor cycle for three successive minor cycles, which is the length of time required for the MQC to count down from "3" to "0". When this has been accomplished the third Add phase will be terminated and the last shift phase initiated via IER FF input gate 24–3. This fourth, or last, shift phase will cause the sentinel now occupying the LSD position of the X Register to be shifted into the MQC and the contents of the A and X Register will once more be shifted right one digit position with the LSD of (*r*A) being shifted into the MSD position of *r*X. The shift of the sentinel (0101) into the MQC $FF_s$ causes them to read $Q_1$, $\overline{Q}_2$, $Q_3$, $\overline{Q}_4$. The $Q_1$ and $Q_3$ MQC signals fully alert sentinel detector gate 25–15, which was already partially alerted by the IER signal from IER FF 24C, so that a *t*9B– timing signal from the Cycling Unit will be passed therethrough. The output signal from sentinel detector gate 25–15 is routed to the Static Register 25 "clear line" arriving there at time *t*10B and causing all the Static Register $FF_s$ to be cleared to their zero or barred state at time *t*11B. The clearing of the Static Register $FF_s$ causes Instruction Decoder search gate 26–1A to be selected and Multiply Decoder gates 26–14A and 26–15A to become unselected. The unselecting of these latter two gates suppresses the $14_1$A and $14_2$A high level signals at time *t*0A of the next minor cycle with the consequent suppression of the control signals associated therewith. The selection of Decoder gate 26–1A results in the generation of the control signals needed for the search for the next "*c*" Address instruction word. This concludes the Multiplication operation.

*Division*

Turn now to a consideration of the Division Operation. As for the Multiplication and Addition operations previously described the general method or philosophy will be first analyzed and will be then followed by a detailed description of the manner in which the general method is implemented.

Basically, Division may be considered to be a process of iterative subtraction wherein the divisor is subtracted from the dividend the greatest number of times which does not produce a negative remainder. The quotient is then the number of times that such subtraction was performed. The foregoing process can be very time consuming, and as in the case of multiplication, many shorthand schemes have been employed to reduce the time of computation. One of these schemes is employed in the familiar long division system which uses a system of multiplication and subtraction. For example if it is desired to divide the number 1234 by the number 4321, the long division method computes the quotient and remainder as follows:

```
          .2855
4321/1234.0000
      864.2
      ------
      369.80
      345.68
      ------
       24.120
       21.605
       ------
        2.5150
        2.1605
        ------
         .3545
```

It can be seen that the process employed in the familiar long division process consists of the following steps:

(1) If the divisor has "*p*" digits examine the most significant "*p*" digits of the dividend to see whether or not the number consisting of the first "*p*" dividend digits is larger or smaller than the divisor. If the divisor is larger than the number consisting of the first "*p*" dividend digits, the first division operation will be performed by dividing the divisor into the most significant "$p+1$" dividend digits.

For the example given above it is seen the the divisor 4321 is larger than the dividend 1234, and hence the divisor 4321 must be divided into 12340. This in effect constitutes a left shift of the dividend or a multiplication by 10 *without* shifting the original location of the decimal point with regard to the quotient digits to be computed.

(2) Multiply the divisor by the largest digit which produces a number just not greater than the left shifted dividend.

(3) Write the digit determined in (2) above over the least significant digit of the left shifted dividend. This is the first quotient digit.

(4) Write the product of the first quotient digit and the divisor under the left shifted dividend.

(5) Subtract the product found in (4) from the left shifted dividend. This is the first remainder.

(6) Left shift the first remainder (multiply by 10) and add the next most significant dividend digit (bringdown), which in the instant example is a zero.

(7) Multiply the divisor by the largest digit which produces a number just not greater than the left shifted first remainder.

(8) Write the digit determined in (7) above over the least significant digit of the left shifted first remainder. This will be the second quotient digit.

(9) Write the product of the second quotient digit and the divisor under the left shifted first remainder.

(10) Subtract the product found in (9) from the left shifted first remainder. This is the second remainder.

(11) Repeat steps 6 through 10 for the third and successive remainders and quotient digits to as many significant places as may be desired.

Steps 2, 4, and 5, and their later numbered counterparts outlined above logically corresponds to the iterative subtraction of the divisor from the dividend as previously mentioned. That this is so will be seen from the following illustration using the same numbers as divisor and dividend. Assume that a counter exists which will establish each quotient digit by counting up from zero the number of substractions that can be performed without producing a negative remainder. Such a system necessarily requires that after each subtraction the divisor be compared with the remainder and that when it is determined that the remainder has become less than the divisor the subtractions must be stopped.

```
            Dividend=D
            Divisor=V
            Remainder=R1,2, . . . N
 10D     12340  Shift dividend left
   V     -4321  Subtract divisor
         -----
         08019  10D-V
         -4312
         -----
  R1     03698  10D-2V ----------> 2
10R1     36980  Shift remainder left
   V     -4321  Subtract divisor
         -----
         32659  10R1-V
           .      .
           .      .
           .      .
         06733  10R1-7V
         -4321
         -----
  R2     02412  10R1-8V ---------> 8
10R2     24120  Shift remainder left
   V     -4321  Subtract divisor
         -----
         19799  10R2-V
           .      .
           .      .
           .      .
         -----
  R3     02515  10R2-5V ---------> 5
10R3     25150  Shift remainder left
   V     -4321  Subtract divisor
         -----
         20829  10R3-V
           .      .
           .      .
           .      .
         -----
  R4     03545  10R3-5V ---------> 5
```

It is seen in the illustration above that the remainder $R_1$ becomes less than the divisor V when the divisor V has been twice subtracted from the left shifted dividend 10D. The first quotient digit is therefore, as indicated, the integer 2. The first remainder $R_1$ and successive remainders $R_2$ and $R_3$ are treated exactly as the original dividend and the entire process repeated for each successive quotient digit. It is seen that the quotient digits successively established by this iterative subtraction system are 2855, with a final remainder $R_4$ of 3545. These results correspond exactly to the quotient and remainder determined by the long division illustration.

In order therefore to adapt the interative subtraction system to a computer it is necessary that apparatus exist for counting up from zero to establish the number of times the divisor is subtracted from the dividend without producing a negative remainder. It is also necessary that apparatus exists to perform subtraction. However, the computer herein described contains neither apparatus for counting up from zero nor apparatus for directly subtracting one number from another, but does contain a counter, the Multiplier Quotient Counter FIGURE 23, which counts down one unit at a time from some initial predetermined digit, and moreover substraction is accomplished by complementing and adding. Therefore, some system of division must be utilized which can produce quotient digits by counting *down* and by *adding*. The two requirements of counting down and adding instead of counting up and subtracting are complementary for the apparatus already present in the computer and previously described. That is, instead of subtracting the divisor from the dividend *add the divisor to the complemented dividend.* Assumes as before that the dividend is 1234 and the divisor is 4321. Further assume that the dividend is stored in a first register (the A Register), that the divisor is stored in a second register (the L Register). In this illustration and the more detailed illustration which will follow, a pair of four digit numbers are used, and hence registers having a four digit capacity will be illustrated. However, as has been seen from the detailed descriptions of the A and L Registers, these registers have a ten digit capacity and hence in actuality the computer can divide one ten digit number by another ten digit number. The four digit registers will be used only in an illustrative sense, the mechanics of the division operation being completely analogous for ten digit division.

| | SBW | MSD | | LSD | |
|---|---|---|---|---|---|
| a | 1 | 2 | 34 | 0 | Shift dividend left. |
| b | 8 | 7 | 65 | 9 | Nine's complement left shifted dividend. |
| c+ | | 4 | 32 | 1 | Add divisor to left shifted complemented dividend same number of times as subtraction would have been done. |
| | 9 | 1 | 98 | 0 | |
| + | | 4 | 32 | 1 | |
| Remainder $R_1$ | 9 | 6 | 30 | 1 | |

It should be here observed that the remainder 96301 just calculated is the nine's complement of the remainder 03698 obtained for the same step of previous illustration using the subtraction method. Recalling now that it was necessary in the subtraction method to establish after each subtraction whether or not the remainder was less than the divisor, a similar operation would normally have to be here performed. This would involve:

(1) Nine's complementing the remainder to obtain the true remainder and then comparing it with the divisor for magnitude.

(2)(a) If the remainder is < the divisor, then stop adding and perform next shift.

(b) If the remainder ≥ the divisor, then recomplement the true remainder and perform another addition.

(3) Repeat (1) and (2b) until condition (2a) occurs.

The above outlined process is very time consuming and can be completely avoided by performing one more addition than the number of subtractions would have been. That is, instead of stopping the adding when the remainder 96301 is obtained (corresponding to 2 subtractions), perform one more addition.

| SBW | MSD | | LSD |
|---|---|---|---|
| 9 | 6 | 30 | 1 |
| + | 4 | 32 | 1 |
| 10 | 0 | 62 | 2 |

It will be observed that by so doing an overflow *out of the SBW position* (space between words) is produced. It is clear that such overflow will *always* occur when there is a decimal "9" in the SBW position and a decimal carry is produced by the addition of the MSD digits of the divisor and the accumulated divisor and complemented dividend. The occurrence of this overflow then may be used as an indication that there has been *one too many additions* and that a negative remainder has been produced. As previously pointed out, however, the Multiplier Quotient Counter (MQC) used in this computer does not count up, but only counts down. Therefore, by starting with an initial count of "10" in the MQC and counting down three times to "7," it can be seen that the MQC will store the nines complement of the true first quotient digit. That is, the nines complement of "7" is "2." By nines complementing the MQC digit during the next shift operation the true quotient digit "2" is obtained and may be stored, as will subsequently be seen, in a register (the X Register). It should be here pointed out that the remainder produced by the extra addition (equivalent subtraction) does *not* lead to errors in the subsequently determined quotient digits even though it may be considered that a negative remainder is being dealt with. The method of division producing such a remainder is designated "non-restoring" since the remainder is not brought back through zero to a positive value. That this system does not lead to quotient errors will be seen to be so in the detailed example on following page.

The division process, an illustration of which appears below, may be considered to consist basically of three portions: D1, D2 and D3. The D1 portion of the division operation is a preparation portion wherein the information to be operated upon is routed to the proper places and necessary preparations for the actual computation which will take place in the D2 portion are made. During the D3 portion of division, which follows immediately upon the conclusion of D2, an interchange operation takes place, wherein the quotient which is stored in one register (the X Register) is transferred to another register (the A Register), and the remainder which was stored in this other register is transferred to the register originally storing the quotient. Assume now that the divisor 4321 has been previously programmed into the L Register and is circulating there. Further assume that during the D1 portion of the operation the dividend 1234 is transferred from the memory to *r*A, and a sentinel is inserted into the sign digit position of *r*X. This sentinel will be used to determine when the proper number of cycles have been completed and the division operation should be terminated. The manner in which this is accomplished will subsequently be seen as the division operation progresses. The illustration below shows in the first two lines the conditions immediately preceding and at the conclusion of the D1 portion of the division operation. Having concluded the D1 or set-up portion, the actual process whereby the quotient and remainder may be established commences, which is the D2 portion of division. D2 is divided into alternate phases of shift and add, the order being first a shift phase and then an add phase. At the conclusion of the D1 portion of division the first shift phase is initiated. During this first shift phase the dividend 1234 which is stored in *r*A is shifted one digit position to the left and simultaneously is 9's complemented, thereby producing the numbers 8765, the digit 8 now occupying the space between words digit position in *r*A being the 9's complement of the former MSD of the dividend, the 7, 6, and 5 being the 9's complements of the former dividend digits 2, 3, and 4 respectively. It will be observed that the least significant digit position of *r*A is shown to now contain the digit 9. This digit 9 is produced by shifting the digit in the space between words position of *r*X into the LSD position of *r*A through a special gate which inserts into the LSD position of *r*A the 9's complement of the digit which was in the SBW position of *r*X immediately preceding a shift. Hence, it can be seen that since *r*X had been initially cleared, and therefore contained all 0's except for the sentinel which had been inserted into the sign digit position, the 9's complement of the 0 in the SBW position of *r*X must be a 9, and a 9 is therefore inserted into the LSD position of *r*A. The digit which is shifted from the SBW position of *r*X is given a special name which is $\overline{X}_{4D}$, and will hereinafter be referred to as such. Simultaneous with the left shifting and nines complementing of the dividend stored in *r*A two other things occur. First, the contents of *r*X are also left shifted and 9's complemented, thus causing the former "0's" in *r*X to become decimal 9's, and the sentinel which was a decimal 1 to now appear as a decimal 8 shifted from the sign position into the LSD position of *r*X. Second, the MQC is jammed to a value equal to decimal 10 and is thus set up to count down the number of add operations which will occur during the first add phase to immediately follow the termination of the first shift phase. When the foregoing steps have been completed the first shift phase will be concluded and the first add phase will be initiated. During the first add phase, and every add phase that follows, the divisor will be successively added Dividend=1234 (stored in memory) Divisor=4321 (*r*L)

| | SBW | *r*A | $\bar{X}_{4D}$ | | *r*X | MQC | | No. of Quotient Digit Complements |
|---|---|---|---|---|---|---|---|---|
| | | MSD LSD | SIGN | SBW | MSD LSD | SIGN | | |
| | 0 | 0 0 0 0 | 0 | 0 | 0 0 0 0 | 0 | 0 | |
| D1 | 0 | 1 2 3 4 | 0 | 0 | 0 0 0 0 | (1) ←Sentinel | | |
| D2 (1st Shift) | 8 | 7 6 5 9 | 0 | 9 | 9 9 9 (8) | 0 | 10←JAM | |
| (ADD) 1 | 9 | 1 9 8 0 | 0 | | | | 9 | |
| | 9 | 6 3 0 1 | 0 | | | | 8 | |
| Overflow | 0 | 0 6 2 2 | 0 | 9 | 9 9 9 (8) | 0 | 7 | 3 |
| (Shift) 2 | 9 | 3 7 7 0 | 0 | 0 | 0 0 (1) 2 | 0 | 10←JAM | |
| (ADD) 2 | 9 | 8 0 9 1 | 0 | | | | 9 | |
| Overflow | 0 | [2 4 1 2] | 0 | 0 | 0 0 (1) 2 | 0 | [8] | 2 |
| (Shift) 3 | 7 | 5 8 7 9 | 0 | 9 | 9 (8) 7 1 | 0 | 10←JAM | |
| (ADD) 3 | 8 | 0 2 0 0 | 0 | | | | 9 | |
| | 8 | 4 5 2 1 | 0 | | | | 8 | |
| | 8 | 8 8 4 2 | 0 | | | | 7 | |
| | 9 | 3 1 6 3 | 0 | | | | 6 | |
| | 9 | 7 4 8 4 | 0 | | | | 5 | 1 |
| Overflow | 0 | 1 8 0 5 | 0 | 9 | 9 (8) 7 1 | 0 | 4 {Detect sentinel in MSD-1 | |
| (Shift) 4 | 8 | 1 9 4 0 | 0 | 0 | (1) 2 8 5 | 0 | 10←JAM | |
| (ADD) 4 | 8 | 6 2 6 1 | 0 | | | | 9 | |
| | 9 | 0 5 8 2 | 0 | | | | 8 | |
| | 9 | 4 9 0 3 | 0 | | | | 7 | |
| | 9 | 9 2 2 4 | 0 | | | | 6 | |
| | 0 | [3 5 4 5] | 0 | 0 | (1) 2 8 5 | 0 | [5] | 0 |
| D3 | (1) | 2 8 5 5 | 5 | 0 | 3 5 4 5 | 0 | | |
| Recirc. | 0 | 2 8 5 5 | 0 | 0 | 3 5 4 5 | 0 | | |

to the complemented left-shifted dividend which is stored in *r*A. Each time the divisor is added to the complemented left-shifted dividend the count in the MQC will be reduced by 1. The illustration shows that the first addition of the divisor 4321 to the left-shifted complemented dividend 87659 results in a total 91980, the count in the MQC being reduced at the same time from 10 to 9. The second addition of the divisor produces the sum 96301 and reduces the count in the MQC to 8. The third addition of the divisor produces the number 00622, the count in the MQC now reading the decimal value 7. It will be observed that this third addition caused an overflow out of the SBW position of *r*A to occur, and it will be recalled from the earlier discussion that the occurrence of such a condition may be tested for and used as an indication that one too many additions have been performed, thereby indicating that the first add phase should be terminated and the second shift phase should be initiated. During the second shift phase the remainder 0622 will be treated exactly as if it had been the original dividend. That is, the remainder stored in *r*A will be left-shifted and 9's complemented thereby producing in *r*A the numbers 9377 which are seen to be the 9's complements respectively of the remainder digits 0622. It will be further observed that the LSD position of *r*A is now shown as containing a decimal 0 and not a decimal 9 as was the case for the first shift. However, the reason for this is readily seen by observing that the SBW position of the *r*X just prior to the second shift contained a decimal 9 as a result of the first complement operation which took place during the first shift. Therefore, when the decimal 9 contained in the SBW position of *r*X is shifted into the LSD position of *r*A through the special complement gate, the decimal 9 is 9's complemented and therefore assumes the decimal value 0. Again as before, the contents of *r*X are left-shifted and complemented thus producing a decimal 0 for each former decimal 9 in the register, the 9's complemented sentinel occupying the LSD position of *r*X as a decimal 8 being 9's complemented to produce a decimal 1 in the LSD+1 digit position of *r*X. Retracing for a moment to the D1 and first shift steps it will be observed that the sentinel which was inserted into the sign position of *r*X on D1 was shifted into the LSD position of *r*X on the first shift of D2. On every successive shift however nothing will be transferred from the sign position into the LSD position of *r*X, so that on the second shift operation the 0 which was stored in the sign position of *r*X is not shifted into the LSD position. The LSD position of *r*X is reserved for the quotient digit just calculated and which is presently stored in the MQC. Referring again to the second shift operation it will be seen that the number in the MQC is a decimal 7 and during the second shift this decimal 7 is 9's complemented and read into the LSD position of *r*X, thereby producing a decimal 2 as indicated. During this same second shift operation the MQC is subsequently again jammed to a decimal value 10 to prepare it for counting down during the next add phase which will follow the termination of the second shift. The second add phase is initiated and proceeds in exactly the same way as the first add phase. After the divisor has been added to the contents of *r*A two times an overflow condition again occurs resulting in the digits 02412 being stored in *r*A. At the same time, the count in the MQC has been reduced from the decimal value 10 to the decimal value 8. The third shift phase is now initiated and the contents of *r*A, corresponding to the second remainder, are left-shifted and 9's complemented just as was done during each previous shift phase. It will be seen that a decimal 9 is again inserted into the LSD position of *r*A by virtue of the fact that the SBW position of *r*X contained a decimal 0 just prior to the shift. The contents of the *r*X are again also left-shifted and 9's complemented and the second quotient digit in the MQC is shifted into the LSD position of *r*X, it also being 9's complemented and therefore appearing as a decimal 1. The MQC is again jammed to a decimal value 10, as before, in preparation for counting down during the third add phase. The third add phase progresses in an identical fashion to the previous two add phases. When overflow occurs on this third add phase it is seen that the MQC has counted down to the decimal number 4, and it will be further observed that on the next or fourth shift phase the decimal 4 in the MQC will be 9's complemented and inserted into the LSD position of *r*X as a decimal 5. It is thus observed that after the conclusion of three add phases and at the termination of the fourth shift phase, *r*X contains the first three quotient digits 285 and the sentinel, a decimal 1, has been shifted into the MSD position of the X Register. During the fourth shift phase the sentinel is detected by a special sentinel detector gate which indicates to the computer that the presently being performed shift (the fourth shift) is to be the last shift, and that the D3 portion of the division operation must be initiated immediately subsequent to the fourth add phase. Although the sentinel is detected during the fourth shift phase, it is detected *before* it has been shifted. That is, it is detected in the MSD–1 digit position. It will become clear from the detailed description of the mechanics of carrying out the division operation to be subsequently described that it is necessary to detect the sentinel in the MSD–1 position in order that the fourth shift shall be the last shift. At the termination of the fourth shift phase the fourth add phase is initiated and, as before, a countdown procedure takes place, one count-down in the MQC occurring for each addition of the divisor to the contents of *r*A. When the MQC has counted down from the decical value 10 to the decimal value 5 overflow out of the SBW position of *r*A will again occur and thus terminate the fourth add phase. Now however, a fifth shift phase will not be initiated because of the detection of the sentinel on the previous shift phase. Instead, the D3 portion of the division operation will commence. During D3 the last quotient digit computed, which is a decimal 5, is transferred directly to the sign and LSD positions of *r*A, and *not* to the LSD of *r*X. The contents of *r*X are also transferred to *r*A, thereby causing the sentinel to be placed into the SBW position of *r*A and the first three quotient digits, 285 to be placed in the MSD, MSD–1 and MSD–2 digit positions of *r*A. Simultaneous with this transfer the contents of *r*A, which constitute the final remainder 3545, are transferred to the corresponding digit positions of *r*X. During the first minor cycle of machine timing after the completion of the D3 portion of division of the sentinel will be cleared out of the SBW position of *r*A and the "5" which is occupying the sign position of *r*A will also be cleared. Thus it can be seen that *r*A now stores the quotient 2855, and *r*X stores the remainder 3545, these results conforming exactly to the answers obtained by the standard long division method and by the subtraction method earlier illustrated. Before preceding to a detailed discussion of the actual mechanics of carrying out the division operation certain informative conclusions may be formulated from an examination of the illustration just concluded. For example:

(1) On all odd cycles (1, 3, 5 etc.) the remainder in *r*A, just prior to the addition which causes overflow out of the SBW position of *r*A, is the nines complement of the true remainder.

(2) At the end of all odd cycles the number in the MQC (odd quotient digits) is the nines complement of the true quotient digit.

(3) At the end of all even cycles the number in the MQC (even quotient digits) is the true quotient digit, and the remainder in *r*A is a true remainder. In addition, the quotient digits which have been transferred from the MQC to *r*X are true quotient digits since all odd quotient digits have been complemented an odd number of times and all even quotient digits have been complemented an even number of times. The number of times each quotient digit is complemented during the course of the entire division operation is indicated in the right-hand-most column, and it is seen that the first and all successive odd position quotient digits are complemented an odd number of times, and that the second and all even position quotient digits will be complemented an even number of times. In the illustration, the true quotient digits and true remainders are shown enclosed in boxes, and it will be observed that these are indicated to occur on the even cycles as previously indicated.

(4) The alternate insertion of 9's and 0's from the SBW position of *r*X into the LSD position of *r*A is required to give the true remainder. Such requirement is a direct result of the theoretical derivation and proof of the non-restoring method of division here utilized. The theory requires that on the first and all subsequent odd shift cycles the dividend (or remainder) should be first shifted and then complemented, and that on the second and all subsequent even cycles the remainder should be first complemented and then shifted. It is therefore easily seen that on the first and all subsequent odd cycles the process of first shifting and then complementing will effectively read a decimal 9 into the LSD position of *r*A, and that on the second and all subsequent even cycles the requirement of complementing and then shifting will read a 0 into the LSD position of *r*A. Since the left shift and complement processes are performed simultaneously in order to save time, it is clear that the desired order between complementing and shifting is exactly satisfied by the process of alternately reading into the LSD position of *r*A 9's and 0's. This is most easily accomplished in the manner already described.

(5) Although the division operation as illustrated is set-up to perform four place division it will be appreciated that with the 10 place registers utilized in the computer a 10 step division operation will be performed. There is no requirement, however, even though 10 place division may be accomplished that such is mandatory. The division operation may be terminated earlier than the computation of a 10 place quotient provided that it is terminated on an *even* cycle. This requirement should be clear from the fact that the quotient and the remainder will thus be in their true form.

In summary then, the division operation is seen to consist of the following steps:

(1) Read the dividend into *r*A and the sentinel into the sign position of *r*X.

(2) Left shift and 9's complement the contents of *r*A and of *r*X, and jam of the MQC to the decimal value 10. Also read a decimal 9 into the LSD position of *r*A from the complemented space between words digit of *r*X.

(3) Add the divisor to the contents of *r*A until overflow out of *r*A SBW position occurs.

(4) Left shift and 9's complement the contents of *r*A and the contents of *r*X. Insert a "0" into the LSD position of *r*A from the complemented SBW position of *r*X, then read the complemented MQC digit into the LSD of *r*X.

(5) Repeat 3 and 4 until the sentinel is detected in the MSD–1 position of *r*X during the shift phase when the sentinel is shifted from the MSD–1 to the MSD position of *r*X.

(6) Repeat 3, and then (7) Interchange the contents of *r*A and *r*X, first reading the final MQC digit into the LSD position of *r*X.

Understanding now the basic method of dividing and the steps to be performed, turn to a consideration of FIGURES 46A, 46B, 46C, and 46D, arranged as indicated by the inset FIGURE 46 for a more detailed description of the mechanics of executing these steps. The clearest understanding may be had by also referring to the detailed descriptions of the logical elements shown in these figures in conjunction with the foregoing outline of division.

The Divide or 55 instruction is an order to divide the number stored at a memory location designated by the "*m*" address of the instruction word in the C Register by the number stored in the L Register, placing the remainder in the X Register and the quotient in the A Register. Assume that a divisor which has been read into the L Register 14 by a previous instruction is presently circulating there, and that the sign of the divisor is stored in the Sign of (*r*L) FF 11–C. Further assume that the P9 and P10 digits of the instruction word read from the memory during the previous $\beta$ transfer have been staticized and decoded by the Static Register 25 as a 55 instruction, and transmitted to the Instruction Decoder 26. Since the 55 instruction decodes with zeros in the STR1 and STR2 positions ($\overline{\text{STR1}}$ and $\overline{\text{STR2}}$) a memory search will be instituted by Instruction Decoder gate 26–1A. This search will be an "*m*" address search for the dividend, and will be carried out as previously described in the section on Address Selection. Refer now to the Instruction Decoder gates 26–16A, 26–18A and 26–19A. It will be observed that all three of these gates require as inputs from the Static Register 25 the STR1, STR3, $\overline{\text{STR4}}$, $\overline{\text{STR5}}$, and STR6 signals. It will be further observed that both of the gates 26–18A and 26–19A also require an STR2 signal input and that these two gates differ only in that gate 26–19A may be jammed by a high level OR+ signal generated by the OR FF 24A. This jamming action will be explained subsequently in connection with the D2 or execution portion of the division operation. Additionally, the gate 26–16A differs from both 26–18A and 26–19A in that the first named gate requires an $\overline{\text{STR2}}$ input signal from the Static Register 25, and not an STR2 signal. Gate 26–16A, as will be subsequently seen, generates signals which among other things control the transfer of the dividend from the memory to the A Register during the D1 or set-up portion of the division operation. Gates 26–18A and 26–19A are utilized during the D2 or execution portion of the instruction to cause the generation of control signals required for the shift and add phases, gate 26–18A being selected for the entire D2 portion whereas, as will be seen, gate 26–19A is active only during the add phases but not during the shift phases. The division operation can thus be considered to consist of four basic steps involving four Instruction Decoder gates. These steps are:

(1) "*m*" address search for the dividend involving Decoder gate 26–1A, followed by (2) D1—set-up to perform division, including transfer of the dividend to *r*A involving Decoder gate 26–16A, followed by (3) D2—divide, involving Decoder gates 26–18A and 26–19A.

(4) D3—Interchange the contents of *r*A and *x*X, involving the D3 flip-flop of FIGURE 25, and no Instruction Decoder gates. The D1 Instruction Decoder gate 26–16A is not immediately selected by the staticized instruction because it requires an STR1 signal and not an $\overline{\text{STR1}}$ signal. However, during the last minor cycle of the "*m*" address or data search for the dividend, Static Register gate 25–4 passes a *t*10B– timing signal from the Cycling Unit which sets the Static Register FF A to its STR1 state at time *t*11B. Decoder gate 26–16A is therefore selected and generates the (15A) high level signal at time *t*0A. The (15A) high level signal is transmitted to the Control Encoder 27, which is response thereto generates the (15), (62), (64), (77), (78) low level signals, and the (55+), (56+) high level signals at time *t*0B, and the (82+) high level signal at time *t*1A. The (55+) high level signal jams the recirculation gates 15–1 of the A Register 15 thereby claering the register by preventing recirculation and preparing it to receive the dividend. The (82+) high level signal jams the Sub Buffers input buffing circuits 19–1 causing the unbarred S lines to be held low, thus producing $S_1$, $S_2$, $S_3$, $S_4$ signals on the S lines from time *t*1B through time *t*10B of the $D_1$ minor cycle. This jamming action is termniated at time *t*11B because the (82+) high level signal is suppressed by a *t*10B+ timing signal from the Cycling Unit (see FIGURE 27D). These signals together with the (77) low level signal alert A register read-in gates 15–4 so that the dividend which was found during the just completed "*m*" address memory search may read into the A Register via the Minuend Buffers 20 and the M lines. The (15A) high level signal from the Instruction Decoder jams the Sign of *r*A FF 11B to its minus state. Since this flip-flop will store the sign of the quotient, it is seen that the signs of the divisor and dividend are assumed to be different. The (78) low level control signal alerts input gates 11–21 and 11–22 to the Sign of (*r*X) FF 11–A so that the sign of the dividend reading into *r*A may be stored. A *t*0B– timing signal from the Cycling Unit is applied to both gates 11–21 and 11–22, selecting gate 11–22 and thereby attempting to set the Sign of (*r*X) FF 11–A to its plus state. However, if the sign of the dividend is minus, as evidenced by the presence of a bit in the $M_1$ position of the P0 digit, gate 11–21 will be also selected and will set the Sign of (*r*X) FF 11–A to its minus state, overriding the effect of gate 11–22. The (56+) high level signal jams the recirculation gates 16–1 of the X Register 16 thereby clearing it by preventing recirculation. This prepares the X Register to receive the first quotient digit from the MQC and insures that a zero exists in the SBW position so that a 9 will be inserted into the LSD of *r*A on the first shift cycle of $D_2$. The (15) low level control signal passes a *t*0B– timing signal from the Cycling Unit through sentinel insertion gate 16–6 to the P0 digit position of the bit 1 channel in the X Register 16. This sentinel (0001) which is fused to terminate the D2 portion, will be propagated through the X Register toward the MSD digit position, being shifted left one digit position on each shift operation of the $D_2$ portion.

The (62) low level control signal passes a *t*0B– timing signal from the Cycling Unit through initial clear gate 23–1 which clears the MQC 23 flip-flops to their $\overline{Q}_1$, $\overline{Q}_2$, $\overline{Q}_3$, and $\overline{Q}_4$ states, thus insuring that the MQC FF's A, B, and C will store zeros at time *t*1B of the next minor cycle when $D_2$ is beginning. This is important, because at that time *t*1B, the digit stored in the MQC will be nines complemented and shifted into *r*X. The ORA+ high level signal from the OR FF 24A, to be subsequently described in detail, normally clears the MQC at time *t*2B, but this is too late for the requirements of the first shift cycle of $D_2$.

The remaining $D_1$ low level control signal (64) alerts Static Register gate 25–5 so that a *t*10B– timing signal from the Cycling Unit may be gated therethrough and cause Static Register FF B to be set to its STR2 state at time *t*11B of $D_1$. This change of state of Static Register FF B causes Instruction Decoder gate 26–16A to become unselected and causes gates 26–18A and 26–19A to be selected.

Finally, the aforementioned (15) low level signal is applied to OR FF 24A input gate 24–2 and passes a *t*11B– timing signal from the Cycling Unit, which generates the OR, OR+, and IER–OR signals at time *t*0B, and the ORA+ signal at time *t*1A of the next minor cycle. These signals initiate the first shift phase of the $D_2$ portion of the division operation. The unselecting of Instruction Decoder gate 26–16A at time *t*11B causes the (15A) high level signal to be suppressed at time *t*0A with the resultant consequent suppression of the control signals whose functions have been previously described. This ends the $D_1$ or set-up portion of the division operation, the $D_2$ portion commencing immediately with the selection of Decoder gates 26–18A and 26–19A. The selecting of Decoder gates 26–18A and 26–19A at time *t*11B of $D_1$ causes the generation respectively of the ($31_1A$) and ($31_2A$) high level signals at time *t*0A of the first minor cycle of $D_2$. The ($31_1A$) high level signal is transmitted to the Control Encoder 27 which in response thereto generates the (55+) high level signal and the (31) and (66) low level signals at time *t*0B. The ORA+ high level signal generated by the OR FF 24–A at time *t*1A is also routed to the Control Encoder 27 where it causes the generation of the (71) low level signal and the (56+) high level signal commencing at time t1B. The (71) and (56+) signals are shown enclosed in a box to easily distinguish the fact that they arise at time *t*1B and not at time *t*0B as do the (66), (31), and (55+) signals.

The ($31_2A$) high level signal is also transmitted to the Control Encoder 27, which in response thereto generates the (50) and (61) low level control signals at time *t*0B. However, the OR+ high level signal which was generated by the OR FF 24A at time *t*0B is also transmitted to the Instruction Decoder 26 and jams decoder gate 26–19A so that the high level output signal ($31_2A$) is suppressed at time *t*1A, thus suppressing the (50) and (61) low level control signals from the Control Encoder 27 at time *t*1B. It is seen then that the (50) and (61) control signals will exist for one pulse time only, time *t*0B, during each shift phase due to the action of the OR+ jamming signal. As will be subsequently seen however the OR+ jamming signal will not be present during the add phases and the (50) and (61) signals will be maintained then. The existence of the (50) and (61) low level control signals for the one pulse-time *t*0B of the first $D_2$ shift does not interfere with the division process for the following reasons. The (50) low level control signal opens the output gates of the Adder 18B at time *t*0B but no information reads out of the "0" lines at the beginning of $D_2$ because one pulse-time earlier, at time *t*11B of $D_1$, the M and S lines were cleared. The S lines were cleared because the (82+) high level signal was suppressed at time *t*11A by a *t*10B+ timing signal from the Cycling Unit, and hence the empty SBW digit of *r*A reads onto the S lines at time *t*11B. The M lines were cleared by the action of the memory read-out circuits of FIGURE 31 (not shown). The (61) low level control signal which alerts MQC count-down gates 23–15 to 23–19 is ineffective on every shift cycle because all of these gates require a *t*1B– timing signal from the Cycling Unit, and by time *t*1B the (61) signal has been suppressed. From the foregoing it will be appreciated that the Control Encoder signals effectively present for the first shift phase of the divide operation are the (55+) and (56+) high level signals and the (31), (66), and (71) low level signals, and that all these signals arise at time *t*0B except the (56+) high level signal and the 71 low level signal which arise at time *t*1B. Additionally, the OR+, ORA+ and OR signals from the OR FF 24A will be present, as will the IER–OR signal from the IER–OR circuit 24B. The OR+ and OR signals arise at time *t*0B and are suppressed at time *t*0B of the next minor cycle, whereas the ORA+ signal arises at time *t*1A and is suppressed at time *t*0A. The IER–OR signal arises at time *t*0B of the first shift cycle and is suppressed at time *t*0B of the next minor cycle, on all subsequent shift cycles arising at time *t*1B and lasting until time *t*0B. The reason for the early presence of IER–OR during the first shift cycle will presently be made clear.

The ORA+ signal performs four functions. First, the ORA+ signal is routed to the Control Encoder 27 where it causes a (56+) high level signal and a (71) low level signal to be generated at time *t*1B, as already previously described. Second, the ORA+ is routed to the MQC 23 via buffer 23–29 where it causes the MQC flip-flops to be cleared continuously throughout the shift phase. Each shift phase the MQC flip-flops are utilized to provide the left shift of the contents of the X Register by delaying each digit out of *r*X for one pulse period. The contents of the X Register read out over the $X_{1-4}$ lines and into the MQC 23 via MQC input gates 23–2. These input gates 23–2 are alerted by the IER–OR signal which appears at time *t*0B of the first shift phase. The timing of the digits reading out of the X Register 16 over the $X_{1-4}$ lines is P0=*t*0B, so that on the first shift cycle the IER–OR signal passes the digits P0 through P11 out of the X Register through gates 23–2 and into the MQC 23. The circuits of the MQC 23 are so arranged that information reading into the MQC flip-flops via gates 23–2 will override the clearing action of the ORA+ signal. Hence, the MQC flip-flops will be set to a given state by each digit out of the X Register and will be immediately thereafter cleared, so that an alternate setting and clearing of the MQC flip-flops for each digit out of the X Register takes place. The precise action which takes place can be readily seen from an examination of the detailed diagram of the MQC, FIGURE 23. It will be appreciated therefore that during a shift phase the MQC 23 is not in fact performing any counting function whatever, but is merely providing a one pulse period delay path for the contents of the X Register, thereby producing the left shift desired. Third, the ORA+ generates the IER–OR signal, whose function has just been described, for the time interval *t*1B through *t*0B. It will be recalled that the IER–OR signal was present during this first shift phase at time *t*0B. However, this was due to the action of OR flip-flop input gate 24–2 which is only active to initiate the first shift phase. For all subsequent shift phases OR flip-flop input gate 24–1 will be utilized, as will be subsequently explained, and this gate does not generate the IER–OR signal at time *t*0B, this latter signal being generated hereafter by the ORA+ signal. That this is true can readily be established by referring to the detailed diagram containing the OR flip-flop, FIGURE 24. Fourth, the ORA+ signal is transmitted to the Complement flip-flop 21 where it causes the Complement flip-flop to be set to its CP state at time *t*1B. The CP state will be maintained until the end of the minor cycle when a *t*11B+ timing signal from the Cycling Unit causes the Complement flip-flop 21 to be cleared to its $\overline{CP}$ state at time *t*0B. The CP signal is routed to the Adder input gates 18A and to A Register left shift gates 15–3. The CP signal present at the Adder input gates 18A causes the contents of the A Register, which are reading through Subtrahend Buffers 19 onto the S lines, to be 9's complemented as they pass through the Adder input gates 18A, where they are also delayed for one pulse period. The quinary portion of the A Register digits, after being complemented and shifted in the Adder input gates 18A, are routed to the left shift gates 15–3 as the $S_{1c}$, $S_{2c}$, and $S_{3c}$ signals. The binary bit channel of the A Register contains its own extra delay path and hence the binary bit information of each digit in the A Register is delayed for one pulse period, being routed to the left shift gates 15–3, and arrives there as the A″4 and $\overline{A''}$4 signals. Additionally, the A Register left shift gates 15–3 have present thereon a (71) signal from the Control Encoder 27, the CP signal from the Complement flip-flop 21, and a *t*0B+ timing signal from the Cycling Unit. The *t*0B+ timing signal from the Cycling Unit jams the gates so that the information on the S lines at time *t*11B of the previous minor cycle cannot be gated into the A Register. The (71) low level control signal alerts all of the gates at time *t*1B so that the 9's complemented left shifted contents of the A Register may be read back into that register. A CP signal is present on only one of the gates 15–3, the gate which also looks for the $\overline{A''}$4 signal. The A″4 gate, it will be observed, can never be fully alerted because of the absence of the $\overline{CP}$ signal and is really therefore, not utilized in the division process. Inasmuch as the contents of the A Register have been left shifted in addition to being 9's complemented, it should be clear that all digits have been shifted one digit position toward the MSD and therefore the former P0 digit has been read into the P1 digit position, the former P1 digit has been read into the P2 digit position, and so forth for the remainder of the original contents of the A Register. Since the P0 digit is the normal sign digit and is presently storing 0's, nothing is effectively read into the P1 digit position of the A Register and this P1 digit position is available for the read-in of the $\overline{X}$4D signal from the X Register, as previously described in the explanation of the last illustration. The (66) low level control signal from the Control Encoder 27 attempts to open the output gates 14–4 of the L Register but the OR+ signal generated by OR flip-flop 24A jams these output gates so that the contents of the L Register cannot read through the Minuend Buffers 20 onto the M lines. The OR+ signal also jams the Instruction Decoder gate 26–19A thereby suppressing the ($31_{2A}$) high level signal at time *t*1A, and suppressing the (50) and (61) control signals at time *t*1B, as already previously described. The OR signal from OR flip-flop 24A is routed to four places, as follows. First, the OR signal alerts shift gate 15–7, which is the gate whereby the $\overline{X}_{4D}$ signal from the X Register 16 is complemented and inserted into the P1 position of the A Register. The function of this gate has already been previously described. That is, this gate 15–7 causes a decimal 9 to be read into the LSD position *r*A on the first and subsequent odd shift cycles, and causes a decimal 0 to be inserted into the LSD of *r*A on the second and subsequent even shift cycles. Second, the OR signal partially alerts the sentinel detector gate 22–21. This gate looks for the sentinel which was inserted into the X Register during the D1 or set-up portion of the division operation. The sentinel however is not tested for until time *t*9B of each shift phase, and hence it will be appreciated that the sentinel will not be detected until it has been shifted successively from the original sign position into the MSD–1 digit position of the X Register, and this will not occur until the shift phase immediately preceding the last add phase. Third, the OR signal alerts X Register left shift gates 16–2 so that the contents of the X Register, which are being read through the one pulse period delay path provided by the MQC 23, may be read back into the X Register 16. Examination of these gates 16–2 will show that they are 9's complement gates and that each digit which is read out of the X Register and passed through the MQC 23 will be 9's complemented before being reinserted into the X Register. The *t*0B+ timing signal from the Cycling Unit which is applied to all the gates 16–2 jams these gates so that the sign position P0 in the X Register 16 is cleared. It will be recalled that during D1 the division sentinel had been inserted into the P0 digit position of the X Register 16. However, the sentinel will not be destroyed by the action of the *t*0B+ timing signal applied to gates 16–2 because the sentinel, after being delayed for one pulse period in the MQC 23 will appear at the gates 16–2 at time *t*1B, and will hence read back into the X Register 16 in the P1 digit position. Fourth, the OR signal is applied to MQC read-in gate 23–6 and passes a *t*11B– timing signal from the Cycling Unit into the MQC, thereby jamming the MQC flip-flops to a value equal to decimal 10 at time *t*0B of the next minor cycle, which will be the beginning of the first add phase. This prepares the MQC for its count-down function. The (55+) and (56+) high level signals from the Control Encoder 27 respectively inhibit the recirculation of the contents of the A Register and recirculation of the contents of the X Register while the left shifts are taking place. The (31) low level control signal from the Control Encoder 27 which partially alerts OR flip-flop input gate 24–1 and D3 flip-flop input gate 25–7 is ineffective during the shift cycle, because, although an A signal could be regenerated no C signal can be had from the Comparator 17 (not shown). The A and C signals just mentioned denote by their combined presence a decimal carry from the addition of a pair of digits. The A signal can be generated by the Comparator during a shift operation because the contents of the A Register are being read through the Subtrahend Buffers 19, and the outputs of the Subtrahend Buffers in addition to going to the Adder input gates 18A are also routed to the Comparator. At the end of the first shift cycle a *t*11B+ timing signal from the Cycling Unit causes the Complement flip-flop 21 to be cleared to its $\overline{CP}$ state at time *t*0B of the next minor cycle. The $\overline{CP}$ signal will be needed at the Adder input gates 18A during the add phase which follows the termination of the first shift phase. The *t*11B+ timing signal from the Cycling Unit also clears the OR flip-flop 24A so that the OR and OR+ signals are suppressed at time *t*0B, and the ORA+ signal is suppressed at time *t*0A. The suppressing of the ORA+ signal at time *t*0A causes the IER–OR signal from IER–OR circuit 24B to be suppressed at time *t*0B. Thus the first shift phase is terminated and the first add phase is initiated, and in like manner every shift phase will be terminated and every add phase initiated, that is, by the *t*11B+ timing signal from the Cycling Unit. The loss of the ORA+ signal suppresses the (71) and (56+) control signals at time *t*0B. The loss of the OR+ signal unjams Instruction Decoder gate 26–19A, generating the ($31_{2A}$) high level signal at time *t*1A, and hence the (50) and (61) low level Control Encoder signals at time *t*1B. In addition, the suppressing of the OR+ signal unjams the output gates 14–4 of the L Register 14 at time *t*0B, hence allowing the recirculating divisor to read through the output gates 14–4 into the Minuend Buffers 20, and thence on to the M lines with the timing P0=*t*0B. The suppression of the OR signal closes X Register left shift gates 16–2 at time *t*0B, thus preventing the decimal 10 which was forced into the MQC by the OR signal at the end of the previous shift cycle from reading into the X Register 16. The loss of the IER–OR signal at time *t*0B closes the MQC input gates 23–2 so that the $X_{1-4}$ signals from the X Register 16 are no longer able to read into the MQC 23. The (55+) high level signal from the Control Encoder 27 maintains the recirculation path of the A Register 15 in a jammed condition and thereby prevents recirculation of the contents of that register. The (50) low level signal from the Control Encoder 27 opens the Adder output gates 18–45 to 18–64 so that the sum of the divisor reading into the Adder over the M lines and the dividend reading into the Adder over the S lines may be read back into the A Register 15. The process of adding the contents of the L Register and the contents of the A Register is performed once for each minor cycle until the proper number of addition operations have produced the overflow condition out of the space between words (SBW) digit position of the A Register 15. The detection of this condition will terminate the add phase and initiate the next shift phase in a manner to be described shortly. The (61) low level control signal from the Control Encoder 27 alerts the MQC count-down gates 23–15 through 23–19 so that the first quotient digit may be established by successive count-downs from 10. These gates will cause the count in the MQC to be reduced by 1 for each addition of the divisor and dividend that takes place. The specific mode of operation of the MQC count-down gates 23–15 to 23–19 has already been described in connection with the description of the detailed diagram FIGURE 23, and moreover also in connection with the explanations of the N, V, and multiplication operations, to which reference may be had. Low level control signal (31) from the Control Encoder 27 partially alerts OR flip-flop input gate 24–1 and D3 flip-flop input gate 25–7 to look for the overflow out of the SBW (P11 digit position) of *r*A. Gate 24–1 differs from gate 25–7 basically in that the former requires an $\overline{OF}$ signal from the Overflow flip-flop 22A whereas the latter requires the OF signal from the same flip-flop 22A. In the case of the division operation, the Overflow flip-flop does not give an indication of an overflow condition. It is merely used to give an indication of the detection of the division sentinel by sentinel detection gate 22–21. Before the detection of the division sentinel the Overflow flip-flop 22A is in its cleared or $\overline{OF}$ state and hence is partially alerting gate 24–1. However, when the division sentinel has been detected on the 10th shift phase the Overflow flip-flop is set to its OF condition thereby unalerting gate 24–1 and partially alerting gate 25–7. Whichever gate, 24–1 or 25–7, is alerted by the Overflow flip-flop 22A tests for overflow out of the SBW position in the following way. Both of these gates will be sampled at time *t*11B by a *t*11B– timing signal from the Cycling Unit and therefore the meaning of the presence of $S_3$ and $S_4$ bits and A and C signals must be considered at time *t*11B of the particular minor cycle of the add phase on which overflow will occur. It will be recalled from the detailed illustration preceding the description of the actual mechanics of division that an overflow out of the space between words digit position will always occur when there is a decimal 9 in the SBW position and a decimal carry is produced by the addition of the MSD digit of the divisor and the accumulated divisor and complemented dividend. Since these gates are sampled at time *t*11B, then the $S_3$ and $S_4$ bits appearing on the S lines must represent the number in the SBW position of the A Register because it will be recalled that the timing on the S lines is P0=*t*0B, and hence P11=*t*11B. The presence of $S_3$ and $S_4$ bits is a clear indication that a decimal 9 exists in the SBW position since an $S_4$ bit represents the decimal value 5 and an $S_3$ bit represents the decimal value 4, the sum being decimal 9. The A and C signals, denoting a decimal carry, represent the timing P10=*t*11B at gate 24–1. This is so since again recalling the timing on the S lines is P0=*t*0B, the timing into the Comparator 17 (not shown) is P10=*t*10B, and the one pulse period delay encountered by the P10 digits being propagated through the Comparator 17 causes the A and C signals to appear at gate 24–1 at time *t*11B. It is clear therefore that the $S_3$ and $S_4$ bits representing decimal 9 in the SBW position and the A and C signals representing decimal carry from the MSD positions will indicate that an overflow must occur out of the SBW position during the next pulse period. When, therefore, this condition occurs gates 24–1 will be selected and will set the OR flip-flop 24A via buffer 24–7, thereby generating the OR+, the ORA+ and OR signals, and hence initiating the next shift phase. The OR+, ORA+ and OR signals will arise at the same times as already indicated during the first shift phase, and the ORA+ signal will cause the IER–OR signal to be generated by the IER–OR circuit 24B at time *t*1B. These signals perform the identical functions already described in connection with the first shift phase, the only difference being that the IER–OR signal arising at time *t*1B instead of time *t*0B does not allow the P0 digit of *r*X to read through MQC input gates 23–2. Since the P0 or sign digit after being delayed through the MQC would have been read into the P1 digit position of the X Register, the P1 digit position is effectively made available so that the number stored in the MQC at the end of the previous add phase may be read into the LSD position of *r*X. When the IER–OR signal opens the MQC input gates 23–2 at time *t*1B therefore, the P1 digit will read through the MQC, being delayed for one pulse period, and will then be shifted into the P2 digit position of the X Register. Similarly, the digits P2, P3, etc., out of the X Register will read through the MQC 23, being delayed therein for one pulse period, and will then be read into the P3, P4, etc. digit positions of the X Register. Recalling now, that during the first shift phase the original digits in the X Register where 9's complemented and so were returned to the X Register in their complement form, it can be seen that during the second shift phase the digits which are read through the MQC and are again 9's complemented will be read back into the X Register in their true form. In addition, since the first quotient digit determined during the first add phase was the complement of the true quotient digit and it is also read into the LSD position of the X Register through the complement gate, 16–2, the first quotient digit will be inserted into the X Register as a true quotient digit. The manner in which the quotient is built up in the X Register should now be clear. Briefly, the build-up is accomplished in the following way. At the end of the second shift phase it has been shown that the first quotient digit was shifted into the LSD position of the X Register and that the original LSD digit was shifted into the P2 digit position. But this original LSD contained the shifted sentinel. During the next shift phase the sentinel will be shifted from P2 to P3, the first quotient digit will be shifted from P1 to P2, and the just calculated second quotient digit (which is a true quotient digit) will be inserted into P1. Therefore, at the end of the 9th shaft phase the sentinel will be in the P9 digit position and the first quotient digit will be in P8 with the second, third etc. quotient digits occupying P7, P6 and so on. On the next or 10th shift phase the sentinel, now occupying the P9 or MSD–1 digit position, is detected by sentinel detection gate 22–21 and is also shifted into P10 of *r*X via the MQC 23, with the first quotient digit being shifted into P9. The 10th add phase follows the 10th shift phase, and when the overflow out of the SBW position occurs the final shift or $D_3$ portion of the division operation will take place. The $D_3$ portion will be initiated instead of another shift phase as previously mentioned because the detected sentinel causes the Overflow flip-flop 22A to be set to its OF state, thereby alerting $D_3$ flip-flop input gate 25–7 and unalerting OR flip-flop 24A input gate 24–1. It should be observed that gate 25–7 also has as a required alerting signal the STR6 signal from the Static Register 25. This signal is required so that an ambiguous situation will not develop. It is conceivable that an improper division may have occurred and that this may happen during the last add phase. If this should occur, then it is desired that the Static Register flip-flops be cleared to 0 and that no $D_3$ portion of the division operation takes place. The improper division signal, when it occurs, will suppress the STR6 signal by clearing the Static Register 25, and hence, by requiring the STR6 signal as a required condition for initiating the $D_3$ portion of the division operation, $D_3$ may be prevented from taking place by the generation of the improper division signal. The effect of the improper division signal will be subsequently explained. Return now to time *t*11B of the 10th add phase when gate 25–7 is selected, assuming that an improper division has not occurred. The selection of gate 25–7 causes the $D_3$ flip-flop 25–37 to be set, thus causing the generation of the (32) low level control signal at time *t*0B of the next minor cycle and high level control signal (32A) at time *t*1A. In addition, the output of gate 25–7 passes through buffer 25–26 to the Static Register 25, causing Static Register FFD to be set to its STR4 state. The generation of the STR4 signal by the Static Register 25 causes Instruction Decoder gates 26–18A and 26–19A to become unselected since both of these gates require an $\overline{\text{STR4}}$ signal. Consequently all of the control signals associated with the $D_2$ portion of the division operation are suppressed by time *t*0B of the $D_3$ portion. The (32A) high level signal generated at time *t*1A by the $D_3$ flip-flop 25–37 is routed to the Control Encoder 27 and causes (86) and (67) low level control signals and the (56+) and (55+) high level control signals to be generated at time *t*1B. The (55+) and (56+) high level signals respectively jam the recirculation gates of the A Register and the X Register so that the information presently stored therein cannot recirculate back into the registers. The (32) low level signal generated at time *t*0B by the $D_3$ flip-flop 25–37 alerts A Register read-in gate 15–5 so that the last quotient digit and the contents of the X Register may be read into the A Register, thereby transferring the quotient from *r*X to *r*A. It is seen therefore that the last quotient digit is read directly into the LSD position of the A Register 15. The (32A) high level signal generated at time *t*1A by the $D_3$ flip-flop 25–37 performs two functions in addition to the generation of control signals via the Control Encoder 27. First, the (32A) signal is routed to the IER–OR circuit 24B causing the generation of the IER–OR signal commencing at time *t*1B. Second, the (32A) signal is applied to the MQC 23 via buffer 23–29 and causes the MQC flip-flops to be continuously cleared in the same manner as previously explained for the ORA+ high level signal. The presence of the IER–OR signal at time *t*1B opens the MQC input gates 23–2 so that the contents of the X Register may read through the MQC and into A Register input gates 15–5. Since the IER–OR signal opens the MQC input gates 23–2 at time *t*1B, the first digit out of the X Register which can read through the MQC 23, and hence into the A Register 15, is the P1 digit. This P1 digit is delayed by one pulse period in the MQC flip-flops 23 and is read into the P2 position of the A Register 15. The rest of the X Register digits continue to read through the MQC 23 and into the A Register, the P9 digit out of *r*X being the most significant quotient digit and reading into the P10 position of *r*A. The sentinel which occupies the P10 position of the X Register will be read into the P11 or SBW position of the A Register and will be cleared out of *r*A during the first recirculation within the register. Hence it can be seen that the least significant quotient digit (LSQD) has been read into the LSD position of *r*A and the most significant quotient digit (MSQD) has been read into the most significant or P10 digit position of the A Register. At the same time that this transfer is taking place from *r*X to *r*A via the MQC, the final remainder which was stored in the A Register 15 reads out of the A Register through the Subtrahend Buffers 19 and into the X Register via X Register input gates 16–4, which have been opened by the (32) low level control signal. The (86) low level control signal alerts input gates 11–1 and 11–2 to the Sign of (*r*A) FF 11B. A *t*11B– timing signal from the Cycling Unit samples these two gates at the end of the $D_3$ portion of the division operation to determine the sign of the quotient which has just been transferred to the A Register 15. Under the ordinary rules of division it is known that the sign of the quotient of two numbers is positive if the signs of the divisor and the dividend are alike, whereas the sign of the quotient is negative if the signs of the divisor and dividend are different. The proper sign of the quotient is established as follows. As has been seen, the (15A) high level signal jams the Sign of (*r*A) FF 11B to its minus state during the $D_1$ portion of division, thereby assuming that the signs of the divisor and dividend are different. If in fact the signs of the divisor and the dividend are the same, then either gate 11–1 or 11–2 will detect such condition and set the Sign of (*r*A) FF 11B to its plus state. It can therefore be seen that the Sign of (*r*A) FF 11B stores the sign of the quotient, and the Sign of (*r*X) FF 11A stores the sign of the remainder. However, the sign of the remainder stored in the Sign of (*r*X) FF 11A does not necessarily conform to the sign of the quotient since the sign stored therein is the sign of the original dividend and no steps are taken to conform this sign to the sign of the quotient. The (67) low level control signal alerts Static Register clearing gate 25–16 so that a *t*9B– timing signal from the Cycling Unit may pass therethrough to the Static Register clearing line at time *t*10B and cause the Static Register flip-flops to be cleared to their 0 or barred state at time *t*11B. The clearing of the Static Register flip-flops causes Instruction Decoder search gate 26–1A to be selected, thereby generating the control signals needed for the search for the next "C" address instruction word. The (32A) high level signal from the $D_3$ flip-flop 25–37 is suppressed at time *t*0A, and the (32) low level signal is suppressed at time *t*0B by the action of a *t*11B+ timing signal from the Cycling Unit. The suppression of the (32A) high level signal at time *t*0A causes the (86), (67), (55+) and (56+) control signals to be suppressed at time *t*0B, the same time at which the normal search signals are generated. The foregoing, or $D_3$ portion of the division operation, constitutes what may be considered a normal division termination. Consider now the abnormal termination of the division operation due to the generation of an improper division signal. Input gate 22–22 to the Overflow Flip-Flop 22A is the improper division detection gate. It will be observed that this gate requires four inputs to be selected. These are, the (31) low level control signal which exists during the $D_2$ portion of division, a *t*9B– timing signal from the Cycling Unit, and $Q_2$ and $Q_3$ signals from the MQC flip-flops FFB and FFC. The $Q_2$ and $Q_3$ signals, representing the decimal number 6 cannot normally occur in the biquinary system utilized since the decimal value 6 in this system is represented by a $Q_4$ and a $Q_1$. The $Q_2$, $Q_3$ combination arises when the MQC 23 counts down below the decimal value "0," and this can be established by making reference to the detailed diagram of the MQC figure 23. If such a condition arises it is known that 11 count-downs have taken place, and hence an error has been made. The *t*9B– timing signal from the Cycling Unit will therefore pass through gate 22–22 and be routed to two places. First, the output of this gate will pass through buffer 25–39 to the Static Register 25 clearing line and cause the Static Register flip-flops to be cleared to their "0" or barred state, thereby initiating a search for the next instruction without waiting for the completion of the division operation. Second, the output of this gate 22–22 will pass through buffer 22–38 and causes the Overflow flip-flop 22A to be set to its OF state. The DF signal from Overflow flip-flop 22A is routed to Overflow Delay flip-flop 22B input gate 22–24 which is partially alerted by the (1) low level control signal present because of the search operation which has just been initiated. At time *t*11B of the minor cycle on which time selection is found, gate 22–24 will pass a *t*11B– timing signal to set the Overflow Delay flip-flop 22B to its OF 2+ state. The OF 2+ signal is transmitted to the Overflow flip-flop 22A and clears it to its $\overline{\mathrm{OF}}$ state, thus fully alerting Static Register input gate 25–4. The OF 2+ signal is also transmitted to the TS flip-flop 12B and jams this flip-flop to its TS state so that the TS signal will be present for the "C+1" address. Consequently it is the "C+1" memory location contents which will be transferred during the $\beta$ cycle initiated by the *t*10B– timing signal applied to Static Register gate 25–4. It is seen therefore, that when an improper division has occurred the memory address of the next instruction will be found in the "C+1" memory location and not in the memory location designated by the "C" address of the Control Register. This system is for the convenience of the Programmer and allows the Programmer to put an alternate instruction in the "C+1" memory address should an improper division be detected. The alternate instruction may be an instruction to re-run the division operation, or it may be an instruction to initiate some sub-routine. This concludes the division operation.

INPUT-OUTPUT—FIGURES 48 THROUGH 52

*Introduction*

Having described the operation and construction of the computer, a typical input-output system for feeding information into the computer, and for reproducing information processed by the computer, will now be briefly described. For purposes of illustration, it will be assumed that the input-output apparatus includes a typewriter having first, an encoder section for converting manually typed data into the bi-quinary code for use in the computer and second, a decoder section for converting the bi-quinary code produced by the computer into typed characters. Such equipment is conventional in the art and does not form part of this invention. The illustration of a typewriter is for purposes of convenience only, and it will be obvious that other forms of input-output equipment could be employed. For example, various forms of tape readers and printers could be used as the input-output equipment for this invention.

The overall inter-connections for the input-output system are shown in simplified block diagram form in FIGURES 52A through 52D, while certain of the components in the input-output system are shown in more detailed form in FIGURES 48 through 51.

One of the principal components of the input-output system is the *r*0 Register, hereinafter called the 0 or *r*0 Register shown in FIGURE 50 which serves as the connecting link between the relatively slow digit rate input system, here a typewriter, and the relatively fast digit rate of the computer itself. This register receives the bi-quinary coded digits from the typewriter and stores them until such time as the computer calls for the contents of the *r*0 Register. The digits stored in the 0 Register are read out of the 0 Register and into the computer at the pulse rate of the computer. In coming out of the machine and into the typewriter during print-out operations the reverse relationship holds, namely the 0 Register is filled at machine rate and thereafter the contents of the 0 Register are read out and typed by the typewriter at the rate of the typewriter itself. In addition to serving as a synchronizing link between the input-output equipment and the computer itself, the 0 Register also has another vital function, namely that of reversing the order of the digits as they are read into and out of the computer. In more particular, the normal order of writing or typing a multi-digit number is from most significant digit to the least significant digit; whereas in the computer the digits are handled in the reverse order, namely from least significant digit to most significant digit. Thus the 0 Register operates, as will hereinafter be seen, to take from the computer in sequence, first the least significant digit and finally the most significant digit. When the *r*0 Register feeds its information to the typewriter it reverses the digit order so that the most significant digit is typed out first and the least significant digit last. On going into the computer from the typewriter, the most significant digit is fed into the 0 Register first but is read out of the 0 Register and into the computer last, to coincide with the digit order required by the computer.

*0 register (r0)*

Referring now to FIGURE 50, the details of the 0 Register will be described. As herein illustrated the 0 Register, like the other registers within the computer, comprises four parallel channels one for each bit of the 5421 bi-quinary code of the computer. All channels are identical in construction and operation and only the first channel will be described in detail. Unlike the other registers in this invention the 0 Register comprises eleven cascaded stages of recirculating storage which operate so that a bit read into any stage may be recirculated within that stage indefinitely, or alternatively the recirculation within the individual stages may be interrupted and the bits caused to shift from stage to stage with the output of the last stage recirculating back into the input of the first stage so as to simulate the end around recirculating registers within the computer. Referring now to the first channel of the 0 Register, shown in partial detail, and examining stage 50–2A, it will be seen that each stage comprises an input complementer labelled in this stage as 50–20B, an output complementer 50–24B connected in cascade with the input complementer and a stage recirculation loop comprising a recirculation gate 50–25B connected to a recirculation complementer labelled 50–23B. There are eleven such stages in each channel of the register, and each stage is connected to the next stage through a shift gate exemplified at 50–19B for the connection between the first and second stages. Also the output of the last stage 50–11A of the register is connected back to the input of the first stage through a similar shift gate labelled 50–19A. In operation a bit fed into any stage, with the stage recirculation gates 50–25, 50–25B etc. opened, will recirculate within that state until the recirculation gate is closed. Likewise a bit in one stage will not be transferred to the next stage until the inter-connecting shift gate, such as gate 50–19B, 50–19K etc. inter-connecting the stages is opened. If this gate is opened then the bit recirculating with the one stage will be transferred to the next stage. Each shift gate 50–19A, 50–19B etc. has two inputs thereto; one input is derived from the output of the immediately preceding stage and the other input is a shift input connected in common to all shift gates in each channel of the register. These common inputs are connected to a line marked "shift." The recirculation gates also have two inputs thereto; one input for each of the recirculation gates 50–25, 50–25B, 50–25K etc. is obtained from the output of the associated stage in the register, the other input to these gates is a common input labelled "hold." In operation if the shift line is held at a high potential all the shift gates are blocked. If at the same time the "hold" line is held at a low potential all the recirculation gates are opened. In this set-up, each stage recirculates its own bit continuously. By reversing the potentials on the shift and hold lines, that is by driving the "shift" line low and the "hold" line high, it will be seen that each of the hold gates is jammed so that the bit in any stage cannot recirculate. At the same time the shift gates are all opened so that bits in one stage may transfer to the next stage etc. with the output of the last stage being fed back into the input of the first stage. Under these conditions the register then operates as a conventional end around register where the bits go from one stage to the next in the conventional manner. The final condition for the shift and hold lines is that both of them may be momentarily raised to a high level. Under this condition both the shift gates and the hold gates are jammed so a bit cannot recirculate within its stage and cannot be transferred to the next stage. When this condition occurs, the contents of the 0 Register are cleared and this comprises the arrangement for clearing the 0 Register as will later be described.

As indicated in FIGURE 50 each of the channels of the 0 Register has a corresponding input shown in detail at 50–15A for the first stage, and in blocks 50–15B for the second, 50–15C for the third and 50–15D for the fourth. All of these inputs are the same and only the first one shown at 50–15A will be described in detail. As indicated at 50–15A the input to the 0 Register comprises an input gate 50–13A which receives two inputs one of which marked RIN is common to all input gates and is a gating signal. This signal is a recurrent signal developed during the time that the 0 Register is being filled and is derived in part from the typewriter itself, whenever the register is being filled from the typewriter, or is derived from the computer itself whenever the 0 Register is being filled by the computer. In the first instance where the RIN is developed under control of the typewriter the RIN occurs at the typewriter rate whereas in the second instance the RIN is developed at computer rate. In either event the RIN signal is a gating signal which operates to open the *r*0 input gates 50–13A etc. to permit the bits coming from lines R1, R2, R3 and R4 of the input circuits for the 0 Register (FIGURE 51) to be gated into the 0 Register. The R1 through R4 inputs represent the four parallel bits of a digit as will be seen. Each input circuit, 50–15A to 50–15D, includes an A phase complementer shown at 50–21 the output of which is connected to the B phase complementer 50–24 in stage 1 of the various channels in the 0 Register.

Each channel of the register includes a read out circuit shown in detail at 50–18A for the first channel and in block form designated 50–18B, 50–18C and 50–18D for the other channels. Each read out circuit includes a gate 50–17A etc. on which are impressed three inputs. The first input is the output from the eleventh stage of the associated channel of the 0 Register, the second input is a (29) Control Encoder signal which obtains whenever it is desired to read information from the 0 Register into the computer, and an $IB_1$ signal which is an inter-lock Flip Flop signal obtained from the circuitry shown in FIGURE 48A. The $IB_1$ signal obtains whenever the 0 Register has been filled by the typewriter. The output of each of the output gates 50–17A etc. is fed through an A phase complementer onto the $DM_{11}$, $DM_{21}$, $DM_{31}$, $DM_{41}$ lines from where they go to the Minuend Buffer circuits of FIGURE 20.

In addition to the read out circuits which connect the output of the 0 Register to the computer, print out circuits are included to connect the 0 Register to the typewriter so that the information in the 0 Register may be printed out by the typewriter. These circuits are shown in detail at 50–16A for the first channel and in block form 50–16B, 50–16C and 50–16D for the other channels. Each print out circuit includes an input gate labelled 50–14A for the first channel followed by a B phase complementer 50–26, the output of which goes to a buffer 50–28 and to the input of an A phase amplifier 50–27. The output of the A phase amplifier 50–27 is connected to the buffer 50–28. The output of the buffer 50–28 drives a relay coil 50–29 associated with the keyboard of the typewriter. In operation all the relay coils 50–29 are connected in a conventional manner to the keys of the typewriter so that with a given code being read out of the respective channels of the 0 Register, the various relay coils 50–29 will be excited to select a predetermined typewriter key for operation in accordance with known techniques. To control the print out circuits each of the gates 50–14A etc. have in addition to the output of the first stage of the 0 Register, a PR signal obtained from the print Flip-Flop 52–29. The print Flip-Flop 52–29 is a conventional flip-flop circuit and operates to produce a PR signal whenever a print-out operation is to take place. The PR signal thereby alerts the gates 50–14A etc. to permit the bits recirculating in the first stage to cause operation of the associated relay coils 50–29 etc. As will be understood, the energization of the relay coils themselves take a certain finite amount of time, so that during a normal, end around recirculation of the contents of the 0 Register where all the recirculation gates 50–25, 50–25B etc. to 50–25K are blocked and the bits are recirculating in an end around manner, the bits pass the input gates to the print out circuits at rates which prevent their energizing the relay coil 50–29. When, however, the 0 Register goes into the hold phase where the contents are recirculated individually in each stage, and when the PR signal is present, a bit recirculating in the first state will, after a number of recirculations, cause the relay coil 29 to operate. Operation of the relay coil, as will be described, causes the typewriter to print out the digit then circulating in the first stage of the register. Then, as will be described, a common sprocket pulse (CSP signal) is generated and this causes the 0 Register to go through a ten place shift and bring the next digit into the first stage of the register, for print out. After all of the digits have been printed out, the operation is terminated in a manner to be described in connection with the over-all block shown in FIGURES 52A to 52D.

*0 register input circuits*

Turning now to the input circuits for the 0 Register shown in FIGURE 51, it will be seen that these circuits are provided with four output lines labelled R1 to R4 which connect to the 0 Register input in the manner indicated. Each of these output lines is driven from a B phase complementer labelled 51–15, 51–16, 51–17 and 51–18 for the respective R1 to R4 outputs. Driving each of the B phase complementer are three A phase complementers 51–7A, 51–8A, 51–9A for the R1 output line; 51–7B, 51–8B, 51–9B for the R2 output line; 51–7C, 51–8B, 51–9C for the R3 output line, and finally, 51–7D, 51–8D, 51–9D for the R4 output line. Each of the three A phase complementers associated with the R1 to R4 outputs is controlled by a corresponding gate labelled 51–1A, 51–2A and 51–3A for the R1 circuit; 51–1B, 51–8C, 51–9C for the R3 output line, and finally, 51–7D, for the R3 circuit, and finally 51–1D, 51–2D, 51–3D for the R4 circuit. Gates 51–1A through 51–1D have two input signals applied thereto one of which is the K signal which is obtained from the Input Ready Flip-Flop 52–21 shown in FIGURE 52B. The Input Ready Flip-Flop 52–21 may be of conventional design having a set or K input and output circuit and a clear, or $\overline{K}$ input and output circuit. The set, or K signal is a low level permissor signal which obtains whenever it is desired to type information into the 0 Register from the keyboard. At this time the Input Ready Flip-Flop is set to produce the K signal and alert all gates 51–1A through 51–1D, the other inputs to these gates namely KB1, KB2, KB3 and KB4 for gates 51–1A through 51–1D respectively, are the bi-quinary pulse signals which are obtained from the decoder associated with the typewriter. In more particular, the typewriter decoder operates to produce a bi-quinary coded pulse group of KB pulse signals for each type key. For example, whenever the typewriter key corresponding to the digit 1 is struck by the operator, a "1" bit will appear at terminal KB1 and "0" bits will appear at KB2 through KB4. Similarly, whenever the key character 6 is struck by the operator "1" bits will appear at KB1 and KB4 terminals and "0" bits will appear at KB2 and KB3 all in accordance with the bi-quinary code. Gates 51–2A through 51–2D each have three signals impressed thereon. The first signal is an (84) Control Encoder signal, which is applied to all gates in parallel. This signal is a permissor for the gates and exists whenever it is desired to read information out of the computer and into the 0 Register. The second signal which is common to all the gates 51–2A through 51–2D is the $\overline{IA}$ signal obtained from the IA Inter-lock Flip-Flop shown in FIGURE 48A. This signal is also a permissor and obtains whenever the 0 Register is not in use. If the 0 Register is in use or is not available, then an IA signal is obtained from the Inter-lock Flip-Flop and gates 51–2A through 51–2D are blocked. The final inputs, $S_1$ through $S_4$ for the gates 51–2A through 51–2D are obtained from the Subtrahend Buffer lines of FIGURE 19. Since it is known that only the output of the C Register and A Register traverse the Subtrahend Buffer lines, then it is apparent that gates 51–2A through 51–2D are used to fill the 0 Register from the A Register or the C Register within the computer.

Finally gates 51–3A to 51–3D each have two inputs impressed thereon. The first input to these gates is common to all gates and is the (84) Control Encoder signal. As mentioned above this signal is a permisssor and exists whenever it is desired to read information out of the computer and into the 0 Register. The other inputs, $M_1$ through $M_4$, for these gates are obtained from the Minuend Buffer lines shown in FIGURE 20. The M line signals are obtained from the outputs of the X and L Registers. Summarizing then it will be seen that gates 50–1A to 50–1D are used whenever the 0 Register is to be filled from the typewriter. Gates 51–2A to 51–2D are used whenever it is desired to fill the 0 Register from the A or C Register of the computer. Finally, gates 51–3A to 51–3D are used whenever it is desired to fill the 0 Register from the X or the L Register within the computer.

In addition to the input gates already described, there are three other input gates for the input circuits for the 0 Register. These three gates are shown at 51–4, 51–5 and 51–6 and represent the input gates for feeding the sign information contained in the A, X and L Register into the 0 Register itself. The sign information from the typewriter is not fed into the 0 Register but is stored directly in the sign of *r*0 Flip-Flop 52–26 shown in FIG. 52B. As indicated the output of each of the sign gates drives a corresponding A phase complementer the outputs of which are all buffed together and through buffers 51–13, and 51–14 to the R1 and R3 lines of the input circuits for the 0 Register. It will be recalled that sign information within the computer is represented by the appearance of a "1" bit or a "0" bit in the 1st bit position of the P0 digit of the computer word. It will also be appreciated that although the computer can detect this sign information due to its P0 timing, the typewriter encoder would not be able to distinguish between a P0 bit and the decimal digit one. Therefore, the sign information coming from the computer is stored in the *r*0 Register as an improper five. That is, the sign information in the computer is gated into the *r*0 register as a 0101 by buffing the sign information into channels $R_1$ and $R_3$ by buffers 51–13 and 51–14. On print out then, the typewriter will recognize the 0101 code as a minus sign. Positive value numbers may be unsigned on print out.

Referring to gates 51–4 to 51–6, it will be seen that gate 51–6 is the gate used for transferring the sign of the *r*L register into the 0 Register. To this end, gate 51–6 receives the L— signal from the sign of *r*L Flip-Flop, an RSL signal from the register selector element 52–13 (FIGURE 52D), a *t*0B– gating signal from the Cycling Unit, and an SCOB signal from the SCO Flip-Flop 49–38 shown in FIGURE 49B. The RSL signal is a manually switched signal which exists whenever information is to be transferred from the L Register to the 0 Register. The SCOB signal is a permissor signal which is automatically obtained at the time information is to be transferred from the computer to the 0 Register. Gate 51–5 is similar in operation except it is used to transfer the sign information from the X Register to the 0 Register. To this end, this gate receives the X— output from the sign of *r*X Flip-Flop, a *t*0B– gating signal from the Cycling Unit, the SCOB signal from the SCO Flip-Flop, and the RSX signal from the register selector element 52–14 shown in FIGURE 52D. Thus, whenever information is to be transferred from the X Register to the 0 Register, gate 51–5 will operate to transfer the sign information. Finally gate 51–4 is used to transfer the information concerning the sign of the A Register into the 0 Register. This gate receives the $\overline{IA}$ signal from the Inter-lock Flip-Flop shown in FIGURE 48A, the A— signal from the sign of *r*A Flip-Flop, the 84 Control Encoder signal which exists whenever information is to be read out of the computer and into the 0 Register, and a (58+) jamming signal from the Control Encoder.

*Sprocket and Interlock Flip-Flops*

Turning now to FIGURE 48B, the Sprocket Flip-Flop Hold and Shift circuits which control the operation of the 0 Register are shown. The Sprocket Flip-Flop is shown at 48–31. This Flip-Flop comprises a B phase complementer 48–54 connected to input of a recirculation gate 48–57 the output of which feeds an A phase complementer 48–55. The output of the A phase complementer 48–55 feeds back through a buffer 48–56 to the input of the recirculation complementer 48–54. A *t*9B+ reset signal is connected to the recirculation gate 48–57 so that the Flip-Flop 48–31 is cleared at time *t*10A each minor cycle of machine operation. In more particular, the *t*9B+ timing signal jams gate 48–57, and a high level signal is propagated through the gate 48–57 to cause complementer 48–55 to produce a low level output signal. This low level output signal is recirculated through complementer 48–54 to sustain the low level output from the Flip-Flop 48–31. This represents the normal clear condition of the Sprocket Flip-Flop circuit. The output of the Sprocket Flip-Flop is coupled through a buffer 48–58 to the input of buffers 48–60 and 48–62 which represent the input circuits for the "shift" line of the 0 Register and the "hold" line of the 0 Register respectively. Each of these circuits includes in addition to buffers 48–60 and 48–62 a B phase complementer 48–59 for the "shift" line and a B phase amplifier 48–61 for the "hold" line. Thus whatever the Sprocket Flip-Flop 48–31 is set to produce high level outputs it will be seen that these high level outputs propagate through buffers 48–60 and 48–62 to produce low level shift pulses and high level hold pulses. This is the condition for effecting a normal end around shifting operation of the 0 Register.

The Sprocket Flip-Flop 48–31 can be set from either gate 48–32 or 48–33. The output of gate 48–33 feeds an A phase complementer 48–48, the output of which is connected directly to the recirculation loop of the Sprocket Flip-Flop 48–31 as shown, whereas the output of gate 48–32 is connected through another A phase complementer 48–47 and buffer 48–34 to the recirculation loop of the Sprocket Flip-Flop 48–31. As shown gates 48–33 and 48–32 receive PR and $\overline{PR}$ outputs respectively from the Print Flip-Flop 52–29. The PR and $\overline{PR}$ signals are the set and clear outputs from the Print Flip-Flop 52–29, shown in FIGURE 52C. If the operation to be performed is a print operation then the Print Flip-Flop 52–29 is set to produce the PR signal and gate 48–33 is alerted. If on the other hand a type-in or a non-print operation is being performed then the Print Flip-Flop 52–29 is cleared to produce the $\overline{PR}$ signal and gate 48–32 is partially alerted. Gate 48–32 in addition, receives the $\overline{C1}$ signal from the counter 52–24 shown in FIGURE 52B. Counter 52–24 is a conventional counter circuit capable of counting to at least 12. This counter is jammed to a one count, here represented by the signal condition C1, each time a type-in or a print-out is to be performed. Then each time a typewriter key is activated either on type-in or print-out, the counter 52–24 is stepped one count. Thus at the start of a print-out or a type-in, the counter will be in its C1 state. Then after one key, the sign key for example, has been activated the counter is thereafter in its $\overline{C1}$ state. The $\overline{C1}$ signal will partially alert gate 48–32 and if the operation is a type-in the $\overline{PR}$ signal will be present and gate 48–32 will be fully alerted. The remaining inputs for gates 48–32 and 48–33 is the common sprocket or CSP signal. This signal is derived from gate 48–40. Gate 48–40 receives three signals, namely a *t*9B– gating signal from the Cycling Unit, an EW signal from the Every Other Word Flip-Flop, FIGURE 33A, and the set signal from the Sprocket Synch. Flip-Flop 52–19 (FIGURE 52B). As shown in FIGURE 52, the Sprocket Synch. Flip-Flop 52–19 is set each time a key on the typewriter is activated, since the activation of any key will generate a sprocket signal from the typewriter. Thus each time a key on the typewriter is activated, the Sprocket Synch. Flip-Flop will be set, and at time *t*9B, the *t*9B– gating signal will pass through the gate 48–40. This signal propagates through gate 48–40 and the one pulse delay circuit 48–41 to produce a CSP signal at time *t*10B. Then if gate 48–32 is alerted, the CSP will produce an RIN signal at *t*11B and will set the Sprocket Flip-Flop 48–31 at time *t*0A.

On type-in, gate 48–32 is alerted as described above and each CSP signal after the first will produce an RIN signal at *t*11B and will set the Sprocket Flip-Flop 48–41 at *t*0A. Ten pulse periods later, at time *t*10A, Sprocket Flip-Flop 48–31 will be cleared by the *t*9B+ jamming signal on gate 48–57. Setting the Sprocket Flip-Flop at *t*0A and clearing it at *t*10A will produce ten low level shift pulses and ten high level hold pulses commencing at time *t*0B and stopping at time *t*10B. Thus each typed character, after the first, will be gated into the 0 Register by the resulting RIN signal and will be immediately shifted ten places to the eleventh stage of the 0 Register by the action of the ten shift pulses generated by the Sprocket Flip-Flop 48–31. Accordiingly as each character is typed into the 0 Register it is immediately shifted to the eleventh stage of the 0 Register. The previously typed in characters will also be shifted ten places and will now recirculate in a stage in the 0 Register just ahead of the stage they were in prior to the typing in of the last character. Then after ten or some fewer number of digits have been typed into the 0 Register the "Fill" key on the typewriter will be struck. Striking the "Fill" key sets the IB Flip-Flop, as will be seen, to $IB_1$. The $IB_1$ signal operating through gate 48–38 as will later be described, produces a train of shift pulses starting at *t*0B, thereby causing the contents typed into the 0 Register to recirculate in an end around fashion in the 0 Register. During this recirculation the last digit typed into the 0 Register will appear at the input to the read out gates 50–17A etc. at time *t*0B of each minor cycle, while the next to the last digit will appear at the read out gates 50–17A at time *t*1B etc. Thus when the computer calls for the contents of the 0 Register by producing a (29) Control Encoder signal, the last digit typed into the 0 Register will be the first digit read out, while the first digit typed into the 0 Register will be the last digit read out. This covers the mechanism for filling the 0 Register by the typewriter.

Referring now to gate 48–38 the operation of this circuit to permit normal end-around recirculation of the contents of the 0 Register after the same has been filled by the typewriter will now be discussed. This gate receives the $IB_1$ signal which is present after the fill key on the typewriter has been struck and a *t*10B+ jamming signal from the Cycling Unit. The output of gate 48–38 is connected through an A phase complementer 48–49 to the "hold" and "shift" line buffers 48–62 and 48–60.

The $IB_1$ is a low level signal which will hold gate 48–38 opened except at time *t*10B when it is jammed closed by the *t*10+ jamming signal. Gates 48–38 operating through complementer 48–49 will cause the generation of eleven low level shift pulses and eleven high level hold pulses each minor cycle. This same circuitry, due to the *t*10B+ jamming signal, causes the generation of one low level hold and one high level shift pulse each minor cycle. Thus for one pulse period each minor cycle after the $IB_1$ signal has come on, the shift signals are interrupted and the hold signals are applied. This is necessary since the word time is twelve pulse periods in duration and the 0 Register has only eleven stages. Thus for one pulse period of each minor cycle after the $IB_1$ signal has come on, the bits normally recirculating in the 0 Register in an end around fashion will be interrupted to permit recirculation within the stage for this pulse period thereby accommodating the eleven stage 0 Register to the twelve pulse period minor cycle of the machine and at the same time maintaining synchronization of the bits in the 0 Register.

If the 0 Register is filled from the computer then the RIN signals must be produced at machine rate and the shift and hold circuits must be controlled directly from the operation of the computer itself. To produce the RIN signals at computer rate gate 48–35 is included. The output of this gate feeds through an A phase complementer 48–46 and buffer 48–42 into complementer 48–53 the output of which represents the RIN signals. Gate 48–35 has for one its inputs, the $\overline{IA}$ signal which is obtained from the Inter-lock Flip-Flop shown in FIGURE 48A. As noted above this signal exists whenever the 0 Register is not in use. The other input for gate 48–35 is the (84) Encoder signal which is obtained whenever it is desired to read the information out of the computer and into the 0 Register. Thus assuming that it is desired to read information out of the computer and into the 0 Register and the $\overline{IA}$ signal is present, then when the (84) signal comes on at time *t*0B gate 48–35 will operate to produce RIN signals for a minor cyle at machine speed. To control the shift and hold operations during this time, gates 48–36 and 48–37 are added. Gate 48–37 has impressed thereon the (84) signal and the $\overline{IA}$ signal. This gate drives an A phase complementer 48–51 the output of which is buffed to the hold line to block the hold gates in the 0 Register. At the same time gate 48–36 is alerted by the (84) and $\overline{IA}$ signals. This gate has also impressed thereon, the *t*0B+ signal which jams gate 48–36 for one pulse period. Gate 48–36 operating through complementer 48–50 and complementer 48–59 produces low level shift signals to permit the information being read into the 0 Register from the computer to be shifted in the 0 Register in the normal end-around fashion except when the *t*0B+ signal jams gate 48–36. At this time and more particularly at time *t*1B as it appears in the output of the shift line, the shift signal will go high. The shift signal being high and the hold signal being high permits the register to be cleared of its previous contents before the read in from the computer takes place.

The final circuit shown in FIGURE 48B comprises a buffer 48–39 and an amplifier 48–52 the output of which represents the Q line in FIGURE 52. The Q signal is used to jam the counter 52–24 to C1 as will be described and at the same time to clear the 0 Register. This is accomplished by connecting the output of the amplifier 48–52 through buffer 48–62 to the hold line. Thus whenever one of the inputs to buffer 48–39 goes high the "hold" output line will also go high thereby clearing the 0 Register. The signal sources for buffer 48–39 include the E signal from the Erase circuit 52–23, the T signal from buffer 48–8, the PR′ signal from the set input of the Print Flip-Flop 52–29, and the SCO′ signal from the Supervisory Control Output Flip-Flop 49–38.

Before describing the Interlock Flip-Flops and the rest of the input-output circuiting, a few comments concerning the actions of the 0 Register and the Sprocket Flip-Flop circuit of FIGURE 48B during a print-out is in order. It will be obvious that the print-out operation is in effect during the time that the 0 Register is to be filled from the computer. At this time, with the (84) Control Encoder signal present, the Print Flip-Flop 52–29 (FIGURE 52C) is set to the PR condition. The PR signal alerts the print-out gates 50–14A etc. associated with the 0 Register, and the gate 48–33 in the Sprocket Flip-Flop circuit, FIGURE 48B. After a minor cycle, the (84) signal disappears and its control over the 0 Register shift and hold circuits is removed. The 0 Register is filled and the digits stored in the 0 Register are permitted to recirculate within the respective stages, that is, the end around recirculation is killed and recirculation of the bits within each stage is initiated. At this time the sign digit is recirculating in the first stage of the 0 Register, with the most significant digit stored in stage 2 and the least significant digit stored in the 11th stage of the 0 Register. Since stage by stage recirculation is present and since the print-out gates 50–14A are alerted by the PR signal, the recirculation of the sign bits in the first stage will eventually cause the relay coils 50–29 to actuate. Actuation of these relays pulls the sign key down on the typewriter to effect printing of the sign. When the sign key is actuated, a sprocket signal is generated by the typewriter to thereby set the Sprocket Synch. Flip-Flop 52–19. Setting the Sprocket Flip-Flop 52–19 produces Sprocket Sync. Set signal which is applied to gate 48–40 along with the EW signal and the timing signal *t*9B–. The output of gate 48–40 is fed to amplifier 48–41 which one pulse period later produces a CSP signal which is gated through the alerted gate 48–33 to set the Sprocket Flip-Flop 48–31. Setting the Sprocket Flip-Flop 48–31 causes the production of ten shift pulses as previously described to thereby shift the contents of the 0 Register ten places. This brings the most significant digit, previously held in stage 2 of the 0 Register into the 1st stage where it is eventually printed and starts the next shift cycle where the second most significant digit will be brought into the first stage of the 0 Register. This action continues until all the digits stored in the 0 Register have been printed out, at which time the Print Flip-Flop will be cleared to the $\overline{PR}$ condition.

Referring now to FIGURE 48A, there is shown the IA and IB Interlock Flip-Flops used in association with the 0 Register to indicate the state of the register. The IB Flip-Flop is shown in general at 48–1, and is used to indicate whether or not the 0 Register is full. This Flip-Flop, as shown, comprises a B phase complementer 48–29 the output of which is marked $IB_1$ and is fed back through a recirculation gate 48–27, an A phase complementer 48–26, and buffer 48–30 to its input. Connected to the output of the A phase complementer 48–26 is another B phase complementer 48–28 the output of which is marked $IB_2$.

The IB Flip-Flop 48–1 can be set to produce low level outputs on lines $IB_1$ and $IB_2$ from either of two sources. The first source is from the load switch circuit shown in FIGURE 52A. Closure of the load switch will produce a high level signal which is propagated through buffer 48–30 to produce low level $IB_1$ and $IB_2$ signals thereby to indicate that the 0 Register is full or is being used in a load operation. The second source for setting the IB Flip-Flop 48–1 is gate 48–6, the output of which is fed through complementer 48–18 to the input of buffer 48–30. The output from complementer 48–18 also is used to produce an output on the RE line which connects to the Input Ready Flip-Flop 52–21 to clear same to the $\overline{K}$ condition. Gate 48–6 has two inputs thereto. The first input is the CSP signal from FIGURE 48B and the second input is from the Fill key of the typewriter 52–20. Gate circuit 48–6 is used whenever the 0 Register is being filled from the typewriter, that is when the operator has typed the desired number of digits into the 0 Register he strikes the Fill key. This gates the CSP signal through gate 48–6 at time *t*10B to thereby set the IB Flip-Flop 48–1. Setting the IB Flip-Flop from this source, initiates the production of $IB_1$ low level signals at *t*11B and low level $IB_2$ signals at *t*0B.

The IB Flip-Flop 48–1 can be cleared from three separate sources shown connected to the PE line of the figure. The first source is the disconnect signal from the disconnect circuit 52–22 (FIGURE 52B). Operation of the disconnect switch produces a high level pulse which is fed through buffer 48–5 and amplifier 48–20 to the PE line and thus to the recirculation gate 48–27 of the IB Flip-Flop. A high level signal at this point blocks the recirculation of the low level $IB_1$ signal and clears the IB Flip-Flop to produce high level signals at outputs $IB_1$ and $IB_2$ thus indicating that the 0 Register has been emptied. The second clearing source for the IB Flip-Flop 48–1 comprises gate 48–3 and complementer 48–16, the output of the latter connecting through amplifier 48–20 to the PE line. Gate 48–3 has impressed thereon, the (29) Control Encoder signal, the $IB_2$ signal and a *t*10B– timing signal from the Cycling Unit. A coincidence of low level signals at this gate causes a high level jamming signal to appear at the recirculation gate 48–27 at time *t*11B thereby causing the initiation of high level $IB_1$ and $IB_2$ outputs at time *t*0B. From the use of the (29) Control Encoder signal on gate 48–3 it will be obvious that this represents the clearing source for the IB Flip-Flop during an I order, that is when the 0 Register is being emptied into the computer. The last source for clearing the IB Flip-Flop comprises gate 48–4 and complementer 48–17 the output of which is also connected through the amplifier 48–20 to the PE line. Gate 48–4 has impressed thereon the $C_{12}$ output of the Counter 52–24 (FIGURE 52B), the PR output of the Print Flip-Flop 52–29 (FIGURE 52C) and a *t*10B– timing signal from the Cycling Unit. A coincidence of low level inputs at this gate causes a high level jamming signal to appear at the recirculation gate 48–27 at time *t*11B thereby causing the initiation of high level $IB_1$ and $IB_2$ signals at time *t*0B. From the use of the PR signal, it will be recognized that gate 48–4 is used whenever the 0 Register is being emptied into the typewriter on a print-out operation. Before leaving this gate it should be mentioned that the C12 signal from the counter 52–24 obtains whenever eleven characters have been typed in or printed out by the typewriter 52–20.

The IA Flip-Flop, which is used to indicate whether or not the 0 Register is in use is shown at 48–2. This Flip-Flop includes a B phase complementer 48–23 the output of which is marked IA, a recirculation gate 48–24, and an A phase feedback complementer 48–25 for feeding the output of the complementer 48–23 back into its input through a buffer 48–21. Connected to the output of the feedback complementer 48–25 is a B phase amplifier 48–22 the output of which is marked $\overline{IA}$.

In its cleared state, the IA Flip-Flop 48–2 produces low level $\overline{IA}$ signals and high level IA signals, whereby it is indicated that the 0 Register is not in use. In its set state, the IA Flip-Flop 48–2 produces low level IA signals and high level $\overline{IA}$ signals, whereby it is indicated that the 0 Register is in use.

The IA Flip-Flop is cleared from the PE line in its same way and at the same time as the IB Flip-Flop is cleared. In more particular, one of the inputs to the recirculation gate 48–24 is connected to the PE line so that whenever a high level pulse is present on this line to clear the IB Flip-Flop by jamming recirculation gate 48–27, it also jams recirculation gate 48–24 to clear the IA Flip-Flop.

The IA Flip-Flop is set by feeding a high level pulse to the input of buffer 48–21. Four separate sources are shown for setting the IA Flip-Flop. The first source, comprises gate 48–7 and complementer 48–19 the output of which is fed into buffer 48–21. Gate 48–7 has impressed thereon, an (83) signal from the Control Encoder, an $\overline{IA}$ signal and a *t*11B– timing signal from the Cycling Unit. Whenever there is a coincidence of low level signals at gate 48–7 complementer 48–19 produces a high level pulse which will set the IA Flip-Flop at *t*0B thereby indicating that the 0 Register is in use. As will be apparent from the (83) signal on gate 48–7, this gate is used to set the Flip-Flop whenever the 0 Register is being filled by the computer during an 0 order. The other three sources for setting the IA Flip-Flop 48–2 are obtained from gates 48–9, 48–10 and 48–11, the outputs of which are connected through corresponding A phase complementers 48–15, 48–14 and 48–13 to buffer 48–8. The output of buffer 48–8 is fed to the IA Flip-Flop to set the same and to the T line to set the Input Ready Flip-Flop 52–21 (FIGURE 52B). Gate 48–9 has impressed thereon, a (1) Control Encoder signal, an EW signal from the Every Other Word Flip-Flop, an $\overline{IA}$ signal, the F signal from the input alert circuit 52–27 (FIGURE 52B) and a *t*9B– timing signal from the Cycling Unit. A coincidence of low level signals in this gate will produce a high level signal from complementer 48–15 to thereby set the IA Flip-Flop 48–2 and also produce a T signal to set the Input Ready Flip-Flop 52–21. Gate 48–10 has impressed thereon, the F signal from the Input Alert Circuit 52–27, a *t*9B– timing signal from the Cycling Unit, an EW signal from the Every Other Word Flip-Flop, an $\overline{IA}$ signal, an IOS signal from the IOS Flip-Flop 52–8 (FIGURE 52A) and a $\overline{LOAD}$ signal from the load Flip-Flop 52–17 (FIGURE 52D). Again, a coincidence of low level signals on this gate causes complementer 48–14 to produce a high level signal to set the IA Flip-Flop 48–2 and also produce a T signal to set the Input Ready Flip-Flop. The final source is gate 48–11 which has impressed thereon the SCI signal from the SCI Flip-Flop 49–1 (FIGURE 49), a *t*9B– timing signal from the Cycling Unit and a load signal from the Load Flip-Flop 52–17. Here again, a coincidence of low-level signals on gate 48–11 will cause complementer 48–13 to produce a high level pulse to set the IA Flip-Flop 48–2 and a T signal to set the Input Ready Flip-Flop 52–21. The operation of gates 48–9, 48–10 and 48–11 to set the IA Flip-Flop 48–2 and the Input Ready Flip-Flop 52–21 will be described in more detail in the description of FIGURES 52A to 52D. Refer now to FIGURE 49B where there is illustrated the Supervisory Control Output Flip-Flop 49–38 and its related input and output circuitry.

*Supervisory control circuits*

The Supervisory Control Output Flip-Flop 49–38, hereinafter designated as the SCO Flip-Flop, comprises a complementer 49–28 which generates low level $SCO_B$ signals at its output. Complementer 49–28 is connected via recirculation gate 49–29 to the input of complementer 49–30 which in turn is connected at its output to the input of complementer 49–28 so that there is a feedback loop from the output of the last named complementer back to its own input. Further the output of complementer 49–28 is connected to the input of complementer 49–31 which generates high level Gen 84 signals at its output and is connected to the inputs of gates 49–32 to 49–34.

It will be observed that Flip-Flop 49–38 is connected at one input of its recirculation gate to the *t*10B+ output of the Cycling Unit (FIGURE 34). Thus at time *t*10B a high level signal will be transmitted through recirculation gate 49–29 to the input of complementer 49–30 which will generate a low level signal at the input of complementer 49–28 at time *t*11A. In response to a low level input at time *t*11A complementer 49–28 will produce a high level output signal at time *t*11B. It will be appreciated therefore that this high level output signal will be recirculated through elements 49–29 and 49–30 so that Flip-Flop 49–38 will continue to produce high level signals from time *t*11B on, in response to a *t*10B+ signal at the input of the recirculation gate 49–29. The high level output from complementer 49–28 will cause complementer 49–31 to produce a sustained low level signal at its output marked Gen 84 beginning at time *t*11A. This low level signal will indicate the Gen 84 signal is not present. Further the high level output of complementer 49–28 will inhibit gates 49–32 to 49–34 by placing a high level signal at one input to all of these gates.

If a high level signal is applied to the input of complementer 49–28 it will be appreciated that this complementer will produce a low level signal at its output designated $SCO_B$ and that this low level signal will be recirculated through the loop comprising elements 49–29 and 49–30, whereby Flip-Flop 49–38 will continue to produce low level signals at the output of complementer 49–28 until the Cycling Unit applies a *t*10B+ pulse to the recirculation gate 49–29 which will cause high level signals to appear at the output of complementer 49–28 at time *t*11B.

Low level signals are applied to complementer 49–28 via the following input circuit which comprises isolating buffer 49–27, complementer 49–26, and gate 49–25, wherein buffer 49–27 is connected at its output to the input of complementer 49–28 and is connected at its input to the output of complementer 49–26 which in turn is connected at its input to the output of gate 49–25. Gate 49–25 is connected at its inputs to the *t*10B– output of the Cycling Unit (FIGURE 34), the EW output of the Every Other Word Flip-Flop circuits (FIGURE 33A), and the output of Synch. Flip-Flop 52–6 (FIGURE 52). Flip-Flop 52–6 will not be described in detail, however, this synchronizing Flip-Flop is similar to the element 32–42 already described in connection with FIGURE 32. Accordingly, when all the inputs to gate 49–25 are at a low level (a condition which can only occur at time *t*10B) complementer 49–26 will generate a high level signal at time *t*11A. This high level signal from complementer 49–26 is designated as the SCO′ signal and is applied to buffer 48–39 (FIGURE 48) and to complementer 49–28 via buffer 49–27. In response to a high level signal at its input at time *t*11A complementer 49–28 will produce a low level signal at time *t*11B which will be applied to recirculation gate 49–29, complementer 49–31 and to one input of gates 49–32 to 49–34. This low level signal will be sustained until the recirculation gate 49–29 receives a high level *t*10B+ signal from the Cycling Unit. This high level *t*10B+ signal as previously explained will cause complementer 49–28 to produce high level signals beginning at time *t*11B. Thus, complementer 49–28 will produce low level signals in response to an output from gate 49–25 from time *t*11B of one minor cycle to time *t*10B of the next minor cycle. Low level signals from the output of complementer 49–28 cause complementer 49–31 to produce a sustained series of high level Gen 84 signals which also last for one minor cycle, that is from *t*0A of one minor cycle to *t*0A of the next minor cycle. In addition the low level output from complementer 49–28 will condition gates 49–32 to 49–34 to pass low level inputs which may be applied thereto. It will be observed that gates 49–32 to 49–34 are connected at one of their inputs to the RSX, RSC, and RSL low level outputs of elements 52–14, 52–12, and 52–13 respectively which will be described in connection with FIGURE 52D. Gates 49–32 to 49–34 are connected to the inputs of complementers 49–35 to 49–37 respectively. These complementers generate high level SCOX, SCOC and SCOL signals one-half pulse period after their respective gates transmit an input.

Referring now to FIGURE 49A there is shown the Supervisory Control Input Flip-Flop 49–1 and its related input and output circuitry.

The Supervisory Control Input Flip-Flop 49–1, hereinafter designated as the SCI Flip-Flop, comprises a complementer 49–11 connected at its output to one input of recirculation gate 49–12, which in turn is connected at its output to the input of complementer 49–13. Complementer 49–13 is connected at its output to the input of complementer 49–11 via buffer 49–10 so that there is closed-ring configuration of elements 49–10 through 49–13. Additionally, recirculation gate 49–12 is connected at a second input to the *t*10B+ output of the Cycling Unit (FIGURE 34). A low level signal at the output of complementer 49–11 is designated as the SCI signal and a high level signal at the output of complementer 49–13 is designated as the Gen I signal. The SCI signal is applied as an alerting signal to one input of gates 49–17 to 49–20 which shall subsequently be described.

The operation of the SCI Flip-Flop 49–1 will not be described in detail, but it will be appreciated that a high signal applied to buffer 49–10 will cause the SCI Flip-Flop 49–1 to produce a sustained series of low level SCI signals at the output of complementer 49–11, and a sustained series of high level Gen I signals at the output of complementer 49–13. Further, it will be understood that *t*10B+ signal applied to recirculation gate 49–12 will remove the SCI signals and Gen I signals at time *t*11A and *t*11B respectively.

Buffer 49–10 of SCI Flip-Flop 49–1 is connected at one of its inputs to the output of buffer 49–9 which has two inputs thereto. The first input of Buffer 49–9 is connected to the output of complementer 49–8, which in turn is connected at its input to the output of gate 49–4. In addition buffer 49–9 is connected at its second input to the output of complementers 49–6 and 49–7 which are connected at their inputs to the outputs of gates 49–2 and 49–3, respectively.

Gate 49–2 is connected at its input to the K output of the Input Ready Flip-Flop 52–21 (FIGURE 52); the Fill output of the Keyboard 52–20 (FIGURE 52); the IOS output of IOS Flip-Flop 52–8; the $\overline{\text{load}}$ output of Load Flip-Flop 52–17 and the CSP (Common Sprocket Signal) output from element 48–41 (FIGURE 48). Gate 49–3 is also connected at its input to CSP output of element 48–41 and the Fill output of the Keyboard 52–20 and is additionally connected to the $\overline{\text{IOS}}$ and LOAD outputs of the IOS Flip-Flop 52–8 (FIGURE 52) and the Load Flip-Flop 52–17 (FIGURE 52). When all the input signals to either gate 49–2 or 49–3 are at low levels, a condition which, as shall be shown, may only occur at time *t*10B, complementer 49–6 or 49–7 will generate a high level signal at time *t*11A. This high level signal will be applied to SCI Flip-Flop 49–1 via buffer 49–9 whereby sustained SCI signals and Gen I signals will be produced beginning at time *t*11B and *t*0A respectively.

It will be observed that buffer 49–9 is also connected at its output to the input of complementer 49–14, which is connected at its output to one input of gate 49–15. Gate 49–15 is connected at a second input to the output of the Sign of *r*0 Flip-Flop 52–26, (FIGURE 52). The sign of *r*0 Flip-Flop 52–26 will not be described in detail, however it is similar in construction to the Sign Flip-Flops already described in connection with FIGURE 11. The Sign of *r*0 Flip-Flop 52–56 stores a signal which is indicative of the sign of the information in the *r*0 register and gate 49–15 is connected to the output of the sign of *r*0 Flip-Flop 52–56 which indicates that the sign of the data in the 0 Register is minus. Accordingly, when buffer 49–9 transmits a high level signal, complementer 49–14 will generate, after a one-half pulse period delay, a low level signal which is applied to one input of gate 49–15. If the sign of the contents of the 0 Register is minus, as indicated by Flip-Flop 52–56, there will be transmitted throughout gate 49–15 a low level signal which is applied to the input of complementer 49–16. Complementer 49–16 in response thereto will generate a high level signal (indicative of a minus sign) which is applied to the DM12 input of Min Buffer 1 (FIGURE 20).

Gate 49–4, which as previously described is coupled to the first input of buffer 49–9, is connected at its inputs to the Load output of the Load Flip-Flop 52–17, the STL output of the Synchronizing-Start Flip-Flop via amplifier 32–16 (FIGURE 32), and to the $1B_2$ output of the 1B Flip-Flop 48–1 (FIGURE 48). When all the input signals to gate 49–4 are at low level, a condition which can only occur at time *t*10B since the STL signal is generated at that time, complementer 49–8 will be caused to generate a high level at time *t*11A. This high level is applied via buffer 49–9 to complementer 32–14 whereby, as explained, the sign of the data in the 0 Register will be gated to the input of the Min Buffer 1 (FIGURE 20), and to the SCI Flip-Flop 49–1, whereby sustained SCI and Gen I signals will be produced commencing at time *t*11B and *t*0A, respectively. The high level output of complementer 49–8 produced at time *t*11A is also applied via buffer 32–40 (FIGURE 32) to the Stop Line (32–43) whereby Flip-Flop 32–41 (FIGURE 32) will commence to produce SP signals.

Assuming that the SCI Flip-Flop 49–1 is producing low level SCI signals, then gates 49–17 to 49–20 will be partially alerted to transmit a signal. Gates 49–17 to 49–20 are connected at their outputs to the inputs of complementers 49–22, 49–22', 49–23 and 49–24 respectively. Complementers 49–22, 49–22', 49–23 and 49–24 generate in response to low level signals at their inputs, high level Gen $\beta$, Gen B, Gen L and Gen Y signals, respectively.

Gate 49–17 is connected at its inputs to the *t*10B+ output of the Cycling Unit (FIGURE 34), the RS*c* low level output of element 52–12 (FIGURE 52), the SCI output of Flip-Flop 49–1 and *r*0→*r*C output of Flip-Flop 52–16 (FIGURE 52). Flip-Flop 52–16 will not be set forth in detail, but it will be appreciated that it is similar to the many Flip-Flops already described and that it has two input terminals and two output terminals from which mutually exclusive *r*0→*r*C and *r*0→*r*A signals obtain.

One-half pulse period after all the signals applied to gate 49–17 are at a low level complementer 49–22 will produce a high level Gen $\beta$ signal at is output. It will be appreciated, since gate 49–17 is connected to the *t*10B+ output of the Cycling Unit (FIGURE 34) that at time *t*10B of any minor cycle at least one input of the aforementioned gate will be at a high level and consequently the Gen $\beta$ will not appear at time *t*11A.

Gate 49–18 is connected at its inputs to the SCI output of the SCI Flip-Flop 49–1 and the *r*0→*r*A output of flip-flop 52–16 (FIGURE 52). Accordingly, one-half pulse period after both the inputs of gate 49–18 are at a low level, complementer 49–22' will generate a high level Gen B signal.

Gate 49–19 is connected to the SCI output of flip-flop 49–1, the $\overline{RS_L}$ low level output of element 52–13 (FIGURE 52) and the $\overline{\text{load}}$ output of the load flip-flop 52–17 (FIGURE 52). Therefore one-half pulse period after all the signals to gate 49–19 are at a low level complementer 49–23 will generate the high level Gen L signal.

Gate 49–20 is also connected at its inputs to the SCI output of flip-flop 49–1, the $\overline{\text{load}}$ output of the Load Flip-Flop 52–17, and the $RS_X$ low level output of element 52–14. Again one-half pulse period after all the inputs to this latter gate are at a low level complementer 49–24 will generate a high level Gen Y signal.

It will be appreciated that the signals applied to the aforementioned gates 49–17 and 49–20 may all be sustained signals lasting approximately one minor cycle, and accordingly, complementers 49–22, 49–22', 49–23 and 49–24 may generate a sustained series of high level outputs lasting approximately one minor cycle.

*Operations—FIGURES 52A–52D*

Having now described certain components of the input-output equipment, the inter-connection of those components with other components and devices to provide an effective input-output system will now be set forth. It is occasionally desirable to be able to extract information from the computer itself and to be able to preserve extracted information in some permanent form, such as typed copy from a typewriter. It is also sometimes desirable to be able to insert new information into the computer at strategic times to initiate sub-routines or to entirely change the program that is being followed. Such desirable ends require a flexible system of two way communication between the computer and external sources of information. FIGURE 52 consisting of FIGURES 52A, 52B, 52C, and 52D as arranged as shown in the inset FIGURE 52 on FIGURE 52A provides such a flexible system of communication. The functions provided by the inter-connection of elements illustrated in FIGURE 52 may be categorized as either input functions or output functions, and these may be further sub-divided into types of input functions and types of output functions as follows:

*Input to the computer from an external source*—

(1) Type into *r*0–I Instruction (82). The 82 instruction provides for the computer controlled transfer of information that has been typed into the 0 Register to the A Register. This instruction calls for an interrogation by the computer to see whether or not there is information in the 0 Register which is ready to be transferred into the computer. If such is the case, then the computer will cause a transfer, and if there is no information in the 0 Register which is ready to be transferred then the computer will continue with its routine.

(2) Type into some register—externally controlled transfer of the contents of the 0 Register to the C, A, X or L Registers. These transfers are completely externally controlled. That is, when the information from the external source has been typed into the 0 Register, a transfer to the desired register will be immediately performed, no control being exercised by the computer at all. These input operations are externally controlled by switches on a supervisory control panel, and are under the direct control of an operator.

(3) Load operation—this facility provides for loading the memory system and my be used to initially store information on the memory drum or may be used at any time to write new information onto the memory drum, thereby destroying what had been previously written there. The load operation may be either of two types, which are:

(a) Non-continuous—this facility provides for a transfer to the memory of one word, and then causes the computer to await further instructions.

(b) Continuous—this facility provides for a continuous transfer of information from the external source into the memory.

*Output to a recording instrument from the computer*—

The output facilities provide for the transfer of information from the computer to the 0 Register, whereupon such information is immediately read out to the recording instrument. These output functions may be of two types, which are (1) Internally controlled—0 Instruction (77). This instruction provides for the transfer of the contents of the A Register to the 0 Register, and thence out to the recording instrument.

(2) Externally controlled—These functions are again switch selected from a supervisory control board and allow the operator to cause to be read out of any register of the computer the information contained therein, such information, as before, being directly transferred to the recording instrument.

The foregoing functions will be individually described in connection with the input-output functional system illustrated on FIGURE 52. For the clearest understanding reference should also be had to the detailed diagrams of the logical elements shown thereon. In this regard it should be noted that certain elements shown on FIGURE 52 are designated as elements 52–1 through 52–31. No detailed diagrams exist for these logical elements since they are all straightforward devices. However, a word as to the significance of the types of elements so designated should suffice to clearly indicate the function performed. The natures of certain of these elements have already been indicated in the connection with the detailed descriptions of FIGURES 48 through 51, and therefore will not be repeated here. The elements so described are 52–6, 52–8, 52–16, 52–17, 52–19, 52–20, 52–21, 52–24, 52–26 and 52–29. Elements 52–1 through 52–4 are circuits which are capable of providing one of two potential levels, which are labelled respectively as high and low. The potential which is in fact present is determined by the position of the two switches 52–30 and 52–31 and is established as follows. Examining for example the $\beta$E− circuit 52–2, it will be observed that a pair of leads from the One Instruction Switch 52–30 are shown entering the high box of element 52–2. The convention here adopted is that the high $\beta$E− signal will be present when the input circuit through the contacts of switch 52–30 is closed, as is shown. Such being the case, it is clear then that the low $\beta$E− signal is absent. Similarly for the QT Stop element 52–1 it will be observed that the high level box input circuit is closed through the QT Stop Switch 52–31, and therefore the high potential level is present, the low potential level being therefore absent. If the QT Stop Switch were to be selected, thereby opening the input circuit to the QT Stop element, then the high QT Stop potential would be suppressed and the low QT Stop potential would rise. The same convention applies to all of the elements 52–1 through 52–4. Elements 52–5, 52–9, 52–18, 52–25, 52–28 are all shown as logical gating structures and conform in all respects to the gates previously described in connection with the detailed diagrams. Element 52–7 is a conventional Flip-Flop having a set input terminal and a clear input terminal, in this case only the set output being utilized. This element 52–7 provides a synchronizing function in much the same fashion as the Start-Synchronizing Flip-Flop which is part of element 32–42 and which has already been described in the description of the detailed diagram FIGURE 32B. Element 52–11, the $\beta$E+ box, is merely a potential source which is required during the load operation, and its function will be subsequently described. Elements 52–10 and 52–12 through 52–15 are the register selector elements which provide potentials required to alert certain of the gating circuits, which will also be subsequently described. The particular potential state of a given register selector is determined by switch selection from the supervisory control panel, and the function provided is that of selecting a particular register into which information shall be read or from which information shall be transferred. When the register selector in neutral position has been chosen then the N switch will be closed on element 52–10 and will thus produce a high $RS_N$ output, the low $RS_N$ output being suppressed. If the L Register is to be selected then the L switch contacts associated with logical elements 52–12, 52–13 and 52–15 will be closed thus causing element 52–12 to produce a high $RS_C$ output, element 52–13 to produce a low $RS_L$ output, and element 52–15 to produce a high $RS_A$ output. If the X Register were to be selected then all of the X switch circuits would be closed and element 52–12 and 52–15 will produce respectively high $RS_C$ and $RS_A$ outputs, whereas element 52–14 will produce a low $RS_X$ output. Similarly, a selection of the A Register causes element 52–12 to produce a high $RS_C$ output, whereas the selection of the C Register causes element 52–15 to produce a high $RS_A$ output. It can thus be appreciated that the logical elements 52–10 and 52–12 through 52–15 are binary in nature, and produce either a high or low level output at all times, these outputs being of course mutually exclusive. Finally, logical elements 52–22, 52–23, and 52–27 are illustrated as boxes with an external contact to complete an internal circuit. These contacts may be non-locking push button or key type circuits which are manually operated from the supervisory control by the supervising operator. The outputs from elements 52–22 and 52–23 will provide a jamming type function, whereas the output from the input alert circuit 52–27 will provide a low level conditioning or alerting function for the three gates 48–9 through 48–11.

Turn now to an examation of FIGURE 52 for purposes of understanding the input and output functions catalogued above. These operations will be described in the order in which they are presented, that is, first the input operations will be described and then the output operations. Consider now the first input operation which is "type into *r*0 from an external source and wait for an internally programmed I or 82 instruction to initiate the transfer of the contents of the 0 Register into the A Register within the computer." To carry out this operation the register selector switch must be placed in the neutral position. This is required so that once the information has been transferred from the external source into the 0 Register there will not take place an immediate transfer of this information to some register within the machine. When the register selector switch has been placed in the neutral position the Input Alert key may be depressed thereby causing the Input Alert circuit 52–27 to generate an F signal, which is applied to gates 48–9 and 48–10 as a partially alerting signal. Assuming that the One Instruction Switch 52–30 has not also been depressed, so that the IOS Flip-Flop 52–8 has not been set to its IOS state, then gate 48–10 cannot be fully alerted due to the absence of the IOS signal. Consequently, gate 48–9 is the gate which will initiate this operation. The several functions of the One Instruction Switch and the results caused by its selection will be explained subsequently in the explanation of other operations. Examining now gate 48–9 it will be observed that in addition to the F signal from the Input Alert element 52–27, there are required the following additional signals; the 1 signal from the Control Encoder 27, *t*9B– timing signal from the Cycling Unit, the EW signal from the Every Other Word Flip-Flop, and the $\overline{IA}$ signal from IA FF 48–2. The EW and *t*9B– signals serve the purpose of synchronization in the same way as described in connection with the start circuits of FIG. 32B. The presence of the (1) signal indicates that the computer is engaged in a search, and this is chosen as a convenient time to initiate a type-in operation because it is known that if the computer is on search there is no possibility that it is attempting to gain control of the 0 Register for purposes of reading out of the computer. The presence of the $\overline{IA}$ from IA FF 48–2 signifies that the 0 Register is available and is not currently in use. Hence, assuming that the 0 Register has no information stored therein, and it is also known by virtue of the presence of the (1) control signal that the computer is not attempting to gain control of the 0 Register, then gate 48–9 will be selected by the *t*9B– timing signal from the Cycling Unit and will pass a signal through buffer 48–8, giving rise to the T signal. The T signal is routed to several places and performs the following functions. First, the T signal causes the Input Ready FF 52–21 to be set to its K signal state. The K signal from the Input Ready FF 52–21 unlocks the keyboard of the typewriter so that bi-quinary coded signals may be generated when a given key of the keyboard is struck by an operator. Additionally, the K signal is routed to gates 51–1 as an alerting signal so that when a character is struck at the keyboard a signal so generated may pass through the gates 51–1 to the 0 Register input gates 52–13. The K signal is also routed to gate 49–2, which is an input gate to the SCI FF 49–1, but this gate is inactive due to the absence of the IOS signal from FF 52–8 as previously mentioned. Second, the T signal is routed to the IA FF 48–2 causing it to be set to its IA state thereby suppressing the $\overline{IA}$ signal and indicating that the 0 Register is in use. This prevents the computer from attempting to take over the use of the 0 Register. Third, the T signal is passed through buffer 48–39, thereby producing the Q signal. The Q signal in turn is routed to the Twelve Counter 52–24 where it jams the counter to its C1 state. The Q signal is also routed to the 0 Register hold circuits 48–44 causing an inhibition of the hold circuits and thereby clearing the entire 0 Register. Further, the Q signal jams the Sign of (*r*0) FF 52–26 to its plus state, thereby assuming that the sign of the information to be transferred from the keyboard to the 0 Register is positive. And, finally, the Q signal is routed to FF 52–16 where it sets this Flip-Flop to its *r*0→*r*A state. The setting of 52–16, however, for purposes of the present operation, is ineffectual, since the output signals from this flip-flop will not initiate any further action.

Recapitulating then at this point, the keyboard has been unlocked so that it is ready to start typing information into the 0 Register, the 0 Register has been cleared so that it is ready to receive this information, a plus sign has been jammed into the Sign of (*r*0) Flip-Flop and the IA Flip-Flop has been set to its IA state so that the computer cannot gain control of the 0 Register and attempt thereby to transfer information into it from one of the registers of the computer. The keyboard operator may now start to type information into the 0 Register 50. The first character to be typed is always sign information. If the sign of the word to be typed into the 0 Register 50 is minus, then when the minus key is struck on the keyboard a KB1 pulse will be generated, as will a sprocket pulse. A KB1 pulse is routed to the gates 51–1 and generates thereby an R1 signal which is transmitted to gate 52–25. The sprocket signal which was generated by the striking of the minus key on the keyboard 52–20 is transmitted to the Sprocket Synch. Flip-Flop 52–19, thereby setting this flip-flop and partially alerting gate 48–40. The *t*9B– timing signal and the EW signal which are also required at gate 48–40 again serve the purpose of timing synchronization. When therefore, the Sprocket Synch. Flip-Flop 52–19 has been set, the *t*9B– timing signal from the Cycling Unit will pass gate 48–40 and through one pulse delay device 48–41, emerging therefrom as the CSP (common sprocket pulse) signal. The CSP signal performs several functions. First, the CSP signal recirculates to the input of the Sprocket Synch. Flip-Flop 52–19 thereby clearing it. Second, the CSP signal is applied to gate 48–6, the read ending pulse gate, but is ineffective at this time because the Fill key has not been depressed at the keyboard. Third, the CSP is applied to the Sign of (*r*0) Flip-Flop input gate 52–25 and is gated therethrough to set the Sign of *r*0 FF 52–26 to its minus state, because the R1 and the C1 alerting signals were present at the input to gate 52–25. The timing of the circuits is so arranged that the R1 and CSP signals arrive at gate 52–25 simultaneously. Fourth, the CSP steps the Counter 52–24 off of C1 and onto $\overline{C1}$, thereby indicating that the count in the counter is not one. Lastly, the CSP signal is applied to gates 48–32 and 48–33. It is ineffective at gate 48–33 because this gate requires a PR signal from the Print Flip-Flop 52–29, and such signals will only be generated when a print out operation is called for. The CSP signal applied to gate 48–32 is likewise ineffective even though the $\overline{PR}$ signal from the Print FF 52–29 is present. This is because the CSP arrives at gate 48–32 before the counter has shifted from its C1 to its $\overline{C1}$ output, and therefore the required $\overline{C1}$ signal is not present at this gate. If the sign of the word to be typed in instead of being minus were a plus, then no KB1 pulse would have been generated when the plus sign at the keyboard was struck by the operator. Therefor, the R1 signal would not have been generated via gates 51–1, and when the CSP signal arrived at gate 52–25 it would not have passed through to cause the Sign of (*r*0) FF 52–26 to be set to its minus state. All other functions just previously described, of course, would have occurred. After having typed in the sign information, the ten information characters will then be successively typed in, and the circuit operation for each one of these characters will be the same and is as follows. When a character is typed, the bi-quinary coded designation for such character will be transmitted over the KB1 to KB4 lines to the gates 51–1 and will pass therethrough to the 0 Register input gates 50–13. The input gates 50–13 however require the presence of an RIN signal from element 48–53 in order to transmit into the 0 Register channels the coded information arriving from the keyboard. The RIN signal is generated in the following way. As each character is struck at the keyboard a sprocket pulse will be transmitted through the Sprocket Synch. Flip-Flop 52–19 to generate a CSP signal as previously described. As before, the CSP signal clears the Sprocket Synch. Flip-Flop 52–19, steps the Counter 52–24, and is transmitted to gate 48–32. On each digit after the sign digit, the CSP signal will pass through gate 48–32 because the $\overline{C1}$ signal is now present as an alerting signal on that gate. The output of gate 48–32 is transmitted to buffer 48–42 and buffer 48–34. The output of buffer 48–42 drives the RIN circuit 48–53, thereby generating an RIN signal which passes the character typed at the keyboard through the 0 Register input gates 50–13. The output signal from gate 48–32 which was transmitted to buffer 48–34 passes therethrough to set the Sprocket Flip-Flop 48–31. The set output from Sprocket Flip-Flop 48–31 is transmitted to the Inhibit Hold and Shift circuits 48–44 and 48–43, whereupon a ten place shift of the digit just read into the 0 Register is initiated at time *t*0B. A *t*9B+ timing signal from the Cycling Unit clears the Sprocket FF 48–31 during the next minor cycle and terminates the shift operation at time *t*10B, thereby staticizing the character just typed in. As has been previously explained in connection with the detailed description of FIGURE 50, the 0 Register, this ten place shifting operation is necessary because the registers of the computer are set up to accept information inserted in order from the LSD to the MSD, and the information being typed into the 0 Register from the keyboard 52–20 is being typed-in in the reverse order, that is from MSD to LSD. After the sign and the ten characters have been typed in from the keyboard, the Fill key must be struck to terminate the type-in operation and allow the computer to transfer the contents of the 0 Register into the A Register when it so desires. The keyboard operator therefore strikes the Fill key and generates thereby a fill signal and a sprocket signal. The sprocket signal again generates a CSP (common sprocket pulse) which clears the Sprocket Synch. Flip-Flop 52–19 and steps the counter to C12. However, before the counter is stepped to C12 the CSP is passed through gate 48–32 to set the Sprocket FF 48–31 via buffer 48–34 and perform the final 0 Register shift. The generation of the RIN signal by the output of gate 48–32 is non-material at this time since the Fill key does not generate any bi-quinary characters which will be presented to the gates 51–1. The common sprocket pulse now however, is passed through gate 48–6 by virtue of the presence of the fill signal and emerges as the RE pulse. The RE or read-end pulse clears the Input Ready FF 52–21 and thereby locks out the keyboard 52–20 so that no further information may be typed into the 0 Register. Additionally, the RE pulse sets IB FF 48–1 to its IB1 state. The IB1 output signal from IB FF 48–1 in turn causes the generation of the IB2 output signal. Moreover, the IB1 signal is transmitted to gates 48–38 and 50–17. Gate 48–38 inhibits the Hold Circuits 48–44 and simultaneously initiates a shift of the contents of the 0 Register via Shift Circuits 48–43. This shift is an end-around shift, or recirculation within the register, and proceeds at computer timing so that the contents of the 0 Register may be read into the computer when called for at a rate which is synchronous with the computer pulse rate. Gates 50–17, which are partially alerted by the IB1 signal, are the output gates of the 0 Register 50 and will allow the contents of the 0 Register to be read into the Minuend Buffers 20 at such time as the (29) control signal appears to open these gates 50–17. The IB2 signal is transmitted to three places which are effective on this operation. First, it partially alerts gate 48–3, which is a clearing gate, and whose function will be subsequently explained. Additionally, it partially alerts CT FF input gate 12–37 and Sign of (*r*A) FF input gate 11–8, both of whose functions will also be subsequently explained. The presence of the IB signals signifies that the 0 Register 50 is full and that its contents are available to be transferred into the computer. While the foregoing type-in to the 0 Register was taking place the computer had been continuing on its programmed routine. When, subsequent to the completion of the type-in operation, an I or 82 instruction is staticized in the Static Register Flip-Flop, the STR6, STR5, STR4, $\overline{STR3}$, STR2, and $\overline{STR1}$ Static Register signal lines will be selected. These signals will select Instruction Decoder gate 26–25A at time *t*11B and will therefore cause the (29A) high level signal to be generated at time *t*0A. The (29A) high level signal is transmitted to the Control Encoder 27 where it causes the generation at time *t*0B of the (6), (29), (67) and (77) low level control signals and the 55+ high level control signal, and further causes the generation of the (82+) high level control signal at time *t*1B. With the exception of the (29) low level control signal, the remainder of the control signals are seen to be identical to those generated for the B instruction, which it will be recalled was an instruction calling for the transfer of the contents of some memory location to the A Register. The mechanics of the transfer already described in connection with the B instruction are the same as those for the I or 82 instruction with some small differences. These differences are as follows. The (6) and (29) low level control signals together with the IB2 signal from the IB FF 48–1 alert Sign of (*r*A) Flip-Flop input gate 11–8 so that the SR− signal from the Sign of (*r*0) FF 52–26 may be transferred to the Sign of (*r*A) Flip-Flop 11B and cause the state of that Flip-Flop to be set to minus. This gate is required for the following reason. It will be recalled from the B instruction that the two gates 11–4 and 11–7 established the Sign of (*r*A) Flip-Flop as either plus or minus, and that if an $\overline{M}_1$ signal is present on the M lines for the P0 digit position, then the Sign of (*r*A) Flip-Flop will be set to its plus state, gate 11–4 effectively overriding the effect of gate 11–7. Now, it will be recalled that the sign of the information typed into the 0 Register was not stored in the 0 Register, but only in the Sign of (*r*0) FF 52–26. Since this is so, when the contents of the 0 Register are read into the Minuend Buffers the P0 digit position will be empty and hence an $\overline{M}_1$ signal condition will exist, apparently indicating that the sign of the contents of the 0 Register is plus. However, this may not be the case and gate 11–8 is necessary to override the effect of gate 11–4 should the sign of the information being transferred to the A Register be in fact minus. Second, the 29 low level control signal and IB2 signal from the IB FF 48–1 partially alert CT FF input gate 12–37. It will be observed that this gate 12–37 also requires the $\overline{\text{Load}}$ signal and the $\overline{\text{SP}}$ signal to be fully alerted. The $\overline{\text{Load}}$ signal is present from Load Flip-Flop 52–17 since a load operation is not presently in process. The $\overline{\text{SP}}$ signal is present since none of the stop gates on FIGURE 32B have been selected, and therefore the Stop Flip-Flop is not set. This gate 12–37 is really an interrogation gate wherein the computer interrogates the 0 Register to see whether or not it is filled, such filled condition being designated by the $IB_2$ signal. If the 0 Register is filled and the $IB_2$ and other required signals are present, gate 12–37 will pass the *t*0B– timing signal from the Cycling Unit therethrough and cause the CT FF 12A to be set to its CT state, thereby establishing that the location of the next instruction will be found in the "*m*" Address portion of the Control Register. On the other hand, if the $IB_2$ signal is not present, indicating that the 0 Register is not filled, then gate 12–37 will not be selected and the CT FF 12A will remain in its $\overline{\text{CT}}$ state, thereby indicating that the location of the next instruction is in the "*c*" Address portion of the Control Register. The I or 82 instruction, therefore is an instruction which says, "If the 0 Register is filled then transfer the contents of the 0 Register to the A Register, the next instruction being designated by the "*m*" Address portion of the Control Register; if the 0 Register is not filled then clear the A Register, jam the Sign of (*r*A) FF 11–B to plus, and find the next instruction at the memory location designated by the "*c*" Address portion of the Control Register." Third, the (29) low level control signal, as earlier mentioned, opens the output gates at the 0 Register 50–17 so that the contents of the 0 Register may read through the Minuend Buffers 20 and onto the M lines with the timing P0=*t*0B. The (29) signal therefore causes the transfer of the contents of the 0 Register to the A Register, effectively substituting the 0 Register for the memory source utilized by the B instruction. Lastly, the (29) signal fully alerts the gate 48–3, together with the $IB_2$ signal from the IB FF 48–1, so that at the end of the transfer a *t*10B– timing signal from the Cycling Unit may be gated through 48–3 to clear the IA and IB Flip-Flops 48–2 and 48–1 respectively. The clearing of these flip-flops releases the 0 Register 50 for immediate use. As previously mentioned the I or 82 instruction is in other respects identical to the B or 25 instruction, and hence the (55+) high level control signal will clear out the A Register so that the contents of the 0 Register now reading over the M lines may enter the A Register via input gates 15–4 alerted by the (77) low level control signal and the S1, S2, S3 and S4 signals from the Subtrahend Buffers 19. These S signals, of course, are forced by the presence of the (82+) high level control signal on the Subtrahend Buffer input gates 19–1. The (67) low level control signal will cause a normal termination by alerting Static Register gate 25–16 so that a *t*9B– timing signal from the Cycling Unit may pass therethrough to the Static Register clearing line, and hence cause the Static Register Flip-Flops to be cleared to their zero or barred states at time *t*11B. This clearing of the Static Register Flip-Flops at time *t*11B in turn causes the unselecting of Instruction Decoder gate 26–25A and the selecting of Instruction Decoder gate 26–1A, the normal search gate. The search which then follows is controlled by the "*m*" or "*c*" Address portions of the Control Register, depending upon whether or not a transfer has taken place from the 0 Register to the A Register. This terminates the first type of input operation, which will now be followed by the second type of input operation.

The second type of input operation consists of an externally controlled transfer of the contents of the 0 Register to the C, X, A, or L Register. The transfer to be described will again be a transfer to the A Register, although, as will be readily seen in the subsequent description, transfers to the L, X or C Registers will proceed in analogous fashion. The externally controlled transfers, one of which is about to be described, all require that prior to the initiation of the operation the computer must be stopped. That is, stopped in the sense that it is not computing. This will be accomplished in a manner to be described by effectively inhibiting the Instruction Decoder so that no computational operation may be carried out. Assume now than an externally controlled transfer is to be initiated. First, the One Instruction Switch must be depressed, thereby causing the normally closed contacts of One Instruction Switch 52–30 to open and the normally open contacts to close. The opening of the $\beta$E– contact will cause the $\beta$E– circuit to assume its low level potential, thereby partially alerting gate 32–34. The opening of the contact associated with the $IOS_{NC}$ circuit 52–3 causes the $IOS_{NC}$ signal to be suppressed and the low level $\overline{IOS_{NC}}$ signal to arise. This signal is transmitted to the Synchronizing FF 52–7, thereby setting this flip-flop and partially alerting gate 52–9. The circuits affected by the other contacts of One Instruction Switch 52–30, namely elements 52–4 and 52–10, are non-material to the instant operation and will have no effect thereupon. When the EW signal from the Every Other Word Flip-Flop arises, a *t*0B– timing signal from the Cycling Unit will be passed through gate 52–9 to set the IOS FF 52–8 to its IOS state. The IOS signal is transmitted to and partially alerts SCI FF input gate 49–2, gate 32–34, and Input Ready FF input gate 48–10. The IOS signal also clears Synch. FF 52–7. Input gate 48–10 to the Input Ready FF 52–21 requires for complete alerting, in addition to the IOS signal, the $\overline{\text{Load}}$ signal, the EW and *t*9B– signals, and the F signal from the Input Alert Circuit 52–27. The $\overline{\text{Load}}$ signal will be present from the Load FF 52–17 inasmuch as a Load operation is not now being instituted. The EW and *t*9B– signals will again be present and the F signal from the Input Alert Circuit 52–27 will be generated when the Input Alert Key is depressed. A T signal, hence, will be generated by buffer 48–8 and will perform the same functions as already previously described for the first input operation. Briefly recapitulating these functions, they are; set the Input Ready FF 52–21 to its K signal state; set the IA FF 48–2 to its IA condition; generate the Q signal via buffer 48–39. The Q signal, as before, will jam the Counter 52–24 to C1, clear the 0 Register 50, jam the Sign of (*r*0) FF 52–26 to plus, and set FF 52–16 to its *r*0→*r*A state. The output signal from 52–16 partially alerts the GEN B gate 49–18, which gate also requires the SCI signal from SCI FF 49–1 to be selected. The K signal from Input Ready FF 52–21 in addition to its previously described functions is also routed to SCI FF input gate 49–2 as a partial alerting signal. Gate 49–2 also requires to be completely selected the $RS_N$ low signal from the $RS_N$ circuit 52–10, the $\overline{\text{Load}}$ signal from FF 52–17, and CSP and fill signals derived from the Keyboard 52–20. The $\overline{\text{Load}}$ signal from FF 52–17 has already been indicated to be present, and the CSP and fill signal from the Keyboard will be generated when the Fill Key is depressed by the operator at the end of the type-in. The $RS_N$ low signal will be present on gate 49–2 at such time as some register is selected, because the selecting of a register A, L, X, or C necessarily causes the register selector to be in some switch position other than neutral, thereby insuring that the N switch contact is open. It is seen therefore, that the register to which the transfer shall be made must be selected prior to striking the Fill Key at the Keyboard 52–20, but whether or not the register is actually selected prior to the beginning of the type-in operation is not material. Assume therefore that the register selector switch is set to the A Register position thereby causing the A Switch contact to close and forcing the $RS_C$ signal generated by element 52–12 to become high. The operator may now type the information into the 0 Register in exactly the same manner as has already been previously described for the first input operation, and when this has been done the operator will also depress the Fill Key. The fill signal in addition to generating the RE pulse via gate 48–6, as already previously described, is also routed to SCI FF input gate 49–2, arriving there at the same time as the CSP which was generated by the fill signal sprocket pulse. SCI FF input gate 49–2 is therefore selected at time *t*10B (the time of generation of the CSP signal) and passes a signal through buffer 49–9 which causes the SCI FF 49–1 to generate the SCI signal at time *t*11B and the GEN I signal at time *t*0A. The SCI signal selects gate 49–18 and causes it to generate a GEN B signal, also at time *t*0A. The output of buffer 49–9 in addition to setting the SCI FF 49–1, is also transmitted to gate 49–15. This signal at gate 49–15 will cause the Sign of (*r*0) FF 52–26 to be gated through to the Min Buffers 20 in the event that the sign so stored were negative. This is necessary for purposes of transferring the minus sign to the Sign of (*r*X) FF 11A or to the Sign of (*r*L) FF 11C should a transfer to the X or L Register have been called for. This sign information will emerge on the M lines with the timing P0=*t*0B, but in the case of a transfer to the A Register this produces no deleterious results since such sign information even though read into the A Register will be cleared out on the first recirculation. The GEN I and GEN B signals are transmitted directly to the Control Encoder 27 and generate the (29), (6), (77) low level signals and the (55+) high level signal at time *t*0B, and also generate the (82+) high level signal at time *t*1B. It should be here observed that these control signals are identical to the signals generated during the first transfer operation already described, with the single exception that no (67) *low level* control signal is here produced. The transfer of (*r*0) to the A Register will be carried out in the same manner as already previously described for the first input operation. At time *t*10B of the transfer minor cycle a *t*10B+ timing signal from the Cycling Unit will cause the SCI FF 49–1 to be cleared at time *t*11B, thus suppressing the SCI and Gen. I signals and consequently also suppressing the Gen. B signals. The suppression of the Gen. I and Gen. B signals in turn causes the suppression of the Control Encoder signals previously set forth at time *t*0B. This terminates the transfer operation. It will be recalled however that the computer had been stopped by the placing of an inhibition on the Instruction Decoder 26, and this inhibition as yet has not been removed. The manner in which this inhibition had been established will now be set forth. It will be recalled that when the One Instruction Switch 52–30 was depressed, a low $\beta$E— was transmitted to Stop FF gate 32–34 and acted as a partial alerting signal. Additionally, the setting of the IOS FF 52–8 caused the IOS signal to be also transmitted to the Stop FF input gate 32–34, thereby completely alerting this gate to the presence of a (2) low level control signal from the Control Encoder 27. When therefore, the computer had completed the operation it was presently engaged in, a search for the next instruction had been initiated. When the search for the memory location had been found and a $\beta$ transfer had been initiated the (2) low level control signal was generated by Instruction Decoder gate 26–2A. The presence of the (2) signal at gate 32–34 selected this gate and transmitted a pulse to the Stop Flip-Flop 32–41 thereby causing the SP signal to arise and the $\overline{SP}$ signal to be suppressed. The loss of the $\overline{SP}$ signal inhibits the Instruction Decoder gates even though the instruction which was being transferred is staticized in the Static Register 25. When therefore, the externally controlled transfer of information to the A Register has been completed, it is clear that the computer cannot proceed because the inhibition on the Instruction Decoder still remains. In order to start the computer the operator must depress the Start Bar 32–6. If it is desired that the machine be put back on continuous operation, then prior to depressing the Start Bar 32–6, the One Instruction Switch 52–30 should be returned to its unselected position. Assuming that this has been done, it is clear that the $\beta$E— low level signal will be suppressed and the $IOS_{NC}$ high level signal will arise. When the Start Bar 32–6 is now depressed, the high level $IOS_{NC}$ signal will clear the IOS FF 52–8 to its $\overline{IOS}$ state, and the Start Synch. FF 32–42 will be set. The suppression of the $\beta$E— and the IOS signals cause Stop FF input gate 32–34 to be rendered insensitive, so that when the next search and $\beta$ cycle occur the occurrence of the (2) low level control signal will not cause Stop FF 32–41 to again be set to its SP state, and hence will not inhibit the Instruction Decoder 26. The setting of the Start Synch. FF 32–42 alerts Stop FF input gate 32–13 so that the subsequent occurrence of the EW and *t*10A– signals will be gated therethrough and set the Stop FF to its $\overline{SP}$ state, thereby removing the inhibition from the Instruction Decoder 26 and allowing the staticized instruction in the Static Register to be executed. If now, on the other hand, the One Instruction Switch 52–30 had not been restored to its continuous operation position then the $\beta$E— signal would persist at gate 32–34 and the $IOS_{NC}$ high level signal would not be present to cause IOS FF 52–8 to be cleared to its $\overline{IOS}$ state. Hence the IOS signal would also be present at gate 32–34. When now the Start Bar 32–6 is depressed, the Start Synch. FF 32–42 would be set and would cause the Stop FF 32–41 to be cleared to its $\overline{SP}$ state as previously described. However, the output of Stop FF input gate 32–13, it will be observed, recirculates and clears the Start Synch. FF 32–42. Hence, at the completion of the instruction that is staticized in the Static Register 25 and the initiation of a subsequent search and $\beta$ cycle, the (2) low level control signal would again arise and would cause Stop FF input gate 32–42 to pass a pulse to set the Stop FF 32–41 to its SP state, again inhibiting the Instruction Decoder. Consequently, it can be seen that when the One Instruction Switch 52–30 remains depressed, only one instruction can be performed by the striking of the Start Bar 32–6. The Start Bar 32–6 must therefore be struck each time that it is desired that the next instruction shall be performed. If a display system for the contents of the various register is provided, such as a bank of neon indicating lights, then the operator at the supervisory control panel is provided with a means for monitoring the computer. The ability to be able to break into the computer routine in such a fashion has been found to be extremely valuable. This concludes the description of the externally controlled transfer of the contents of the 0 Register to one of the internal computer registers. Turn now to a consideration of the load operations.

Although the primary function of the load operations is to put information from an external source onto the Memory Drum, the Load operations are in fact not so limited. If desired, the computer may be freed from its internal memory and worked directly with an external memory system by virtue of the flexibility provided by the Load operations. Basically, the Load operations function by first causing a word to be transferred from an external source to the A Register via the 0 Register and then causing a second word to be transferred to the C Register via the 0 Register. The word read into the A Register is an information word, and the word transferred to the C Register is an instruction word. The cycle of operation may be considered to be the following:

(1) Read an information word into the A Register.

(2) Read an instruction word into the C Register and Static Register.

(3) Transfer the word in the A Register to the memory location designated by the "*m*" Address portion of the Control Register.

(4) Repeat the cycle indicated in 1, 2, and 3 above until the load operation has been completed.

(5) Disconnect, which terminates the load operation.

The only modification of the foregoing system which is needed to allow the computer to work with an external memory is that step 3 shall be modified. Instead of transferring the data word which has been already read into the A Register to the Memory, the instruction which is read into the Static Register need only call for some other sort of transfer or manipulation. Refer now to FIGURE 52 for a description of the way in which a load operation may be executed. To initiate the load operation the following steps must be taken. First the Register Selector Switch must be placed in the neutral position. This closes the N contact and causes Register Selector Circuit 52–10 to generate a high $RS_N$ signal. This is necessary to insure that a transfer to the L or X Registers cannot occur. Second, the One Instruction Switch 52–30 must be depressed, thereby generating the $\beta E-$ low signal, the $IOS_{NC}$ low signal, and closing the circuit between the $RS_N$ high level output and the $\beta E+$ circuit 52–11. Third, the Load Switch must be closed thereby transmitting the $\beta E+$ signal from element 52–11 to the Load FF 52–17 and to the IB FF 48–1. The $\beta E+$ signal causes the Load FF 52–17 to be set to its load condition thereby generating the Load signal. The Load signal is transmitted to several other elements which are FF 52–16, and gates 32–32, 49–3, 49–4, and 48–11. The Load signal transmitted to FF 52–16 causes this flip-flop to be set to its $r0 \rightarrow rA$ state, thereby alerting gate 49–18, the Gen. B gate. The $\beta E+$ signal transmitted to the IB FF 48–1 causes the generation of the IB1 and IB2 signals in the manner already described. At this point it may be decided whether a non-continuous load or continuous load operation is desired. If the non-continuous load operation is desired, then the One Instruction Switch 52–30 should remain depressed, whereas if a continuous load operation is desired the One Instruction Switch 52–30 should be restored to the continuous operation position. The non-continuous load operation will be first described and will be then followed by a description of the continuous type of load operation. Of the two gates 49–3 and 49–4 which have been partially alerted by the Load signal, it will be observed that gate 49–3 can never be selected because it requires as one of its inputs a fill signal from the Keyboard 52–20. However, the Keyboard has not been unlocked, and it is not possible to type a fill signal. Therefore, gate 49–4 will be the gate which will initiate the load operation and it will do so in the following way. Gate 49–4 is partially alerted by the presence of the load signal and the $IB_2$ signal from the IB FF 48–1, the latter having been generated by the $\beta E+$ signal from element 52–11 when the Load Switch was depressed. The remaining signal required to select gate 49–4 is derived from a gate 32–14 which has as required inputs the $\overline{K}$ or clear signal from the Input Ready FF 52–21 and a signal from the Start Synch. FF 32–42. The $\overline{K}$ signal is present on gate 32–14 because none of the input gates to the Input Ready FF 52–21 have been selected, and hence the Input Ready FF is in its cleared condition. The last thing to be now done which will initiate the load operation is, that the operator at the supervisory control panel shall depress the Start Bar 32–6. The depressing of the Start Bar 32–6 by the operator causes the Start Synch. FF 32–42 to be set, and hence to thereafter generate a start signal via gate 32–13. The start signal so generated will set the Stop FF 32–41 to its $\overline{SP}$ state and hence release the Instruction Decoder. The start signal will also recirculate to clear the Start Synch. FF 32–42, and additionally will select gate 32–14 with the consequent selection of gate 49–4. The selection of gate 49–4 causes a pulse to be propagated through buffer 32–40 which then proceeds to cause the Stop FF 32–41 to be set to its SP state. In addition, the selection of gate 49–4 causes a pulse to be transmitted through buffer 49–9 to the SCI FF 49–1 and to Sign of ($r0$) FF output gate 49–15. The output signal from buffer 49–9 will have exactly the same effect as that which has already been described for the previous externally controlled input operation. It will cause the SCI FF 49–1 to generate the SCI and Gen. I signals. The SCI signal selects gate 49–18 thereby generating the Gen. B signal. As previously described, Gen. I and Gen. B signals will cause a transfer of the contents of the 0 Register 50 to the A Register, and the SCI FF 49–1 as well as the IB FF 48–1 will be cleared at the end of this transfer cycle by a $t10B+$ timing signal from the Cycling Unit. Recalling that prior to this transfer the keyboard had been locked, it should be clear that what is transferred from $r0$ to $rA$ will be whatever is stored in the $r0$ Register. The fact that what was in the 0 Register may be undesired information is not really material because, as will be seen, this initial transfer is effectively an initiation cycle and ($r0$) which are transferred to $rA$ will be cleared out of $rA$ when the first word to be read into $r0$ from the external source is transferred to $rA$. The SCI signal, in addition to selecting gate 49–18 which generates the Gen. B signal, is also transmitted to Input Ready FF input gate 48–11. Gate 48–11, it will be observed, has as required input signals the Load and $t9B-$ signals, and it is known that the Load signal was already present thereon. Therefore, during the transfer minor cycle when the SCI signal appears at gate 48–11, the $t9B-$ timing signal from the Cycling Unit will select this gate and cause a pulse to be propagated through buffer 48–8 and thereby generate the T signal. The T signal performs its now well-known functions of setting the Input Ready FF 52–21 so that the Keyboard will be unlocked, setting the IA FF 48–2 to its IA state (not really significant for this operation), jamming the counter 52–24 to its C1 state by generating the Q signal via buffer 48–39, clearing the 0 Register, jamming the Sign of ($r0$) FF 52–26 to its plus state, and attempting to set FF 52–16 to its $r0 \rightarrow rA$ state, which had already been done by the Load FF 52–17. The operator at the Keyboard may now proceed with the load operation. After the sign digit and the ten information digits have been typed into the 0 Register and the Sign of $r0$ Flip-Flop 52–26 by the operator, the Fill Key must be struck. The striking of the Fill Key will generate the fill signal and the sprocket signal, the latter generating a CSP in the now well-known manner. The CSP and fill signals will cause a pulse to be passed through gate 48–6 to generate the Read End pulse (RE) and thereby clear the Input Ready FF 52–21 and set IB FF 48–1. The $IB_2$ signal will again be transmitted to SCI FF input gate 49–4 and the $IB_1$ signal will alert the 0 Register output gates 50–17 for the read out of ($r0$). The clear signal from Input Ready FF 52–21 will alert gate 32–14 so that when the operator again strikes the Start Bar 32–6 the Start Synch. FF 32–42 will again be set and cause gate 32–14 to pass a pulse to gate 49–4. As before, the selection of gate 49–4 will cause the Stop FF 32–41 to be set to its SP, or Stop, condition via buffer 32–40, and will also cause the SCI FF 49–1 to generate the SCI and Gen. I signals via buffer 49–9. The SCI will again cause the Gen. B signal to be generated by gate 49–19 and will also alert Input Ready FF input gate 48–11 so that a *t*9B– timing signal from the Cycling Unit may pass a pulse through buffer 48–8. The transfer from *r*0 to *r*A takes place and again the SCI FF 49–1 is cleared by a *t*10B+ timing signal from the Cycling Unit. The operator may now continue typing the next word which will be an instruction word to be transferred to the C Register. Since an instruction word contains no sign information, the first digit position is available for some other use. Instead of typing in sign information, the operator strikes a special *r*C key on the keyboard 52–20, which is shown in the right hand corner of that element on FIGURE 52. The striking of this key generates a special *r*C signal and in addition the sprocket signal. The sprocket signal generates the CSP which is transmitted to gate 52–18 at the same time as the special *r*C signal is also transmitted thereto. The gate 52–18 had been partially alerted by the C1 signal from the Counter 52–24 so that when the CSP and *r*C signals appear, gate 52–18 will pass a pulse to set FF 52–16 to its *r*0→*r*C state. The *r*0→*r*C signal will therefore arise and the *r*0→*r*A signal will be suppressed, with the consequent alerting of gate 49–17 and unalerting of gate 49–18. Gate 49–17 is also alerted by the low $RS_C$ signal from element 52–12 since it will be observed that none of the register selector contacts for L, X, or A are closed. This is known to be the case because one of the initial conditions for the load operation was that the register selector switch must be in the neutral position. The operator may now type into *r*0 the instruction word which is to be transferred to the C Register, the last character of course to be struck by the operator being the Fill Key. When now the Start Bar 32–6 is depressed with the consequent selection of gate 49–4 and the generation of the SCI and Gen. I signals by SCI FF 49–1, it is seen that gate 49–17 the Gen. β gate will be selected, and that gate 49–18, the Gen. B gate will not be selected. The SCI signal will again be transmitted to gate 48–11 so that the input Ready FF can be set to unlock the Keyboard 52–20 and prepare the 0 Register and its attendant circuits to be set up to receive the next information word to be transferred to the A Register once the transfer of the word presently in the 0 Register has been completed. The Gen. I and Gen. β signals, which arise at time *t*0A, are routed directly to the Control Encoder 27 and cause the generation of the (29) and (2) low level control signals and the (2+) high level control signal at time *t*0B. The (29) low level control signal will perform its already described functions of opening the 0 Register output gates 50–17 so that the instruction word stored in the 0 Register may read through the Minuend Buffers 20 onto the M lines, and thence to the input gates of the C Register 13. The (2+) high level control signal is transmitted to the C Register recirculation gates 13–1 where it prevents recirculation of the old contents of the C Register by jamming these gates. The (2) low level control signal performs several functions. First, the (2) low level control signal opens the C Register input gates 13–2 so that the instruction word which is reading through 0 Register output gates 50–17 through the Minuend Buffers 20 and onto the M lines may read into the C Register. Second, the (2) signal, together with the SCI signal from SCI FF 49–1, alerts Static Register clearing gate 25–35 so that a *t*1B– timing signal from the Cycling Unit may pass therethrough to the Static Register clearing line at time *t*2B, and thereby cause the Static Register FF*s* to be cleared to their zero or barred condition at time *t*3B. The clearing of the Static Register at time *t*3B will not initiate a search because examination of Instruction Decoder gate 26–1A will indicate that the $\overline{SP}$ low level signal is required, and it is known that the $\overline{SP}$ low level signal has been suppressed by the action of buffer 32–40 in setting the Stop FF 32–41 to its SP state. Third, the (2) low level control signal applied to Static Register gates 25–2 permits the P9 and P10 digits of the instruction word being transferred from *r*0 to *r*C to be staticized in the Static Register FF*s*. For a load operation this instruction will be an H instruction which calls for the transfer of (*r*A) to a memory location designated by the "*m*" Address portion of the C Register 13. Finally, the (2) low level control signal is applied to Stop FF gates 32–27 and 32–34. The (2) signal applied to gate 32–34 jams the Stop FF 32–41 so that the SP signal state is maintained in spite of the fact that gate 32–27 attempts to set the Stop FF 32–41 to its $\overline{SP}$ state. Gate 32–34 is active, it will be recalled, because of the presence of the IOS and βE– signals from IOS FF 52–8 and βE– element 52–2, both of these signals being present by virtue of the fact that the One Instruction Switch 52–30 is depressed. At the completion of the transfer of the instruction word from the 0 Register to the C Register, the *t*10B+ timing signal from the Cycling Unit will clear the SCI FF 49–1 and thereby suppress the (29) and (2) low level control signals and the (2+) high level control signal. The H instruction, which is now staticized in the Static Register 25, cannot however be executed because the Instruction Decoder 26 is inhibited by the absence of the $\overline{SP}$ low signal. Therefore, the Start Bar 32–6 must again be struck. The striking of the Start Bar 32–6 will cause the Start Synch. FF 32–42 to be set and consequently clear the Stop FF 32–41 to its $\overline{SP}$ state, thereby releasing the Instruction Decoder 26 so that the H instruction may be executed. Gate 49–4 will not be able to stop this transfer by propagating a pulse through buffer 32–40 to the Stop FF 32–41 because the $IB_2$ alerting signal required by this gate is not present, the IB FF 48–1 having been cleared at the end of the transfer of the instruction word from the 0 Register to the C Register. When the H instruction has been executed, Static Register clearing gate 25–17 will pass a *t*4B– timing signal from the Cycling Unit to generate an EP1 signal, and also to clear the Static Register FF*s* to their zero or barred state. The EP1 ending pulse signal so generated is transmitted to gate 32–32, which has previously been alerted by the presence of a Load signal. Gate 32–32 will thereupon pass a pulse to cause the Stop FF 32–41 to be set to its SP state, thereby suppressing the $\overline{SP}$ signal and inhibiting the normal search which would follow as a result of the clearing of the Static Register Flip-Flops. This is achieved in the now well-known manner of inhibiting Instruction Decoder gate 26–1A by suppressing the $\overline{SP}$ low level signal. The preceding process may now be repeated for each information word and instruction word pair, and the foregoing described process will be carried out in the manner just indicated. At such time as the operator desires, the non-continuous load operation may be terminated by depressing the Disconnect Key. The Disconnect Key will cause the Disconnect Element 52–22 to generate a pulse which performs the following functions. First, the disconnect pulse will be transmitted to the Load FF 52–17 and cause this Flip-Flop to be cleared to its $\overline{\text{Load}}$ state. Second, the disconnect signal will be passed through buffer 48–5 to clear the IB FF 48–1 and the IA FF 48–2. Third, the disconnect signal will be transmitted to the Input Ready FF 52–21, clearing it to its $\overline{K}$ state and locking the Keyboard 52–20. This terminates the noncontinuous load operation and the computer may be allowed at this time to carry out the program which has just been inserted into the memory. In order to do this, the last instruction word which is read into the C Register must contain in the C Address portion the memory location of the first instruction to be performed. Also, this program will proceed one instruction at a time unless the One Instruction Switch 52–30 is returned to its continuous operation position. If it is not so returned, then at the conclusion of the execution of the first instruction by the machine, the Stop FF 32–41 will be set to its SP state and it will be necessary to depress the Start Bar 32–6 to proceed to the next instruction. If continuous machine computing is desired, then the One Instruction Switch 52–30 must be returned to its continuous position and the Start Bar 32–6 must be depressed. Thereafter, the computer will function to perform one instruction after another in accordance with the program which has been loaded into the memory.

Understanding now the method of operation of a non-continuous load, turn now to a consideration of the continuous load operation. The continuous load is basically the same as the non-continuous load, with the exception that after the transfer of each word from the 0 Register to the A or C Registers it is not necessary to depress the Start Bar 32–6 to cause the subsequent transfer. The continuous load operation requires that the Start Bar 32–6 be depressed only once. As for the non-continuous load operation a certain order of procedure must be follower. That is, the Register Selector Switch must be set to neutral, the One Instruction Switch must be depressed, and the Load Switch must be also depressed. The consequences of the preceding enumerated steps are exactly the same as those already described for the non-continuous load operation. However, once the Load Switch has been depressed, the One Instruction Switch 52–30 should be returned to its continuous operation position. When now the Start Bar 32–6 is struck, an initial transfer of the contents of the 0 Register to the A Register will procede exactly in the same way as already described for the non-continuous load operation, and will be initiated as before described by the SCI FF input gate 49–4. In addition however, the following will occur. The return of the One Instruction Switch 52–30 to its continuous operation position caused the suppression of the $\beta$ E– low level signal and also caused the $IOS_{NC}$ high level signal to arise. When the Start Bar 32–6 was struck, the $IOS_{NC}$ high level signal was transmitted to the IOS FF 52–8 thereby causing it to be cleared to its $\overline{IOS}$ condition. The $\overline{IOS}$ signal, together with the load signal from Load FF 52–17, partially alerts SCI FF input gate 49–3. Examination of gate 49–3 indicates that for complete selection two other signals are required, which are the Fill signal from the Keyboard and a CSP which is generated simultaneously with the Fill signal. The generation of the SCI signal from SCI FF 49–1 during the initial transfer from *r*O to *r*A had caused gate 48–11 to become fully alerted and to thereby pass the *t*9B– timing signal from the Cycling Unit through buffer 48–8 and generate the T signal. The T signal had performed its ordinary functions and the Keyboard 52–20 has been allowed to control a type-in to the 0 Register 50. The keyboard operator may now proceed to type the information into the 0 Register in the order already designated, that is first an information word which will be transferred to the A Register, followed by an instruction word which will be transferred to the C Register. At the conclusion of the type-in of the first information word which will go to the A Register, and the striking of the Fill Key by the keyboard operator, the Fill and CSP signals will be generated which will completely select gate 49–3 and therefore pass a pulse through buffer 49–9 to the SCI FF 49–1, thereby causing the transfer of the first information word to the A Register by the now well known process. This transfer takes place so rapidly that the keyboard operator never really becomes aware that the keyboard has become locked and subsequently unlocked by the action of the SCI signal and gate 48–11. The first instruction word is now typed in and again the striking of the Fill Key by the operator will cause the selection of gate 49–3 and the subsequent transfer of this instruction word to the C Register and the Static Register. Now however, gate 32–34 cannot cause the STOP Flip-Flop 32–41 to be set to its SP state because the $\beta$ E– and IOS signals are not present at the gate 32–34. Therefore, gate 32–27 will inhibit the Instruction Decoder for only one pulse time when the instruction is being staticized in the Static Register, and will immediately cause the STOP FF 32–41 to be set to its $\overline{SP}$ condition. Thus, the H instruction transfer of the information word previously read into the A Register will occur, and the conclusion of the H instruction will cause the STOP FF 32–41 to be set to its SP state in the manner already described. That is, by generating an EP1 signal via Static Register clearing gate 25–17. The foregoing process can be repeated indefinitely until the memory is completely loaded or it is desired that the load operation be terminated. It should also be pointed out that gate 49–4 will never be selected subsequent to the initial transfer of the contents of the 0 Register to the A Register because there was never a necessity to strike the Start Bar 32–6. Hence, no Start signal from Start Synch. Flip-Flop 32–42 was ever presented to gate 32–14, and consequently the output of this gate, which is required by gate 49–4, was never generated. This being so, no signal was ever transmitted through buffer 32–40 to cause the STOP Flip-Flop 32–41 to be set to its SP state and consequently the H instruction proceeds without the necessity for the operator's again striking the Start Bar 32–6. Although this continuous load operation has been described in connection with the Keyboard 52–20, it should be borne in mind that a source other than the Keyboard may very well be utilized. Such a source might be a tape mechanism which causes the keyboard characters to be generated in their coded condition without the necessity for an operator to strike the keys. In the alternative, the coded designations for the characters, together with the Fill, Sprocket, and *r*C characters could be placed directly upon the tape at the proper points and cause the load operation to take place without the necessity for utilizing a Keyboard such as 52–20 at all. If such an operation were in fact utilized, then, at the end of the continuous load operation a disconnect signal will also have to be placed upon the tape so that the functions performed by the Disconnect Element 52–22 could be carried out. This would require the providing of a gate to examine for the particular disconnect code and, when this code were detected to then buff a pulse through to those circuits requiring the disconnect signal from element 52–22 as already previously described. This concludes the description of the input functions.

A description of the output facilities will now be presented. As earlier mentioned the output facilities provide for the transfer of information from the computer to the 0 Register, whereupon such information will then be immediately read out to a recording instrument. These output functions may be either of the internally controlled type, or alternatively may be externally controlled by the operator at the supervisory control panel. Consider now the first or internally controlled type. This output function corresponds to the 0 or 77 Instruction. When, during the course of computation, an 0 or 77 Instruction is read into and staticized by the Static Register Flip-Flops, the STR6, STR5, $\overline{STR}$4, STR3, STR2 and $\overline{STR}$1 Static Register signal lines will be selected. These signals will select Instruction Decoder gate 26–28A at time *t*11B and will therefore cause the (84A) high level signal to be generated at time *t*0A. The (84A) high level signal is transmitted to the Control Encoder 27 where it causes the generation at time *t*0B of the (83), (84), and (67) low level control signals. The (84) low level control signal from the Control Encoder 27 performs the following functions. First, it is applied to Print Flip-Flop input gate 52–28. If the IA FF 48–2 is in its cleared condition and hence is generating the $\overline{IA}$ signal indicating that the 0 Register is not in use, the $\overline{IA}$ signal will also be applied to gate 52–29. A *t*0B– timing signal from the Cycling Unit will pass through gate 52–28 and set the Print Flip- Flop 52–29 to its PR signal state. Additionally, the output of gate 52–28 is routed to buffer 48–39 as the PR′ signal which generates the Q signal. The PR signal from Print Flip-Flop 52–29 is transmitted to gates 48–33, 48–4 and 50–14, and the functions of these gates will be subsequently treated. The Q signal jams the Counter 52–24 to C1 and clears the 0 Register by inhibiting the Hold circuits 48–44. Second, the (84) signal together with the $\overline{IA}$ signal from IA FF 482–2 alerts gates 48–35, 48–36 and 48–37. Gates 48–36 and 48–37 co-operate to allow the word which will be transferred from the A Register to the 0 Register to be read into the 0 Register at a computer pulse rate by inhibiting the Hold Circuit 48–44 and activating the Shift Circuit 48–43. The *t*0B+ timing signal from the Cycling Unit jams gate 48–36 to insure that the 0 Register will be cleared by preventing a shift for the one pulse time while gate 48–37 is inhibiting the Hold. Gate 48–35 forces the RIN signal to be generated constantly from RIN element 48–53 by constantly providing input signals thereto via buffer 48–42. The RIN signal is transferred to the 0 Register input gates 50–13 to allow the A Register information to be inserted into the 0 Register through these input gates. Third, the (84) signal, together with the $\overline{IA}$ from IA FF 48–2, alerts gates 51–2 and 51–4. Gate 51–2 receives the A Register information from the Subtrahend Buffers 19 and transmits it therethrough to the 0 Register input gates 50–13, where the digits are read into the register by the RIN signal generated from element 48–53, as previously mentioned. Gate 51–4 reads the sign of the contents of the A Register into the 0 Register if the sign stored in the Sign of (*r*A) FF 11B is minus. This sign is passed through gate 51–4 by a *t*0B– timing signal from the Cycling Unit ,and hence it will be appreciated that the first digit read into the 0 Register will be the sign digit. It is seen therefore, that the A Register information is read into the 0 Register in computer order. That is, the sign digit is read in first and is then followed by the ten information digits of the A Register reading from LSD to MSD. The (83) low level control signal is transmitted to two places in the computer. First it is transmitted as an alerting signal to CT FF input gate 12–38, where together with the $\overline{IA}$ signal from IA FF 48–2 and the $\overline{LOAD}$ signal from Load FF 52–17, it causes at *t*10B– timing signal from the Cycling Unit to be passed therethrough and set the CT FF 12A to its CT state, thus directing the computer to look for the next instruction at a memory location designated by the "*m*" Address portion of the Control Register. If at the time the 0 instruction had been staticized in the Static Register 25, the 0 Register had been in use, then no $\overline{IA}$ signal would have been present. Thus, CT FF input gate 12–38 would not have been selected and the computer would find the next instruction at a memory location designated by the "*c*" Address of the Control Register Second, the (83) low level control signal, together with the $\overline{IA}$ signal from IA FF 48–2, alerts gate 48–7 so that a *t*11B– timing signal from the Cycling unit may pass therethrough and set the IA FF 48–2 to its IA state. This is done so that at the conclusion of the transfer of the contents of *r*A to the 0 Register, the information in the *O* Register will be allowed to print out without the risk being run that the 0 Register will be cleared by a subsequent attempt to gain control of this register, either by the computer or by an operator at the Supervisory Control Console. The (67) low level control signal alerts Static Register clearing gate 25–16 so that a *t*9B– timing signal from the Cycling Unit may pass therethrough and cause the Static Register Flip-Flops to be cleared to their zero or barred state at time *t*11B of the transfer cycle. The clearing of the Static Register at that time will cause the unselecting of the Instruction Decoder gate 26–28A and the selection of Instruction Decoder gate 26–1A. The unselecting of gate 26–28A will suppress the (84A) high level signal generated therefrom at time *t*0A of the next minor cycle with the consequent suppression of the (83), (84) and (67) low level control signals from the Control Encoder 27 at time *t*0B. The selection of Instruction Decoder gate 26–1A will institute a normal search operation. The search which then follows is controlled by the "*m*" or "*c*" Address portions of the Control Register, depending upon whether or not a transfer has taken place from the A Register to the 0 Register. The computer is now free to continue with its normally programmed routine. However, it still remains to cause the transferred contents of the A Register to be printed out from the 0 Register 50. The suppression of the (84) low level control signal causes the transferred information to be staticized in the 0 Register by closing gates 48–36 and 48–37 and thereby removing the inhibition on the Hold Circuit 48–44 and terminating the shift operation produced by Shift Circuit 48–43. It will be recalled that the setting of the Print FF 52–29 to its PR state had alerted the print-out gates 50–14 from the 0 Register. When the information digits now stored in the 0 Register are staticized by the action of the Hold circuit, the read-in timing has been such that the sign information is in a position to be read out through the output gate 50–14. Upon being so read out, the sign information is transmitted to the Keyboard decoding matrix, where, if the sign information were negative, the minus sign key on the keyboard will be energized and will print out a minus sign on the recording medium, which may be a tape or paper roll. The energization of the sign key in addition to printing out the character will generate a sprocket signal. The sprocket signal will be transmitted to the Sprocket Synch. FF 52–19, and, in the already described manner, will generate a CSP. The CSP will step the Counter 52–24 from C1 to $\overline{C1}$ and will also be transmitted to gate 48–33. Now, gate 48–33 will transmit the CSP because it has been alerted by the PR signal from the Print FF 52–29. The output signal from gate 48–33 is in turn transmitted to the Sprocket FF 48–31 which initiates a ten place shift of the digits stored in the 0 Register, the shift being terminated in the fashion already explained, by the *t*9B+ timing signal from the Cycling Unit. The ten place shift results in the MSD digit now being in position to be read out of the input gates 50–14, and it will be so read out and transmitted to the decoding matrix of the Keyboard 52–20 in the same manner as the sign information. The procedure just described will now be repeated. That is, the printing of the MSD digit will generate a sprocket signal which will in turn cause a CSP to step the Counter to its next count position and will also pass through gate 48–33 to the Sprocket Flip-Flop 48–31 and 'initiate another ten place shift. Therefore, at the end of this ten place shift the MSD–1 digit stored in the 0 Register will be in position to be read out of the output gates 50–14. This process will continue with each digit being successively read out of the 0 Register and printed by the print-out circuits of the Keyboard 52–20. When the last digit (LSD) is read out of the 0 Register through the output gates 50–14 and caused to be printed at the Keyboard 52–20, the CSP generated as a result thereof will now step the Counter 52–24 to its C12 position and will initiate the final shift via the Sprocket Flip-Flop 48–31. The C12 signal output from Counter 52–24 is transmitted to print ending gate 48–4 which is alerted by the PR signal from the Print FF 52–29. A *t*10B– timing signal from the Cycling Unit will therefore be passed through the gate 48–4 to generate the Print End pulse (PE) which clears the IB FF 48–1, clears the IA FF 48–2, and clears the Print FF 52–29. The clearing of the IA FF 48–2 to its $\overline{IA}$ state frees the 0 Register so that the computer may initiate another transfer from *r*A to *r*0 if it so desires, or the operator at the supervisory control console may gain control of the 0 Register for purposes of inserting information into the computer. This concludes the description of the internally controlled output operation.

Turn now to a consideration of the externally controlled output transfer operations. These operations are switch selected from the supervisory control board and allow the operator to cause to be read out of any register of the computer the information which is contained therein, such information, as before, being directly transferred to the recording instrument for printing out. The transfer to be now described will be a transfer from the L Register of the computer to the 0 Register, although, as will be readily seen from the subsequent description, transfers from the X, A, or C Registers will proceed in an analogous fashion. The externally controlled output transfers, one of which is about to be described all require that prior to the initiation of the operation the computer must be stopped. This stopping is accomplished by depressing the One Instruction Switch 52–30. The consequence of depressing the One Instruction Switch has already been fully described in the explanation of the externally controlled input transfers. It should be sufficient at this point to indicate that the SP signal will be generated from the Stop FF 32–41 and that the IOS$_{PR}$ signal from element 52–4 will be caused to assume a low level state. The Register Selector Switch must now be set to select the L Register from which the transfer will be made. Selection of the L Register causes the L contacts of the Register Selector Switch to be closed so that the low level RS$_{C}$ signal from element 52–12 will be suppressed, as will the low level signals from elements 52–14 and 52–15. When now the Print-out key is depressed, the low level IOS$_{PR}$ signal from element 54-4 will be transmitted to gate 52–5. This gate has been completely alerted by the presence of the SP signal from the Stop FF 52–41, the $\overline{IA}$ signal from IA FF 48–2, and and the low RS$_{N}$ signal from element 52–10. Consequently, the IOS$_{PR}$ low level signal transmitted to gate 52–5 via the Print-out key will pass therethrough to set the Sync. FF 52–6. The set output of the Sync. FF 52–6 will alert gate 49–25 so that an EW and *t*10B– signal will cause an output pulse to be transmitted therethrough to the SCO FF 49–38. The SCO FF 49–38 in response to the input signal from gate 49–25 generates the SCO′ signal, the SCO$_{B}$ signal, and the Gen. 84 signal. The SCO′ signal is transmitted to buffer 48–39 and passes therethrough to generate the Q signal. The Q signal performs its here relevant functions of jamming the Counter 52–24 to C1 and clearing the 0 Register by inhibiting the hold circuit 48–44. The SCO$_{B}$ signal clears the Sync. FF 52–6 and alerts gates 49–32, 49–33, 49–34 and 51–5 and 51–6. Since the RS$_{L}$ low level signal from element 52–13 is the only low level signal present on these gates, it is seen that only gates 49–34 and 51–6 will be effected. Gate 49–34 generates the SCO$_{L}$ signal at time *t*0A. This signal, together with the Gen. 84 signal from SCO FF 49–38, is transmitted to the Control Encoder 27, which in response thereto generates the (84) and (66) low level control signals and the (58+) high level control signal at time *t*0B. Additionally, the Gen. 84 signal from SCO FF 49–38 sets the Print FF 52–29 to its PR signal state, thereby alerting gates 48–33, 50–14 and 48–4 as before. The (66) low level control signal from the Control Encoder 27 opens the L Register output gates so that the contents of the L Register may read out and through the Minuend Buffers 20 onto the M lines. The (84) low level control signal performs the functions already previously described in connection with the internally controlled transfer from the A Register to the 0 Register. Briefly recapitulating, gate 48–35 causes the RIN signal to be generated from element 48–53 via buffer 48–42, thereby opening the 0 Register input gates 50–13 so that the contents of the L Register reading now onto the M lines may be read into the 0 Register. In order to accomplish this read-in the (84) signal also alerts gate 51–3 so that the information on the M lines may be transmitted therethrough to the input gates 50–13. The (84) signal applied to gates 48–36 and 48–37 causes the 0 Register to shift the digits being read in through the input gates 50–13 at the computer pulse rate. However, the timing is so arranged that prior to read-in of the information digits coming from the L Register, the L—sign information from the Sign of (*r*L) FF 11C will be first read into the 0 Register through gate 51–6 which has been alerted by the RS$_{L}$ low level signal and the SCO$_{B}$ signal, so that the *t*0B— timing signal from the Cycling Unit will pass the sign information through this gate. The (58+) high level control signal from the Control Encoder 27 jams the output gates of the A Register so that the information recirculating within that register cannot be read through the Subtrahend Buffers 19 to the gates 51–2. Likewise, the (58+) high level signal jams gate 51–4 so that the sign information from the Sign of (*r*A) FF 11B cannot be transmitted therethrough to the 0 Register input gates. A *t*10B+ timing signal from the Cycling Unit clears SCO FF 49–38 at the end of the transfer minor cycle, thereby suppressing the control signals (84), (66) and (58+) from the Control Encoder 27. When, the (84) signal disappears, the shift of the information through the 0 Register at the computer pulse rate is terminated because the Shift Circuits 48–43 are no longer activated. The L Register information digits are therefore staticized in the 0 Register in exactly the same way as the A Register information had been for the internally controlled transfer operation. As in that already described operation, the information with the 0 Register will be staticized in such a way that the sign information will be in a position to be read out of the 0 Register through the output gates 50–14. The print-out operation will now take place in an identical way to that already previously described for the internally controlled transfer from *r*A to *r*0. It should be noted, however, that since the (83) signal had never been generated during this transfer, the gate 48–7 had never been activated and the IA FF 48–2 had never been set to its IA state. This, however, is not material for purposes of this operation because the computer cannot attempt to gain control of the 0 Register, since the One Instruction Switch is depressed and hence the computer is stalled. At the conclusion of this print-out operation when the Print FF 52–29 has been cleared by the print ending pulse generated from gate 48–4, the operator at the supervisory control panel may restore the One Instruction Switch 52–30 to its continuous operation position, and may then depress the Start Bar 32–6 and enable the computer to resume its program. This concludes the description of the externally controlled output transfer functions. Two additional functions will be now described. These functions are:

(1) Erase
(2) QT Stop

Consider first the Erase function which is controlled by Erase element 52–23. This function is used in conjunction with the input functions for purposes of correction of erroneous information which has been inadvertently typed into the 0 Register in preparation for transfer into the computer. When the Erase key is closed, Erase element 52–23 generates an E pulse which is transmitted to buffer 48–39 to generate a Q signal. The Q signal will jam the Counter to C1 and will clear the 0 Register, will set the Sign (*r*0) FF 52–26 to its plus state and will set the FF 52–16 to its *r*0→*r*A state. It is seen that these conditions correspond to those just prior to the beginning of a type-in operation. Therefore, if some information had been typed in so that for example six characters were already in the 0 Register and the Counter was at a count of 7, these characters will be cleared out of the 0 Register and the Counter will be returned to its count of 1 or C1 state, so that the operator at the keyboard may begin over again. In order to utilize the Erase function during an externally controlled input transfer it is only required that the Erase key be depressed prior to the striking of the Fill Key at the Keyboard 52–20.

Consider now the QT Stop function. This function is similar to the one instruction function provide by the One Instruction Switch 52–30. It differs from the one instruction function in that setting of the QT Stop Switch 52–31 will cause the computer to stall when either a Q or T instruction becomes staticized in the Static Register, but not after every instruction. When the QT Stop Switch 52–31 is depressed, the QT Stop element 52–1 will generate a low level signal because the contacts to the high level box are now open. The $IOS_{NC}$ element 52–3 will be caused to generate a low level signal for a similar reason. The $IOS_{PR}$ element 52–4 will likewise be shifted to its low level condition, thereby enabling a print-out operation to take place if this is desired. The $IOS_{NC}$ low signal is transmitted to Sync. FF 52–7, setting this flip-flop and ultimately causing the IOS FF 52–8 to be set to its IOS state. The IOS signal from IOS FF 52–8, together with the low level QT Stop Signal from element 52–1, partially alerts Stop FF input gate 32–30. When thereafter, a Q or T instruction code appears on the Static Register output lines, this code will be transmitted also to Stop FF input gate 32–30 and will allow a *t*10B– timing signal from the Cycling Unit to be passed therethrough to set the Stop FF 32–41 to its SP state. This of course suppresses the $\overline{SP}$ low level signal and inhibits the Instruction Decoder 26 from carrying out the Q or T instruction. The operator at the supervisory control panel may at this point, if he so desires, cause a print-out from any of the registers of the computer by depressing the Print Key. The computer may be allowed to continue on its routing by pressing the Start Bar 32–6. This causes Start Sync. FF 32–42 to be set and thereafter to clear the Stop FF 32–41 to its $\overline{SP}$ state, thereby freeing the Instruction Decoder to perform the Q or the T instruction. Additionally, the set output from Start Sync. FF 32–42 is transmitted to Stop FF input gate 32–30 as a high level signal at time *t*10B so that it jams this gate when the *t*10B– timing signal from the Cycling Unit would normally be again passed there through to set the Stop FF 32–41 to its SP condition. This allows the Q or T instruction to be performed. Of course, the next time a Q or T instruction appears in the Static Register the same stop operation will again occur, and the Start Bar 32–6 will again have to be depressed to execute the Q or T instruction. At such time as this QT Stop function is no longer desired, then the QT Stop Switch 52–31 should be restored to its continuous position. This removes the low QT stop signal generated by element 52–1 from gate 32–30, thereby terminating the QT stop operations. Additionally, when the Star Bar 32–6 is depressed the IOS FF 52–8 will be cleared to its $\overline{IOS}$ state.

Although we have shown and described only certain specific computer operations and inter-connections, it will be apparent that many more operations and inter-connections are possible without departing from the spirit of the present invention. Therefore this invention is not to be limited except insofar as is indicated by the purview of the disclosure itself.

What is claimed is:

1. An electronic computer comprising: a multiple address memory in which both data and instruction signals may be stored, the instruction signals having a control portion for predetermining operations to be performed on data signals and an address portion for selecting predetermined data and instruction addresses from the memory, an address register coupled to said memory for storing the address portion of the instruction signals, control circuits coupled to said memory and said address register including a static register for storing the control portion of instruction signals derived from the memory, memory addressing means coupled to said memory and said address register for receiving an address from said address register and in response thereto selecting the contents of the memory location specified by said received address for transmission to a portion of said electronic computer, said control circuits further including switching means coupled to said address register operative in response to said static register being set to a predetermined condition to cause the address stored in said address register to be transferred to said memory addressing means to thereby search for an address in the memory as selected by the address register, and means coupled to the static register for setting said static register to said predetermined condition in response to the completion of the operation being momentarily performed by the computer.

2. An electronic computer comprising, a multiple address memory in which both data and instruction signals may be stored, the instruction signals having a control portion for predetermining operations to be performed on data signals and an address portion for selecting predetermined data and instruction addresses from the memory, data manipulation means coupled to said memory, memory address means including an address register for storing the address portion of the instruction signals coupled to said memory, control circuits coupled to said memory, said data manipulation means and said address register and further including a static register for storing the control portion of instruction signals derived from the memory, said control circuits being operative when said static register is set to selected conditions by said control portion of said instruction signals to initiate selected operations by said data manipulation means to be performed on data signals and when set to a predetermined first condition to cause said memory address means to search the memory for an address of an instruction or data as selected by the address register, and means coupled to said static register for setting said register to said predetermined condition in response to the completion of the operation being momentarily performed by the computer.

3. An electronic computer comprising, a multiple address memory in which both data and instruction signals may be stored, the instruction signals having (1) a control portion for predetermining operations to be performed on data signals, (2) a first address portion for selecting instruction signals from predetermined memory addresses and (3) a second address portion for selecting data signals from other predetermined memory addresses, an address register coupled to said memory for storing the address portions of instruction signals derived from the memory, memory addressing means coupled to said memory and to said address register for receiving one of the addresses in said address register and in response thereto selecting the contents of the memory location specified by said received address for transmission to a portion of said electronic computer, control circuits including means directly coupled to said memory for storing the control portion of instruction signals derived from the memory, said control circuits further including switching means coupled to said address register operative when set to a first predetermined condition to select for transfer to said memory addressing means the second portion of the address stored in the address register and thereafter in response to the locating of said data signals produces a sequence of new signals controlling said computer in the manipulation of said data signals and further operative when set to a second condition to select for transfer to said memory addressing means the first portion of the address stored in the address register, and means coupled to the control circuits for setting said control circuits to said second condition in response to the completion of the operation being momentarily performed by the computer.

4. An electronic computer comprising, a multiple address memory in which both data and instruction signals may be stored, the instruction signals having (1) a control portion for predetermining operations to be performed on data signals, (2) a first address portion for selecting instruction signals from predetermined memory addresses and (3) a second address portion for selecting data signals from predetermined memory addresses, an address register coupled to said memory for storing the address portions of instruction signals derived from the memory, memory addressing means coupled to said memory and to said address register for receiving one of the addresses in said address register and in response thereto selecting the contents of the memory location specified by said received address for transmission to a portion of said electronic computer, a static register coupled to said memory for storing the control portion of instruction signals derived from the memory, a bi-stable switch coupled to said address register for selecting one or the other address portions of the instruction signal stored therein in dependency upon the condition of the switch, means responsive to a first predetermined condition of the static register for searching the memory for an address selected by the address register and the bi-stable switch, means operable to set said bi-stable switch to one condition and said static register to said first predetermined condition in response to certain predetermined operations stored in said static register, and means coupled to said static register and to said bi-stable switch to set said bi-stable switch to the other condition, and said static register to said first predetermined condition when the operation being momentarily performed by the computer is completed.

5. In an electronic computer in which computer words, data or instruction words, appear as a group of time sequential digit pulses and wherein the time interval embraced by said group of pulses represents a minor cycle of computer time; the combination including, processing circuits for processing the digits comprising a computer word, control circuits adapted to receive and store instruction words coupled to said processing circuits for controlling the action of said processing circuits in accordance with the instruction word stored in said control circuits, a counter, input means for inserting at least one digit of a computer word into said counter to set the same to said at least one count of the digit, means for stepping said counter down only one count each minor cycle of computer operation, until said counter reaches a first predetermined count, and means coupling said counter to said control circuits and selectively responsive to either said first predetermined count or a second predetermined count in said counter to change the instruction stored in said control circuits.

6. An electronic computer as set forth in claim 5 wherein the last named means includes a pair of gates, one operative in response to the first predetermined count of the counter and a first predetermined instruction, and the other operative in response to a second predetermined count in the counter and a different instruction stored in the control circuits to change the instruction stored in said control circuits.

7. In an electronic computer in which computer words, data or instruction words, appear as a group of time sequential digit pulses and wherein the time interval embraced by said group of pulses represents a minor cycle of computer time; the combination including, processing circuits for processing the digits comprising a computer word, control circuits adapted to receive and store instruction words coupled to said processing circuits for controlling the action of said processing circuits in accordance with the instruction word stored in said control circuits, a counter, input means for storing the least significant digit of a data word in the counter, count down means operative following the storage of said digit in said counter to step the count in said counter down one step each minor cycle until the counter reaches zero, means coupled to said counter and said input means for rendering said input means operative when said counter reaches zero to store the next successive higher order digit of the data word in said counter, said count down means being operative to again step the count of the counter down to zero and so on, and means coupling said counter to said control circuits operative to change the instruction stored in said control circuits response to the storage of a predetermined digit in said counter.

8. A computer as set forth in claim 7 wherein the last named means includes a gate circuit having inputs from the counter which senses the storage of said predetermined digit in said counter and operates responsive to said digit to change the instruction stored in said control circuit.

9. In an electronic computer in which computer words, data or instruction words, appear as a group of time sequential digit pulses and wherein the time interval embraced by said group of pulses represents a minor cycle of computer time; the combination including, register means for holding the digits of a computer word, shift circuits coupled to said register means, said shift circuits being arranged to shift the position of the digits held by said register means when rendered operable, the shift being one digit position for each minor cycle of computer time, control circuit means coupled to said shift circuits operable in response to the storage of a shift instruction in said control circuits, a counter, means storing the digit present in a predetermined digit position of an instruction word in said counter, means stepping said counter down only one count each minor cycle of computer operation until the counter reaches zero, and means responsive to the shift instruction stored in said control circuits and the attainment of a zero count in said counter to change the instruction stored in said control circuits.

10. An electronic computer comprising, a multiple address memory in which both data and instruction signals may be stored, the instruction signals having a control portion for predetermining operations to be performed on data signals and an address portion for selecting predetermined data and instruction addresses from the memory, an address register coupled to said memory for storing the address portion of the instruction signals, a static register coupled to said memory for storing the control portion of the instruction signals derived from the memory, control circuits including a decoder-encoder means driven by the static register and operable in response to the control signals stored in the static register to control the operation of the computer, gating means coupled to the static register for modifying the signals stored therein, said gating circuits being controlled by predetermined signals from said decoder-encoder means in response to the predetermined signals for automatically cycling said computer through the steps of a computation, ending pulse circuits coupled to said static register operative upon the termination of a computation to set said static register to a first predetermined state, to thereby develop control signals from said decoder-encoder means to cause the computer to search the memory for the next instruction, the address of the next instruction being determined by the address stored in the address register.

11. In combination, a first source of information signals, a second source of information signals, storage means adapted to receive and store information signals from said first or second source, first transfer means linking said first source with said storage means, second transfer means linking said second source with said storage means, and control circuits coupled to said first and second transfer means for controlling the transfer of information signals from said first or second source to said storage means including switch means coupled to said control circuits and to said first and second transfer means, said switch means for generating first and second switch signals, said first and second switch signals being mutually exclusive, said first switch signal partially conditioning said first and second transfer means to initiate a transfer of information signals from said first or second source to said storage means, said second switch signal perventing the initiation of a another transfer of information to said storage means and said control circuits being connected to said first switch means to cause said first switch means to produce said second switch signal after said storage means has received a quantum of information signals.

12. The combination according to claim 11 wherein said first and second sources supply information in signal groups containing a predetermined number of sequential signals and said storage means is adapted to receive and store at least one of said signal groups, and including a utilization device adapted to utilize signals stored in said storage means, and third transfer means being effective responsive to enabling signals from said control circuits to transfer at least one of said signal groups to said utilization device from said storage means.

13. The combination according to claim 12 including detector means coupled to said utilization device for detecting the transfer of a complete signal group to said utilization device, and means responsive to said detector means and said control circuits for causing said switch to generate said first switch signal.

14. In combination, a source of information signals, storage means adapted to receive and store information signals from said source, transfer means linking said source with said storage means, control circuits coupled to said transfer means for controlling the transfer of information signals from said source to said storage means, first switch means coupled to said control circuits and to said transfer means for generating mutually exclusive first and second switch signals, said first switch signal enabling said control circuits to initiate a transfer of information signals from said source to said storage means and said second switch signal preventing the initiation of such transfer, said control circuit being connected to said first switch means to cause said first switch means to produce said second switch signal after said storage means has received a quantum of inforamtion signals, second switch means adapted to generate mutually exclusive third and fourth switch signals, means coupling said control circuits and said first switch to said second switch effective responsive to predetermined control signals and said first switch signal to cause said second switch to generate said third switch signal, said source of information signals said control circuits and said second switch comprising elements of an electronic computer characterized by a multiple address memory system in which both data and instruction signals may be stored, said computer further including a device for storing a plurality of memory addresses therein, said second switch circuit being coupled to said device for selecting one address at a time from the plural addresses stored therein, a first address being selected in response to said third switch signal and a different address being selected in response to said fourth switch signal.

15. An electrical computer having an addressable memory for storing data and instructions including an address locating means associated with said memory, data processing elements and circuitry interconnecting the elements, comprising control means coupled to said locating means including a static register and a distributor which exert mutual control over each other, said distributor containing encoding and decoding function table means for generating control signal for distribution to parts of the computer, said static register and distributor producing signals in a first condition to effect extraction of operating instructions from the memory by said locating means, said static register being responsive to a portion of an extracted instruction to generate in co-operation with said distributor operating signals for controlling said data processing elements, interconnecting circuitry and locating means, said static register further comprising means responsive to a signal from said locating means indicative of the availability of a memory location for the extraction or insertion of an operating instruction or item of data, thereby to effect a change of state of said static register and produce new signals from the distributor further to direct the operation of the computer elements.

16. A computer as defined in claim 15 comprising control elements coupled between the distributor and the static register which produce a signal indicating the end of one phase of computer operation and effect a further change of state of said static register to produce further new signals from said distributor to redirect the operation of the computer elements.

17. A computer as defined in claim 15 comprising control elements coupled between the distributor and the static register and controlled by at least one of said data processing elements which produce a signal indicating the end of one phase of computer operation and effect a further change of state of said static register to produce further new signals from said distributor to redirect the operation of the computer elements.

18. A computer defined in claim 15 wherein said locating means comprises apparatus coupled to a portion of said static register and responsive to the condition of that portion for locating either data or instruction locations in said memory.

19. An electrical computer having an addressable memory for storage data and operating instructions including an address locating means, data processing elements and circuitry interconnecting the elements, comprising control means coupled to said locating means including a static register and a distributor which exert mutual control over each other, said distributor containing encoding and decoding function table means for generating control signals for distribution to parts of the computer, said static register and distributor producing signals in a first condition to effect extraction of operating instructions from the memory by said locating means, said static register being responsive to a portion of an extracted instruction to generate in co-operation with said distributor operating signals for controlling said data processing elements, interconnecting circuitry, and locating means, and means coupled between the distributor and the static register for producing a signal indicating the end of one phase of computer operation and for effecting a further change of state of said static register to produce further new signals from said distributor to redirect the operation of the computer elements.

20. A computer as defined in claim 19 comprising a transfer circuit connecting said memory to said data processing elements and additionally connecting said memory to said static register, said transfer circuit being responsive to a first condition of said static register to transfer a portion of an instruction extracted from the memory to said static register.

21. An apparatus as defined in claim 19 wherein said instructions have a control portion for determining operations to be performed on data signals, a first address portion for selecting instructions from said memory, and a second address portion for selecting data from said memory, and further comprising an address register connected to said memory for receiving said first and second address portions of an instruction and switching means governed by said control means for transferring one of said addresses in said address register to said address locating means.

22. A program controlled electrical computer having elements for carrying out processes on information signals, said information signals representative of data and instruction, at least one storage means for storing said information signals, circuitry interconnecting said storage means and said elements, internal control circuits coupled to said storage means for receiving and executing said instructions and including input-output means for providing information signals to the computer or receiving said signals from the computer, a transfer register coupled between said input-output means and said computer elements for transferring said signals back and forth between said input-output means and said computer elements, and electronic monitor means coupled to said control circuits and to said transfer register for electronically controlling said transfer register and effective to generate a signal to prevent further transfers into said transfer register following transfer of a predetermined quantum of said signals thereinto until such time as said transfer register is cleared.

23. The apparatus defined in claim 22 further including a first tranfer means linking said input-output means and said transfer register and a second transfer means coupled to and controlled by said control circuits linking said at least one storage means to said transfer register, and wherein said electronic monitor means comprises a first bi-stable switch effective to generate first and second mutually exclusive signals, the first signal partially conditioning said first and second transfer means to initiate a transfer of information signals from said input-output means or from said at least one of said storage means to said transfer register, said second signal preventing initiation of a transfer of information signals to said transfer register.

24. The apparatus defined in claim 23 wherein said electronic monitor means includes a second bi-stable switch coupled to said second transfer means and effective to generate either one of a pair of mutually exclusive signals.

25. The apparatus defined in claim 24 in which said first transfer means is effective in response to said first signal from said monitor means to transfer information signals from said input-output means to said transfer register and said second transfer means is effective in response to a signal from the second switch and predetermined signals from said control circuits to transfer information from said register to said storage means.

26. The apparatus defined in claim 24 wherein said second switch is coupled to said input-output means and said second transfer means, and is responsive to a particular signal from said input-output means to generate a signal to enable the transfer of the information signals from said transfer register to said storage means in the presence of said predetermined control circuit signals.

27. The apparatus defined in claim 26 wherein said input-output means comprises apparatus for generating said particular signal after a desired number of information signals have been generated.

28. The apparatus defined in claim 22 further including a first transfer means linking said input-output means and said transfer register and a second transfer means controlled by said control circuits and linking said at least one storage means to said transfer register and wherein said electronic monitor means comprises a switch means effective to generate either one of a pair of mutually exclusive signals in which said first transfer means is effective in response to the first signal from said monitor means to transfer information signals from said input-output means to said transfer register and said second transfer means is effective in response to a signal from the switch and predetermined signals from said control circuits to transfer information from said transfer register to said storage means.

29. The apparatus defined in claim 28 wherein said switch is linked to said input-output means and said transfer means, said switch is responsive to a particular signal from said input-output means to generate a signal thereby to enable transfer of the information signals from said transfer register to said storage means in the presence of said predetermined control circuit signals.

30. The apparatus defined in claim 29 in which said input-output means comprises apparatus for generating said particular signal after a desired number of information signals had been produced.

31. A program controlled electrical computer having elements for carrying out processes on information signals, said information signals representative of data and instructions, storage means for storing said information signals, circuitry inter-connecting said elements and said storage means, internal control circuits coupled to said storage means for selecting and executing instructions in accordance with the program, input-output means for providing information signals to said storage means and receiving signals from said storage means, a transfer register coupled between said input-output means and said storage means for transferring information signals back and forth between said input-output means and said storage means, electronic monitor means controlling transfers and effective to prevent further transfers into said transfer register folowing transfer of a predetermined quantum of said signals thereunto until such time as said transfer register is cleared, and external manually operated control circuits coupled to said monitor means and said storage means for controlling the transfer of information signals to and from said storage means.

32. A program controlled electrical computer system having elements for carrying out processes on data, circuitry inter-connecting said elements, storage means for storing a program of instructions, internal control circuits coupled to said storage means for selecting and executing instructions in accordance with said program, first, second and third storage means for storing signals representative of information, at least one of said storage means being coupled to and controlled by said control circuits, said second storage means coupled between said first and said third storage means for transferring signals between said first and third storage means, and electronic monitor means coupled to said control circuits for controlling said transfers and effective to prevent further transfers into said second storage means following transfer of a predetermined quantum of signals thereunto until such time as said second storage means is cleared.

33. In a program controlled electrical computer having elements and at least one storage register for carrying out processes on data, a multiple address memory for storing instruction and data, circuitry inter-connecting said elements and said at least one storage register, internal control circuits coupled to said memory for executing instructions in accordance with the program, a memory addressing means coupled to said memory comprising an address register for storing a plurality of memory addresses, an input-output device for providing signals to the computer and receiving signals from the computer, a transfer register coupled between said device and said computer elements for transferring signals back and forth between said device and said computer elements, monitor means controlling transfers and effective to prevent further transfer into said transfer register following transfer of a predetermined quantum of signals thereinto until such time as said transfer register is cleared, a first transfer means linking said device to said transfer register and a second transfer means linking said at lease one storage register to said transfer register, said monitor means comprising a first bi-stable switch effective to generate first and second mutually exclusive signals, the first signal partially conditioning said first and second transfer means to initiate a transfer of information signals from said device or at least one of said storage means to said transfer register, said second signal preventing initiation of a transfer of information signals to said transfer register, and selection means coupled to said address register and controlled by said first bi-stable switch for selecting one of the addresses from said address register in response to the condition of said first bi-stable switch for addressing the memory by said memory addressing means.

34. The apparatus defined in claim 33 wherein said selection means comprises a further bi-stable switch controlled by said first bi-stable switch and said internal control circuits for generating third and fourth mutually exclusive signals, said first switch signal and predetermined signals from said internal control circuits being effective to cause a further bi-stable switch to generate a third switch signal, and wherein said second bi-stable switch is coupled to said address register thereby to select one address at a time from the plurality of addresses stored therein, a first address being selected in response to the third switch signal, and a different address being selected in response to the fourth switch signal.

References Cited by the Examiner

UNITED STATES PATENTS

| | | | |
|---|---|---|---|
| 2,679,638 | 5/54 | Bensky | 340—174 |
| 2,765,115 | 10/56 | Belounge | 235—61 |
| 2,765,456 | 10/56 | Hollander | 340—174 |
| 2,767,908 | 10/56 | Thomas | 235—157 |
| 2,772,050 | 11/56 | Robinson et al. | 235—61 |
| 2,781,968 | 2/57 | Chenus | 235—61 |
| 2,802,625 | 8/57 | Dickinson | 235—159 |
| 2,815,168 | 12/57 | Zukin | 235—157 |
| 2,834,543 | 5/58 | Burkhart | 235—159 |
| 2,874,902 | 2/59 | Edwards | 235—176 |
| 2,881,979 | 4/59 | Blundi | 235—176 |
| 2,916,210 | 12/59 | Selmer | 235—157 |
| 2,935,259 | 5/60 | Bird et al. | 235—167 |
| 2,959,351 | 11/60 | Hamilton et al. | 235—153 |

OTHER REFERENCES

Functional Description of the EDVAC, vol. 1, U. of Penn., Moore School of Electrical Engineering, 11/49, pages 2-5 to 2-9.

MALCOLM A. MORRISON, *Primary Examiner.*

LEO SMILOW, ABRAHAM BERLIN, CORNELIUS D. ANGEL, *Examiners.*